US006167384A

United States Patent [19]

Graff

[11] Patent Number: 6,167,384

[45] Date of Patent: Dec. 26, 2000

[54] AUGMENTED SYSTEM AND METHODS FOR COMPUTING TO SUPPORT FRACTIONAL CONTINGENT INTERESTS IN PROPERTY

[75] Inventor: Richard A. Graff, Chicago, Ill.

[73] Assignee: Graff/Ross Holdings, Chicago, Ill.

[21] Appl. No.: 09/145,341

[22] Filed: Sep. 1, 1998

[51] Int. Cl.[7] .................. G06F 15/30

[52] U.S. Cl. .................. 705/35; 705/1

[58] Field of Search .................. 705/35, 36, 1

[56] References Cited

U.S. PATENT DOCUMENTS

| | | | |
|---|---|---|---|
| 5,241,466 | 8/1993 | Perry et al. | 364/401 |
| 5,361,201 | 11/1994 | Jost et al. | 364/401 |
| 5,802,501 | 9/1998 | Graff | 705/36 |
| 5,913,198 | 6/1999 | Banks | 705/4 |

OTHER PUBLICATIONS

Forte, Joseph Philip, "Assessing the Causes and Consequences of Loan Defaults and Workouts", Real Estate Finance, vol. 9, No. 3, pp. 11–28, Fall 1992.

*Primary Examiner*—Allen R. MacDonald
*Assistant Examiner*—Susanna Meinecke-Diaz
*Attorney, Agent, or Firm*—Peter K. Trzyna, Esq.

[57] ABSTRACT

A computer system, and methods for making and using it, for changing digital electrical signals to generate a valuation of a fractional interest in a contingent interest in property, the computer apparatus including: an input device operable for converting input data representing property into input digital electrical signals representing the input data; a digital electrical computer having a processor, the processor electrically connected to the input device to receive the input digital electrical signals, the processor programmed to change the input digital electrical signals to produce modified digital electrical signals representing a valuation of a fractional interest in a contingent interest in the property associated with at least one lease default condition for the property; a memory electrically connected to the processor, and wherein: the processor manipulates further digital electrical signals to generate at least one document for the contingent interest by inserting the valuation in preexisting text data obtained from the memory; and an output device electrically connected to the processor to print the document.

17 Claims, 17 Drawing Sheets

AUGMENTED SYSTEM AND METHODS FOR COMPUTING TO SUPPORT FRACTIONAL CONTINGENT INTERESTS IN PROPERTY

TECHNICAL FIELD

This invention concerns a digital, electrical computer and a data processing system, and methods involving the same, applied to the financial fields of securities, real estate, and taxation. More particularly, this invention relates to a computer system for supporting a financial innovation involving the securitization of property, preferably by its decomposition into at least two components. One component can be an estate for years and/or an augmented estate for years interest, and a second component can be a remainder and/or a complementary remainder interest. The computer system computes the respective values and investment characteristics of the components, and produces documentation thereof, to facilitate financial transactions involving the separate components.

BACKGROUND OF THE INVENTION

A. Description of the Prior Art

During the last recession, a far greater number of businesses failed than would normally have been expected. Bankruptcies, financial defaults, and foreclosures on property also increased, and bad real estate loans caused an atypically large number of lenders to collapse. If there were obvious ways to increase investment return under conditions of economic stress, most likely those ways would have been uncovered long ago.

Consider real estate, for example. Commercial real estate market activity was at or near a standstill for several years around the start of this decade, beginning in the last recession and continuing for more than a year past the end of the recession. Although excess development of commercial space received great attention in the financial press, there was also a drastic reduction in capital available for real estate equity investment and finance.

Real estate equity capital declined as pension funds reduced or ended commitments of new equity capital to real estate capital markets. Capital for real estate finance declined correspondingly as savings and loan institutions withdrew from commercial real estate lending. Of even greater significance, real estate lending practices of insurance companies and commercial banks came under greater regulatory scrutiny in response to increased loan defaults in the early 1990s, which led to a tightening of standards for real estate loans and a reduction in flexibility on loan terms.

Property values fell, and investors were uncertain of how far values had fallen because so few sales of commercial property were occurring.

The problem was not a lack of potential investors. Although the pension funds had withdrawn from the markets, the core group of real estate developers and professionals involved in the markets before the pension funds entered were still committed to the real estate business and were still willing to commit capital to acquire and control real estate for business investment purposes.

Nor was the problem a lack of potential financing. Despite some withdrawal by savings and loan institutions, insurance companies were still available to provide financing for sound commercial real estate developments. However, there were at least two key constraints on loan commitments by insurance companies that had the practical effect of restricting the amount of available financing.

One key constraint was the emergence of a more strict regulatory environment that restricted the maturities of most loans that insurance companies were willing to make to no more than ten (10) years. This conflicted with the dictates of tax considerations for taxable investors, which suggested that the terms of loans should be at least fifteen (15) years, and preferably twenty (20) years or more.

A second key constraint was that, due to high nationwide vacancy rates in commercial properties, insurance companies were making real estate loans primarily on property that was almost fully leased to tenants that were unlikely to default on their leases. Thus, credit ratings of the tenants were a prime consideration in deciding whether loans should be made.

In fact, insurance companies usually viewed real estate loans as financings of existing tenant leases. Accordingly, lenders usually insisted that property owners assign the rent payments to the lenders to provide additional assurance that loan payments would be made, and lenders also insisted that the rent assignments totally amortize the loans. (The primary reason that most offered mortgages were for no more than ten years was that, in the high-vacancy rental environment existing at that time, most leases ran for no more than ten years.) Furthermore, the lenders could frequently have viewed their legal claims on the tenants' rental payments as perhaps more important than their claims on the property, because in a market with excess space, a claim on vacant space was not particularly valuable.

In other words, during this period of excess rental capacity, financing necessary to sustain the level of liquidity historically experienced by the real estate markets was not available from financial institutions on acceptable terms and conditions.

The result was market "gridlock" and a dearth of real estate transactions until the current economic expansion led to a nationwide increase in demand for rental space and a corresponding decrease in vacancy rates.

Similar troubles have been features of the real estate market at low points in the real estate cycle at various times in the history of the market. Despite great economic pressure to improve the situation, a more efficient technology for real estate finance in an economic environment of excess rental capacity and weak economic activity has not surfaced.

SUMMARY OF THE INVENTION

In response to the above, a new financial product has been developed based on the concept that property value consists of separately valuable property rights that can be worth more when sold separately. In a manner of speaking, the whole can be less than the sum of its parts.

With the development of a new financial product, a need has arisen for new machines and processes to use in bringing the product to market and sustaining it. These machines and processes are the subject of the present invention.

A. Real and Personal Property

As an example, in the case of property that is customarily leased by corporations, leased and unleased property have different investment characteristics. Ownership of leased property is a fixed-income asset with investment characteristics that depend upon lease covenants, the market for corporate debt, and the lessees' credit ratings. By contrast, ownership of unleased property is a speculative asset having investment characteristics that depend on the spot rental market for that type of property. Thus it is possible to split ownership of this type of property into at least two components, at least one of which is a fixed-income asset.

Consider real estate, for example, which can be divided into an estate for years and a remainder interest. Lenders can purchase the estate for years outright instead of writing a commercial mortgage on the whole property. Alternatively, a special purpose entity can be established to purchase the estate for years, and the lenders can purchase ownership or equity interests in the entity. Similarly, the other component—the remainder interest—can be purchased by real estate investors (or, again, the remainder interest can be purchased by a special purpose entity in which the real estate investors purchase equity or ownership interests) in lieu of the standard investment approach, in which the investor would purchase all rights to the property using some funds from a commercial loan. Examples of such special purpose entities include, but are not limited to, trusts, limited partnerships, and limited liability companies. The term of the estate for years can be determined by the parameters that describe the property, in particular by the remaining lengths of the terms of the existing leases.

For purposes of this summary of the invention, in those cases in which a special purpose entity is created to hold a component, for example, such as the estate for years or remainder interest, an equity interest in the component is intended to refer to an equity interest in the special purpose entity.

If the property is fully leased (or is almost fully leased), and the leases will not expire until after the estate for years has expired, then the estate for years has the investment characteristics of a fixed-income asset rather than of property. Under these circumstances, at least for real estate, insurance companies are allowed by regulators to treat the estate for years as a fixed-income investment, and to compute its value accordingly. In other words, the insurance companies value the estate for years based on cash flow characteristics of the leases and credit ratings of the tenants, and not based on the value of real estate or the risk in the real estate markets.

Due to an interplay of values for the property components and the needs of respective purchasers, including tax needs, it is frequently possible to sell the components of the property separately for more than the price that the property as a whole would command.

From the perspective of an investor who acquires the remainder interest, a purchaser of the estate for years has accepted an assignment of the lease payments for the term of the estate for years in return for financing the acquisition of the property by the remainder interest purchaser. From this perspective, the amount of financing provided is equal to the purchase price of the estate for years, the lease payments during the estate for years term completely amortize the financing, and the length of the financing term equals the term of the estate for years.

Unlike traditional mortgage finance, shorter financing terms (less than fifteen years) are not a problem under this structure for the remainder interest investor, because: (1) during the estate for years term, the investor does not incur any tax liabilities; and (2) taking possession of the property upon expiration of the estate for years is not a taxable event for the investor. In other words, the investor does not have any tax liability until there is an obligation to pay taxes on rent payments received after taking possession of the property at the expiration of the estate for years, and those rental payments provide the cash to meet the taxes due on those payments. Therefore, the estate for years term is irrelevant to the remainder interest investor, except insofar as the term determines the amount of financing the estate for years purchaser provides (the longer the estate for years term, the greater the amount of financing). In addition, upon expiration of the estate for years, the remainder interest investor owns the property outright (i.e., without any debt).

From the perspective of a financier, this financing product has no claim on the property investor (i.e., the remainder interest investor), but the strongest possible direct claim on the tenants, because the financier is the owner of record during the estate for years term. In other words, this financing product is more efficient than a commercial mortgage at matching the legal recourse claims in event of default with the asset that is actually being financed: tenant promises to pay future rent. The estate for years term can be as long as the existing leases are committed to run—typically ten years or less, although sometimes longer in the case of property that is fully leased for long terms. However, investor preferences may dictate an estate for years term that is significantly shorter than the longest lease term, and technical considerations may suggest an estate for years term that is slightly longer than the longest lease term.

In addition, ownership can be structured so that the transaction creates the estate for years and the remainder interest, in order to create the most favorable tax consequences for the financier and the property investor.

It is frequently the case that special purpose entities with one or more limited liability equity interests created to hold one or more components can enhance the value of equity interest(s) in the components. An opportunity for value enhancement can arise because direct ownership of an equity interest in tangible property can expose the owner to potentially unlimited legal liability as a result of events involving the property, whereas component ownership via an equity interest in the entity is a limited liability equity interest in the component. In other words, a special purpose entity with one or more limited liability equity interests can transform one or more components of a property into limited liability components, i.e., components with one or more limited liability equity interests. Thus market-based component valuation, in the case in which a component is held by an entity, involves both valuation of the investment characteristics of a component and the effect of the entity on the investment characteristics of the component.

Any additional tax liability created by existence of a special purpose entity that contains one or more components of a property detracts from the investment returns that flow from the property to investors in the components, resulting in a reduction in the market values of the relevant components. The loss of value is most significant in the case of United States federal tax liabilities, since United States federal tax rates are usually higher than corresponding state and local taxes. Thus an appropriate entity for purposes of holding estate for years and remainder interests is an entity that does not incur additional tax liabilities, at least at the United States federal tax level. A pass-through entity for United States federal tax purposes is an example of such an entity. An example of such a pass-through entity is a grantor trust.

Since an entity that holds one or more component interests in a property is not expected to retain significant amounts of income, another appropriate type of entity is an entity that is allowed a United States federal tax deduction for distributions to holders of equity interests in the entity.

In cases in which an entity holds one or more components of a property, the entity can be used to modify investment characteristics of the components without modifying underlying leases on the property. For example, put or call options on some equity interests in the entity can be inserted into the organizational document of the entity. In the case of fixed-income components, these can be used to add features that are sometimes found in United States government bonds and corporate bonds without approaching lessees to renegotiate the leases.

It is not necessary for a component to be purchased in its entirety by one investor. A component can be divided into shares so that investors can purchase fractional interests in the component (the fraction representing the fractional interest being a positive number less than or equal to one). In those cases in which there is a special purpose entity for the component, fractional interests in the component can be created by dividing the equity interest in the entity into shares with equal equity participation rights. This accords prospective investors the investment option of purchasing fractional interests in the component simply by purchasing fewer than the entire number of shares in the equity interest.

More generally, multiple classes of shares with various equity participation rights in an entity can be created, according investors the investment option of purchasing more general types of equity interests, e.g., in a component.

More particularly, an investor can purchase an equity interest (e.g., in a component) that is less than the entire equity interest (e.g., in the component). In the case wherein the entire equity interest is divided into fractional interests, each fractional interest is valued by multiplying the valuation of the entire equity interest by the fraction represented by the fractional interest. For example, in the case wherein the entire equity interest in the component is divided into more general types of equity interests, the equity interests may be valued by more general market-based techniques, such as by regarding an individual equity interest as a separate temporal component if the investment characteristics of the equity interest are those of a temporal component and valuing each such interest by the methodology introduced herein for valuing components. If one of these equity interests is then further subdivided into fractional subinterests, then each fractional subinterest is valued by multiplying the valuation of the entire equity interest by the fraction represented by the fractional subinterest.

An example of more general equity interests (e.g., in one or more remainder components) occurs in cases in which insurance is available to protect remainder component investors against the risk of a decline in property value below some specified value at some specified future time or time interval close to the expiration date of the estate for years term. Such insurance, known as residual value insurance, implies that the minimum possible return over the estate for years term for remainder component investors is greater than −100% so long as the insurer remains solvent, and that the value of the minimum possible investment return for the remainder component over the estate for years term is equal to the return value that will transform the remainder component purchase price into the insured minimum future property value. The existence of residual value insurance implies that the remainder component can in turn be decomposed into at least two types of equity interests, including a preferred equity interest that receives most or all of the protection of the residual value insurance and a residual equity interest that receives little or none of the protection of the residual value insurance.

The preferred equity interest may be viewed for investment purposes as a zero-coupon fixed-income asset, possibly with a bonus feature of an equity participation on the upside, with a bond term approximately equal to the estate for years term and a credit rating equal to the credit rating of the insurer. Accordingly, the preferred equity interest will be of interest primarily to fixed-income investors and the residual equity interest will be of interest primarily to equity investors. Such preferred/residual decompositions of remainder interests carve additional fixed-income assets out of property that are essentially independent of the fixed-income assets represented by the estate for years components.

Another example of a more general equity interest in property (e.g., in a component, for example, a remainder interest) is a contingent equity interest, e.g., a contingent equity interest that will only become an unconditional (or less-conditional, if there is at least one additional contingency) equity interest at some future date if some event or combination of events occurs or fails to occur, whose future occurrence is uncertain when the contingent interest is established. For example, the specified contingency can be the occurrence (or nonoccurrence) of the default conditions (or a subset of the default conditions) in one or more property leases, the occurrence (or nonoccurrence) of a further specified combination of which (e.g., the occurrence of any one of which) will activate the contingency. It follows that each specified contingency actually corresponds to at least two contingent equity interests: the primary equity interest, which is the contingent equity interest in the property that represents an equity interest in the property until and/or unless the specified contingency does in fact occur or fail to occur (e.g., an equity interest in the property subject to a condition subsequent), and the secondary equity interest, which is the contingent equity interest in the property that only represents an equity interest in the property once the specified contingency does in fact occur or fail to occur (e.g., an equity interest in the property subject to a condition precedent).

A secondary contingent equity interest in property (e.g., in a remainder component) that can only be activated by a specified set of lease default conditions (for example, a specified set of lease default conditions that includes the lease default conditions that relate to lessee bankruptcy) can be valuable to a property holder (e.g., an estate for years holder) if held as protection or supplemental protection against economic loss in event of lessee nonperformance. More particularly, in event of lessee default and/or bankruptcy, one or more secondary contingent property interest(s) can provide an equity property interest holder with loss protection or supplemental loss protection to legal remedies available from lease default provisions and/or bankruptcy law. For example, in event of lessee default and/or bankruptcy, secondary contingent remainder interest (s) can provide an estate for years holder with an equity property interest after expiration of the estate for years term in addition to legal remedies available from the estate for years interest alone (e.g., legal claims on the defaulting lessee and/or rights to release the property during the estate for years term). However, if no lessee defaults occur during the estate for years term, then the secondary contingent interest never becomes an actual equity interest in the property, and hence never entitles the holder to any investment returns from the property.

An augmented interest in property can be viewed as consisting essentially of an interest in property together with one or more secondary contingent interests. For example, a combination of an estate for years interest in property (or more than one estate for years interests in property) and at least one secondary contingent interest in the property (e.g., at least one secondary interest in at least one remainder interest in the property) can be viewed as an augmented estate for years interest that provides the holder with greater protection against economic loss due to lessee default than the corresponding protection against loss provided by an estate for years interest alone. Such an augmented estate for years is an additional example of a component temporally decomposed from property. In cases in which there is an augmented estate for years interest, the expression "complementary remainder interest" will refer in this invention description to consisting essentially of the portion of the equity interest(s) in the property that is not included in at least one augmented estate for years interest. For example, the complementary remainder interest can include any primary contingent interest(s) that corresponds to the at least one secondary contingent interest included in the at least one augmented estate for years. An augmented estate for years interest and complementary remainder interest in a property can be viewed as an example of a temporal decomposition of the property that is an alternative and/or supplemental temporal decomposition to an estate for years interest and a remainder interest in the property.

As is the case with an estate for years, an augmented estate for years can be viewed as an alternative and/or supplemental financing instrument to a conventional mortgage. (In this view, the corresponding complementary remainder interest can be viewed as analogous to conventional mortgaged equity.) An advantage of an augmented estate for years over conventional mortgage finance is that the protections and remedies provided against economic loss in the event of lessee default can be utilized and carried to completion in a more efficient manner. In applications to property finance, either an augmented estate for years or a conventional mortgage or both can be used, as may be desired.

A valuation (e.g., market-based) for a fractional interest in a contingent interest can be computed by discounting expected future net cash flows from the fractional interest at an appropriate risk-adjusted rate. For example, a valuation (e.g., market-based) for such an augmented estate for years component can be computed by discounting the expected cash flows of the estate for years interest at a market-based discount rate that reflects lessee creditworthiness together with the additional loss protection provided by the secondary contingent interests. This can frequently be a materially lower discount rate than the estate for years interest alone could be expected to receive in the marketplace. For example, in the case of medium below-investment-grade lessee credit ratings (e.g., single B or better), if the lowest value that can reasonably be expected for the combined contingent interests is always at least a material percentage (e.g., twenty percent or larger) of the expected estate for years value throughout the estate for years term, then an appropriate market-based discount rate for valuation of an augmented estate for years interest can frequently be a discount rate that corresponds to an investment-grade fixed-income credit rating for the augmented estate for years.

The valuation of the fractional interest in the contingent interest in the property can be inserted by the supporting computer system in a computer-generated document, and preferably the document is one of a group of documents used for securitization of the contingent interest (or any fractional interest therein) in the property. In such a case, the contingent interest can be an augmented estate for years interest, a complementary remainder interest, or both. Interestingly, a valuation of the contingent interest (or the fractional interest therein), usually including taxation, may need to be recomputed subsequent to elimination of a contingency in the contingent interest due to occurrence of the at least one lease default condition for the property. And as with the creation of the document including the initial valuation, the supporting computer can generate an additional document utilizing the recomputed tax. Of course, it is most efficient to have the documentation include text for paper-clipping (and/or stapling) shares in the augmented estate for years interest and/or complementary remainder interest.

The time period during which specified lessee nonperformance can activate a secondary contingent interest will frequently coincide with the estate for years term. However, the time period does not have to coincide with the estate for years term. Occasionally, the time period can be slightly longer than the estate for years term, in order give the secondary contingent interest holder additional time to verify that the lessee(s) has performed as required by the lease(s) during the estate for years term.

In addition, the time period for activation of a secondary contingent interest can sometimes be shorter than the estate for years term. The creation of a contingent interest with a shorter contingency period can be motivated by the fact that an estate for years interest in a property is an economic asset whose value totally amortizes away over the estate for years term, while the combined value of the corresponding complementary remainder interests slowly accretes towards 100% of the value of the property. This suggests that there can come a time during an estate for years term at which a contingent equity interest is a claim on an equity interest whose value is materially greater than the value of the estate for years interest. At this point, an activation of the entire secondary contingent interest could provide the estate for years holder with significantly more valuable property rights than needed for protection against economic loss due to lessee nonperformance. This situation can be avoided by creating several secondary contingent equity interests with different expiration dates for the respective specified contingencies, for example, secondary contingent interests with the same specified contingency but with staggered expiration dates for the respective periods during which the specified contingency can activate the respective equity interest.

An augmented estate for years interest can be viewed as having a term, the term coinciding with the term of vested property interests in the augmented estate for years, e.g., the longest term of the property interests that are included in the augmented estate for years other than the secondary contingent interests that are included in the augmented estate for years. For example, in the case wherein the actual property interests in the augmented estate for years consist of one estate for years interest, the augmented estate for years term and the estate for years term can usually be expected coincide.

In cases of property decomposition in which there is both an augmented estate for years interest and a preferred/residual decomposition of at least one remainder interest, it is usually preferable for both the at least one augmented estate for years interest and the at least one preferred interest in the at least one remainder interest to be fixed-income components such that neither fixed-income component is subordinated to the other. Accordingly, in such situations, a secondary contingent equity interest that comprises part of the at least one augmented estate for years interest will usually be a contingent equity interest in the at least one residual interest portion of the at least one remainder interest.

In cases in which there is an entity for a component, the purchase by investors of less-than-entire interests in the component may be facilitated by the division of the equity interest in the entity into one more classes of shares. If there is a single class of shares in the entity, then a purchase of shares in the entity is equivalent to the purchase of a fractional economic interest in the component.

One or more entities can also facilitate the creation of shares in an augmented estate for years. For example, there can be at least one entity that is an entity for both the at least one estate for years that is included in the augmented estate for years and at least one secondary contingent interest that is included in the augmented estate for years interest. In this case, at least one class of shares in the augmented estate for years interest can be fractional interests in the at least one entity. Alternatively, or in addition, in a second case, shares in at least one class of shares in the augmented estate for years interest can be interests in the at least one entity such that the shares represent equity interests in the at least one estate for years interest alone, and shares in a second class of shares in the augmented estate for years interest can be interests in the entity such that the second class of shares represents equity interests in the at least one secondary contingent interest but not in the at least one estate for years interest. In the second case, wherein there are separate classes of shares for the estate for years interest that is included in the augmented estate for years interest and the at least one secondary contingent interest that is included in the augmented estate for years interest, shares for the at least one estate for years interest and shares for at least one secondary contingent interest can be combined into and/or sold as equity units in the augmented estate for years interest.

In the second case, shares in equity units in the augmented estate for years interest can be "stapled" together, i.e., the equity units can be structured so that shares comprising individual units cannot be detached from each other during the estate for years term, but instead must be purchased and sold during the estate for years term as equity units. Alternatively, or in addition, equity units in the augmented estate for years can be "paper-clipped" together, i.e., the equity units can be structured so that, following issuance of the units or after the elapse of some time period (shorter than the remaining portion of the estate for years term) following issuance of the units, shares comprising individual units can either remain grouped into units or can be detached from each other and henceforth purchased and sold separately, these choices to be made by individual unit holders according to their individual preferences. Equity units can also be structured so that some shares (and/or groups of shares) in equity units are stapled together and other shares (and/or groups of shares) are only paper-clipped together.

A third case is for an entity for the at least one estate for years interest that is included in the augmented estate for years interest to be separate from each entity for the at least one secondary contingent equity interest that is included in the augmented estate for years. In this case, shares (e.g., equity units) in the augmented estate for years can be comprised of shares in the at least one entity for the at least one estate for years interest that is included in the augmented estate for years interest together with shares in the at least one secondary contingent equity interest that is included in the augmented estate for years. As in the second case of equity units in an augmented estate for years interest, equity units in this case can be structured so that shares in individual equity units are stapled together and/or paper-clipped together.

Although it is expected that entities associated with components will be special purpose entities established to facilitate specific transactions, more general entities not designed for specific transactions may be appropriate in some circumstances. For example, this could occur in order to avoid duplicative costs associated with creating multiple separate entitles in situations wherein multiple equity interests with the appropriate investment characteristics can be created with fewer entities.

As in the case of special purpose entities with limited liability components, a more general entity for a component can affect both the extent of liability exposure on the part of investors in that component and also the degree of control investors in that component and possibly also investors in other components of the property as well have over the property in event of lessee default during the estate for years term. Thus market-based component valuation in the case wherein any component is held by an entity involves valuation of the investment characteristics of the component, including any effect of any entity on the investment characteristics of the component. So for example, a component that is a lease or leases packaged in an entity (e.g., a limited liability component) can have a different valuation than a naked lease or leases-more particularly, this is likely to be the case if more than one of the components is a limited liability component.

There can also be cases in which there is an entity for an equity interest in a component, which can be either in lieu of or in addition to an entity for the entire component. For example, in the case of publicly traded equity interests in a component, nominal ownership of the equity interest could be held by an investor's brokerage firm, or the equity interest could be in the form of depositary receipts for shares in a component such as American Depositary Receipts for shares whose registered ownership resides offshore, with no material impact from an investor's perspective on the investment characteristics of the equity interest. More generally, in cases in which an entity for an equity interest has no material effect on investment return, risk, or liquidity characteristics of the equity interest, and no material effect on the degree of investor control potentially available to an investor, the existence of the entity will have no effect on valuation of the equity interest.

In this way, there can be a concatenated sequence of entities for an equity interest. Such a functional sequence can be regarded for investment analysis and descriptive purposes as a single entity.

The effect of such a concatenated sequence on valuation of a component can be analyzed by successively valuing the impact of each entity in the sequence, starting with the entity that is legally closest to the property and working successively towards the entity that is legally closest to the investor.

In the case of real estate, the purchase price of an estate for years (and/or an augmented estate for years) component alone, or a material interest therein, will almost never be large enough to cover the sale price of the property and the cost of component separation. This implies that a market-based valuation and sale of the remainder (and/or complementary remainder) component, or a material interest therein, is an essential factor in the implementation of component separation. In the case of tangible personal property, the purchase price of an estate for years (and/or augmented estate for years) component also will almost never not be large enough to cover the sale price of the property and the cost of component separation, except in those cases wherein the property can reasonably be expected to reach the end of its useful economic life during the estate for years (and/or augmented estate for years) term.

B. Tax-exempt Finance

Separating property into at least two components along a time dimension (e.g., into an estate for years interest and a remainder interest (and/or an augmented estate for years interest and a complementary remainder interest)) can also be used to enhance the investment value of tax-exempt securities such as tax-exempt general obligation bonds, tax-exempt industrial revenue bonds, and tax-exempt leases. This separation can be applied either to individual securities or to pools of tax-exempt securities. Value enhancement can be achieved in two ways: (1) cash flow streams from the components can appeal to investors who would not be interested in the entire cash flow stream of the original asset, and (2) the combined tax shelter benefits that accompany the components can be greater than the tax shelter benefits associated with the original asset. Both effects are significant, though in some situations, the tax effect will be the more dramatic of the two.

Unlike the example of taxable leased property discussed above, for the tax-exempt property example, both components can be viewed as fixed-income securities. One would expect that these fixed-income securities would be valued by investors in the marketplace by comparison with other fixed-income securities.

For tax-exempt securities, to effect a successful change in cash flow benefits from splitting the property or asset into components, one can proceed indirectly in separating the asset into components. Rather than directly separating ownership of the tax-exempt security itself, it is better to create an entity to hold the tax-exempt security, and then to separate one or more of the equity interests in the entity along the time dimension into estate for years and remainder components (and/or augmented estate for years and complementary remainder components).

From a legal perspective, creating tax-exempt components can be accomplished within the framework of a general or special purpose entity, examples of which include general and limited partnerships and mutual funds. However, to create limited-liability components, smooth the cash flow streams, and avoid an imposition of unusual bookkeeping requirements on fixed-income investors, an entity with one or more limited liability equity interests is the preferred format, with some limited liability equity interests as the assets that are subject to component separation. To enhance marketability of the components, and to facilitate investor valuation of the components by comparison with alternative fixed-income investments available in the marketplace, the entity may alter the frequency of cash flows to holders of equity interests from schedules of the original assets (e.g., the original assets could generate monthly cash flows, and the components could generate semiannual cash flows).

In general, component separation will produce two effects: (1) the estate for years (and/or augmented estate for years) components will generate more tax deductions than are necessary to shelter the cash flows of this component from taxes; and (2) the remainder (and/or complementary remainder) interest component will generate fewer tax deductions than are necessary to shelter the cash flows of this component from taxes (the tax obligations associated with the remainder (and/or complementary remainder) component will still be lower than those associated with a conventional taxable fixed-income security). It is also possible that, in some situations, purchasers of taxable securities may view remainder (and/or complementary remainder) interests as taxable securities and value those interests more highly than investors in tax-exempt securities.

The same component separation technology can be applied to separate the following fixed-income assets along the time dimension into components: a taxable fixed-income security, a portfolio of taxable fixed-income securities, a portfolio of taxable and tax-exempt fixed-income securities. More generally, the same component separation technology can be applied to any asset or portfolio of assets that is either ratable as if it were a fixed-income security (possibly of investment grade), where the term "ratable" refers in general to fixed-income ratings assigned by widely recognized investment rating agencies such as Standard and Poor's and Moody's Investors Service, or classifiable for regulatory purposes as a fixed-income security (possibly of investment grade) by a major regulatory agency for financial institutions or institutional investors, e.g., National Association of Insurance Commissioners (NAIC) investment classifications assigned by the NAIC Securities Valuation Office or the offices of individual state insurance commissioners. However, in general the maximum incremental tax benefits that can be generated are smaller than in the case of tax-exempt fixed-income securities.

The combined investment value of the tax deductions generated by the various components may be greater than, equal to, or lower than the tax deductions associated with the original tax-exempt or taxable asset (s). Since creating an entity to hold the original securities requires a diversion of a portion of the asset cash flow stream to pay administrative expenses associated with maintenance of the entity, component separation of securities is likely to be of interest only when the combined value of tax deductions generated by the components exceeds tax deductions associated with the original asset (s).

In general, determining a schedule of economic benefits associated with various equity interests in the entity, valuing the tax deductions associated with the components, and pricing of the components as fixed-income securities, are computation-intensive procedures.

C. Automated Support

To efficiently offer the above-described financial products, it would be best to use automated means to do computing and data processing, i.e., machine, manufacture, and process applied to supporting the proper structuring and pricing of the components. Efficiency also dictates a need to use automated means to incorporate the computational output in generating financial documents associated with a separated purchase transaction.

Therefore, the invention has an object providing a machine, manufacture, and process for providing applied to financial analytical data automation, including pricing data, for the decomposition of property.

A further object of the invention is to provide the same applied to supporting a new financing product that is based on providing financing of preferably fifteen years or less, while also allowing taxable investors to avoid tax problems encountered with typical mortgage financing.

Another object of the invention is to provide the same applied to calculating financial particulars of the property based on the concept that the source of property value is property rights that can be split and separately valued.

Another object of the invention is to provide the same applied to using the financial particulars in efficiently tailoring financial documents to support transactions involving property components.

Another object of the present invention is to provide the same applied to real estate as the property.

Still another object of the invention is to provide the same applied to supporting the decomposition of real estate into an estate for years (and/or augmented estate for years) and a remainder (and/or complementary remainder) interest, particularly for computing the price, including tax, of these components.

Still another object of the invention is to provide the same to computing the after-tax yield for the estate for years (and/or augmented estate for years) and the equivalent pretax yield that would be required to obtain the same after-tax return from a bond.

Yet another object of the present invention is to provide the same applied to equity interests in entities that hold tax-exempt securities or pools of tax-exempt securities as the property.

Yet another object of the invention is to provide the same applied to supporting the decomposition of equity interests in entities that hold tax-exempt securities or pools of tax-exempt securities into estate for years (and/or augmented estate for years) and remainder (and/or complementary remainder) interests, particularly for computing the price, including tax, of these components.

Still another object of the invention is to provide the same applied to analyzing the returns offered based on certain assumptions to inform potential investors of the range of outcomes as they relate to certain inputs.

Still another object of the invention is to provide the same applied to generating data so that comparisons can be made to alternative investment opportunities.

These and other objects are addressed by a digital computer having a logic means for controlling electrical signal processing and modification. The logic means can be completely hard wired or it can be programmable so that one or more computer programs can run on the digital computer. Preferably an embodiment includes a computer program running on a programmable digital computer system to provide financial analytical data concerning decomposed property. The computer system is connected to receive information representing a description of the characteristics of the property from a data input means, such as a keyboard. The computer system also outputs computed data and documentation to an output means and saves the output financial analysis to a memory system. The computer system also has a second means for automatically controlling the digital computer to produce financial documents from the financial analysis and model documents stored in the memory system.

The computer system uses as input data information obtained from a variety of sources, including The Wall Street Journal tabulation of daily Treasury bond interest rates, insurance company weekly publications that list private placement debt risk premia, the property offering documents, and the property lease documents. For applications to tax-exempt finance, the computer system also uses tax-exempt bond finance interest rates tabulated and published daily by such sources as Telerate Systems.

With this information, it is possible to compute the following: (1) the optimal choice of the estate for years (and/or augmented estate for years) term to maximize profitability of the components; (2) whether risk characteristics of either component are appropriate for inclusion in a prospective investor's portfolio; and if so, (3) whether an expected return justifies the system-determined purchase price.

BRIEF DESCRIPTION OF THE DRAWINGS AND SPECIMENS

The aforementioned and other objects and features of this invention and the manner of attaining them will become apparent, and the invention itself will be best understood, by references to the following description of the invention in conjunction with accompanying figures and specimens.

A. Figures

FIG. 4*a*–4*e* is a flow chart showing the data input, computational and other logic, and data output of the logic means for controlling the computer system in accordance with the present invention.

FIGS. 5*a*–5*d* is a flow chart showing the data input, computational and other logic, and data output of the logic means for controlling the computer system in accordance with the present invention as applied to tax-exempt property.

Figure 6:
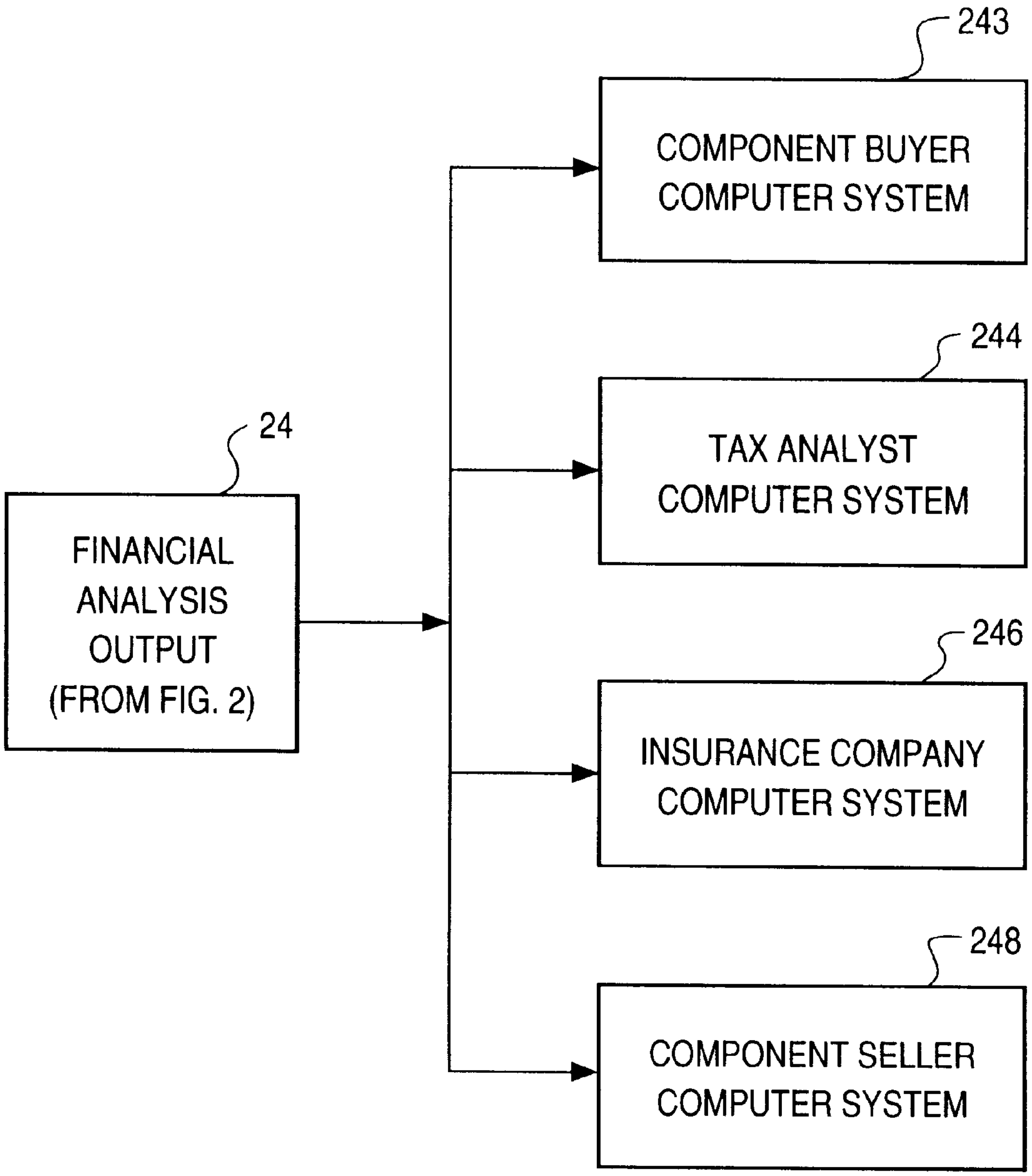

FIG. 6 is a graphic representation of interrelated computer systems, in accordance with the present invention.

B. Specimens

Specimen 1 (Screens 1–4) is a series of computer screens constructed by the computer system, in accordance with the present invention.

Specimen 2 (Screens 1–4) is a series of four computer screens constructed by the computer system, for another embodiment in accordance with the present invention.

Specimen 3 is an example of a financial document for an estate for years real estate component constructed based on data in the data table and by means of the computer system, in accordance with the present invention.

Specimen 4 is an example of a financial document for a remainder real estate component constructed based on data in the data table and by means of the computer system, in accordance with the present invention.

Specimen 5 is an example of a financial document for securitization of a remainder real estate component constructed based on data in the data table and by means of the computer system, in accordance with the present invention.

Specimen 6 is an example of a financial document for securitization of a remainder real estate component constructed based on data in the data table and by means of the computer system, in accordance with the present invention.

Specimen 7 is an example of a financial document for securitization of a primary contingent remainder real estate interest, constructed by the computer system, in accordance with the present invention.

Specimen 8 is an example of a financial document for securitization of a secondary contingent remainder real estate interest, constructed by the computer system, in accordance with the present invention.

Specimen 9 is an example of a financial document for a securitized interest in a primary contingent remainder real estate interest, constructed by the computer system, in accordance with the present invention.

Specimen 10 is an example of a financial document for a securitized interest in a secondary contingent remainder real estate interest, constructed by the computer system, in accordance with the present invention.

DETAILED DESCRIPTION OF A PREFERRED EMBODIMENT OF THE INVENTION

A. Financial Innovation

Figure 1:
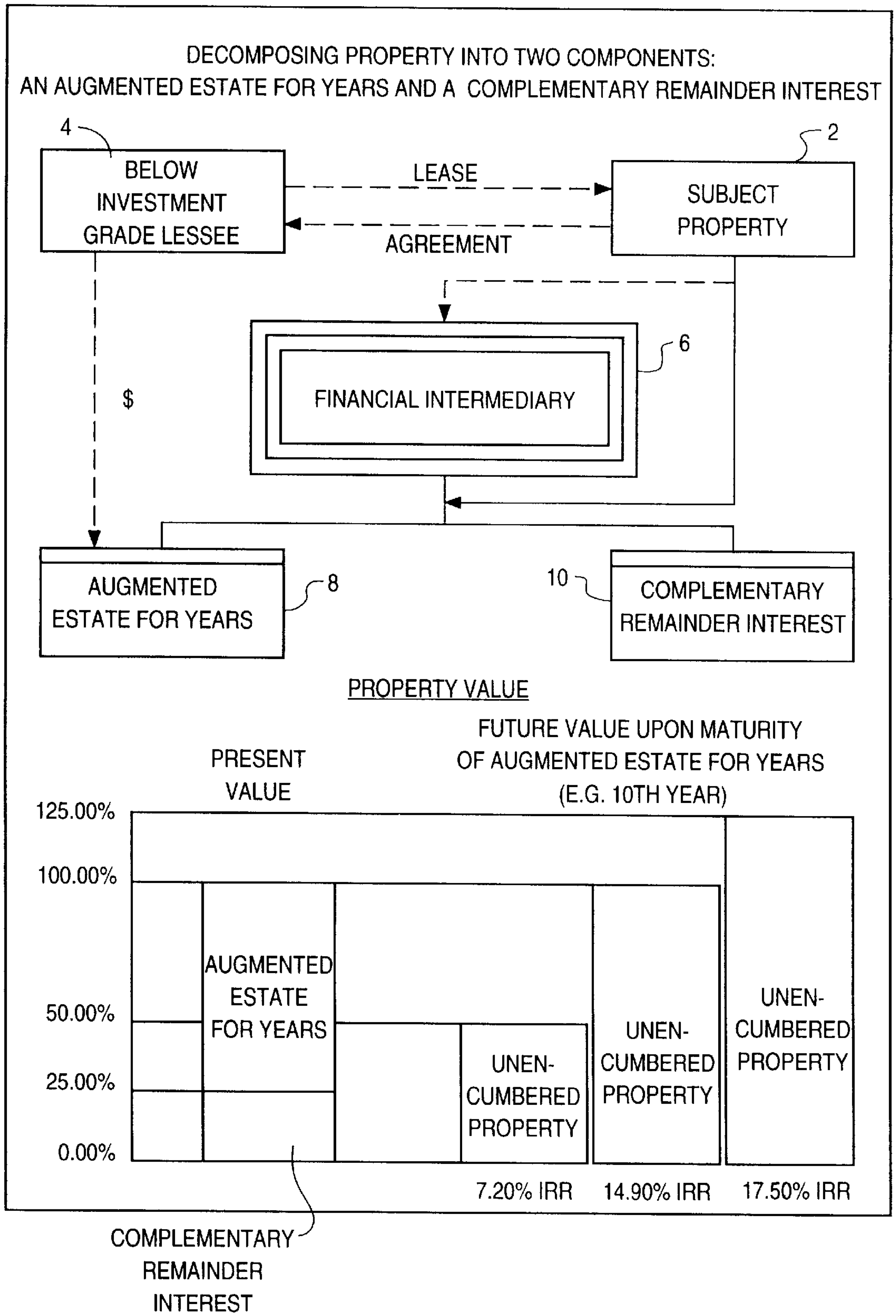
FIG. 1 is a graphic representation of a separated purchase transaction in accordance with the present invention.

FIG. 1 illustrates the nature of the financial innovation that gave rise to the need for the computer system and methods of the present invention. Rights to a Subject Property 2 (any property whatsoever, but in a preferred embodiment, real estate) are leased to a Lessee 4, preferably an investment-grade lessee, for a definite term, in exchange for rent. All rights to the Subject Property 2 and cash flow from rent money from the Subject Property 2 are conveyed to an investor in an estate for years (and/or augmented estate for years), or to an entity with one or more limited liability equity interests, for example a trust, that holds title to the estate for years (and/or augmented estate for years) and that—absent any competing claims—flows the rent money through to the investor. Financial Intermediary 6 separates the Subject Property 2 and cash flow of rent money into at least two components, using a computer system and methods of the present invention. The components are usually securitized into rights to an Augmented Estate For Years 8 and a Complementary Remainder Interest 10. For example, property law provides mechanisms for the temporal decomposition of property. In the case of real estate, one mechanism is to create multiple deeds. For example, there can be a deed to a term (and/or augmented term) interest in a property, and a separate deed to a remainder (and/or complementary remainder) interest in the property. In nearly all states, both deeds represent real interests in the property. As a further example, there can be at least three deeds in the case of an augmented estate for years/complementary remainder decomposition: a deed to a term interest in the property, a second deed to a primary contingent interest in the property, and a third deed to a secondary contingent interest in the property. Similarly, in the case of tangible personal property there can be multiple titles, for example, a title to a term (and/or augmented term) interest in a property and a separate title to a remainder (and/or complementary remainder) interest in the property, and/or (in the case of an augmented estate for years/complementary remainder decomposition) there can be a title to a term interest in the property, a second title to a primary contingent interest in the property, and a third title to a secondary contingent interest in the property. Of course, there can be more titles for more interests, as may be desired. The use of a financial intermediary facilitates the separation process but is not necessary in all cases.

The term of separation usually coincides with the remaining term on the existing tenant lease, and is almost never longer than the shortest remaining tenant lease term. The estate for years (and/or augmented estate for years) component can, therefore, be viewed as a fixed-income asset, but tax considerations may dictate whether the remainder (and/or complementary remainder) component is viewed as a pure equity asset or as a mixture of pure equity and fixed-income.

When component separation takes place, Subject Property 2 is sold to the Financial Intermediary 6, and at least two entities (e.g., two trusts) may be established to acquire actual titles to the respective components (or, in the case of an augmented estate for years, three entities may be established to acquire actual respective titles to the estate for years, the primary contingent interest, and the secondary contingent interests). For example, the estate for years (and/or augmented estate for years) can be a term (and/or augmented term) of years interest. In the case of real estate as the property, an entity (e.g., a trust) is issued a deed to the term (and/or augmented term) of years interest by the property seller and a second entity (e.g., a second trust) is issued a deed to the remainder (and/or complementary remainder) interest by the property seller (or, in the case of an augmented estate for years, one entity is issued a deed to the term of years interest, a second entity is issued at least one deed to the at least one primary contingent interest, and a third entity is issued at least one deed to the at least one secondary contingent interest). In the case of tangible personal property as the property, an entity (e.g., a trust) is issued a bill of sale for the term of years interest by the property seller and a second entity (e.g., a second trust) is issued a bill of sale for the remainder (and/or complementary remainder) interest by the property seller (or, in the case of an augmented estate for years, one entity is issued a bill of sale for the term of years interest, a second entity is issued at least one bill of sale for the at least one primary contingent interest, and a third entity is issued at least one bill of sale for the at least one secondary contingent interest).

Any existing property debt is retired at, or prior to, the time of acquisition. An obligation of any manager of such an entity (e.g., trustee of such a trust) for the Augmented Estate for Years 8 is to preserve title to the estate for years (and/or augmented estate for years) and to prevent any property encumbrances from being established during the separation term.

If there is an entity for an estate for years (and/or augmented estate for years) (e.g., a trust), it has a term (and/or augmented term) beneficial interest, and if there is an entity for a remainder (and/or complementary remainder) interest (e.g., a trust) it has a remainder (and/or complementary remainder) beneficial interest. The term (and/or augmented term) beneficiary has all rights and obligations of estate for years (and/or augmented estate for years) ownership during the life (or term) of the entity for the estate for years except a right to encumber the property or petition a court to terminate or dissolve the estate for years/remainder (and/or augmented estate for years/complementary remainder) interest structure. A remainder (and/or complementary remainder) beneficiary enjoys no rights or benefits until the term interest expires, and then enjoys all rights and benefits of the fee simple title.

In this case, the term (and/or augmented term) beneficial interest becomes the (fixed-income) estate for years (and/or augmented estate for years) component, and the remainder (and/or complementary remainder) beneficial interest becomes the remainder (and/or complementary remainder) component.

In the case of an augmented estate for years, several legal structures can transform a secondary contingent remainder interest into an unconditional (or less-conditional) remainder interest at the time of (or a specified amount of time after) occurrence of a specified contingency and also deactivate a corresponding primary contingent remainder interest. In the case wherein there are separate deeds (or bills of sale) to the primary and secondary contingent remainder interests, the transformation and deactivation can occur automatically for legal purposes if so specified in the deeds (or bills of sale), without any further action on the part of either contingent remainder holder. In order to guard against any possibility of unlawful taking or use (e.g., adverse possession) of the property after expiration of the term of years by the holder of the (formerly) primary contingent remainder, the secondary contingent remainder owner can register occurrence of the contingency and the resulting strengthened equity status of the (formerly) secondary contingent remainder with appropriate authorities (for example, in the case of real estate, with the appropriate county recorder of deeds or registrar of titles), and/or serve notice on relevant organizations and individuals (e.g., the holder and/or owner of the term of years interest). In the case wherein there are one or more entities for the deeds (or bills of sale) to the primary and secondary contingent remainders, the organizational document of the entity for the (formerly) secondary contingent remainder can direct the entity to perform the registrations and/or serve the notices for the (formerly) secondary contingent remainder holder.

In a second case, there may not be separate deeds (or bills of sale) for the primary and secondary contingent remainder interests. For example, there may be separate deeds (or bills of sale) to a term of years interest and a remainder interest, an entity for the term of years interest, a second entity for the remainder interest, and primary and secondary contingent interests in the entity for the remainder. In this case, the organizational document for the entity for the remainder interest can bestow all rights and obligations of beneficial ownership in the entity on the holder of the primary contingent remainder interest until (or a specified amount of time after) notification (for example, in a specified/acceptable format) of occurrence of the specified contingency, and afterwards to bestow all rights and obligations of beneficial ownership in the entity on the holder of the (formerly) secondary contingent remainder interest.

Examples of possible specified/acceptable formats for notification include the following: in the case wherein the entity for the term of years is distinct from the entity for the remainder, the organizational document of the entity for the estate for years can provide for automatic notification of the entity for the remainder in event of specified lessee defaults and/or bankruptcy. Alternatively, or in addition, in the case wherein the specified contingency is comprised of types of bankruptcy filings, the at least one holder of the secondary contingent remainder interest can attorn in an affidavit that the contingency has occurred, citing the court, jurisdiction, and date of the filing, etc. The organizational document of the entity for the remainder can direct the entity to contact the court to verify or disprove the information within a specified amount of time and, subject to verification, then transform the primary and secondary contingent interests as specified in the organizational document for the entity. In the case wherein there is one entity for the estate for years interest and the remainder interest, the entity will be aware of any lease default when it occurs, and will take any appropriate action to transform the primary and secondary contingent remainder interests as directed in the organizational document for the entity.

The components are both viewed as personal property for legal purposes. Ownership of either component can be transferred without affecting the legal status or investment characteristics of the Subject Property 2 or the other component. Similarly, while legal judgments against the owner of either component can create a lien against that component, such judgments cannot create a lien against the Subject Property 2 or the other component.

For tax purposes (usually for United States tax purposes), the holder of the estate for years (and/or augmented estate for years) component (or an equity interest therein) is usually entitled to amortize the acquisition cost (e.g., purchase price) of the estate for years (and/or augmented estate for years) component (or the acquisition cost of the equity interest therein) over the portion of the estate for years (and/or augmented estate for years) term remaining after acquisition of the estate for years (and/or augmented estate for years) component (or the equity interest therein).

Alternatively, the estate for years holder may be entitled to both depreciation and amortization deductions. In this case however, the value of the deductions is interleaved, not additive. That is, although the combined deduction would be greater than the amortization deduction alone, the combined deduction would be smaller than the sum of the amortization and depreciation deductions.

As an additional alternative, in some cases in which there is a single entity for both the estate for years (and/or augmented estate for years) and remainder (and/or complementary remainder) components, the estate for years (and/or augmented estate for years) holder may be entitled to cost recovery in the form of depreciation of the temporally decomposed property in lieu of amortization of the estate for years (and/or augmented estate for years) purchase price. These situations usually involve tangible personal property and leases with terms that are longer than the statutory cost recovery period for that type of property, in which cost recovery via depreciation is faster for the estate for years (and/or augmented estate for years) investor than cost recovery via amortization of the estate for years (and/or augmented estate for years) price over the lease term.

Whichever cost recovery deduction schedule is claimed by the estate for years (and/or augmented estate for years) holder, the tax treatment of the estate for years (and/or augmented estate for years) will be different from the treatment claimed by the holder of conventional taxable debt, because for tax purposes, the estate for years (and/or augmented estate for years) is an income-producing asset rather than a debt instrument:

If the estate for years (and/or augmented estate for years) component holder is a corporate investor, then the tax write-offs accruing from component separation are available to offset taxes on either passive or operating income.

In the case of an augmented estate for years interest, tax treatment of the augmented estate for years is likely to be identical to the tax treatment that the estate for years alone would receive, so long as the future contingency (or contingencies) that could activate the beneficial property interest(s) represented by the secondary contingent interest portion of the augmented estate for years is viewed as reasonably unlikely to occur, based on available information at the time the temporal property decomposition takes place. However, the tax treatment of the augmented estate for years interest can change once a specified contingency provision has occurred and at least one corresponding secondary contingency interest has become an actual property interest that is held by the estate for years holder. Depending on the nature of the newly uncontingent (or less-contingent) property interest, the augmented estate for years holder may henceforth receive the tax treatment that would be accorded a holder of an interest in temporally undecomposed property. For this reason, it can be worthwhile to incorporate a time delay of a few weeks to a few months into the structure of a secondary contingent interest between the occurrence of a contingency event that activates the secondary interest and the consequent conversion of the contingent interest into an uncontingent (or less-contingent) interest. Such a time delay can give the augmented estate for years holder an opportunity to sell the soon-to-be uncontingent (or less-contingent) equity interest and thereby preserve any tax benefits due to separate component ownership that might otherwise cease at the time the conversion takes place.

Since the tax treatment of an augmented estate for years is likely to change after the occurrence of a contingency and consequent transformation of a secondary contingent interest into an uncontingent (or less-contingent) interest, all schedules of remaining tax payments and/or tax deductions for the augmented estate for years should be recomputed after an occurrence of such an occurrence and/or transformation. In addition, the at least one tax basis for the augmented estate for years together with all schedules of remaining tax payments and/or tax deductions should be recomputed after detachment and sale of any secondary contingent interest in the augmented estate for years, or more generally, any partial interest in the augmented estate for years.

Separation is facilitated if the lease(s) is triple-net, i.e., during the trust term, the lease(s) obligates the tenant to the estate for years (and/or augmented estate for years) component holder for property management and maintenance, payment of taxes, and property insurance. Thus, absent a default by a tenant, the rights and obligations of the estate for years (and/or augmented estate for years) component holder involve the right to receive scheduled net rental payments, while the benefits of property occupancy belong to the tenant. The only claim of the estate for years (and/or augmented estate for years) component holder on any property asset is a contingent one, in event of a tenant default.

In a tenant default, the estate for years component holder has recourse against the tenant as prescribed by property law and the lease covenants. This recourse against both tenant financial assets and the remaining portion of term property occupancy rights is the subject of traditional principles of property law. The availability of tax write-offs accruing from component separation continues unaffected by a tenant default event.

The default risk associated with the estate for years (and/or augmented estate for years) is identical to the default risk associated with tenant general obligation debt. The expected value of the combined estate for years (and/or augmented estate for years) default claims compares favorably with the claims available to the holders of tenant unsubordinated debentures.

Leased and unleased property have different investment characteristics. The nature of this difference can be illustrated by considering the extreme cases of two unleveraged general purpose single-tenant properties of similar size, location, and architecture, one perpetually leased on a triple-net basis to an investment-grade tenant, the other momentarily unleased.

In the case of the perpetually leased property, all future rental cash flows are determined. Absent tenant default, there will be no future rental negotiations. Thus, there are no present values that fluctuate with changes in the spot market for comparable space, implying that the value of this property does not depend on the real estate market. Property value in this case depends solely on the contracted values of future net cash flows, tenant credit risk, and long-term interest rates. In other words, this asset has the investment characteristics of tenant debt.

By contrast, all future rentals from the unleased property are as yet undetermined, and the present value of these rentals fluctuates with expectations about the future evolution of the spot rental market. In short, this asset is a pure real estate equity investment, with no fixed-income component.

Typical institutional-grade property is not well represented by either extreme. Such property is usually fully leased or almost-fully leased for a reasonable period of time, with arrangements for tenant occupancy beyond that period open to future negotiation. As in the case of perpetually leased property, existing leases have the investment characteristics of fixed-income assets, whereas the speculative risk dimensions investors associate with equity real estate are due entirely to the remaining rights in the property asset: the right to future rental opportunities after existing leases expire.

By securitizing net-leased property to separate ownership of current leases from ownership of future leases, the net-leased property is decomposed into estate for years and pure equity remainder (and/or complementary remainder) components (and/or into augmented estate for years and complementary remainder (and/or complementary remainder) components). The estate for years (and/or augmented estate for years) components are appropriate for investors interested in traditional fixed-income investments, while the pure equity remainders (and/or complementary remainders) are appropriate for real estate investors, speculators, and tax-exempt institutions interested in acquiring portfolio diversification benefits of real estate at a fraction of the cost for all components of the real estate.

By contrast, complementary remainder interests are usually more specialized equity products related to corporate finance. Since the value of some equity interests in a complementary remainder interest can be affected negatively by lessee default during or at the end of the augmented estate for years term, such equity interest(s) will frequently be of more interest to investors that have an economic interest in least one property lessee than to investors interested only in a pure equity property investment.

The separation of property into components can create major tax benefits if property is properly securitized and the components are sold to independent investors in a simultaneous three-way transaction.

As part of the undivided property, most of the lease cash flows are taxable income, while as a stand-alone asset, most of the lease cash flows are tax-exempt. This suggests a change in the appropriate buyers for lease income streams. As part of whole property, lease income produces the greatest after-tax benefit for tax-exempt institutions; whereas, packaged as stand-alone assets with incremental tax deductions, taxable institutions are natural investors.

The present value of the incremental tax deductions generated during the estate for years (and/or augmented estate for years) term by separation of ownership into components is an enhancement to property value. This implies that the combined market values of securitized components should be greater than the value of unsecuritized property. The tax deductions themselves can also be viewed as a fixed-income asset, which can be valued by fixed-income techniques. Alternatively, the combined value of incremental tax deductions and the lease income stream can be valued by fixed-income techniques as a single fixed-income package.

From a tax perspective, the estate for years (and/or augmented estate for years) is an income-producing asset; from the return/risk perspective, it is an asset-backed bond. Unlike commercial mortgages, the default claims generated by the estate for years (and/or augmented estate for years) have recourse against financial assets held by the entities who have obligated themselves to make the cash flow payments.

The example herein involves a single-tenant property; the case of multitenant property component separation is slightly more complicated if the lease terms of tenants vary. Because the estate for years (and/or augmented estate for years) must have the characteristics of a fixed income asset, it may be that a credit enhancing instrument such as an insurance policy against tenant default will have to be created to wrap around the lease agreements to achieve the characteristics of a marketable fixed income asset. The use of such an enhancement may broaden the application of the separation process in both single-tenant and multitenant property by creating investment-grade estate for years (and/or augmented estate for years) fixed-income components in properties without investment-grade tenants. Alternatively, there may be cases of properties with below-investment-grade tenants in which it is not cost-effective to reduce the default risk of the estate for years (and/or augmented estate for years) components with credit enhancement insurance. In these cases, equity interests in the estate for years (and/or augmented estate for years) components will be ratable as fixed-income securities, for example, that are below investment-grade, where the term "ratable" refers throughout this investment description to fixed-income ratings assigned by widely recognized investment rating agencies such as Standard and Poor's and Moody's Investors Service, or classifiable for regulatory purposes as fixed-income securities, for example, that are below investment-grade, by a major regulatory agency for financial institutions or institutional investors, e.g., National Association of Insurance Commissioners (NAIC) investment classifications assigned by the NAIC Securities Valuation Office or the offices of individual state insurance commissioners.

In the case of single-tenant property, the estate for years (and/or augmented estate for years) default risk is determined by the tenant credit rating. Thus, the estate for years (and/or augmented estate for years) default risk is identical to the default risk of tenant debentures. In the event of tenant default, the estate for years (and/or augmented estate for years) owner has the same claim on tenant financial assets as holders of tenant debentures, so long as the tenant does not declare bankruptcy.

In tenant bankruptcy, the estate for years (and/or augmented estate for years) holder has a combination of claims with combined values that can be shown to exceed the expected recovery rate on defaulted corporate debentures, as determined by average prices on publicly traded debentures immediately after default and by asset recovery rates subsequent to defaults on unsubordinated general obligation debt.

In other words, estate for years (and/or augmented estate for years) default risk is the same as default risk on general obligation tenant debt, but in default the loss risk is less. This can be reflected in pricing the component, as illustrated below.

One possibility is to generate an investment-grade estate for years (and/or augmented estate for years) component (e.g., a component such that at least one certificate evidencing ownership or beneficial ownership of the component, a fractional interest therein, or an equity interest therein, is an investment-grade security), for example, with between four percent (4%) and six and one half percent (6½%) after-tax yields under current property market conditions. This is an after-tax premium of between 20 and 170 basis points over corporate debentures of comparable credit risk. Alternatively, this represents an approximate pre-tax equivalent premium of between 25 and 230 basis points for taxable buyers in a 36% marginal tax bracket.

These premia can be expected to erode slowly as the markets for the property components develop. Sellers will learn to value each component separately in arriving at property valuation. (To value each component, one could use separate computer systems to compute such valuation for each component separately. In effect, this approach is the invention disclosed herein divided into two computer systems, one for each component. Such an approach is viewed as an equivalent to the present invention.) In any case, eventually multiple bidders for estate for years (and/or augmented estate for years) interests will drive estate for years (and/or augmented estate for years) yield premia down to double or single-digit basis points. However, by placing the estate for years (and/or augmented estate for years) interests privately, dissemination of this embodiment of the investment technology may lag.

In short, when viewed as a financial asset, unleveraged commercial property is a portfolio comprised of at least two components with different investment characteristics: a fixed-income asset essentially consisting of all ownership rights while existing leases are in place, and a pure equity component essentially consisting of all ownership rights after existing leases expire.

B. Computer System

The present invention is directed to a computer system for manipulating digital electrical signals to produce an illustration of a decomposition of property into separately valued components. The computer system includes a digital electrical computer controlled by a processor. A first logic means controls the processor in manipulating digital electrical signals representing input data to the computer, the input data characterizing at least two components decomposed from the property. The manipulating includes transforming the digital electrical signals into modified digital electrical signals representing respective values for each of the components, the values being computed to reflect taxation for the components. Input means is electrically coupled to the computer and operable for converting the input data (which can be entered manually) into the digital electrical signals and communicating the digital electrical signals to the computer. Output means is electrically coupled to receive the modified digital electrical signals from the computer and to convert the modified digital electrical signals representing the respective values into an illustration of the computed respective prices.

The computer system can additionally include a second logic means for controlling the processor in further manipulating the electrical signals, the further manipulating producing at least one financial document for one of the components, the financial document being constructed in response to electrical signals representing preexisting text and stored in memory accessed by said computer and in response to said modified digital electrical signals representing the respective values.

The computer system can be used in cooperation with one or more computer systems in respective locations to either recompute the computations i.e., signal processing) discussed above or do supplemental computations (i.e., signal processing) as discussed below.

The property can be any property or divisible property right. Preferably, the property is real estate, but in another preferred embodiment, the property is a tax-exempt security.

Figure 2:
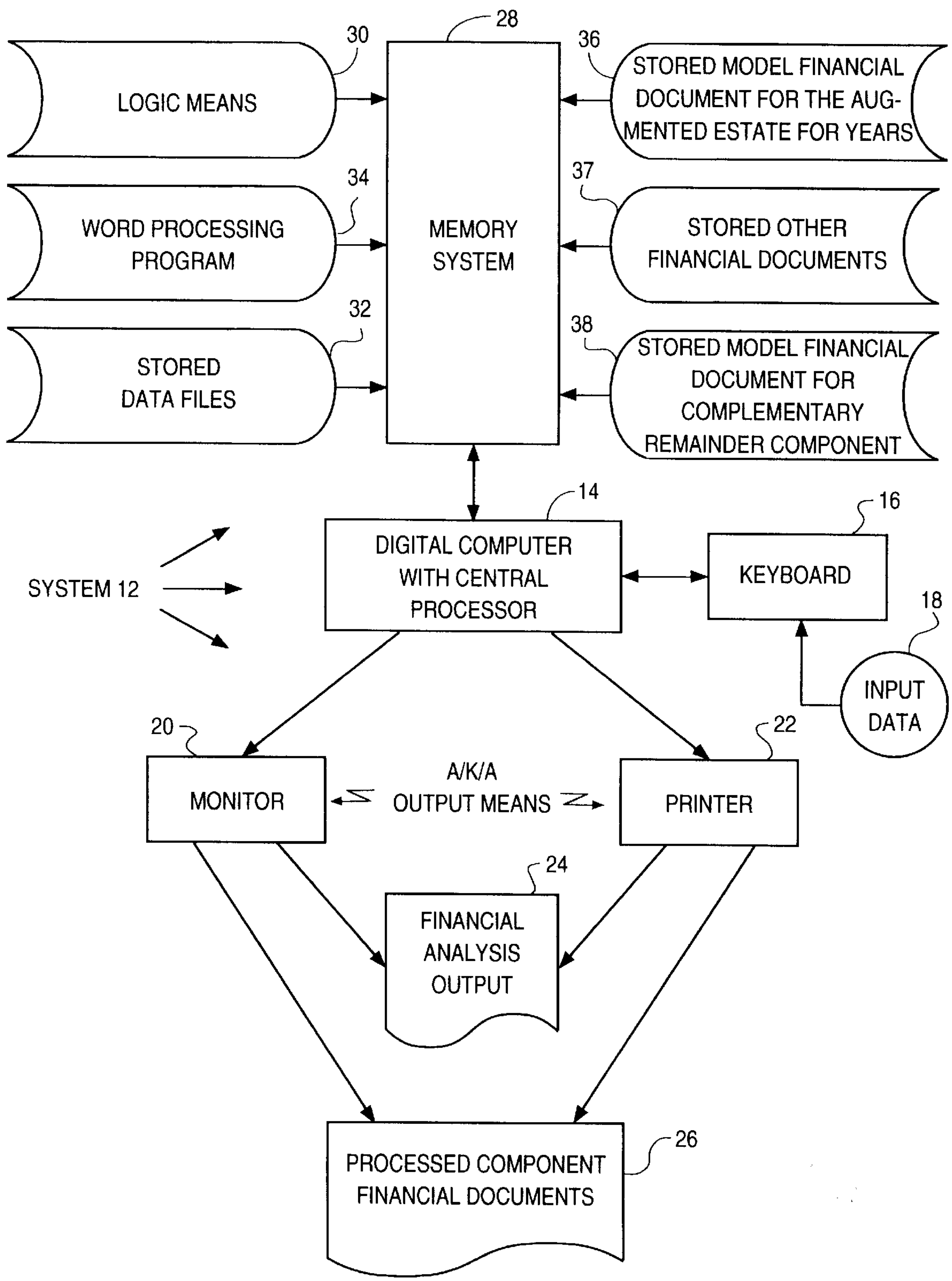
FIG. 2 is a diagram representing the electrical computer system and its input and output in accordance with the present invention.
Figure 3:
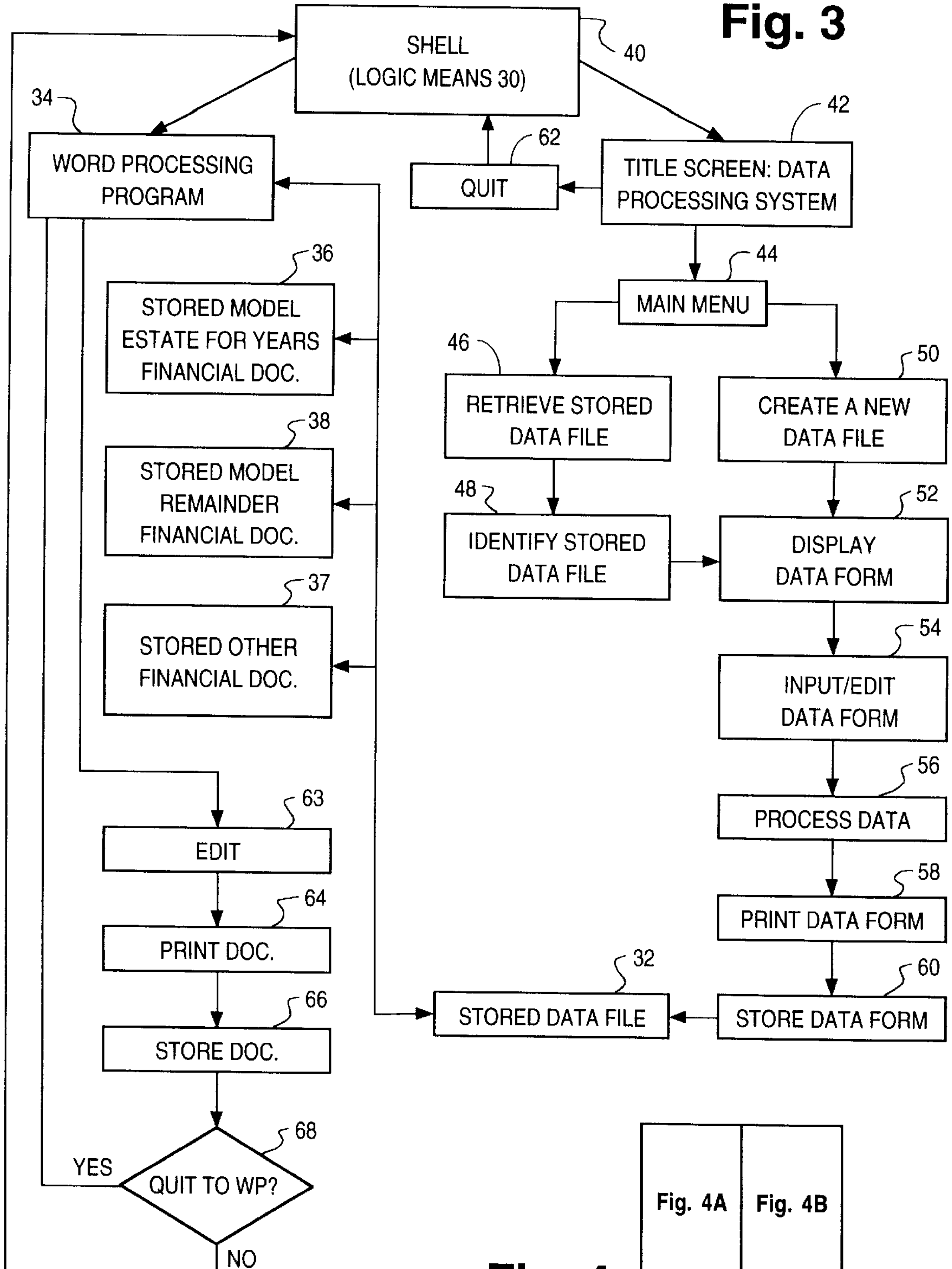
FIG. 3 is a flow chart showing the logic of a logic means for controlling the electrical computer system in accordance with the present invention.

More particularly, with reference to FIG. 2, the hardware, input, and output of a Computer System 12 according to the present invention are shown. The System 12 includes a Digital Computer 14, such as an IBM-compatible personal computer with a DOS operating system. Digital Computer 14 preferably has a model 486 central processor or a 386 central processor with a math coprocessor. Digital Computer 14 is operably linked to a Keyboard 16, for receiving Input Data 18 (described more particularly below with regard to FIG. 3) and converting it into electrical signals. Digital Computer 14 also is operably linked to output means, such as a Monitor 20 and a Printer 22 (such as a dot-matrix or laser printer) for outputting Financial Analysis Output 24 (described more particularly below with regard to Specimen 1) and Processed Component Financial Documents 26 (described more particularly below with regard to Specimens 3 and 4). (The specimens 4–6 are representative of stored financial documents, in this case, for an estate for years and a remainder, but it should be understood that suitable corresponding financial documents would be utilized for an augmented estate for years and a complementary remainder.) Digital Computer 14 is additionally operably linked to Memory System 28, comprising a means for storing Logic Means 30, such as a diskette or a hard disk, and a means for communicating the Logic Means 30 to the Digital Computer 14, such as a disk drive. Logic Means 30 can be a LOTUS 123 (Version 2.01 or higher) computer program, which is used to produce Specimen 1, though as described subsequently, a program dedicated to the purposes of this invention would be preferable.

When loaded and running on Digital Computer 14, Logic Means 30 controls the Computer System 12 transforming the electrical signals from Keyboard 16 into electrical signals associated with constructing files 32 (or records, if so desired) and of Financial Analysis Output 24. Storing a plurality of data files 32 would be appropriate, for example, for analyzing different separated purchase transactions or for analyzing how one or more changes in Input Data 18 influence the Financial Analysis Output 24.

Memory System 28 also stores a Word Processing Program 34, such as Word Perfect 5.1. Word Processing Program 34 is useful for constructing and editing text files to be printed via Printer 22 as Processed Component Financial Documents 26.

Preferably, one text file includes a Stored Model Financial Document For the Augmented Estate For Years 36, for example, an organizational document (e.g., for an entity for the estate for years (and/or augmented estate for years) real estate component such that certificates evidencing equity interest in the entity are securities, as exemplified in Specimen 3) or a disclosure document for securities law purposes for the securitized estate for years (and/or augmented estate for years) real estate component (e.g., for an equity interest in the securitized estate for years (and/or augmented estate for years) real estate component, as exemplified in Specimen 5). Another text file includes Stored Model Financial Document For Complementary Remainder Component 38, for example, an organizational document (e.g., for an entity for the remainder (and/or complementary remainder) real estate component such that certificates evidencing equity interest in the entity are securities, as exemplified in Specimen 4) or a disclosure document for securities law purposes for the securitized remainder (and/or complementary remainder) real estate component (e.g., for an equity interest in the securitized remainder (and/or complementary remainder) real estate component, as exemplified in Specimen 6). Still another text file includes Stored Other Financial Documents 37, detailed subsequently herein.

It is to be explicitly understood that other implementations of the present invention, say, those using a different kind of digital computer, analogous hardware, multiple computer systems, comparable input and output, a computer program or programs written in a different language, or a hardwired system replacing the computer program, are entirely acceptable and equivalent to the present invention. Also the invention can be implemented by hardwired logic in a handheld calculator. When software is loaded into, and running, a programmable computer, the software sets what in effect are many, many "switches," and the result can be considered a new computer machine, with logic formed from the set switches. Instead of setting the switches, an equivalent would be to hardwire the same or equivalent circuitry. Therefore, whether a configurable device is configured to the requirements of the present invention, or a device is constructed from scratch solely for meeting the requirements of the present invention, is a distinction without a difference from an electrical signal processing standpoint. All these embodiments are different species of the present invention that are within the contemplated scope of the present invention.

C. Logic Means 30

Focusing more particularly on Logic Means 30, it should be recognized that System 12 is intended for a specific purpose, for operation under certain assumptions, to compute the values of components decomposed from property, and to provide documentation thereof; System 12 involves certain Input Data 18 and Financial Analysis Output 24, each of which is discussed below in greater detail.

1. Purpose

The Logic Means 30, in conjunction with the rest of System 12, is intended to facilitate financial transactions involving the separate components of property, preferably commercial real estate in a separated purchase transaction. For a separated purchase transaction to take place, the sum of the prices the two investors agree to pay for their respective components should theoretically be at least equal to a price at which the owner is willing to sell the property.

Logic Means 30 partially automates financial considerations that take into account the different investment characteristics of the two components. This facilitates or reduces the cost for, carving a property value into respective values, which can be treated as prices, for the estate for years (and/or augmented estate for years) and the remainder (and/or complementary remainder) interest. In addition, Logic Means 30, in conjunction with Digital Computer 14, calculates various financial parameters to assist prospective purchasers in deciding whether the components are suitable as investments at the respective sale prices.

Logic Means 30, in conjunction with Digital Computer 14, calculates throughout the estate for years (and/or augmented estate for years) the values and tax bases of the separate components so that the sale and purchase of each component may take place privately or through a financial exchange established to provide liquidity in a market in which none presently exists.

Further, Logic Means 30, in conjunction with Digital Computer 14, provides accounting support to the estate for years (and/or augmented estate for years) investor by computing, on both annual and quarterly bases, the tax deductions generated by the property and the estate for years (and/or augmented estate for years). These deductions may be used by the estate for years (and/or augmented estate for years) investor to reduce taxes on income produced by the estate for years (and/or augmented estate for years) and in certain other taxable operations. Because these deductions affect the basis of the remainder (and/or complementary remainder) interest upon expiration of the estate for years (and/or augmented estate for years), the accounting support set forth is also necessary for the remainder (and/or complementary remainder) interest.

Logic Means 30 can also be used in conjunction with Word Processing Program 34 to efficiently incorporate Financial Analysis Output 24 into Financial Documents 26 (and to edit and revise the stored Model Financial Documents 36 and 38 for each separate purchase transaction) for each of the components.

2. Assumptions

The Logic Means 30 is intended to support the separated purchase transaction of real estate in which the estate for years (and/or augmented estate for years) has a definite and specified term, and in which the property is leased for rent prior to, or coincident with, the separated purchase transaction. For the estate for years (and/or augmented estate for years) to be an asset with fixed-income investment characteristics, the term of the estate for years (and/or augmented estate for years) is normally no longer than the shortest term remaining on the lease(s). That is, the estate for years (and/or augmented estate for years) entitles the holder to the right to receive the net cash flows from the existing leases until the end of the term. Furthermore, the risk of default on the scheduled cash flow(s) is determined by either the lowest-rated tenant credit risk or the value-weighted average credit risk of the tenants, with the former the norm.

It is assumed in this embodiment that ownership of the components is structured so that, after the separated purchase transaction, the purchaser(s) of the estate for years (and/or augmented estate for years) is (are) entitled to amortize the estate for years (and/or augmented estate for years) purchase price for tax purposes and also over the estate for years (and/or augmented estate for years) term. Additionally, it is assumed that any depreciation deductions are to be taken by the estate for years (and/or augmented estate for years) purchaser(s). Finally, it is assumed in this embodiment that the entire investment return on any preferred equity interest in the remainder (and/or complementary remainder) component is insured via residual insurance, that the preferred equity interest does not have any participatory interest in the investment return on the remainder (and/or complementary remainder) component other than the insured return, and that none of the residual value insurance is left over to insure the return on the residual equity interest in the remainder (and/or complementary remainder) component. This implies that the preferred interest is a ratable fixed-income asset and that it is usually an investment-grade fixed-income asset in cases in which the residual value insurer has an investment grade credit rating.

In addition, it is assumed in this embodiment that the cost of the residual value insurance is payable in the form of a single up-front insurance premium at the time the property is separated into components. Other embodiments can incorporate general schedules and amounts of residual value insurance premium payments over the estate for years (and/or augmented estate for years) term. Still other embodiments can provide for the possibility that creation of a preferred interest in a remainder (and/or complementary remainder) component, the purchase of residual value insurance for the preferred interest, or both the creation of a preferred interest in a remainder (and/or complementary remainder) component and the purchase of residual value insurance for the preferred interest, can occur as one or more events subsequent to separation of the property into estate for years (and/or augmented estate for years) and remainder (and/or complementary remainder) interests. These and yet other embodiments can also allow for the cost of possible interim financing for the remainder interest prior to the time the residual value insurance takes effect.

3. Pricing the Estate for Years (And/or Augmented Estate for Years)

Under the above assumptions, the risk and return characteristics of the estate for years (and/or augmented estate for years) are those of a fixed-income asset. This implies that prospective investors will price the estate for years (and/or augmented estate for years) as a fixed-income investment, i.e., prospective purchasers will value the estate for years (and/or augmented estate for years) relative to comparable investments available in the bond market at the time of the separated purchase transaction.

Specifically, prospective purchasers of the estate for years (and/or augmented estate for years) will look at the available yield on Treasury securities of comparable cash flow characteristics for a comparable average life, add a risk premium based on the average credit risk of the tenants (and/or, in the case of an augmented estate for years, diminished loss risk due to the inclusion of one or more secondary contingent remainder interests) and, under present market conditions, probably add an additional premium due to the illiquidity of the investment. The sum of the appropriate Treasury rate plus the risk and the illiquidity premiums is a typical fixed income market discount rate for the estate for years (and/or augmented estate for years).

4. Input Data 18

Generally, in order to value the estate for years (and/or augmented estate for years) as a fixed-income investment, a schedule of net cash flows during the estate for years (and/or augmented estate for years) term is determined. Typically, this will comprise a stream of scheduled monthly net rental payments. If the estate for years (and/or augmented estate for years) does not begin on the first day of a month and terminate on the last day of a calendar month, net rental payments could also include fractional monthly rental payments for the first and last months of the estate for years (and/or augmented estate for years) term. In addition, the date of the split purchase transaction, and the date that the estate for years (and/or augmented estate for years) terminates, are also entered as Input Data 18.

Estate for years (and/or augmented estate for years) valuation also includes the appropriate discount rate for the estate for years (and/or augmented estate for years). But instead of inputting this number directly, the Logic Means 30 prompts a request (as Input Data 18) for the appropriate annualized Treasury bond interest rate for bonds of an equivalent average life to the estate for years (and/or augmented estate for years), plus an appropriate risk/illiquidity premium, as discussed above.

To compute the remainder (and/or complementary remainder) interest purchase price, the property sale price, together with any extra expenses (i.e., fees and commissions) arising in the securitization of the real estate components, are also entered as Input Data 18.

To estimate the depreciation and amortization deductions to which the estate for years (and/or augmented estate for years) purchaser is entitled, the Logic Means 30 assumes that the percentage of the property purchase price represented by land is not depreciable, but that the remaining portion of the purchase price is depreciable, as prescribed by the tax code. Thus, the Logic Means 30 requires the user to enter the percentage of property value that is not depreciable and the amounts and depreciation schedules for the remaining portions of the purchase price.

To project the after-tax cash flows of the estate for years (and/or augmented estate for years) investor, and hence this investor's projected after-tax income rate, the Logic Means 30 also uses the projected tax bracket schedule of the estate for years (and/or augmented estate for years) investor as Input Data 18.

To calculate the implied purchase price of the property for the remainder (and/or complementary remainder) interest buyer at the time the estate for years (and/or augmented estate for years) expires, the Logic Means 30 further uses an implied risk-free opportunity cost of capital for the remainder (and/or complementary remainder) interest buyer, typically though not necessarily the zero-coupon risk-free Treasury rate for the estate for years (and/or augmented estate for years) term, as Input Data 18.

5. Elements of the Financial Analysis Output

Elements of the Financial Analysis Output 24 of Logic Means 30 include (1) a representation of the price for the estate for years (and/or augmented estate for years) component, and (2) a representation of the price for the remainder (and/or complementary remainder) interest component. The price an estate for years (and/or augmented estate for years) investor is willing to pay can be computed from the net rental cash flows, the interest rates in the bond markets, and the credit ratings of the tenants. The Logic Means 30 discounts the sequence of net rental payments scheduled during the estate for years (and/or augmented estate for years) term at the required estate for years (and/or augmented estate for years) discount rate to determine an appropriate purchase price for the estate for years (and/or augmented estate for years). The price a remainder (and/or complementary remainder) interest investor must pay is computed as the difference between: (1) the sum of the property asking price plus the costs and fees associated with separating the components, and (2) the estate for years (and/or augmented estate for years) valuation. This formula follows because between them the purchasers of the components must come up with the property asking price together with any extra expenses associated with creating the components. If these prices are acceptable to prospective component purchasers, then a separated purchase transaction of the real estate interests can be consummated.

6. Additional Output

In one embodiment of the invention, Logic Means 30 can have Compute Present Value of Enhancement 117, which computes the present value of the enhancement in property value due to component separation. This value is computed as the difference between the present value of the estate for years (and/or augmented estate for years) after-tax cash flows, and the after-tax cash flows the estate for years (and/or augmented estate for years) would generate if the estate for years (and/or augmented estate for years) were still a part of undivided property and subject to the same tax deductions available to the owner of undivided property. The discount rate used to compute this present value is the after-tax income yield rate for both sets of cash flows.

Logic Means 30 outputs the present value of the enhancement in two forms: expressed as a dollar amount, and expressed as a percentage of the gross property sale price.

The present value of the enhancement must be greater than the cost of extra fees and commissions due to securitization, in order for component separation to be a value-enhancing process.

Value enhancement is a rough measure of the attractiveness of component separation in each prospective transaction. However, it is not used directly in pricing components, nor in preparing documentation describing investment characteristics of the components.

7. Computer Screens and Logic

A preferred embodiment of this invention would involve a stand alone computer and a computer program (Logic Means 30) stored on a hard disk (of Memory System 28) of a 486 Personal computer (Digital Computer 14). Unlike a hardwired equivalent embodiment, a programmable Computer System 12 is more readily adaptable to produce whatever output a user of Computer System 12 may desire with respect to a prospective separated purchase transaction. The preferred programming language is structured BASIC, although C, Fortran, or any other language with mathematical formulaic capabilities is acceptable. The operating version of the computer program for users should be in compiled code.

The Logic Means 30 includes Shell 40, which permits the option of accessing Word Processing Program 34 or a Title Screen 42 of a data processing system. Title Screen 42 informs the user of the name and ownership of the Logic Means 30, notice of any copyrights or patents that involve the invention, etc.

The Title Screen 42 leads to a Menu 44 screen created by Computer System 12 to query the user as to whether the user wants to retrieve one of the Data Files 32 stored from a previous run of the Logic Means 30 that the user saved in Memory System 28 or to create a new data file to become a new one of the stored Data Files 32. If the user makes a menu selection indicating that the Logic Means 30 should retrieve one of the stored Data Files 32, the Logic Means 30 asks on a Retrieve Stored Data File Screen 46 for the name and directory of the selected Data File 32. Block 48 performs the function of recalling the appropriate one of Data File 32.

Otherwise, the user can make a menu selection at Block 44 to create a New Data File 50. Regardless of which of these selections is made, Logic Means 30 displays a Data Form 52 like Screen 1 of Specimen 1, which will either have blank spaces to receive Input Data 18 to fill in the Data Form or will already be completed as a stored Data File 32. Specimen 1, Screen 1, herein is a representation of a completed data form. This representation, which is illustrative only, involves 10-year leases and a certain pattern of rents, and as such, it is a limited illustration of the capabilities of the invention discussed herein. Also, a portion of the Financial Analysis Output 24 is presented in Screen 2 and Screen 3 of Specimen 1, which is a simplification over the use of a dedicated program to generate the Financial Analysis Output 26 after all of the Input Data 18 has been entered.

The Logic Means 30 has an Input/Edit Data Form 54 screen adapted to receive Input Data 18 from the user by manual operation of Keyboard 16. Thereby, the user is able to enter or edit a column of rents until all payments have been entered. The user is also able to edit data on the data form, as is discussed more particularly below. Editing a data form recalled from Data File 32 efficiently enables recomputing similar data without having to enter data all anew. Instructions informing the user of which keys perform the functions can appear at the top or bottom of the screen. After the user is satisfied that all information solicited in the data form has been entered correctly, the user enters a command to enable Data Processing 56. The Logic Means 30, in conjunction with Digital Computer 14, calculates the output parameters indicated in FIG. 4 to produce a new Data Form as Financial Analysis Output 24 in FIG. 2.

The Logic Means 30 also provides options to Print 58 the Financial Analysis Output 24 and to Store 60 the Financial Analysis Output 24 as a Data File 32. The user makes a selection at Blocks 58 and 60 by pressing an appropriate key on Keyboard 16.

The Logic Means 30 returns to the Main Menu 44 to either repeat the aforesaid sequence or to quit 62 to the Shell 40. The action of pressing an exit key at any point in the sequence, if this feature is used, should bring up a fail-safe screen requesting the user to confirm the exit instruction by pressing another designated key, or cancel the exit instruction by pressing any other key.

From Shell 40, the user can alternatively enter a selection to call up the Word Processing program 34. Word Processing program 34 can access the Stored Model Augmented Estate For Years Financial Document 36 or the Stored Model Complementary Remainder Component Financial Document 38 or other financial documents to modify the selected document to include information computed from Process Data 56. This information can include the expected returns under various performance scenarios, the price, and various quantitative descriptions of risk, e.g., prices under various scenarios. Process Data 56 can be contained entirely within one computer or can encompass a group of at least two computers that communicate electronically. Thus, computations of the expected returns under the various performance scenarios can take place entirely within one computer or can take place within a group of computers that communicate computations and/or data on the expected returns under the various investment scenarios electronically within the group. Similarly, computations of the prices under the various performance scenarios can take place entirely within one computer or can take place within a group of computers that communicate computations and/or data on the prices under the various investment scenarios electronically within the group.

Edit 63 involves editing any of the stored model documents of Block 36, Block 37, and Block 38, particularly to incorporate information from a Stored Data File 32. Print Document 64 permits printing the modified selected document at Printer 22 as one of the Processed Component Financial Documents 26. Store Document 66 permits storing the modified selected document via Memory System 28. Quit to Word Processing Program 68 inquires whether the user prefers to return to Word Processing Program 34 to repeat a loop defined thereby, or to go to the Shell 40.

Other Stored Model Financial Document 37 represents other financial documentation required to successfully place the securitized components. For each component, these include at least one securities document, e.g., one or more of the following group: an organizational document for an entity such that a certificate evidencing an ownership or equity interest in the entity is a security, a security evidencing an ownership or equity interest in such an entity, and a disclosure document for securities law purposes, such as an offering memorandum, prospectus, or term sheet, which would normally include some or all of the following.

Security Description

Property Description and Legal Description

Lease Synopsis and Lease Agreement

Description of Tenant(s)

Business

Financial Assessments

Financial Analysis Based Upon Various Assumptions and Inputs

Presentation of Risk Characteristics (In this description, the term "securities law" can refer to United States federal securities law alone or to all applicable United States federal, state and territorial securities law.)

The computer-aided method for generating financial documentation for a fractional interest in a contingent interest in property best includes generating at least one document of a set of documents collectively used in securitizing a fractional interest in a contingent interest in the property, the contingency interest associated with at least one lease default condition for the property, and printing the document, wherein at least a member of the set of documents is made by a computerized valuation of the fractional interest in the contingent interest in the property inserted in text data obtained from a memory.

A portion of the Financial Analysis Output 24 is presented in Screens 2–4 of Specimen 2, which is a simplification over the use of a dedicated program to generate the Financial Analysis Output 26 after all of the Input Data 18 has been entered.

Figure 4:
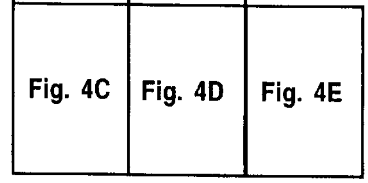
Figure 4A:
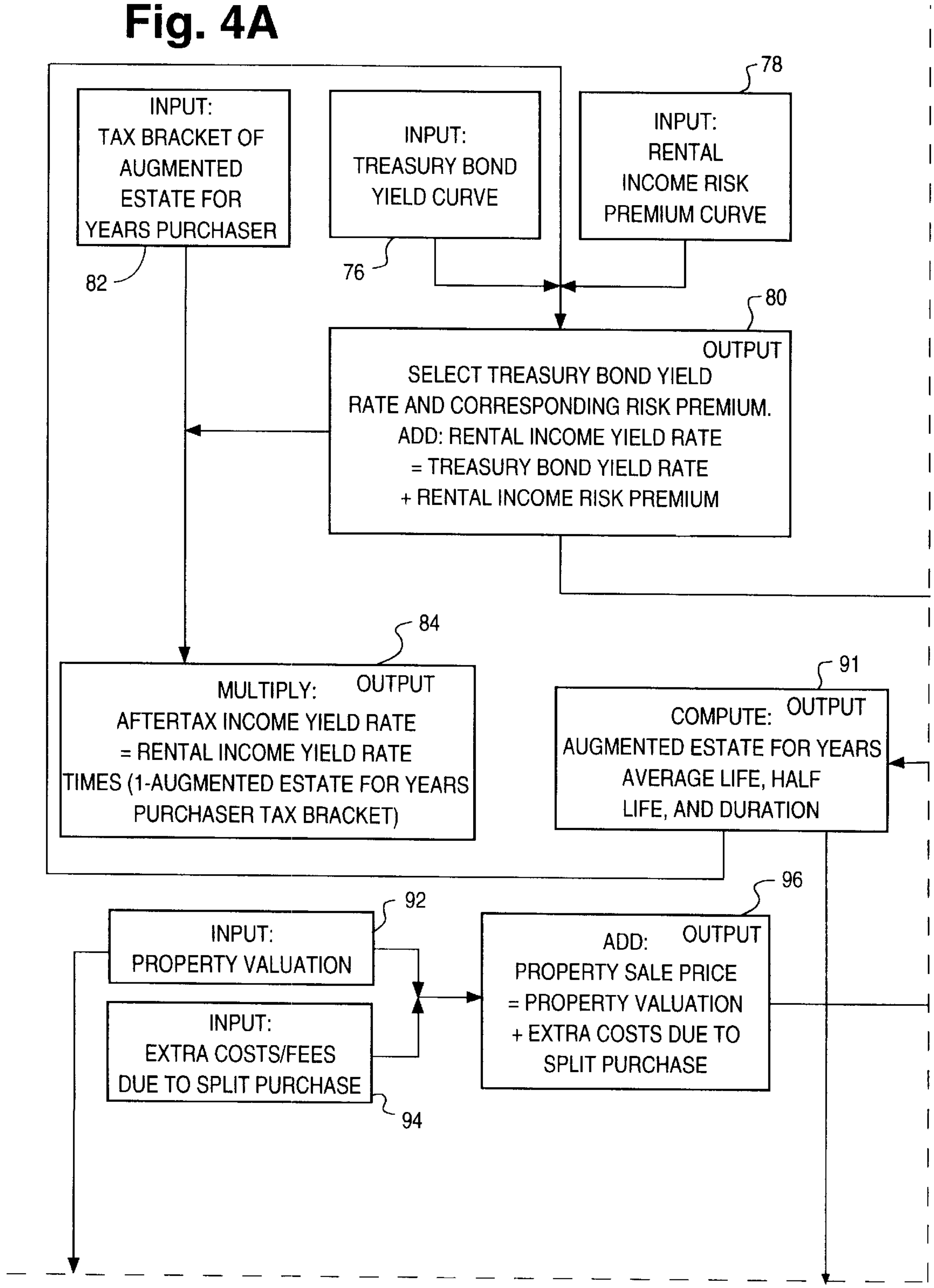
Figure 4B:
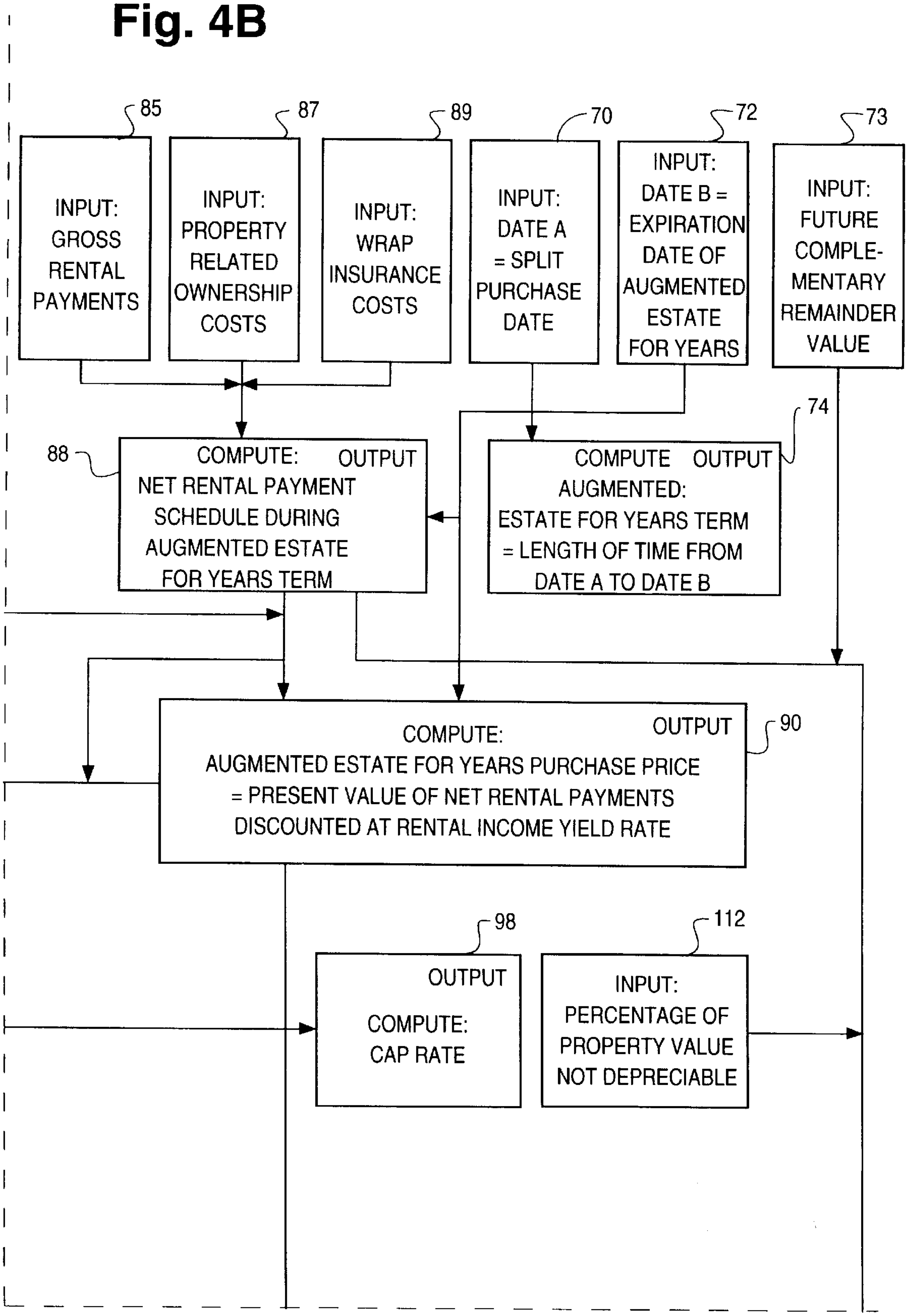
Figure 4C:
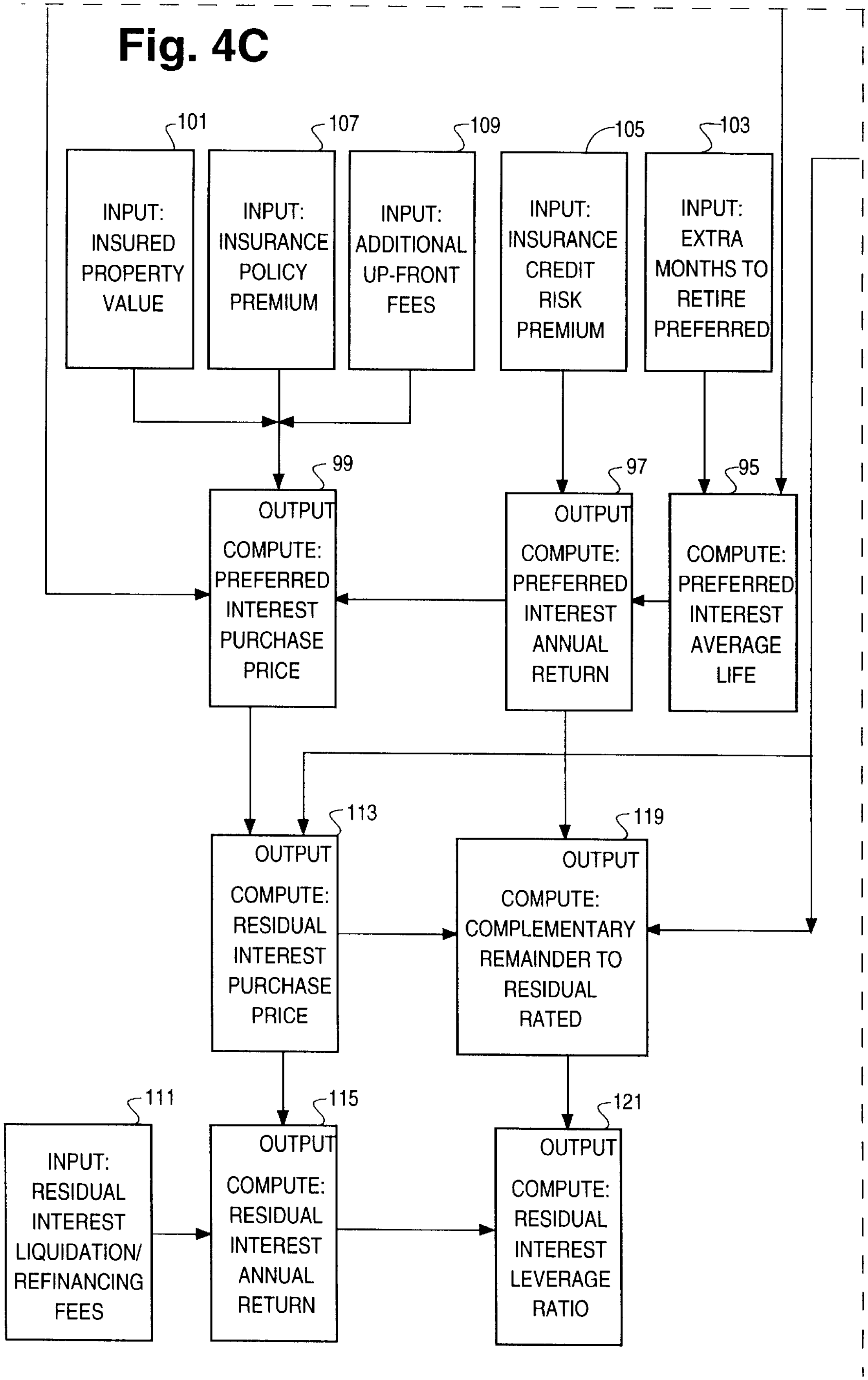
Figure 4D:
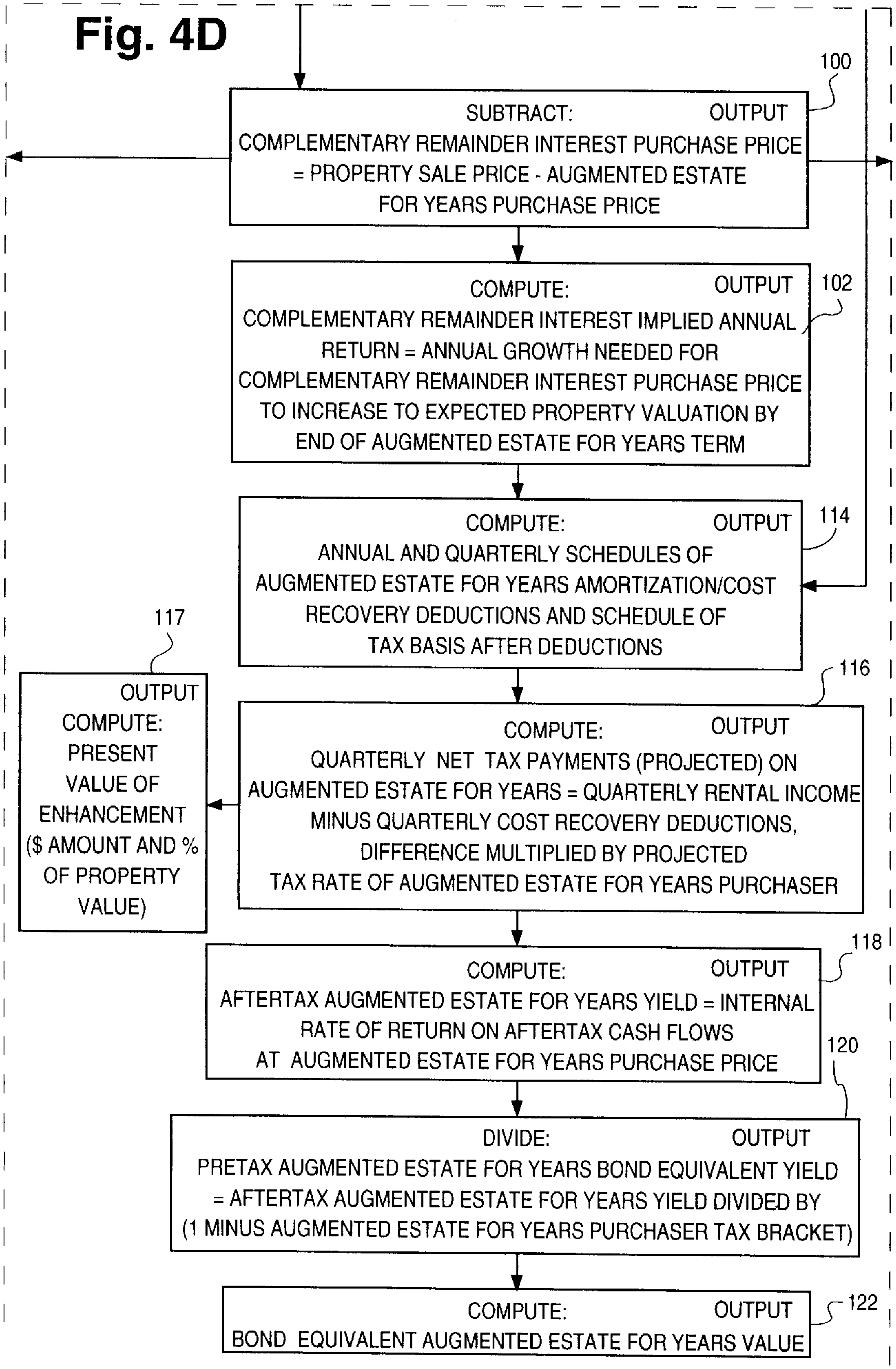
Figure 4E:
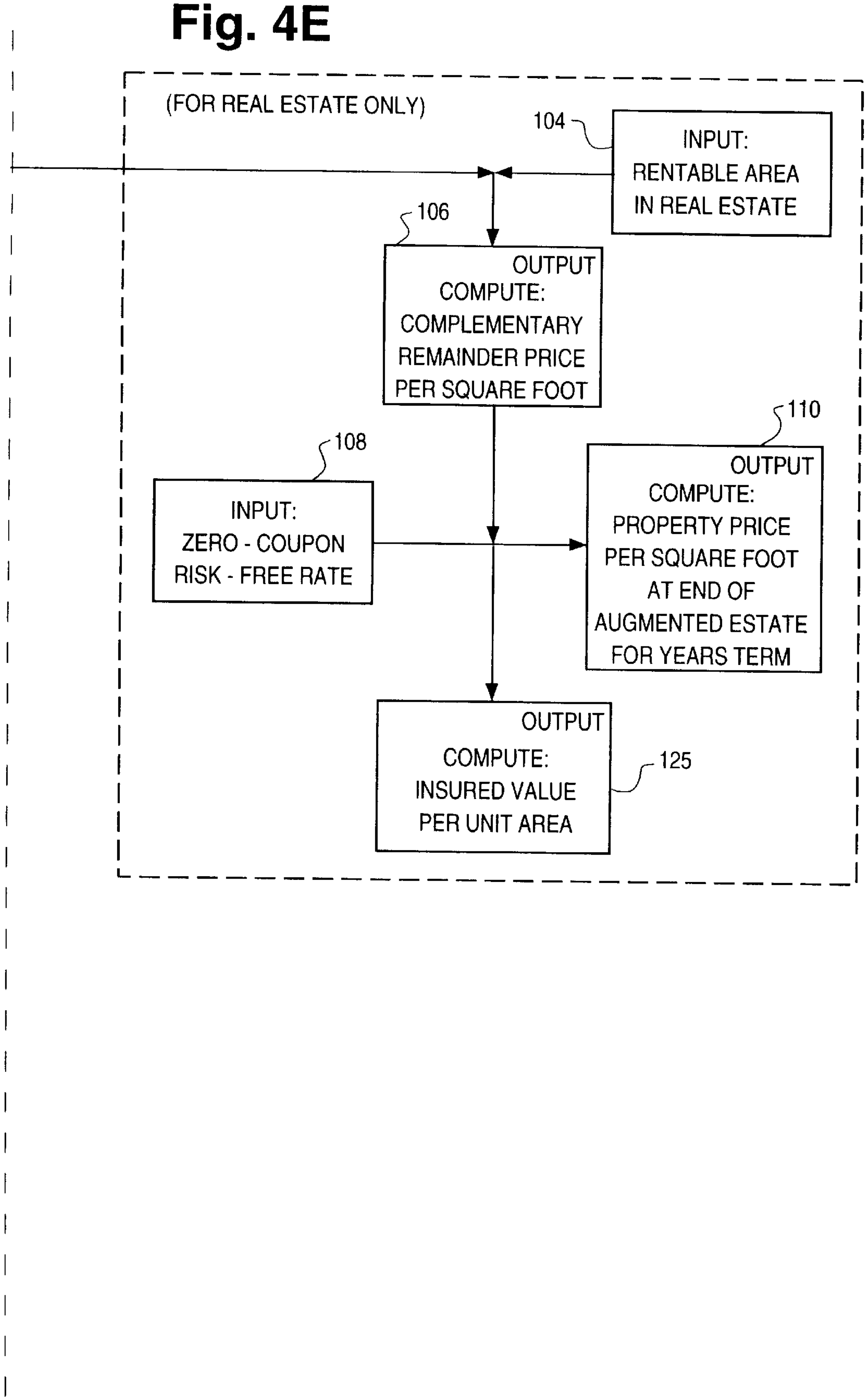

Turning now to FIG. 4, the input and computational logic of a preferred embodiment of Logic Means 30 is detailed. The logic of Input Data A 70 receives entry of the date on which a separated purchase transaction is to take place, and Input Data B 72 receives entry of the expiration date for the estate for years (and/or augmented estate for years). The transaction date and the estate for years (and/or augmented estate for years) expiration date should be entered as numbers, i.e., the number of the month, the number of the day, so that the length of the period between the two dates can be easily computed in Compute Augmented Estate For Years Term 74. Block 74 computes the number of whole and fractional months in the estate for years (and/or augmented estate for years) term, both as an output and for use elsewhere in the logic in computing discounted presented values and the schedules of annual and quarterly depreciation and amortization deductions, as discussed subsequently.

Usually, the end of the estate for years (and/or augmented estate for years) term will be on the last day of a calendar month, and the transaction date will be on the first or last day of a calendar month. Thus Block 72 stores the number of days in any fractional calendar month at the beginning or end of the term, if any, separately from, and in addition to, the length of the term (i.e., Block 72 keeps the number of days in beginning and end fractional calendar months separate from each other). By subtracting the separated purchase date from the expiration date of the estate for years (and/or augmented estate for years), the Logic Means 30 can be used to compute the length of the estate for years (and/or augmented estate for years) term (e.g., "10 years", "9 years 8 months", or "9 years 10 months 11 days").

The Treasury yield curve input for Block 76 can be obtained electronically, for example, from Treasury bond market database services (such as Bloomberg L.P.) accessible by subscription. The rental income risk premium curve input for Block 78 can also be obtained electronically, for example, from one or more data services. More precisely, in the case of property leased to a single lessee with a fixed-income rating from one of the major fixed-income rating agencies, such as Standard and Poor's and Moody's Investors Service, the lessee credit rating can be obtained electronically, for example, from one of the rating agencies. Bond market databases accessible electronically by subscription furnish data on corporate bond fixed-income risk premia, thereby enabling the computer to translate the lessee fixed-income rating into a current numerical risk premium by comparison of the lessee credit rating with the credit ratings corresponding to the numerical risk premia for bonds of similar average life in the database.

The case of an augmented estate for years involves slightly different processing. In this case, the expected loss rate due to default is less than the expected loss rate due to an estate for years alone. In the case wherein there is not a credit-wrap insurance policy for the estate for years, a numerical risk premium can be computed by comparing the loss risk of the augmented estate for years with expected loss risks for uninsured asset-backed bonds of similar average life (to the augmented estate for years) in the database. In the case wherein there is a credit-wrap insurance policy for the estate for years, a numerical risk premium for the augmented estate for years is computed by replacing the credit rating of the lessee with the credit rating of the insurer and then following the procedure to compute a numerical risk premium for the estate for years alone.

The Logic Means 30 also includes Input Treasury Bond Yield Rates 76 and Input Rental Income Risk Rates 78 for respectively receiving entry of the Treasury bond yield curve and the rental risk premium curve as a function of the yield curve. The output of Block 91, which is only slightly sensitive to changes in position on the yield curve, is used interactively to select the appropriate Treasury bond rate and rental income risk premium.

The data entered in Blocks 76 and 78 are used in Compute Rental Income Rate 80, which adds the data to compute the rental income yield rate, which is the discount rate used to value the pretax net rental payment cash flows. Rather than treating the value as an input, the Logic Means 30 has the user input the corresponding Treasury bond yield rate and the rental income risk premium appropriate for the tenant credit ratings (in the case of an augmented estate for years, the risk premium as adjusted for the inclusion of one or more secondary contingent interests). The rental income yield rate is computed in Block 80 as the sum of the Treasury bond yield rate and the rental risk premium.

The Logic Means 30 also has Tax Bracket 82 for receiving input data representing the tax bracket of the estate for years (and/or augmented estate for years) purchaser. The estate for years (and/or augmented estate for years) purchaser will usually be a taxable investor, in order to take advantage of the tax deductions associated with ownership of the estate for years (and/or augmented estate for years) asset. The Logic Means 30 computes the after-tax income yield rate, (i.e., the marginal after-tax interest rate the estate for years (and/or augmented estate for years) investor receives on income from senior debentures of the same default risk as the estate for years (and/or augmented estate for years)) in Block 84. The computation is the product of the pretax interest rate on those debentures (obtained from Block 80) multiplied by one minus the tax bracket of the estate for years (and/or augmented estate for years) purchaser (obtained from Block 80).

Input Gross Rental Payment 85, which is applicable for non-triple net leases, receives the projected gross rental payment. Input Property-Related Ownership Costs 87, which is also applicable for non-triple net leases, receives the projected ownership costs. Input Wrap Insurance Costs 89 is actually a part of Input Block 87 in the case of non-triple net leases, but is broken out and made a separate input in the case of triple-net leases that are not bondable. This is the schedule of insurance payments for the wrap insurance policy(ies) needed to upgrade a non-bondable triple-net lease to bondable status and/or to credit-enhance a bondable estate for years, for example, for the case in which at least one lessee is below-investment-grade.

Input Wrap Insurance Costs 87 can also receive the schedule of insurance payments for credit-enhancement insurance in the case of an augmented estate for years interest, in which the augmentation to the estate for years due to at least one secondary contingent interest in the at least one remainder (and/or complementary remainder) interest provides the holder with greater protection against economic loss than could be expected based on lessee creditworthiness alone. In this case, the inclusion in the augmented estate for years of at least one secondary contingent property interest can materially reduce the loss risk for the provider(s) of credit-enhancement insurance relative to the expected loss risk that would be incurred by insuring the estate for years interest alone. Such a reduction in relative loss risk can reasonably be expected to result in a material reduction in the cost of the credit-enhancement insurance relative to the corresponding expected cost of credit-enhancement insurance for the estate for years interest alone.

Compute Scheduled Net Rental Payments 88 receives the data input in Blocks 85, 87, and 89 to compute net rental payments during the estate for years (and/or augmented estate for years) term, as mentioned above. However, for triple-net leases, Block 88 can be an input of net rental payments, with Blocks 85 and 87 unnecessary, and Block 89 optional or unnecessary: (1) unnecessary in the case of bondable triple-net leases; and (2) optional for other triple-net leases, depending on whether or not insurance to upgrade the triple-net lease to bondable status is cost-effective. If the user selects to enter the monthly rental payments manually, the Logic Means presents Screen 54 with the aforementioned two columns: a list of the calendar months in the estate for years (and/or augmented estate for years) term (beginning with the month that includes the transaction date, and ending with the month that includes the expiration date of the estate for years (and/or augmented estate for years) security) on the left, and corresponding spaces for rental payments on the right. Alternatively, in the (typically occurring) cases of leases which have constant net rental payments, or for which the term can be divided into a small number of subterms during each of which the net rental payments are constant, the various net rents and the periods to which they apply may be entered in lieu of a month-by-month net rent schedule.

The data input in Block 88 is used in Compute Augmented Estate for Years Purchase Price 90 (see, equation 1 below). The estate for years (and/or augmented estate for years) purchase price, which is implied by the rental income yield rate, is the discounted present value of the net scheduled rental payments, valued at the rental income yield rate computed in Block 80. If the transaction date is the first day of a calendar month, and the estate for years (and/or augmented estate for years) term consists of a whole number of months, then Formula 1 gives this value.

$$\text{Augmented Estate for Years Purchase Price} = \sum_{j=1}^{N} \frac{(\text{rent} \in \text{jth month})}{(1 + r/12)^{j-1}}, \tag{1}$$

where r=the annual rental income yield rate, and N=the number of months in the estate for years term.

The data input for Block 90 together with the output of Block 90 is used in Block 91 to compute the weighted average life, half life, and duration, for the Estate for Years (And/or Augmented Estate For Years). One or more of these values—the weighted average is currently the preferred choice—is typically used by investors to determine which value on the Treasury yield curve is the most suitable choice for input through Block 76. Because these values only vary by relatively small amounts as the inputs from Blocks 76 and 78 are varied, rough estimates of the correct place on the yield curve can be used for these inputs, with the output of Block 91 then used iteratively to correct the original estimates; alternatively, the iterative loop can be omitted, and instead performed manually by the user to select among candidate yield curve values and converge interactively to the appropriate place on the yield curve based upon the output of Block 91. If the manual mode is employed, one, two or at most three, iterations will be required to converge to the correct yield curve value.

The Logic Means 30 additionally has Input Property Valuation 92 for receiving input data representing a property valuation of the real estate; Input Extra Fees 94 is for receiving input data representing fees and expenses incurred in structuring the separated purchase transaction. The securitization and separation of a property into components often entails greater costs than a traditional real estate sale. Those investing in the components are willing to pay the additional cost because, after a split purchase, the combined values of the two components is greater than the value of the real estate before the purchase as shown in FIG. 1, due to additional tax deductions available after the real estate interests have been divided.

The gross property sale price is computed in Property Sale Price 96 as the sum of the value of the undivided property (from Block 92) and the incremental expenses required to split the real estate into components (from Block 94). Expenses beyond those required in a conventional real estate transaction are considered here.

Compute Cap Rate 98 computes a rather crude indicator of the return on the investment. The cap rate is computed by dividing the total first year rent (from Block 88) by the gross property sale price of the undivided property (from Block 96).

Complementary Remainder Interest Purchase Price 100 computes the remainder (and/or complementary remainder)

interest purchase price as whatever amount in addition to the estate for years (and/or augmented estate for years) purchase price is required to put together the price required to purchase the real estate. This value is computed by subtracting the estate for years (and/or augmented estate for years) purchase price (from Block 90) from the gross property sale price (from Block 96).

Complementary Remainder Interest Implied Annual Return 102 computes the remainder (and/or complementary remainder) interest component implied annual return, which is the annualized return the remainder (and/or complementary remainder) interest investor will have earned if the value of the property when the estate for years (and/or augmented estate for years) expires is determined by multiplying Input Future Complementary Remainder Value 73 by Input Property Valuation 92. Input Future Complementary Remainder Value 73 is the expected remainder (and/or complementary remainder) value at the end of the estate for years (and/or augmented estate for years) term, expressed as percentage of Input Property Valuation 92. In the case of institutional grade real estate, the input value received by Input Future Complementary Remainder Value 73 will frequently be close or equal to 100%, reflecting the frequently applicable assumption that the value of the decomposed property is expected to change little or not at all across the estate for years (and/or augmented estate for years) term.

This interest rate is the only unknown quantity in Formula 2, which is set forth below.

$$\text{Expected Property Valuation}=(\text{Complementary Remainder Component Purchase Price})(1+x)^{[N/12]}(1+(N/12-[N/12])x) \quad (2)$$

where Expected Property Valuation is the product of Input Future Complementary Remainder Value 73 and Input Property Valuation 92, N=number of months in the estate for years (and/or augmented estate for years) term, [N/12]=the largest integer that is less than or equal to N/12, and x=remainder (and/or complementary remainder) component implied annual return, i.e., the output of Complementary Remainder Interest Implied Annual Return 102.

Input Rental Area 104 is for receiving data input representing the rentable area in the real estate. This data is used in Complementary Remainder Price Per Square Foot 106 to compute the remainder (and/or complementary remainder) price per square foot, which is computed by dividing the remainder (and/or complementary remainder) interest purchase price (from Block 100) by the number of rentable square feet in the property (from Block 104).

Input Zero-Coupon Risk-Free Rate 108 is for receiving data input representing the zero-coupon risk-free rate. Then, in Block 110, the price per square foot that the remainder (and/or complementary remainder) interest buyer is paying at the time the remainder (and/or complementary remainder) interest matures into full ownership of the property is computed as equaling the amount to which the remainder (and/or complementary remainder) price per square foot increases when it accrues interest at the zero-coupon risk-free rate. Formula 3 is used to compute this value.

$$\text{Price/Sq. Ft.}=(\text{Complementary Remainder Price/Sq. Ft.})(1+\text{zero-coupon risk-free rate})^{[N/12]}(1+(N/12-[N/12])(\text{zero-coupon risk-free rate})) \quad (3)$$

where N=number of months in the estate for years (and/or augmented estate for years) term, and [N/12]=the largest integer that is less than or equal to N/12.

Although this is the correct formula for a comparison of remainder (and/or complementary remainder) interest prices at the beginning and end of the estate for years (and/or augmented estate for years) term in an arbitrage-free market, the remainder (and/or complementary remainder) interest investor may find it more instructive to transforming this equation into a capital budgeting relation by substituting the remainder (and/or complementary remainder) interest investor's opportunity cost of equity or debt capital for the risk-free rate.

Percentage of Property Value Not Depreciable 112 is for receiving input data representing a percentage of property value represented, in the case of real estate, by the land. If a conservative cost recovery position is taken by the estate for years (and/or augmented estate for years) investor and only amortization is claimed as a tax deduction, which is the likeliest scenario at the current time, then this input is unnecessary. If depreciation as well as amortization is claimed by the estate for years (and/or augmented estate for years) holder, then this value is used in Block 114 to compute the schedule of depreciation and amortization tax deductions, together with the resulting adjustments to the estate for years (and/or augmented estate for years) tax basis. These must be computed very carefully because if both deductions are claimed then the deductions are not completely independent of each other, and because the interaction is complex and subtle.

Under present tax law, during the estate for years (and/or augmented estate for years) term, the estate for years (and/or augmented estate for years) is entitled at least to a deduction computed by straight line amortization of the estate for years (and/or augmented estate for years) acquisition cost, and possibly depreciation deductions as well, with reductions in each end-of-year tax basis computed in accordance with established tax accounting principles.

After computing the values of these annual deductions, the investor allocates fractions of the deductions to each tax quarter as instructed in the present tax code (e.g., if the first year is the entire calendar year, one quarter of each deduction is allocated to each quarter), and the tax basis is reduced accordingly on a quarterly basis.

The quarter-by-quarter amortization and depreciation deductions, and the corresponding quarterly adjustments to the estate for years (and/or augmented estate for years) tax basis, will be entered into a preformatted table. This table will be available for viewing on the Monitor 20, can be stored with the other output data if saved in Data File 32 by the user of Computer System 12, and can be printed at Printer 22 if the user presses a designated key on the Keyboard 16. (It should be noted that this invention uses the tax code, whatever it may require, in decomposing the real estate into separate components; the invention of the computer system and methods involving it of course do not depend upon the present tax laws.)

Block 116 computes quarterly tax payments by subtracting the quarterly tax deductions from the quarterly net rental payments, and multiplying the result by the tax bracket of the estate for years (and/or augmented estate for years) investor. This is output since it is part of the accounting support for the estate for years (and/or augmented estate for years) investor.

Typically, tax payments are made by institutional investors four times per year, in the middle of months 1, 4, 7, and 10. The after-tax income component yield, which is computed in Block 118, is the after-tax yield to the estate for years (and/or augmented estate for years) buyer, and is the internal rate of return on the after-tax net rental cash flows. For rental payments made at the beginning of each month, it is preferred to divide the year into twenty-four (24) semi-monthly periods with cash flows at the beginning of each period. With this approach, the pretax rents are the cash flows in the odd-numbered periods (i.e., periods 1, 3, 5, . . . , 21, 23), while the tax payments are the cash flows in periods 2, 8, 14, 20 (in the other even-numbered periods, the cash flows are treated as being equal to zero).

An alternative is to simplify the calculation conceptually for the estate for years (and/or augmented estate for years) holder by assuming that tax deductions occur with the same frequency as the cash flows (typically, on a monthly basis), and matching the occurrence of the tax deductions with the corresponding cash flows. In this case, for computational purposes the year will be divided into the same number of periods as the expected frequency of cash flows—typically, twelve periods, or monthly.

In Pretax Income Component Yield 120, the pretax income component yield is computed as the pretax interest rate that the estate for years (and/or augmented estate for years) buyer would have to receive if the estate for years (and/or augmented estate for years) were a bond, in order to be left with the same amount of after-tax income that results from owning the estate for years (and/or augmented estate for years). This number is computed by dividing the after-tax income component yield (from Block 118) by one minus the tax bracket of the estate for years (and/or augmented estate for years) investor (from Block 82).

If the estate for years (and/or augmented estate for years) purchaser is a taxable investor, this number will be larger than the rental income yield rate of Block 80. This occurs because the estate for years (and/or augmented estate for years) is an income-producing asset rather than a bond, and hence income from the estate for years (and/or augmented estate for years) is subject to different tax regulations than income from a bond.

Block 122 computes the equivalent after-tax estate for years (and/or augmented estate for years) value by discounting the after-tax net rental payments at the after-tax income yield rate. This is the discount rate that would be applied to the after-tax cash flows if the estate for years (and/or augmented estate for years) were a bond.

Block 122 may compute other measures of the estate for years (and/or augmented estate for years) value by discounting different components of the after-tax cash flows at different discount rates that reflect the different risk characteristics of those components (e.g., discounting the pretax cash flows, tax payments, and tax deductions at rates that reflect the different degrees of certainty that they will be realized as projected at the time of component separation).

In cases in which the remainder (and/or complementary remainder) component is to be decomposed into a preferred fixed-income interest and a residual equity interest, Input Credit Risk Premium Curve 105 receives the credit risk premium curve of the insurer for the preferred interest. Input Extra Months to Retire Preferred 103 receives the amount of time beyond the estate for years (and/or augmented estate for years) term, if any, that the residual equity interest investor has to refinance or sell the property and pay off the preferred interest holder. Average Life 95 computes the expected life of the preferred interest in the remainder (and/or complementary remainder) component by adding the estate for years (and/or augmented estate for years) term to the value received by Input Extra Months to Retire Preferred 103, which equals the average life of the preferred interest since the preferred interest is a zero coupon bond. Preferred Interest Annual Return 97 selects the Treasury bond yield rate from Input Data 78 and corresponding insurance credit risk premium from Input Data 105 corresponding to the preferred equity interest average life, and computes the preferred interest annual return by adding the Treasury bond yield rate to the insurance credit risk premium.

Input Insured Property Value 101 receives the insured value for the property at a date specified by the residual value insurance (e.g., at maturity of the preferred interest), expressed as a percentage of Input Property Valuation 92. Preferred Interest Purchase Price 99 converts the insured value for the property to a nominal amount by multiplying Input 101 and Input 92 together, and then computes the preferred interest purchase price by discounting the insured property value at maturity of the preferred interest back to the date of the temporal decomposition by the equation:

$$\text{Preferred Interest Purchase Price}=\text{Insured Property Value}/((1+y)^{[M/12]}(1+(M/12-[M/12])y)) \quad (4)$$

where y=preferred interest annual return, and M=number of months in the expected life of the preferred interest.

The cost of decomposing the remainder (and/or complementary remainder) component into preferred and residual interests is computed in Residual Interest Purchase Price 113 as the sum of the cost of residual value insurance from Input Insurance Policy Premium 107 and any additional associated up-front fees from Input Additional Up-Front Fees 109, such as the costs of obtaining a credit rating for the preferred interest and of generating financial disclosure documents for the preferred and residual interests. Residual Interest Purchase Price 113 then computes the residual interest purchase price from the equation that the sum of the preferred interest and residual interest purchase prices is equal to the sum of the purchase price of the remainder (and/or complementary remainder) component from Complementary Remainder Interest Purchase Price 100 and the cost of decomposing the remainder (and/or complementary remainder) component into the preferred and residual interests. This is a linear equation in which the only unknown quantity is the purchase price of the residual interest, which implies that the equation can be solved for the residual interest purchase price as follows:

$$\text{Residual Interest Purchase Price}=\text{Complementary Remainder Component Purchase Price}+\text{Residual Value Insurance Policy Premium}+\text{Additional Up-Front Fees}-\text{Preferred Interest Purchase Price} \quad (5)$$

In some exceptional cases, it may be desirable to use a fraction of the residual value insurance to insure the return on the preferred interest, reserving the remaining fraction of the residual value insurance to insure a portion of the return on the residual interest. This can lower the investment risk associated with the residual interest, enhancing the marketability of the residual interest by sacrificing some residual interest leverage. In such cases, the expression on the right side of Equation (4) for the preferred interest purchase price must be modified as follows: the right side of the equation must be multiplied by the fraction that represents the portion of residual value insurance that is allocated to insurance for the preferred interest return. Equation (5) still provides the solution for the residual interest purchase price in terms of the preferred interest purchase price.

Input Exit Fees 111 receives the expected future cost of liquidating or refinancing the remainder (and/or complementary remainder) interest in order to raise the funds required to retire the preferred interest, which cost is expressed as a percentage of the expected property valuation at maturity computed in Block 102.

Residual Interest Annual Return 115 computes the expected annual return on the residual interest over the expected life of the preferred/residual decomposition. This interest rate is the only unknown quantity in the following equation:

$$\text{Expected Residual Interest Valuation at Maturity}=(\text{Residual Interest Purchase Price})(1+z)^{[M/12]}(1+(M/23-[M/12])z) \quad (6)$$

where Expected Residual Interest Valuation at Maturity is the value obtained by subtracting the sum of the preferred interest valuation at maturity and the expected nominal amount of exit fees from the expected property valuation at maturity from Block 102, z=residual interest annual return, and M=number of months in the expected life of the preferred interest. The preferred interest valuation at maturity equals the value of the portion of the minimum property value specified by the residual value insurance that is allocated to the preferred interest, which portion usually is equal to the entire amount of the specified minimum property value. The expected nominal amount of exit fees is obtained by multiplying the percentage value from Input Exit Fees 111 by the nominal value of the expected property valuation at maturity.

Complementary Remainder-to-Residual Ratio 119 divides the remainder (and/or complementary remainder) interest valuation by the residual interest valuation. This represents the factor by which the amount of equity risk capital required to complete the acquisition and decomposition of the property is reduced via the use of residual value insurance to carve a fixed-income preferred interest out of the remainder (and/or complementary remainder) component.

Residual Leverage Ratio 121 computes the factor by which leverage for the equity investor is increased (for the case of the scenario specified by the input values) by carving a preferred fixed-income interest out of the remainder (and/or complementary remainder) component. This is computed by the following equation:

$$\text{Residual Leverage Ratio}=(\text{Complementary Remainder-to-Residual Ratio})(\text{Expected Residual Valuation at Maturity}/\text{Expected Property Valuation}) \quad (7)$$

where Complementary Remainder-to-Residual Ratio is obtained from Block 119, Expected Residual Valuation at Maturity is obtained from Block 115, and Expected Property Valuation is obtained from Block 102.

In Blocks 115 and 121, the residual interest annual return and the residual leverage ratio are computed net of fees associated with raising the funds required to retire the preferred interest This is a financially conservative approach to the computation of these values and differs from the approach frequently taken in disclosure documents, which is to compute returns and leverage ratios based on asset values before imposition of any back-end liquidation or refinancing fees. It is important to note that the alternative values for the residual annual return and residual leverage ratio before imposition of back-end fees are also generated by this software, by setting Input Exit Fees 111 equal to zero.

By contrast, the incorporation of an assumed exit fee at the end of the estate for years (and/or augmented estate for years) term in Complementary Remainder Interest Implied Annual Return 102 and the expected property valuation input to Residual Leverage Ratio 121 is usually inappropriate in the case of a remainder (and/or complementary remainder) interest that is not leveraged or decomposed into components, since in this case the remainder (and/or complementary remainder) interest holder usually does not face an automatic need to refinance the property at the end of the estate for years (and/or augmented estate for years) term. In cases in which the remainder (and/or complementary remainder) holder is expected to face such a need, expected exit fees can be subtracted from Input Future Complementary Remainder Value 73 either before or after data entry. This modification will flow through automatically to make appropriate modifications for expected remainder (and/or complementary remainder) holder exit fees to the calculations for Complementary Remainder Interest Implied Annual Return 102 and Residual Leverage Ratio 121.

Insured Value Per Unit Area 125 computes the insured value of the property per unit area of rentable space by multiplying the property valuation from Input Property Valuation 92 by the insured value for the property from Input Insured Property Value 101 (as specified at maturity of the preferred interest by the residual value insurance and expressed as a percentage of Input Property Valuation 92) and dividing the resulting product by the rentable area of the property, usually in square feet, received from Input Rental Area 104.

In using Computer System 12 and the Financial Analysis Output 26, the user of Computer System 12 can construct financial documents by using a Word Processing Program 34 to revise such documents as those in Specimen 2 and Specimen 3 and the Stored Other Financial Document 37. These documents contain other terms and conditions and other particulars for the separated purchase transaction of the components of the real estate, in accordance with the present invention.

D. Computer Screens and Logic For Another Embodiment

In another embodiment of the present invention, the Logic Means 30, in conjunction with the rest of System 12, is used in connection with financial transactions involving separate components of one or more partnership interests in tax-exempt securities.

In this embodiment, Logic Means 30 partially automates the dividing of he partnership interest into respective, valued interests for the estate for years (and/or augmented estate for years) and the remainder (and/or complementary remainder) interest. Computation of the values is based on fixed-income pricing techniques widely accepted by fixed-income investors.

In this other embodiment of the invention, the hardware, logic, and computer screens are as described above, with modifications to reflect the different kind of property being divided. Reflecting these modifications, Data Form 52, of which Screen 1 of Specimen 2 is an example, accepts inputs for a tax-exempt security with constant debt service payments.

The user enters or edits a column of debt service payments (instead of the rents in the above-mentioned embodiment) until all payments have been entered.

Other Stored Model Financial Document 37 represents other financial documentation required to successfully place the securitized components. For each component, these include a securities document, e.g., one or more of the following group: an organizational document for an entity such that a certificate evidencing an ownership or equity interest in the entity is deemed a security for securities law purposes, a security evidencing an ownership or equity interest in such an entity, and a disclosure document for securities law purposes, such as an offering memorandum, prospectus, or term sheet, which would normally include some or all of the following:

Security Description

Entity Description

Tax-Exempt Fixed-Income Security(ies) Held by Entity (Description)

Description of Borrower(s) Financial Assessments

Financial Analysis Based Upon Various Assumptions and Inputs

Presentation of Risk Characteristics

In this description, the term "securities law" can refer either to United States federal securities law alone or to all applicable United States federal, state and territorial securities law.

FIG. 5 represents the input and computational logic of this embodiment of Logic Means 30, which again is substantially as discussed in the above-mentioned embodiment. The pricing logic for components is analogous to the pricing of the estate for years (and/or augmented estate for years) in the case of property. However, unlike the application of this invention to property, every financial asset in the present embodiment—the original asset together with all components—is treated as a fixed-income asset, and is valued via fixed-income technology.

Values can be expressed, and computations performed, in absolute terms of a currency unit such as dollars, or in relative terms such as percentages of current value or original issue value of the tax-exempt securities in the partnership portfolio of interest. While all contracts ultimately require values to be expressed in absolute terms, comparisons of profitability are more easily made in relative terms. Specimen 2 illustrates both modes of expression for System 12 input and output.

To simplify the language in what follows, the remaining discussion will refer to "securities" in the singular only, i.e., "security;" however, it will be understood that the discussion applies both to single-security portfolios and multiple security portfolios held by the partnership. Where possible, the discussion will simply refer to the security as the "partnership portfolio." Similarly, the term "investor," when applied to the holders of estate for years (and/or augmented estate for years) and remainder (and/or complementary remainder) components, is intended to refer to both the singular and plural cases.

The logic of Input Data 124 receives a schedule of interest rates for AAA publicly traded general obligation municipal bonds of annual maturities from one to thirty-five years. This serves as the analogue of the yield curve for the tax-exempt bond market, i.e., the basis for pricing all other tax-exempt securities, and this input is used by each pricing calculation herein. Input Data 126 receives a schedule of additional interest investors expect for holding a type of tax-exempt portfolio held by a limited partnership.

Block 136 roughly estimates a remaining average life of the partnership portfolio, selects the corresponding AAA general obligation rate and risk premium, and adds them to obtain the current yield required by the fixed-income market for the partnership portfolio.

Input Data 132 receives the schedule of payments expected from the partnership portfolio. This will usually be in the form of a file specifying payment values and dates. However, in some cases an alternate description may be appropriate. For example, in the case of a single-security portfolio with constant debt service, the specification of principal value, frequency of payments, and amortization term constitutes a description from which, together with the yield rate from Input Data 134, a schedule of debt service payments may be reconstructed.

Using data received by Input Data Blocks 130 and 132, Block 142 extracts a schedule of remaining cash flows expected from the partnership portfolio, and computes a present value by discounting the cash flows at the rate received from Block 136. Based on this present value, an improved estimate of the average life of the portfolio is computed by Block 140.

Block 136 uses this improved estimate iteratively to recompute the current portfolio yield, and the recomputed portfolio yield is used by Blocks 142 and 140 to recompute the portfolio value and average life, respectively. As discussed earlier, average life is relatively insensitive to changes in the discount rate, so one or two iterations is almost always sufficient to obtain consistent output values that will not change with additional iterations.

This linked iteration is used four more times in the logic of Logic Means 30: in the calculations of discount rate, and the price, and the average lives of the estate for years (and/or augmented estate for years) and the remainder (and/or complementary remainder) interests. The other examples are virtually identical, and will not be discussed separately.

Box 146 receives a percentage of the partnership that will be separated into estate for years and remainder (and/or augmented estate for years and complementary remainder) components, and Box 148 computes a complementary value of the partnership that will not be separated into components. It is possible that several partnership interests will be separated into components, and that various estate for years (and/or augmented estate for years) components will have distinct terms; however, typically there will be only one partnership interest that will be separated into components, and it will be the entire limited partnership interest. Consequently, the "term" of the estate for years (and/or augmented estate for years) is clear because usually there is only one estate for years (and/or augmented estate for years). However, the invention is intended to include the more general case of multiple component separations as well.

The choice of partnership percentage that will be separated into components as an input is arbitrary, at least in the case in which one component is separated into components. It is equally acceptable to input the partnership percentage that will not be separated into components, and to output the percentage of the partnership that will be separated into components.

Block 148 receives the schedule of partnership cash flows that will be received after the date the components are separated and decomposes the cash flows into interest and repayment of principal portions, using the original interest rate at which the security was issued (from Input Data 134). These distinctions are important in valuing the components because, under current federal tax law, only the interest portion of each payment is automatically tax-exempt; the repayment of principal portion is sheltered from federal taxation only to the extent that cost recovery deductions generated by the security are available to the security holder(s).

It will frequently be the case that the original tax-exempt interest rate received by Input Data 134 equals the current tax-exempt yield rate computed by Block 136. One natural way for this to occur is if the tax-exempt security in the partnership portfolio is created at the same time as the estate for years and remainder (and/or augmented estate for years and complementary remainder) components. In this case, the embodiment of the invention defined herein will generate documentation for the tax-exempt security as well as documentation for the estate for years and remainder (and/or augmented estate for years and complementary remainder) components.

Block 152 multiplies the payment schedules for interest and repayment of principal by the percentage of the partnership that will be separated into components to compute schedules for interest payments and repayment of principal payments that will be split between the components.

The length of the estate for years (and/or augmented estate for years) term received by Input Data 150 is used by Blocks 154 and 156 to split the schedules of interest and repayment of principal payments into schedules of payments that will be received by the estate for years (and/or augmented estate for years) investor and the remainder (and/or complementary remainder) investor, respectively.

Block 158 receives the schedule of risk premium values for a security of the type represented by the estate for years (and/or augmented estate for years). The estate for years (and/or augmented estate for years) risk premium schedule is related to the partnership portfolio risk premium schedule, but may differ due to different investor perceptions of risk in the two types of investments. While credit risk for the estate for years (and/or augmented estate for years) is usually the same as credit risk for the partnership portfolio, liquidity risk may be different. The liquidity risk will be increased if the estate for years (and/or augmented estate for years) is viewed as more difficult to sell prior to maturity than the partnership portfolio, as will be the case before this product is well-established in the fixed-income marketplace. But the liquidity risk will also lessen because the average life of the estate for years (and/or augmented estate for years) is shorter than the average life of the partnership portfolio. The combined effect on liquidity risk as perceived by investors is difficult to predict, and may have to be dealt with on a case-by-case basis.

The estate for years (and/or augmented estate for years) risk premium may also contain a component due to perceived tax risk, i.e., the risk that not all of the predicted incremental tax benefits associated with the estate for years (and/or augmented estate for years) will be received by the estate for years (and/or augmented estate for years) investor. This risk may be substantial in some cases, and nonexistent in others. For example, if the estate for years (and/or augmented estate for years) component carries insurance against loss of economic benefits due to a change in the tax laws, the estate for years (and/or augmented estate for years) investor would not be expected to demand additional return for tax risk, because this investor is not exposed to any risk of economic loss as a consequence of this risk dimension.

For marketing purposes, the estate for years (and/or augmented estate for years) component may disburse cash payments according to a different schedule than the partnership portfolio. For example, the partnership portfolio may receive payments monthly, or at irregular intervals (e.g., if the portfolio contains several securities), whereas the estate for years (and/or augmented estate for years) makes disbursements semiannually. Input Data 160 receives the frequency of estate for years (and/or augmented estate for years) cash disbursements, and Input Data 162 receives the tax-exempt interest rate the general partner(s) guarantee to accrue on warehoused payments from the partnership portfolio, usually from a tax-exempt money market fund.

Block 166 computes the cash payment schedule of the estate for years (and/or augmented estate for years) component. Each payment is computed by adding together the portion of the partnership portfolio disbursements warehoused for the estate for years (and/or augmented estate for years) investor since the last disbursement, and adding to that the interest accrued on the warehoused payments.

Block 164 computes the estate for years (and/or augmented estate for years) yield rate as in the case of the partnership portfolio yield rate (cf. Block 136).

Block 174 computes the estate for years (and/or augmented estate for years) purchase price by discounting the cash flows from Block 168. In general, this computation is an interactive process. First, Block 170 discounts the after-tax estate for years (and/or augmented estate for years) cash flows at the estate for years (and/or augmented estate for years) yield rate computed by Block 164. This discounts all of the interest portions of the cash flows, but assumes that repayment of principal portions are reduced by tax payments before discounting, where tax payments are computed using the projected tax rates from Input Data 162.

Figures 1, 5A:
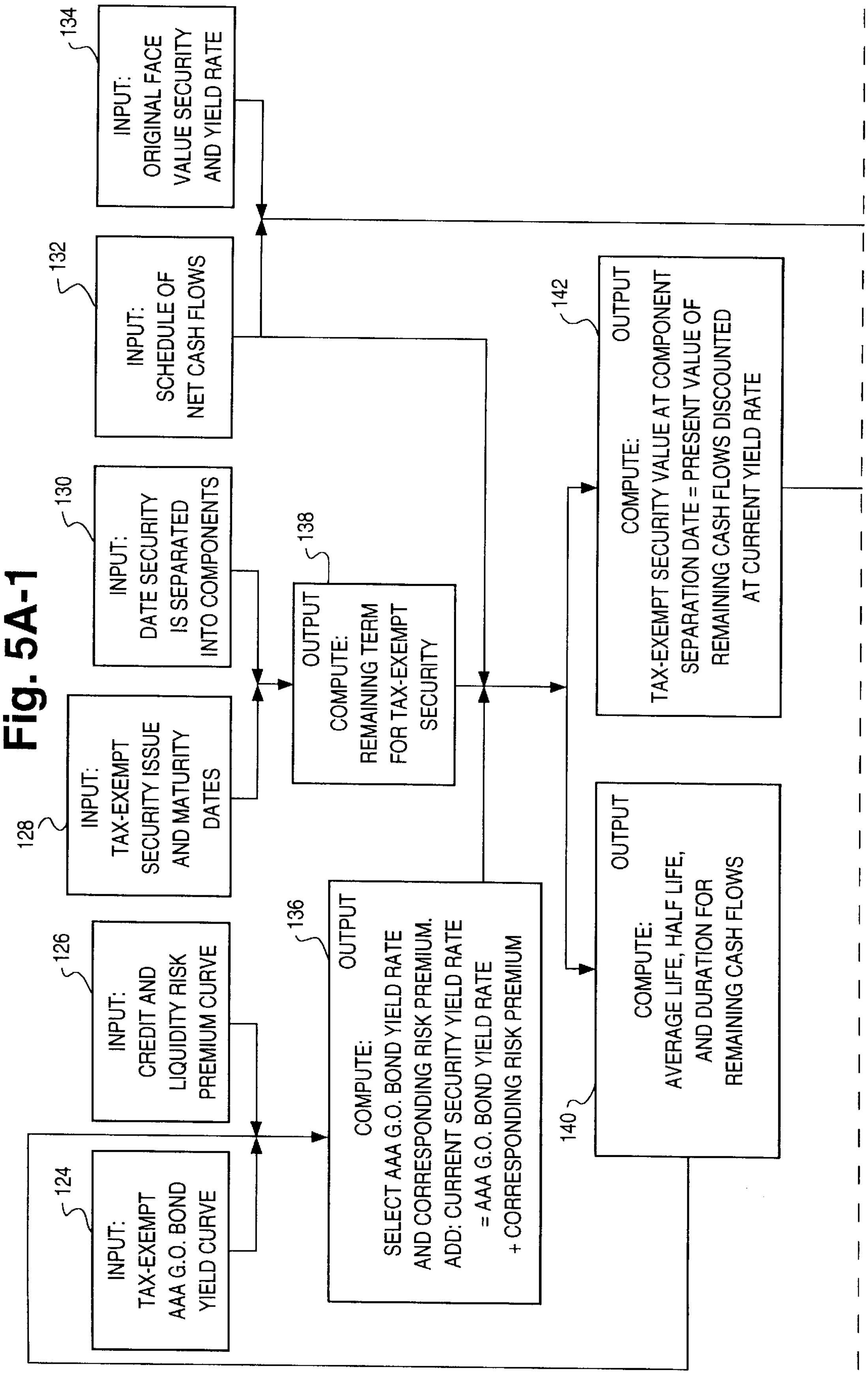
Figures 2, 5A:
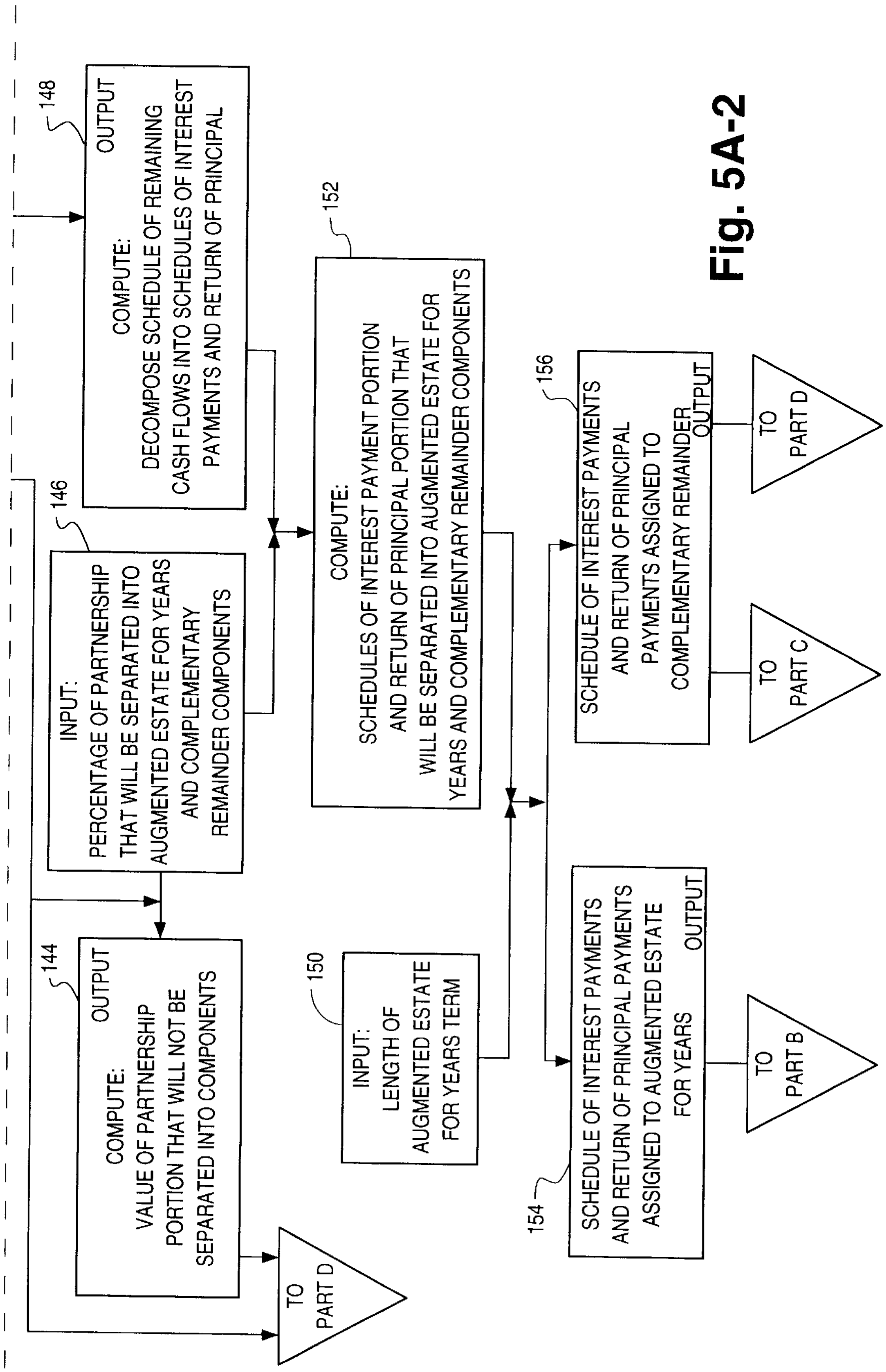
Figures 1, 5B:
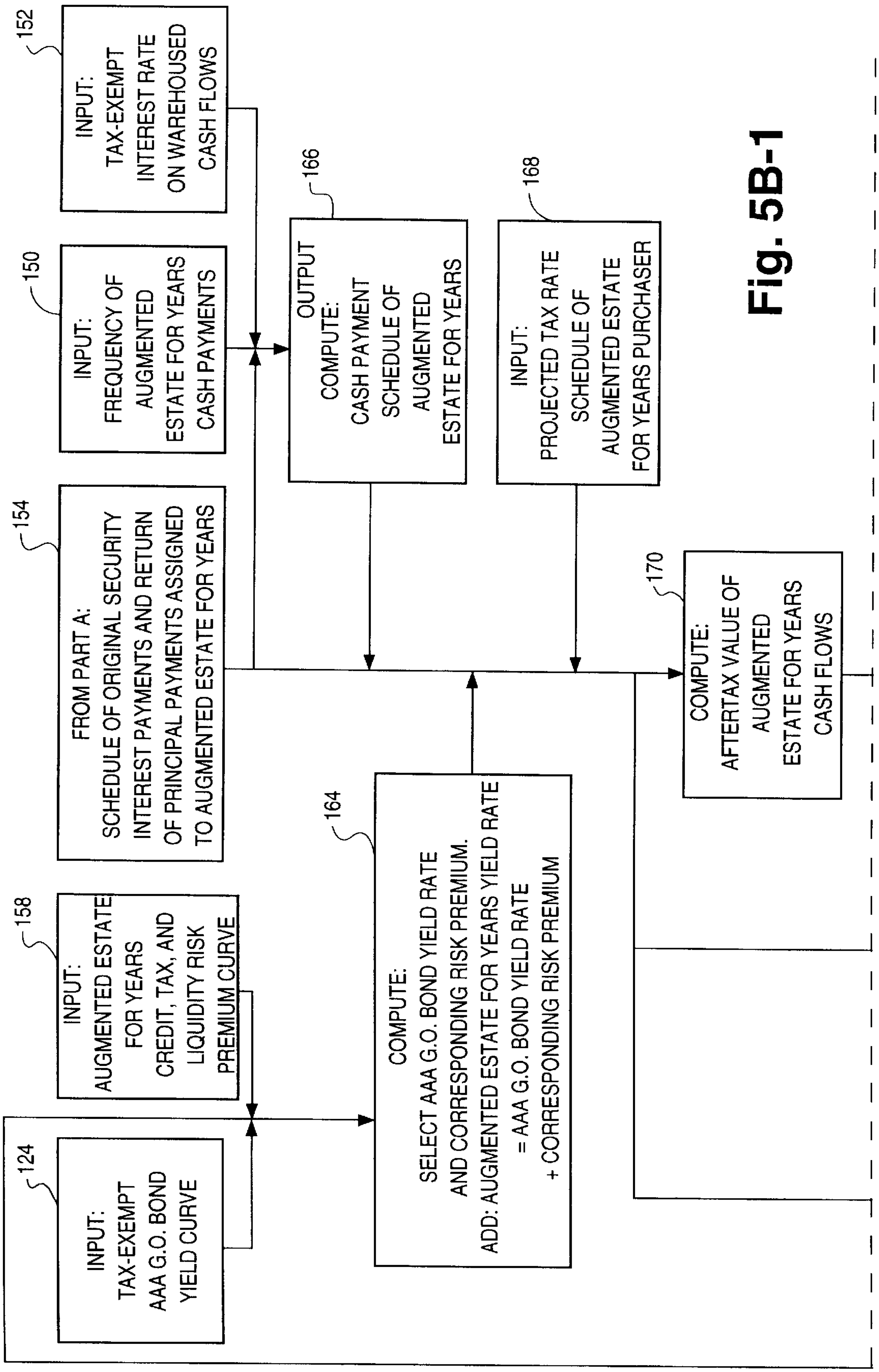
Figures 2, 5B:
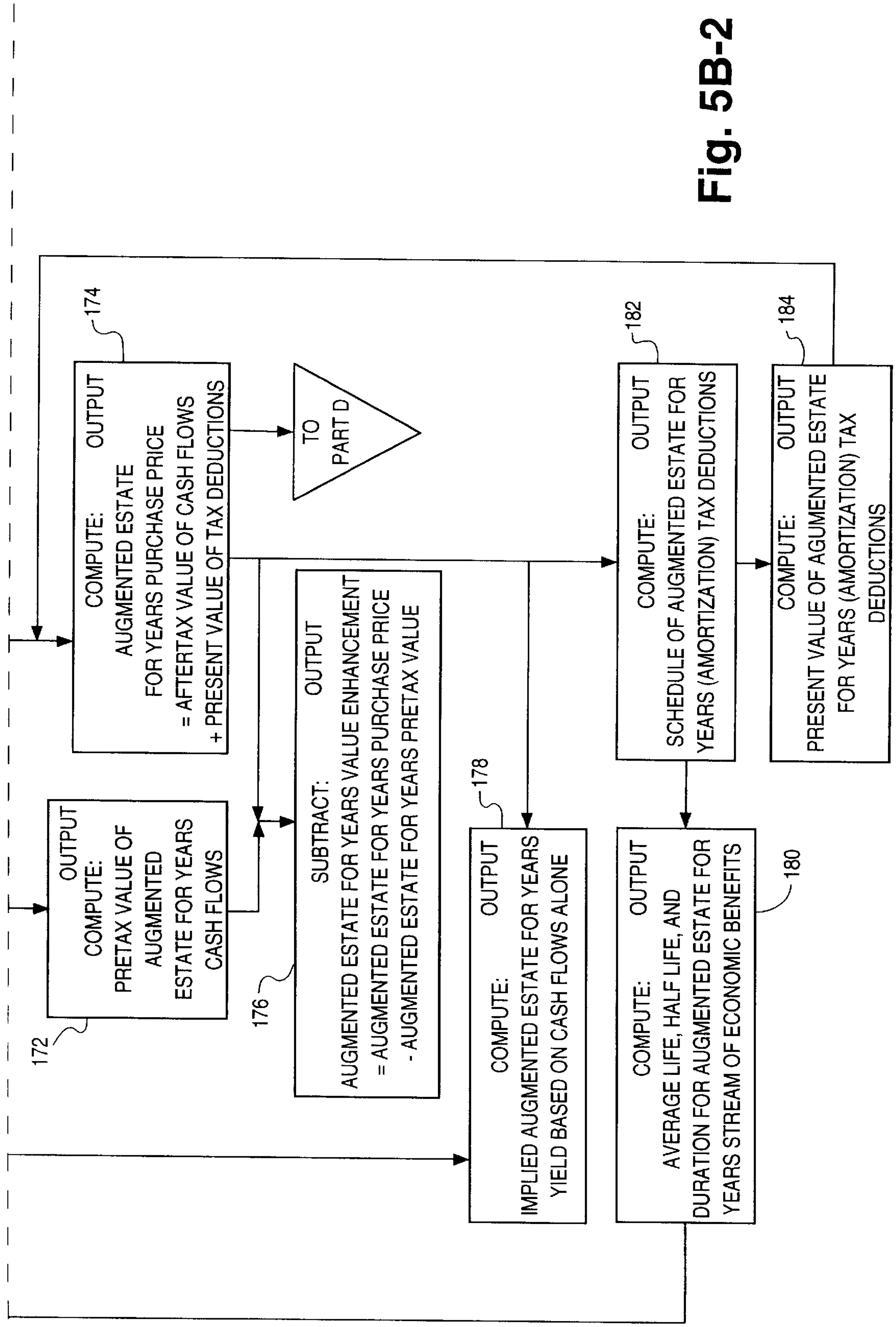
Figures 1, 5C:
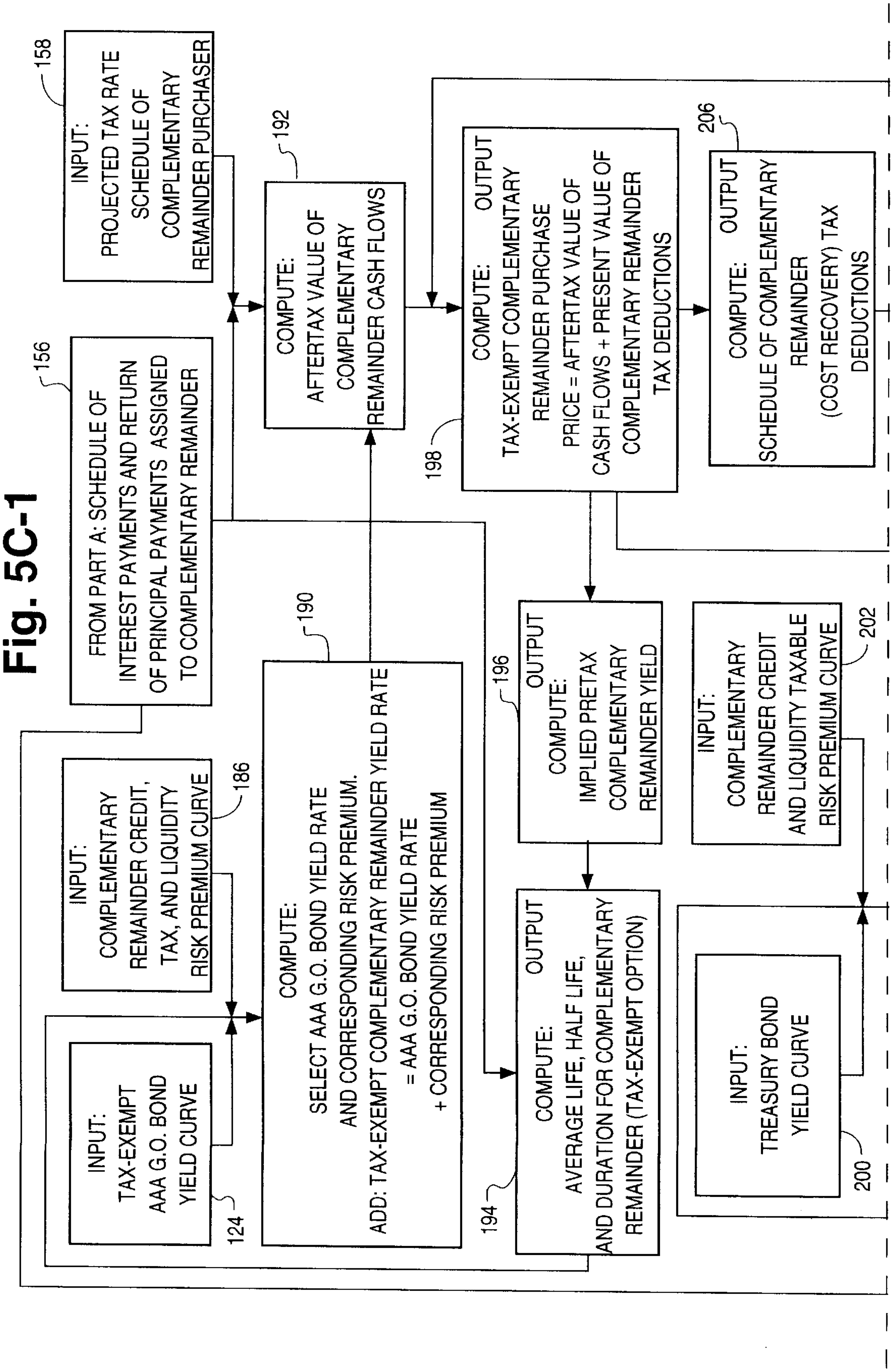
Figures 2, 5C:
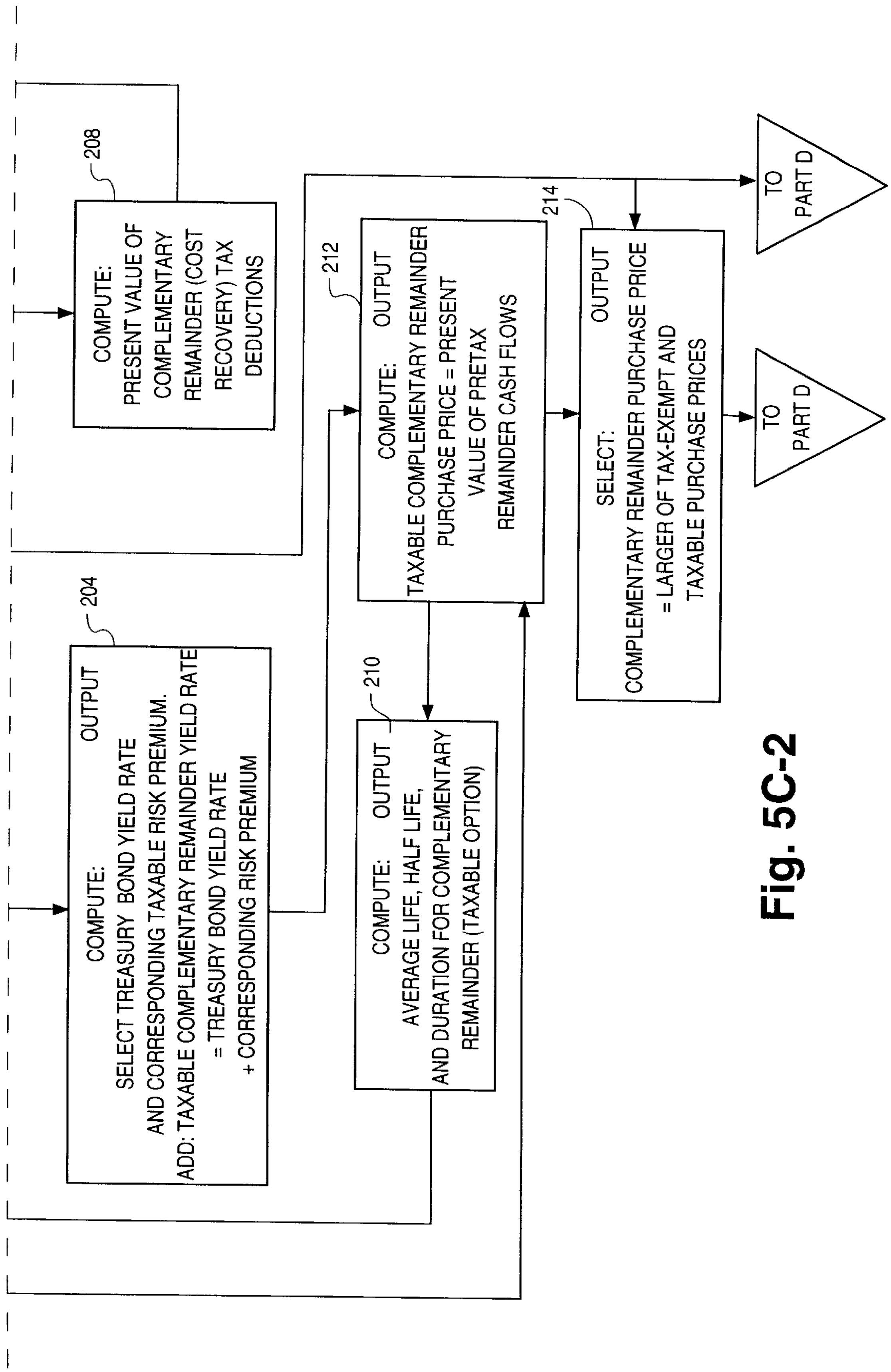
Figures 1, 5D:
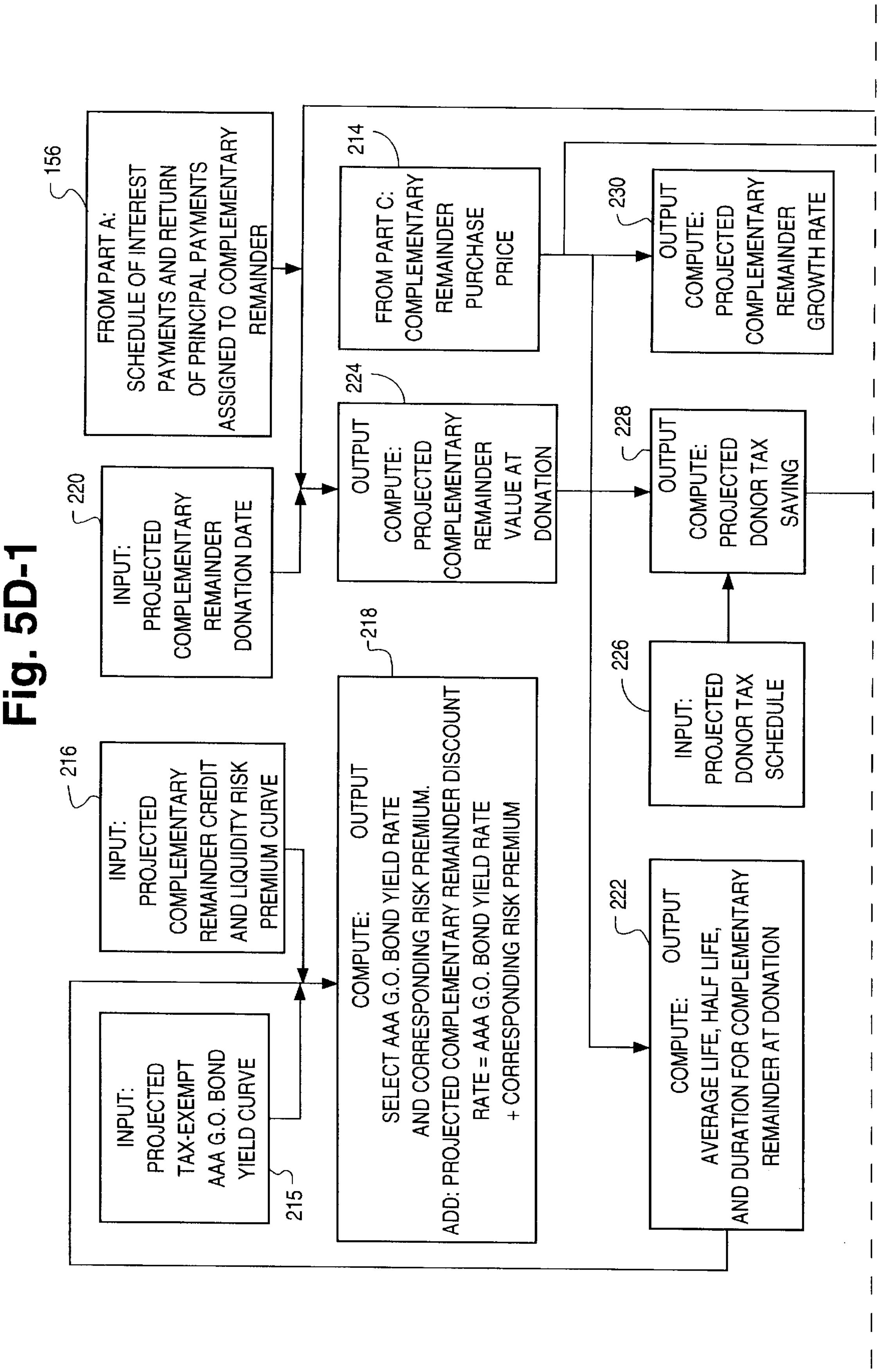
Figures 2, 5D:
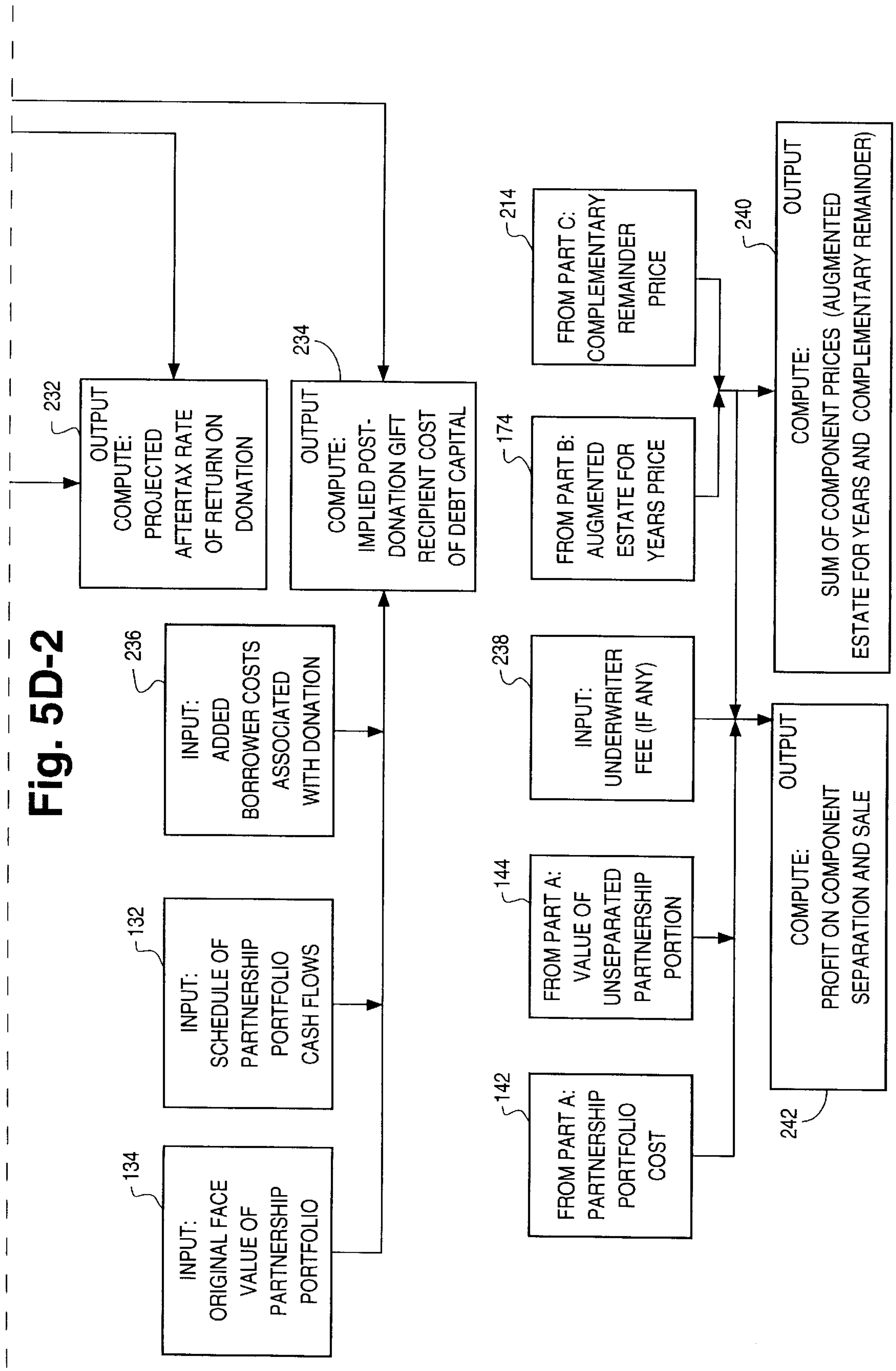

Next a schedule of estate for years (and/or augmented estate for years) amortization deductions is computed in Block 182, a present value of amortization deductions is computed by Block 184, and an updated iterate for the estate for years (and/or augmented estate for years) purchase price is computed by summing the output of Blocks 170 and 184. Then the loop is repeated as shown in FIG. 5(B), until the computed value of the estate for years (and/or augmented estate for years) purchase price ceases to change significantly with additional iterations.

The projected tax schedule of the estate for years (and/or augmented estate for years) purchaser received from Input Data 168 is essential to the valuation of amortization of tax deductions in Block 184. If the estate for years (and/or augmented estate for years) purchaser were assumed to be a tax-exempt investor, the present value of the tax deductions would be zero. This reveals an important point: as with conventional tax-exempt securities, the estate for years (and/or augmented estate for years) component is worth more to a taxable investor than to a tax-exempt investor.

Furthermore, as the tax bracket of the estate for years (and/or augmented estate for years) investor increases, so does the value of the estate for years (and/or augmented estate for years) component.

Typically, the projected tax rate schedule received from Input Data 168 will consist of a single tax rate, and some implementations of Logic Means 30 will make this simplification.

It is not always necessary to compute the value of the estate for years (and/or augmented estate for years) component iteratively. If the cash flows from the partnership portfolio are sufficiently regular, for example if debt service payments do not vary and are made at regular intervals (e.g., as is the case for a single-security partnership portfolio with constant debt service payments, and possibly a balloon payment at maturity), then computation of the estate for years (and/or augmented estate for years) purchase price in Block 174 is made via an analytic formula without Block 170 and without iterative computations.

The output of Block 174 shows the value of applying the innovation to tax-exempt securities. The estate for years (and/or augmented estate for years) component generates amortization deductions to shelter a portion of the cash flows received by the estate for years (and/or augmented estate for years) component from taxes. However, because the partnership portfolio is tax-exempt, portions of the cash flows attributed to interest are already tax-exempt. For cases in which tax-exempt interest represents a sufficiently large part of estate for years (and/or augmented estate for years) cash flow, estate for years (and/or augmented estate for years) amortization deductions will be greater than needed to shelter the repayment of principal portions of estate for years (and/or augmented estate for years) cash flows from taxes. These excess amortization deductions can be used to reduce taxes on disbursements from (other) taxable investments, which implies that the estate for years (and/or augmented estate for years) value is greater than the value of the estate for years (and/or augmented estate for years) cash flows alone.

The incremental value represented by excess amortization deductions is computed in Block 176, which subtracts the value of the tax-exempt estate for years (and/or augmented estate for years) cash flows computed in Block 172 from the estate for years (and/or augmented estate for years) purchase price computed in Block 174. Block 176 reveals the business/economic value created by the application of component separation to tax-exempt securities. This invention is not tied to any particular amortization or cost recovery schedule for the estate for years (and/or augmented estate for years), as long as the contribution of the present value of tax deductions generated by the estate for years (and/or augmented estate for years) component enhances the estate for years (and/or augmented estate for years) value relative to its value as a schedule of tax-exempt cash flows.

Block 178 computes the implied yield on the estate for years (and/or augmented estate for years) component based on cash flow alone. This is an important safety check on the validity of the estate for years (and/or augmented estate for years) amortization deductions, because under current tax law deductions are invalid if they create an asset with negative or zero expected investment return. Because the estate for years (and/or augmented estate for years) is a fixed-income asset, implied yield to maturity based on cash flow alone equals expected investment return. Thus the output of Block 178 must be greater than zero for the prices computed by the invention to be valid.

Block 180 computes the average life, half life, and duration of the estate for years (and/or augmented estate for years) using the full schedule of estate for years (and/or augmented estate for years) cash flows plus projected tax savings. This output is used in the iterative calculation of the estate for years (and/or augmented estate for years) yield rate as in the previous examples of this process.

Computation of the remainder (and/or complementary remainder) component price entails a complication not present in computing the estate for years (and/or augmented estate for years) price, due to the fact that is a zero-coupon security, i.e., due to the fact that no cash flow is generated during the estate for years (and/or augmented estate for years) term. Consequently, the tax basis of the remainder (and/or complementary remainder) component will never be large enough to tax shelter all of the return of principal payments received by the remainder (and/or complementary remainder), so that a portion of the cash flows received by the remainder (and/or complementary remainder) investor is subject to federal taxation.

This implies that the remainder (and/or complementary remainder) component can be valued in at least two ways: (1) as a tax-exempt security, on the basis of its aftertax cash flows; or (2) a conventional taxable security, valued on the basis of its pretax cash flows. In case (1), the projected tax rate schedule of the purchaser affects the computation of the purchase price, whereas in case (2), the purchase price computation is independent of the tax bracket of the purchaser. Logic Means 30 computes the remainder (and/or complementary remainder) value as a tax-exempt security in Block 198, and the remainder (and/or complementary remainder) value as a taxable security in Block 212. Logic Means 30 selects the larger value in Block 214, and outputs a recommendation as to the appropriate marketing strategy, i.e., whether to market the remainder (and/or complementary remainder) as a tax-exempt fixed-income security or a taxable fixed-income security.

As a longer term zero-coupon investment, the regularity or irregularity of remainder (and/or complementary remainder) cash flows has little to do with asset marketability. Because there is little to gain by rescheduling the remainder (and/or complementary remainder) cash flows via cash flow warehousing, this degree of complexity is omitted from the structure of the remainder (and/or complementary remainder) component by the logic means.

Block 190 computes the yield rate for the remainder (and/or complementary remainder) under the assumption that it is regarded as a tax-exempt security.

The computation of the remainder (and/or complementary remainder) price in Block 198 proceeds iteratively exactly as in the case of the estate for years (and/or augmented estate for years), substituting Block 192 for Block 170, Block 206 for Block 182, and Block 208 for Block 184. Also, again as with computation of the estate for years (and/or augmented estate for years) purchase price, the iterations can be avoided and replaced by an analytic formula for the tax-exempt remainder (and/or complementary remainder) purchase price if the remainder (and/or complementary remainder) cash flows are assumed to be sufficiently regular.

The computation of the average life of a fixed-income security is based on pretax cash flows and pretax interest rate. Block 196 computes the implied pretax remainder (and/or complementary remainder) interest rate. This value is identical to the tax-exempt yield rate computed by Block 190 if the tax rate schedule from Input Data 188 is zero, and in general the value computed by Block 196 differs only slightly from the tax-exempt yield rate. The interest rate computed by Block 196 together with the pretax cash flows and the tax-exempt remainder (and/or complementary remainder) purchase price from Block 198 are used to compute the tax-exempt average life for the remainder (and/or complementary remainder) in Block 194.

Viewing the remainder (and/or complementary remainder) as a taxable fixed-income security, the corresponding computations become much simpler. Input Data 200 receives the conventional Treasury yield curve, and Input Data 202 the corresponding (taxable) risk premium curve. Block 204 computes the taxable remainder (and/or complementary remainder) yield rate, and Block 212 computes the taxable remainder (and/or complementary remainder) purchase as the present value of the pretax remainder (and/or complementary remainder) cash flows discounted at the yield rate computed in Block 204. As in previous cases, Block 210 computes the average life, half life, and duration for the taxable remainder (and/or complementary remainder), and the average life is fed back to Block 204 to iterate the computation of the taxable remainder (and/or complementary remainder) yield rate.

Block 240 computes the sum of the estate for years and remainder (and/or augmented estate for years and complementary remainder) prices. Block 242 computes a measure of profitability for the separation transaction by computing the difference between: (1) the sum of the estate for years (and/or augmented estate for years) price, the remainder (and/or complementary remainder) price, the value of the unseparated portion of the partnership interests, and any underwriting fees received in connection with the overall transaction, and (2) the price of the tax-exempt fixed-income portfolio acquired by the partnership.

An additional feature of component decomposition applied to tax-exempt fixed-income portfolios arises because of the zero-coupon nature of the remainder (and/or complementary remainder) interest.

During the estate for years (and/or augmented estate for years) term, the remainder (and/or complementary remainder) is a zero-coupon security, and the return earned on the remainder (and/or complementary remainder) is tax-deferred for a remainder (and/or complementary remainder) investor; taxes are only due when the estate for years (and/or augmented estate for years) term has expired and the remainder (and/or complementary remainder) investor begins to receive cash flows, or when the remainder (and/or complementary remainder) is sold. Consequently, a tax-effective strategy for a philanthropic remainder (and/or complementary remainder) purchaser would be the following: hold the remainder (and/or complementary remainder) during the estate for years (and/or augmented estate for years) term while it earns tax-deferred returns, then make a charitable donation of the remainder (and/or complementary remainder) when the estate for years (and/or augmented estate for years) term expires and take a charitable deduction enhanced by the increase in the remainder (and/or complementary remainder) value. In addition, the remainder (and/or complementary remainder) purchaser receives the satisfaction of seeing a favorite charitable foundation or institution receive a substantial fixed-income security as a gift.

Logic Means 30 computes values to describe and measure the value generated by a remainder (and/or complementary remainder) purchaser through a remainder (and/or complementary remainder) donation. The key value needed by the remainder (and/or complementary remainder) purchaser is the projected value of the remainder (and/or complementary remainder) at the time of the donation. This value is a fixed-income present value computation analogous to the other present value computations made by Logic Means 30 in this application.

Input Data 220 receives the projected date of a remainder (and/or complementary remainder) donation. Frequently, though not necessarily, the projected donation date will be near the expiration of the estate for years (and/or augmented estate for years) term.

Input Data 215 receives the AAA g.o. curve projected for the date of the donation, and Input Data 216 receives the corresponding risk premium curve projected for that date. Block 218 selects the appropriate AAA base rate and risk premium based on the average life of the remainder (and/or complementary remainder) at the projected time of the remainder (and/or complementary remainder) donation, and sums these two rates to obtain the projected discount rate needed to compute the projected present value of the remainder (and/or complementary remainder) at the time it is donated.

Block 224 computes the projected value of the remainder (and/or complementary remainder) at the projected donation date; using this value, Block 222 computes the average life, half life, and duration for the remainder (and/or complementary remainder) at the projected donation date. Using the remainder (and/or complementary remainder) purchase price computed earlier, Block 230 computes the projected growth rate in the remainder (and/or complementary remainder) value between the remainder (and/or complementary remainder) purchase date and the remainder (and/or complementary remainder) donation date.

Using a projected donor tax rate schedule received by Input Data 228, Block 228 computes the projected value of the donor tax saving generated for the remainder (and/or complementary remainder) investor by the remainder (and/or complementary remainder) donation.

Block 232 computes the rate of return for the remainder (and/or complementary remainder) purchaser from an investment equal in value to the remainder (and/or complementary remainder) purchase price on the component separation date that generates a return equal in value to the projected value of the donor tax saving at the remainder (and/or complementary remainder) donation date.

Finally, under the additional assumption that the tax-exempt portfolio held by the partnership is a financial obligation of the intended recipient of the remainder (and/or complementary remainder) donation, Block 234 subtracts the remainder (and/or complementary remainder) cash flows after the projected donation date from the tax-exempt portfolio cash flows and recomputes the cost of debt capital on the tax-exempt portfolio based on the remaining cash flows and the initial value of the tax-exempt portfolio. This is an additional piece of financial information to aid the remainder (and/or complementary remainder) purchaser in gauging the effectiveness of a prospective remainder (and/or complementary remainder) donation under the assumption that the intended donation recipient is the original issuer of the tax-exempt portfolio; in this case, Block 234 measures the reduction in the cost of capital for the fixed-income debt obligations in the partnership portfolio due to the cancellation of the portion of the debt represented by the remainder (and/or complementary remainder) component.

E. Interrelated Computer Systems

That aspect of the invention illustrated with respect to FIG. 2, etc., can function in cooperation with other computer systems respectively in different institutions involved in the decomposition. One or both component buyers preferably employ a digital electrical Computer System 243, comprised of a processor in a computer, input means, output means, and logic means, such as preferably a computer program. Computer System 243 in FIG. 6 is programmed to receive and store cash flow and tax deduction schedules provided to the component buyer, or at least some of the Output 24 of System 2. This data can be communicated electronically or by manually entering the data from hard copy produced by System 2 into Computer System 243 by a keyboard. The Computer System 243 is programmed to: (1) compute and/or recompute taxes, (2) complete and/or generate required annual and/or interim tax filing schedules, and/or (3) generate investment portfolio and income accounting reports required by regulatory agencies on a periodic basis from regulated institutional investors. This can include generation of an accounting income and valuation schedule to value an equity interest in a component and income therefrom for accounting purposes between the purchase date of the equity interest and the end of the estate for years (and/or augmented estate for years) term or beyond, based on generally accepted accounting principles, and can include insertion of the income and valuation schedule or portions thereof in investment portfolio and income accounting reporting and documentation. Parameters for this programming are straightforward: the tax code and accounting standards of the regulator(s).

More particularly, this can be characterized as providing a second digital electrical computer controlled by a processor, the processor being controlled by logic means for receiving and storing in memory accessible by the computer electrical signals representing cash flow and tax deduction schedules provided to a component buyer. The logic means is also for manipulating the electrical signals representing cash flow and tax deduction schedules to produce altered electrical signals corresponding to at least one of the group consisting of (1) computing the tax, (2) generating a tax filing schedule, and (3) generating documentation at an output means electrically connected to said second computer.

Computer System 244 has hardware and logic means analogous to Computer System 243, except that the computer system is programmed particularly to examine a different tax and/or investment scenario than that used in the decomposition conducted in accordance with System 2 for at least one of the components, e.g., a tax scenario under a different interpretation of the tax code or a change in the tax code. Computer System 244 is programmed to generate a tax schedule from input data representing: (1) a breakdown of the cash payment schedule into schedules of interest/income payments and return of principal payments, (2) the security purchase price, and—in the case of estate for years (and/or augmented estate for years) securities—(3) the estate for years (and/or augmented estate for years) term. This input data includes at least some of the output 24. The Computer System 244 in FIG. 6 can also be programmed to format the schedule of tax deductions for transmittal to other computer systems, and to store and transmit this schedule in exactly the same way that System 2 does.

Computer System 244 thus can be programmed to compute: (1) independent verification of the tax deduction schedules furnished to purchasers by sellers, and/or (2) a sensitivity analysis of the effect of future modifications in the tax code on the tax deduction schedule generated by the security and/or the effect of these modifications on the present value of the aftertax cash flows.

More particularly, the Computer System 244 can be characterized as providing a second digital electrical computer controlled by third logic means controlling a second processor in manipulating other digital electrical signals representing next input data to the second computer, the next input data characterizing at least one of the at least two components decomposed from the property, the manipulating by the second processor including transforming the other digital electrical signals into other modified digital electrical signals representing a respective value for the at least one of the two components, the respective value being computed to reflect taxation for the components under a second tax and/or investment scenario. Additionally involved is providing second input means electrically connected to the second computer converting the next input data into the other digital electrical signals, and communicating the corresponding other digital electrical signals to the second computer; and providing second output means electrically connected to the second computer for receiving the other modified digital electrical signals from the second computer, and converting the other modified digital electrical signals representing the respective value into a printed document.

Computer System 244 usually computes output values, for example, component prices and expected returns for a specific set of input parameter values at the time property decomposition into components occurs. Computer System 244 can also be programmed to perform risk analysis for the output parameters, e.g., by Monte Carlo analysis, for example, for the expected remainder (and/or complementary remainder) annual return.

More particularly, an example of a risk analysis input (e.g., in the case of expected remainder (and/or complementary remainder) annual return) is a probability distribution for the expected property value at a future time (e.g., at the end of the estate for years (and/or augmented estate for years) term) and a set of values for the other input parameters for the embodiment. Computer System 244 can be programmed to generate random samples from the probability distribution for expected future property value, and each random sample for the expected future property value can be combined with the fixed values for the other input parameters and processed to generate a set of output values, including a value for expected annual remainder (and/or complementary remainder) return. By generating repeated random samples of the multiple future property value (e.g., normally at least one thousand, and usually at least ten thousand), Computer System 244 generates a probability distribution for the expected annual remainder (and/or complementary remainder) return and can compute investment risk parameters for the expected annual remainder (and/or complementary remainder) return from the distribution, for example, standard deviation, skewness, and kurtosis.

In cases involving further decomposition of the remainder (and/or complementary remainder) component into a preferred interest and a residual interest, Computer System 244 also generates a probability distribution for the expected annual residual return and can compute investment risk parameters for the expected annual residual return from the distribution, for example, standard deviation, skewness, and kurtosis.

For the case of support for a decision about a commitment to component decomposition significantly in advance of the expected date for the component decomposition or in advance of the expected date for at least one component purchase, Computer System 144 can compute the probability that the decomposition of property into components and the at least one component purchase will become uneconomical due to changes in the values of input parameters between the date of the analysis and the expected date of component separation.

More particularly, in this case, an example of an additional input for a Computer System 244 risk analysis is a probability distribution for at least one input parameter, for example, a multivariate probability distribution for the following group of input parameters: the yield curve, the risk premium curve for the estate for years (and/or augmented estate for years) component, the risk premium curve for the preferred interest (in cases wherein there is or will be a preferred interest), and the future property value that will be expected at the time of component decomposition. An example of an additional input value for Computer System 244 in this case is at least one of the following: a value for the minimum required annual return for remainder (and/or complementary remainder) interest investor(s), a value for the minimum required annual return for residual interest investor(s), and a value for the minimum required annual return for estate for years (and/or augmented estate for years) interest investor(s). Computer System 244 generates a multivariate distribution for the output parameters, from which it can compute a risk analysis of the financial success or failure of the transaction. For example, Computer System 244 can compute at least one of the values for the following risk parameters: the probability that the sum of the estate for years purchase price and the remainder interest purchase price (and/or the sum of the augmented estate for years purchase price and the complementary remainder interest purchase price) will not be sufficient to cover the sale price of the property together with associated expenses such as real estate brokerage commissions and the cost of component decomposition, the expected magnitude of the deficit, the expected magnitude of the deficit given that a deficit does occur, and the below-target semivariance of the deficit.

Computer System 246 is again structurally analogous to that of Computer System 243, with the digital electrical computer being controlled in its signal processing by a processor, etc. However, Computer System 246 can be used by an insurance company, for example, in computing premiums for writing insurance against the savings that accrue to the component purchaser from tax deductions generated by the component. Computing insurance premiums for a given event is a well explored discipline, though in the present case, it would reflect sensitivity analyses of the effect of tax code modifications too. Thus, the invention discussed with respect to FIG. 2 can be employed in combination with software for determining insurance premiums. Because tax deductions are default free, there is no credit risk associated with these deductions that might be reduced by insurance. However, insurance can be written against legislative risk that results from potential (future) changes in the tax law, such as: (1) changes in tax brackets and rates that inversely affect the value of tax deductions generated by the security, and (2) modifications of tax code regulations regarding availability and/or scheduling of tax deductions.

More particularly, Computer System 246 can be characterized as providing a second digital electrical computer controlled by third logic means controlling a second processor in manipulating other digital electrical signals representing next input data to the second computer, the next input data characterizing at least one of the two components decomposed from the property, the manipulating by the second processor including transforming the other digital electrical signals into other modified digital electrical signals representing a respective value under a second tax scenario for the at least one of the two components, the manipulating by the second processor also including transforming the other digital electrical signals into still other modified digital electrical signals representing an insurance premium for insurance against the second tax scenario. Additionally involved is providing second input means electrically connected to the second computer converting the next input data into the other digital electrical signals, and communicating the corresponding other digital electrical signals to the second computer; and providing second output means electrically connected to the second computer for receiving the still other modified digital electrical signals from the second computer, and converting the still other modified digital electrical signals representing the insurance premium into a printed document.

Computer System 246 can also be used by an insurance company in computing premiums for writing insurance against an economic risk in a component. For the case of an estate for years (and/or augmented estate for years) component, this can include insurance to protect the estate for years (and/or augmented estate for years) holder against any property-related risk that might otherwise be assumed by purchase of the estate for years (and/or augmented estate for years) component in cases wherein the existing leases are not bondable net. Insurance for the estate for years (and/or augmented estate for years) component can also include credit enhancement insurance to raise the credit rating of the estate for years (and/or augmented estate for years) component to investment grade in cases wherein one or more existing lessees for the property have below-investment-grade credit ratings. For the case of a remainder (and/or complementary remainder) component, this can include residual value insurance, which sets a minimum target valuation for the property and insures the remainder (and/or complementary remainder) interest holder against the risk that the property value will be below the target valuation when the remainder (and/or complementary remainder) interest matures into ownership of the property.

In the case of residual value insurance for remainders (and/or complementary remainders), such policies have been discussed in recent years for conventional real estate ownership. However, in this case they suffer from the defect that the insurer has a subordinate claim on the real estate to any mortgage lender. Thus the insurer can suffer huge losses if tenants default and the mortgage lender forecloses because of temporary cash flow deficiencies, events which have nothing to do with the underlying economics of the real estate. By contrast, residual value insurance on the remainder (and/or complementary remainder) provides the insurer with an unsubordinated claim on the real estate. This is the rationale for the innovation of residual value insurance for remainders (and/or complementary remainders).

Computer System 248 in FIG. 6 is again structurally analogous to that of Computer System 244, except it is programmed, to: (1) receive market-based interest rate inputs, (2) compute the current market-based yield/discount rate for the component, (3) determine the current market/based price of the component by computing the sum of the present values of expected aftertax future cash flows and future purchaser tax savings from tax deductions generated by the component.

Computer System 248 is adapted to provide analytic support for purchasers who might need to sell or resell the component security at some time prior to the maturity date of the security. Thus, making use of logic such as that in FIG. 2, Computer System 248 is programmed to price the security for resale and to compute the schedule of tax deductions generated by the security for the subsequent owner if a resale effort is successful.

More particularly, Computer System 248 can be characterized as providing a second digital electrical computer controlled by third logic means controlling a second processor in manipulating other digital electrical signals representing next input data to the second computer, the next input data characterizing at least one of the two components decomposed from the property, the manipulating by the second processor including transforming the other digital electrical signals into other modified digital electrical signals representing a respective value under a tax scenario for the at least one of the two components, the manipulating by the second processor also including computing current market-based yield/discount rate for the at least one component, and determining a market/based price of the at least one component by computing a sum of present values of expected aftertax future cash flows and future purchaser tax savings from tax deductions generated by the at least one component. Additionally involved is providing second input means electrically connected to the second computer converting the next input data into the other digital electrical signals, and communicating the corresponding other digital electrical signals to the second computer; and providing second output means electrically connected to the second computer for receiving the other modified digital electrical signals from the second computer, and converting the other modified digital electrical signals into an illustration of data corresponding to the other modified electrical signals.

As with any of the above-referenced computer systems and methods for making or using them, the invention extends to any kind of property, including a portfolio of at least one tax-exempt fixed income security. Further, the tax may be computed in different ways, including with an accelerated deduction for at least one of the components, as well as taxation under different interpretations of the existing tax code, or under a changed tax code altogether, without at all departing from the spirit of the invention of the computer system and methods related to electrical signal processing.

CONCLUSION

While a particular embodiment of the present invention has been disclosed, it is to be understood that various different modifications are possible and are within the true spirit of the invention, the scope of which is to be determined with reference to the claims set forth below. Of course, the invention can be carried out by using multiple computers or by using the same computer to handle operations sequentially, as would be equivalent under the circumstances-software embodiments being equivalent to hardwired embodiments, as is well known in the art. There is no intention, therefore, to limit the invention to the exact disclosure presented herein as a teaching of one embodiment of the invention.

09106014.053198

SPECIMEN 1

SCREEN 1

ESTATE FOR YEARS/REMAINDER (AND/OR AUGMENTED ESTATE FOR YEARS/ COMPLEMENTARY REMAINDER) INPUT PARAMETERS

| | |
|---|---|
| PROPERTY VALUATION: | $28,000,000 |
| TREASURY BOND YIELD BASIS: | 5.40% |
| (AVERAGE LIFE = 5.66) | |
| RENTAL INCOME RISK PREMIUM: | 1.50% |
| ESTATE FOR YEARS TAX RATE: | 40.00% |
| COMPONENT SEPARATION COSTS/FEES: | $800,000 |
| RENTABLE SQUARE FOOTAGE: | 280,940 |
| ZERO-COUPON RISK-FREE RATE: | 10.00% |
| WRAP INSURANCE COST: | 3.00% |
| FUTURE REMAINDER VALUE: | 100.00% |
| INITIAL ANNUAL RENT: | $ 3,080,000 |
| TERM (MONTHS): | 60 |
| SECOND ANNUAL RENT: | $ 3,388,000 |
| TERM (MONTHS): | 60 |
| THIRD ANNUAL RENT: | $0 |
| TERM (MONTHS): | 0 |
| FOURTH ANNUAL RENT: | $0 |
| TERM (MONTHS): | 0 |
| FIFTH ANNUAL RENT: | $0 |
| TERM (MONTHS): | 0 |
| SIXTH ANNUAL RENT: | $0 |
| TERM (MONTHS): | 0 |
| SEVENTH ANNUAL RENT: | $0 |
| TERM (MONTHS): | 0 |
| EIGHTH ANNUAL RENT: | $0 |

| | |
|---|---|
| TERM (MONTHS): | 0 |
| NINTH ANNUAL RENT: | $0 |
| TERM (MONTHS): | 0 |
| TENTH ANNUAL RENT: | $0 |
| TERM (MONTHS): | 0 |

SPECIMEN 1

SCREEN 2

ESTATE FOR YEARS/REMAINDER (AND/OR AUGMENTED ESTATE FOR YEARS/COMPLEMENTARY REMAINDER) OUTPUT PARAMETERS

| | |
|---|---|
| ESTATE FOR YEARS PURCHASE PRICE: | $22,560,530 |
| ESTATE FOR YEARS TERM (MONTHS): | 120 |
| ESTATE FOR YEARS YIELD RATE: | 6.90% |
| AFTERTAX BOND YIELD RATE: | 4.14% |
| AFTERTAX ESTATE FOR YEARS YIELD: | 4.34% |
| PRETAX BOND EQUIVALENT | |
| ESTATE FOR YEARS YIELD: | 7.23% |
| BOND EQUIVALENT ESTATE FOR YEARS VALUE: | $22,772,597 |
| INITIAL RENT/SQUARE FOOT: | $10.96 |
| REMAINDER PURCHASE PRICE: | $6,239,470 |
| GROSS PROPERTY SALE PRICE: | $28,800,000 |
| ANNUAL REMAINDER RETURN: | 16.20% |
| REMAINDER PRICE/SQUARE FOOT: | $22.21 |
| REMAINDER PRICE/SQ.FT. AT | |
| ESTATE FOR YEARS MATURITY: | $57.61 |
| CURRENT PRICE/SQ.FT. | |
| NET TO SELLER : | $99.67 |
| INITIAL CAP RATE = | 11.00% |

09145341.090198

SPECIMEN 1

SCREEN 3

ADDITIONAL OUTPUT PARAMETERS

| | |
|---|---|
| PRESENT VALUE OF ENHANCEMENT: | 15.93% |
| PV OF ENHANCEMENT: (DOLLARS) | $4,460,877 |

SPECIMEN 1

SCREEN 4

ADDITIONAL INPUT PARAMETERS

| | |
|---|---|
| INSURED MINIMUM PROPERTY VALUE: | 50.00% |
| RESIDUAL VALUE INSURANCE PREMIUM FEE: | $1,000,000 |
| ADDITIONAL ASSOCIATED FEES: | $100,000 |
| TREASURY BOND YIELD BASIS: | 6.00% |
| INSURER CREDIT RISK PREMIUM: | 1.50% |
| LIQUIDATION/REFINANCING FEES: | 1.00% |
| EXTRA MONTHS TO RETIRE PREFERRED: | 0 |

ADDITIONAL OUTPUT PARAMETERS

| | |
|---|---|
| PREFERRED INTEREST ANNUAL RETURN: | 7.50% |
| PREFERRED INTEREST PURCHASE PRICE: | $6,792,715 |
| RESIDUAL INTEREST PURCHASE PRICE: | $546,755 |
| RESIDUAL INTEREST ANNUAL RETURN: | 38.02% |
| REMAINDER-TO-RESIDUAL RATIO: | 11.41 |

09104534.010198

| | |
|---|---|
| RESIDUAL LEVERAGE RATIO: | 5.59 |
| INSURED VALUE/SQUARE FOOT: | $49.83 |

SPECIMEN 2

SCREEN 1

ESTATE FOR YEARS/REMAINDER (AND/OR AUGMENTED ESTATE FOR YEARS/COMPLEMENTARY REMAINDER) INPUT PARAMETERS

| | |
|---|---|
| TAX-EXEMPT AAA G.O. BOND BASE: | 5.90% |
| (AVERAGE LIFE = 8.81) | |
| ORIGINAL SECURITY RISK PREMIUM: | 1.00% |
| AAA G.O. ESTATE FOR YEARS BASE: | 5.70% |
| (AVERAGE LIFE = 5.66) | |
| ESTATE FOR YEARS RISK PREMIUM: | 1.10% |
| AAA G.O. REMAINDER BASE: | 6.00% |
| (AVERAGE LIFE = 12.72) | |
| REMAINDER RISK PREMIUM: | 1.00% |
| TREASURY (TAXABLE) REMAINDER BASE: | 8.00% |
| (AVERAGE LIFE = 12.73) | |
| REMAINDER (TAXABLE) RISK PREMIUM: | 1.00% |
| ESTATE FOR YEARS TAX RATE: | 40.00% |
| REMAINDER INTEREST TAX RATE: | 40.00% |
| ESTATE FOR YEARS TERM (YEARS): | 10.00 |
| ORIGINAL SECURITY TERM (YEARS): | 15.00 |
| AMORTIZATION TERM (YEARS): | 15.00 |
| ESTATE FOR YEARS GIC RATE: | 4.00% |
| GENERAL PARTNER SHARE: | 1.00% |
| UNDERWRITER FEE: | 0.00% |

SPECIMEN 2

SCREEN 2

09071698 .091501

ESTATE FOR YEARS/REMAINDER (AUGMENTED ESTATE FOR YEARS/COMPLEMENTARY REMAINDER) OUTPUT PARAMETERS

| | |
|---|---|
| ORIGINAL SECURITY ANNUALIZED YIELD: | 6.90% |
| ESTATE FOR YEARS CASH-ON-CASH YIELD: | 4.21% |
| (CASH FLOW AV. LIFE = 5.60) | |
| ESTATE FOR YEARS YIELD: | 6.80% |
| REMAINDER YIELD AS TAX-EXEMPT: | 7.00% |
| (PRETAX YIELD = 8.66%) | |
| REMAINDER YIELD AS TAXABLE BOND: | 9.00% |
| ORIGINAL SECURITY DEBT SERVICE: | 10.72% |
| THE REMAINDER VALUE IS HIGHER IF IT IS MARKETED AS A TAX-EXEMPT BOND. | |
| ESTATE FOR YEARS PRICE: | 86.59% |
| REMAINDER PRICE AS TAX-EXEMPT: | 18.12% |
| REMAINDER PRICE AS TAXABLE BOND: | 17.38% |
| SUM OF COMPONENT PRICES: | 104.71% |
| PROFIT (INCL. G.P.SHARE+FEE): | 5.71% |

09015341.090198

SPECIMEN 2

SCREEN 3

TRANSACTION DOLLAR AMOUNTS

PRINCIPAL VALUE = $50,000,000

ANNUAL DEBT SERVICE = $5,359,481

ESTATE FOR YEARS PURCHASE PRICE = $43,297,056

REMAINDER PURCHASE PRICE = $9,060,219

SPECIMEN 2

SCREEN 4

REMAINDER DONATION ANALYSIS

INPUT PARAMETERS

| | |
|---|---|
| PROJECTED AAA G.O. REMAINDER BASE AT ESTATE FOR YEARS MATURITY: (AVERAGE LIFE = 2.68) | 5.75% |
| REMAINDER RISK PREMIUM AT MATURITY: | 1.00% |
| REMAINDER DONOR TAX RATE: | 40.00% |
| ADDITIONAL COST TO BORROWER: | 0.00% |

OUTPUT PARAMETERS

| | |
|---|---|
| PROJECTED REMAINDER YIELD AT ESTATE FOR YEARS MATURITY: | 6.75% |
| PROJECTED REMAINDER VALUE AT ESTATE FOR YEARS MATURITY: | 44.93% |
| PROJECTED DONOR TAX SAVING AT ESTATE FOR YEARS MATURITY: | 17.97% |
| PROJECTED DONOR GIFT GROWTH RATE THROUGH ESTATE FOR YEARS TERM: | 9.50% |
| PROJECTED AFTERTAX DONOR ANNUAL RETURN: | -0.08% |
| IMPLIED DONATION RECIPIENT COST OF BORROWED CAPITAL: | 1.48% |

PROJECTED $$ DONOR TAX DEDUCTION AT ESTATE FOR YEARS MATURITY = $22,463,386

PROJECTED $$ DONOR TAX SAVING = $8,985,354

SPECIMEN 3

SUMMARY OF TERMS

THE ESTATE FOR YEARS COMPONENT SECURITY

For Real Estate To Be Occupied By

Anonymous Mortgage Company At Typical Industrial Park

Anytown, Illinois

DESCRIPTION OF SECURITY:

The security, henceforth known as the "Security," is the sole beneficial interest in a grantor trust that will be established to hold the deed to an estate for years in the land and improvements described in Exhibit A, henceforth known as the "Premises." The estate for years will be created as part of a transaction in which fee simple ownership of the Premises will change hands, the estate for years to be acquired by the trust and the remainder interest to be acquired by a legally separate entity.

The Premises have been fully (100%) pre-leased on a triple-net basis to a single tenant for an initial term of approximately ten years. The lease is uncancellable during the initial term except as described below. The Security entitles the holder to receive Base Rent from the lease on the Premises during the initial lease term, and to re-lease the Premises subject to specified restrictions in the event of premature lease cancellation.

The Security has similar investment characteristics to an asset-backed bond: a debt-like obligation with the right to legal recourse to compel Tenant performance absent Tenant bankruptcy; and in Tenant bankruptcy, a senior claim to repossess the asset (term occupancy of the Premises) that secures the debt-like obligation if the Tenant repudiates the obligation. The general rental agreement formalizes financial restrictions, offering sufficient security for classification of the Security as a fixed-income investment for regulatory purposes.

DESCRIPTION OF SECURITY TERM:

Expiration of the estate for years term will coincide with expiration of the initial lease term. The period from acquisition of the estate for years by the grantor trust 09713544.010598 to expiration of the initial lease term will henceforth be known as the "Term."

Covenants in the estate for years deed and the remainder interest deed will provide for claims of the estate for years beneficiary incurred during the Term to survive the Term expiration. The grantor trust indenture will provide for continuation of the trust until all such claims are resolved.

DESCRIPTION OF SECURITY LEASE:

The Tenant is Anonymous Mortgage Company, a wholly-owned affiliate of Anonymous Conglomerate Corporation. The lease is tentatively scheduled to begin on 15 October 1992, and will expire on the last day of the calendar month that contains the tenth anniversary of the Commencement Eve Date, where the Commencement Eve Date is the day immediately prior to the commencement of the lease term.

DESCRIPTION OF SECURITY CASH FLOWS:

Security cash flows consist of Base Rent from the Anonymous Mortgage lease. Annual Base Rent is determined by multiplying the annual base rent per square foot by the building net square footage. Initial annual Base Rent per square foot is $11.00. The preliminary estimate of net square footage is 100,000 feet, implying an estimated initial Annual Base rent of $1,100,000.

The building net square footage, and hence the initial net rent, will be finalized for the Term as described in Lease Section 3.02 within ten days of the Lease Commencement date.

Annual Base Rent per square foot in subsequent lease years is determined by increasing the base rent per square foot in the preceding year by three percent (3%) and rounding the resulting value off to the nearest cent ($0.01).

Base Rent is due in equal monthly installments at the beginning of each month.

Prepayment:

Security cash flows cannot be reduced by prepayment.

Tax Shields:

From a legal perspective the Security is an income-producing asset, so tax treatment of Security cash flows differs from tax treatment of cash flows generated by debt securities.

Tax deductions generated by the Security arise from amortization of a wasting asset purchase price rather than from the separation of cash flows into taxable and tax-exempt (i.e. interest and principal) components. Since Security deductions are generated by asset characteristics rather than by cash flow receipts, Security tax deductions are independent of cash flows. Consequently, whereas the credit risk of Security cash flows is determined by the credit risk of Anonymous Mortgage, Security tax deductions are default free.

The Security holder is entitled to an annual amortization deduction on the estate for years. The annual deduction is computed by multiplying the Security tax basis by the following ratio: the number of days during the tax year that the grantor trust held the estate for years divided by the number of days remaining in the estate for years on the first day of the tax year that the grantor trust held title.

Amortization deductions are classified for tax reporting purposes as passive deductions, and are subject to the restrictions of the Internal Revenue Code on the use of such deductions to offset taxes on income. These restrictions vary with the tax status and classification of the beneficiary.

DEFINITION OF DEFAULT:

Any of the following events constitutes a default under the Security lease: failure by Tenant to pay monthly Rent when due, together with failure to pay within ten (10) days after Landlord serves Tenant with written notice of past due Rent; failure by Tenant to perform or observe any other provision of the lease, provided that such failure continues for more than ten (10) days after Landlord gives Tenant written notice of such failure or, if the failure cannot be corrected within the ten (10) day period, provided that Tenant does not commence to correct the failure within the ten (10) day period and thereafter pursue the correction through to completion within a reasonable time, and in any case prior to such time as failure to complete the correction could result in violation of any law, rule, or ordinance; failure by Tenant to pay monthly Rent on time more than three (3) times during any twelve (12) month period, or failure by Tenant to perform or observe any other provision of the lease more than three (3) times during any twelve (12) month period; performance by Tenant of any act that results in the creation of a lien upon the Premises and fails to discharge the lien or post bond for the lien with Landlord as required by Lease Article XX; any attempt by Tenant to make an unpermitted assignment or sublease; failure by Tenant to maintain in force all insurance policies required by the lease, and such failure continues for more than ten (10) days after Landlord gives Tenant written notice of such failure; the filing of a petition against Tenant or any guarantor of the lease under any section of the Bankruptcy Code (and in the case of an involuntary proceeding, the filing is not permanently discharged or vacated within sixty (60) days); if Tenant or any guarantor of the lease becomes insolvent or makes a transfer in fraud of creditors or makes an assignment for the benefit of creditors; a court-authorized appointment of a receiver, custodian, or trustee for substantially all Tenant assets or all assets of or any guarantor of the lease is made and not subsequently vacated within sixty (60) days of the initial appointment date; the cumulative transfer of more than 50% interest in Anonymous Mortgage that results in Anonymous retaining less than a 50% interest Anonymous Mortgage.

DEFAULT RECOURSE:

Security Lease Provisions:

In event of default, Landlord has the right to enter and take possession of the Premises and if Landlord elects, at Tenant's expense release the Premises and/or repair any damage for which Tenant is responsible. In the event that Landlord relets the Premises: Tenant is liable for all costs associated with the default and with recovery of the Premises; all accumulated Rent up to the time the Anonymous Mortgage lease is terminated; costs associated with preparing the Premises for new tenants; and any deficiency between the present value of rent payable by new tenants over the remaining Term and the present value of Anonymous Mortgage rent contracted in the current lease. The deficiency between the present value of total rent payable by the new tenant(s) and contracted total rent in the Anonymous Mortgage lease can be calculated either: before the new lease(s) are signed, on the basis of expected market rent; after the new lease(s) are signed, on the basis of actual rent specified in the new lease(s).

Letter of Credit:

For the duration of the lease Anonymous or a successor Anonymous-affiliated parent of Anonymous Mortgage agrees to provide a one-time two million dollar ($2,000,000) irrevocable letter of credit within two (2) business days of receipt of written notification from Landlord of any one of the following events: Tenant default under the lease that remains uncured for twenty (20) days after written notification to Anonymous Real Estate and which, in the case of nonmonetary default, Tenant has not commenced or has not diligently pursued to cure; a decline in Tenant net worth, as calculated annually, of either more than five percent (5%) of total Tenant assets or below twenty-five million dollars, which continues without correction for ten (10) business days after the determination of the decline. The letter of credit must be issued by a nationally recognized institution with sufficient funds available to fund such a credit instrument at the time of issuance.

In the event that Anonymous Real Estate or its successor Anonymous-affiliated parent fails to provide the agreed-upon letter of credit as required, Anonymous agrees to provide the letter of credit within ten (10) business days of written notification from Landlord of nonperformance of the first-specified provider.

In event of Tenant default(s), Landlord can draw cumulatively against the credit line provided by the letter up to the lesser of the default amount and the remaining balance of the credit line. If Tenant default results in lease termination, the entire remaining balance on the letter of credit will be available immediately to the Landlord.

In event of a Tenant default resulting in lease termination prior to the end of the Term, then effective as of the termination date, the amount deemed due and owing to Landlord pursuant to the Letter of Credit agreement shall be the amount due and owing to Landlord pursuant to the lease remedies provisions.

In event that the scheduled letter of credit expiration date is earlier than the end of the Term, Landlord is entitled to draw upon the full outstanding balance of the credit line unless the letter is renewed at least thirty (30) days prior to scheduled expiration for an amount equal to the remaining outstanding balance.

INTERRUPTION OF CASH FLOWS:

Condemnation:

If the entire Premises is acquired or condemned by eminent domain, the lease terminates as of the date the condemning authority takes possession, and total Rent due is adjusted to that date.

If partial condemnation results in the loss by Landlord of at least five percent (5%) of the Building or ten percent (10%) of parking for the Building, then Tenant may elect to terminate the lease within thirty (30) days of final determination of the extent of the loss, termination to occur as of the date the condemning authority takes possession, with total Rent due is adjusted to that date.

If Tenant has the option to terminate the lease but fails to exercise the option, then Landlord shall promptly restore the remaining Premises to a condition comparable to its condition immediately prior to condemnation and the lease shall continue as prior to the condemnation, except that after the effective date of condemnation the Rent shall be reduced as reasonably determined by Landlord if such reduction is reasonably warranted. Tenant waives any right or claim to any part of a compensatory award from the condemning authority to Landlord, and waives any claim against Landlord due to the condemnation.

In any action of eminent domain involving the Premises, the grantor trust and the remainder interest holder make separate compensation claims against the condemning authority. The estate for years deed and the remainder interest deed will disallow condemnation claims of the deed holders against each other.

Damage and Destruction:

The Security holder shall carry rent business interruption insurance applicable to the Premises sufficient to cover Base Rent payments plus all related taxes and operating expenses for a period of 300 days. The cost of business interruption insurance will be reimbursed by the Tenant, including all related appraisal and consulting fees.

If the Building or any portion thereof is damaged or destroyed to such an extent that it cannot be repaired within two hundred seventy days of the event, then the Tenant has the right to terminate the lease by giving the Landlord written notice within the later of (i) thirty (30) days after the event or (ii) five (5) business days after determination that the damage or destruction cannot be repaired within 270 days. The Landlord would continue to receive Base Rent for the period covered by business interruption insurance, and would have the right to relet the Premises after restoration for the remainder of the Term.

In event of destruction or damage to the Building which does not result in lease termination but which renders the Building wholly or partially untenantable, Base Rent shall be abated in proportion to the area so rendered until restoration is completed. However, the Landlord would continue to receive the abated portion of Base Rent plus operating expenses while restoration is under way due to business interruption insurance, unless restoration took longer than 300 days.

If the Building or any portion thereof is destroyed by fire or other cause during the last two (2) years of the lease term, then Tenant shall have the right to terminate the lease by giving written notice to the Landlord within sixty (60) days of the destruction. In this case, the Landlord would continue to receive Base Rent plus taxes and operating expenses from business interruption insurance for 300 days.

PRESERVATION OF ASSET THAT SECURES CASH FLOWS:

Grantor Trust:

The grantor trust indenture will charge the trustee with preventing the Security holder from imposing any lien whatsoever on the Premises, with removing any liens imposed by other entities that the Security holder does not promptly seek to remove by all legal means available, and otherwise with passing tenant rent through to the Security holder. Otherwise, ultimate responsibility for Landlord decisions concerning property management, maintenance, insurance and taxes will remain with the Security holder during the Term, although under the Anonymous Mortgage lease the Tenant will assume full responsibility for performance in these areas as prescribed in the lease, together with responsibility for direct payment of all costs associated with performance. The trust indenture assigns the Security holder the general responsibilities accorded

09145341 .090198 financial fiduciaries, reserving other specified services to the trustee as appropriate.

During the final Term year, the Security holder and Anonymous Mortgage are responsible only for management and maintenance costs incurred prior to Term expiration, and only for a pro rata share of tax and insurance expenses based on the ratio of the number of days during the year that fall within the estate for years to the total number of days in the year.

Management and Maintenance:

Anonymous Mortgage assumes full and sole responsibility for the condition, operation, repair, replacement, management and maintenance of the Premises and all improvements thereon. At its own expense, Anonymous Mortgage Company will keep the Premises both clean and in good order and operating condition, and make all necessary repairs (both structural and nonstructural, interior and exterior, ordinary and extraordinary, foreseen and unforeseen, of every nature, kind and description, including parking areas, driveways, sidewalks, landscaping and roadways).

Anonymous Mortgage will maintain, at its own expense, service contracts satisfactory to the Landlord for the following: (i) maintenance for HVAC systems, roof, elevators, landscaping and irrigation, and the parking lot; (ii) fire alarm service; (iii) janitorial service; (iv) security service; (v) snow removal; (vi) exterior window cleaning at least four (4) times per calendar year.

If, after expiration of the sixth (6th) year of the lease term, any capital repairs are required, and such repairs are not required due to (i) the failure of the tenant to perform routine maintenance required by the lease, (ii) tenant negligence, (iii) unusual or excessive tenant use of any system or portion of the Premises, or (iv) any tenant act which voids a warranty that otherwise would reimburse repair costs, then tenant is only required to pay a fraction of the repair cost based on the ratio of the remaining lease term (including exercised options for extension) to the remaining useful life of the item repaired.

Anonymous Mortgage will not make any alterations to the Premises without first obtaining written Landlord consent, which consent shall not be withheld or delayed unreasonably. Landlord may refuse permission for any alterations that are likely to weaken the structure of the Building, which are likely to damage or disrupt the HVAC systems or other major Building systems, or which are visible from the exterior of the Building. All alterations shall be made at Tenant's sole expense, either by Tenant's contractors approved in advance by Landlord or, at Tenant's option, by Landlord on terms reasonable to Tenant, including a fifteen percent (15%) supervisory fee in addition to the net cost of the materials and labor.

Notwithstanding the above, Anonymous Mortgage will pay, in addition to Base Rent, a management fee of one and eight tenths percent (1.8%) of the Base rent for administering the lease and as reimbursement of Landlord expenses for the costs of semiannual maintenance review and other management overhead.

Taxes:

Anonymous Mortgage is responsible for direct payment of all real and personal property-related taxes (except income taxes) as specified in Lease Section 5.01. Tenant will provide Landlord with evidence in the form of official receipts or other acceptable proof that complete payment has been made within thirty (30) days of each assessment due date.

Anonymous Mortgage has the right at its sole expense to contest the validity or amount of any tax, but will first pay the tax under protest.

For taxes and assessments related to the calendar year during which the Term expires, the Security holder is responsible for a pro rata share of taxes and assessments based on the ratio of the number of days during the year that fall within the Term to the total number of days in the year, and the remainder interest holder is responsible for the remaining portion of taxes and assessments. If the lease has not been extended, Anonymous Mortgage is responsible for the portion of taxes attributable to the Security. If the lease has been extended, Anonymous Mortgage is responsible for all property taxes incurred during the calendar year.

Insurance and Indemnification:

Tenant shall obtain and maintain various insurance policies related to the Premises and activities therein. All expenses in connection with Tenant policies shall be the sole responsibility of the Tenant.

09134534.010198

Tenant policies shall include the following: All Risk insurance sufficient to cover the replacement cost of Tenant personal property, Building improvements and alterations; business interruption insurance; comprehensive general public liability insurance with limits of not less than $5,000,000 per occurrence; automobile liability insurance of at least $300,000; Worker's Compensation and Employer's Liability insurance; Tenant's All Risk Legal Liability insurance for the replacement cost of the Premises.

Except for events due to Landlord negligence or willful misconduct, Tenant waives all claims against Landlord and agrees to indemnify and hold Landlord harmless for damage to any property, or injury to or death of any person, on or about the Premises. This includes injury or damage to persons or property resulting from fire, explosion, falling plaster, steam, gas, electricity, water, rain, flood, snow, dampness, or leaks from pipes, appliances, plumbing works, roof, floor or ceiling subsurfaces or from the street.

09145341.060198

Utilities:

During the Term, Anonymous Mortgage is responsible for all deposits and fees in connection with obtaining and maintaining necessary utility services for the Premises, including but not limited to the following: water, sewage, heat, gas, light, garbage, electricity, telephone, steam and power.

Tenant-Incurred Liens:

Anonymous Mortgage warrants to keep the Premises free from any liens arising from any work performed, materials furnished, or obligations incurred by or on behalf of Anonymous Mortgage. If any such lien is attached and not promptly discharged as prescribed in Lease Section 10.01, Landlord has the right to pay the full amount of the lien without inquiry into its validity, and to bill Tenant as Additional Rent for all expenses connected with the lien removal, including interest and attorneys' fees.

Hazardous Materials and Indemnification:

Tenant is restricted to use of the Premises for executive, sales and administrative purposes. For the restrictions on use and/or handling of hazardous and toxic material, see Lease Article XXV.

Tenant shall indemnify, defend and hold Landlord, its beneficiaries, any managing agents and leasing agents of the Premises, and their respective agents, partners, officers, directors and employees harmless from all damages, costs, losses, expenses (including, but not limited to, actual attorney's fees and engineering fees) arising from or attributable to any breach by Tenant or any of its warranties, representations or covenants in Lease Article XXV. Tenant's obligations hereunder shall survive termination of this lease.

Remainder Interest Liens:

During the Term the remainder interest will be held in a grantor trust. Among the primary responsibilities of the remainder interest trustee will be to prevent any liens whatsoever from being attached to the remainder interest fee.

TENANT FINANCIAL REPORTS:

During each year of the Term, on no later than March 1, Anonymous Mortgage shall provide Landlord with a net worth report as of December 31 of the prior calendar year and the preceding year. The report shall be certified by a nationally recognized accounting firm.

At any time during the Term, up to once per fiscal year, Tenant will, upon ten days prior notice from Trustee A, provide the Trustee with a current financial statement and financial statements for the two (2) preceding fiscal years. The statements will be prepared in accordance with Generally Accepted Accounting Principles.

09170601.145340

SPECIMEN 4

SUMMARY OF TERMS

THE REMAINDER EQUITY COMPONENT SECURITY

For Real Estate To Be Occupied By

Anonymous Mortgage Company At Typical Industrial Park

Anytown, Illinois

DESCRIPTION OF SECURITY:

The security, henceforth known as the "Security," is the sole beneficial interest in a land or grantor trust, as will be determined, that will be established to hold the deed to the remainder interest in the land and improvements described in Exhibit A, henceforth known as the "Premises." The remainder interest will be created as part of a transaction in which fee simple ownership of the Premises changes hands and is separated into an estate for years and a remainder interest. The remainder interest will be acquired by the Trust and the estate for years will be acquired by a legally separate trust. The trust indenture will assign the Security holder the general responsibilities accorded financial fiduciaries, reserving other specified services to the trustee as appropriate.

The holder of the estate for years will have the right to all rent paid by tenants for occupancy of the Premises during the estate for years term. Covenants in the estate for years deed and the remainder interest deed will provide for claims by the estate for years holder against tenants incurred during the estate for years term to survive expiration of the estate for years term. All other rights of property ownership after expiration of the estate for years term belong to the Security holder.

The Security has similar investment characteristics to a zero-coupon bond: a remainder interest with a specified term and a balloon payment at maturity, and no cash flows prior to maturity. Unlike a zero-coupon bond, the balloon payment at maturity consists of the fee simple interest in real property rather than a nominal cash payment.

DESCRIPTION OF PROPERTY:

09105014.134511698

The Premises are located in the Typical Industrial Park, a 400 acre master-planned business park under development in Anytown, Illinois. The park is zoned for office and light industrial facilities.

The Building is a two-story, 100,000 square foot build-to-suit office building configured for multitenant occupancy but fully (100%) pre-leased on a triple-net basis to Anonymous Mortgage Company, a wholly-owned affiliate of Anonymous Conglomerate Corporation, for initial term of approximately ten years with options for renewal.

DESCRIPTION OF LEASE TERM:

The Anonymous Mortgage lease is tentatively scheduled to begin on 15 October 1992, and will expire on the last day of the calendar month that contains the tenth anniversary of the Commencement Eve Date, where the Commencement Eve Date is the day immediately prior to the commencement of the lease term. The lease is not cancelable during the initial term except as described below.

The period from acquisition of the remainder interest by the grantor trust to expiration of the initial lease term will henceforth be known as the "Term."

<u>Automatic Lease Extension:</u>

Anonymous Mortgage Company and the developer have entered into an option agreement (Phase II) under which, at the option of Anonymous Mortgage, a second office building may be constructed and leased on a build-to-suit basis to Anonymous Mortgage on property adjacent to the Premises. In the event the option is exercised, the initial lease term will automatically be extended to cause the expiration of the initial lease term to coincide with the expiration of the 10-year Phase II lease. However, in the event of an extension of the initial lease term, the expiration of the Term the Security will remain unchanged. The Phase II option to extend the initial lease term expires on June 1, 1993.

<u>Renewal Options:</u>

Anonymous Mortgage shall have options to extend the lease term for two (2) consecutive five (5) year periods, on the same terms, conditions and provisions as contained in the lease agreement for the initial lease term. The first renewal period shall commence on the day after the expiration date for the initial lease term and shall expire on the fifth (5th) anniversary of the expiration date for the initial lease term. The second renewal period shall commence on the day after the expiration date for the first renewal period and shall expire on the fifth (5th) anniversary of the expiration date for the first renewal period.

Exercise of each renewal option shall be exercised by written notice from Tenant to Landlord of Tenant's election to exercise said option. Written notice must be provided not later than twelve (12) months prior to expiration of the then current lease term.

DESCRIPTION OF RENT:

Total Rent consists of Base Rent from the Anonymous Mortgage lease, plus Additional Rent to cover property management, maintenance, taxes and insurance as described in subsequent sections. Annual Base Rent is determined by multiplying the annual base rent per square foot by the building net square footage. Initial Annual Base Rent per square foot is $11.00. The preliminary estimate of net square footage is 100,000 feet, implying an estimated initial Annual Base rent of $1,100,000.

The building net square footage, and hence the initial net rent, will be finalized for the Term as described in Lease Section 3.02 within ten days of the Lease Commencement Date.

Annual Base Rent per square foot in subsequent years of the initial lease term (including the Phase II extension option) is determined by increasing the base rent per square foot in the preceding year by three percent (3%) and rounding the resulting value off to the nearest cent ($0.01).

During the first year of the first renewal option period, Annual Base Rent shall be the greater of (i) initial Annual Base Rent on the Lease Commencement Date, increased by three percent (3%) per year compounded annually through the first day of the renewal period, and (ii) ninety-five percent (95%) of the fair market rental rate as defined in Lease Section 26.04(a).

In each successive year of the renewal option period, Annual Base Rent shall increase by an amount equal to three percent (3%) of the Annual Base Rent for the preceding year.

During the first year of the second renewal option period, Annual Base Rent shall be the greater of (i) initial Annual Base Rent on the Lease Commencement Date, increased by three percent (3%) per year compounded annually through the first day of the renewal period, and (ii) the fair market rental rate as defined in Lease Section 26.04(a). In each successive year of the renewal option period, Annual Base Rent shall increase by an amount equal to three percent (3%) of the Annual Base Rent for the preceding year.

Base Rent is due in equal monthly installments at the beginning of each month. Additional Rent is paid directly or as described under "Preservation of Property" and "Damage and Destruction."

PRESERVATION OF PROPERTY:

Estate for Years Trust:

The trust indenture for the estate for years will forbid the trustee from imposing any lien whatsoever on the Premises and will charge the trustee with removing any liens imposed by other entities that the trust beneficiary does not promptly seek to remove by all legal means available. Otherwise, ultimate responsibility and discretion regarding Landlord decisions concerning property management, maintenance, insurance and taxes will remain with the estate for years trust during the Term, although under the Anonymous Mortgage lease the Tenant will assume full responsibility for performance in these areas as prescribed in the lease, together with responsibility for direct payment of all costs associated with performance. The trust indenture assigns the estate for years beneficiary the general responsibilities accorded financial fiduciaries, reserving other specified services to the estate for years trustee as appropriate.

During the final Term year, the estate for years trust is responsible only for management and maintenance costs incurred prior to Term expiration, and only for a pro rata share of tax and insurance expenses based on the ratio of the number of days during the year that fall within the estate for years to the total number of days in the

09061598 . 091599 year.

Management and Maintenance:

Anonymous Mortgage assumes full and sole responsibility for the condition, operation, repair, replacement, management and maintenance of the Premises and all improvements thereon. At its own expense, Anonymous Mortgage Company will keep the Premises both clean and in good order and operating condition, and make all necessary repairs (both structural and nonstructural, interior and exterior, ordinary and extraordinary, foreseen and unforeseen, of every nature, kind and description, including parking areas, driveways, sidewalks, landscaping and roadways).

Anonymous Mortgage will maintain, at its own expense, service contracts satisfactory to the Landlord for the following: (i) maintenance for HVAC systems, roof, elevators, landscaping and irrigation, and the parking lot; (ii) fire alarm service; (iii) janitorial service; (iv) security service; (v) snow removal; (vi) exterior window cleaning at least four (4) times per calendar year.

If, after expiration of the sixth (6th) year of the lease term, any capital repairs are required, and such repairs are not required due to (i) the failure of the tenant to perform routine maintenance required by the lease, (ii) tenant negligence, (iii) unusual or excessive tenant use of any system or portion of the Premises, or (iv) any tenant act which voids a warranty that otherwise would reimburse repair costs, then tenant is only required to pay a fraction of the repair cost based on the ratio of the remaining lease term (including exercised options for extension) to the remaining useful life of the item repaired.

Anonymous Mortgage will not make any alterations to the Premises without first obtaining written Landlord consent, which consent shall not be withheld or delayed unreasonably. Landlord may refuse permission for any alterations that are likely to weaken the structure of the Building, which are likely to damage or disrupt the HVAC systems or other major Building systems, or which are visible from the exterior of the Building. All alterations shall be made at Tenant's sole expense, either by Tenant's contractors approved in advance by Landlord or, at Tenant's option, by Landlord on terms reasonable to Tenant, including a fifteen percent (15%) supervisory fee in addition to the net cost of the materials and labor.

Notwithstanding the above, Anonymous Mortgage will pay, in addition to Base Rent, a management fee of one and eight tenths percent (1.8%) of the Base rent for administering the lease and as reimbursement of Landlord expenses for the costs of semiannual maintenance review and other management overhead.

Taxes:

Anonymous Mortgage is responsible for direct payment of all real and personal property-related taxes (except income taxes) as specified in Lease Section 5.01. Tenant will provide Landlord with evidence in the form of official receipts or other acceptable proof that complete payment has been made within thirty (30) days of each assessment due date.

Anonymous Mortgage has the right at its sole expense to contest the validity or amount of any tax, but will first pay the tax under protest.

For taxes and assessments related to the calendar year during which the Term expires, the estate for years trust is responsible for a pro rata share of taxes and assessments based on the ratio of the number of days during the year that fall within the Term to the total number of days in the year, and the Security holder is responsible for the remaining portion of taxes and assessments. If the lease has not been extended, Anonymous Mortgage is responsible for the estate for the portion of taxes attributable to the estate for years. If the lease has been extended, Anonymous Mortgage is responsible for all property taxes incurred during the calendar year.

Insurance and Indemnification:

Tenant shall obtain and maintain various insurance policies related to the Premises and activities therein. All expenses in connection with Tenant policies shall be the sole responsibility of the Tenant.

Tenant policies shall include the following: All Risk insurance sufficient to cover the replacement cost of Tenant personal property, Building improvements and alterations; business interruption insurance; comprehensive general public liability insurance with limits of not less than $5,000,000 per occurrence; automobile liability insurance of at least $300,000; Worker's Compensation and Employer's Liability insurance; Tenant's All Risk Legal Liability insurance for the replacement cost of the Premises.

Except for events due to Landlord negligence or willful misconduct, Tenant waives all claims against Landlord and agrees to indemnify and hold Landlord harmless for damage to any property, or injury to or death of any person, on or about the Premises. This includes injury or damage to persons or property resulting from fire, explosion, falling plaster, steam, gas, electricity, water, rain, flood, snow, dampness, or leaks from pipes, appliances, plumbing works, roof, floor or ceiling subsurfaces or from the street.

Utilities:

During the Term, Anonymous Mortgage is responsible for all deposits and fees in connection with obtaining and maintaining necessary utility services for the Premises, including but not limited to the following: water, sewage, heat, gas, light, garbage, electricity, telephone, steam and power.

Tenant-Incurred Liens:

Anonymous Mortgage warrants to keep the Premises free from any liens arising from any work performed, materials furnished, or obligations incurred by or on behalf of Anonymous Mortgage. If any such lien is attached and not promptly discharged as prescribed in Lease Section 10.01, Landlord has the right to pay the full amount of the lien without inquiry into its validity, and to bill Tenant as Additional Rent for all expenses connected with the lien removal, including interest and attorneys' fees.

Hazardous Materials and Indemnification:

Tenant is restricted to use of the Premises for executive, sales and administrative purposes. For the restrictions on use and/or handling of hazardous and toxic material, see Lease Article XXV.

Tenant shall indemnify, defend and hold Landlord, its beneficiaries, any managing agents and leasing agents of the Premises, and their respective agents, partners, officers, directors and employees harmless from all damages, costs, losses, expenses (including, but not limited to, actual attorney's fees and engineering fees)

arising from or attributable to any breach by Tenant or any of its warranties, representations or covenants in Lease Article XXV. Tenant's obligations hereunder shall survive termination of this lease.

DEFINITION OF TENANT DEFAULT:

Any of the following events constitutes a default under the lease: failure by Tenant to pay monthly Rent when due, together with failure to pay within ten (10) days after Landlord serves Tenant with written notice of past due Rent; failure by Tenant to perform or observe any other provision of the lease, provided that such failure continues for more than ten (10) days after Landlord gives Tenant written notice of such failure or, if the failure cannot be corrected within the ten (10) day period, provided that Tenant does not commence to correct the failure within the ten (10) day period and thereafter pursue the correction through to completion within a reasonable time, and in any case prior to such time as failure to complete the correction could result in violation of any law, rule, or ordinance; failure by Tenant to pay monthly Rent on time more than three (3) times during any twelve (12) month period, or failure by Tenant to perform or observe any other provision of the lease more than three (3) times during any twelve (12) month period; performance by Tenant of any act that results in the creation of a lien upon the Premises and fails to discharge the lien or post bond for the lien with Landlord as required by Lease Article XX; any attempt by Tenant to make an unpermitted assignment or sublease; failure by Tenant to maintain in force all insurance policies required by the lease, and such failure continues for more than ten (10) days after Landlord gives Tenant written notice of such failure; the filing of a petition against Tenant or any guarantor of the lease under any section of the Bankruptcy Code (and in the case of an involuntary proceeding, the filing is not permanently discharged or vacated within sixty (60) days); if Tenant or any guarantor of the lease becomes insolvent or makes a transfer in fraud of creditors or makes an assignment for the benefit of creditors; a court-authorized appointment of a receiver, custodian, or trustee for substantially all Tenant assets or all assets of or any guarantor of the lease is made and not subsequently vacated within sixty (60) days of the initial appointment date; the cumulative transfer of more than 50% interest in Anonymous Mortgage that results in 09145341.090198

Anonymous retaining less than a 50% interest Anonymous Mortgage.

DEFAULT RECOURSE:

In event of default, Landlord has the right to enter and take possession of the Premises and if Landlord elects, at Tenant's expense release the Premises and/or repair any damage for which Tenant is responsible. In the event that Landlord relets the Premises: Tenant is liable for all costs associated with the default and with recovery of the Premises; all accumulated Rent up to the time the Anonymous Mortgage lease is terminated; costs associated with preparing the Premises for new tenants; and any deficiency between the present value of rent payable by new tenants over the remaining Term and the present value of Anonymous Mortgage rent contracted in the current lease. The deficiency between the present value of total rent payable by the new tenant(s) and contracted total rent in the Anonymous Mortgage lease can be calculated either: before the new lease(s) are signed, on the basis of expected market rent; after the new lease(s) are signed, on the basis of actual rent specified in the new lease(s).

INTERRUPTION OF RENT:

Condemnation:

If the entire Premises is acquired or condemned by eminent domain, the lease terminates as of the date the condemning authority takes possession, and total Rent due is adjusted to that date.

If partial condemnation results in the loss by Landlord of at least five percent (5%) of the Building or ten percent (10%) of parking for the Building, then Tenant may elect to terminate the lease within thirty (30) days of final determination of the extent of the loss, termination to occur as of the date the condemning authority takes possession, with total Rent due is adjusted to that date.

If Tenant has the option to terminate the lease but fails to exercise the option, then Landlord shall promptly restore the remaining Premises to a condition comparable to its condition immediately prior to condemnation and the lease shall continue as prior to the condemnation, except that after the effective date of condemnation the Rent shall be reduced as reasonably determined by Landlord if such 09174350.021598 reduction is reasonably warranted.

Tenant waives any right or claim to any part of a compensatory award from the condemning authority to Landlord, and waives any claim against Landlord due to the condemnation.

In any action of eminent domain involving the Premises, the grantor trust and the remainder interest holder make separate compensation claims against the condemning authority.

Damage and Destruction:

The Landlord shall carry rent business interruption insurance applicable to the Premises sufficient to cover Base Rent payments plus all related taxes and operating expenses for a period of 300 days. The cost of business interruption insurance will be reimbursed by the Tenant, including all related appraisal and consulting fees.

If the Building or any portion thereof is damaged or destroyed to such an extent that it cannot be repaired within two hundred seventy days of the event, then the Tenant has the right to terminate the lease by giving the Landlord written notice within the later of (i) thirty (30) days after the event or (ii) five (5) business days after determination that the damage or destruction cannot be repaired within 270 days. The Landlord would continue to receive Base Rent for the period covered by business interruption insurance, and would have the right to relet the Premises after restoration for the remainder of the Term.

In event of destruction or damage to the Building which does not result in lease termination but which renders the Building wholly or partially untenantable, Base Rent shall be abated in proportion to the area so rendered until restoration is completed. However, the Landlord would continue to receive the abated portion of Base Rent plus operating expenses while restoration is under way due to business interruption insurance, unless restoration took longer than 300 days.

If the Building or any portion thereof is destroyed by fire or other cause during the last two (2) years of the lease term, then Tenant shall have the right to terminate the lease by giving written notice to the Landlord within sixty (60) days of the destruction. In this case, the Landlord would continue to receive Base Rent plus taxes

09145304 . 091598 and operating expenses from business interruption insurance for 300 days.

TENANT FINANCIAL REPORTS:

During each year of the Term, on no later than March 1, Anonymous Mortgage shall provide Landlord with a net worth report as of December 31 of the prior calendar year and the preceding year. The report shall be certified by a nationally recognized accounting firm.

At any time during the Term, up to once per fiscal year, Tenant will, upon ten days prior notice from Trustee A, provide the Trustee with a current financial statement and financial statements for the two (2) preceding fiscal years. The statements will be prepared in accordance with Generally Accepted Accounting Principles.

09745341.090198

SPECIMEN 5

Limited Offering Memorandum Confidential

Rating: Standard & Poor's: A+

(See "RATING" herein)

LIMITED OFFERING MEMORANDUM CONFIDENTIAL

Rating: Standard & Poor's: A+

(See "RATING" herein)

K.C. ABBE® TRUST 1995-1

$9,040,000 Certificates

---

This Limited Offering Memorandum relates to the offering and sale of $9,040,000 aggregate amount of certificates (the "Certificates") evidencing undivided fractional interests in K.C. ABBE® Trust 1995-1, a special purpose grantor trust (the "Trust"). The Trust has been created and will be governed by the terms of a First Amended and Restated Term Trust Agreement, dated as of August 25, 1995, between Scribcor, Inc. (the "Grantor") and The First National Bank of Chicago, as Trustee (the "Trustee"). The property of the Trust will consist of (i) a term-of-years real property interest expiring on December 31, 2009 (the "Term Interest") in and to the Old American Life Insurance Building, a three story commercial office building located at 4900 Oak Street in the Country Club Plaza district of Kansas City, Missouri (the "Property"), (ii) the right, as landlord, to receive all payments to be made on and after August 25, 1995 (the "Closing Date") by the tenant of the Property under the terms of a Lease, dated as of December 29, 1989, as amended (the "Lease"), and (iii) the right to all monies and securities deposited or required to be deposited with the Trustee pursuant to any term of the Trust Agreement. The Property has been leased to Old American Life Insurance Company for an initial term expiring on December 31, 2009, and the obligations of Old American Life Insurance Company under the Lease have been unconditionally and irrevocably guaranteed by Kansas City Life Insurance Company, a Missouri company (the "Lease Guarantor").

The Certificates will be dated the Closing Date, and Certificate Payments will be distributed to holders of Certificates on the 15th calendar day of each month (or, if the 15th calendar day of each month is not a Business Day, the following Business Day), commencing September 15, 1995 and ending on December 15, 2009. The Certificates will be issued in fully-registered book-entry form. Ownership interests in the Certificates will be shown on, and transfers thereof will be effected only through, records maintained by The Depository Trust Company, New York, New York ("DTC"), and its participants. Owners of beneficial interests in the Certificates will be entitled to physical delivery of the Certificates in certificated form equal in principal amount to their respective beneficial interests only under the circumstances described under the caption "THE CERTIFICATES -- Book-Entry Only System." The Certificates will be subject to prepayment as more fully described herein.

THE CERTIFICATES REPRESENT INTERESTS IN THE TRUST AND DO NOT REPRESENT INTERESTS IN OR OBLIGATIONS OF SCRIBCOR, INC., OLD AMERICAN LIFE INSURANCE COMPANY, KANSAS CITY LIFE INSURANCE COMPANY OR ANY OF THEIR AFFILIATES.

THE CERTIFICATES HAVE NOT BEEN REGISTERED UNDER THE SECURITIES ACT OF 1933, AS AMENDED (THE "SECURITIES ACT"), OR APPLICABLE STATE SECURITIES LAWS, NOR HAS THE SECURITIES AND EXCHANGE COMMISSION OR ANY STATE REGULATORY AUTHORITY PASSED UPON THE ACCURACY OR ADEQUACY OF THIS OFFERING MEMORANDUM OR ENDORSED THE MERITS OF THIS OFFERING. ANY REPRESENTATION TO THE CONTRARY IS UNLAWFUL. THE CERTIFICATES ARE BEING OFFERED PURSUANT TO EXEMPTIONS FROM THE REGISTRATION REQUIREMENTS OF THE SECURITIES ACT PROVIDED BY RULE 144A PROMULGATED THEREUNDER, CERTAIN STATE SECURITIES LAWS AND CERTAIN RULES AND REGULATIONS

PROMULGATED PURSUANT THERETO. THE CERTIFICATES MAY NOT BE TRANSFERRED BY ANY PURCHASER THEREOF UNLESS THE CERTIFICATES ARE REGISTERED UNDER THE SECURITIES ACT OR AN EXEMPTION FROM REGISTRATION IS AVAILABLE AND UPON THE SATISFACTION OF CERTAIN CONDITIONS. SEE "NOTICE TO INVESTORS."

William Blair & Company (the "Placement Agent") has agreed, as agent for the Grantor, to offer the Certificates on a "best efforts" basis. See "Plan of Distribution."

---

William Blair & Company

The date of this Limited Offering Memorandum is August 25, 1995

©Copyright 1995 Graff/Ross Holdings, an affiliate of the Grantor -- All Rights Reserved.
ABBE® is a registered trademark of Graff/Ross Holdings.

This Limited Offering Memorandum (the "Offering Memorandum") is being furnished to a limited number of qualified institutional buyers on a confidential basis solely for the purpose of each such investor's consideration of the purchase of the Certificates and does not constitute an offer to sell or the solicitation of an offer to buy nor shall there be any sale of the Certificates by any person in any jurisdiction in which it is unlawful for such person to make such offer, solicitation or sale. No dealer, broker, salesman or other person has been authorized to give any information or to make any representations other than those contained herein and, if given or made such other information or representations must not be relied upon as having been authorized by Scribcor, Inc. or any other entity. The information contained in, or incorporated by reference in, this Offering Memorandum under the caption "THE LEASE GUARANTOR" and in Exhibit B has been obtained from sources available to the public, and all other information contained herein has been obtained from the Grantor, and from other sources that are believed to be reliable, but such information is not guaranteed as to accuracy or completeness by, and it is not to be construed to be the representation of, William Blair & Company. Interested investors are advised to contact the Grantor concerning the matters referred to herein. Neither the delivery of this Offering Memorandum nor the sale of any Certificate implies that there has been no change in the information contained herein since the date thereof. Neither this Offering Memorandum nor any statement that may have been made verbally or in writing is to be construed as a contract with the registered owners of the Certificates.

THE CERTIFICATES HAVE NOT BEEN REGISTERED UNDER THE SECURITIES ACT OF 1933, AS AMENDED, IN RELIANCE UPON EXEMPTIONS CONTAINED IN SUCH ACTS. THE REGISTRATION OR QUALIFICATION OF THE CERTIFICATES IN ACCORDANCE WITH APPLICABLE PROVISIONS OF SECURITIES LAWS OF THE STATES IN WHICH THE CERTIFICATES HAVE BEEN REGISTERED OR QUALIFIED AND THE EXEMPTION FROM REGISTRATION OR QUALIFICATION IN OTHER STATES CANNOT BE REGARDED AS A RECOMMENDATION THEREOF. NEITHER THESE STATES NOR ANY OF THEIR AGENCIES HAVE PASSED UPON THE MERITS OF THE CERTIFICATES OR THE ACCURACY OR COMPLETENESS OF THIS OFFERING MEMORANDUM. ANY REPRESENTATION TO THE CONTRARY MAY BE A CRIMINAL OFFENSE.

EACH PURCHASER OF THE CERTIFICATES, BY ITS ACCEPTANCE THEREOF, WILL BE DEEMED TO HAVE MADE THE ACKNOWLEDGMENTS, REPRESENTATIONS TO AND AGREEMENTS WITH THE GRANTOR, THE TRUST AND THE PLACEMENT AGENT SET FORTH UNDER THE CAPTION "NOTICE TO INVESTORS."

THIS OFFERING MEMORANDUM MAY NOT BE COPIED, REPRODUCED OR DISTRIBUTED, AND THE INFORMATION CONTAINED HEREIN MAY NOT BE

DISCLOSED TO ANYONE OTHER THAN THE INVESTOR TO WHOM IT IS DIRECTED, WITHOUT THE EXPRESS WRITTEN CONSENT OF THE GRANTOR AND THE PLACEMENT AGENT.

K.C. ABBE® TRUST 1995-1

$9,040,000 Certificates

---

TABLE OF CONTENTS

| | Page |
|---|---|
| SUMMARY OF THE OFFERING | 121 |
| INVESTMENT HIGHLIGHTS | 128 |
| OFFERING TERMS | 133 |
| KANSAS CITY LIFE INSURANCE COMPANY | 134 |
| ANNUAL CERTIFICATE PAYMENT REQUIREMENTS | 135 |
| ACQUISITION OF PROPERTY AND BRIDGE FINANCING | 135 |
| ESTIMATED SOURCES AND USES OF FUNDS | 136 |
| THE TERM INTEREST | 139 |
| THE LEASE | 142 |
| THE CERTIFICATES | 155 |
| THE TRUST AGREEMENT | 160 |
| THE SERVICING AGREEMENT | 174 |
| THE BUILDING AND THE PROPERTY | 182 |
| INVESTMENT CONSIDERATIONS | 184 |
| FEDERAL INCOME TAX MATTERS | 189 |
| PLAN OF DISTRIBUTION | 192 |
| RATING | 192 |
| REPORTS TO CERTIFICATEHOLDERS | 193 |
| ADDITIONAL INQUIRIES | 193 |
| LEGAL MATTERS | 193 |

ENFORCEABILITY OF REMEDIES 194

NOTICE TO INVESTORS 194

EXHIBITS:

GUARANTY Exhibit A

KANSAS CITY LIFE INSURANCE COMPANY

ANNUAL REPORT ON FORM 10-K FOR THE YEAR ENDED

DECEMBER 31, 1994 Exhibit B

SCHEDULE OF LEASE PAYMENTS AND CERTIFICATE PAYMENTS Exhibit C

FORM OF TRUST AGREEMENT Exhibit D

FORM OF LEASE Exhibit E

FORM OF SERVICING AGREEMENT Exhibit F

Set forth below is a diagram depicting the structure of the transaction described by this Limited Offering Memorandum:
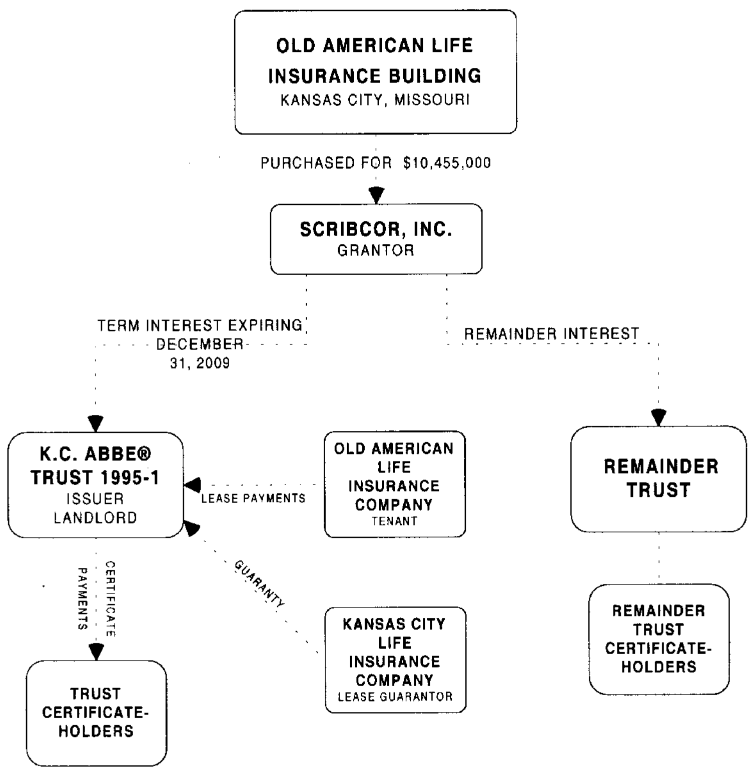

SUMMARY OF THE OFFERING

The following summary is qualified in its entirety by the detailed information appearing elsewhere in this Offering Memorandum. The descriptions and summaries of various documents set forth in this Offering Memorandum do not purport to be comprehensive or definitive, and reference is made to each document for the complete details of all terms and conditions thereof. All statements contained herein are qualified in their entirety by reference to each document. The five Exhibits hereto are part of this Offering Memorandum, and this Offering Memorandum, including the Exhibits, should be read in its entirety. Until the issuance and delivery of the Certificates, substantially final forms of the Trust Agreement, the Lease, the Servicing Agreement, the Guaranty and certain other documents described in this Offering Memorandum may be obtained at the office of William Blair & Company (the "Placement Agent") in Chicago, Illinois. Definitive copies of these documents may be obtained from the Trustee after delivery of the Certificates. Certain capitalized terms used in this summary are defined elsewhere in this Offering Memorandum.

Kansas City Life Insurance Company

The obligations of the Tenant under the Lease have been irrevocably and unconditionally guaranteed by Kansas City Life Insurance Company, a Missouri company ("Kansas City Life" or the "Lease Guarantor").

Kansas City Life and its wholly-owned subsidiaries issue and market a full line of universal life, term and traditional whole life insurance and accident and health insurance products. For the year ended December 31, 1994, Kansas City Life had consolidated revenues in the amount of $393.5 million, pre-tax income of $57.0 million and net income of $37.4 million. At December 31, 1994, Kansas City Life had total assets of $2.7 billion and total stockholders' equity of $343.7 million. With respect to its claims paying ability, Kansas City Life has a rating from A.M. Best of "A+" and ratings from Standard & Poor's Corporation and Moody's Investor Services of "A+" and "A2", respectively. See "KANSAS CITY LIFE INSURANCE COMPANY."

The Certificates

The Certificates offered hereby evidence undivided fractional interests in K.C. ABBE® Trust 1995-1, a special purpose grantor trust (the "Trust"). The Trust has been created and will be governed by the terms of a First Amended and Restated Term Trust Agreement, dated as of August 25, 1995, between Scribcor, Inc. (the "Grantor") and The First National Bank of Chicago, as Trustee (the "Trustee"). Holders of Certificates will be entitled to receive substantially all payments to be made on and after August 25, 1995 (the "Closing Date") by the sole tenant of the Old American Life Insurance Building, a three story commercial office building located at 4900 Oak Street in the Country Club Plaza district of Kansas City, Missouri (the "Property") pursuant to the terms of a Lease, dated as of December 29, 1989, as amended (the "Lease"). The obligations of the tenant under the Lease have been irrevocably and unconditionally guaranteed by Kansas City Life.

The Certificates will be dated the Closing Date, and Certificate Payments will be distributed to holders of Certificates on the 15th calendar day of each month (or, if the 15th calendar day of each month is not a Business Day, the following Business Day), commencing September 15, 1995 and ending on December 15, 2009.

The Certificates will be issued in fully-registered book-entry form. Ownership interests in the Certificates will be shown on, and transfers thereof will be effected only through, records maintained by The Depository Trust Company, New York, New York ("DTC"), and its participants. Owners of beneficial interests in the Certificates will be entitled to physical delivery of the Certificates in certificated form equal in amount to their respective beneficial interests only under certain circumstances. See "THE CERTIFICATES -- Book-Entry Only System."

The Certificates will be subject to prepayment upon the occurrence of a Total Condemnation. See "THE CERTIFICATES -- Prepayment."

The Offering $9,040,000 aggregate amount of Certificates are being offered hereby at an offering price of $20,000 per Certificate to persons who satisfy the investor suitability requirements described under the caption "NOTICE TO INVESTORS." The minimum subscription for each investor is one Certificate. The Grantor may, in its sole discretion, elect to accept subscriptions for fractional Certificates.

The Trust

The Trust is a special purpose grantor trust created and governed by the terms of a First Amended and Restated Term Trust Agreement, dated as of August 25, 1995 (the "Trust Agreement"), between the Grantor and the Trustee. The Grantor has established the Trust by selling and assigning the Term Interest to the Trust in exchange for $8,305,000. Prior to such sale and assignment, the Trust had no assets or obligations or any operating history. The Trust will not engage in any activity other than acquiring and holding the Term Interest, receiving the Lease Payments with respect to the Lease and issuing the Certificates and distributing Certificate Payments pursuant to the Trust Agreement.

Trust Property

The property of the Trust (the "Trust Property") consists solely of (i) a term-of-years real property interest expiring on December 31, 2009 (the "Term Interest") in and to the Property; (ii) the right, as landlord, to receive all payments ("Lease Payments") to be made by the Tenant under the terms of the Lease; and (iii) the right to all monies and securities deposited or required to be deposited with the Trustee pursuant to any term of the Trust Agreement.

The Term Interest

The Term Interest is a real property interest and constitutes a vested (i.e., current) unencumbered estate-for-years in and to the Property expiring on December 31, 2009. Following termination in 2009 of the Term Interest, the Trust will have no further interest in the Property. For federal income tax purposes, the Term Interest constitutes a depreciable asset, and the initial cost of the Term Interest to the Trust is recoverable under Section 167(a) of the Internal Revenue Code of 1986, by means of equal and ratable cost recovery deductions which may be taken by the Trust and passed through to holders of Certificates through 2009. See "THE TERM INTEREST."

The Property

The Property consists of a 94,149 square foot office building (the "Building") situated on a 2.091 acre parcel in the Country Club Plaza District of Kansas City, Missouri. The Country Club Plaza District is located approximately 4.5 miles south of Downtown Kansas City. The Building was constructed in 1960 and substantial renovations were completed by Kansas City Life for approximately $1.5 million on the Building in 1992. The Building has been subleased to The Ewing Kauffman Foundation (the "Subtenant") through 1997. See "THE BUILDING AND THE PROPERTY."

Property Acquisition and Bridge Financing

On May 4, 1995, the Grantor acquired a fee simple interest in the Property for a purchase price of $10,455,000. Following Grantor's acquisition of the entire fee simple interest in the Property, the Grantor "split" the fee simple ownership of the Property by simultaneously (a) conveying or causing to be conveyed to the Trust the Term Interest expiring in 2009 and (b) conveying or causing to be conveyed to a single purpose grantor trust (the "Remainder Trust"), in exchange for $2,150,000, a remainder interest in the Property, which remainder interest will entitle the beneficiaries of the Remainder Trust, upon termination of the Term Interest on December 31, 2009, to a fee simple interest in the Property.

The Grantor established the Trust by assigning and selling the Term Interest to the Trust in exchange for $8,305,000, which amount was contributed to the Trust by K.C. ABBE Holdings, L.L.C. ("Holdings"), a Delaware limited liability company of which the sole members (equity holders) are principals of the Grantor or spouses thereof. Holdings was formed to facilitate the purchase of the Property pending completion of the offering of the Certificates made hereby. Holdings financed its purchase of the beneficial interest in the Trust representing the Term Interest by incurring bank indebtedness in the amount of $8,300,000, which indebtedness and accrued interest thereon will be discharged with the proceeds of the offering of Certificates made hereby. See "ESTIMATED SOURCES AND USES OF FUNDS."

The Lease

Pursuant to the terms of a Lease, dated as of December 29, 1989, as amended (the "Lease"), the Property has been leased to the Tenant for an initial term expiring on December 31, 2009. The Lease is a so-called "triple net" lease, with Tenant assuming responsibility for taxes, insurance and operating expenses, obligations for repair and maintenance, and certain condemnation and casualty risks associated with the Building. See "INVESTMENT HIGHLIGHTS -- Absolute Net Lease".

The Servicer

Upon acquisition of the Property and creation of the Term Interest, the Trust was assigned all rights of the landlord under the Lease. Pursuant to the terms of a Servicing Agreement, dated as of August 25, 1995 (the "Servicing Agreement"), between the Trustee and Scribcor, Inc. (the "Servicer"), the Servicer has been authorized to act as agent for the Trustee with respect to (a) monitoring the performance of the Tenant under the Lease, (b) undertaking certain collection obligations of the landlord under the Lease and (c) pursuing, on behalf of the Trustee, certain remedies available to landlord under the Lease upon the occurrence of a default thereunder. See "THE SERVICING AGREEMENT."

Scribcor, Inc., founded in 1891, is a privately-held firm focusing on management, leasing and consulting in the Midwest commercial and industrial real estate market. At March 31, 1995, the Servicer managed in excess of 3.5 million square feet of commercial office space, and clients of the Servicer include Wm. Wrigley Jr. Company and IBM Corporation.

Security

The Certificates represent beneficial interests in, and unsecured obligations of, the Trust only and do not represent interests in or obligations of the Grantor, the Tenant or Kansas City Life. The Trust will not hold a mortgage on the Building.

The Trust will hold title directly to the Term Interest, which will expire and terminate in 2009. As holder of the Term Interest, the Trust will be entitled to receive all rents and profits derivable from the Building (including all Lease Payments under the Lease) through, but only through, December 31, 2009.

The Grantor and Affiliates

Scribcor, Inc. (the "Grantor") is the grantor of the Trust and will serve as the Servicer under the Trust Agreement. The Grantor is an affiliate of Electrum Partners L.L.C. ("Electrum"), a newly-formed Illinois limited liability company.

The principal officers and majority owners of Electrum are Richard M. Ross, Jr. and Richard A. Graff. Principals of Electrum have been engaged for over the past three years developing the conceptual debt/equity model which serves as the basis for the financing contemplated hereby.

Mr. Ross is President of Scribcor, Inc., and has been associated with Scribcor in various administrative capacities since 1971. Scribcor, founded in 1891, is a privately-held firm focusing on management, leasing and consulting in the Chicago commercial and industrial real estate market. During his 23-year tenure with Scribcor, Mr. Ross has directed complex transactions for major institutional clients, including site acquisition, financing, office relocation, development consulting and property management. He has provided confidential consulting services to numerous major corporations. Mr. Ross is a graduate of Denison University and holds an MBA in Finance from the University of Chicago. He is a member of the American Society of Real Estate Counselors (ASREC) and the Urban Land Institute.

Over the last nine years, Mr. Graff developed the investment theory and legal structure that forms the basis for the Electrum's proprietary financial technology. Mr. Graff is a graduate of the Massachusetts Institute of Technology. He holds MA and Ph.D. degrees in mathematics from Princeton University and an MBA in Finance from the University of Chicago. He is an author of several widely recognized articles on innovations in real estate finance and investments that have appeared or are scheduled to appear in various professional and academic real estate and financial publications.

Investment Considerations

An investment in the Certificates involves certain risks. See "INVESTMENT CONSIDERATIONS."

Certain Tax Matters

In the opinion of Kirkland & Ellis, special tax counsel to the Grantor, the Trust will be classified for Federal income tax purposes as a grantor trust and not as an association taxable as a corporation. Accordingly, each holder of a Certificate will be subject to Federal income taxation as if it owned directly its proportionate interest in each asset owned by the Trust.

In the opinion of Kirkland & Ellis, for Federal income tax purposes the Term Interest constitutes a depreciable asset and the initial cost of the Term Interest to the Trust is recoverable under Section 167(a) of the Internal Revenue Code of 1986, by means of equal and ratable cost recovery deductions which may be taken by the Trust and passed through to holders of Certificates through 2009. See "FEDERAL INCOME TAX MATTERS."

Investor Suitability

Certificates will be offered and sold solely to "qualified institutional buyers" ("QIBs"), as such term is defined under Rule 144A under the Securities Act of 1933, as amended, in compliance with Rule 144A. See "NOTICE TO INVESTORS."

Rating

Standard & Poor's, a division of The McGraw-Hill Companies ("S&P"), has assigned the Certificates a rating of "A+". A rating reflects only the views of S&P and an explanation of the significance of such rating may be obtained from S&P. Once assigned, there is no assurance that any rating will continue for any given period of time, or that it will not be revised downward or withdrawn entirely by the issuing rating agency if, in its judgment, circumstances so warrant. Any downward revision or withdrawal of a rating assigned to the Certificates may have an adverse effect on the market price of the Certificates. A security rating is not a recommendation to buy, sell or hold securities, may be subject to revision or withdrawal at any time by the assigning rating agency and should be evaluated independently of any other rating. See "RATING."

INVESTMENT HIGHLIGHTS

Single Purpose Issuing Entity

The Certificates will be issued by K.C. ABBE® 1995-1 Trust, a special purpose grantor trust created solely for the purpose of purchasing the Term Interest. The Trust will not engage in any activity other than acquiring and holding the Trust Property, issuing the Certificates, receiving Lease Payments and distributing Certificate Payments with respect to the Certificates.

Unconditional Lease Guaranty

The obligations of the Tenant under the Lease have been unconditionally and irrevocably guaranteed, as to payment and not as to collection, by Kansas City Life Insurance Company. At December 31, 1994, the obligation of Kansas City Life represented by the Guaranty had been capitalized for financial reporting purposes in accordance with generally accepted accounting principles. See Kansas City Life's Annual Report on Form 10-K for the year ended December 31, 1994, which is attached hereto as Exhibit B.

Kansas City Life Insurance Company

Kansas City Life and its wholly-owned subsidiaries issue and market a full line of universal life, term and traditional whole life insurance and accident and health insurance products. For the year ended December 31, 1994, Kansas City Life had consolidated revenues in the amount of $393.5 million, pre-tax income of $57.0 million and net income of $37.4 million. At December 31, 1994, Kansas City Life had total assets of $2.7 billion and total stockholders' equity of $343.7 million. With respect to its claims paying ability, Kansas City Life has a rating from A.M. Best & Co. of "A+" and ratings from Standard & Poor's Corporation and Moody's Investors Service of "A+" and "A2", respectively.

Absolute Net Lease

The Lease is an absolute "triple net" lease, with Tenant assuming responsibility for all taxes, insurance and operating expenses, obligations for repair and maintenance (including structural repair and maintenance) and condemnation and casualty loss risks associated with the Building.

Capital Expenditures. The Trustee, in its capacity as landlord under the Lease, has no obligation under the Lease to make capital expenditures with respect to the Building. Tenant is required, at its sole cost and expense, to keep the Building and all parts thereof in good order, repair and condition, whether interior or exterior, structural or non-structural, ordinary or extraordinary, foreseen or unforeseen, including, without limitation, repair of all glass, utilities, conduits, fixtures, equipment, foundations, roofs, exterior and interior walls, heating and air conditioning systems, lighting fixtures, wiring, plumbing, sprinkler systems, paving, sidewalks, roads, parking areas, curbs, gutters and fences. The necessity for and adequacy of all repairs to be made to the Building pursuant to the Lease shall be measured by the standard which is appropriate for suburban office buildings in the Kansas City metropolitan area of similar construction, class and age.

Casualty Loss Risk. If the Building, or any part thereof, is damaged or destroyed by fire or other casualty during the term of the Lease (except during the second to last and final year of the term), Tenant is obligated to promptly repair or restore the Building to substantially the same condition it was in immediately prior to such fire or casualty, and Tenant's obligation to pay Base Rent and to perform its other obligations under the Lease will not be suspended, abated or reduced as a result thereof.

In the event of (a) damage or destruction during the second to last year of the Term (the repair and restoration of which would cost in excess of 75% of the replacement value of the Premises) or (b) damage or destruction during the last year of the Term (the repair and restoration of which would cost in excess of 25% of the replacement value of the Building), the Trustee (in its capacity as landlord under the Lease) or Tenant may terminate the Lease, provided that any and all insurance proceeds in such case received by Tenant are required to be paid to and assigned to the Trust, as landlord. In each such case, the Trustee, in its capacity as landlord under the Lease and pursuant to the terms of the Trust Agreement, is obligated to utilize such insurance proceeds to restore the Building to substantially the same condition as existed immediately prior to the Casualty Loss giving rise to such Casualty Loss Termination. Notwithstanding the foregoing, Tenant shall not have the right to terminate the Lease if (a) any damage or destruction is caused by an uninsured casualty, (b) Tenant shall have failed to maintain the insurance required to be maintained under the Lease or (c) Landlord is unable for any reason to collect all insurance proceeds which would otherwise be payable by Tenant's insurance carriers in connection with such damage or destruction. Pursuant to the terms of the Trust Agreement, the Trustee, in its capacity as landlord under the Lease, has been irrevocably instructed not to exercise its right to terminate the Lease upon the occurrence of a Casualty Loss. See "THE TRUST AGREEMENT -- Specific Duties of Trustee -- Casualty Loss."

In accordance with the terms of the Lease, Tenant is required to maintain all-risk property and casualty insurance for the full (100%) replacement cost of the Property (with a deductible of not more than $25,000). See "THE LEASE -- Insurance." The Trustee is required pursuant to the Trust Agreement to procure rental interruption insurance in an amount sufficient to assure that holders of Certificates will receive when due monthly Certificate Payments with respect to the Certificates. There can be no assurance that receipt by the Trustee of any such casualty insurance or rental interruption insurance proceeds will be at such time or times sufficient to assure timely payment with respect to the Certificates. See "THE TRUST AGREEMENT -- Specific Duties of Trustee -- Rental Interruption Insurance."

Condemnation Risk. If less than 50% of the Building shall be taken by condemnation or other eminent domain proceedings pursuant to any law, general or special, or the use or occupancy of the Premises or any part thereof shall be temporarily requisitioned by any governmental authority, civil or military, then the Lease shall continue in full force and effect without abatement or reduction of Base Rent, additional rent or other sums payable by Tenant. In such event, Tenant is obligated after such taking or requisition, at its sole cost and expense, to repair any damage caused by any such taking or requisition in conformity with the provisions in the Lease governing the making of alterations to the Building.

If condemnation shall effect at least 50% of the Building and, in Tenant's reasonable judgment, shall render the Building unsuitable for restoration for continued use and occupancy (a "Total Condemnation"), then Tenant shall terminate the Lease and submit an irrevocable offer to purchase from the Term Trust (a) any remaining portion of the Building and (b) the right to receive the net proceeds, if any, payable in connection with such condemnation. The purchase price shall be equal to ten times the then-annual Base Rent payable under the Lease, which amount will not be less than $9,326,500 and which amount will in all cases be equal to or greater than the then-applicable Prepayment Amount. In accordance with the terms of the Trust, the Trustee is required to accept such offer to purchase, and proceeds received by the Trust from the Tenant upon the occurrence of a Total Condemnation will be distributed, first, to holders of Certificates to the extent of the then-applicable Prepayment Amount, and second, if and only to the extent of any remaining proceeds, to the Remainder Trustee for distribution to holders of Remainder Trust Certificates.

Environmental Risk. In connection with the acquisition of the Property, the Grantor engaged Environment Audit Incorporated, Lee's Summit, Missouri, to perform a Phase I environmental assessment of the Property. The Phase I assessment revealed no matters of significance with respect to non-compliance with environmental laws and regulations. Pursuant to the terms of the Lease, Tenant has agreed to defend, indemnify and hold the Trust, as landlord under the Lease, harmless from and against any and all claims, including without limitation wrongful death actions and third-party claims (but excluding claims for consequential damages) arising directly or indirectly from the presence of any Hazardous Material (as defined in the Lease) in, on, under, at or about the Property or any Hazardous Discharge (as defined in the Lease) in, on, under, at or about the Property, or any environmental complaint.

Depreciability of Term Interest

For Federal income tax purposes, the Term Interest constitutes a depreciable asset, the cost of which is subject to equal and ratable cost recovery deductions through December 31, 2009. See "FEDERAL INCOME TAX MATTERS".

Remedies of Trust Upon Tenant Default

The Trust will hold title directly to the Term Interest, which constitutes a current real property interest which will expire and terminate on December 31, 2009, and the Trust will be the primary assignee and beneficiary of the Guaranty. The Trust will not hold a mortgage on the Property. As direct holder of the Term Interest, upon a default by the Tenant the Trustee (as landlord under the Lease) will be entitled to seek enforcement of its rights and remedies in accordance with the terms of the Lease and without resort to mortgage foreclosure or other judicial proceedings which otherwise might be required to realize upon a security interest in the Property.

OFFERING TERMS

The Trust is offering hereby a total of 452 Certificates at an offering price of $20,000 per Certificate and in integral multiples of $1,000 in excess thereof. The purchase price will be payable in full upon subscription. The minimum subscription is one Certificate. The Grantor reserves the right, in its sole discretion, to accept subscriptions for fractional Certificates, so long as the minimum subscription requirement is met. The Certificates will be sold only to such persons who meet the suitability standards set forth under "NOTICE TO INVESTORS."

KANSAS CITY LIFE INSURANCE COMPANY

Pursuant to the terms of a Guaranty, dated as of November 13, 1991 (the "Guaranty"), from Kansas City Life, the obligations of the Tenant under the Lease have been irrevocably and unconditionally guaranteed by Kansas City Life. A copy of the Guaranty is attached hereto as Exhibit A. The Tenant is a wholly-owned subsidiary of Kansas City Life. The obligation of Kansas City Life represented by the Guaranty has been capitalized for financial reporting purposes in accordance with generally accepted accounting principles.

Kansas City Life and its wholly-owned subsidiaries issue and market a full line of universal life, term and traditional whole life insurance and accident and health insurance products. For the year ended December 31, 1994, the Lease Guarantor had consolidated revenues in the amount of $393.5 million, pre-tax income of $57.0 million and net income of $37.4 million. At December 31, 1994, the Lease Guarantor had total assets of $2.7 billion and total stockholders' equity of $343.7 million. With respect to its claims paying ability, Kansas City Life has a rating from A.M. Best of "A+" and ratings from Standard & Poor's Corporation and Moody's Investors Service of "A+" and "A2", respectively.

Attached hereto as Exhibit B is a copy of the Kansas City Life's Annual Report on Form 10-K for the year ended December 31, 1994, in the form as filed with the Securities and Exchange Commission.

ANNUAL CERTIFICATE PAYMENT REQUIREMENTS

For a comparison of the Lease Payments of Base Rent required to be made by the Tenant under the Lease with the Certificate Payments required to be made with respect to the Certificates, see Exhibit C. The applicable Prepayment Amount at any monthly Certificate Payment date is included as Appendix B to the Trust Agreement, a copy of which has been included herein as Exhibit D.

ACQUISITION OF PROPERTY AND BRIDGE FINANCING

On May 4, 1995, the Grantor acquired a fee simple interest in the Property for a purchase price of $10,455,000. Immediately following Grantor's acquisition of the entire fee simple interest in the Property, the Grantor "split" the fee simple ownership of the Property by simultaneously (a) conveying or causing to be conveyed to the Trust the Term Interest expiring in 2009 and (b) conveying or causing to be conveyed to the Remainder Trust, in exchange for $2,150,000, a remainder interest in the Property, which remainder interest will entitle holders of certificates evidencing interests in the Remainder Trust ("Remainder Trust Certificates"), upon termination of the Term Interest on December 31, 2009, to a fee simple interest in the Property.

The Grantor established the Trust by assigning and selling the Term Interest to the Trust in exchange for $8,305,000, which amount was contributed to the Trust by K.C. ABBE Holdings, L.L.C. ("Holdings"), a Delaware limited liability company of which the sole members (equity holders) are principals of the Grantor or spouses thereof. Holdings was formed to facilitate the purchase of the Property pending completion of the offering of the Certificates made hereby. Holdings financed its purchase of the beneficial interest in the Trust representing the Term Interest by incurring bank indebtedness (the "Bridge Financing") in the amount of $8,300,000, which indebtedness and accrued interest thereon will be discharged with the proceeds of the offering of Certificates made hereby. See "ESTIMATED SOURCES AND USES OF FUNDS".

ESTIMATED SOURCES AND USES OF FUNDS

Set forth below is a summary of the estimated sources and uses of funds in connection with the (a) purchase of the Property by the Grantor for $10,455,000, (b) sale by the Grantor to Holdings of the Term Interest to the Trust, (c) the sale by the Grantor of the Remainder Interest to the Remainder Trust and the issuance of the Remainder Trust Certificates, (d) the cash flow attributable to the Certificates purchased by Holdings during the interim period May 4, 1995 to date (the "Interim Period"), and (e) the issuance of the Certificates offered hereby. The information set forth below represents the best estimate of the Grantor and is subject to change.

SOURCES OF FUNDS:

| | Purchase of Property/ Interim Period Certificate Cash Flow | Issuance of Certificates Offered Hereby |
|---|---|---|
| Proceeds from issuance and sale of Certificates offered hereby | | $9,040,000 |
| Proceeds from Bridge Financing | $8,300,000 | |
| Proceeds from issuance and sale of Remainder Trust Certificates | 2,150,000 | |
| Net rent received during Interim Period | 233,162 | |
| Amount on deposit in Certificate Distribution Account | | 25,000 |
| Advances from Scribcor, Inc. | 216,662 | |
| TOTAL SOURCES OF FUNDS | $10,899,824 | $9,065,000 |

USES OF FUNDS:

| | | |
|---|---|---|
| Acquisition cost of Property ................................ | $10,455,000 | |
| Interest on Bridge Financing paid during Interim Period ................................................................ | 210,797 | |
| Real estate commissions, legal expenses and other costs Payable in connection with acquisition of Property ......................................................... | 133,027 | |
| Repayment of Bridge Financing .......................... | | $8,300,000 |
| Interest on Bridge Financing paid on Closing Date .. | | 88,003 |
| Reimburse Scribcor, Inc. for Property acquisition and other Interim Period costs ............................ | | 216,662 |
| Roll-over funding of Certificate Distribution Account .............................................................. | | 25,000 |
| Initial funding of Rental Insurance Reserve Account .............................................................. | | 28,200 |
| Initial funding by Scribcor, Inc. of Rating Agency Account .............................................................. | | 17,500 |
| Other expenses payable in connection with organization of Remainder Trust and offering of Remainder Trust Certificates .............................. | 101,000 | |

| | | |
|---|---|---|
| All other expenses, including rating agency fees, printing expenses, placement agent fees, Trustee fees, and other expenses payable in connection with organization of Term Trust and offering of Certificates........................................ | | 389,635 |
| TOTAL USES OF FUNDS ........................ | $10,899,824 | $9,065,000 |

THE TERM INTEREST

Background

Academics and real estate finance specialists have generally accepted the notion that commercial real estate leased on a so-called "bondable" basis (i.e., obligating the tenant, among other things, to pay all maintenance, insurance and tax expenses to assume certain condemnation, environmental and structural repair risks) to credit-worthy tenants can be divided conceptually into two components: a bond-equivalent component and a "residual", or equity, component. The bond-equivalent component represents the value on a net present value basis of the expected payments under the bondable lease, discounted at a rate appropriate to the duration of the lease and the credit-worthiness of the tenant. The bond-equivalent component is comparable in many respects to a intermediate-term, non-callable fixed-income security. In contrast, the "residual", or equity, component represents the value of commercial real estate after the cash flows generated by the bond-equivalent component have been eliminated -- i.e., the net present value of the future right to occupy the real estate upon expiration of the term of the lease. Legally, the bond-equivalent component can be simulated by creating a term-of-years of a duration co-terminous with the term of the triple-net lease, while the equity component in a particular property represents an interest in a vested (i.e., current)

unencumbered remainder interest in fee simple title to such property. This unencumbered remainder interest will entitle the holder of such interest to future possession and control of the property on a debt-free basis following the termination of the underlying term-of-years.

The Term Interest

The Term Interest is a real property interest and constitutes a vested (i.e., current) unencumbered estate-for-years in and to the Property expiring on December 31, 2009. Following termination in 2009 of the Term Interest, the Trust will have no further interest in the Property. For Federal income tax purposes, the Term Interest constitutes a depreciable asset, the cost of which is subject to equal and ratable cost recovery deductions through December 31, 2009. See "FEDERAL INCOME TAX MATTERS".

Acquisition of the Property and Creation of Term Interest

On May 4, 1995 the Grantor purchased for $10,455,000 the entire fee simple interest in the Property, which consists of a 94,149 square foot office building (the "Building") situated on a 2.091 acre parcel in the Country Club Plaza District of Kansas City, Missouri. The Country Club Plaza District is located approximately 4.5 miles south of Downtown Kansas City. The Building was constructed in 1960 and substantial renovations were completed by Kansas City Life on the Building for approximately $1.5 million in 1992, and the Subtenant has made significant expenditures to maintain the space in a manner commensurate with a Class A office building space. The $10,455,000 purchase price represents a capitalization of the Building's operating income for the year ended December 31, 1994 at a rate of 8.93%, a capitalization of projected operating income for the year ending December 31, 2000 at a rate of 10.27% and a capitalization of projected operating income for the year ending December 31, 2005 at a rate of 11.81%.

Immediately following Grantor's acquisition of the entire fee simple interest in the Property pursuant to the Acquisition Agreement, Grantor "split" the fee simple ownership of the Property by simultaneously (a) conveying or causing to be conveyed to the Trust the Term Interest expiring on December 31, 2009 and (b) conveying or causing to be conveyed to the Remainder Trust for $2,150,000 a remainder interest in the Property, which remainder interest will entitle the beneficiaries of the Remainder Trust, upon termination of the Term Interest on December 31, 2009, to a fee simple interest in the Property.

The Grantor established the Trust by assigning and selling the Term Interest to the Trust in exchange for $8,305,000, which amount was contributed to the Trust by K.C. ABBE Holdings, L.L.C. ("Holdings"), a Delaware limited liability company of which the sole members (equity holders) are principals of the Grantor or spouses thereof. Holdings was formed to facilitate the purchase of the Property pending completion of the offering of the Certificates made hereby. Holdings financed its purchase of the beneficial interest in the Trust representing the Term Interest by incurring bank indebtedness in the amount of $8,300,000, which indebtedness and accrued interest thereon will be discharged with the proceeds of the offering of Certificates made hereby. See "ESTIMATED SOURCES AND USES OF FUNDS".

Prior to such initial sale and assignment, the Trust had no assets or obligations or any operating history. The Trust has not and will not engage in any activity other than acquiring and holding the Trust Property, receiving Lease Payments from the Tenant pursuant to the Lease, issuing the Certificates pursuant to the Trust Agreement and distributing Certificate Payments to Certificateholders.

THE LEASE

The following is a summary of certain provisions of the Lease. This summary is not a complete description of the terms of the Lease, and reference is made to the Lease for its detailed provisions. A copy of the Lease, as amended, is attached hereto as Exhibit E. All references herein to the "Landlord" are to the Trustee, in its capacity as landlord under the Lease. Section references are to the corresponding provisions of the Lease, the terms of which are incorporated herein by reference thereto.

General

Pursuant to the Lease, the Tenant has leased during the Initial Term (as defined below) the Property, which contains all 94,149 rentable square feet of office space in the Old American Life Insurance Building (the "Building"), comprised of (i) 66,369 rentable square feet of office space on floors 1 through 3 of the Building and (ii) 27,780 rentable square feet of space in the Building's basement, which is utilized as a cafeteria, print shop and other office service facilities and (iii) the Building's three-story covered parking garage, containing spaces for 250 cars. The term "Premises," as used herein, shall refer to the Property (including the Building).

Term

The initial 20-year term of the Lease (the "Initial Term") commenced on December 29, 1989 and will expire on December 31, 2009, unless sooner terminated in accordance with the provisions of the Lease pertaining to casualty loss or condemnation or the exercise of the Landlord's remedies under the Lease. The Tenant has the option to extend the term of the Lease for two additional periods of five years (each, a "Renewal Term"). The Initial Term and the Renewal Terms are sometimes collectively referred to herein as the "Term."

In the event that the Property has been subleased to not more than two subtenants, for a term, including renewals, which shall expire not more than three years after the expiration of the Term, the Tenant shall have the right, at its option, to renew the Term for an additional period of either one, two or three years, so that the Term, as so renewed, shall expire after the expiration of such subleases; provided, Tenant shall have no further right to renew or extend the Term of the Lease. (Article III.D.)

Base Rent

The Tenant is obligated to pay the annual base rent ("Base Rent") in equal installments on the first day of each month during the Term, without any right of set-off or deduction whatsoever. The annual and monthly Base Rent prescribed by the Lease during each year during the Initial Term and Renewal Terms is as follows:

| Year ending December 31, | Annual Base Rent | Monthly Base Rent |
| --- | --- | --- |
| 1995-1999, inclusive........................................ | $ 932,650 | $ 77,720.83 |
| 2000-2004, inclusive........................................ | 1,072,548 | 89,379.00 |
| 2005-2009, inclusive........................................ | 1,233,430 | 102,785.83 |
| First Renewal Term: 2010-2014, inclusive........................................................ | 1,418,445 | 118,203.75 |
| Second Renewal Term: 2015-2019, inclusive........................................................ | 1,631,211 | 135,934.25 |

Net Lease

The Lease is a so-called "triple-net" lease -- i.e., it is the intent of Landlord and Tenant that the Lease will yield, net to Landlord, the Base Rent as above specified, and that all costs and expenses relating to the Premises shall be paid by the Tenant. (Article V.A.) Accordingly, in addition to Base Rent, the Tenant shall pay as additional rent, without right of reduction, set-off or abatement, all costs and expenses relating to the Premises, including taxes, utility expenses and costs of insurance, and repair and maintenance expenses, all as more fully described below.

Taxes

Tenant has agreed to pay as additional rent, before any fine or costs may be added for nonpayment, all real estate taxes, assessments, water and sewer rents, rates and charges, ad valorem taxes, gross receipts taxes, sales and use taxes, and other similar governmental charges which may at any time during the Term be assessed in respect of the Premises and to furnish to Landlord official receipts or other satisfactory proof evidencing such payment. (Article VI.A.)

Repairs and Maintenance

Tenant is required, at its sole cost and expense, to keep the Premises and all parts thereof, including without limitation, all sidewalks, curbs, parking areas, access ways and landscaped areas, in good order, repair and condition, whether interior or exterior, structural or nonstructural, ordinary or extraordinary, foreseen or unforeseen, including, without limitation, repair of all glass, utilities, conduits, fixtures, equipment, foundations, roofs, exterior and interior walls, heating and air conditioning systems, lighting fixtures, wiring, plumbing, sprinkler systems, paving, sidewalks, roads, parking areas, curbs, gutters and fences. The necessity for and adequacy of all repairs to be made to the Premises pursuant to the Lease shall be measured by the standard which is appropriate for suburban office buildings in the Kansas City metropolitan area of similar construction, class and age. (Article VII.A.)

If, during the last twelve months of the Term, Tenant is required pursuant to any applicable legal requirement to make structural repairs or alterations to the Premises (a "Mandated Repair"), then in such case if a Mandated Repair must be completed prior to the expiration of the Term, Tenant shall be responsible for completing the Mandated Repair at its sole cost and expense. If, however, a Mandated Repair may be completed over a period of time which extends beyond the expiration of the Term, but work on such Mandated Repair must be commenced prior to the expiration of the Term, then in such event Tenant is required to commence the work on the Mandated Repair and is obligated to pay that portion of the work which is equal to the result obtained by pro rating the total cost of the Mandated Repair over the period of time during which such Mandated Repair may or must be completed and allocating to Tenant the amount allocable to the balance of the Term. (Article VII.C.)

Utilities and Services

Landlord is not required to furnish any utilities or services to Tenant. Tenant is responsible for the procurement of and payment for all charges for electricity, power, gas, steam, water, telephone and other utilities and services, including without limitation, cleaning and maintenance services used in connection with the Premises. (Article XI).

Insurance

Tenant shall maintain at all times, at its sole cost and expense, insurance coverage as follows:

1. All-risk property insurance for the full (100%) replacement cost of the Property (with a deductible of not more than $25,000);

2. Commercial general public liability insurance against claims for bodily injury, death or property damage occurring on or about the Premises in a single limit amount of $10,000,000 with respect to bodily injury or death arising out of any one accident or occurrence;

3. Boiler and machinery insurance in the amount of at least $1,000,000 (with a deductible of not more than $10,000);

4. Worker's compensation insurance to the extent required by law;

5. During any period of construction with respect to the Building, builders' risk insurance on a completed value basis for the total cost of any alterations;

6. If and to the extent such insurance is commonly obtained by prudent owners of suburban office buildings in the Kansas City metropolitan area, environmental impairment insurance in such amounts as are commonly obtained by such prudent owners. Notwithstanding the foregoing, Tenant shall not be required to carry such environmental impairment insurance so long as its net worth exceeds Tenant's Minimum Net Worth (as defined) (and further provided that, to the extent that Tenant is required to carry such insurance because its net worth is equal to or less than Tenant's Minimum Net Worth, Tenant may maintain a deductible with respect to such insurance of not more than 5% of its net worth);

7. Such other insurance in such amounts as are commonly obtained at the time in question by prudent owners of suburban office buildings in the Kansas City metropolitan area.

For purposes of the foregoing paragraph (6), "Tenant's Minimum Net Worth" is an amount equal to the greater of (i) $50,000,000 or (ii) the product of (1) 50 times (2) the Base Rent and taxes with respect to the Premises payable by the Tenant in the then-current calendar year. All insurance maintained by Tenant with respect to the Premises must name Landlord as an additional insured as its interest may appear. In addition, at the request of Landlord, but not more than once every three years, Tenant at Tenant's sole cost and expense shall increase the limits of liability on any of the insurance policies Tenant is otherwise required to maintain to such greater amounts as Landlord shall reasonably request. (Article XII)

All insurance required to be maintained by Tenant shall be written by companies of nationally recognized financial standing, reasonably satisfactory to the Trustee in its capacity as landlord under the Lease. The Trust Agreement further provides that the Trustee will not accept insurance written by any company, unless such company has a claims paying rating of "BBB+" or better as determined by Standard & Poor's Corporation.

All proceeds of insurance maintained by Tenant under the Lease shall be payable to and administered by the Trustee under the terms of the Trust Agreement.

Fire and Other Casualty

In the event of (a) damage or destruction during the second to last year of the Term (the repair and restoration of which would cost in excess of 75% of the replacement value of the Premises) or (b) in the event of damage or destruction during the last year of the Term (the repair and restoration of which would cost in excess of 25% of the replacement value of the Premises) (each such events in clause (a) and (b) a "Casualty Loss"), then in each such event, Landlord or Tenant, upon 30 days' written notice to the other, may terminate the Lease, provided that any and all insurance proceeds in such case received by Tenant are required to be paid to and assigned to Landlord. Notwithstanding the foregoing, Tenant shall not have the right to terminate the Lease if (a) any damage or destruction is caused by an uninsured casualty, (b) Tenant shall have failed to maintain the insurance required to be maintained under the Lease or (c) Landlord is unable for any reason to collect all insurance proceeds which would otherwise be payable by Tenant's insurance carriers in connection with such damage or destruction. In accordance with the terms of the Trust Agreement, the Trustee, in its capacity as landlord under the Lease, has been irrevocably instructed not to exercise its right to terminate the Lease upon the occurrence of a Casualty Loss. See "THE TRUST AGREEMENT -- Specific Duties of Trustee -- Casualty Loss." (Article XIV.B.)

Upon the occurrence of a Casualty Loss giving rise to a Casualty Loss Termination, the Trustee, in its capacity as landlord under the Lease and pursuant to the terms of the Trust Agreement, is obligated to utilize such insurance proceeds to restore the Building to substantially the same condition as existed immediately prior to the Casualty Loss giving rise to such Casualty Loss Termination. The Trustee is required pursuant to the Trust Agreement to procure rental interruption insurance in an amount sufficient to assure that holders of Certificates will receive when due monthly Certificate Payments with respect to the Certificates. There can be no assurance that receipt by the Trustee of any such casualty insurance or rental interruption insurance proceeds will be at such time or times sufficient to assure timely payment with respect to the Certificates. See "THE TRUST AGREEMENT -- Specific Duties of Trustee -- Rental Interruption Insurance."

Condemnation

Tenant has irrevocably assigned to Landlord any award or payment to which Tenant may be or become entitled by reason of any taking of the Premises or any part thereof by condemnation or other eminent domain proceedings pursuant to any law, general or special, by any governmental authority, civil or military. Notwithstanding the foregoing, Tenant shall have the right to any award or payment on account of Tenant's trade fixtures, equipment and moving expenses, to the extent Tenant shall have a right to make a separate claim therefor against the appropriate governmental authority. (Article XV.A.)

If less than 50% of the Premises shall be taken by condemnation or other eminent domain proceedings pursuant to any law, general or special, or the use or occupancy of the Premises or any part thereof shall be temporarily requisitioned by any governmental authority, civil or military, then the Lease shall continue in full force and effect without abatement or reduction of Base Rent, additional rent or other sums payable by Tenant. In such event, Tenant is obligated after such taking or requisition, at its sole cost and expense, to repair any damage caused by any such taking or requisition in conformity with the provisions in the Lease governing the making of alterations to the Premises. (Article XV.E.)

If all or substantially all of the Property shall be taken by condemnation or other eminent domain proceedings, then the Lease shall terminate on the day preceding the date of the vesting of title to the Premises or portion thereof in the condemning authority, and Base Rent and additional rent shall be paid to the date of such termination. (Article XV.B.)

If condemnation shall affect at least 50% of the Premises and, in Tenant's reasonable judgment, shall render the Premises unsuitable for restoration for continued use and occupancy (a "Total Condemnation"), then Tenant shall, not later than 30 days after such condemnation, deliver to Landlord (i) notice of its intention to terminate the Lease on the next rental payment date which occurs not less than 90 days after the delivery of such notice (the "Condemnation Termination Date"), (ii) a certificate of an authorized officer of the Tenant describing the event giving rise to such termination and (iii) an irrevocable offer by Tenant to Landlord to purchase on the Condemnation Termination Date (a) any remaining portion of the Premises and (b) the right to receive the net proceeds, if any, payable in connection with such condemnation, at a price equal to ten times the then annual Base Rent. If Landlord shall reject such offer by notice given to Tenant not later than 15 days prior to the Condemnation Termination Date, the Lease shall terminate on the Condemnation Termination Date upon payment by Tenant of all Base Rent, additional rent and other sums then due and payable to and including the Condemnation Termination Date. (Article XV.C.) Notwithstanding the foregoing and notwithstanding any direction to the contrary of the Certificateholders, the Trustee pursuant to the terms of the Trust Agreement is irrevocably instructed to accept the Tenant's offer to purchase the Property required to be made upon the occurrence of a Total Condemnation pursuant to the provisions of the Lease (or the comparable provisions of any Replacement Lease). See "THE TRUST AGREEMENT -- Specific Duties of Trustee -- Condemnation."

Assignment and Subletting

Tenant shall have the right to assign the Lease (in whole, but not in part) or to sublet the Premises (in whole or in part) without the consent of Landlord, provided that in the case of a subletting, no subletting shall be for a term ending later than one day prior to the expiration date of the Term. No assignment shall be deemed a waiver of any agreement, term, covenant or condition of the Lease or a release of Tenant from the performance or further performance by Tenant of the agreements, terms, covenants, conditions of the Lease, and Tenant shall continue to be primarily liable under the Lease in accordance with its terms. (Article XVI.A.)

The merger or consolidation or sale of substantially all the assets of Tenant shall be deemed to be an assignment of the Lease. However, it shall be a condition precedent to the merger of Tenant into another corporation or the consolidation of the Tenant with one or more other corporations, that the surviving entity shall (i) have a minimum net worth at least equal to the net worth of Tenant immediately prior to such merger or consolidation, (ii) deliver to Landlord a certified financial statement evidencing satisfaction of the requirement set forth in the foregoing clause (i), and (iii) deliver to Landlord an acknowledged instrument in recordable form assuming all obligations, covenants and responsibilities of Tenant under the Lease. (Article XVI.E.) See "THE TRUST AGREEMENT -- Assignment of Lease."

Environmental Matters

Tenant has agreed not to use, manufacture, store, dispose or sell any substance or material (collectively, "Hazardous Materials") identified to be toxic, or hazardous according to any applicable federal, state or local statute, law, rule or regulation relating to regulation or control of toxic or hazardous substances or materials ("Environmental Laws"). If Tenant receives any written notice of any event involving the use, spill, discharge, dumping or clean-up of any Hazardous Material in at or about the Premises or into the sewer, septic system or waste treatment system servicing the Premises (any such event being hereinafter referred to as a "Hazardous Discharge") or any complaint, order, citation or notice with regard to such Hazardous Discharge, then in such event Tenant shall give immediate oral and written notice of same to Landlord.

For purposes of the Lease, the following event constitutes an Event of Default:

If the Environmental Protection Agency, or any other local, state or federal agency asserts or creates a lien upon any or all the Premises by reason of (a) the presence of Hazardous Materials in, on, under, at or about the Premises, (b) the occurrence of a Hazardous Discharge, (c) an environmental complaint, or (d) any violation of any environmental law or otherwise; or if the EPA or any other local, state or federal agency asserts a written claim against Tenant, the Premises or Landlord for damages or clean-up costs related to the presence of Hazardous Materials, a Hazardous Discharge or an environmental complaint on or pertaining to the Premises; provided, however, such claim or lien shall not constitute a default if, within ten days after Tenant receives written notice of such lien or claim:

(a) Tenant shall commence and shall thereafter pursue with due diligence either (i) the cure or correction of the event which constitutes the basis for the claim of lien and continues with due diligence to pursue such cure or correction to completion or (ii) proceedings for an injunction, restraining order or other appropriate proceedings are brought by Tenant with due diligence seeking relief of the matter giving rise to the claim and the relief thereby obtained is not thereafter reversed on appeal; and (b) In either of the foregoing events, Tenant shall have posted a bond, letter of credit or other security required by law satisfactory in form, substance and amount to the agency or entity asserting the claim to secure the proper and complete cure or correction of the event which constitutes the basis for the claim.

Tenant has agreed to defend, indemnify and hold Landlord harmless from and against any and all claims, including without limitation wrongful death actions and third-party claims (but excluding claims for consequential damages) arising directly or indirectly from the presence of any Hazardous Material in, on, under, at or about the Premises or any Hazardous Discharge in, on, under, at or about the Premises, or any environmental complaint. (Article XIII.)

Alterations

Tenant, at its sole cost and expense, may make alterations or additions or other improvements to the Premises or any part thereof, provided that any alterations or additions (i) shall not reduce the fair market value of the Premises below its value immediately before such alteration or impair the usefulness or structural integrity of the Building or change the use thereof; (ii) shall not reduce the gross leaseable area of the Premises, (iii) are effected in good and workmanlike manner in a safe and careful fashion in compliance with all applicable legal requirements and (iv) are fully paid for by the Tenant. (Article VIII.)

Covenant Against Liens

Tenant shall not permit any mechanics' or similar liens for labor or materials furnished to the Premises during the Term to be filed against the Premises or any part thereof and, if such lien shall be filed, Tenant shall either pay the same or procure the discharge thereof in any manner permitted by law within 30 days after such filing. Tenant shall indemnify Landlord and save Landlord harmless from and against any and all loss, damage, claims, liabilities, judgments, costs and expenses arising out of the filing of any such lien. (Article X.)

Default Provisions; Landlord's Remedies

The occurrence of any of the following events constitutes an event of default (an "Event of Default") under the Lease:

1. Tenant's failure to pay any Base Rent, additional rent or any other sum required to be paid pursuant to the Lease, and such failure shall continue for 10 days after notice to Tenant of such failure. Under the terms of the Trust Agreement, the Trustee is required to give notice to the Tenant within two days following the non-payment when due of any rent or other monies required to be paid by Tenant to the Trustee, in its capacity as landlord under the Lease;

2. The occurrence of an Event of Default described under "Environmental Matters" above;

3. Tenant's failure to observe or perform any other provision of the Lease and such failure shall continue for 30 days after notice to Tenant of such failure;

4. If Tenant shall make an assignment for the benefit of creditors, or shall file a voluntary petition under any bankruptcy or insolvency law or an involuntary petition alleging any act of bankruptcy or insolvency shall be filed against Tenant, and the occurrence of certain other bankruptcy-related events, and in such case such events shall occur and continue without the acquiescence of Tenant for a period of 90 days;

5. The occurrence of any event or contingency whereby the Lease or the estate thereby created or the unexpired balance of the Lease Term would, by operation of law or otherwise, devolve upon pass to any person, firm or corporation, except as expressly permitted in the Lease; or 6. If Tenant shall abandon all of the Demised Premises by vacating the premises and failing to (i) maintain the premises, (ii) make all repairs thereto, (iii) maintain security and/or (iv) comply with all the terms, covenants and provisions thereof for a period in excess of 30 days.

If an Event of Default shall have occurred and be continuing, Landlord shall have the right to give Tenant a five-day notice of Landlord's termination of the Lease. Upon expiration of such five-day period, the Lease and the estate thereby granted shall expire and terminate, and all rights of Tenant under the Lease shall expire and terminate, but Tenant shall remain liable under the Lease as hereinafter provided. (Article XVIII.B.)

Upon the occurrence of an Event of Default, Landlord shall have the following additional rights and remedies:

1. Landlord shall have the right to reenter the Premises, to dispossess Tenant by a summary proceeding or other appropriate suit and, at Tenant's expense, to remove, for the sole benefit of Landlord, Tenant's effects and to hold the Premises and the right to receive all rental and other income of and from the Premises;

2. In the case of any such reentry termination and/or disposition the Base Rent, Additional Rent and any other sums payable by Tenant under the Lease shall become immediately due and be paid up to the time of such reentry, disposition and/or termination, together with such reasonable expenses as Landlord may incur for legal expenses, attorneys' fees and disbursements; Landlord may relet the premises or any part or parts thereof for a term or terms which may at Landlord's option be less than or exceed the period which would otherwise have constituted the balance of the Term;

3. Tenant shall also pay to Landlord as liquidated damages an amount equal to the Liquidated Damages Amount set forth in the Lease; and 4. Landlord shall have the right to invoke any remedy allowed at law or in equity as if reentry, summary proceedings and other remedies were not provided for in the Lease.

In the event of any termination of the Lease or in the event that Landlord shall reenter the premises as above described, Tenant will pay to Landlord as liquidated damages, at the election of Landlord, either:

(i) A sum equal to the excess, if any, discounted at 8% per annum, of (x) the full amount of Rent reserved under the Lease for the balance of the unexpired portion of the Initial Term, or a Renewal Term, as applicable, and the Additional Rent and other charges or sums payable by Tenant hereunder which would have been payable had the Lease not so terminated, over (y) the aggregate rental value of the Premises for the same period considered on a net rental basis, such sum to be immediately due in full upon such termination or reentry; or (ii) a sum which is equal to the aggregate of the Base Rent reserved under the Lease for the balance of the unexpired portion of the Initial Term or Renewal Term, as applicable, and the Additional Rent and other charges or sums payable by Tenant thereunder which would have been payable by Tenant had the Lease not so terminated, or had Landlord not so reentered the Premises, payable upon the due dates specified in the Lease following such termination or such reentry and until the date for the expiration of the Initial Term or such Renewal Term, as applicable, as provided herein. (Article XVIII.E.)

Pursuant to the terms of the Trust Agreement, the Trustee or the Servicer, as the case may be, will in all cases elect the measure of damages described above which will, in the reasonable judgment of the Trustee or Servicer, as the case may be, result in the maximum award to the Trustee in respect of such Event of Default.

THE CERTIFICATES

General

The Certificates will be issued only in fully registered form. The Certificates will be issued in denominations of $20,000 and in integral multiples of $1,000 in excess thereof.

The Certificates will be initially registered through a book-entry only system operated by The Depository Trust Company, New York, New York ("DTC"). Details of payments of the Certificates and the book-entry only system are described below under the subcaption "Book-Entry Only System". Except as described under the subcaption "Book-Entry Only System" below, beneficial owners of the Certificates will not receive or have the right to receive physical delivery of Certificates, and will not be or be considered to be the Owners thereof. Accordingly, beneficial owners must rely upon (i) the procedures of DTC and, if such beneficial owner is not a DTC Participant (as described below), the DTC Participant who will act on behalf of such beneficial owner to receive notices and payments of Lease Payments with respect to the Certificates, and to exercise voting rights and (ii) the records of DTC and, if such beneficial owner is not a DTC Participant, such beneficial owner's DTC Participant, to evidence its beneficial ownership of the Certificates. So long as DTC or its nominee is the registered owner of the Certificates, references herein to Holders or owners of such Certificates shall mean DTC or its nominee and shall not mean the beneficial owners of such Certificates. The laws of some states may require that certain purchasers of securities take physical delivery of such securities in definitive form. Such limits and laws may impair the ability to transfer beneficial interests in a Certificate.

If at any time the Holder of any Certificate shall request that its Certificate be registered in its name and not that of Cede & Co., the Trustee shall promptly take such action as is necessary to authenticate and deliver to such Holder Certificates registered in its name or that of its nominee.

Prepayment

Except as set forth below and except for monthly Certificate Payments made in accordance with the payment schedule attached hereto as Exhibit C, the Certificates will not be prepaid, in whole or in part, prior to expiration of the Term Interest on December 31, 2009. The Certificates shall be prepaid prior to expiration of the Term Interest only upon the occurrence of a Total Condemnation (see "THE LEASE -- Condemnation" and "THE TRUST AGREEMENT -- Specific Duties of Trustee -- Condemnation") through the application of moneys on deposit in the Certificate Distribution Account under the Trust Agreement. In each such case, prepayment shall be in an amount equal to the then-applicable Prepayment Amount specified in Appendix B to the Trust Agreement, but without premium.

Certificate Payments

The sole source of payment of Certificate Payments with respect to the Certificates will be the Tenant's monthly Lease Payments of Base Rent under the Lease. The ability of the Trust to make timely Certificate Payments with respect to the Certificates will be entirely dependent upon its receipt of timely Lease Payments by the Tenant under the Lease. Under the Trust Agreement and the Lease, the Tenant is required to make Lease Payments of Base Rent directly to the Trustee. The Trustee will apply these payments as described under "THE TRUST AGREEMENT -- Certificate Payments."

Book-Entry Only System

The following information has been furnished by DTC for use in this Offering Memorandum and neither the Placement Agent nor the Grantor takes any responsibility for its accuracy or completeness.

DTC will act as securities depository for the Certificates. The Certificates will be registered in the name of Cede & Co. (DTC's partnership nominee). One fully-registered Certificate will be issued in the aggregate issuance amount and will be deposited with DTC.

DTC is a limited-purpose trust company organized under the New York Banking Law, a "banking organization" within the meaning of the New York Uniform Commercial Code, and a "clearing agency" registered pursuant to the provisions of Section 17A of the Securities Exchange Act of 1934. DTC holds securities that its participants ("Participants") deposit with DTC. DTC also facilitates the settlement among Participants of securities transactions, such as transfers and pledges, in deposited securities through electronic computerized book-entry changes in Participants' accounts, thereby eliminating the need for physical movement of securities certificates. Direct Participants include securities brokers and dealers, banks, trust companies, clearing corporations, and certain other organizations. DTC is owned by a number of its Direct Participants and by the New York Stock Exchange, Inc., the American Stock Exchange, Inc., and the National Association of Securities Dealers, Inc. Access to the DTC system is also available to others such as securities brokers and dealers, banks, and trust companies that clear through or maintain a custodial relationship with a Direct Participant, either directly or indirectly ("Indirect Participants"). The Rules applicable to DTC and its Participants are on file with the Commission.

Purchases of the Certificates under the DTC system must be made by or through Direct Participants, which will receive a credit for the Certificates on DTC's records. The ownership interest of each actual purchaser of each Certificate ("Beneficial Owner") is in turn to be recorded on the Direct and Indirect Participants' records. Beneficial Owners are expected to receive written confirmations providing details of the transaction, as well as periodic statements of their holdings, from the Direct or Indirect Participant through which the Beneficial Owner entered into the transaction. Transfers of ownership interests in the Certificates are to be accomplished by entries made on the books of Participants acting on behalf of Beneficial Owners. Except as otherwise provided herein, Beneficial Owners will not receive certificates representing their ownership interests in the Certificates, except in the event that use of the book-entry system for the Certificates is discontinued.

To facilitate subsequent transfers, all Certificates deposited by Participants with DTC are registered in the name of DTC's partnership nominee, Cede & Co. The deposit of the Certificates with DTC and their registration in the name of Cede & Co. effect no change in beneficial ownership. DTC has no knowledge of the actual Beneficial Owners of the Certificates; DTC's records reflect only the identity of the Direct Participants to whose accounts such Certificates are credited, which may or may not be the Beneficial Owners. The Participants will remain responsible for keeping account of their holdings on behalf of their customers.

Conveyance of notices and other communications by DTC to Direct Participants, by Direct Participants to Indirect Participants, and by Direct Participants to Beneficial Owners will be governed by arrangements among them, subject to any statutory or regulatory requirements as may be in effect from time to time.

Neither DTC nor Cede & Co. will consent or vote with respect to the Certificates. Under its usual procedures, DTC mails an Omnibus Proxy to the Trust as soon as possible after the record date. The Omnibus Proxy assigns Cede & Co.'s consenting or voting rights to those Direct Participants to whose accounts the Certificates are credited on the record date (identified in a listing attached to the Omnibus Proxy).

Certificate Payments with respect to the Certificates will be made to DTC. DTC's practice is to credit Direct Participants' accounts on payable date in accordance with their respective holdings shown on DTC's records unless DTC has reason to believe that it will not receive payment on payable date. Payments by Participants to Beneficial Owners will be governed by standing instructions and customary practices, as is the case with securities held for the accounts of customers in bearer form or registered in "street name," and will be the responsibility of such Participant and not of DTC, the Trustee, or the Trust, subject to any statutory or regulatory requirements as may be in effect from time to time. Payment of Certificate Payments to DTC is the responsibility of the Trustee, disbursement of such payments to Direct Participants shall be the responsibility of DTC, and disbursement of such payments to the Beneficial Owners shall be the responsibility of Direct and Indirect Participants.

DTC may discontinue providing its services as securities depository with respect to the Certificates at any time by giving reasonable notice to the Grantor or the Trustee. Under such circumstances, if a successor securities depository is not obtained, certificates for the Certificates are required to be printed and delivered.

The Trust may decide to discontinue use of the system of book-entry transfers through DTC (or a successor securities depository). In that event, certificates for the Certificates will be printed and delivered.

THE TRUST AGREEMENT

Set forth below is a summary of certain provisions of the Trust Agreement governing the terms of the Trust. The description and summaries of the Trust Agreement hereinafter set forth do not purport to be comprehensive or definitive, and reference is made to the Trust Agreement for the complete details of all terms and conditions. All statements herein are qualified in their entirety by reference to the Trust Agreement, a copy of which is attached as Exhibit D to this Offering Memorandum.

General

The Trust Agreement sets forth the terms and conditions on which The First National Bank of Chicago, as Trustee, shall hold the Term Interest. The Trust Agreement establishes the duties and obligations of the Trustee regarding the collection and distribution of funds and other administrative responsibilities relating to the Term Interest.

Certificate Distribution Account

The Trust Agreement creates and establishes a special and segregated trust account, in the name of the Trustee on behalf of the Trust and for the benefit of Certificateholders (the "Certificate Distribution Account"), into which will be deposited (i) all monthly Lease Payments of rent made on or with respect to the Lease and (ii) Net Compensation payable upon the occurrence of a Total Condemnation. The Certificate Distribution Account must be established at a bank or other financial institution (i) authorized pursuant to applicable laws to exercise corporate trust powers with respect to the Term Interest; (ii) having a combined capital and surplus of at least $50,000,000 and subject to supervision or examination by federal or state authorities; and (iii) having (or having a parent which has) a long term unsecured debt rating of at least BBB+ by Standard & Poor's Corporation (an "Eligible Bank").

Funds in the Certificate Distribution Account will be invested as provided in the Trust Agreement in "Eligible Investments". "Eligible Investments" are defined generally as (i) demand and time deposits in, or certificates of deposit of, any depository institution or trust company (including the Trustee) incorporated under the laws of the United States or any state thereof having a combined capital and surplus of at least $25,000,000 and subject to supervision and examination by federal and/or state banking authorities; provided, however, that such deposits shall be in amounts no greater than $100,000 for any one such depository institution or trust company unless the commercial paper or other unsecured short-term obligations of such depository institution or trust company are rated at least A+ by Standard & Poor's Corporation;

(ii) direct obligations of, and obligations fully guaranteed by, the United States of America, the Federal Home Loan Mortgage Corporation, FNMA, Federal Farm Credit System, the Federal Home Loan Banks or any agency or instrumentality of the United States of America the obligations of which are backed by the full faith and credit of the United States of America;

(iii) bankers' acceptances issued by any depository institution or trust company (including the Trustee) meeting the requirements of clause (i) above; provided, however, that at the time of such investment or contractual commitment providing for such investment the commercial paper or other unsecured short-term debt obligations of such depository institution or trust company carry at least the ratings required under clause (i) above;

(iv) repurchase obligations with respect to any securities described in clause (ii) above or any other security issued or guaranteed by any instrumentality of the United States of America, the obligations of which are backed by the full faith and credit of the United States of America; provided, however, that in either case, such security shall have a remaining maturity of one year or less and such repurchase obligation shall have been entered into with a depository institution or trust company (acting as principal) of the type described in the proviso to clause (iii) above; and (v) commercial paper (including both non-interest bearing discount obligations and interest bearing obligations payable on demand or on a specific date not more than one year after the date of issuance thereof) rated at least A+ by Standard & Poor's Corporation.

Investments of amounts on deposit in the Certificate Distribution Account described below with respect to any Distribution Date are limited to obligations or securities that mature not later than the corresponding Distribution Date.

The Trust Agreement also creates and establishes a special and segregated trust account, in the name of the Trustee on behalf of the Trust and for the benefit of Certificateholders (the "Rating Agency Account"), into which the amount of $17,500 will be deposited by the Grantor initially on the Closing Date. The funds on deposit in the Rating Agency Account shall be used to fund the annual rating agency monitoring fee payable to Standard & Poor's Corporation, which fee shall be payable annually in an amount not presently expected to exceed $2,000. Funds on deposit in the Rating Agency Account will be invested as provided in the Trust Agreement in Eligible Investments. If, upon termination of the Term Interest or earlier termination of the Trust (see "Termination of the Trust" below), there shall remain any unapplied balance in the Rating Agency Account, such unapplied balance shall be distributed to the Grantor.

Certificate Payments

The Servicer will deposit all Lease Payments made by the Tenant with respect to the Lease into the Certificate Distribution Account within two days of receipt by the Servicer thereof. On the 15th day of each month, commencing September 15, 1995 and ending on December 15, 2009 (each, a "Distribution Date"), the Trustee will distribute to each holder of Certificates as of the immediately preceding Record Date such holder's ratable share of the amount of Distributable Funds then on deposit in the Certificate Distribution Account. Distributable Funds includes the total balance of funds then in the Certificate Distribution Account less the sum of: (i) $25,000; plus (ii) the amount of all Reimbursable Costs incurred by the Trustee for which the Trustee has not previously been reimbursed; plus (iii) the amount of all Reimbursable Costs reasonably anticipated by the Trustee to be incurred prior to the next succeeding Distribution Date; plus (iv) the amount of any Net Casualty Proceeds and/or any Net Compensation deposited in the Certificate Distribution Account pending application in accordance with the terms of the Trust Agreement; plus (v) any Additional Servicing Fee payable to the Servicer pursuant to the terms of the Servicing Agreement; plus (vi) the amount of any investment earnings (net of losses and investment expenses) on amounts on deposit in the Certificate Distribution Account; plus (vii) the amount of any Trustee's fees payable pursuant to the terms of the Trust Agreement. The Trustee has a priority right to reimbursement of Reimbursable Costs incurred pursuant to the Trust Agreement from Lease Payments received by the Trustee and, if necessary, from the Trust Estate. On the Final Distribution Date, the Distributable Funds shall be calculated without regard to clauses (i), (iii) and (vi) above. On each Distribution Date, the Trustee will include with the distribution to each Certificateholder a statement itemizing Lease Payments received, Reimbursable Costs incurred and the calculation of the amount of Distributable Funds.

For purposes of calculating Distributable Funds, "Reimbursable Costs" include all fees, expenses, costs or other charges incurred in good faith by the Trustee in the performance of its duties and obligations under the Trust Agreement. By way of example, Reimbursable Costs include all fees and expenses incurred by the Trustee in connection with the engagement by the Trustee of the Servicer and counsel to advise the Trustee regarding the discharge by the Trustee of its obligations under Section 6.2 of the Trust Agreement upon the occurrence of an Event of Default, Casualty Loss Termination or Total Condemnation.

General Duties of Trustee

The Trustee shall generally have only such duties as are specifically set forth in the Trust Agreement relating to the administration of the Trust in the interest of the holders of the Certificates and is required to discharge such duties in accordance with its general obligations of loyalty and prudence as Trustee. In addition, the Trustee shall be required to give and receive all notices in respect of the Trust Estate as more specifically set forth in the Trust Agreement.

Specific Duties of Trustee

Actions to be Taken By Trustee Upon Event of Default under Lease; Termination of Lease. The Trustee is required to engage the Servicer pursuant to the terms of the Servicing Agreement to monitor on behalf of the Trustee performance by the Tenant under the Lease, to give and receive notices required or appropriate to be given or received by the Trustee in its capacity as landlord under the Lease, and to otherwise perform on behalf of the Trustee its obligations, in its capacity as landlord under the Lease, in accordance with the terms of the Trust Agreement and the Servicing Agreement.

If an Event of Default shall occur under the Lease, the Trustee must give, or cause the Servicer to give, notice thereof to the holders of Certificates and the Tenant within not less than two business days after the date the Trustee first obtains knowledge of the occurrence of such Event of Default. If so directed in writing by the holders of Certificates, the Trustee shall initiate, or cause the Servicer to initiate on its behalf, such actions, including the commencement of legal proceedings, as shall in the reasonable judgment of counsel retained by the Trustee for such purpose be necessary or appropriate to preserve the Trust Property and to enforce the rights and remedies of the Trust, in its capacity as the landlord under the Lease. All costs and expenses incurred by the Trustee in so acting shall constitute Reimbursable Costs. The Trustee shall not be required to take any action, incur any expense or advance any funds unless: (i) there shall then be on deposit in the Certificate Distribution Account funds sufficient, in the reasonable judgment of the Trustee, to provide for reimbursement of all Reimbursable Costs incurred or to be incurred by the Trustee in acting at the direction of the holders of Certificates; or (ii) the Trustee shall have received assurances from the holders of Certificates as to the source and manner for the reimbursement of such Reimbursable Costs reasonably satisfactory to the Trustee (clauses (i) and (ii) above being hereinafter referred to as the "Reimbursement Conditions"). If the Trustee shall seek such assurances and the holders of Certificates shall fail or refuse to provide the same within fifteen (15) days after demand therefor by the Trustee, such failure or refusal shall constitute a Termination Event and the Trustee shall be excused from taking any further action with respect to such Event of Default.

If the Lease or Tenant's right to possession of the Property thereunder shall be terminated in connection with an Event of Default, a Casualty Loss Termination or Total Condemnation (see "Casualty Loss; Casualty Loss Termination" and "Condemnation", below), the Trustee shall direct the Servicer to provide usual and customary property and asset management services pursuant to the Servicing Agreement with respect to the Property pursuant to a written management agreement. The Trustee shall initiate such actions as are, in the reasonable judgment of the Servicer and counsel engaged by the Trustee for such purpose, necessary and appropriate to (i) preserve the Trust Estate and maintain the Property, including the payment of property taxes, insurance premiums and other reasonable costs and expenses of maintaining and preserving the Property in good operating condition and (ii), if so directed in writing by the holders of Certificates, procure a Replacement Lease or Leases on such terms and conditions as shall be approved in writing by the Certificateholders. The Trustee shall not be required to take any such action unless the Reimbursement Conditions shall have been satisfied. A "Replacement Lease" is any lease for all or any portion of the Property, which lease (A) shall require the Tenant thereunder at its sole cost and expense to (i) maintain at least the insurance prescribed by the Lease, (ii) pay all ad valorem and other real property taxes levied against the Property and (iii) maintain or cause the Property to be maintained in good operating condition and in compliance with all applicable laws and (B) shall have been submitted to Standard & Poor's Corporation ("S&P"), and S&P shall have confirmed that such Replacement Lease shall not result in a downgrade, qualification or withdrawal of its then-assigned rating with respect to the Certificates.

Casualty Loss. In the event of a Casualty Loss affecting the Property involving a loss in excess of $100,000, the Trustee is required to give written notice to the holders of Certificates within not less than five business days after the date the Trustee first obtains knowledge of such Casualty Loss. The Trustee shall establish at an Eligible Bank a segregated trust account (the "Casualty Account"), into which the Net Casualty Proceeds from such Casualty Loss shall be deposited in accordance with Article XIV of the Lease (or any comparable provision of any Replacement Lease), and the Trustee, in its capacity as landlord under the Lease, shall exercise the rights and remedies set forth under Article XIV of the Lease (or the comparable provisions of any Replacement Lease) in connection with the restoration of the Property by the Tenant.

If such Casualty Loss results in a Casualty Loss Termination of the Lease, the Trustee shall deposit into the Casualty Account the Net Casualty Proceeds, which shall be applied by the Trustee or, at its direction the Servicer, to restore the Property to substantially the same condition as existed immediately prior to the Casualty Loss giving rise to the Casualty Loss Termination. In such event, the Servicer on behalf of the Trust shall obtain, within 45 days after such Casualty Loss, three fixed price bids for the performance of the work required in connection with the restoration of the Property from a "Qualified Contractor." A "Qualified Contractor" is an experienced general contractor having (i) a net worth of at least $10,000,000; (ii) a five year annual average contract revenues of not less than $50,000,000; and (iii) not less than ten years of continuous business operation. The Trustee shall submit the three bids to the Certificateholders, who shall direct in writing the Trustee as to the bid to be selected not later than 30 days after receipt by the Certificateholders of such bids. If the holders of the Certificates fail or refuse to select one of the three bids within such 30-day period, the Servicer shall recommend to the Trustee the bid which, in the judgment of the Servicer exercised in accordance with the servicing standards set forth in the Servicing Agreement (see "THE SERVICING AGREEMENT -- Duties of Servicer"), is the bid in the best interest of the Certificateholders, and the Trustee shall select such bid and proceed with the restoration. If the holders of Certificates shall direct the Trustee with respect to the taking of any actions in response to such Casualty Loss Termination, all fees and expenses reasonably incurred by the Trustee in connection therewith shall be Reimbursable Costs. The Trustee shall have no obligation to take any such actions unless the Reimbursement Conditions are then met.

For purposes of the Trust Agreement, a "Casualty Loss" is any loss or damage suffered or incurred with respect to the Property arising out of any fire, windstorm, flood, earthquake, act of God, war, strike or other casualty. A "Casualty Loss Termination" means any termination of the Lease resulting from the occurrence of a Casualty Loss. Pursuant to the terms of the Trust Agreement, the Trustee, in its capacity as landlord under the Lease, has been irrevocably instructed not to exercise its right to terminate the Lease upon the occurrence of a Casualty Loss. See "THE LEASE -- Fire and Other Casualty."

Rental Interruption Insurance. Provided the same may be obtained on commercially reasonable terms, the Trustee shall, or shall cause the Servicer to, obtain and maintain at all times during the last two years of the Initial Term rental interruption insurance in an amount equal to the lesser of (i) 125% of the Prepayment Amount applicable as of the first month of the penultimate year of the Initial Term; and (ii) the total rent payable under the Lease during the final two years of the Initial Term. Such rental interruption insurance shall be on such terms and conditions as shall be customary insuring the Trust against interruption of rental payments under the Lease, and the cost of such rental interruption insurance shall constitute a Reimbursable Cost under the Trust Agreement. Such rental interruption insurance shall be written by a company having a claims-paying ability rating of "BBB+" or better as determined by Standard & Poor's Corporation.

To fund its obligations to maintain rental interruption insurance, the Trustee shall establish and maintain a segregated trust account (the "Rental Insurance Reserve Account"), into which shall be deposited from funds otherwise constituting Distributable Funds on the initial Distribution Date with respect to the Certificates the amount of $28,200. Funds in the Rental Insurance Reserve Account will be invested as provided in the Trust Agreement in Eligible Investments. If, after acquiring such rental interruption insurance during the last two years of the Initial Term, there shall remain any unapplied balance in the Rental Insurance Reserve Account, such unapplied balance shall be distributed to the Certificateholders.

Condemnation. In the event of a Partial Condemnation affecting the Property, the Trustee shall deposit the Net Compensation received by the Trustee from such Partial Condemnation into a segregated trust account at an Eligible Bank (the "Condemnation Account"), and the proceeds therein shall be applied by the Servicer on behalf of the Trustee in accordance with the provisions of the Lease (or the comparable provisions of any Replacement Lease) respecting payments to be made to the Tenant (or any Replacement Tenant) in connection with the restoration of the Property by the Tenant as required by the Lease. See "THE LEASE -- Condemnation." If, after making all payments of Net Compensation required to be made to the Tenant (or any Replacement Tenant) there shall remain any unapplied balance of the Net Compensation in the Condemnation Account, such unapplied balance shall be paid over to the Remainder Trustee.

If there shall occur a Total Condemnation, the Trustee shall give written notice thereof to the Certificateholders not later than five business days after the Trustee shall have obtained knowledge of such Total Condemnation. Thereafter the Trustee shall, upon the written direction (or consent) of the Certificateholders, exercise the rights and perform the obligations of the Trust, in its capacity as landlord under the Lease, under the provisions of the Lease governing a Total Condemnation (or the comparable provisions of any Replacement Lease). Notwithstanding the foregoing and notwithstanding any direction to the contrary of the Certificateholders, the Trustee is irrevocably instructed to accept the Tenant's offer to purchase the Property required to be made upon the occurrence of a Total Condemnation pursuant to the provisions of the Lease (or the comparable provisions of any Replacement Lease). See "THE LEASE -- Condemnation." The proceeds received by the Trustee from such sale shall be thereupon deposited into the Certificate Distribution Account, and such proceeds shall be distributed in accordance with the provisions of the Trust Agreement governing a Termination Event. See "-- Termination of the Trust," below.

Termination of the Trust

The Trust Agreement and the trust created thereby will terminate upon the final distribution by the Trustee of all monies of the Trust Estate following the earlier of (i) December 31, 2009, (ii) the occurrence of a Total Condemnation, or (iii) the failure of holders of Certificates to give to the Trustee certain financial assurances and indemnities upon the occurrence of a Event of Default under the Lease or upon the occurrence of a Casualty Loss Termination (each such event set forth in clauses (i), (ii) and (iii) a "Termination Event", and each event set forth in clause (iii) a "Section 6.2 Termination Event"). In no other event will the Trust Agreement terminate, and neither the Trustee nor the holders of the Certificates have the right to terminate the Trust Agreement. Within 30 days following the occurrence of a Termination Event, the Trustee shall give notice to the holders of the Certificates, which notice shall state (i) the Final Distribution Date at which time final payment of the Certificates shall be made upon presentation and surrender of the Certificates at the office of the Trustee; (ii) the amount (if then known) of any such final payment; and (iii) that payments will be made only upon presentation and surrender of the Certificates at the office of the Trustee therein specified. Upon presentation and surrender of the Certificates, the Trustee shall cause to be distributed to Certificateholders amounts distributable on such Final Distribution Date. The Final Distribution Date shall be not later than (i), in the event of a Total Condemnation, 30 days following receipt by the Trustee of the Net Compensation payable in connection therewith; (ii), in the case of a sale of the Property following a Section 6.2 Termination Event, 30 days following receipt by the Trustee of the proceeds from such sale; and (iii) not later than 30 days following December 31, 2009.

Upon the occurrence of a Section 6.2 Termination Event, the Trustee shall give a termination notice with respect thereto to the Certificateholders and the Trustee shall thereafter sell the Property at an open outcry auction held in a commercially reasonable manner and on commercially reasonable terms on a date not earlier than 30 days and not later than 90 days after such termination notice has been given by the Trustee.

Such termination notice shall specify the time, place and terms of such auction. The Trustee shall consult with the Servicer regarding the auctioneer to be engaged by the Trustee and the terms and conditions of the auction to be conducted thereby. The Servicer shall make a written recommendation to the Trustee regarding the identity of the auctioneer to be selected and the terms on which the auction should be conducted; provided, however, that in all events, the auctioneer will conduct any such auction (i) at the corporate trust office of the Trustee; (ii) on an open outcry basis with no reserve price or minimum bid; (iii) only after publication of the time and place for such auction in manner and with such publications as shall then be required to satisfy the requirements of the Uniform Commercial Code as then in effect in the jurisdiction in which such auction shall beheld, with respect to sales or collateral thereunder; (iv) pursuant to bidding rules that shall specify the form of purchase and sale agreement to be entered into between the Trustee and the successful bidder at the auction; and (v) substantially in accordance with the rules or procedures recommended by the Servicer and counsel engaged by the Trustee in connection with such auction. Certificateholders and any person controlling or controlled by, owning, owned by or under common ownership with any Certificateholder, shall not be entitled to participate in such auction.

Upon the occurrence of a Total Condemnation, the Trustee shall, in connection with the winding up of the Trust, distribute the Net Compensation (i) first, to the Certificateholders, to the extent of the applicable Prepayment Amount as determined pursuant to Appendix B of the Trust Agreement (or the amount of the Net Compensation, if the Net Compensation is less than the applicable Prepayment Amount) and (ii) second, the balance, if any, to the Remainder Trustee.

Assignment of Lease

The Trust Agreement provides that the Trustee shall not consent to any assignment of the Lease or sublease of any material portion of the Real Property by the Tenant unless there shall then exist no default or Event of Default under the Lease, and either (i) after giving effect to the proposed assignment or sublease, the Tenant and the Guarantor under the Guaranty shall remain fully liable for each and every of the obligations of the Tenant under the Lease and shall confirm the same in writing to the Trustee and the proposed assignee or sublessee shall execute and deliver a written agreement agreeing to be bound by the terms and conditions of the Lease; or (ii) the Trustee shall have notified the Certificateholders in writing describing the proposed assignment or sublease and Certificateholders having at least a majority of the Voting Interests shall have approved in writing the proposed assignment or sublease. The Trustee has agreed to provide a copy of any notice given pursuant to this paragraph to Standard & Poor's Corporation.

Amendments

The Trust Agreement may be amended by the Trustee with the consent of the holders of 51% or more of the Voting Interests only for the limited purposes of (i) curing any ambiguity; (ii) correcting or supplementing any provision in the Trust Agreement that may be defective or inconsistent with any other provision; (iii) as shall be required in connection with the acceptance of the appointment of a successor Trustee in respect to the Trust Property; or (iv) and as may be required to facilitate the administration of the Trust under the Trust Agreement by more than one Trustee pursuant to Article VI of the Trust Agreement. The Trust Agreement may not otherwise be amended.

The Trustee

The First National Bank of Chicago will serve as Trustee. The Trustee, in its individual capacity or otherwise, and any of its affiliates, may hold Certificates in their own name or as pledgee. In addition, for the purpose of meeting the legal requirements of certain jurisdictions, the Trustee will have the power to appoint co-trustees or separate trustees of all or any part of the Trust. In the event of such appointment, all rights, powers, duties and obligations conferred or imposed upon the Trustee by the Trust Agreement will be conferred or imposed upon the Trustee and such co-trustee or separate trustee jointly or, in any jurisdiction where the Trustee is incompetent or unqualified to perform certain acts, singly upon such co-trustee or separate trustee who shall exercise and perform such rights, powers, duties and obligations solely at the direction of the Trustee.

The Trustee may resign at any time, in which event the Certificateholders may appoint a successor trustee. The Certificateholders may also remove the Trustee if the Trustee ceases to be eligible to serve, becomes legally unable to act, is adjudged insolvent or is placed in receivership or similar proceedings.

The Trust Agreement provides that the fees and expenses of the Trustee constitute Reimbursable Costs, reimbursable from funds on deposit in the Certificate Distribution Account created pursuant to the Trust Agreement.

The Trustee's Corporate Trust Office is located at One First National Plaza, Suite 0126, Chicago, Illinois 60670-0126. The Seller and its affiliates may have other banking relationships with the Trustee and its affiliates in the ordinary course of their respective businesses.

The Administration Agreement

The First Amended and Restated Administration Agreement, dated as of August 25, 1995 (the "Administration Agreement"), between the Trustee and American National Bank and Trust Company of Chicago, as Remainder Trustee, imposes certain notice and other obligations upon the Trustee and the Remainder Trustee. In particular, the Trustee is required to send to the Remainder Trustee copies of (i) all notices received from the Tenant or from Certificateholders after the occurrence of an Event of Default under the Lease; (ii) all notices sent to Certificateholders pursuant to any of the terms of Section 6.2 of the Trust Agreement (see "THE TRUST AGREEMENT -- Specific Duties of Trustee -- Casualty Loss" and "-- Condemnation"); and (iii) any notice pertaining to a Termination Event given or received by the Trustee pursuant to the terms of the Trust Agreement.

In addition, the Trustee shall provide to the Remainder Trustee, and if the Trust has not previously terminated, the Remainder Trustee shall provide to the Trustee, copies of all written materials, bid packages, invitations to bid, or other materials prepared by or for the Trustee or the Remainder Trustee, as the case may be, in connection with any auction to be held pursuant to Section 7.2 of the Trust Agreement or the provisions of the Remainder Trust Agreement, in each case so long as such materials are made generally available to potential bidders at such auction.

Pursuant to the terms of the Administration Agreement, the Remainder Trustee shall have the right, upon reasonable advance written notice to the Trustee, to have the Property inspected during normal business hours not more than two times in each 12 calendar month period. Such inspection shall be performed in a manner so as to minimize, to the extent reasonably practicable, any disruption to the Tenant, and as otherwise required pursuant to the terms of the Lease.

The Remainder Trustee has reserved any and all rights and remedies it may have, whether arising at law or in equity, to prevent the occurrence of waste at the Property, including without limitation, the commencement of any actions or legal proceedings against the Trustee or the Tenant as shall be deemed appropriate by the Remainder Trustee in its sole discretion.

THE SERVICING AGREEMENT

Set forth below is a summary of certain provisions of the Servicing Agreement between Scribcor, Inc., as initial Servicer, and the Trustee. The description and summaries of the Servicing Agreement hereinafter set forth do not purport to be comprehensive or definitive, and reference is made to the Trust Agreement for the complete details of all terms and conditions. All statements herein are qualified in their entirety by reference to the Servicing Agreement, a copy of which is attached as Exhibit F to this Offering Memorandum.

General

Pursuant to the terms of the Servicing Agreement, the Servicer has been authorized to act as agent for the Trustee with respect to (a) monitoring the performance of the Tenant under the Lease, (b) undertaking certain collection obligations of the Trust, as landlord under the Lease, and (c) pursuing, on behalf of the Trustee, certain remedies available to the Trust, as landlord under the Lease, upon the occurrence of a default thereunder.

Scribcor, Inc. has been appointed as initial Servicer under the terms of the Servicing Agreement. Founded in 1891, Scribcor is a privately-held firm focusing on management, leasing and consulting in the Midwest commercial and industrial real estate market. At March 31, 1995, the Servicer managed in excess of 3.5 million square feet of commercial office space, and clients of the Servicer include Wm. Wrigley Jr. Company and IBM Corporation.

Duties of Servicer

Basic Services. The Servicer has been engaged to monitor on behalf of the Trustee the performance by the Tenant under the Lease, to give and receive notices required or appropriate to be given or received by the Trustee (in its capacity as landlord under the Lease) and to otherwise perform on behalf of the Trustee the obligations imposed under the Lease upon the Trustee (in its capacity as landlord under the Lease). The Servicer shall inspect the Property not less frequently than two times in each twelve calendar month period during the term of the Servicing Agreement for the purpose of determining Tenant's compliance with the terms of the Lease, and Servicer shall prepare and deliver to the Trustee a report reflecting the results of such inspection. Among other things, the Servicer shall perform certain billing services, including the rendering of monthly invoices for rent, and refer to the Trustee any communications received by the Servicer from the Tenant concerning payment disputes, any proposed transfer of the Tenant's interest in the Lease, and any communications respecting matters which constitute or, with the passage of time or the giving of notice or both would constitute, an Event of Default under the Lease. The Servicer shall review the financial and legal covenants contained in the Lease as necessary to accurately monitor Tenant's performance thereunder and, in connection therewith, the Servicer has agreed to immediately notify Trustee upon obtaining knowledge that the insurance required under the Lease is not being maintained strictly in accordance with terms thereof.

The Servicer shall direct the Tenant to make all payments required to be made by the Tenant under the Lease directly to the Trustee for deposit into the Certificate Distribution Account. If the Servicer shall receive any collections of rent or other payments directly, the Servicer shall cause such collections to be deposited into the Certificate Distribution Account no later than the business day following receipt thereof.

The Servicer shall receive as compensation for performance of the basic monitoring services described above an annual fee in the amount of $2,500, which shall be payable annually in advance in a single installment.

Additional Services. If an Event of Default shall occur under the Lease, the Servicer shall give a default notice with respect thereto to the Tenant and to the Trustee not later than two business days after the date in which the Servicer first obtains knowledge of the occurrence of such Event of Default. If so directed in writing by the Trustee, the Servicer shall initiate such actions, including the commencement of legal proceedings as shall, in the judgment of counsel retained by the Trustee for such purpose, be necessary or appropriate to preserve the Trust Estate and enforce the rights and remedies of the Trustee, in its capacity as landlord under the Lease (collectively, "Enforcement Proceedings"). In connection with Enforcement Proceedings, the Servicer shall obtain an inspection of the Property, including a Phase I environmental inspection, and shall deliver copies of any report prepared in connection therewith to the Trustee promptly upon receipt. All reasonable third party costs and expenses incurred by the Servicer in pursuing such Enforcement Proceedings shall constitute Reimbursable Costs under the Servicing Agreement and the Trust Agreement.

Upon the termination of the Lease or Tenant's right to possession of the Property under the Lease resulting from an Event of Default, Casualty Loss Termination or Total Condemnation, the Trustee may direct the Servicer to provide "Property Management Services" and to otherwise initiate such actions as are, in the reasonable judgment of the Servicer, necessary and appropriate to (i) maintain the Property (including without limitation the payment of real property taxes, insurance premiums and other reasonable costs and expenses of maintaining the Property in good operating condition and in compliance with all laws); and (ii), if so directed in writing by the Trustee, procure a Replacement Lease or leases on such terms and conditions as shall be approved in writing by the Trustee. All reasonable costs and expenses incurred by the Servicer in performing Property Management Services shall constitute Reimbursable Costs under the Servicing Agreement and the Trust Agreement. "Property Management Services" shall mean such usual and customary activities as are required to oversee and perform all aspects of the day-to-day management, oversight, operation and maintenance of the Property in a manner consistent with the servicing standard set forth in the Servicing Agreement and so as to cause the Property to be maintained in good condition and in compliance with all laws. The Trustee and the Servicer shall enter into an amendment to the Servicing Agreement setting forth the agreed upon scope of and compensation for Property Management Services at the time the same are requested by the Trustee, which amendment shall have been submitted to Standard & Poor's Corporation ("S&P"), and S&P shall have confirmed that such amendment shall not result in a downgrade, qualification or withdrawal of its then-assigned rating with respect to the Certificates.

In the event of a Casualty Loss affecting the Property in connection with which the amount of casualty proceeds payable with respect to such Casualty Loss shall be $100,000 or more, the Servicer will give written notice thereof to the Trustee not later than three business days after the Servicer shall have obtained knowledge of such Casualty Loss. Thereafter, the Trustee shall direct the Servicer to exercise the rights and perform the obligations of the Trustee, subject to the provisions of the Servicing Agreement and the Trust Agreement, in its capacity as landlord under the Lease, in accordance with Section XIV of the Lease (or the comparable provisions of any Replacement Lease) in connection with the settlement of all insurance claims relating to such Casualty Loss in connection with the restoration of the Property by the Tenant as required pursuant to Article XIV.A. of the Lease (collectively, "Casualty Services"). See "THE TRUST AGREEMENT -- Specific Duties of Trustee -- Casualty Loss."

Upon the occurrence of a Casualty Loss Termination during the last two years of the Term of the Lease and following deposit of the Net Casualty Proceeds resulting therefrom into the Casualty Account, such proceeds shall be administered by the Servicer, at the direction of the Trustee, to engage a Qualified Contractor and to restore the Property to substantially the same condition as existed immediately prior to the Casualty Loss giving rise to the Casualty Loss Termination. Without limiting the foregoing, the Servicer shall perform on behalf of the Trustee the obligations of the Trustee upon the occurrence of a Casualty Loss resulting in a Casualty Loss Termination, all as set forth in the Trust Agreement. See "THE TRUST AGREEMENT -- Specific Duties of Trustee -- Casualty Loss."

In the event of a Total Condemnation, the Servicer shall give written notice thereof to the Trustee not later than three business days after Servicer shall have obtained actual knowledge of such Total Condemnation. Thereafter, the Servicer shall take such actions as are reasonably necessary to assist the Trustee in completing the sale of the Property pursuant to Section XV of the Lease. See "THE TRUST AGREEMENT -- Specific Duties of Trustee -- Condemnation."

For performing the Property Management Services and services associated with a Casualty Loss, Total Condemnation and/or a construction management function (collectively, the "Additional Services"), the Servicer shall receive an additional servicing fee in an amount to be determined by the Trustee and the Servicer, based upon the submission by the Servicer of a proposed scope of service and budget therefor; provided, however, that the amount of any additional servicing fee shall have been submitted to S&P, and S&P shall have confirmed that payment of such additional servicing fee shall not result in a downgrade, qualification or withdrawal of its then-assigned rating with respect to the Certificates. In each case, the Servicer shall be entitled to receive, in addition to the basic servicing fee and such additional servicing fee associated with Additional Services, all Reimbursable Costs reasonably incurred in connection with the performance of such Additional Services.

Servicing Standard

The Servicing Agreement provides that the Servicer shall perform its obligations thereunder with reasonable care and in a manner consistent with prudent industry standards for commercial property managers. Without limiting the foregoing, the Servicer shall provide services under the Servicing Agreement with at least the same level of care, skill, prudence and diligence used by the Servicer in connection with the servicing and administration of similar assets by the Servicer for its own account and for the accounts of others, giving due consideration to customary and usual property servicing and management practices of a prudent property and asset manager, the restrictions placed on the Servicer's activities as provided in the Servicing Agreement, and the limited scope of the Servicer's obligations under the Servicing Agreement.

Other Matters

In connection with the performance of its obligations under the Servicing Agreement, the Servicer shall maintain at its expense a blanket fidelity bond covering all of Servicer's officers, employees or other persons acting in any capacity, permitting such persons to handle funds, money, documents and papers related to the Property. The Servicer shall also obtain and maintain at all times prescribed insurance coverages, with respect to which the issuer, policy form and terms, coverage limits and deductibles shall be as reasonably required by the Trustee from time to time.

The Servicer shall annually deliver to the Trustee an officer's certificate stating that (a) a review of the activities of the Servicer during the proceeding calendar year and of its performance under the Servicing Agreement has been made under such officer's supervision and (b), to the best of such officer's knowledge, the Servicer has fulfilled all of its obligations under the Servicing Agreement throughout such year or, if there has been a default in the fulfillment of any such obligation, such Certificate shall specify each such default known to such officer and the nature and status thereof.

The Servicing Agreement provides that the Servicer will defend and indemnify the Trust and Certificateholders against any and all costs, expenses, losses, damages claims and liabilities, including reasonable fees and expenses of counsel and expenses of litigation, arising out of or resulting from the willful failure, or gross negligence of the Servicer in the performance of its duties under the Servicing Agreement. The Servicer's obligations to indemnify the Trust and the Certificateholders for the Servicer's actions or omissions will survive the removal of the Servicer, but will not apply to any action or omission of a successor Servicer.

The Servicing Agreement provides that the Servicer may not resign from its obligations and duties as Servicer thereunder, except upon a determination that the Servicer's performance of such duties is no longer permissible under applicable law. No such resignation will become effective until the Trustee or a successor Servicer has assumed the Servicer's servicing obligations and duties under the Servicing Agreement.

Any corporation or other entity into which the Servicer may be merged or consolidated into, or that may result from any merger, conversion or consolidation to which the Servicer is a party, or any entity that may succeed by purchase and assumption to all or substantially all of the business of the Servicer, or the Servicer is not the surviving entity and where such corporation or other entity assumes the obligation of the Servicer under the Servicing Agreement, who will be the successor to the Servicer under the Servicing Agreement.

Events of Termination

The following events will constitute "Events of Termination" under the Servicing Agreement:

(i) any failure by the Servicer to remit or deposit any payment required to be made under the terms of the Servicing Agreement, which failure continues beyond the second day following the date upon which such payment was due;

(ii) any failure by the Servicer duly to observe or perform in any material respect any covenant or agreement in the Servicing Agreement, which failure continues unremedied for 10 days after written notice of such failure is given to the Servicer by the Trustee or to the Servicer and the Trustee by the holders of Certificates evidencing not less than a majority of the aggregate outstanding balance of the Certificates; and (iii) certain events of bankruptcy, receivership, insolvency or similar proceedings and certain actions by the Servicer indicating its insolvency pursuant to bankruptcy, receivership, conservatorship, insolvency or similar proceedings or its inability to pay its obligations.

The holders of Certificates evidencing not less than a majority of the aggregate outstanding balance thereof may waive any Event of Termination.

Rights Upon an Event of Termination

As long as an Event of Termination remains unremedied, the Trustee may terminate the Servicer's rights and obligations under the Servicing Agreement, whereupon the Trustee will succeed to all the responsibilities, duties and liabilities of the Servicer under the Servicing Agreement. Thereafter, the Trustee will be entitled to the same fee otherwise payable to the Servicer. The Trustee may appoint, or petition the court of competent jurisdiction for the appointment of, an eligible Servicer to act as successor to the outgoing Servicer under the Servicing Agreement. In no event may the servicing compensation to be paid to such successor be greater than the fee payable to the Servicer under the Servicing Agreement. In the event of the bankruptcy of the Servicer, the bankruptcy trustee or the Servicer, as debtor in possession, may have the power to prevent a termination of the Servicer's rights and obligations under the Servicing Agreement. A "Eligible Servicer" means a person which, at the time of its appointment as Servicer, (i) has not less than 10 years experience as a professional asset or property manager and is licensed (if required) to perform such services in the locale of the Property; (ii) then has under management a portfolio of commercial and office properties containing in the aggregate not less than 2,000,000 square feet, or with an aggregate fair market value of not less than $20,000,000; and (iii) then has not fewer than 20 employees directly engaged in the provision of asset or property management services.

THE BUILDING AND THE PROPERTY

General

The Grantor has purchased for $10,455,000 the entire fee simple interest in the Kansas City Life Insurance Office Building, a 94,149 square foot office building (the "Building") located at 4900 Oak Street in the Country Club Plaza district of Kansas City, Missouri. The Country Club Plaza district is located approximately 4.5 miles south of Downtown Kansas City. The Building was constructed in 1960 and substantial renovations were completed by the Subtenant for approximately $1.5 million on the Building in 1992.

The Building

The Building is a three-story office building containing 94,149 square feet of rentable area, of which approximately 27,780 square feet comprise a basement containing a mailroom, print shop, cafeteria, boiler room and restrooms. A sprinklered garage containing 76,341 square feet adjoins and is connected to the structure and provides sheltered parking for 250 vehicles. The Building was constructed in 1960, and substantial renovations were completed in 1992. The Building is of steel beam and column construction, with exterior walls of concrete panels, brick, decorative marble and glass. The Building's heating/ventilating/air conditioning system consists of hot and cold deck systems which utilize two gas hot water heaters, each with 37,000,000 BTUs of heating capacity, together with two 200 ton Carrier centrifugal chillers. The Grantor believes that the Building is in very good physical condition.

The Property

The Building and its adjoining garage are located approximately 4.5 miles south of downtown Kansas City on a 2.091 acre parcel in an area commonly referred to as the Country Club Plaza district of Kansas City, Missouri. The Property, situate at the intersection of Volker Boulevard and Oak Street, is located directly across from the campus of the University of Missouri at Kansas City and is surrounded by several other office buildings, medical research facilities and high-quality residential developments. Access to the Property site is along both Volker Boulevard and Oak Street, with a circular drive running to the Building's front entrance off of Oak Street.

The Country Club Plaza district of Kansas City is anchored by the Country Club

Plaza retail development, which was established in 1920's as the country's first "shopping center." Country Club Plaza remains one of the most prestigious retail locations in Kansas City, attracting quality tenants including Saks Fifth Avenue, Tiffany, Brooks Brothers, Dillard's and Ralph Lauren/Polo, among others. Country Club Plaza is located less than one mile from the Property. The area surrounding the Property is fully developed, made up of approximately 45% single family residential, 15% institutional, 15% commercial retail, 15% multi-family residential and 10% commercial office buildings.

The Kansas City, Missouri/Kansas metropolitan area is the 28th largest in the United States, with a population in excess of 1.5 million. The economy of the region is diversified, with the manufacturing, wholesale/retail services and government sectors each contributing in excess of 15% of the non-agricultural jobs in the region. Transportation, finance, insurance and real estate are also substantial contributors to the region's economy.

INVESTMENT CONSIDERATIONS

The purchase of Certificates involves substantial risks for investors. In addition to general investment risks and the factors described elsewhere herein, a prospective purchaser of Certificates should consider the following factors.

Real Estate Investment Risks

An investment in Certificates will be subject to many of the risks generally associated with the ownership of real property, including the possibility of adverse changes in national and local economic conditions; changes in rates of inflation; changes in the real estate investment climate; adverse changes in local market conditions due to changes in general or local economic conditions and neighborhood characteristics; adverse changes in governmental rules and fiscal policies; natural disasters, including earthquakes (which may result in uninsured losses) and other factors which are beyond the control of the Grantor.

No Operating History

The Trust is newly formed and has no operating history.

Casualty Loss Risk

If the Building, or any part thereof, is damaged or destroyed by fire or other casualty during the term of the Lease (except during the second to last and final year of the term), Tenant is obligated to promptly repair or restore the Building to substantially the same condition it was in immediately prior to such fire or casualty, and Tenant's obligation to pay Base Rent and to perform its other obligations under the Lease will not be suspended, abated or reduced as a result thereof.

In the event of (a) damage or destruction during the second to last year of the Term (the repair and restoration of which would cost in excess of 75% of the replacement value of the Building) or (b) damage or destruction during the last year of the Term (the repair and restoration of which would cost in excess of 25% of the replacement value of the Building), the Tenant may terminate the Lease, provided that any and all insurance proceeds in such case received by Tenant are required to be paid to and assigned to the Trust. In each such case, the Trustee, in its capacity as landlord under the Lease and pursuant to the terms of the Trust Agreement, is obligated to utilize such insurance proceeds to restore the Building to substantially the same condition as existed immediately prior to the Casualty Loss giving rise to such Casualty Loss Termination.

In accordance with the terms of the Lease, Tenant is required to maintain all-risk property and casualty insurance for the full (100%) replacement cost of the Property (with a deductible of not more than $25,000). See "THE LEASE -- Insurance." The Trustee is required pursuant to the Trust Agreement to procure rental interruption insurance in an amount sufficient to assure that holders of Certificates will receive when due monthly Certificate Payments with respect to the Certificates. There can be no assurance that receipt by the Trustee of any such casualty insurance or rental interruption insurance proceeds will be at such time or times sufficient to assure timely payment with respect to the Certificates. See "THE TRUST AGREEMENT -- Specific Duties of Trustee -- Rental Interruption Insurance."

Tenant Lease Payments -- Bankruptcy Considerations

The sole source of payment of Certificate Payments with respect to the Certificates will be the Tenant's monthly Lease Payments of Base Rent under the Lease. The Trust, as landlord under the Lease, will be entitled to receive directly all payments made by the Tenant pursuant to the Lease.

If the Tenant and Kansas City Life are unable to make their respective payments required under the Lease and Guaranty, respectively, there can be no assurance that the Trust will be able to obtain a substitute tenant or tenants willing to make rental payments sufficient to generate Lease Payments with respect to the Certificates, and to otherwise pay operating expenses and tax payments associated with the Building. It is not possible to predict the future demand for, or rents associated with, office space in the Building's market.

In a bankruptcy proceeding involving the Tenant, the Tenant would have the option to assume or reject the Lease. If the Tenant elects to assume its obligations under the Lease, it could do so only upon approval of the bankruptcy court following a hearing at which the financial burdens and business purpose of the assumption were presented, and at which the Tenant's other creditors were given an opportunity to participate. If the bankruptcy court allowed the Tenant to reject the Lease, the Trust would be entitled to file a claim for its actual rejection damages or a formula amount, whichever is less. Under the formula, rejection damages are allowed in an amount equal to the greater of (a) one year's rent or (b) 15% of the total rent remaining due under the Lease, up to a maximum of three years' rent. The rejection damages claim, plus any unpaid pre-bankruptcy rent, would be treated as a pre-bankruptcy general unsecured claim against the Tenant. It is not possible to predict what action a bankruptcy court might take with respect to the Lease, although typically a bankruptcy court defers to the judgment of the debtor (the Tenant) or bankruptcy trustee, as the case may be. In any bankruptcy of the Tenant, it is possible that there may not be sufficient assets to pay in full pre-bankruptcy unsecured claims, including the claim of the Trust. Accordingly, there is no assurance that the damages actually recovered in a bankruptcy case would be sufficient to pay the full amount of Lease Payments with respect to the Certificates.

If Kansas City Life were also a debtor in a bankruptcy case, or failed to make payments of rent or other obligations when due, the Trust would be entitled under certain circumstances to file a claim under the Guaranty for the Lease Payments due with respect to the Certificates. Kansas City Life's obligations under the Guaranty are intended to be contractually independent of the Tenant's obligations under the Lease so that a claim against Kansas City Life under the Guaranty might not be subject to the same limitation on rejection damages described above as might be applicable to the Trust's claim against the Tenant under the Lease. However, it is not free from doubt that the independence of such obligation from the Tenant's obligations under the Lease would be preserved by a bankruptcy court in a proceeding involving Kansas City Life as the debtor, and such obligations may be subject to the rejection formula described above in bankruptcy proceedings involving the Tenant. If the Tenant rejected the Lease in a bankruptcy proceeding, its obligations to pay rent would be terminated (subject to the receipt by the Trust of any rejection damages).

If the Tenant were a debtor in a bankruptcy case and Kansas City Life were not, the Trust, to the extent permitted by law, would be entitled, in certain circumstances provided for in the Guaranty, to pursue an action against Kansas City Life for payments due under the Lease. Kansas City Life's obligations under the Guaranty are contractually independent of the Tenant's obligations under the Lease and an action against Kansas City Life under the Guaranty should not be subject to the same limitation on rejection damages as might be applicable to the Trust's claim against the Tenant under the Lease. If the Tenant rejected the Lease in a bankruptcy proceeding, its obligations to pay rent would be terminated (subject to receipt of any rejection damages as described above).

Lack of Liquidity

There is no established market for the Certificates and the Grantor does not anticipate that any such market will develop. Consequently, holders may not be able to liquidate their investment in the event of an emergency or for other reasons. Purchase of a Certificate is therefore suitable only for persons who have no need for liquidity with respect to their investment and who are able to bear the economic risks of their investment for an unlimited period of time.

Securities Law Aspects

The Certificates have not been registered under the Act or the Illinois Securities Act in reliance upon certain exemptions from registration thereunder. The Grantor believes that the offering presently qualifies and, where appropriate, will continue to qualify under the exemptions. However, since the availability of certain of these exemptions is based upon subjective factors, and in some instances the criteria for exemption are subject to reinterpretation by state or federal regulatory agencies and courts, there can be no assurance that such exemptions will be determined to be available.

ERISA Considerations

The Employee Retirement Income Security Act of 1974, as amended ("ERISA"), and the Internal Revenue Code of 1986, as amended (the "Code") generally prohibit certain transactions between a qualified employee benefit plan under ERISA (an "ERISA Plan") and persons who, with respect to that plan, are fiduciaries or other "parties in interest" within the meaning of ERISA or a "disqualified person" within the meaning of the Code. In the absence of an applicable administrative exemption, transactions between an ERISA Plan and a party in interest with respect to an ERISA Plan, including the acquisition by one from the other of a Certificate, could be viewed as violating those prohibitions. In this regard, the Tenant or Kansas City Life might be considered or might become a "party in interest" within the meaning of ERISA or a "disqualified person" within the meaning of the Code, with respect to an ERISA Plan. Prohibited transactions within the meaning of ERISA and the Code may arise if Certificates are acquired by an ERISA Plan with respect to which the Tenant or Kansas City Life is a party in interest or a disqualified person. In all events, fiduciaries of ERISA Plans, in consultation with their advisors, should carefully consider the impact of ERISA and the Code on an investment in Certificates.

FEDERAL INCOME TAX MATTERS

PROSPECTIVE INVESTORS ARE URGED TO CONSULT THEIR PERSONAL TAX ADVISORS WITH RESPECT TO THE FEDERAL, STATE, AND LOCAL INCOME TAX CONSEQUENCES OF PURCHASING CERTIFICATES.

The following is a summary of the material federal income tax consequences to holders of Certificates. This summary is based upon the Internal Revenue Code of 1986, as amended (the "Code"), and upon rules and regulations promulgated under the Code and existing interpretations thereof, any of which could be changed at any time, by legislation or otherwise. Any of such changes may or may not be retroactive with respect to transactions consummated prior to the date such changes are announced. The discussion below does not purport to address federal income tax consequences applicable to particular categories of investors, some of which (e.g., banks, tax-exempt organizations, insurance companies or foreign investors) may be subject to special rules. No rulings will be sought from the Internal Revenue Service with respect to any of the matters discussed herein.

In the opinion of Kirkland & Ellis, special tax counsel to the Grantor, the Term Trust will be classified for Federal income tax purposes as a grantor trust and not as an association taxable as a corporation. Accordingly, each holder of a Certificate will be subject to federal income taxation as if it owned directly its proportionate interest in each asset owned by the Trust. Each holder of Certificates will be required to report on its federal income tax return its pro rata share of each item of income, gain, loss, deduction or credit from the Property held in the Trust, in accordance with such holder's method of accounting.

Subject to the restriction set forth in the succeeding paragraph, in the opinion of Kirkland & Ellis, each holder of a Certificate will be entitled to amortize its tax basis in the Certificate. Section 167(a) of the Code provides a depreciation deduction for business or income-producing property which obsolesces or "wastes away" over a reasonably determinable time period. The Term Interest held by the Trust is a term-of-years interest in real property which produces income under the Lease, the value of which decreases commensurately with the passage of time. Therefore, as a general matter, the Term Interest constitutes a depreciable asset and each holder of a Certificate is entitled to claim a deduction, for each taxable year during which it holds such Certificate, in an amount equal to (1) its adjusted tax basis in such Certificate, divided by (2) the number of years, including the current year, remaining in the term of the Term Interest. (This amount may have to be prorated if a holder holds a Certificate during less than all of a taxable year.) Under Section 167(c) of the Code, none of a Certificate holder's adjusted tax basis is allocable to, and no separate depreciation deduction is allowable for, the Trust's interest in the Lease.

However, Section 167(e) of the Code prohibits the taking of a depreciation deduction (under Section 167 or any other income tax provision of the Code) with respect to a term interest in property for any period during which the remainder interest in such property is held (directly or indirectly) by a related person. For this purpose, "related person" is defined very broadly by reference to Code Sections 267(b) and (e) and includes family members, corporations, partnerships and/or trusts having 50% or more cross-ownership or common ownership, among other relationships. Moreover, these related person rules are expanded as applied to "pass-thru entities," including Subchapter S corporations and partnerships (and limited liability companies structured to be taxable as partnerships under the Code). Under these expanded rules, as applied for purposes of Section 167(e), if, for example, a partnership owned the Term Interest, no depreciation deduction would be allowable if any of its partners, or any family member of any of its partners, or any corporation in the same controlled group as any of its partners, etc., owned (directly or indirectly) the Remainder interest (or any other remainder interest) in the Property. For purposes of rendering its opinion, Kirkland & Ellis has assumed that no holder of a Certificate or "related person" owns or will own (directly or indirectly) the LURE® interest or any other remainder interest in the Property.

A holder that sells or exchanges a Certificate should recognize gain or loss equal to the difference between its adjusted tax basis in the Certificate and the amount realized upon such sale or exchange. If the holder held such Certificate as a capital asset, any such gain or loss will be capital gain or loss, which will be long-term capital gain or loss if the Certificate was held for more than one year. Any long-term capital gains realized on the sale or exchange of a Certificate will be taxable under current law to corporate taxpayers at the rates applicable to ordinary income, and to individual taxpayers at a maximum marginal rate of 28%. Any capital losses realized generally will be deductible by a corporate taxpayer only to the extent of capital gains and by an individual taxpayer only to the extent of capital gains plus $3,000 of other income.

PLAN OF DISTRIBUTION

Pursuant to a placement agreement (the "Placement Agreement") between the Grantor and William Blair & Company (the "Placement Agent"), the Placement Agent has agreed to use its best efforts to solicit the purchase of the Certificates. The Grantor has agreed to pay the Placement Agent a fee as compensation for its services in connection with the issuance and sale of the Certificates.

The Grantor has agreed to indemnify the Placement Agent against certain civil liabilities, including certain liabilities arising out of any incorrect statements or information or omissions in or for this Offering Memorandum, and to contribute with respect to payments that the Placement Agent may be required to make in respect thereof.

RATING

Standard & Poor's, a division of The McGraw-Hill Companies ("S&P"), has assigned the Certificates a rating of "A+". No application was made to any other rating agency for the purpose of obtaining an additional rating of the Certificates. A rating reflects only the views of S&P, and an explanation of the significance of such rating may be obtained from S&P. The Grantor has furnished to S&P information and materials in order to secure a rating for the Certificates, including certain information and materials which have not been included in the Official Memorandum. Once assigned, there is no assurance that any rating will continue for any given period of time, or that it will not be revised downward or withdrawn entirely by the issuing rating agency if, in its judgment, circumstances so warrant. Any downward revision or withdrawal of a rating assigned to the Certificates may have an adverse effect on the market price of the Certificates.

A security rating is not a recommendation to buy, sell or hold securities, may be subject to revision or withdrawal at any time by the assigning rating agency, and should be evaluated independently of any other rating.

Kansas City Life is the guarantor of the Tenant's obligations under the Lease and, as such, may become the ultimate source of payment on the Certificates. Because of this dependence upon Kansas City Life for the ultimate payment of the Certificates, the rating on the Certificates is directly related to the credit of Kansas City Life. It should, therefore, be expected that a reduction, withdrawal or qualification of the debt ratings of Kansas City Life would adversely affect the rating on the Certificates.

REPORTS TO CERTIFICATEHOLDERS

The Trustee will furnish to each holder of Certificates certain reports, statements and tax information, as set forth in the Trust Agreement, a copy of which is attached as Exhibit D, including such information necessary in the preparation of the Certificateholders' federal income tax returns.

ADDITIONAL INQUIRIES

The Grantor will make every effort to furnish to any qualified prospective investor any additional information, or opportunity for inquiry, concerning the terms and conditions of this offering, including information requested to verify the accuracy of the information contained in this Offering Memorandum or otherwise furnished the prospective investor.

LEGAL MATTERS

The legality of the Certificates offered hereby will be passed upon for the Grantor by Gardner, Carton & Douglas, Chicago, Illinois. Gardner, Carton & Douglas has served as special securities counsel to the Grantor and certain affiliates of the Grantor. Certain tax matters relating to the Trust, the Certificates and the Term Interest will be passed upon for the Grantor by Kirkland & Ellis, Chicago, Illinois.

ENFORCEABILITY OF REMEDIES

The remedies available to the Trustee or the owners of the Certificates upon an event of default under the Lease or the Trust Agreement are in many respects dependent upon judicial actions that are often subject to discretion and delay. Under existing constitutional and statutory law and judicial decisions, including specifically Title 11 of the United States Code (the "Bankruptcy Code"), the remedies specified by the Lease or the Trust Agreement may not be readily available or may be limited. The various legal opinions to be delivered concurrently with the delivery of the Certificates will be qualified as to the enforceability of the various legal instruments by limitations imposed by principles of equity and by bankruptcy, reorganization, insolvency, moratorium or other similar laws affecting the rights of creditors generally. Similarly, the remedies available to the Trustee under the Lease may be subject to common law principles and statutory provisions affecting the rights of landlords and tenants.

`NOTICE TO INVESTORS

Because of the following restrictions, purchasers are advised to consult legal counsel prior to making any offer, resale, pledge or other transfer of Certificates.

The Certificates have not been registered under the Securities Act or with any securities regulatory authority of any jurisdiction and, accordingly, may not be offered or sold within the United States except pursuant to an exemption from, or in a transaction not subject to, the registration requirements of the Securities Act. Accordingly, the Certificates are being offered and sold only to qualified institutional buyers ("QIBs"), as defined in Rule 144A, in compliance with Rule 144A.

Each purchaser of Certificates offered hereby, by its acceptance thereof, will be deemed to have acknowledged, represented to and agreed with the Grantor as follows:

1. It understands and acknowledges that the Certificates have not been registered under the Securities Act or any other applicable securities law, are being offered for resale in transactions not requiring registration under the Securities Act, or any other securities laws, and, unless so registered, may not be offered, sold or otherwise transferred except in compliance with the registration requirements of the Securities Act or any other applicable securities law, pursuant to an exemption therefrom or in a transaction not subject thereto and in each case in compliance with the conditions for transfer set forth in paragraph (4) below.

2. It is a "qualified institutional buyer" ("QIB"), as defined in Rule 144A promulgated under the Securities Act, and it is aware that any sale of the Certificates to it will be made in reliance on Rule 144A. Such acquisition will be for its own account or for the account of another QIB.

3. It will deliver to each person to whom it transfers Certificates notice of any restrictions on transfer of such Certificates.

4. It is purchasing the Certificates for its own account, or for one or more investor accounts for which it is acting as a fiduciary or agent, in each case for investment, and not with a view to, or for offer or sale in connection with, any distribution thereof in violation of the Securities Act, subject to any requirements of law that the disposition of its property or the property of such investor account or accounts be at all times within its or their control. It agrees on its own behalf and on behalf of any investor account for which it is purchasing the Certificates and each subsequent holder of the Certificates by its acceptance thereof will agree to offer, sell or otherwise transfer such Certificates only (a) to the Grantor, (b) pursuant to a registration statement which has been declared effective under the Securities Act, (c) for so long as the Certificates are eligible for resale pursuant to Rule 144A under the Securities Act, to a person it reasonably believes is a QIB that purchases for its own account or for the account of a QIB to whom notice is given that the transfer is being made in reliance on Rule 144A, (d) pursuant to offers and sales that occur outside the United States within the meaning of Regulation S under the Securities Act, or (e) pursuant to the exemption from registration provided by Rule 144 under the Securities Act, if available, and in each of the foregoing cases, in accordance with any applicable securities laws of any state of the United States. Each purchaser acknowledges that each Certificate will contain a legend substantially to the following effect:

THIS CERTIFICATE HAS NOT BEEN REGISTERED UNDER THE SECURITIES ACT OF 1933, AS AMENDED (THE "SECURITIES ACT") OR ANY STATE SECURITIES LAWS. NEITHER THIS CERTIFICATE NOR ANY INTEREST OR PARTICIPATION HEREIN MAY BE REOFFERED, SOLD, ASSIGNED, TRANSFERRED, PLEDGED, ENCUMBERED OR OTHERWISE DISPOSED OF IN THE ABSENCE OF SUCH REGISTRATION OR UNLESS SUCH TRANSACTION IS EXEMPT FROM, OR NOT SUBJECT TO, REGISTRATION.

THE HOLDER OF THIS CERTIFICATE BY ITS ACCEPTANCE HEREOF AGREES (A) TO OFFER, SELL OR OTHERWISE TRANSFER SUCH CERTIFICATE ONLY (1) TO THE GRANTOR, (2) PURSUANT TO A REGISTRATION STATEMENT WHICH HAS BEEN DECLARED EFFECTIVE UNDER THE SECURITIES ACT, (3) FOR SO LONG AS THIS CERTIFICATE IS ELIGIBLE FOR RESALE PURSUANT TO RULE 144A UNDER THE SECURITIES ACT, TO A PERSON IT REASONABLY BELIEVES IS A "QUALIFIED INSTITUTIONAL BUYER" AS DEFINED IN RULE 144A UNDER THE SECURITIES ACT THAT PURCHASES FOR ITS OWN ACCOUNT OR FOR THE ACCOUNT OF A QUALIFIED INSTITUTIONAL BUYER TO WHOM NOTICE IS GIVEN THAT THE TRANSFER IS BEING MADE IN RELIANCE ON RULE 144A, (4) PURSUANT TO OFFERS AND SALES THAT OCCUR OUTSIDE THE UNITED STATES WITHIN THE MEANING OF REGULATION S UNDER THE SECURITIES ACT, OR (5) PURSUANT TO THE EXEMPTION FROM REGISTRATION PROVIDED BY RULE 144 UNDER THE SECURITIES ACT, IF AVAILABLE, AND IN EACH OF THE

FOREGOING CASES, IN ACCORDANCE WITH ANY APPLICABLE SECURITIES LAWS OF ANY STATE OF THE UNITED STATES, AND (B) IT WILL NOTIFY ANY PURCHASER OF THIS CERTIFICATE OR ANY INTEREST OR PARTICIPATION HEREIN FROM IT OF THE RESALE RESTRICTION REFERRED TO ABOVE.

5. It acknowledges that the Grantor and others will rely upon the truth and accuracy of the foregoing acknowledgments, representations and agreements and agrees that, if any of the acknowledgments, representations and warranties deemed to have been made by it by its purchase of Certificates are no longer accurate, it shall promptly notify the Grantor and the Placement Agent. If it is acquiring any Certificates as a fiduciary or agent for one or more investor accounts, it represents that is has sole investment discretion with respect to each such account and that it has full power to make the foregoing acknowledgments, representations and agreements on behalf of each such account.

6. It acknowledges that the Grantor and the Trustee may, in the event that the Certificates are not registered in the name of Cede & Co., as nominee for DTC, require certifications or other evidence that any transfer of the Certificates is in compliance with the transfer restrictions set forth above.

EXHIBIT A

FORM OF GUARANTY

GUARANTEE

GUARANTEE made as of this 13th day of November, 1991 by KANSAS CITY LIFE INSURANCE COMPANY, a Missouri Corporation, with offices at 3520 Broadway, Kansas City, Missouri 64111 (referred to herein as the "Guarantor").

W I T N E S S E T H

WHEREAS, R & S Kansas City Associates Limited Partnership (referred to herein as the "Landlord") has been has been requested by Old American Life Insurance Company (referred to herein as the "Tenant") to enter into an amendment of lease ("First Amendment of Lease") relating to that certain Lease, dated December 29, 1989, between Landlord and Tenant ("Lease") covering certain premises known as 4900 Oak Street, Kansas City, Missouri (the "Premises"). As a condition to the Landlord's execution of such First Amendment of Lease, Landlord has required, and the Tenant is obligated to deliver to Landlord, the Guarantor's guarantee of the performance of the Tenant's obligations under the Lease as amended by the First Amendment of Lease.

WHEREAS, Tenant is a wholly-owned subsidiary of the Guarantor.

WHEREAS, Landlord and the Tenant have concluded negotiations for the First Amendment of Lease and all references to the Lease hereinafter set forth shall mean the Lease as amended by the First Amendment of Lease (a copy of which is annexed hereto). All capitalized terms used herein, unless otherwise defined, shall have the meanings ascribed to such terms in the Lease.

WHEREAS, Landlord is unwilling to execute the First Amendment of Lease unless and until this Guarantee is delivered to Landlord.

NOW, THEREFORE, in consideration of the premises, and for other good and valuable consideration received, the Guarantor does hereby covenant, agree, represent and warrant to the Landlord as follows:

ARTICLE I

REPRESENTATIONS AND WARRANTIES

OF THE GUARANTOR

Guarantor does hereby represent and warrant that (a) it has the power to enter into and perform this Guarantee, (b) neither this Guarantee, the execution, delivery and performance hereof, the performance of the agreements herein contained nor the consummation of the transaction herein contemplated will violate any statute, ordinance, regulation, court order or decree or order or decree of any governmental authority or agency or any other agreement to which the Guarantor is subject, (c) this Guarantee constitutes a valid and binding obligation of Guarantor enforceable against the Guarantor in accordance with its terms, (d) the Tenant is a wholly-owned subsidiary of the Guarantor and the Guarantor has determined that it is in the interests of the Guarantor that the Tenant enter into the First Amendment of Lease.

ARTICLE II

AGREEMENT TO GUARANTEE

Section 2.1. Obligations, Guarantees (a) Guarantor hereby irrevocably and unconditionally guarantees to the Landlord (i) the full and prompt payment when due of all Rent and other payments required to be paid by Tenant under the Lease, whether now existing or hereafter incurred, and (ii) the full and prompt performance of every other obligation of the Tenant under the Lease. Each and every default in payment of Rent under the Lease or any other sum due under the Lease shall give rise to a separate cause of action hereunder, and separate suits may be brought hereunder as each cause of action arises.

(b) The performance and payments called for hereunder shall become due and payable to Landlord immediately upon Landlord's, its successors or assigns, mailing a written notice by registered or certified mail, return receipt requested, to Guarantor stating that any of the obligations described above have not been timely fulfilled and remain outstanding.

Section 2.2. Obligations Unconditional. The obligations of the Guarantor under this Guarantee shall be absolute and unconditional. It is the intent of this Guarantee that the Landlord shall have resort to the Guarantor without resorting to any remedy against the Tenant and without demand to it. To the fullest extent permitted by law, the obligations of the Guarantor hereunder shall not be affected, modified, released or impaired by any state of facts or the happening from time to time of any event, including, without limitation, any of the following whether or not with notice to, or the consent of, the Guarantor:

(a) The compromise, settlement, release, extension, indulgence, change, modification or termination of any or all of the obligations, covenants and agreements of the Tenant;

(b) The actual or purported assignment of any of the obligations, covenants and agreements contained in this Guarantee or any assignment of the Lease or subleasing of the Premises;

(c) The waiver of the payment, performance or observance by the Tenant of the obligations, conditions, covenants or agreement or any or all of them contained in the Lease;

(d) The extension of time for the payment of any Rent or any other sum payable by Tenant under the Lease or the performance of any other obligation by the Tenant under the Lease;

(e) The modification or amendment (whether material or otherwise but including, without limitation, any increase or decrease in the amount of rental payable under the Lease) of any term, duty, obligation, covenant or agreement set forth in the Lease;

(f) The taking or the omission to take any action or to pursue any right or remedy under the Lease;

(g) The voluntary or involuntary commencement of any case or proceeding under the Federal Bankruptcy Code or any state or foreign bankruptcy, insolvency or similar statute affecting the Tenant, the liquidation, dissolution, merger, consolidation, sale or other disposition of all or substantially all of the assets of the Tenant, the marshalling of the assets and liabilities, receivership, insolvency, assignment for the benefit of creditors, the reorganization, arrangement, composition with creditors, or readjustment of debts or other similar events or proceedings, or the appointment of a receiver, conservator, custodian or sequestrator of or all or part of the property of the Tenant, or any allegation or contest of the validity of this Guarantee or of the Lease in any such proceeding; it being specifically understood, consented and agreed to that this Guarantee shall remain and continue in full force and effect and shall be enforceable against the Guarantor to this same extent and with the same force and effect as if such events and proceedings had not been instituted; and it is the intent and purpose of this Guarantee that the Guarantor shall and does hereby waive all rights and benefits which might accrue to the Guarantor by reason of any such proceedings or case; or (h) Any failure of the Landlord to preserve any security under the Lease.

Section 2.3. No Waiver of Set-Off; No Right to Jury Trial. No act of commission or omission of any kind or at any time upon the part of the Landlord in respect of any matter whatsoever shall in any way impair the rights of the Landlord to enforce any right, power or benefit under this Guarantee and no set-off, counterclaim, reduction or diminution of any obligation or any defense of any kind or nature (other than performance by the Tenant of its obligations under the Lease) which the Guarantor has or may have against the Landlord or any affiliate thereof, shall be available hereunder to the Guarantor. Guarantor hereby waives the right of trial by jury in the event of any litigation between the Landlord and the Guarantor in respect of any matter arising out of this Guarantee.

Section 2.4. Waiver of Notice; Expenses. Guarantor hereby expressly waives notice from the Landlord of its acceptance of, and reliance on, this Guarantee. Guarantor agrees to pay all costs, fees, commissions and expenses (including all attorney fees) which may be incurred by the Landlord in enforcing or attempting to enforce this Guarantee following any default on the part of the Guarantor hereunder, whether the same shall be enforced by suit or otherwise. Guarantor hereby waives presentment of any instrument, demand of payment, protest and notice of non-payment or protest thereof.

ARTICLE III

NOTICES

Section 3.2. Notices. Any notice required to be sent to the Guarantor, or any notice including process, pleadings or other papers served upon the foregoing agent shall at the same time be sent United States registered or certified mail, postage pre-paid, to the Guarantor C/O General Counsel, Kansas City Life Insurance Company, 3520 Broadway, Kansas City, Missouri 64111 or to such other address as the Guarantor shall specify by delivery of notice as aforesaid.

ARTICLE IV

MISCELLANEOUS

Section 4.1. Guarantee to Become Effective. The obligations of the Guarantor hereunder shall arise absolutely and unconditionally upon the execution of the First Amendment of Lease by the Landlord.

Section 4.2. Remedies Not Exclusive. No remedy herein conferred upon or reserved to the Landlord is intended to be exclusive of any other available remedy given under this Guarantee or hereafter existing at law or in equity. No delay or failure to exercise any right or power accruing upon any default, omission or failure or performance hereunder shall impair any such right or power or shall be construed to be a waiver thereof, but any such right and power may be exercised from time to time and as often as may be deemed expedient. If any provision contained in this Guarantee should be breached by the Guarantor and thereafter duly waived by the Landlord, such waiver shall be limited to the particular breach so waived, and shall not be deemed to waive any other breach hereunder. No waiver, amendment, release or modification of the Guarantee shall be established by conduct, custom or course of dealing, but solely by an instrument in writing duly executed by the Landlord and the Guarantor.

Section 4.3. Severability. The invalidity or unenforceability of any one or more of the phrases, sentences, clauses or sections of this Guarantee shall not affect the validity or enforceability of the remaining portion of this Guarantee or any part hereof.

Section 4.4. Applicable Law. This Guarantee shall be governed by and construed in accordance with the laws of the State of Missouri.

Section 4.5 Successors and Assigns. This Guarantee shall be binding upon, and be enforceable against the Guarantor and its respective successors and assigns and shall insure to the benefit of the Landlord, its successors or assigns.

IN WITNESS WHEREOF, the Guarantor has executed this Guarantee as of the date first above written.

KANSAS CITY LIFE INSURANCE COMPANY

ATTEST:

By: ______________________________

EXHIBIT B

KANSAS CITY LIFE INSURANCE COMPANY

ANNUAL REPORT ON FORM 10-K FOR THE YEAR ENDED DECEMBER 31, 1994

ANNUAL REPORT

EXHIBIT C

SCHEDULE OF LEASE PAYMENTS AND CERTIFICATE PAYMENTS

Exhibit C

208(a)

SCHEDULE OF LEASE PAYMENTS AND CERTIFICATE PAYMENTS

| Lease Payment Date | Lease Payment Amount | Draw on Accrued Interest Acct | ABBE Distribution Date | Beginning Certificate Payment (Prepayment Amount) Balance | Certificate Payments: Principal Portion | Certificate Payments: Interest Portion | Certificate Payments: Total Certificate Payment | All Annual Fees (Trustee) | Total Certificate Payment And Fees | Excess of Lease Payments & Accrued Interest Draws Over Certificate Payment & Fees | Ending Certificate Payment (Prepayment Amount) Balance | Ending Certificate Distribution Account Balance |
|---|---|---|---|---|---|---|---|---|---|---|---|---|
| Closing | | | Closing | 9,040,000.00 | | | | | | | | 25,000.00 |
| 9/1/95 | 77,720.83 | 0 | 9/15/95 | 9,078,671.11 | 37,106.00 | 38,671.11 | 75,777.11 | 0.00 | 75,777.11 | 1,943.72 | 9,041,565.11 | 26,943.72 |
| 10/1/95 | 77,720.83 | 0 | 10/15/95 | 9,060,662.57 | 19,937.00 | 57,768.57 | 77,705.57 | 0.00 | 77,705.57 | 15.26 | 9,040,725.57 | 26,958.98 |
| 11/1/95 | 77,720.83 | 0 | 11/15/95 | 9,040,597.64 | 20,065.00 | 57,640.64 | 77,705.64 | 0.00 | 77,705.64 | 15.19 | 9,020,532.64 | 26,974.17 |
| 12/1/95 | 77,720.83 | 0 | 12/15/95 | 9,020,403.89 | 20,194.00 | 57,511.89 | 77,705.89 | 0.00 | 77,705.89 | 14.94 | 9,000,209.89 | 26,989.11 |
| 1/1/96 | 77,720.83 | 0 | 1/15/96 | 9,000,080.31 | 20,324.00 | 57,382.31 | 77,706.31 | 0.00 | 77,706.31 | 14.52 | 8,979,756.31 | 27,003.63 |
| 2/1/96 | 77,720.83 | 0 | 2/15/96 | 8,979,625.90 | 20,454.00 | 57,251.90 | 77,705.90 | 0.00 | 77,705.90 | 14.93 | 8,959,171.90 | 27,018.56 |
| 3/1/96 | 77,720.83 | 0 | 3/15/96 | 8,959,040.65 | 20,585.00 | 57,120.65 | 77,705.65 | 0.00 | 77,705.65 | 15.18 | 8,938,455.65 | 27,033.73 |
| 4/1/96 | 77,720.83 | 0 | 4/15/96 | 8,938,323.57 | 20,717.00 | 56,988.57 | 77,705.57 | 0.00 | 77,705.57 | 15.26 | 8,917,606.57 | 27,049.00 |
| 5/1/96 | 77,720.83 | 0 | 5/15/96 | 8,917,473.63 | 20,850.00 | 56,855.63 | 77,705.63 | 0.00 | 77,705.63 | 15.20 | 8,896,623.63 | 27,064.20 |
| 6/1/96 | 77,720.83 | 0 | 6/15/96 | 8,896,489.84 | 20,984.00 | 56,721.84 | 77,705.84 | 0.00 | 77,705.84 | 14.99 | 8,875,505.84 | 27,079.18 |
| 7/1/96 | 77,720.83 | 0 | 7/15/96 | 8,875,371.20 | 21,119.00 | 56,587.20 | 77,706.20 | 0.00 | 77,706.20 | 14.63 | 8,854,252.20 | 27,093.81 |
| 8/1/96 | 77,720.83 | 0 | 8/15/96 | 8,854,116.68 | 21,254.00 | 56,451.68 | 77,705.68 | 0.00 | 77,705.68 | 15.15 | 8,832,862.68 | 27,108.96 |
| 9/1/96 | 77,720.83 | 0 | 9/15/96 | 8,832,726.30 | 11,391.00 | 56,315.30 | 67,706.30 | 10,000.00 | 77,706.30 | 14.53 | 8,821,335.30 | 27,123.49 |
| 10/1/96 | 77,720.83 | 0 | 10/15/96 | 8,821,262.21 | 21,464.00 | 56,242.21 | 77,706.21 | 0.00 | 77,706.21 | 14.62 | 8,799,798.21 | 27,138.10 |
| 11/1/96 | 77,720.83 | 0 | 11/15/96 | 8,799,660.48 | 21,602.00 | 56,104.48 | 77,706.48 | 0.00 | 77,706.48 | 14.35 | 8,778,058.48 | 27,152.45 |
| 12/1/96 | 77,720.83 | 0 | 12/15/96 | 8,777,919.87 | 21,740.00 | 55,965.87 | 77,705.87 | 0.00 | 77,705.87 | 14.96 | 8,756,179.87 | 27,167.41 |
| 1/1/97 | 77,720.83 | 0 | 1/15/97 | 8,756,040.37 | 21,880.00 | 55,826.37 | 77,706.37 | 0.00 | 77,706.37 | 14.46 | 8,734,160.37 | 27,181.87 |
| 2/1/97 | 77,720.83 | 0 | 2/15/97 | 8,734,019.98 | 22,020.00 | 55,685.98 | 77,705.98 | 0.00 | 77,705.98 | 14.85 | 8,711,999.98 | 27,196.72 |
| 3/1/97 | 77,720.83 | 0 | 3/15/97 | 8,711,858.68 | 22,161.00 | 55,544.68 | 77,705.68 | 0.00 | 77,705.68 | 15.15 | 8,689,697.68 | 27,211.87 |
| 4/1/97 | 77,720.83 | 0 | 4/15/97 | 8,689,555.48 | 22,304.00 | 55,402.48 | 77,706.48 | 0.00 | 77,706.48 | 14.35 | 8,667,251.48 | 27,226.22 |
| 5/1/97 | 77,720.83 | 0 | 5/15/97 | 8,667,108.36 | 22,447.00 | 55,259.36 | 77,706.36 | 0.00 | 77,706.36 | 14.47 | 8,644,661.36 | 27,240.68 |
| 6/1/97 | 77,720.83 | 0 | 6/15/97 | 8,644,517.33 | 22,591.00 | 55,115.33 | 77,706.33 | 0.00 | 77,706.33 | 14.50 | 8,621,926.33 | 27,255.18 |
| 7/1/97 | 77,720.83 | 0 | 7/15/97 | 8,621,781.37 | 22,736.00 | 54,970.37 | 77,706.37 | 0.00 | 77,706.37 | 14.46 | 8,599,045.37 | 27,269.64 |
| 8/1/97 | 77,720.83 | 0 | 8/15/97 | 8,598,899.48 | 22,882.00 | 54,824.48 | 77,706.48 | 0.00 | 77,706.48 | 14.35 | 8,576,017.48 | 27,283.99 |
| 9/1/97 | 77,720.83 | 0 | 9/15/97 | 8,575,870.66 | 13,028.00 | 54,677.66 | 67,705.66 | 10,000.00 | 77,705.66 | 15.17 | 8,562,842.66 | 27,299.16 |
| 10/1/97 | 77,720.83 | 0 | 10/15/97 | 8,562,759.06 | 23,112.00 | 54,594.06 | 77,706.06 | 0.00 | 77,706.06 | 14.77 | 8,539,647.06 | 27,313.94 |
| 11/1/97 | 77,720.83 | 0 | 11/15/97 | 8,539,498.76 | 23,260.00 | 54,445.76 | 77,705.76 | 0.00 | 77,705.76 | 15.07 | 8,516,238.76 | 27,329.01 |
| 12/1/97 | 77,720.83 | 0 | 12/15/97 | 8,516,089.51 | 23,410.00 | 54,296.51 | 77,706.51 | 0.00 | 77,706.51 | 14.32 | 8,492,679.51 | 27,343.33 |
| 1/1/98 | 77,720.83 | 0 | 1/15/98 | 8,492,529.29 | 23,560.00 | 54,146.29 | 77,706.29 | 0.00 | 77,706.29 | 14.54 | 8,468,969.29 | 27,357.87 |
| 2/1/98 | 77,720.83 | 0 | 2/15/98 | 8,468,818.11 | 23,711.00 | 53,995.11 | 77,706.11 | 0.00 | 77,706.11 | 14.72 | 8,445,107.11 | 27,372.59 |
| 3/1/98 | 77,720.83 | 0 | 3/15/98 | 8,444,954.97 | 23,863.00 | 53,842.97 | 77,705.97 | 0.00 | 77,705.97 | 14.86 | 8,421,091.97 | 27,387.45 |
| 4/1/98 | 77,720.83 | 0 | 4/15/98 | 8,420,938.85 | 24,016.00 | 53,689.85 | 77,705.85 | 0.00 | 77,705.85 | 14.98 | 8,396,922.85 | 27,402.43 |
| 5/1/98 | 77,720.83 | 0 | 5/15/98 | 8,396,768.75 | 24,170.00 | 53,535.75 | 77,705.75 | 0.00 | 77,705.75 | 15.08 | 8,372,598.75 | 27,417.52 |
| 6/1/98 | 77,720.83 | 0 | 6/15/98 | 8,372,443.65 | 24,325.00 | 53,380.65 | 77,705.65 | 0.00 | 77,705.65 | 15.18 | 8,348,118.65 | 27,432.69 |
| 7/1/98 | 77,720.83 | 0 | 7/15/98 | 8,347,962.57 | 24,481.00 | 53,224.57 | 77,705.57 | 0.00 | 77,705.57 | 15.26 | 8,323,481.57 | 27,447.95 |
| 8/1/98 | 77,720.83 | 0 | 8/15/98 | 8,323,324.48 | 24,639.00 | 53,067.48 | 77,706.48 | 0.00 | 77,706.48 | 14.35 | 8,298,685.48 | 27,462.30 |
| 9/1/98 | 77,720.83 | 0 | 9/15/98 | 8,298,527.38 | 14,797.00 | 52,909.38 | 67,706.38 | 10,000.00 | 77,706.38 | 14.45 | 8,283,730.38 | 27,476.75 |
| 10/1/98 | 77,720.83 | 0 | 10/15/98 | 8,283,635.43 | 24,892.00 | 52,814.43 | 77,706.43 | 0.00 | 77,706.43 | 14.40 | 8,258,743.43 | 27,491.14 |
| 11/1/98 | 77,720.83 | 0 | 11/15/98 | 8,258,583.71 | 25,051.00 | 52,654.71 | 77,705.71 | 0.00 | 77,705.71 | 15.12 | 8,233,532.71 | 27,506.26 |
| 12/1/98 | 77,720.83 | 0 | 12/15/98 | 8,233,371.97 | 25,212.00 | 52,493.97 | 77,705.97 | 0.00 | 77,705.97 | 14.86 | 8,208,159.97 | 27,521.13 |
| 1/1/99 | 77,720.83 | 0 | 1/15/99 | 8,207,998.19 | 25,374.00 | 52,332.19 | 77,706.19 | 0.00 | 77,706.19 | 14.64 | 8,182,624.19 | 27,535.77 |
| 2/1/99 | 77,720.83 | 0 | 2/15/99 | 8,182,461.37 | 25,537.00 | 52,169.37 | 77,706.37 | 0.00 | 77,706.37 | 14.46 | 8,156,924.37 | 27,550.22 |
| 3/1/99 | 77,720.83 | 0 | 3/15/99 | 8,156,760.51 | 25,701.00 | 52,005.51 | 77,706.51 | 0.00 | 77,706.51 | 14.32 | 8,131,059.51 | 27,564.54 |
| 4/1/99 | 77,720.83 | 0 | 4/15/99 | 8,130,894.60 | 25,865.00 | 51,840.60 | 77,705.60 | 0.00 | 77,705.60 | 15.23 | 8,105,029.60 | 27,579.77 |
| 5/1/99 | 77,720.83 | 0 | 5/15/99 | 8,104,863.63 | 26,031.00 | 51,674.63 | 77,705.63 | 0.00 | 77,705.63 | 15.20 | 8,078,832.63 | 27,594.98 |
| 6/1/99 | 77,720.83 | 0 | 6/15/99 | 8,078,665.60 | 26,198.00 | 51,507.60 | 77,705.60 | 0.00 | 77,705.60 | 15.23 | 8,052,467.60 | 27,610.21 |
| 7/1/99 | 77,720.83 | 0 | 7/15/99 | 8,052,299.49 | 26,367.00 | 51,339.49 | 77,706.49 | 0.00 | 77,706.49 | 14.34 | 8,025,932.49 | 27,624.55 |
| 8/1/99 | 77,720.83 | 0 | 8/15/99 | 8,025,763.31 | 26,536.00 | 51,170.31 | 77,706.31 | 0.00 | 77,706.31 | 14.52 | 7,999,227.31 | 27,639.07 |
| 9/1/99 | 77,720.83 | 0 | 9/15/99 | 7,999,057.03 | 16,706.00 | 51,000.03 | 67,706.03 | 10,000.00 | 77,706.03 | 14.80 | 7,982,351.03 | 27,653.87 |
| 10/1/99 | 77,720.83 | 0 | 10/15/99 | 7,982,243.84 | 26,813.00 | 50,892.84 | 77,705.84 | 0.00 | 77,705.84 | 14.99 | 7,955,430.84 | 27,668.86 |

208(b)

| Lease Payment Date | Lease Payment Amount | Draw on Accrued Interest Acct | ABBE Distribution Date | Beginning Certificate Payment (Prepayment Amount) Balance | Certificate Payments Principal Portion | Certificate Payments Interest Portion | Certificate Payments Total Certificate Payment | All Annual Fees (Trustee) | Total Certificate Payment And Fees | Payments & Accrued Interest Draws Over Certificate Payment & Fees | Ending Certificate Payment (Prepayment Amount) Balance | Ending Certificate Distribution Account Balance |
|---|---|---|---|---|---|---|---|---|---|---|---|---|
| 11/1/99 | 77,720.83 | 0 | 11/15/99 | 7,955,258.79 | 26,985.00 | 50,720.79 | 77,705.79 | 0.00 | 77,705.79 | 15.04 | 7,928,273.79 | 27,683.91 |
| 12/1/99 | 77,720.83 | 0 | 12/15/99 | 7,928,100.63 | 27,158.00 | 50,547.63 | 77,705.63 | 0.00 | 77,705.63 | 15.20 | 7,900,942.63 | 27,699.10 |
| 1/1/00 | 89,379.00 | 0 | 1/15/00 | 7,900,768.37 | 38,991.00 | 50,373.37 | 89,364.37 | 0.00 | 89,364.37 | 14.63 | 7,861,777.37 | 27,713.74 |
| 2/1/00 | 89,379.00 | 0 | 2/15/00 | 7,861,527.18 | 39,241.00 | 50,123.18 | 89,364.18 | 0.00 | 89,364.18 | 14.82 | 7,822,286.18 | 27,728.56 |
| 3/1/00 | 89,379.00 | 0 | 3/15/00 | 7,822,034.38 | 39,493.00 | 49,871.38 | 89,364.38 | 0.00 | 89,364.38 | 14.62 | 7,782,541.38 | 27,743.18 |
| 4/1/00 | 89,379.00 | 0 | 4/15/00 | 7,782,287.97 | 39,746.00 | 49,617.97 | 89,363.97 | 0.00 | 89,363.97 | 15.03 | 7,742,541.97 | 27,758.22 |
| 5/1/00 | 89,379.00 | 0 | 5/15/00 | 7,742,286.93 | 40,001.00 | 49,362.93 | 89,363.93 | 0.00 | 89,363.93 | 15.07 | 7,702,285.93 | 27,773.29 |
| 6/1/00 | 89,379.00 | 0 | 6/15/00 | 7,702,029.26 | 40,258.00 | 49,106.26 | 89,364.26 | 0.00 | 89,364.26 | 14.74 | 7,661,771.26 | 27,788.03 |
| 7/1/00 | 89,379.00 | 0 | 7/15/00 | 7,661,512.93 | 40,516.00 | 48,847.93 | 89,363.93 | 0.00 | 89,363.93 | 15.07 | 7,620,996.93 | 27,803.10 |
| 8/1/00 | 89,379.00 | 0 | 8/15/00 | 7,620,736.96 | 40,776.00 | 48,587.96 | 89,363.96 | 0.00 | 89,363.96 | 15.04 | 7,579,960.96 | 27,818.14 |
| 9/1/00 | 89,379.00 | 0 | 9/15/00 | 7,579,699.31 | 31,038.00 | 48,326.31 | 79,364.31 | 10,000.00 | 89,364.31 | 14.69 | 7,548,661.31 | 27,832.83 |
| 10/1/00 | 89,379.00 | 0 | 10/15/00 | 7,548,462.15 | 41,237.00 | 48,127.15 | 89,364.15 | 0.00 | 89,364.15 | 14.85 | 7,507,225.15 | 27,847.68 |
| 11/1/00 | 89,379.00 | 0 | 11/15/00 | 7,506,960.55 | 41,502.00 | 47,862.55 | 89,364.55 | 0.00 | 89,364.55 | 14.45 | 7,465,458.55 | 27,862.14 |
| 12/1/00 | 89,379.00 | 0 | 12/15/00 | 7,465,192.24 | 41,768.00 | 47,596.24 | 89,364.24 | 0.00 | 89,364.24 | 14.76 | 7,423,424.24 | 27,876.90 |
| 1/1/01 | 89,379.00 | 0 | 1/15/01 | 7,423,156.23 | 42,036.00 | 47,328.23 | 89,364.23 | 0.00 | 89,364.23 | 14.77 | 7,381,120.23 | 27,891.67 |
| 2/1/01 | 89,379.00 | 0 | 2/15/01 | 7,380,850.50 | 42,306.00 | 47,058.50 | 89,364.50 | 0.00 | 89,364.50 | 14.50 | 7,338,544.50 | 27,906.17 |
| 3/1/01 | 89,379.00 | 0 | 3/15/01 | 7,338,273.04 | 42,577.00 | 46,787.04 | 89,364.04 | 0.00 | 89,364.04 | 14.96 | 7,295,696.04 | 27,921.13 |
| 4/1/01 | 89,379.00 | 0 | 4/15/01 | 7,295,422.83 | 42,850.00 | 46,513.83 | 89,363.83 | 0.00 | 89,363.83 | 15.17 | 7,252,572.83 | 27,936.30 |
| 5/1/01 | 89,379.00 | 0 | 5/15/01 | 7,252,297.88 | 43,125.00 | 46,238.88 | 89,363.88 | 0.00 | 89,363.88 | 15.12 | 7,209,172.88 | 27,951.42 |
| 6/1/01 | 89,379.00 | 0 | 6/15/01 | 7,208,896.16 | 43,402.00 | 45,962.16 | 89,364.16 | 0.00 | 89,364.16 | 14.84 | 7,165,494.16 | 27,966.26 |
| 7/1/01 | 89,379.00 | 0 | 7/15/01 | 7,165,215.66 | 43,681.00 | 45,683.66 | 89,364.66 | 0.00 | 89,364.66 | 14.34 | 7,121,534.66 | 27,980.60 |
| 8/1/01 | 89,379.00 | 0 | 8/15/01 | 7,121,254.38 | 43,961.00 | 45,403.38 | 89,364.38 | 0.00 | 89,364.38 | 14.62 | 7,077,293.38 | 27,995.22 |
| 9/1/01 | 89,379.00 | 0 | 9/15/01 | 7,077,011.29 | 34,243.00 | 45,121.29 | 79,364.29 | 10,000.00 | 89,364.29 | 14.71 | 7,042,768.29 | 28,009.93 |
| 10/1/01 | 89,379.00 | 0 | 10/15/01 | 7,042,548.57 | 44,463.00 | 44,901.57 | 89,364.57 | 0.00 | 89,364.57 | 14.43 | 6,998,085.57 | 28,024.36 |
| 11/1/01 | 89,379.00 | 0 | 11/15/01 | 6,997,800.26 | 44,748.00 | 44,616.26 | 89,364.26 | 0.00 | 89,364.26 | 14.74 | 6,953,052.26 | 28,039.09 |
| 12/1/01 | 89,379.00 | 0 | 12/15/01 | 6,952,765.13 | 45,035.00 | 44,329.13 | 89,364.13 | 0.00 | 89,364.13 | 14.87 | 6,907,730.13 | 28,053.96 |
| 1/1/02 | 89,379.00 | 0 | 1/15/02 | 6,907,441.16 | 45,324.00 | 44,040.16 | 89,364.16 | 0.00 | 89,364.16 | 14.84 | 6,862,117.16 | 28,068.81 |
| 2/1/02 | 89,379.00 | 0 | 2/15/02 | 6,861,826.33 | 45,615.00 | 43,749.33 | 89,364.33 | 0.00 | 89,364.33 | 14.67 | 6,816,211.33 | 28,083.48 |
| 3/1/02 | 89,379.00 | 0 | 3/15/02 | 6,815,918.63 | 45,908.00 | 43,456.63 | 89,364.63 | 0.00 | 89,364.63 | 14.37 | 6,770,010.63 | 28,097.85 |
| 4/1/02 | 89,379.00 | 0 | 4/15/02 | 6,769,716.05 | 46,202.00 | 43,162.05 | 89,364.05 | 0.00 | 89,364.05 | 14.95 | 6,723,514.05 | 28,112.79 |
| 5/1/02 | 89,379.00 | 0 | 5/15/02 | 6,723,217.59 | 46,499.00 | 42,865.59 | 89,364.59 | 0.00 | 89,364.59 | 14.41 | 6,676,718.59 | 28,127.20 |
| 6/1/02 | 89,379.00 | 0 | 6/15/02 | 6,676,420.22 | 46,797.00 | 42,567.22 | 89,364.22 | 0.00 | 89,364.22 | 14.78 | 6,629,623.22 | 28,141.98 |
| 7/1/02 | 89,379.00 | 0 | 7/15/02 | 6,629,322.94 | 47,097.00 | 42,266.94 | 89,363.94 | 0.00 | 89,363.94 | 15.06 | 6,582,225.94 | 28,157.03 |
| 8/1/02 | 89,379.00 | 0 | 8/15/02 | 6,581,923.74 | 47,399.00 | 41,964.74 | 89,363.74 | 0.00 | 89,363.74 | 15.26 | 6,534,524.74 | 28,172.30 |
| 9/1/02 | 89,379.00 | 0 | 9/15/02 | 6,534,220.59 | 37,704.00 | 41,660.59 | 79,364.59 | 10,000.00 | 89,364.59 | 14.41 | 6,496,516.59 | 28,186.70 |
| 10/1/02 | 89,379.00 | 0 | 10/15/02 | 6,496,274.66 | 47,946.00 | 41,418.66 | 89,364.66 | 0.00 | 89,364.66 | 14.34 | 6,448,328.66 | 28,201.04 |
| 11/1/02 | 89,379.00 | 0 | 11/15/02 | 6,448,021.01 | 48,253.00 | 41,111.01 | 89,364.01 | 0.00 | 89,364.01 | 14.99 | 6,399,768.01 | 28,216.04 |
| 12/1/02 | 89,379.00 | 0 | 12/15/02 | 6,399,458.38 | 48,563.00 | 40,801.38 | 89,364.38 | 0.00 | 89,364.38 | 14.62 | 6,350,895.38 | 28,230.66 |
| 1/1/03 | 89,379.00 | 0 | 1/15/03 | 6,350,583.77 | 48,874.00 | 40,489.77 | 89,363.77 | 0.00 | 89,363.77 | 15.23 | 6,301,709.77 | 28,245.89 |
| 2/1/03 | 89,379.00 | 0 | 2/15/03 | 6,301,396.16 | 49,188.00 | 40,176.16 | 89,364.16 | 0.00 | 89,364.16 | 14.84 | 6,252,208.16 | 28,260.72 |
| 3/1/03 | 89,379.00 | 0 | 3/15/03 | 6,251,892.54 | 49,504.00 | 39,860.54 | 89,364.54 | 0.00 | 89,364.54 | 14.46 | 6,202,388.54 | 28,275.19 |
| 4/1/03 | 89,379.00 | 0 | 4/15/03 | 6,202,070.89 | 49,821.00 | 39,542.89 | 89,363.89 | 0.00 | 89,363.89 | 15.11 | 6,152,249.89 | 28,290.30 |
| 5/1/03 | 89,379.00 | 0 | 5/15/03 | 6,151,930.20 | 50,141.00 | 39,223.20 | 89,364.20 | 0.00 | 89,364.20 | 14.80 | 6,101,789.20 | 28,305.09 |
| 6/1/03 | 89,379.00 | 0 | 6/15/03 | 6,101,467.47 | 50,463.00 | 38,901.47 | 89,364.47 | 0.00 | 89,364.47 | 14.53 | 6,051,004.47 | 28,319.63 |
| 7/1/03 | 89,379.00 | 0 | 7/15/03 | 6,050,680.66 | 50,787.00 | 38,577.66 | 89,364.66 | 0.00 | 89,364.66 | 14.34 | 5,999,893.66 | 28,333.97 |
| 8/1/03 | 89,379.00 | 0 | 8/15/03 | 5,999,567.78 | 51,112.00 | 38,251.78 | 89,363.78 | 0.00 | 89,363.78 | 15.22 | 5,948,455.78 | 28,349.19 |
| 9/1/03 | 89,379.00 | 0 | 9/15/03 | 5,948,127.81 | 41,440.00 | 37,923.81 | 79,363.81 | 10,000.00 | 89,363.81 | 15.19 | 5,906,687.81 | 28,364.38 |
| 10/1/03 | 89,379.00 | 0 | 10/15/03 | 5,906,421.90 | 51,706.00 | 37,657.90 | 89,363.90 | 0.00 | 89,363.90 | 15.10 | 5,854,715.90 | 28,379.48 |
| 11/1/03 | 89,379.00 | 0 | 11/15/03 | 5,854,384.12 | 52,038.00 | 37,326.12 | 89,364.12 | 0.00 | 89,364.12 | 14.88 | 5,802,346.12 | 28,394.36 |
| 12/1/03 | 89,379.00 | 0 | 12/15/03 | 5,802,012.21 | 52,372.00 | 36,992.21 | 89,364.21 | 0.00 | 89,364.21 | 14.79 | 5,749,640.21 | 28,409.15 |
| 1/1/04 | 89,379.00 | 0 | 1/15/04 | 5,749,304.16 | 52,708.00 | 36,656.16 | 89,364.16 | 0.00 | 89,364.16 | 14.84 | 5,696,596.16 | 28,423.99 |
| 2/1/04 | 89,379.00 | 0 | 2/15/04 | 5,696,257.95 | 53,046.00 | 36,317.95 | 89,363.95 | 0.00 | 89,363.95 | 15.05 | 5,643,211.95 | 28,439.04 |
| 3/1/04 | 89,379.00 | 0 | 3/15/04 | 5,642,871.57 | 53,387.00 | 35,977.57 | 89,364.57 | 0.00 | 89,364.57 | 14.43 | 5,589,484.57 | 28,453.47 |
| 4/1/04 | 89,379.00 | 0 | 4/15/04 | 5,589,142.00 | 53,729.00 | 35,635.00 | 89,364.00 | 0.00 | 89,364.00 | 15.00 | 5,535,413.00 | 28,468.47 |

208(c)

Exhibit C

| Lease Payment Date | Lease Payment Amount | Draw on Accrued Interest Acct | ABBE Distribution Date | Beginning Certificate Payment (Prepayment Amount) Balance | Certificate Payments Principal Portion | Certificate Payments Interest Portion | Certificate Payments Total Certificate Payment | All Annual Fees (Trustee) | Total Certificate Payment And Fees | Payments & Accrued Interest Draws Over Certificate Payment & Fees | Ending Certificate Payment (Prepayment Amount) Balance | Ending Certificate Distribution Account Balance |
|---|---|---|---|---|---|---|---|---|---|---|---|---|
| 5/1/04 | 89,379.00 | 0 | 5/15/04 | 5,535,068.24 | 54,074.00 | 35,290.24 | 89,364.24 | 0.00 | 89,364.24 | 14.76 | 5,480,994.24 | 28,483.22 |
| 6/1/04 | 89,379.00 | 0 | 6/15/04 | 5,480,647.27 | 54,421.00 | 34,943.27 | 89,364.27 | 0.00 | 89,364.27 | 14.73 | 5,426,226.27 | 28,497.96 |
| 7/1/04 | 89,379.00 | 0 | 7/15/04 | 5,425,877.07 | 54,770.00 | 34,594.07 | 89,364.07 | 0.00 | 89,364.07 | 14.93 | 5,371,107.07 | 28,512.89 |
| 8/1/04 | 89,379.00 | 0 | 8/15/04 | 5,370,755.63 | 55,122.00 | 34,242.63 | 89,364.63 | 0.00 | 89,364.63 | 14.37 | 5,315,633.63 | 28,527.27 |
| 9/1/04 | 89,379.00 | 0 | 9/15/04 | 5,315,279.93 | 45,475.00 | 33,888.93 | 79,363.93 | 10,000.00 | 89,363.93 | 15.07 | 5,269,804.93 | 28,542.34 |
| 10/1/04 | 89,379.00 | 0 | 10/15/04 | 5,269,513.13 | 55,767.00 | 33,597.13 | 89,364.13 | 0.00 | 89,364.13 | 14.87 | 5,213,746.13 | 28,557.21 |
| 11/1/04 | 89,379.00 | 0 | 11/15/04 | 5,213,388.29 | 56,125.00 | 33,239.29 | 89,364.29 | 0.00 | 89,364.29 | 14.71 | 5,157,263.29 | 28,571.92 |
| 12/1/04 | 89,379.00 | 0 | 12/15/04 | 5,156,903.15 | 56,485.00 | 32,879.15 | 89,364.15 | 0.00 | 89,364.15 | 14.85 | 5,100,418.15 | 28,586.77 |
| 1/1/05 | 102,785.83 | 0 | 1/15/05 | 5,100,055.71 | 70,254.00 | 32,516.71 | 102,770.71 | 0.00 | 102,770.71 | 15.12 | 5,029,801.71 | 28,601.89 |
| 2/1/05 | 102,785.83 | 0 | 2/15/05 | 5,029,350.91 | 70,705.00 | 32,065.91 | 102,770.91 | 0.00 | 102,770.91 | 14.92 | 4,958,645.91 | 28,616.81 |
| 3/1/05 | 102,785.83 | 0 | 3/15/05 | 4,958,192.22 | 71,159.00 | 31,612.22 | 102,771.22 | 0.00 | 102,771.22 | 14.61 | 4,887,033.22 | 28,631.42 |
| 4/1/05 | 102,785.83 | 0 | 4/15/05 | 4,886,576.62 | 71,615.00 | 31,155.62 | 102,770.62 | 0.00 | 102,770.62 | 15.21 | 4,814,961.62 | 28,646.63 |
| 5/1/05 | 102,785.83 | 0 | 5/15/05 | 4,814,502.09 | 72,075.00 | 30,696.09 | 102,771.09 | 0.00 | 102,771.09 | 14.74 | 4,742,427.09 | 28,661.37 |
| 6/1/05 | 102,785.83 | 0 | 6/15/05 | 4,741,964.61 | 72,537.00 | 30,233.61 | 102,770.61 | 0.00 | 102,770.61 | 15.22 | 4,669,427.61 | 28,676.59 |
| 7/1/05 | 102,785.83 | 0 | 7/15/05 | 4,668,962.16 | 73,003.00 | 29,768.16 | 102,771.16 | 0.00 | 102,771.16 | 14.67 | 4,595,959.16 | 28,691.26 |
| 8/1/05 | 102,785.83 | 0 | 8/15/05 | 4,595,490.73 | 73,471.00 | 29,299.73 | 102,770.73 | 0.00 | 102,770.73 | 15.10 | 4,522,019.73 | 28,706.37 |
| 9/1/05 | 102,785.83 | 0 | 9/15/05 | 4,521,548.29 | 63,943.00 | 28,828.29 | 92,771.29 | 10,000.00 | 102,771.29 | 14.54 | 4,457,605.29 | 28,720.91 |
| 10/1/05 | 102,785.83 | 0 | 10/15/05 | 4,457,194.99 | 74,353.00 | 28,417.99 | 102,770.99 | 0.00 | 102,770.99 | 14.84 | 4,382,841.99 | 28,735.75 |
| 11/1/05 | 102,785.83 | 0 | 11/15/05 | 4,382,364.89 | 74,830.00 | 27,940.89 | 102,770.89 | 0.00 | 102,770.89 | 14.94 | 4,307,534.89 | 28,750.70 |
| 12/1/05 | 102,785.83 | 0 | 12/15/05 | 4,307,054.73 | 75,310.00 | 27,460.73 | 102,770.73 | 0.00 | 102,770.73 | 15.10 | 4,231,744.73 | 28,765.80 |
| 1/1/06 | 102,785.83 | 0 | 1/15/06 | 4,231,261.49 | 75,794.00 | 26,977.49 | 102,771.49 | 0.00 | 102,771.49 | 14.34 | 4,155,467.49 | 28,780.14 |
| 2/1/06 | 102,785.83 | 0 | 2/15/06 | 4,154,981.14 | 76,280.00 | 26,491.14 | 102,771.14 | 0.00 | 102,771.14 | 14.69 | 4,078,701.14 | 28,794.83 |
| 3/1/06 | 102,785.83 | 0 | 3/15/06 | 4,078,211.68 | 76,769.00 | 26,001.68 | 102,770.68 | 0.00 | 102,770.68 | 15.15 | 4,001,442.68 | 28,809.97 |
| 4/1/06 | 102,785.83 | 0 | 4/15/06 | 4,000,950.08 | 77,262.00 | 25,509.08 | 102,771.08 | 0.00 | 102,771.08 | 14.75 | 3,923,688.08 | 28,824.72 |
| 5/1/06 | 102,785.83 | 0 | 5/15/06 | 3,923,192.32 | 77,758.00 | 25,013.32 | 102,771.32 | 0.00 | 102,771.32 | 14.51 | 3,845,434.32 | 28,839.24 |
| 6/1/06 | 102,785.83 | 0 | 6/15/06 | 3,844,935.37 | 78,257.00 | 24,514.37 | 102,771.37 | 0.00 | 102,771.37 | 14.46 | 3,766,678.37 | 28,853.70 |
| 7/1/06 | 102,785.83 | 0 | 7/15/06 | 3,766,176.22 | 78,759.00 | 24,012.22 | 102,771.22 | 0.00 | 102,771.22 | 14.61 | 3,687,417.22 | 28,868.31 |
| 8/1/06 | 102,785.83 | 0 | 8/15/06 | 3,686,911.85 | 79,264.00 | 23,506.85 | 102,770.85 | 0.00 | 102,770.85 | 14.98 | 3,607,647.85 | 28,883.29 |
| 9/1/06 | 102,785.83 | 0 | 9/15/06 | 3,607,139.24 | 69,773.00 | 22,998.24 | 92,771.24 | 10,000.00 | 102,771.24 | 14.59 | 3,537,366.24 | 28,897.89 |
| 10/1/06 | 102,785.83 | 0 | 10/15/06 | 3,536,918.53 | 80,221.00 | 22,550.53 | 102,771.53 | 0.00 | 102,771.53 | 14.30 | 3,456,697.53 | 28,912.19 |
| 11/1/06 | 102,785.83 | 0 | 11/15/06 | 3,456,182.78 | 80,735.00 | 22,035.78 | 102,770.78 | 0.00 | 102,770.78 | 15.05 | 3,375,447.78 | 28,927.24 |
| 12/1/06 | 102,785.83 | 0 | 12/15/06 | 3,374,929.73 | 81,253.00 | 21,517.73 | 102,770.73 | 0.00 | 102,770.73 | 15.10 | 3,293,676.73 | 28,942.34 |
| 1/1/07 | 102,785.83 | 0 | 1/15/07 | 3,293,155.35 | 81,775.00 | 20,996.35 | 102,771.35 | 0.00 | 102,771.35 | 14.48 | 3,211,380.35 | 28,956.82 |
| 2/1/07 | 102,785.83 | 0 | 2/15/07 | 3,210,855.63 | 82,299.00 | 20,471.63 | 102,770.63 | 0.00 | 102,770.63 | 15.20 | 3,128,556.63 | 28,972.02 |
| 3/1/07 | 102,785.83 | 0 | 3/15/07 | 3,128,028.55 | 82,828.00 | 19,943.55 | 102,771.55 | 0.00 | 102,771.55 | 14.28 | 3,045,200.55 | 28,986.30 |
| 4/1/07 | 102,785.83 | 0 | 4/15/07 | 3,044,669.07 | 83,359.00 | 19,412.07 | 102,771.07 | 0.00 | 102,771.07 | 14.76 | 2,961,310.07 | 29,001.07 |
| 5/1/07 | 102,785.83 | 0 | 5/15/07 | 2,960,775.18 | 83,894.00 | 18,877.18 | 102,771.18 | 0.00 | 102,771.18 | 14.65 | 2,876,881.18 | 29,015.72 |
| 6/1/07 | 102,785.83 | 0 | 6/15/07 | 2,876,342.86 | 84,432.00 | 18,338.86 | 102,770.86 | 0.00 | 102,770.86 | 14.97 | 2,791,910.86 | 29,030.69 |
| 7/1/07 | 102,785.83 | 0 | 7/15/07 | 2,791,369.09 | 84,974.00 | 17,797.09 | 102,771.09 | 0.00 | 102,771.09 | 14.74 | 2,706,395.09 | 29,045.43 |
| 8/1/07 | 102,785.83 | 0 | 8/15/07 | 2,705,849.84 | 85,519.00 | 17,251.84 | 102,770.84 | 0.00 | 102,770.84 | 14.99 | 2,620,330.84 | 29,060.43 |
| 9/1/07 | 102,785.83 | 0 | 9/15/07 | 2,619,782.09 | 76,068.00 | 16,703.09 | 92,771.09 | 10,000.00 | 102,771.09 | 14.74 | 2,543,714.09 | 29,075.17 |
| 10/1/07 | 102,785.83 | 0 | 10/15/07 | 2,543,225.99 | 86,556.00 | 16,214.99 | 102,770.99 | 0.00 | 102,770.99 | 14.84 | 2,456,669.99 | 29,090.01 |
| 11/1/07 | 102,785.83 | 0 | 11/15/07 | 2,456,114.59 | 87,111.00 | 15,659.59 | 102,770.59 | 0.00 | 102,770.59 | 15.24 | 2,369,003.59 | 29,105.25 |
| 12/1/07 | 102,785.83 | 0 | 12/15/07 | 2,368,444.62 | 87,670.00 | 15,100.62 | 102,770.62 | 0.00 | 102,770.62 | 15.21 | 2,280,774.62 | 29,120.46 |
| 1/1/08 | 102,785.83 | 0 | 1/15/08 | 2,280,212.07 | 88,233.00 | 14,538.07 | 102,771.07 | 0.00 | 102,771.07 | 14.76 | 2,191,979.07 | 29,135.21 |
| 2/1/08 | 102,785.83 | 0 | 2/15/08 | 2,191,412.91 | 88,799.00 | 13,971.91 | 102,770.91 | 0.00 | 102,770.91 | 14.92 | 2,102,613.91 | 29,150.13 |
| 3/1/08 | 102,785.83 | 0 | 3/15/08 | 2,102,044.12 | 89,369.00 | 13,402.12 | 102,771.12 | 0.00 | 102,771.12 | 14.71 | 2,012,675.12 | 29,164.84 |
| 4/1/08 | 102,785.83 | 0 | 4/15/08 | 2,012,101.67 | 89,942.00 | 12,828.67 | 102,770.67 | 0.00 | 102,770.67 | 15.16 | 1,922,159.67 | 29,180.00 |
| 5/1/08 | 102,785.83 | 0 | 5/15/08 | 1,921,582.54 | 90,519.00 | 12,251.54 | 102,770.54 | 0.00 | 102,770.54 | 15.29 | 1,831,063.54 | 29,195.29 |
| 6/1/08 | 102,785.83 | 0 | 6/15/08 | 1,830,482.71 | 91,100.00 | 11,670.71 | 102,770.71 | 0.00 | 102,770.71 | 15.12 | 1,739,382.71 | 29,210.41 |
| 7/1/08 | 102,785.83 | 0 | 7/15/08 | 1,738,798.15 | 91,685.00 | 11,086.15 | 102,771.15 | 0.00 | 102,771.15 | 14.68 | 1,647,113.15 | 29,225.09 |
| 8/1/08 | 102,785.83 | 0 | 8/15/08 | 1,646,524.84 | 92,273.00 | 10,497.84 | 102,770.84 | 0.00 | 102,770.84 | 14.99 | 1,554,251.84 | 29,240.08 |
| 9/1/08 | 102,785.83 | 0 | 9/15/08 | 1,553,659.75 | 82,865.00 | 9,905.75 | 92,770.75 | 10,000.00 | 102,770.75 | 15.08 | 1,470,794.75 | 29,255.16 |
| 0/1/08 | 102,785.83 | 0 | 10/15/08 | 1,470,263.04 | 93,397.00 | 9,374.04 | 102,771.04 | 0.00 | 102,771.04 | 14.79 | 1,376,866.04 | 29,269.95 |

208(d)

Exhibit C

| Lease Payment Date | Lease Payment Amount | Draw on Accrued Interest Acct | ABBE Distribution Date | Beginning Certificate Payment (Prepayment Amount) Balance | Certificate Payments Principal Portion | Certificate Payments Interest Portion | Certificate Payments Total Certificate Payment | All Annual Fees (Trustee) | Total Certificate Payment And Fees | Payments & Accrued Interest Draws Over Certificate Payment & Fees | Ending Certificate Payment (Prepayment Amount) Balance | Ending Certificate Distribution Account Balance |
|---|---|---|---|---|---|---|---|---|---|---|---|---|
| 11/1/08 | 102,785.83 | 0 | 11/15/08 | 1,376,266.74 | 93,996.00 | 8,774.74 | 102,770.74 | 0.00 | 102,770.74 | 15.09 | 1,282,270.74 | 29,285.04 |
| 12/1/08 | 102,785.83 | 0 | 12/15/08 | 1,281,667.60 | 94,599.00 | 8,171.60 | 102,770.60 | 0.00 | 102,770.60 | 15.23 | 1,187,068.60 | 29,300.27 |
| 1/1/09 | 102,785.83 | 0 | 1/15/09 | 1,186,461.59 | 95,206.00 | 7,564.59 | 102,770.59 | 0.00 | 102,770.59 | 15.24 | 1,091,255.59 | 29,315.51 |
| 2/1/09 | 102,785.83 | 0 | 2/15/09 | 1,090,644.68 | 95,817.00 | 6,953.68 | 102,770.68 | 0.00 | 102,770.68 | 15.15 | 994,827.68 | 29,330.65 |
| 3/1/09 | 102,785.83 | 0 | 3/15/09 | 994,212.86 | 96,432.00 | 6,338.86 | 102,770.86 | 0.00 | 102,770.86 | 14.97 | 897,780.86 | 29,345.63 |
| 4/1/09 | 102,785.83 | 0 | 4/15/09 | 897,162.09 | 97,051.00 | 5,720.09 | 102,771.09 | 0.00 | 102,771.09 | 14.74 | 800,111.09 | 29,360.37 |
| 5/1/09 | 102,785.83 | 0 | 5/15/09 | 799,488.34 | 97,674.00 | 5,097.34 | 102,771.34 | 0.00 | 102,771.34 | 14.49 | 701,814.34 | 29,374.86 |
| 6/1/09 | 102,785.83 | 0 | 6/15/09 | 701,187.60 | 98,300.00 | 4,470.60 | 102,770.60 | 0.00 | 102,770.60 | 15.23 | 602,887.60 | 29,390.09 |
| 7/1/09 | 102,785.83 | 0 | 7/15/09 | 602,256.84 | 98,931.00 | 3,839.84 | 102,770.84 | 0.00 | 102,770.84 | 14.99 | 503,325.84 | 29,405.07 |
| 8/1/09 | 102,785.83 | 0 | 8/15/09 | 502,691.04 | 99,566.00 | 3,205.04 | 102,771.04 | 0.00 | 102,771.04 | 14.79 | 403,125.04 | 29,419.87 |
| 9/1/09 | 102,785.83 | 0 | 9/15/09 | 402,486.15 | 97,705.00 | 2,566.15 | 100,271.15 | 2,500.00 | 102,771.15 | 14.68 | 304,781.15 | 29,434.55 |
| 10/1/09 | 102,785.83 | 0 | 10/15/09 | 304,154.21 | 100,832.00 | 1,939.21 | 102,771.21 | 0.00 | 102,771.21 | 14.62 | 203,322.21 | 29,449.16 |
| 11/1/09 | 102,785.83 | 0 | 11/15/09 | 202,675.21 | 101,479.00 | 1,292.21 | 102,771.21 | 0.00 | 102,771.21 | 14.62 | 101,196.21 | 29,463.79 |
| 12/1/09 | 102,785.83 | 0 | 12/15/09 | 100,545.05 | 99,904.00 | 641.05 | 100,545.05 | 0.00 | 100,545.05 | 2,240.78 | 641.05 | 31,704.57 |
| Totals | 15,571,372.96 | 0.00 | | | 9,040,000.00 | 6,392,168.39 | 15,432,168.39 | 132,500.00 | 15,564,668.39 | 6,704.57 | | |

EXHIBIT D

FORM OF AMENDED AND RESTATED TRUST AGREEMENT

FIRST AMENDED AND RESTATED

TERM TRUST AGREEMENT

BETWEEN

SCRIBCOR, INC.

SELLER

AND

The First National Bank of Chicago

TERM TRUSTEE

DATED AS OF AUGUST 25, 1995

TABLE OF CONTENTS

| | | Page |
|---|---|---|
| ARTICLE I | | |
| | DEFINITIONS AND INCORPORATION BY REFERENCE | 215 |
| 1.1 | Definitions | 215 |
| ARTICLE II | | |
| | ORGANIZATION | 215 |
| 2.1 | Name | 215 |
| 2.2 | Office | 216 |
| 2.3 | Purposes and Powers | 216 |
| 2.4 | Appointment of Term Trustee | 217 |
| 2.5 | Initial Capital Contribution of Trust Estate | 217 |
| 2.6 | Declaration of Trust | 217 |
| 2.7 | Liability of the Seller and the Certificateholders | 218 |
| 2.8 | Title to Trust Property | 218 |
| 2.9 | Situs of Trust | 219 |
| 2.10 | Representations and Warranties of the Seller | 219 |
| 2.11 | Tax Treatment | 221 |
| ARTICLE III | | |
| | THE CERTIFICATES | 222 |
| 3.1 | Initial Certificate Ownership | 222 |
| 3.2 | Form of the Certificates | 222 |
| 3.3 | Execution, Authentication and Delivery | 223 |
| 3.4 | Registration; Registration of Transfer and | |

| | | | |
|---|---|---|---|
| | | Exchange of Certificates | 223 |
| | 3.5 | Mutilated, Destroyed, Lost or Stolen Certificates | 224 |
| | 3.6 | Persons Deemed Certificateholders | 226 |
| | 3.7 | Access to List of Certificateholders' Names and Addresses | 226 |
| | 3.8 | Maintenance of Corporate Trust Office | 227 |
| | 3.9 | Seller as Certificateholder | 227 |
| | 3.10 | Restrictions on Transfer | 227 |
| | 3.11 | Book-Entry Certificates | 228 |
| | 3.12 | Notices to Clearing Agency | 230 |
| | 3.13 | Definitive Certificates | 230 |
| ARTICLE | | IV | |
| | ACTIONS BY TERM TRUSTEE | | 231 |
| | 4.1 | Prior Notice to Certificateholders with Respect to Certain Matte | 231 |
| | 4.2 | Prohibitions with Respect to Certain Matters | 231 |
| | 4.3 | Bankruptcy | 232 |
| | 4.4 | Restrictions on Certificateholders' Power | 232 |
| | 4.5 | Majority Control | 232 |
| | 4.6 | Limitations on Activities | 233 |
| ARTICLE | | V | |
| | APPLICATION OF TRUST FUNDS; CERTAIN DUTIES | | 234 |
| | 5.1 | Establishment of Certificate Distribution Account | 234 |
| | 5.2 | Application of Trust Funds | 235 |
| | 5.3 | Method of Payment | 237 |
| | 5.4 | Accounting and Reports to the Certificateholders, | |

the Internal Revenue Service and Others 237

5.5 Signature on Returns 237

5.6 Investment of Trust Funds 238

ARTICLE VI

THE TERM TRUSTEE 238

6.1 Duties of Term Trustee, General 238

6.2 Duties of Term Trustee, Specific 239

6.3 Rights of Term Trustee 249

6.4 Acceptance of Trusts and Duties 249

6.5 Action upon Instruction by Certificateholders 251

6.6 Furnishing of Documents 252

6.7 Representations and Warranties of Term Trustee 252

6.8 Reliance; Advice of Counsel 254

6.9 Term Trustee Shall Not Own Certificates and Notes 255

6.10 Compensation ; Reimbursable Costs 255

6.11 Replacement of Term Trustee 256

6.12 Merger or Consolidation of Term Trustee 258

6.13 Appointment of Co-Trustee or Separate Trustee 258

6.14 Eligibility Requirements for Term Trustee 260

6.15 Replacement of Servicer 261

ARTICLE VII

TERMINATION OF TRUST AGREEMENT 262

7.1 Termination of Trust Agreement 262

7.2 Termination Pursuant to Section 6.2 264

7.3 Distribution of Remainder Proceeds 265

| | | |
|---|---|---|
| 7.4 | Failure of Auction | 265 |
| 7.5 | Default by Purchaser | 266 |
| ARTICLE | VIII | |
| | AMENDMENTS | 267 |
| 8.1 | Amendments | 267 |
| 8.2 | Form of Amendments | 267 |
| ARTICLE | IX | |
| | MISCELLANEOUS | 268 |
| 9.1 | No Legal Title to Trust Estate. | 268 |
| 9.2 | Limitations on Rights of Others | 268 |
| 9.3 | Derivative Actions. | 269 |
| 9.4 | Notices | 269 |
| 9.5 | Severability | 270 |
| 9.6 | Counterparts | 270 |
| 9.7 | Successors and Assigns | 270 |
| 9.8 | No Recourse | 271 |
| 9.9 | Headings | 271 |
| 9.10 | Governing Law | 271 |
| Exhibit A | Form of Certificate | |
| Exhibit B | Form of Securities Act Exemption Certificate | |
| Exhibit C | Form of Undertaking Letter | |
| Exhibit D | Form of Distribution Date Statement | |
| Exhibit E | Lease and Guarantee | |
| Exhibit F | Servicing Agreement | |
| Exhibit G | Form of Certificate Depository Agreement | |

FIRST AMENDED AND RESTATED TRUST AGREEMENT, dated as of August 25, 1995, between SCRIBCOR, INC., an Illinois corporation, as Seller, and The First National Bank of Chicago, a national banking association, not in its personal capacity but solely as Term Trustee of the Trust created hereby.

RECITALS

A. Seller and Term Trustee are parties to that certain Term Trust Agreement dated as of April 27, 1995 (the "Original Agreement") establishing the K.C.ABBE® Trust 1995-1.

B. Pursuant to Section 8.1(a) of the Original Agreement, the parties hereto wish to amend and restate the Original Agreement as hereinafter set forth, to which the Certificateholders consent.

The Seller and the Term Trustee hereby agree as follows:

ARTICLE I

DEFINITIONS AND INCORPORATION BY REFERENCE

SECTION 1.1 Definitions . Certain capitalized terms used in this Agreement shall have the respective meanings assigned to them in Appendix A attached hereto or Appendix A to the Servicing Agreement. All references herein to "the Agreement" or "this Agreement" are to this First Amended and Restated Trust Agreement, and all references herein to Articles, Sections and subsections are to Articles, Sections and subsections of this Agreement unless otherwise specified.

ARTICLE II

ORGANIZATION

SECTION 2.1 Name . The Trust created hereby shall be known as the K.C.

ABBE® Trust 1995-1 in which name the Term Trustee may conduct the business of the Trust, make and execute contracts and other instruments on behalf of the Trust and sue and be sued on behalf of the Trust.

SECTION 2.2 Office. The office of the Trust shall be in care of the Term Trustee at the Corporate Trust Office or as the Term Trustee may designate by written notice to the Certificateholders.

SECTION 2.3 Purposes and Powers. (a) The purpose of the Trust is to engage in the following activities:

(i) to acquire, manage and hold the Trust Estate in accordance with the terms hereof;

(ii) to issue the Certificates pursuant to this Agreement, and to sell, transfer or exchange the Certificates;

(iii) to collect and receive all payments required to be made by the Tenant under the Lease, whether such payments constitute Rent or other sums required to be paid by the Tenant pursuant to the terms of the Lease, to make payments to the Certificateholders at the times and in the manner herein set forth, and to pay the organizational, start-up and transactional expenses of the Trust;

(iv) to enter into and perform the obligations and exercise the rights of the Landlord under the Lease;

(v) subject to the limitations hereinafter set forth herein, to engage in those activities, including entering into agreements, that are necessary, suitable or convenient to accomplish the foregoing or are incidental thereto or connected therewith; and (vi) subject to compliance herewith and with the Lease and the Administration Agreement, to engage in such other activities as may be required in connection with conservation of the Trust Estate and the making of distributions to the Certificateholders. The Trust shall not engage in any activity other than in furtherance of the foregoing or as specifically required or authorized by the terms of this Agreement or the Administration Agreement.

SECTION 2.4 Appointment of Term Trustee . The Seller hereby appoints the Term Trustee as trustee of the Trust effective as of the date hereof, to have all the rights, powers and duties set forth herein.

SECTION 2.5 Initial Capital Contribution of Trust Estate . The Seller has previously sold, transferred, assigned and conveyed to the Term Trustee, not personally, but solely in its capacity as trustee under the Original Agreement, an estate for years in the Real Property, the Lease and the Guaranty. The Term Trustee hereby acknowledges receipt in trust from the Seller, as of the date hereof, of the foregoing contribution, which shall constitute the initial Trust Estate. The Seller has paid all organizational expenses of the Trust incurred through the date hereof together with the trustee's fee. Except as specifically provided in Section 6.10, the Seller shall have no further obligations with respect to the payment of Reimbursable Costs or any other fees or expenses incurred by the Term Trustee after the date hereof.

SECTION 2.6 Declaration of Trust . The Term Trustee hereby declares that it shall hold the Trust Estate in trust, upon and subject to the conditions set forth herein, for the use and benefit of the Certificateholders, subject to the obligations of the Trust under the Lease and the Administration Agreement. It is the intention of the parties hereto that, solely for purposes of federal income taxes, state and local income and franchise taxes, and any other taxes imposed upon, measured by, or based upon gross or net income, the Trust shall be treated as a grantor trust subject to the provisions of Subchapter J of Chapter 1 of the Code (or the corresponding provisions of applicable state or local law). The parties agree that, unless otherwise required by appropriate tax authorities, the Trust shall file or cause to be filed annual or other necessary returns, reports and other forms consistent with the characterization of the Trust as a grantor trust for such tax purposes. Effective as of the date hereof, the Term Trustee shall have all rights, powers and duties set forth herein and under applicable law with respect to accomplishing the purposes of the Trust.

SECTION 2.7 Liability of the Seller and the Certificateholders .

(a) In no event shall the Seller be liable, directly or indirectly, for any losses, claims, damages, liabilities and expenses of the Trust (including without limitation, except as specifically provided in Section 6.10, Reimbursable Costs, to the extent not paid out of the Trust Estate) including, without limitation, (i) any loss, cost, damage or expense suffered or incurred by the Trust in connection with the ownership, use, operation and maintenance of the Real Property (ii) any losses incurred by a Certificateholder in its capacity as an investor in the Certificates or (iii) any losses, claims, damages, liabilities and expenses arising out of the imposition by any taxing authority of any federal, state or local income or franchise taxes, or any other taxes imposed on or measured by gross or net income, gross or net receipts, capital, net worth and similar items (including any interest, penalties or additions with respect thereto) upon the Certificateholders, or the Term Trustee (including any liabilities, costs or expenses with respect thereto) with respect to the Trust Estate not specifically indemnified or represented to hereunder.

(b) No Certificateholder shall have any personal liability for any liability or obligation of the Trust.

SECTION 2.8 Title to Trust Property . Legal title to all of the Trust Estate shall be vested at all times in the Trust as a separate legal entity except to the extent that applicable law requires title to any part of the Trust Estate to be vested in a trustee or trustees, in which case title shall be deemed to be vested in the Term Trustee, a co-trustee and/or a separate trustee, as the case may be.

SECTION 2.9 Situs of Trust . The Trust shall be located and administered in the State of the Corporate Trust Office. All bank accounts maintained by the Term Trustee on behalf of the Trust shall be located in the State of the Corporate Trust Office. The Trust shall not have any employees in any state other than the State of the Corporate Trust Office; provided, however, that nothing herein shall restrict or prohibit the Term Trustee from having employees within or without the State of the Corporate Trust Office. Payments shall be received by the Trust only at the Corporate Trust Office, and payments will be made by the Trust only from the Corporate Trust Office. The only office of the Trust shall be the Corporate Trust Office.

SECTION 2.10 Representations and Warranties of the Seller . The Seller hereby represents and warrants to the Term Trustee that:

(a) The Seller has been duly organized and is validly existing as a corporation in good standing under the laws of the State of Illinois, with power and authority to own its properties and to conduct its business as such properties are presently owned and such business is presently conducted and had at all relevant times, and now has, power, authority and legal right to acquire and own the Trust Estate.

(b) The Seller is duly qualified to do business as a foreign corporation in good standing, and has obtained all necessary licenses and approvals in all jurisdictions in which the ownership or lease of property or the conduct of its business requires such qualifications.

(c) The Seller has the power and authority to execute and deliver this Agreement and to carry out its terms. The Seller has, and had at all relevant times, full power and authority to sell and assign the property to be sold and assigned to and deposited with the Term Trustee as part of the Trust and the Seller has duly authorized such sale and assignment to the Term Trustee by all necessary corporate action; and the execution, delivery and performance of this Agreement have been duly authorized by the Seller by all necessary corporate action.

(d) The consummation of the transactions contemplated by this Agreement and the fulfillment of the terms of this Agreement do not conflict with, result in any breach of any of the terms and provisions of or constitute (with or without notice or lapse of time) a default under, the certificate of incorporation or by-laws of the Seller, or any indenture, agreement or other instrument, or violate any law or, to the best of the Seller's knowledge, any order, rule or regulation applicable to the Seller of any court or of any federal or state regulatory body, administrative agency or other governmental instrumentality having jurisdiction over the Seller or any of its properties.

(e) A true, correct and complete copy of the Lease and Guarantee is attached hereto as Exhibit E.

(f) Seller has not received written notice of any material action, proceeding or investigation pending or threatened which would affect the Real Property.

(g) Seller has not received any notice of violation of or potential liability arising under any federal, state, county, municipal or other governmental authority laws, regulations, ordinances, orders or directives relating to the use or condition or operation of the Real Property, including but not limited to zoning, building, fire, air pollution, water pollution, environmental or health code violations, that have not been heretofore corrected.

(h) There is no suit, petition, study, investigation or other proceeding pending before any court, governmental agency or instrumentality, administrative or otherwise (including enforcement actions, administrative proceedings, arbitrations, or governmental investigations) regarding the Real Property. There is no condemnation proceeding pending or declaration of taking or other similar instrument filed against the Real Property.

(i) There are no persons in possession of, or having a right to possession of, any part of the Real Property other than Seller, Tenant and persons (known or unknown) claiming by, through or under the Tenant. The Lease is in full force and effect, is the valid and binding obligation of the parties thereto, has not been modified or amended and is enforceable against such parties in accordance with the terms thereof. There are no defaults by either party to the Lease beyond any applicable grace or cure period.

(j) The exceptions to title to the Real Property existing at the time of execution of this Agreement do not materially adversely affect the use and operation of the Real Property for the uses permitted under the Lease or the obligation of Tenant to pay all Rent due thereunder.

SECTION 2.11 Tax Treatment. The Seller and the Term Trustee, by entering into this Agreement, and the Certificateholders, by acquiring any Certificate or interest therein, (i) express their intention that the Certificates will qualify under applicable tax law as certificates of beneficial interest in a grantor trust subject to the provisions of Subchapter J of Chapter 1 of the Code (or the corresponding provisions of applicable state or local law) and (ii) unless otherwise required by appropriate taxing authorities, agree to treat the Certificates as certificates of beneficial interest in a grantor trust subject to the provisions of Subchapter J of Chapter 1 of the Code (or the corresponding provisions of applicable state or local law) for the purposes of federal income taxes, state and local income and franchise taxes, and any other taxes imposed upon, measured by, or based upon gross or net income.

ARTICLE III

THE CERTIFICATES

SECTION 3.1 Initial Certificate Ownership .

Upon the formation of the Trust through the contribution by the Seller made pursuant to Section 2.5 and until the issuance of the Certificates, the Seller or its nominee shall be the sole Certificateholder.

SECTION 3.2 Form of the Certificates

The Certificates shall be substantially in the form set forth in Exhibit A and shall be issued in minimum denominations of $20,000.00 and in integral multiples of $1,000.00 in excess thereof; provided, however, that one Certificate may be issued in a denomination that includes any residual amount. The Certificates shall be executed on behalf of the Trust by manual or facsimile signature of a Responsible Officer of the Term Trustee. Certificates bearing the manual or facsimile signatures of individuals who were, at the time when such signatures shall have been affixed, authorized to sign on behalf of the Trust, shall be duly issued, fully paid and non-assessable beneficial interests in the Trust, notwithstanding that such individuals or any of them shall have ceased to be so authorized prior to the authentication and delivery of such Certificates or did not hold such offices at the date of authentication and delivery of such Certificates.

(b) The Certificates shall be typewritten, printed, lithographed or engraved or produced by any combination of these methods (with or without steel engraved borders) all as determined by the officers executing such Certificates, as evidenced by their execution of such Certificates.

(c) The terms of the Certificates s et forth in Exhibit A shall form part of this Agreement.

SECTION 3.3 Execution, Authentication and Delivery . Following with the acquisition of the Trust Estate by the Trust, the Term Trustee shall cause the Certificates in an aggregate principal amount equal to the initial Certificate Balance to be executed on behalf of the Trust, authenticated and delivered to or upon the written order of the Seller, signed by its chairman of the board, its president or any vice president, without further corporate action by the Seller, in authorized denominations. No Certificate shall entitle its holder to any benefit under this Agreement, or shall be valid for any purpose, unless there shall appear on such Certificate a certificate of authentication substantially in the form set forth in Exhibit A, executed by the Term Trustee or an authenticating agent appointed by the Term Trustee, by manual signature. Such authentication shall constitute conclusive evidence that such Certificate shall have been duly authenticated and delivered hereunder. All Certificates shall be dated the date of their authentication.

SECTION 3.4 Registration; Registration of Transfer and Exchange of Certificates .

(a) The Term Trustee shall keep or cause to be kept, at the Corporate Trust Office, a Certificate Register in which, subject to such reasonable regulations as it may prescribe, the Term Trustee shall provide for the registration of Certificates and of transfers and exchanges of Certificates as provided herein; provided, however, that no Certificate may be subdivided upon transfer or exchange such that the denomination of any resulting Certificate is less than $20,000.00.

(b) Upon surrender for registration of transfer of any Certificate at the Corporate Trust Office, the Term Trustee shall execute on behalf of the Trust, authenticate and deliver (or shall cause its authenticating agent to authenticate and deliver), in the name of the designated transferee or transferees, one or more new Certificates in authorized denominations of a like aggregate amount dated the date of authentication by the Term Trustee or any authenticating agent.

(c) At the option of a Certificateholder, Certificates may be exchanged for other Certificates of authorized denominations of a like aggregate principal amount upon surrender of the Certificates to be exchanged at the Corporate Trust Office. Whenever any Certificates are so surrendered for exchange, the Term Trustee shall execute on behalf of the Trust, authenticate and deliver (or shall cause its authenticating agent to authenticate and deliver) one or more Certificates dated the date of authentication by the Term Trustee or any authenticating agent. Such Certificates shall be delivered to the Certificateholder making the exchange.

(d) Every Certificate presented or surrendered for registration of transfer or exchange shall be accompanied by a written instrument of transfer in form satisfactory to the Term Trustee duly executed by the Certificateholder or his attorney duly authorized in writing. Each Certificate surrendered for registration of transfer or exchange shall be cancelled and subsequently destroyed by the Term Trustee in accordance with its customary practice.

(e) No service charge shall be made for any registration of transfer or exchange of Certificates, but the Term Trustee may require payment of a sum sufficient to cover any tax or governmental charge that may be imposed in connection with any transfer or exchange of Certificates.

SECTION 3.5 Mutilated, Destroyed, Lost or Stolen Certificates .

(a) If (i) any mutilated Certificate is surrendered to the Term Trustee, or The Term Trustee receives evidence to its satisfaction of the destruction, loss or theft of any Certificate, and (ii) there is delivered to the Term Trustee and the Trust such security or indemnity as may be required by them to hold each of them harmless, then, in the absence of notice to the Term Trustee that such Certificate has been acquired by a bona fide purchaser, the Term Trustee shall execute on behalf of the Trust and the Term Trustee shall authenticate and deliver (or shall cause its authenticating agent to authenticate and deliver), in exchange for or in lieu of any such mutilated, destroyed, lost or stolen Certificate, a replacement Certificate of a like aggregate principal amount; provided, however, that if any such destroyed, lost or stolen Certificate, but not a mutilated Certificate, shall have become or within seven days shall be due and payable, then instead of issuing a replacement Certificate the Term Trustee may pay such destroyed, lost or stolen Certificate when so due or payable.

(b) If, after the delivery of a replacement Certificate or payment in respect of a destroyed, lost or stolen Certificate pursuant to subsection 3.5(a), a bona fide purchaser of the original Certificate in lieu of which such replacement Certificate was issued presents for payment such original Certificate, the Term Trustee shall be entitled to recover such replacement Certificate (or such payment) from the Person to whom it was delivered or any Person taking such replacement Certificate from such Person to whom such replacement Certificate was delivered or any assignee of such Person, except a bona fide purchaser, and shall be entitled to recover upon the security or indemnity provided therefor to the extent of any loss, damage, cost or expense incurred by the Term Trustee in connection therewith.

(c) In connection with the issuance of any replacement Certificate under this Section 3.5, the Term Trustee may require the payment by the Certificateholder of such Certificate of a sum sufficient to cover any tax or other governmental charge that may be imposed in relation thereto and any other reasonable expenses (including the fees and expenses of the Term Trustee and the Certificate Registrar) connected therewith.

(d) Any duplicate Certificate issued pursuant to this Section 3.5 in replacement of any mutilated, destroyed, lost or stolen Certificate shall constitute an original additional beneficial interest in the Trust, whether or not the mutilated, destroyed, lost or stolen Certificate shall be found at any time or be enforced by anyone, and shall be entitled to all the benefits of this Agreement equally and proportionately with any and all other Certificates duly issued hereunder.

(e) The provisions of this Section 3.5 are exclusive and shall preclude (to the extent lawful) all other rights and remedies with respect to the replacement or payment of mutilated, destroyed, lost or stolen Certificates.

SECTION 3.6 Persons Deemed Certificateholders . Prior to due presentation of a Certificate for registration of transfer, the Term Trustee may treat the Person in whose name any Certificate shall be registered in the Certificate Register as the Certificateholder of such Certificate for the purpose of receiving distributions pursuant to Article V and for all other purposes whatsoever, and the Term Trustee shall not be affected by any notice to the contrary.

SECTION 3.7 Access to List of Certificateholders' Names and Addresses . The Term Trustee shall furnish within 15 days after receipt by the Term Trustee of a written request therefor from the Seller or any Certificateholder, a list, in such form as the party requesting such list may reasonably require, of the names and addresses of the Certificateholders as of the most recent Record Date. Each Holder, by receiving and holding a Certificate, shall be deemed to have agreed not to hold the Term Trustee accountable by reason of the disclosure of its name and address, regardless of the source from which such information was derived.

SECTION 3.8 Maintenance of Corporate Trust Office . The Term Trustee shall maintain at the Corporate Trust Office, an office or offices or agency or agencies where Certificates may be surrendered for registration of transfer or exchange and where notices and demands to or upon the Term Trustee in respect of the Certificates and the Trust Agreement, Lease and Administrative Agreement may be served. The Term Trustee shall give prompt written notice to the Seller and to the Certificateholders of any change in the location of the Certificate Register or any such office or agency.

SECTION 3.9 Seller as Certificateholder . The Seller in its individual or any other capacity shall not become the owner or pledge of Certificates after the date hereof.

SECTION 3.10 Restrictions on Transfer .

(a) The Certificates have not and will not be registered under the Securities Act of 1933, as amended (the "Securities Act"), or the securities laws of any other jurisdiction. Consequently, the Certificates are not transferable other than pursuant to an exemption from the registration requirements of the Securities Act and satisfaction of certain other provisions specified herein. No sale, pledge or other transfer of the Certificates may be made by any person unless either (i) such sale, pledge or other transfer is made to a "qualified institutional buyer" that executes a certificate, in the form attached hereto as Exhibit B or as otherwise in form and substance satisfactory to the Term Trustee and the Seller, to the effect that (A) it is "qualified institutional buyer" as defined under Rule 144A under the Securities Act, acting for its own account or the accounts of other "qualified institutional buyers" as defined under Rule 144A under the Securities Act, and (B) it is aware that the transferor of such Certificate intends to rely on the exemption from the registration requirements of the Securities Act provided by Rule 144A under the Securities Act, or (ii) such sale, pledge or other transfer is otherwise made in a transaction exempt from the registration requirements of the Securities Act, in which case (A) the Term Trustee shall require that both the prospective transferor and the prospective transferee certify to the Term Trustee and the Seller in writing the facts surrounding such transfer, which certification shall be in form and substance satisfactory to the Trustee and the Seller, and (B) the Term Trustee shall require a written opinion of counsel (which will not be at the expense of the Seller or the Term Trustee) satisfactory to the Seller and the Term Trustee to the effect that such transfer will not violate the Securities Act.

(b) The Certificates may not be acquired by or for the account of (i) an employee benefit plan (as defined in Section 3(3) of the Employee Income Retirement Security Act of 1974, as amended ("ERISA")) that is subject to the provisions of Title I of ERISA (ii) a plan described in Section 4975(e)(1) of the Internal Revenue Code of 1986, as amended, or (iii) any entity whose underlying assets include "plan assets" as defined in ERISA by reason of a plan's investment in the entity (each, a "Benefit Plan"). By accepting and holding a Certificate, the Certificateholder shall be deemed to have represented and warranted that it is not a Benefit Plan and, if requested to do so by the Seller or the Trustee, the Certificateholder shall execute and deliver to the Trustee an Undertaking Letter in the form set forth in Exhibit C.

SECTION 3.11 Book-Entry Certificates . Except for the Certificates issued to the Seller, the Certificates, upon original issuance, may be issued in the form of a typewritten certificate or certificates representing Book-Entry Certificates, to be delivered to the Clearing Agency by or on behalf of the Trust pursuant to the terms of the Certificate Depository Agreement. Such Certificate or Certificates shall initially be registered on the Certificate Register in the name of Cede & Co., the nominee of the Clearing Agency and no Certificateholder shall receive a Certificate representing such Certificateholder's interest in the Trust (or Certificate of Ownership thereof) except as provided in Section 3.13. Unless and until definitive fully registered Certificates (the "Definitive Certificates") shall have been issued to Certificateholders pursuant to Section 3.13:

(a) the provisions of this Section 3.11 shall be in full force and effect;

(b) the Term Trustee shall be entitled to deal with the Clearing Agency for all purposes of this Agreement (including the payment of principal of and interest on the Certificates and the giving of instructions or directions hereunder) as the sole Certificateholder;

(c) to the extent that the provisions of this Section 3.11 conflict with any other provisions of this Agreement, the provisions of this Section 3.11 shall control;

(d) the rights of the Certificateholders shall be exercised only through the Clearing Agency and shall be limited to those established by law and agreements between such Certificateholders and the Clearing Agency. Unless and until Definitive Certificates are issued pursuant to Section 3.13, the Clearing Agency will make book-entry transfers among the Clearing Agency Participants and receive and transmit Distributions on the Certificates to such Clearing Agency Participants;

(e) whenever this Agreement requires or permits actions to be taken based upon instructions or directions of Certificateholders owning a specified percentage of the Voting Interests, the Clearing Agency shall be deemed to represent such percentage only to the extent that it has received instructions to such effect from the beneficial owner(s) of the Certificate(s) and/or Clearing Agency Participants owning or representing, respectively, such required percentage of Voting Interests and has delivered such instructions to the Term Trustee.

SECTION 3.12 Notices to Clearing Agency . Whenever a notice or other communication to the Certificateholders is required under this Agreement, unless and until Definitive Certificates shall have been issued to Certificateholders pursuant to Section 3.13, the Owner Trustee shall give all such notices and communications specified herein to be given to Certificateholders to the Clearing Agency and shall have no further obligation to the Certificateholders.

SECTION 3.13 Definitive Certificates . If the Clearing Agency is no longer willing or able to properly discharge its responsibilities with respect to the Certificates, and the Term Trustee is unable to locate a qualified successor, the Term Trustee elects by notice in writing to the Certificateholders to terminate the book-entry system through the Clearing Agency, or after the occurrence of an Event of Default, Certificateholders owning a majority of the Voting Interests advise the Clearing Agency in writing that the continuation of a book-entry system through the Clearing Agency is no longer in the best interest of the Certificateholders, then the Clearing Agency shall notify all Certificateholders and the Term Trustee of the occurrence of any such event and of the availability of Definitive Certificates to Certificateholders requesting the same. Upon surrender to the Term Trustee of the typewritten Certificate or Certificates representing the Book-Entry Certificates by the Clearing Agency, accompanied by registration instructions, the Term Trustee shall execute and authenticate the Definitive Certificates in accordance with the instructions of the Clearing Agency. The Term Trustee shall not be liable for any delay in delivery of such instructions and may conclusively rely on, and shall be protected in relying on, such instructions. Upon the issuance of Definitive Certificates, the Term Trustee shall recognize the party(ies) to whom such Definitive Certificate(s) is (are) issued as Certificateholders.

ARTICLE IV

ACTIONS BY TERM TRUSTEE

SECTION 4.1 Prior Notice to Certificateholders with Respect to Certain Matters The Term Trustee shall not take and shall not direct the Servicer to take any action with respect to the initiation of any claim or lawsuit by the Trust and the compromise of any action, claim or lawsuit brought by or against the Trust until: (i) the Term Trustee shall have notified the Certificateholders in writing of the proposed action, such notice to be given at least five (5) business days before the taking of the action described in such notice; and (ii) the Certificateholders have failed to notify the Term Trustee in writing prior to the 5th business day after such notice is given that such Certificateholders have withheld consent or provided alternative direction.

SECTION 4.2 Prohibitions with Respect to Certain Matters . The Term Trustee shall not have the right, power or authority, except upon the occurrence of a Termination Event, to sell, assign, transfer or convey the Trust Estate or any interest therein, and then, only in accordance with and to the extent of the provisions of Section 7.2 hereof. In no event shall the Term Trustee have the right, power or authority to: (i) pledge, mortgage or hypothecate the Trust Estate or any interest therein; or (ii) amend, or cause to be amended, the Lease; nor shall the Certificateholders have the right, power or authority to direct the Term Trustee to so act, except as explicitly provided in this Agreement. The Term Trustee shall not consent to any assignment of the Lease or sublease of any material portion of the Real Property by the Tenant unless there shall then exist no default or Event of Default under the Lease and after giving effect to the proposed assignment or sublease, the Tenant and the guarantor under the Guarantee shall remain fully liable for each and every of the obligations of the Tenant under the Lease and shall confirm the same in writing to the Term Trustee and the proposed assignee or sublessee shall execute and deliver a written agreement agreeing to be bound by the terms and conditions of the Lease; or (iii) the Term Trustee shall have notified the Certificateholders in writing describing the proposed assignment or sublease and Certificateholders having at least a majority of the Voting Interests shall have approved in writing the proposed assignment or sublease. The Term Trustee shall provide a copy of any notice given pursuant to this Section 4.2 to Standard & Poor's Corporation, Commercial Mortgage Surveillance Group, 25 Broadway, 10th Floor, New York, New York 10004-1064.

SECTION 4.3 Bankruptcy. In no event shall the Term Trustee have the right, power or authority to commence a voluntary proceeding in bankruptcy relating to the Trust.

SECTION 4.4 Restrictions on Certificateholders' Power. The Certificateholders shall not direct the Term Trustee to take or refrain from taking any action if such action or inaction would be contrary to any obligation of the Trust or the Term Trustee under this Agreement or the Administration Agreement or would be contrary to Section 2.3, nor shall the Term Trustee follow any such direction, if given. In no event shall the Certificateholders have the right to direct the Term Trustee to amend the Lease.

SECTION 4.5 Majority Control. Except as expressly provided herein, any action that may be taken or consent that may be given or withheld by the Certificateholders under this Agreement may be taken, given or withheld by Certificateholders having not less than a majority of the Voting Interests thereof. Except as expressly provided herein, any written notice of the Certificateholders delivered pursuant to this Agreement shall be effective if signed by Certificateholders consisting of not less than a majority of the Voting Interests at the time of the delivery of such notice.

SECTION 4.6 Limitations on Activities . Notwithstanding any other provisions of this Agreement.:

(a) The Term Trustee shall not acquire any asset other than the Trust Estate and those assets necessary or appropriate for, incidental to, or resulting from, the ownership, management or operation of the Trust Estate.

(b) The Trust shall not engage, and the Term Trustee shall not cause the Trust to engage, in any business other than those necessary for the ownership, management or operation of the Trust Estate. Any transaction between the Trust and the Term Trustee or any Affiliate of the Term Trustee shall be entered into upon terms and conditions that are intrinsically fair and substantially similar to those that would be available on an arms-length basis with third parties other than the Term Trustee or any Affiliate of the Term Trustee.

(c) The Trust shall not and the Term Trustee shall not cause the Trust to incur any debt, secured or unsecured, direct or contingent (including guaranteeing any obligation), other than (i) any debt secured by a lien on the Trust Estate that is authorized by any express provision of this Agreement and (ii) indebtedness incurred in the ordinary course of business, and (except for any debt arising out of or in connection with the duties as the trustee of the Trust or as otherwise provided for in this Agreement) the Term Trustee shall not incur any debt, secured or unsecured, direct or contingent (including guaranteeing any obligation).

(d) The Trust shall not, and the Term Trustee shall not cause the Trust to, make any loans or advances to any third party (including any Affiliate of the Term Trustee, the Tenant or the Certificateholders).

(e) The Trust shall, and the Term Trustee shall cause the Trust to, pay its liabilities from its own assets and not those of any other party and the Term Trustee shall pay its liabilities from its assets and not those of any other party.

(f) Subject to the provisions of Article VII hereof, the Term Trustee shall do or cause to be done all things necessary to preserve the existence of the Trust, and the provisions of this Paragraph 4.6 shall not be amended or modified except with the consent of all of the Certificateholders.

(g) The Trust shall and the Term Trustee shall cause the Trust to maintain books and records and bank accounts separate from those of its Affiliates.

(h) The Trust shall be, and at all times shall hold itself out to the public as, a legal entity separate and distinct from any other entity.

(i) The Trust shall and the Term Trustee shall cause the Trust to file its own tax returns.

(j) The Term Trustee shall not commingle the funds and other assets of the Trust with those of the Term Trustee, or any Affiliate of the Term Trustee or any other Person except as may be permitted by law.

(k) The Trust shall and the Term Trustee shall cause the Trust to conduct its own business in its own name.

(l) The Trust shall and the Term Trustee shall cause the Trust to observe all trust formalities.

ARTICLE V

APPLICATION OF TRUST FUNDS; CERTAIN DUTIES

SECTION 5.1 Establishment of Certificate Distribution Account .

(a) The Term Trustee, for the benefit of the Certificateholders, shall establish and maintain in the name of the Term Trustee a segregated trust account at The First National Bank of Chicago, or, if there shall be designated a successor Term Trustee, at such successor Term Trustee known as the K.C. ABBE Trust 1995-1 Certificate Distribution Account, bearing an additional designation clearly indicating that the funds deposited therein are held for the benefit of the Certificateholders (the "Certificate Distribution Account"). All fees and expenses for maintaining the Certificate Distribution Account shall be included in the trustee's fees payable to the Term Trustee in connection with this Agreement and shall not constitute Reimbursable Costs.

(b) The Term Trustee shall possess all right, title and interest in and to all funds on deposit from time to time in the Certificate Distribution Account and in all proceeds thereof. Except as otherwise provided herein, the Certificate Distribution Account shall be under the sole dominion and control of the Term Trustee for the benefit of the Certificateholders.

SECTION 5.2 Application of Trust Funds .

(a) On each Distribution Date (including the Final Distribution Date), the Term Trustee shall distribute to the Certificateholders, on a pro rata basis, from and only to the extent of amounts then on deposit in the Certificate Distribution Account, the Distributable Funds calculated as of the Record Date with respect to such Distribution Date.

(b) On each Distribution Date (including the Final Distribution Date), the Term setting forth, in reasonable detail, and substantially in the form of Exhibit D hereto, the amount of any Expected Distribution as set forth in Appendix C and calculated based upon the assumptions described therein, the amount and nature of all Collections received by the Term Trustee since the immediately preceding Distribution Date, the amount and calculation of the Distributable Funds as of such Distribution Date, a calculation of the difference between the Distributable Funds and the Expected Distribution, the balance of the Certificate Distribution Account after distribution of the Distributable Funds on such Distribution Date (and amounts, if any, distributed from the Certificate Distribution Account to the Term Trustee as reimbursement for Reimbursable Costs or to the Servicer as any Additional Servicing Fee) as of such Distribution Date. The Term Trustee is hereby specifically authorized to cause the amount, if any, of such Reimbursable Costs or Additional Servicing Fee to be distributed from the Certificate Distribution Account to the Term Trustee on each Distribution Date.

(c) If any withholding tax is imposed on the Trust's payment (or allocations of income) to a Certificateholder, such tax shall reduce the amount otherwise distributable to the Certificateholder in accordance with this Section 5.2. The Term Trustee is hereby authorized and directed to retain from amounts otherwise distributable to the Certificateholders sufficient funds for the payment of any tax that is legally owed by the Trust (it being understood that the Trustee may, but shall not be obligated, to contest any such tax in appropriate proceedings and withholding payment of such tax, if permitted by law, pending the outcome of such proceedings). The amount of any withholding tax imposed with respect to a Certificateholder shall be treated as cash distributed to such Certificateholder at the time it is withheld by the Trust and remitted to the appropriate taxing authority. If there is a possibility that withholding tax is payable with respect to a distribution (such as a distribution to a non-U.S. Certificateholder), the Term Trustee may in its sole discretion withhold such amounts in accordance with this subsection 5.2(c). If a Certificateholder wishes to apply for a refund of any such withholding tax, the Term Trustee shall reasonably cooperate with such Certificateholder in making such claim so long as such Certificateholder agrees to reimburse the Term Trustee for any out-of-pocket expenses incurred.

SECTION 5.3 Method of Payment . Subject to subsection 7.1(c), distributions required to be made to Certificateholders on any Distribution Date shall be made to each Certificateholder of record on the immediately preceding Record Date either by wire transfer, in immediately available funds, to the account of such Certificateholder at a bank or other entity having appropriate facilities therefor, if such Certificateholder shall have provided to the Term Trustee appropriate written instructions at least five (5) business days prior to such Record Date and such Holder's Certificates in the aggregate evidence a denomination of not less than $1,000,000, or, if not, by check mailed to such Certificateholder at the address of such holder appearing in the Certificate Register.

SECTION 5.4 Accounting and Reports to the Certificateholders, the Internal Revenue Service and Others . The Term Trustee shall maintain (or cause to be maintained) the books of the Trust on a calendar year basis on the cash method of accounting, deliver to each Certificateholder, as may be required by the Code and applicable Treasury Regulations or otherwise, such information as may be required to enable each Certificateholder to prepare its federal income tax return, file such tax returns relating to the Trust and make such elections as may from time to time be required or appropriate under any applicable state or federal statute or rule or regulation thereunder so as to maintain the Trust's characterization as a grantor trust for federal income tax purposes, cause such tax returns to be signed in the manner required by law and collect or cause to be collected any withholding tax as described in and in accordance with subsection 5.2(c) with respect to income or distributions to Certificateholders.

SECTION 5.5 Signature on Returns . The Term Trustee shall sign on behalf of the Trust any and all tax returns of the Trust, unless applicable law requires the Certificateholders to sign such documents, in which case such documents shall be signed by the Certificateholders.

SECTION 5.6 Investment of Trust Funds . The Term Trustee shall cause funds on deposit from time to time in the Certificate Distribution Account and any other accounts established from time to time by the Term Trustee pursuant to the terms of this Agreement to be invested in Eligible Investments. In making such investments, the Term Trustee shall take into consideration the timing and amount of Distributions and any other payments required or permitted to be made pursuant to this Agreement so as to maintain sufficient liquidity of such funds to permit the Term Trustee to meet the anticipated cash expenditure obligations of the Trust from time to time. Interest or other earnings from such Eligible Investments shall be credited to the Certificate Distribution Account as earned from time to time.

ARTICLE VI

THE TERM TRUSTEE

SECTION 6.1 Duties of Term Trustee, General .

(a) The Term Trustee undertakes to perform such duties, and only such duties, as are specifically set forth in this Agreement and the Administration Agreement, including the administration of the Trust in the interest of the Certificateholders, subject to the Administration Agreement and in accordance with the provisions of this Agreement and the Lease. No implied covenants, obligations or duties shall be read into this Agreement.

(b) In the absence of bad faith on its part, the Term Trustee may conclusively rely upon certificates or opinions furnished to the Term Trustee and conforming to the requirements of this Agreement in determining the truth of the statements and the correctness of the opinions contained therein; provided, however, that the Term Trustee shall have examined such certificates or opinions so as to determine compliance of the same with the requirements of this Agreement.

(c) The Term Trustee may not be relieved from liability for its own negligent action, its own negligent failure to act or its own willful misconduct, except that:

(i) this subsection 6.1(c) shall not limit the effect of subsection 6.1(a);

(ii) the Term Trustee shall not be liable for any error of judgment made in good faith by a Responsible Officer unless it is proved that the Term Trustee was negligent in ascertaining the pertinent facts; and (iii) the Term Trustee shall not be liable with respect to any action it takes or omits to take in good faith in accordance with a direction of the Seller or the Certificateholders received by it pursuant to any provision of this Agreement.

(d) Subject to Sections 5.1 and 5.2, monies received by the Term Trustee hereunder need not be segregated in any manner except (i) to the extent required by law and (ii) as specifically provided herein, and may be deposited under such general conditions as may be prescribed by law for trust funds.

(e) The Term Trustee shall not take any action that (i) is inconsistent with the purposes of the Trust set forth in Section 2.3 or (ii) would, to the Actual Knowledge of a Responsible Officer of the Term Trustee, result in the Trust's becoming taxable as a corporation for federal income tax purposes. The Certificateholders shall not direct the Term Trustee to take action that would violate the provisions of this Section 6.1.

SECTION 6.2 Duties of Term Trustee, Specific. In addition to, and not in derogation of, the general duty of the Term Trustee to administer the Trust in the interest of the Certificateholders, and to conserve the Trust Estate, the Term Trustee shall have the specific duties and obligations set forth below.

(a) The Term Trustee shall at all times prior to the termination of the Trust pursuant to Article VII hereof, take all actions necessary to preserve the existence of the Trust, including, without limitation, the preparation and filing of all instruments or documentation required in connection therewith. In no event shall the Term Trustee take any action, or consent to the taking of any action, pursuant to which the Term Trustee, the Certificateholders or any other person or party seeks to combine, partition, join or merge the Trust Estate with or into any other interest in the Real Property, it being acknowledged by the Certificateholders, through their acquisition of the Certificates, that no Certificateholder shall have any right, claim or cause of action, whether at law or in equity, against the Term Trustee or any other Person, pursuant to which such Certificateholder may seek to have the Trust Estate combined with any other interest in the Real Property, any such right having been hereby fully and irrevocably waived.

(b) Upon creation of the Trust pursuant hereto, the Term Trustee shall establish the Certificate Distribution Account, and shall receive on behalf of the Certificateholders all Collections made in respect of payments required to be made by the Tenant pursuant to the terms of the Lease. All Collections received by the Term Trustee shall be deposited into the Certificate Distribution Account and applied in accordance with the terms hereof.

(c) The Term Trustee shall engage the Servicer pursuant to the terms of the Servicing Agreement to monitor on behalf of the Term Trustee performance by the Tenant under the Lease, to give and receive notices required or appropriate to be given or received by the Landlord under the Lease and to otherwise perform on behalf of the Term Trustee the obligations of the Landlord under the Lease pursuant hereto and to the Servicing Agreement. If an Event of Default shall occur under the Lease, the Term Trustee shall give or shall cause the Servicer to give a Default Notice with respect thereto to the Tenant and to the Certificateholders not later than two (2) business days after the date on which the Term Trustee first obtains Actual Knowledge of the occurrence of such Event of Default. Each Default Notice shall specify in reasonable detail the nature of the default by the Tenant giving rise to the occurrence of such Event of Default. For all purposes of this Agreement, the Term Trustee shall be deemed to have Actual Knowledge of an Event of Default in the payment of any amount required to be paid by the Tenant under the terms of the Lease not later than two (2) business days after the date required for the making of such payment. In furtherance of its duties hereunder, the Term Trustee shall cause the Servicer to inspect the Real Property not less frequently than two (2) times in each twelve (12) calendar month period during the term of this Trust for the purpose of determining the Tenant's compliance with the terms of the Lease. All costs and expenses incurred by the Term Trustee pursuant to the Servicing Agreement shall be Reimbursable Costs.

(d) Unless otherwise directed in writing by the Certificateholders pursuant to Section 4.1, after the giving of a Default Notice, the Term Trustee shall initiate or shall cause the Servicer to initiate such actions, including, without limitation, the commencement of legal proceedings, as shall, in the judgment of counsel retained by the Term Trustee for such purpose, be necessary or appropriate to preserve the Trust Estate and enforce the rights and remedies of the Landlord under the Lease; and all reasonable costs and expenses incurred by the Term Trustee in so doing shall be Reimbursable Costs. In connection therewith, the Term Trustee shall direct the Servicer to obtain an inspection of the Real Property, including, without limitation, a Phase I environmental inspection and shall deliver copies of any report prepared in connection therewith to the Certificateholders promptly upon receipt of the same by the Term Trustee. In connection with any enforcement proceedings initiated by the Term Trustee or by the Servicer on behalf thereof, the Term Trustee or the Servicer, as the case may be, shall in all cases elect the measure of damages provided in Section XVIII B. of the Lease as will, in the reasonable judgement of the Term Trustee or Servicer, as the case may be, result in the maximum award to the Term Trustee in respect of such Event of Default. Notwithstanding the foregoing, the Term Trustee shall not be required to take any action, incur any expenses or advance any funds of the Term Trustee under this Section 6.2(d) unless: (i) there shall then be on deposit in the Certificate Distribution Account funds sufficient, in the reasonable judgment of the Term Trustee, to provide for reimbursement of all Reimbursable Costs incurred or to be incurred by the Term Trustee in acting pursuant to this Section 6.2(d); or (ii) the Term Trustee shall have received assurances from the Certificateholders (or otherwise) as to the source and manner for the reimbursement of such Reimbursable Costs reasonably satisfactory to the Term Trustee. If the Term Trustee shall seek such assurances from the Certificateholders and the Certificateholders shall fail or refuse to provide such assurances within fifteen (15) days after receipt of demand therefor, such failure or refusal shall (i) constitute a Termination Event and (ii) excuse further performance by the Term Trustee pursuant to this Section.

(e) Subject to Section 6.2(h), if the Lease or the Tenant's right to possession of the Real Property thereunder shall be terminated in connection with an Event of Default, Casualty Loss Termination, or Total Condemnation, the Term Trustee shall direct the Servicer to provide usual and customary property and asset management services pursuant to the Servicing Agreement and, subject to Section 4.1, initiate such actions as are, in the reasonable judgment of the Servicer and counsel engaged by the Term Trustee for such purpose necessary or appropriate to: (i) preserve the Trust Estate and maintain the Real Property including, without limitation, the payment of real property taxes, insurance premiums as required to maintain the Minimum Required Insurance and other reasonable costs and expenses of maintaining and preserving the Real Property in good operating condition and in compliance with all Laws; and (ii) if so directed in writing by the Certificateholders, procure a Replacement Lease or Leases on such terms and conditions as shall be approved in writing by the Certificateholders. All reasonable costs and expenses incurred by the Term Trustee pursuant to this Section 6.2(e) shall be Reimbursable Costs. Notwithstanding the foregoing, the Term Trustee shall not be required to take any action, incur any expenses or advance any funds of the Term Trustee under this Section 6.2(e) unless: (i) there shall then be on deposit in the Certificate Distribution Account funds sufficient, in the reasonable judgment of the Term Trustee, to provide for reimbursement of all Reimbursable Costs incurred or to be incurred by the Term Trustee in acting pursuant to this Section 6.2(e); or (ii) the Term Trustee shall have received assurances from the Certificateholders (or otherwise) as to the source and manner for the reimbursement of such Reimbursable Costs reasonably satisfactory to the Term Trustee. If the Term Trustee shall seek such assurances from the Certificateholders and the Certificateholders shall fail or refuse to provide such assurances within fifteen (15) days after receipt of notice thereof, such failure or refusal shall (i) constitute a Termination Event and (ii) excuse further performance by the Term Trustee pursuant to this Section.

(f) In the event of a Casualty Loss affecting the Real Property in connection with which the amount of Casualty Proceeds payable with respect to such Casualty Loss shall be $100,000.00 or more, the Term Trustee shall give or shall cause the Servicer to give, written notice thereof to the Certificateholders not later than five (5) business days after the Term Trustee shall have obtained Actual Knowledge of such Casualty Loss. Thereafter, the Term Trustee shall establish the Casualty Account into which the Net Casualty Proceeds from such Casualty Loss shall be deposited in accordance with Article XIV of the Lease (or any comparable provision of any Replacement Lease), and otherwise direct the Servicer to exercise the rights and perform the obligations, subject to the provisions of this Agreement, of the Landlord under said Article XIV (or the comparable provisions of any Replacement Lease) in connection with the restoration of the Real Property by the Tenant as required pursuant to Article XIV A. of the Lease. In any circumstance in which the Certificateholders do not direct the Term Trustee as to the taking (or not taking) of any action in connection with such restoration of the Real Property, the Term Trustee shall obtain the written recommendation of the Servicer with respect to the matter in question and shall proceed or cause Tenant to proceed with such restoration in the manner so recommended by the Servicer. The Term Trustee shall be entitled to conclusively rely on such recommendations for all purposes of this Agreement. All reasonable costs and expenses incurred by the Term Trustee in so acting, including, without limitation, Additional Servicing Fees and reasonable fees and expenses of counsel retained by the Term Trustee on behalf of the Trust in connection with such Casualty Loss shall be Reimbursable Costs. Notwithstanding anything to the contrary herein or in the Lease contained, the Term Trustee is hereby irrevocably instructed not to exercise any right it may have as Landlord under the Lease, including, without limitation, Article XIV B. thereof, to terminate the Lease upon the occurrence of a Casualty Loss.

(g) In the event of a Total Condemnation, Term Trustee shall give written notice thereof to the Certificateholders not later than five (5) business days after Term Trustee shall have obtained Actual Knowledge of such Total Condemnation and notwithstanding any direction to the contrary of Certificateholders, the Term Trustee is hereby irrevocably instructed to accept the offer to purchase the Real Property required to be made by the Tenant pursuant to Article XV, Subparagraph C of the Lease (or any comparable provision of any Replacement Lease). All reasonable costs and expenses incurred by the Term Trustee in so acting and in completing the sale of the Real Property to the Tenant pursuant to such offer, including without limitation, reasonable fees and expenses of counsel retained by the Term Trustee on behalf of the Trust in connection with such Total Condemnation shall be Reimbursable Costs. The Net Compensation received in connection with such Total Condemnation shall be deposited into the Certificate Distribution Account and applied in accordance with Section 7.3.

(h) Notwithstanding the provisions of Section 6.2(e), if the Lease, or the Tenant's right to possession of the Real Property thereunder, is terminated at any time during the last ten (10) years of the Term, the provisions of Section 6.2(e) with respect to the maintenance and repair of the Real Property shall not apply unless and until at least one (1) Replacement Tenant has executed a lease for and taken possession of the Real Property or any portion thereof; provided, however, that such maintenance provisions shall be likewise suspended at any time thereafter at which there shall not be at least one performing Tenant in possession of all or some portion of the Real Property.

(i) If there shall occur a Casualty Loss Termination, the Net Casualty Proceeds shall be deposited into the Casualty Account and applied by the Term Trustee or, at its direction, the Servicer, to restore the Real Property to substantially the same condition as existed immediately prior to the Casualty Loss giving rise to the Casualty Loss Termination. In such event, the Term Trustee shall direct the Servicer to obtain on behalf of the Trust, within forty-five (45) days after the Casualty Loss in question, or such later time as may be reasonable or necessary under the circumstances, at least three (3) fixed-price bids for the performance of the work required in connection with such restoration from experienced general contractors each having (i) net worth of not less than $10,000,000.00; (ii) a five (5) year annual average contract volume of not less than $50,000,000.00; and (iii) not less than ten (10) years of continuous business operation. The Term Trustee shall submit all three (3) bids to the Certificateholders, who shall direct in writing the Term Trustee as to the bid to be selected not later than thirty (30) days after receipt by the Certificateholders of such bids. If the Certificateholders shall fail or refuse to select one of the three (3) bids within said thirty (30) day period, then the Term Trustee shall direct the Servicer to make a written recommendation as to the bid which, in the judgement of the Servicer exercised in accordance with the servicing standards set forth in the Servicing Agreement, is in the best interest of the Certificateholders, and the Term Trustee shall select such bid and direct the Servicer to proceed with the restoration. In such event, the Term Trustee shall direct the Servicer to provide usual and customary construction management services in connection with the supervision and management of such restoration pursuant to the terms of the Servicing Agreement. All fees and expenses reasonably incurred by the Term Trustee in acting pursuant to this Section 6.2(i) shall be Reimbursable Costs. Notwithstanding the foregoing, the Term Trustee shall not be required to take any action, incur any expenses or advance any funds of the Term Trustee under this Section 6.2(i) unless: (1) there shall then be on deposit in the Casualty Account funds sufficient, in the sole judgment of the Term Trustee, to provide for reimbursement of all Reimbursable Costs incurred or to be incurred by the Term Trustee in acting pursuant to this Section 6.2(i); or (2) the Term Trustee shall have received assurances from the Certificateholders (or otherwise) as to the source and manner for the reimbursement of such Reimbursable Costs satisfactory to the Term Trustee. If the Term Trustee shall seek such assurances from the Certificateholders and the Certificateholders shall fail or refuse to provide such assurances within fifteen (15) days after receipt of demand therefor, such failure or refusal shall constitute a Termination Event and excuse further performance by the Term Trustee pursuant to the provisions of this Section. If, upon completion of the restoration of the Real Property required by this Section 6.2(i) there shall remain any unapplied balance of Net Casualty Proceeds, the same shall be distributed to the Certificateholders in accordance with Section 5.2 hereof.

(j) If there shall occur a Total Condemnation, the Term Trustee shall deposit the Net Compensation received in respect thereof into the Certificate Distribution Account for distribution in accordance with Sections 5.2 and 7.3 hereof.

(k) If there shall occur a Partial Condemnation, the Net Compensation received by the Term Trustee shall be deposited into the Condemnation Account and administered by the Servicer in accordance with Article XV, Subparagraph E of the Lease (or the comparable provisions of any Replacement Lease) to the payments required to be made to the Tenant (or any Replacement Tenant) in connection with the restoration of the Real Property by the Tenant as required pursuant to Article XV. Subparagraph E of the Lease. If, after making all payments of the Net Compensation required to be made to the Tenant (or any Replacement Tenant) there shall remain any unapplied balance of the Net Compensation, such unapplied balance shall be paid to the Remainder Trustee.

(l) The Term Trustee shall establish and maintain a segregated trust account at the First National Bank of Chicago, or if there shall be designated a successor Term Trustee, at such successor Term Trustee known as the K.C. ABBE® Trust 1995-1 Rental Interruption Insurance Reserve Account (the "RII Reserve Account") into which shall be deposited from the funds otherwise constituting Distributable Funds on the first Distribution Date after execution of this Agreement the amount of $28,200.00 as a reserve for the rental interruption insurance required to be obtained pursuant to this Section 6(l). Provided the same may then be obtained on commercially reasonable terms, the Term Trustee shall, or shall cause the Servicer to, obtain and maintain at all times during the last two years of the Term, rental interruption insurance in an amount equal to the lesser of: (i) 125% of the Prepayment Amount as of the first month in the penultimate year of the Term; and (ii) the total rent payable under the Lease during the final two years of the Term, and on such terms and conditions as shall then be customary insuring the Trust against interruption of rental payments under the Lease. Such insurance shall be written by a company having a claims paying ability rating of BBB+ or better as issued by Standard & Poor's Corporation. The cost of such rental interruption insurance shall be paid out of the RII Reserve Account with any excess cost to be paid by the Term Trustee from the Certificate Distribution Account. If, after acquiring such rental interruption insurance, there shall remain any unapplied balance in the RII Reserve Account, the same shall be distributed to the Certificateholders in accordance with Section 5.2 hereof.

(m) The Term Trustee shall establish and maintain a segregated account at The First National Bank of Chicago, or if there shall be designated a successor Term Trustee, at such successor Term Trustee known as the K.C. ABBE® Holdings Rating Agency Reserve Account (the "RA Reserve Account") for the benefit of the Certificateholders of the K.C. ABBE® Trust 1995-1 into which shall be deposited from the funds received from the Seller the amount of $17,500.00 as a reserve for the Rating Agency fees of approximately $2,000.00 per year which fees shall be paid upon receipt by the Term Trustee of invoices from the Rating Agency therefor. Upon the Final Distribution Date, any balance remaining in the RA Reserve Account shall be returned to Seller.

SECTION 6.3 Rights of Term Trustee . The Term Trustee is authorized and directed to execute and deliver the Administration Agreement and each certificate or other document attached as an exhibit to or contemplated by this Agreement or the Administration Agreement to which the Trust is to be a party, in such form as the Certificateholders shall approve as evidenced conclusively by the Term Trustee's execution thereof. In addition to the foregoing, the Term Trustee is authorized, but shall not be obligated, to take all actions required of the Trust pursuant to the Lease and Administration Agreement. To the extent not prohibited by this Agreement or the Administration Agreement, the Term Trustee is further authorized from time to time to take such action as the Certificateholders recommend with respect to the Trust Estate.

SECTION 6.4 Acceptance of Trusts and Duties . Except as otherwise provided in this Article VI, in accepting the trusts hereby created, The First National Bank of Chicago acts solely as Term Trustee hereunder and not in its individual capacity and all Persons having any claim against the Term Trustee by reason of the transactions contemplated by this Agreement shall look only to the Trust Estate for payment or satisfaction thereof. The Term Trustee accepts the trusts hereby created and agrees to perform its duties hereunder with respect to such trusts but only upon the terms of this Agreement. The Term Trustee also agrees to disburse all monies actually received by it constituting part of the Trust Estate upon the terms of this Agreement. The Term Trustee shall not be liable or accountable hereunder or under the Lease or the Administration Agreement under any circumstances, except a breach of its duties under this Agreement or its own willful misconduct or in the case of the inaccuracy of any representation or warranty contained in Section 6.7 and expressly made by the Term Trustee. In particular, but not by way of limitation (and subject to the exceptions set forth in the preceding sentence):

(a) except as specifically provided in Section 6.2 hereof, the Term Trustee shall at no time have any responsibility or liability for or with respect to sufficiency of the Trust Estate or its ability to generate the payments to be distributed to Certificateholders under this Agreement including, without limitation: the existence, condition and ownership of the Real Property; the existence and enforceability of any insurance thereon; or the performance or enforcement of the Lease.

(b) the Term Trustee shall not be liable with respect to any action taken or omitted to be taken by it in accordance with the instructions of the Certificateholders;

(c) no provision of this Agreement or the Lease or the Administration Agreement shall require the Term Trustee to expend or risk funds, incur any Reimbursable Cost, or otherwise incur any financial liability in the performance of any of its rights or powers hereunder, if the Term Trustee shall have reasonable grounds for believing that repayment of such funds or adequate indemnity against such risk or liability is not reasonably assured or provided to it;

(d) under no circumstances shall the Term Trustee be liable for the payment of amounts due under the Certificates except for the distribution of amounts in the Certificate Distribution Account in accordance with Section 5.3 hereof;

(e) the Term Trustee shall not be responsible for or in respect of and makes no representation as to the validity or sufficiency of any provision of this Agreement or for the due execution hereof by the Seller or for the form, character, genuineness, sufficiency, value or validity of any of the Trust Estate or for or in respect of the validity or sufficiency of the Certificates (other than the certificate of authentication on the Certificates) and the Term Trustee shall in no event assume or incur any liability, duty or obligation to any Certificateholder, other than as expressly provided for herein and in the Administration Agreement; and (f) the Term Trustee shall be under no obligation to exercise any of the rights or powers vested in it by this Agreement, or to institute, conduct or defend any litigation under this Agreement or otherwise or in relation to this Agreement, the Lease or Administration Agreement, at the request, order or direction of any of the Certificateholders, unless such Certificateholders have offered to the Term Trustee security or indemnity satisfactory to it against the costs, expenses and liabilities that may be incurred by the Term Trustee therein or thereby. The right of the Term Trustee to perform any discretionary act enumerated in this Agreement or the Administration Agreement shall not be construed as a duty, and the Term Trustee shall not be answerable for other than its negligence or willful misconduct in the performance of any such act.

SECTION 6.5 Action upon Instruction by Certificateholders .

(a) Subject to the terms, conditions and limitations hereof and the terms and conditions of the Administration Agreement, the Certificateholders may by written instruction direct the Term Trustee in the management of the Trust. Such direction may be exercised at any time by written instruction of the Certificateholders pursuant to Section 6.5(c) hereof.

(b) Notwithstanding the foregoing, the Term Trustee shall not be required to take any action hereunder or under the Administration Agreement if the Term Trustee shall have reasonably determined, or shall have been advised by counsel, that such action is likely to result in liability on the part of the Term Trustee or is contrary to the terms hereof or of the Lease or Administration Agreement or is otherwise contrary to law or unduly prejudicial to the interests of the Certificateholders not joining in any such direction.

(c) Whenever the Term Trustee is unable to decide between alternative courses of action permitted or required by the terms of this Agreement or the Lease or Administration Agreement, or is unsure as to the application, intent, interpretation or meaning of any provision of this Agreement or the Lease or Administration Agreement, the Term Trustee shall promptly give notice (in such form as shall be appropriate under the circumstances) to the Certificateholders requesting instruction as to the course of action to be adopted, and, to the extent the Term Trustee acts in good faith in accordance with any such instruction received, the Term Trustee shall not be liable on account of such action to any Person. If the Term Trustee shall not have received appropriate instructions within ten days of such notice (or within such shorter period of time as reasonably may be specified in such notice or may be necessary under the circumstances) it may, but shall be under no duty to, take or refrain from taking such action which is consistent, in its view, with this Agreement or the Lease and the Administration Agreement, and as it shall deem to be in the best interests of the Certificateholders, and the Term Trustee shall have no liability to any Person for any such action or inaction.

SECTION 6.6 Furnishing of Documents . The Term Trustee shall furnish to the Certificateholders, promptly upon receipt of a written request therefor, duplicates or copies of all reports, notices, requests, demands, certificates, financial statements and any other instruments furnished to the Term Trustee under the Lease or hereunder.

SECTION 6.7 Representations and Warranties of Term Trustee . The Term Trustee hereby represents and warrants to the Seller, for the benefit of the Certificateholders, that:

(a) It is a national banking association duly organized, validly existing and in good standing under the laws of the United States.

(b) It has full power, authority and legal right to execute, deliver and perform this Agreement, and has taken all necessary action to authorize the execution, delivery and performance by it of this Agreement.

(c) The execution, delivery and performance by it of this Agreement (i) shall not violate any provision of any law or regulation governing the banking and trust powers of the Term Trustee or any order, writ, judgment or decree of any court, arbitrator or governmental authority applicable to the Term Trustee or any of its assets, (ii) shall not violate any provision of the articles of association or by-laws of the Term Trustee, or (iii) shall not violate any provision of, or constitute, with or without notice or lapse of time, a default under, or result in the creation or imposition of any lien on any properties included in the Trust Estate pursuant to the provisions of any mortgage, indenture, contract, agreement or other undertaking to which it is a party.

(d) The execution, delivery and performance by the Term Trustee of this Agreement shall not require the authorization, consent or approval of, the giving of notice to, the filing or registration with, or the taking of any other action in respect of, any governmental authority or agency regulating the banking and corporate trust activities of the Term Trustee.

(e) This Agreement has been duly executed and delivered by the Term Trustee and constitutes the legal, valid and binding agreement of the Term Trustee, enforceable in accordance with its terms, except as enforceability may be limited by bankruptcy, insolvency, reorganization, or other similar laws affecting the enforcement of creditors' rights in general and by general principles of equity, regardless of whether such enforceability is considered in a proceeding in equity or at law.

SECTION 6.8 Reliance; Advice of Counsel .

(a) The Term Trustee shall incur no liability to anyone in acting upon any signature, instrument, notice, resolution, request, consent, order, certificate, report, opinion, bond or other document or paper believed by it to be genuine and believed by it to be signed by the proper party or parties and need not investigate any fact or matter in any such document. The Term Trustee may accept a certified copy of a resolution of the board of directors or other governing body of any corporate party as conclusive evidence that such resolution has been duly adopted by such body and that the same is in full force and effect. As to any fact or matter the method of the determination of which is not specifically prescribed herein, the Term Trustee may for all purposes hereof rely on a certificate, signed by the president or any vice president or by the treasurer or other authorized officers of the relevant party, as to such fact or matter, and such certificate shall constitute full protection to the Term Trustee for any action taken or omitted to be taken by it in good faith in reliance thereon.

(b) In the exercise or administration of the trusts hereunder and in the performance of its duties and obligations under this Agreement, the Lease or the Administration Agreement, the Term Trustee: may act directly or through its agents, attorneys, custodians or nominees (including the granting of a power of attorney to officers of The First National Bank of Chicago to execute and deliver any documents related thereto on behalf of the Term Trustee) pursuant to agreements entered into with any of them, and the Term Trustee shall not be liable for the conduct or misconduct of such agents, attorneys, custodians or nominees if such agents, attorneys, custodians or nominees shall have been selected by the Term Trustee with reasonable care; and may consult with counsel, accountants and other skilled professionals to be selected with reasonable care and employed by it. The Term Trustee shall not be liable for anything done, suffered or omitted in good faith by it in accordance with the opinion or advice of any such counsel, accountants or other such Persons and not contrary to this Agreement, the Lease or the Administration Agreement.

SECTION 6.9 Term Trustee Shall Not Own Certificates and Notes . The Term Trustee shall not, in its individual or any other capacity, become the owner or pledge of Certificates, but may otherwise deal with the other parties to this Agreement, the Lease, the Administration Agreement, and the Certificateholders with the same rights it would have were it not Term Trustee hereunder.

SECTION 6.10 Compensation ; Reimbursable Costs . The Term Trustee shall receive as compensation for its services hereunder Ten Thousand Dollars ($10,000.00) per year from the Certificate Distribution Account payable in advance in a single annual payment made on September 1 of each year during the term of this Agreement, out of which Two Thousand Five Hundred Dollars ($2,500.00) shall be paid to the Servicer as the basic Servicing Fee under the Servicing Agreement, and the Term Trustee shall be entitled to be reimbursed by the Certificateholders or the Trust Estate, as the circumstances may require, for all Reimbursable Costs as the Term Trustee may incur in connection with the exercise and performance of its rights and its duties under Article VI, Sections 6.2, (d), (e), (f), (g), (i), (j) and (k) hereof. Any amounts paid to the Term Trustee pursuant to this Article VI shall be deemed not to be a part of the Trust Estate immediately after such payment. Seller shall indemnify and hold harmless the Term Trustee from and against any loss suffered or cost incurred by the Term Trustee for any Reimbursable Cost for which the Term Trustee does not receive reimbursement from the Certificateholders, or the Trust Estate, as the circumstances may require, pursuant to the terms of this Agreement ("Unrecovered Costs"), provided the Term Trustee shall have first used all commercially reasonable efforts to recover such Unrecovered Costs from the Certificateholders, or the Trust Estate, as the circumstances may require. Seller shall make payment to the Term Trustee of any Unrecovered Costs in respect of which the Term Trustee is entitled to indemnification pursuant hereto not later than thirty (30) days after receipt of written demand therefor setting forth in reasonable detail the nature and amount of such Unrecovered Costs and the actions taken by the Term Trustee to collect the same from the Certificateholders and the Trust Estate, as the case may be. Upon the making of any payment hereunder by the Seller, the Seller shall be subrogated to all rights and claims of the Term Trustee against the Certificateholders and the Trust Estate in respect of the Unrecovered Costs so paid by the Seller arising under this Agreement or otherwise.

SECTION 6.11 Replacement of Term Trustee .

(a) The Term Trustee may resign at any time and be discharged from the trusts hereby created by giving thirty (30) days' prior written notice thereof to the Certificateholders. The Certificateholders shall appoint a successor Term Trustee meeting the requirements of Section 6.14 by delivering a written instrument, in duplicate, to the resigning Term Trustee and the successor Term Trustee. If no successor Term Trustee shall have been appointed and have accepted appointment within 30 days after the giving of such notice of resignation, the Seller, upon written notice thereof from the resigning Term Trustee, may appoint such successor Term Trustee meeting the requirements of Section 6.14 by delivering a written instruction to such effect to the resigning Term Trustee and the successor Term Trustee within thirty (30) days after receipt of such notice from the resigning Term Trustee. If no successor Term Trustee shall have been appointed and have accepted appointment prior to the expiration of such second thirty (30) day period, the resigning Term Trustee may petition any court of competent jurisdiction for the appointment of a successor Term Trustee. The Certificateholders shall remove the Term Trustee if:

(i) the Term Trustee shall cease to be eligible in accordance with the provisions of Section 6.14 and shall fail to resign after written request therefor by the Certificateholders;

(ii) the Term Trustee shall be adjudged bankrupt or insolvent;

(iii) a receiver or other public officer shall be appointed or take charge or control of the Term Trustee or of its property or affairs for the purpose of rehabilitation, conservation or liquidation; or (iv) the Term Trustee shall otherwise be incapable of acting.

(b) If the Term Trustee resigns or is removed or if a vacancy exists in the office of Term Trustee for any reason the Certificateholders shall promptly appoint a successor Term Trustee by written instrument, in duplicate (one copy of which instrument shall be delivered to the outgoing Term Trustee so removed and one copy to the successor Term Trustee) and shall pay all fees and expenses owed to the outgoing Term Trustee.

(c) Any resignation or removal of the Term Trustee and appointment of a successor Term Trustee pursuant to any of the provisions of this Section 6.11 shall not become effective until a written acceptance of appointment is delivered by the successor Term Trustee to the outgoing Term Trustee and the Certificateholders and all fees and expenses due to the outgoing Term Trustee are paid. Any successor Term Trustee appointed pursuant to this Section 6.11 shall be eligible to act in such capacity in accordance with Section 6.14 and, following compliance with the preceding sentence, shall become fully vested with all the rights, powers, duties and obligations of its predecessor under this Agreement, with like effect as if originally named as Term Trustee.

(d) The predecessor Term Trustee shall upon payment of its fees and expenses deliver to the successor Term Trustee all documents and statements and monies held by it under this Agreement. The Certificateholders and the predecessor Term Trustee shall execute and deliver such instruments and do such other things as may reasonably be required for fully and certainly vesting and confirming in the successor Term Trustee all such rights, powers, duties and obligations.

SECTION 6.12 <u>Merger or Consolidation of Term Trustee</u> . Any corporation into which the Term Trustee may be merged or converted or with which it may be consolidated, or any corporation resulting from any merger, conversion or consolidation to which the Term Trustee shall be a party, or any corporation succeeding to all or substantially all of the corporate trust business of the Term Trustee, shall be the successor of the Term Trustee hereunder, provided such corporation shall be eligible pursuant to Section 6.14, and without the execution or filing of any instrument or any further act on the part of any of the parties hereto.

SECTION 6.13 <u>Appointment of Co-Trustee or Separate Trustee</u> .

(a) Notwithstanding any other provisions of this Agreement, at any time, for the purpose of meeting any legal requirement of any jurisdiction in which the Trust Estate is located, the Certificateholders and the Term Trustee acting jointly shall have the power and shall execute and deliver all instruments to appoint one or more Persons approved by the Term Trustee to act as co-trustee, jointly with the Term Trustee, or as separate trustee or trustees, of all or any part of the Trust Estate, and to vest in such Person, in such capacity, such title to the Trust Estate, or any part thereof, and, subject to the other provisions of this Section 6.13, such powers, duties, obligations, rights and trusts as the Certificateholders and the Term Trustee may consider necessary or desirable. If the Certificateholders shall not have joined in such appointment within fifteen (15) days after receipt of a request so to do, the Term Trustee alone shall have the power to make such appointment. No co-trustee or separate trustee under this Agreement shall be required to meet the terms of eligibility as a successor trustee pursuant to Section 6.14 and no notice of the appointment of any co-trustee or separate trustee shall be required pursuant to Section 6.11.

(b) Each separate trustee and co-trustee shall, to the extent permitted by law, be appointed and act subject to the following provisions and conditions:

(i) all rights, powers, duties and obligations conferred or imposed upon the Term Trustee shall be conferred upon and exercised or performed by the Term Trustee and such separate trustee or co-trustee jointly (it being understood that such separate trustee or co-trustee is not authorized to act separately without the Term Trustee joining in such act), except to the extent that under any law of any jurisdiction in which any particular act or acts are to be performed, the Term Trustee shall be incompetent or unqualified to perform such act or acts, in which event such rights, powers, duties and obligations (including the holding of title to the Trust Estate or any portion thereof in any such jurisdiction) shall be exercised and performed singly by such separate trustee or co-trustee, but solely at the direction of the Term Trustee;

(ii) no trustee under this Agreement shall be personally liable by reason of any act or omission of any other trustee under this Agreement; and (iii) the Certificateholders and the Term Trustee acting jointly may at any time accept the resignation of or remove any separate trustee or co-trustee.

(c) Any notice, request or other writing given to the Term Trustee shall be deemed to have been given to each of the then separate trustees and co-trustees, as effectively as if given to each of them. Every instrument appointing any separate trustee or co-trustee shall refer to this Agreement and the conditions of this Article. Each separate trustee and co-trustee, upon its acceptance of the trusts conferred, shall be vested with the estates or property specified in its instrument of appointment, either jointly with the Term Trustee or separately, as may be provided therein, subject to all the provisions of this Agreement, specifically including every provision of this Agreement relating to the conduct of, affecting the liability of, or affording protection to, the Term Trustee. Each such instrument shall be filed with the Term Trustee and a copy thereof given to the Certificateholders.

(d) Any separate trustee or co-trustee may at any time appoint the Term Trustee as its agent or attorney-in-fact with full power and authority, to the extent not prohibited by law, to do any lawful act under or in respect of this Agreement on its behalf and in its name. If any separate trustee or co-trustee shall die, become incapable of acting, resign or be removed, all of its estates, properties, rights, remedies and trusts shall vest in and be exercised by the Term Trustee, to the extent permitted by law, without the appointment of a new or successor trustee.

SECTION 6.14 Eligibility Requirements for Term Trustee . Subject to Section 6.13, the Term Trustee shall at all times be The First National Bank of Chicago, or in the case of a successor Term Trustee: (i) be a bank or other depository institution authorized pursuant to applicable laws to exercise corporate trust powers with respect to the Trust Estate; (ii) have a combined capital and surplus of at least $50,000,000 and be subject to supervision or examination by federal or state authorities; and (iii) have (or have a parent which has) a long-term unsecured debt rating of at least BBB+ by Standard & Poor's Corporation. If such corporation shall publish reports of condition at least annually, pursuant to law or to the requirements of the aforesaid supervising or examining authority, then for the purpose of this Section 6.14, the combined capital and surplus of such corporation shall be deemed to be its combined capital and surplus as set forth in its most recent report of condition so published. If at any time the Term Trustee shall cease to be eligible in accordance with the provisions of this Section 6.14, the Term Trustee shall resign immediately in the manner and with the effect specified in Section 6.11.

SECTION 6.15 Replacement of Servicer . If an "Event of Termination" shall occur under the Servicing Agreement, the Term Trustee shall immediately notify the Certificateholders thereof. Certificateholders having not less than a majority of the Voting Interests shall be entitled to waive such Event of Termination upon written direction to the Term Trustee. In the absence of such written direction, the Term Trustee or Certificateholders having not less than a majority of the Voting Interests may terminate the Servicing Agreement. In such event, the Term Trustee shall succeed to the rights and responsibilities of the Servicer under the Servicing Agreement. Thereafter, the Term Trustee shall be entitled to the fees payable to the Servicer under the Servicing Agreement. The Term Trustee may appoint an Eligible Servicer to act as a successor Servicer in place of the terminated Servicer under the Servicing Agreement provided that in no event shall the fees payable to such successor Servicer exceed those payable to the Servicer under the Servicing Agreement unless approved in writing by Certificateholders having not less than a majority of the Voting Interests.

ARTICLE VII

TERMINATION OF TRUST AGREEMENT

SECTION 7.1 Termination of Trust Agreement .

(a) This Agreement (other than Section 6.10) and the Trust shall terminate and be of no further force or effect on the final distribution by the Term Trustee of all monies or other property or proceeds of the Trust Estate in accordance with the terms hereof following the occurrence of a Termination Event, or at the time provided in Section 7.2. The bankruptcy, liquidation, dissolution, death or incapacity of any Certificateholder, shall not (x) operate to terminate this Agreement or the Trust, nor (y) entitle such Certificateholder's legal representatives or heirs to claim an accounting or to take any action or proceeding in any court for a partition or winding up of all or any part of the Trust or the Trust Estate nor (z) otherwise affect the rights, obligations and liabilities of the parties hereto.

(b) Neither the Seller nor any Certificateholder shall be entitled to revoke or terminate the Trust.

(c) Notice of any termination of the Trust, specifying the Distribution Date upon which the Certificateholders shall surrender their Certificates to the Term Trustee for final distribution and cancellation,(the "Final Distribution Date"), shall be given by the Term Trustee by letter to Certificateholders mailed within thirty (30) days following the occurrence of a Termination Event (a "Termination Notice"), stating: (i) the Final Distribution Date at which time final payment of the Certificates shall be made upon presentation and surrender of the Certificates at the office of the Term Trustee therein designated; (ii) the amount (if then known) of any such final payment; and (iii) that payments will be made only upon presentation and surrender of the Certificates at the office of the Term Trustee therein specified. Upon presentation and surrender of the Certificates, the Term Trustee shall cause to be distributed to Certificateholders amounts distributable on such Distribution Date pursuant to Section 5.3. The Final Distribution Date shall be not later than: (i) in the event of a Total Condemnation, thirty (30) days following receipt by the Term Trustee of the Net Compensation payable in connection therewith; (ii) in the case of a sale of the Trust Estate pursuant to Section 7.2, thirty (30) days following receipt by the Term Trustee of the proceeds from such sale; and (iii) the event of the occurrence of the Termination Date, not later than thirty (30) days following the Termination Date. If, on the Final Distribution Date, any restoration or repair of the Real Property undertaken pursuant to Sections 6.2(f) or (i) shall not have been completed, then the Term Trustee shall cause the entire balance of funds, if any, then contained in the Casualty Account to be paid to the Remainder Trustee. If, on the Final Distribution Date, any payments required to be made to the Tenant pursuant to Section 6.2(k) on account of a Partial Condemnation shall not have been made, the Term Trustee shall cause the entire balance of funds, if any, then contained in the Condemnation Account to be paid to the Remainder Trustee.

d) if all of the Certificateholders shall not surrender their Certificates for cancellation within six months after the date specified in the Termination Notice , the Term Trustee shall give a second written notice to the remaining Certificateholders to surrender their Certificates for cancellation and receive the final distribution with respect thereto. If within one year after the second notice all the Certificates shall not have been surrendered for cancellation, the Term Trustee may take appropriate steps, or may appoint an agent to take appropriate steps, to contact the remaining Certificateholders concerning surrender of their Certificates, and the cost thereof shall be paid out of the funds and other assets that shall remain subject to this Agreement. Subject to applicable laws with respect to escheat of funds, any funds remaining in the Trust after exhaustion of such remedies in the preceding sentence shall be deemed property of the Seller and distributed by the Term Trustee to the Seller, and the Term Trustee shall have no further liability to the Certificateholders with respect thereto.

SECTION 7.2 Termination Pursuant to Section 6.2 . If a Termination Event shall occur pursuant to Section 6.2, the Term Trustee shall give a Termination Notice with respect thereto to the Certificateholders and to the parties to whom such notice is required pursuant to the Administration Agreement and the Term Trustee shall thereafter sell the assets of the Trust Estate at an open outcry auction held in a commercially reasonable manner and on commercially reasonable terms on a date not earlier than thirty (30) days and not later than ninety (90) days after such Termination Notice has been given by the Term Trustee all as more particularly set forth herein. Such Termination Notice shall specify the time, place and terms of such auction. The Term Trustee shall consult with the Servicer regarding the Auctioneer to be engaged by the Term Trustee and the terms and conditions of the auction to be conducted thereby. The Servicer shall make a written recommendation to the Term Trustee regarding the identity of the Auctioneer to be selected and the terms on which the auction shall be conducted; provided, however, that in all events, the Auctioneer shall conduct any auction held pursuant hereto: (i) at the Corporate Trust Office; (ii) on an open outcry basis with no reserve price or minimum bid; (iii) only after publication of the time and place for such auction in a manner and with such publications as shall then be required to satisfy the requirements of the Uniform Commercial Code, or any successor legislation, as then in effect in the jurisdiction in which such auction shall be held, with respect to sales of collateral thereunder; (iv) pursuant to bidding rules that shall specify the form of purchase and sale agreement to be entered into between the Term Trustee and the successful bidder at the auction, which agreement shall be in the form recommended by the Servicer and counsel engaged by the Trustee in connection with such auction; and (v) substantially in accordance with the rules and procedures recommended by the Servicer and counsel engaged by the Trustee in connection with such auction. The Term Trustee shall be entitled to rely on such recommendations for all purposes of this Agreement. Certificateholders and any Person controlling or controlled by, owning, owned by or under common ownership with any Certificateholder, shall not be entitled to participate in such auction. The proceeds of any such sale, disposition or liquidation of the assets of the Trust shall be applied first to any outstanding Reimbursable Costs, second to any outstanding fees due to the Term Trustee in connection with this Agreement and the balance shall constitute Collections and shall be deposited into the Certificate Distribution Account for distribution in accordance with the terms hereof.

SECTION 7.3 Distribution of Remainder Proceeds . If there shall occur a Total Condemnation, the Term Trustee shall, in connection with the winding-up of the Trust, distribute the Net Compensation as follows: (i) first, to the Certificateholders, the applicable Prepayment Amount as determined pursuant to Appendix B (or the amount of the Net Compensation if the Net Compensation is less than the applicable Prepayment Amount); and (ii) second, to the Remainder Trustee, the Remainder Proceeds.

SECTION 7.4 Failure of Auction . If, for any cause beyond the reasonable control of the Term Trustee, the Qualified Real Estate Consultant or the Auctioneer, the auction required pursuant to Section 7.2 hereof shall fail to produce any bidders, then the Term Trustee shall, within thirty (30) days after the date on which such auction is held, cause to be transferred to the Remainder Trustee all of the right, title and interest of the Term Trustee in and to the Trust Estate by such bills of sale, assignments, deeds or other instruments of conveyance as shall be reasonably necessary therefor, all without warranties or covenants of any nature whatsoever, without payment of any additional consideration of any nature whatsoever.

SECTION 7.5 Default by Purchaser. If the purchaser of the Trust Estate at any auction held pursuant to Section 7.2 shall default in the performance of its obligations under the purchase and sale agreement entered into in connection therewith in the manner and time required thereby, and such default shall give rise to a right to terminate such purchase and sale agreement on the part of the Term Trustee, the Term Trustee is hereby irrevocably authorized and directed to terminate such agreement in accordance with its terms and to conduct another auction of the Trust Estate in the manner set forth in Section 7.2. If the purchaser at any such subsequent auction shall likewise fail to perform its obligations to purchase the Trust Estate and such failure shall give rise to a right to terminate the purchase and sale agreement entered into in connection therewith, then the Term Trustee shall terminate such agreement in accordance with its terms and proceed in the manner set forth in Section 7.4.

ARTICLE VIII

AMENDMENTS

SECTION 8.1 Amendments .

This Agreement may be amended by the Term Trustee with the consent of the holders of 51% or more of the Voting Interests, to (i) cure any ambiguity, (ii) correct or supplement any provision in this Agreement that may be defective or inconsistent with any other provision in this Agreement, and (iii) evidence and provide for the acceptance of the appointment of a successor trustee with respect to the Trust Estate and add to or change any provisions as shall be necessary to facilitate the administration of the trusts hereunder by more than one trustee pursuant to Article VI. Any such amendment shall be narrowly construed so as to give maximum effect to each and every other provision of this Agreement. Notwithstanding the foregoing, Appendix B may be amended only with the written consent of the holders of 100% of the Voting Interests. Except as expressly otherwise provided herein, this Trust Agreement may not be amended.

SECTION 8.2 Form of Amendments .

(a) Promptly after the execution of any amendment, supplement or consent pursuant to Section 8.1, the Term Trustee shall furnish written notification of the substance of such amendment or consent to each Certificateholder.

(b) It shall not be necessary for the consent of Certificateholders, pursuant to Section 8.2, to approve the particular form of any proposed amendment or consent, but it shall be sufficient if such consent shall approve the substance thereof. The manner of obtaining such consents (and any other consents of Certificateholders provided for in this Agreement) and of evidencing the authorization of the execution thereof by Certificateholders shall be subject to such reasonable requirements as the Term Trustee may prescribe.

(c) Prior to the execution of any amendment to this Agreement or the Certificate of Trust, the Term Trustee shall be entitled to receive and rely upon an Opinion of Counsel stating that the execution of such amendment is authorized or permitted by this Agreement. The Term Trustee may, but shall not be obligated to, enter into any such amendment which affects the Term Trustee's own rights, duties or immunities under this Agreement or otherwise.

ARTICLE IX

MISCELLANEOUS

SECTION 9.1 No Legal Title to Trust Estate. The Certificateholders shall not have legal title to any part of the Trust Estate. The Certificateholders shall be entitled to receive distributions with respect to their undivided ownership interest therein only in accordance with Articles V and VII hereof. No transfer, by operation of law or otherwise, of any right, title, and interest of the Certificateholders to and in their ownership interest in the Trust Estate shall operate to terminate this Agreement or the trusts hereunder or entitle any transferee to an accounting or to the transfer to it of legal title to any part of the Trust Estate.

SECTION 9.2 Limitations on Rights of Others . Except for Section 2.7 and Section 9.11 hereof, and except as expressly provided in the Administration Agreement, the provisions of this Agreement are solely for the benefit of the Term Trustee, the Seller and the Certificateholders and nothing in this Agreement, whether express or implied, shall be construed to give to any other Person any legal or equitable right, remedy or claim in the Trust Estate or under or in respect of this Agreement or any covenants, conditions or provisions contained herein.

SECTION 9.3 Derivative Actions. Any provision contained herein to the contrary notwithstanding, the right, if any, of any Certificateholder to bring a derivative action in the right of the Trust is hereby made expressly subject to the following limitations and requirements:

(a) such Certificateholder must meet all requirements set forth in applicable law; and (b) no Certificateholder may bring a derivative action in the right of the Trust without the prior written consent of Certificateholders owning, in the aggregate, a beneficial interest in Certificates representing 50% of the Certificate Balance.

SECTION 9. Notices .

(a) All demands, notices and communications upon or to the Seller, the Term Trustee or the Certificateholders under this Agreement shall be in writing, personally delivered, sent by electronic facsimile (with hard copy to follow via first class mail) or mailed by certified mail-return receipt requested, and shall be deemed to have been duly given upon receipt:

If to Seller: Scribcor, Inc.,
400 North Michigan Avenue
Chicago, IL 60611
Attention: Richard M. Ross
(Facsimile No. (312) 923-8023)

If to the Trust or the Term Trustee, to the Term Trustee at its Corporate Trust Office:

One First National Plaza, Suite 0126
Chicago, Illinois 60670-0126
Attention: Corporate Trust Department
Trust No. 19-203062
(Facsimile No. 312/407-1708)

With respect to any Certificateholder, at the address of such Certificateholder shown in the Certificate Register, If to: Standard & Poor's Corporation
Commercial Mortgage Surveillance Group
25 Broadway
New York, New York 10004-1064

If to Servicer: Scribcor, Inc.
400 North Michigan Avenue
Chicago, IL 60611
Attention: Richard M. Ross
(Facsimile No. (312) 923-8023)

or at such other address as shall be designated by such Person in a written notice to the other parties to this Agreement.

(b) Any notice required or permitted to be given to a Certificateholder shall be given by first-class mail, postage prepaid, at the address of such Holder as shown in the Certificate Register. Any notice so mailed within the time prescribed in this Agreement shall be conclusively presumed to have been duly given, whether or not the Certificateholder receives such notice.

SECTION 9.5 Severability. If any one or more of the covenants, agreements, provisions or terms of this Agreement shall be for any reason whatsoever held invalid, then such covenants, agreements, provisions or terms shall be deemed severable from the remaining covenants, agreements, provisions or terms of this Agreement and shall in no way affect the validity or enforceability of the other provisions of this Agreement or of the Certificates or the rights of the holders thereof.

SECTION 9.6 Counterparts. This Agreement may be executed by the parties hereto in separate counterparts, each of which when so executed and delivered shall be an original, but all such counterparts shall together constitute one and the same instrument.

SECTION 9.7 Successors and Assigns. All covenants and agreements contained herein shall be binding upon, and inure to the benefit of, the Seller, the Term Trustee and each Certificateholder and their respective successors and permitted assigns, all as herein provided. Any request, notice, direction, consent, waiver or other instrument or action by a Certificateholder shall bind the successors and assigns of such Certificateholder.

SECTION 9.8 No Recourse . Each Certificateholder by accepting a Certificate acknowledges that such Certificateholder's Certificates represent beneficial interests in the Trust only and do not represent interests in or obligations of the Tenant, the Term Trustee, or any Affiliate thereof and no recourse may be had against such parties or their assets, except as may be expressly set forth or contemplated in this Agreement or the Certificates.

SECTION 9.9 Headings . The headings of the various Articles and Sections herein are for convenience of reference only and shall not define or limit any of the terms or provisions hereof.

SECTION 9.10 Governing Law . THIS AGREEMENT SHALL BE CONSTRUED IN ACCORDANCE WITH THE LAWS OF THE STATE OF ILLINOIS, WITHOUT REFERENCE TO ITS CONFLICT OF LAW PROVISIONS, AND THE OBLIGATIONS, RIGHTS AND REMEDIES OF THE PARTIES HEREUNDER SHALL BE DETERMINED IN ACCORDANCE WITH SUCH LAWS.

IN WITNESS WHEREOF, the parties hereto have caused this Trust Agreement to be duly executed by their respective officers hereunto duly authorized, as of the day and year first above written.

THE FIRST NATIONAL BANK OF CHICAGO, not in its individual capacity, but solely as Term Trustee as aforesaid By: ____________________

Name: ____________________

Title: ____________________

SCRIBCOR, INC., an Illinois corporation

By: ____________________

Name: ____________________

Title: ____________________

APPENDIX A

Definitions

"Actual Knowledge" shall mean with respect to any Person or party, Conscious Awareness (as hereinafter defined) of a fact that such fact is contained in a document of which such person has Conscious Awareness or which was created during the course of a transaction in which such person actively participated. A person, however, shall not be deemed to have Actual Knowledge of a fact merely because (i) such fact is contained in a document approved by such person if such person does not have Conscious Awareness of such document or if such document was not created during the course of a transaction in which such person actively participated or (ii) any other individual in such person's organization has Actual Knowledge of such fact.

"Administration Agreement" shall mean that certain First Amended and Restated Administration Agreement of even date as the Agreement by and between Term Trustee and the Remainder Trustee.

"Affiliate" shall mean, with respect to any Person, any Person or party owning, or owned by a Person or party owning, directly or indirectly ten percent (10%) or more of the voting interest of such Person, or otherwise having the ability to exercise control over such Person.

"Agreement" shall mean that certain Trust Agreement dated as of April 27, 1995 by and between Seller and Term Trustee as the same may be amended from time to time in accordance with its terms.

"Auctioneer" shall mean the Person selected by the Term Trustee to administer an auction sale of the Trust Estate pursuant to Section 7.2.

"Benefit Plan" shall mean an employee benefit plan as described in Section 3.10 of the Agreement.

"Casualty Account" shall mean a segregated trust account established by the Term Trustee at The First National Bank of Chicago, or if there shall be designated a successor Term Trustee, at such successor Term Trustee acting in its commercial capacity, known as the K.C. ABBE® Trust 1995-1 Casualty Account, bearing an additional designation clearly indicating that the funds deposited therein are held for the benefit of the Certificateholders. All fees and expenses for maintaining the Casualty Account shall be included in the trustee's fees payable to the Term Trustee in connection with this Agreement and shall not constitute Reimbursable Costs.

"Casualty Loss" shall mean any loss or damage suffered or incurred in respect of the Real Property arising out of or in connection with any fire, windstorm, flood, earthquake, act of god, war, strike or other casualty.

"Casualty Loss Termination" shall mean any termination of the Lease resulting from the occurrence of a Casualty Loss.

"Casualty Proceeds" shall mean the aggregate amount of payment received by the Term Trustee in respect of any Casualty Loss affecting the Real Property including, without limitation, all proceeds of any insurance maintained by the Tenant or the Term Trustee in respect thereof.

"Certificate" shall mean one or more certificates of ownership of beneficial interest in the Trust issued by the Term Trustee pursuant to Article III of the Agreement in substantially identical form to the sample certificate attached to the Agreement as Exhibit A.

"Certificate Balance" as of any Distribution Date shall mean with respect to each Certificate, the percentage ownership interest in the Trust represented by such Certificate multiplied by the amount of the Distributable Funds calculated in accordance herewith.

"Certificate Depository Agreement" shall mean the written agreement from time to time in place in the form attached hereto as Exhibit G pursuant to which the Clearing Agency holds Book Entry form Certificates.

"Certificate Distribution Account" shall mean the bank account established and maintained by the Term Trustee pursuant to Section 5.1 of the Agreement.

"Certificateholder" shall mean the Clearing Agency, unless and until Definitive Certificates are issued pursuant to Section 3.13 following which, each Person in whose name one or more Certificates is registered as of a particular date as evidenced by the Certificate Register.

"Certificate Register" shall mean the register of Certificates required to be maintained by the Term Trustee pursuant to Section 3.4 hereof.

"Certificate Registrar" shall mean the Term Trustee or such Person as shall be appointed by the Term Trustee to maintain the Certificate Register pursuant to Section 3.4 of the Agreement.

"Clearing Agency" shall mean, initially, The Depository Trust Company, or such other Person who shall succeed to the rights and obligations of The Depository Trust Company under this Agreement and the Certificate Depository Agreement.

"Clearing Agency Participants" shall mean beneficial owners of Certificates issued in Book Entry form.

"Code" shall mean the Internal Revenue Code of 1986, as it may be amended from time to time.

"Collections" shall mean all monies, cash, rent or other payment received by the Term Trustee in respect of the Lease, the Real Property or otherwise including, without limitation the amount of all judgments, awards or other payments made in connection with the enforcement of the Lease by the Term Trustee, the amount of any Net Casualty Proceeds or Net Compensation.

"Compensation" shall mean the amount of any award, judgment, settlement or other payment receive by the Term Trustee in respect of any Condemnation of all or any portion of the Real Property.

"Condemnation" shall mean any taking, condemnation or other exercise of the power of eminent domain by any governmental or quasi-governmental authority having such power affecting all or any portion of the Real Property.

"Condemnation Account" shall mean a segregated trust account established by the Term Trustee at The First National Bank of Chicago, or if there shall be designated a successor Term Trustee, at such successor Term Trustee acting in its commercial capacity, known as the K.C. ABBE® Trust 1995-1 Condemnation Account, bearing an additional designation clearly indicating that the funds deposited therein are held for the benefit of the Certificateholders. All fees and expenses for maintaining the Condemnation Account shall be included in the trustee's fees payable to the Term Trustee in connection with this Agreement and shall not constitute Reimbursable Costs.

"Conscious Awareness" shall mean with respect to any Person or party, that such Person actually remembered a fact at the given time. A Person shall not be deemed to have Conscious Awareness of a fact at a given time if such Person did not actually remember a fact at the given time unless such fact is contained in a document previously read or executed by such Person in the course of a transaction in which such Person actively participated. A Person shall not be deemed to have Conscious Awareness of a fact merely because any other individual in such Person's organization has Conscious Awareness of such fact.

"Corporate Trust Office" shall mean the office maintained by the Term Trustee at One First National Plaza, Suite 0126, Chicago, Illinois 60670-0126, or, if there shall be a change in the location of the Corporate Trust Office, or if there shall be a successor Term Trustee, at the location specified by the Term Trustee or such successor Term Trustee, in a written notice to all Certificateholders delivered in accordance with Section 9.4.

"Default Notice" means any notice of the occurrence of an Event of Default given pursuant to Section 6.2 of the Agreement.

"Definitive Certificates" shall have the meaning given in Section 3.13.

"Distributable Funds" shall mean, as of the Record Date with respect to any Distribution Date, the total balance of funds in the Certificate Distribution Account less the sum of: (i) $25,000.00; plus (ii) the amount of all Reimbursable Costs incurred by the Term Trustee for which the Term Trustee has not previously been reimbursed; plus (iii) the amount of all Reimbursable Costs reasonably anticipated by the Term Trustee to be incurred prior to the next succeeding Distribution Date; plus (iv) the amount of any Net Casualty Proceeds pending application of the same in accordance with Section 6.2(j) of the Agreement, plus (v) the amount of any Net Compensation pending application of the same in accordance with Section 6.2(l) of the Agreement; (vi) any Additional Servicing Fee payable to the Servicer pursuant to the Servicing Agreement; plus (vii) the amount of any investment earnings accruing on funds on deposit in the Certificate Distribution Account from time to time, plus (viii) the amount of any trustee's fees payable pursuant to Section 6.10, provided, however, that upon the Final Distribution Date, the Distributable Funds shall include the amounts set forth in clauses (i), (iii) and (vii) and any remaining balance in the RII Reserve Account.

"Distribution Date" shall mean the fifteenth day of September, 1995 and the fifteenth day of each month thereafter until termination of the Trust.

"Eligible Investment: shall mean as to any account maintained by the Term Trustee for which Eligible Investments are required or permitted to be made, any one or more of the following obligations or securities:

(i) demand and time deposits in, or certificates of deposit of, any depository institution or trust company (including Trustee or any agent of Trustee, acting in their respective commercial capacities) incorporated under the laws of the United States of America or any state thereof having a combined capital and surplus of at least $25,000,000.00 and subject to supervision and examination by federal and/or state banking authorities, the deposits of which are insured by the FDIC; provided, however, that such deposits shall be in amounts no greater than $100,000 for any one such depository institution or trust company unless the commercial paper or other unsecured short-term debt obligations of such depository institution or trust company (or in the case of a depository institution or trust company which is the principal subsidiary of a holding company, the commercial paper or other unsecured short-term debt obligations of such holding company) are rated at least A+ by Standard & Poor's Corporation;

(ii) direct obligations of, and obligations fully guaranteed by, the United States of America, the Federal Home Loan Mortgage Corporation, FNMA, the Federal Farm Credit System, the Federal Home Loan Banks, or any agency or instrumentality of the United States of America the obligations of which are backed by the full faith and credit of the United States of America;

(iii) bankers' acceptances issued by any depository institution or trust company (including Trustee or any agent of Trustee, acting in their respective commercial capacities) meeting the requirements of clause (i) above; provided, however, that at the time of such investment or contractual commitment providing for such investment the commercial paper or other unsecured short-term debt obligations of such depository institution or trust company (or, in the case of a depository institution or trust company which is the principal subsidiary of a holding company, the commercial paper or other unsecured short-term debt obligations of such holding company) carry at least the ratings required under clause (i) above;

(iv) repurchase obligations with respect to (A) any security described in clause (ii) above or (B) any other security issued or guaranteed by an agency or instrumentality of the United States of America the obligations of which are backed by the full faith and credit of the United States of America; provided, however, that in either case, such security shall have a remaining maturity of one year or less and such repurchase obligation shall have been entered into with a depository institution or trust company (acting as principal) of the type described in the proviso to clause (iii) above;

(v) commercial paper (including both non-interest-bearing discount obligations and interest-bearing obligations payable on demand or on a specified date not more than one year after the date of issuance thereof) rated at least A+ by Standard & Poor's Corporation; and (vi) the Term Trustee's Corporate Trust Short Term Investment Fund, or any money market fund, so long as it is rated in the highest applicable rating category by the Rating Agency.

"Eligible Servicer" shall mean the commercial loan servicing, property or asset management group which is an Affiliate of the Term Trustee, or any Person or party who: (i) has not less than ten (10) years of experience as a professional asset or property manager and is licensed (if required) to perform such services in the locale of the Real Property; (ii) then has under management a portfolio of commercial and office properties containing in the aggregate not less than two (2) million square feet or with an aggregate fair market value of not less than $20,000,000.00; and (iii) then has not fewer than twenty (20) employees directly engaged in the provision of asset or property management services.

"ERISA" shall have the meaning given in Section 3.10.

"Event of Default" shall mean any fact or matter the occurrence of which constitutes a default or an Event of Default under the Lease (or any Replacement Lease).

"Expected Distribution" for any given month shall mean the amount determined in accordance with Appendix C.

"Final Distribution Date" shall have the meaning set forth in Section 7.1.

"Guarantee" shall mean that certain guarantee of the Lease by Kansas City Life Insurance Company dated November 13, 1991.

"Landlord" shall mean the Term Trustee, in its capacity as the landlord under the Lease, together with any successors and assigns.

"Lease" shall mean that certain lease dated December 29, 1989 by and between Old American Insurance Company, as tenant, and R&S Kansas City Associates Limited Partnership as landlord, regarding the Real Property, as amended by a First Amendment to Lease, dated November 12, 1991, as guaranteed by the Guarantee, or any Replacement Lease or Leases entered into from time to time.

"Laws" shall mean all statutes, codes, rules, regulations, ordinances, decrees and enactments of any governmental or quasi-governmental agency having jurisdiction over: (i) the Real Property, or its use and operation; (ii) the Term Trustee; or (iii) the Trust Estate.

"Minimum Required Insurance" shall mean such coverage and limits required to be maintained by Tenant under the Lease.

"Net Casualty Proceeds" shall mean the aggregate amount of Casualty Proceeds received by the Term Trustee in respect of any Casualty Loss less all Reimbursable Costs incurred by the Term Trustee in connection with the adjustment, negotiation, settlement, or collection of such Casualty Proceeds or the exercise or performance by the Term Trustee of any of its rights, powers or duties under the Agreement.

"Net Compensation" shall mean the aggregate amount of Compensation received by the Term Trustee in connection with any Condemnation less all Reimbursable Costs incurred by the Term Trustee in connection with any negotiation, adjudication or settlement regarding the amount of such compensation or the exercise or performance by the Term Trustee of any of its rights, powers or duties under the Agreement.

"Partial Condemnation" shall mean (i) any taking in or by condemnation or other eminent domain proceeding pursuant to any law, general or special or (ii) temporary requisition of the Real Property or any part thereof by any governmental authority, civil or military after the occurrence of which the Lease (or any Replacement Lease) shall remain in full force and effect.

"Person" shall mean any corporation, partnership, limited liability company, or other entity or human being.

"Prepayment Amount" shall mean as of the Final Distribution Date corresponding to a Total Condemnation, the amount then payable to the Certificateholders in respect of such Total Condemnation as set forth in Appendix B.

"RA Reserve Account" shall mean the bank account established and maintained by the Term Trustee pursuant to Section 6.2(m) of the Agreement.

"Real Property" means the land and all buildings and improvements located thereon (including all fixtures and equipment incorporated therein not owned by a Tenant) commonly known as 4900 Oak Street, Kansas City, Missouri and legally described on Appendix C to the Agreement.

"Record Date" shall mean with respect to any Distribution Date, three (3) business days prior to such Distribution Date.

"Reimbursable Costs" shall mean all fees, expenses, costs or other charges incurred in good faith by Term Trustee in the performance of its rights and obligations under Sections 6.2, (d), (e), (f), (g), (i), (j) and (k) of the Agreement, including, without limitation, all payments required to be made to the Servicer pursuant to the Servicing Agreement and any Ratings Agency fees pursuant to Section 6.(m) if the RA Reserve Account does not contain sufficient funds to cover such fees. All other costs and expenses incurred by the Term Trustee under the Agreement shall be included in the fees payable to the Term Trustee and shall not constitute Reimbursable Costs.

"Remainder Proceeds" shall mean the greater of zero and the difference between the Net Compensation received by the Term Trustee in respect of a Total Condemnation and the Prepayment Amount payable in respect thereof.

"Remainder Trust" shall mean the K.C. LURE® Trust 1995-1 established pursuant to that certain Trust Agreement of even date herewith between Seller and the First National Bank of Chicago, as Trustee.

"Remainder Trustee" shall mean the Trustee under the Remainder Trust.

"Rent" shall mean rent as defined in the Lease or as the term may be defined under any Replacement Lease.

"Replacement Lease" means any lease for all or any portion of the Real Property entered into pursuant to Section 6.2(e) of the Agreement, which Lease (A) shall require the tenant thereunder at its sole cost and expense to: (i) maintain at least the Minimum Required Insurance; (ii) pay all ad valorem and other real property taxes levied against the Real Property; (iii) maintain or cause the Real Property to be maintained in good operating condition and in compliance with all Laws, and (B), shall have been submitted to Standard & Poor's Corporation for its review, and Standard & Poor's Corporation shall have confirmed in writing that such Replacement Lease shall not result in a downgrade, qualification or withdrawal of its then assigned rating with respect to the Certificates.

"Replacement Tenant" shall mean any Tenant under a Replacement Lease.

"Responsible Officer" shall mean, with respect to any party to the Agreement or any Certificateholder, the president, any vice-president, assistant vice-president, secretary, assistant secretary or other officer or officers customarily performing functions similar to those performed by any of the above, or to whom any matter arising under this Agreement, the Lease or the Administrative Agreement may be referred, having the legal authority to bind the party in question.

"RII Reserve Account" shall mean the bank account established and maintained by the Term Trustee pursuant to Section 6.2(l) of the Agreement.

"Securities Act" has the meaning given in Section 3.10.

"Seller" shall mean Scribcor, Inc., an Illinois corporation, its successors and assigns.

"Servicer" means initially Scribcor, Inc., or any party who may succeed to Scribcor Inc. as Servicer pursuant to the terms hereof or the Servicing Agreement.

"Servicing Agreement" means the Servicing Agreement attached hereto as Exhibit F and all amendments, modifications or replacements thereof.

"Tenant" shall mean Old American Insurance Company, together with its subtenants, of whatever level, successors and assigns and all parties claiming by or through any of them, and any tenant under any Replacement Lease, or any subtenant (of whatever level) or assignee thereof.

"Term Trust" shall mean the K.C. ABBE® Trust 1995-1 as established pursuant to that certain Trust Agreement of even date herewith by and between Seller and the Term Trustee.

"Term Trustee" shall mean The First National Bank of Chicago, not personally but solely as trustee under the K.C. ABBE® Trust 1995-1, together with any Person who shall be appointed a successor trustee under the Agreement pursuant to Section 6.11 thereof.

"Termination Date" shall mean December 31, 2009.

"Termination Event" shall mean the occurrence of any one or more of the following: (i) a Total Condemnation; (ii) the failure of the Certificateholders to give the financial assurances or indemnity required pursuant to Section 6.2(d) or (g); or (iii) the occurrence of the Termination Date.

"Termination Notice" shall have the meaning set forth in Article 7.

"Total Condemnation" shall mean any Condemnation after the occurrence of which the Lease shall be terminated pursuant to Article XV of the Lease or any similar provision in any Replacement Lease.

"Trust" shall mean the grantor trust established pursuant to the Agreement for the uses and purposes and on the trusts set forth therein.

"Trust Estate" shall mean all right title and interest of the Term Trustee in and to (i) the Real Property; (ii) the Lease and the Guarantee, including without limitation all right to receive the Rent payable under the Lease or any Replacement Lease and any other payments due thereunder or under the Guarantee, and (iii) the accounts held by the Term Trustee pursuant to the provisions of this Agreement (other than the Condemnation Account and the RA Reserve Account).

"Unrecovered Costs" shall have the meaning set forth in Section 6.12 hereof.

"Voting Interests" shall mean the right of each Certificateholder to vote each Certificate in respect of any matter on which Certificateholders may, or are required to, vote pursuant to the terms of this Agreement, with the "Voting Interests" owned by any Certificateholder equal to the percentage ownership interest in the Trust represented by such Certificateholder's Certificate. Certificates held by the Seller are expressly deemed to be included in the computation of Voting Interests for all purposes of this Agreement.

Appendix B

CONDEMNATION ANALYSIS – Appendix B of Trust Agmt.

| Assumed Condemnation Distribution Date | Annual Base Rent | 10x Base Rent "Net Compensation" | Term Allocation (1) | Remainder Proceeds |
|---|---|---|---|---|
| Closing | 932,650.00 | 9,326,500.00 | 9,040,000.00 | 286,500 |
| 9/15/95 | 932,650.00 | 9,326,500.00 | 9,078,671.11 | 247,829 |
| 10/15/95 | 932,650.00 | 9,326,500.00 | 9,060,662.57 | 265,837 |
| 11/15/95 | 932,650.00 | 9,326,500.00 | 9,040,597.64 | 285,902 |
| 12/15/95 | 932,650.00 | 9,326,500.00 | 9,020,403.89 | 306,096 |
| 1/15/96 | 932,650.00 | 9,326,500.00 | 9,000,080.31 | 326,420 |
| 2/15/96 | 932,650.00 | 9,326,500.00 | 8,979,625.90 | 346,874 |
| 3/15/96 | 932,650.00 | 9,326,500.00 | 8,959,040.65 | 367,459 |
| 4/15/96 | 932,650.00 | 9,326,500.00 | 8,938,323.57 | 388,176 |
| 5/15/96 | 932,650.00 | 9,326,500.00 | 8,917,473.63 | 409,026 |
| 6/15/96 | 932,650.00 | 9,326,500.00 | 8,896,489.84 | 430,010 |
| 7/15/96 | 932,650.00 | 9,326,500.00 | 8,875,371.20 | 451,129 |
| 8/15/96 | 932,650.00 | 9,326,500.00 | 8,854,116.68 | 472,383 |
| 9/15/96 | 932,650.00 | 9,326,500.00 | 8,832,726.30 | 493,774 |
| 10/15/96 | 932,650.00 | 9,326,500.00 | 8,821,262.21 | 505,238 |
| 11/15/96 | 932,650.00 | 9,326,500.00 | 8,799,660.48 | 526,840 |
| 12/15/96 | 932,650.00 | 9,326,500.00 | 8,777,919.87 | 548,580 |
| 1/15/97 | 932,650.00 | 9,326,500.00 | 8,756,040.37 | 570,460 |
| 2/15/97 | 932,650.00 | 9,326,500.00 | 8,734,019.98 | 592,480 |
| 3/15/97 | 932,650.00 | 9,326,500.00 | 8,711,858.68 | 614,641 |
| 4/15/97 | 932,650.00 | 9,326,500.00 | 8,689,555.48 | 636,945 |
| 5/15/97 | 932,650.00 | 9,326,500.00 | 8,667,108.36 | 659,392 |
| 6/15/97 | 932,650.00 | 9,326,500.00 | 8,644,517.33 | 681,983 |
| 7/15/97 | 932,650.00 | 9,326,500.00 | 8,621,781.37 | 704,719 |
| 8/15/97 | 932,650.00 | 9,326,500.00 | 8,598,899.48 | 727,601 |
| 9/15/97 | 932,650.00 | 9,326,500.00 | 8,575,870.66 | 750,629 |
| 10/15/97 | 932,650.00 | 9,326,500.00 | 8,562,759.06 | 763,741 |
| 11/15/97 | 932,650.00 | 9,326,500.00 | 8,539,498.76 | 787,001 |
| 12/15/97 | 932,650.00 | 9,326,500.00 | 8,516,089.51 | 810,410 |
| 1/15/98 | 932,650.00 | 9,326,500.00 | 8,492,529.29 | 833,971 |
| 2/15/98 | 932,650.00 | 9,326,500.00 | 8,468,818.11 | 857,682 |
| 3/15/98 | 932,650.00 | 9,326,500.00 | 8,444,954.97 | 881,545 |
| 4/15/98 | 932,650.00 | 9,326,500.00 | 8,420,938.85 | 905,561 |
| 5/15/98 | 932,650.00 | 9,326,500.00 | 8,396,768.75 | 929,731 |
| 6/15/98 | 932,650.00 | 9,326,500.00 | 8,372,443.65 | 954,056 |
| 7/15/98 | 932,650.00 | 9,326,500.00 | 8,347,962.57 | 978,537 |
| 8/15/98 | 932,650.00 | 9,326,500.00 | 8,323,324.48 | 1,003,176 |
| 9/15/98 | 932,650.00 | 9,326,500.00 | 8,298,527.38 | 1,027,973 |
| 10/15/98 | 932,650.00 | 9,326,500.00 | 8,283,635.43 | 1,042,865 |
| 11/15/98 | 932,650.00 | 9,326,500.00 | 8,258,583.71 | 1,067,916 |
| 12/15/98 | 932,650.00 | 9,326,500.00 | 8,233,371.97 | 1,093,128 |
| 1/15/99 | 932,650.00 | 9,326,500.00 | 8,207,998.19 | 1,118,502 |
| 2/15/99 | 932,650.00 | 9,326,500.00 | 8,182,461.37 | 1,144,039 |
| 3/15/99 | 932,650.00 | 9,326,500.00 | 8,156,760.51 | 1,169,739 |
| 4/15/99 | 932,650.00 | 9,326,500.00 | 8,130,894.60 | 1,195,605 |
| 5/15/99 | 932,650.00 | 9,326,500.00 | 8,104,863.63 | 1,221,636 |
| 6/15/99 | 932,650.00 | 9,326,500.00 | 8,078,665.60 | 1,247,834 |
| 7/15/99 | 932,650.00 | 9,326,500.00 | 8,052,299.49 | 1,274,201 |

(1) Represents the total amount due to Certificate holders. This amount will be paid from (i) funds available from the Certificate Distribution Acct., and, if required, (ii) the Net Compensation" amount.

APPENDIX B

| CONDEMNATION ANALYSIS -- Appendix B of Trust Agmt. | | | | |
|---|---|---|---|---|
| Assumed Condemnation Distribution Date | Annual Base Rent | 10x Base Rent "Net Compensation" | Term Allocation (1) | Remainder Proceeds |
| 8/15/99 | 932,650.00 | 9,326,500.00 | 8,025,763.31 | 1,300,737 |
| 9/15/99 | 932,650.00 | 9,326,500.00 | 7,999,057.03 | 1,327,443 |
| 10/15/99 | 932,650.00 | 9,326,500.00 | 7,982,243.84 | 1,344,256 |
| 11/15/99 | 932,650.00 | 9,326,500.00 | 7,955,258.79 | 1,371,241 |
| 12/15/99 | 932,650.00 | 9,326,500.00 | 7,928,100.63 | 1,398,399 |
| 1/15/00 | 1,072,548.00 | 10,725,480.00 | 7,900,768.37 | 2,824,712 |
| 2/15/00 | 1,072,548.00 | 10,725,480.00 | 7,861,527.18 | 2,863,953 |
| 3/15/00 | 1,072,548.00 | 10,725,480.00 | 7,822,034.38 | 2,903,446 |
| 4/15/00 | 1,072,548.00 | 10,725,480.00 | 7,782,287.97 | 2,943,192 |
| 5/15/00 | 1,072,548.00 | 10,725,480.00 | 7,742,286.93 | 2,983,193 |
| 6/15/00 | 1,072,548.00 | 10,725,480.00 | 7,702,029.26 | 3,023,451 |
| 7/15/00 | 1,072,548.00 | 10,725,480.00 | 7,661,512.93 | 3,063,967 |
| 8/15/00 | 1,072,548.00 | 10,725,480.00 | 7,620,736.96 | 3,104,743 |
| 9/15/00 | 1,072,548.00 | 10,725,480.00 | 7,579,699.31 | 3,145,781 |
| 10/15/00 | 1,072,548.00 | 10,725,480.00 | 7,548,462.15 | 3,177,018 |
| 11/15/00 | 1,072,548.00 | 10,725,480.00 | 7,506,960.55 | 3,218,519 |
| 12/15/00 | 1,072,548.00 | 10,725,480.00 | 7,465,192.24 | 3,260,288 |
| 1/15/01 | 1,072,548.00 | 10,725,480.00 | 7,423,156.23 | 3,302,324 |
| 2/15/01 | 1,072,548.00 | 10,725,480.00 | 7,380,850.50 | 3,344,630 |
| 3/15/01 | 1,072,548.00 | 10,725,480.00 | 7,338,273.04 | 3,387,207 |
| 4/15/01 | 1,072,548.00 | 10,725,480.00 | 7,295,422.83 | 3,430,057 |
| 5/15/01 | 1,072,548.00 | 10,725,480.00 | 7,252,297.88 | 3,473,182 |
| 6/15/01 | 1,072,548.00 | 10,725,480.00 | 7,208,896.16 | 3,516,584 |
| 7/15/01 | 1,072,548.00 | 10,725,480.00 | 7,165,215.66 | 3,560,264 |
| 8/15/01 | 1,072,548.00 | 10,725,480.00 | 7,121,254.38 | 3,604,226 |
| 9/15/01 | 1,072,548.00 | 10,725,480.00 | 7,077,011.29 | 3,648,469 |
| 10/15/01 | 1,072,548.00 | 10,725,480.00 | 7,042,548.57 | 3,682,931 |
| 11/15/01 | 1,072,548.00 | 10,725,480.00 | 6,997,800.26 | 3,727,680 |
| 12/15/01 | 1,072,548.00 | 10,725,480.00 | 6,952,765.13 | 3,772,715 |
| 1/15/02 | 1,072,548.00 | 10,725,480.00 | 6,907,441.16 | 3,818,039 |
| 2/15/02 | 1,072,548.00 | 10,725,480.00 | 6,861,826.33 | 3,863,654 |
| 3/15/02 | 1,072,548.00 | 10,725,480.00 | 6,815,918.63 | 3,909,561 |
| 4/15/02 | 1,072,548.00 | 10,725,480.00 | 6,769,716.05 | 3,955,764 |
| 5/15/02 | 1,072,548.00 | 10,725,480.00 | 6,723,217.59 | 4,002,262 |
| 6/15/02 | 1,072,548.00 | 10,725,480.00 | 6,676,420.22 | 4,049,060 |
| 7/15/02 | 1,072,548.00 | 10,725,480.00 | 6,629,322.94 | 4,096,157 |
| 8/15/02 | 1,072,548.00 | 10,725,480.00 | 6,581,923.74 | 4,143,556 |
| 9/15/02 | 1,072,548.00 | 10,725,480.00 | 6,534,220.59 | 4,191,259 |
| 10/15/02 | 1,072,548.00 | 10,725,480.00 | 6,496,274.66 | 4,229,205 |
| 11/15/02 | 1,072,548.00 | 10,725,480.00 | 6,448,021.01 | 4,277,459 |
| 12/15/02 | 1,072,548.00 | 10,725,480.00 | 6,399,458.38 | 4,326,022 |
| 1/15/03 | 1,072,548.00 | 10,725,480.00 | 6,350,583.77 | 4,374,896 |
| 2/15/03 | 1,072,548.00 | 10,725,480.00 | 6,301,396.16 | 4,424,084 |
| 3/15/03 | 1,072,548.00 | 10,725,480.00 | 6,251,892.54 | 4,473,587 |
| 4/15/03 | 1,072,548.00 | 10,725,480.00 | 6,202,070.89 | 4,523,409 |
| 5/15/03 | 1,072,548.00 | 10,725,480.00 | 6,151,930.20 | 4,573,550 |
| 6/15/03 | 1,072,548.00 | 10,725,480.00 | 6,101,467.47 | 4,624,013 |
| 7/15/03 | 1,072,548.00 | 10,725,480.00 | 6,050,680.66 | 4,674,799 |

(1) Represents the total amount due to Certificate holders. This amount will be paid from (i) funds available from the Certificate Distribution Acct., and, if required, (ii) the Net Compensation" amount.

APPENDIX B

CONDEMNATION ANALYSIS – Appendix B of Trust Agmt.

| Assumed Condemnation Distribution Date | Annual Base Rent | 10x Base Rent "Net Compensation" | Term Allocation (1) | Remainder Proceeds |
|---|---|---|---|---|
| 8/15/03 | 1,072,548.00 | 10,725,480.00 | 5,999,567.78 | 4,725,912 |
| 9/15/03 | 1,072,548.00 | 10,725,480.00 | 5,948,127.81 | 4,777,352 |
| 10/15/03 | 1,072,548.00 | 10,725,480.00 | 5,906,421.90 | 4,819,058 |
| 11/15/03 | 1,072,548.00 | 10,725,480.00 | 5,854,384.12 | 4,871,096 |
| 12/15/03 | 1,072,548.00 | 10,725,480.00 | 5,802,012.21 | 4,923,468 |
| 1/15/04 | 1,072,548.00 | 10,725,480.00 | 5,749,304.16 | 4,976,176 |
| 2/15/04 | 1,072,548.00 | 10,725,480.00 | 5,696,257.95 | 5,029,222 |
| 3/15/04 | 1,072,548.00 | 10,725,480.00 | 5,642,871.57 | 5,082,608 |
| 4/15/04 | 1,072,548.00 | 10,725,480.00 | 5,589,142.00 | 5,136,338 |
| 5/15/04 | 1,072,548.00 | 10,725,480.00 | 5,535,068.24 | 5,190,412 |
| 6/15/04 | 1,072,548.00 | 10,725,480.00 | 5,480,647.27 | 5,244,833 |
| 7/15/04 | 1,072,548.00 | 10,725,480.00 | 5,425,877.07 | 5,299,603 |
| 8/15/04 | 1,072,548.00 | 10,725,480.00 | 5,370,755.63 | 5,354,724 |
| 9/15/04 | 1,072,548.00 | 10,725,480.00 | 5,315,279.93 | 5,410,200 |
| 10/15/04 | 1,072,548.00 | 10,725,480.00 | 5,269,513.13 | 5,455,967 |
| 11/15/04 | 1,072,548.00 | 10,725,480.00 | 5,213,388.29 | 5,512,092 |
| 12/15/04 | 1,072,548.00 | 10,725,480.00 | 5,156,903.15 | 5,568,577 |
| 1/15/05 | 1,233,430.00 | 12,334,300.00 | 5,100,055.71 | 7,234,244 |
| 2/15/05 | 1,233,430.00 | 12,334,300.00 | 5,029,350.91 | 7,304,949 |
| 3/15/05 | 1,233,430.00 | 12,334,300.00 | 4,958,192.22 | 7,376,108 |
| 4/15/05 | 1,233,430.00 | 12,334,300.00 | 4,886,576.62 | 7,447,723 |
| 5/15/05 | 1,233,430.00 | 12,334,300.00 | 4,814,502.09 | 7,519,798 |
| 6/15/05 | 1,233,430.00 | 12,334,300.00 | 4,741,964.61 | 7,592,335 |
| 7/15/05 | 1,233,430.00 | 12,334,300.00 | 4,668,962.16 | 7,665,338 |
| 8/15/05 | 1,233,430.00 | 12,334,300.00 | 4,595,490.73 | 7,738,809 |
| 9/15/05 | 1,233,430.00 | 12,334,300.00 | 4,521,548.29 | 7,812,752 |
| 10/15/05 | 1,233,430.00 | 12,334,300.00 | 4,457,194.99 | 7,877,105 |
| 11/15/05 | 1,233,430.00 | 12,334,300.00 | 4,382,364.89 | 7,951,935 |
| 12/15/05 | 1,233,430.00 | 12,334,300.00 | 4,307,054.73 | 8,027,245 |
| 1/15/06 | 1,233,430.00 | 12,334,300.00 | 4,231,261.49 | 8,103,039 |
| 2/15/06 | 1,233,430.00 | 12,334,300.00 | 4,154,981.14 | 8,179,319 |
| 3/15/06 | 1,233,430.00 | 12,334,300.00 | 4,078,211.68 | 8,256,088 |
| 4/15/06 | 1,233,430.00 | 12,334,300.00 | 4,000,950.08 | 8,333,350 |
| 5/15/06 | 1,233,430.00 | 12,334,300.00 | 3,923,192.32 | 8,411,108 |
| 6/15/06 | 1,233,430.00 | 12,334,300.00 | 3,844,935.37 | 8,489,365 |
| 7/15/06 | 1,233,430.00 | 12,334,300.00 | 3,766,176.22 | 8,568,124 |
| 8/15/06 | 1,233,430.00 | 12,334,300.00 | 3,686,911.85 | 8,647,388 |
| 9/15/06 | 1,233,430.00 | 12,334,300.00 | 3,607,139.24 | 8,727,161 |
| 10/15/06 | 1,233,430.00 | 12,334,300.00 | 3,536,918.53 | 8,797,381 |
| 11/15/06 | 1,233,430.00 | 12,334,300.00 | 3,456,182.78 | 8,878,117 |
| 12/15/06 | 1,233,430.00 | 12,334,300.00 | 3,374,929.73 | 8,959,370 |
| 1/15/07 | 1,233,430.00 | 12,334,300.00 | 3,293,155.35 | 9,041,145 |
| 2/15/07 | 1,233,430.00 | 12,334,300.00 | 3,210,855.63 | 9,123,444 |
| 3/15/07 | 1,233,430.00 | 12,334,300.00 | 3,128,028.55 | 9,206,271 |
| 4/15/07 | 1,233,430.00 | 12,334,300.00 | 3,044,669.07 | 9,289,631 |
| 5/15/07 | 1,233,430.00 | 12,334,300.00 | 2,960,775.18 | 9,373,525 |
| 6/15/07 | 1,233,430.00 | 12,334,300.00 | 2,876,342.86 | 9,457,957 |
| 7/15/07 | 1,233,430.00 | 12,334,300.00 | 2,791,369.09 | 9,542,931 |

(1) Represents the total amount due to Certificate holders. This amount will be paid from (i) funds available from the Certificate Distribution Acct., and, if required, (ii) the Net Compensation" amount.

APPENDIX B

| CONDEMNATION ANALYSIS -- Appendix B of Trust Agmt. | | | | |
|---|---|---|---|---|
| Assumed Condemnation Distribution Date | Annual Base Rent | 10x Base Rent "Net Compensation" | Term Allocation (1) | Remainder Proceeds |
| 8/15/07 | 1,233,430.00 | 12,334,300.00 | 2,705,849.84 | 9,628,450 |
| 9/15/07 | 1,233,430.00 | 12,334,300.00 | 2,619,782.09 | 9,714,518 |
| 10/15/07 | 1,233,430.00 | 12,334,300.00 | 2,543,225.99 | 9,791,074 |
| 11/15/07 | 1,233,430.00 | 12,334,300.00 | 2,456,114.59 | 9,878,185 |
| 12/15/07 | 1,233,430.00 | 12,334,300.00 | 2,368,444.62 | 9,965,855 |
| 1/15/08 | 1,233,430.00 | 12,334,300.00 | 2,280,212.07 | 10,054,088 |
| 2/15/08 | 1,233,430.00 | 12,334,300.00 | 2,191,412.91 | 10,142,887 |
| 3/15/08 | 1,233,430.00 | 12,334,300.00 | 2,102,044.12 | 10,232,256 |
| 4/15/08 | 1,233,430.00 | 12,334,300.00 | 2,012,101.67 | 10,322,198 |
| 5/15/08 | 1,233,430.00 | 12,334,300.00 | 1,921,582.54 | 10,412,717 |
| 6/15/08 | 1,233,430.00 | 12,334,300.00 | 1,830,482.71 | 10,503,817 |
| 7/15/08 | 1,233,430.00 | 12,334,300.00 | 1,738,798.15 | 10,595,502 |
| 8/15/08 | 1,233,430.00 | 12,334,300.00 | 1,646,524.84 | 10,687,775 |
| 9/15/08 | 1,233,430.00 | 12,334,300.00 | 1,553,659.75 | 10,780,640 |
| 10/15/08 | 1,233,430.00 | 12,334,300.00 | 1,470,263.04 | 10,864,037 |
| 11/15/08 | 1,233,430.00 | 12,334,300.00 | 1,376,266.74 | 10,958,033 |
| 12/15/08 | 1,233,430.00 | 12,334,300.00 | 1,281,667.60 | 11,052,632 |
| 1/15/09 | 1,233,430.00 | 12,334,300.00 | 1,186,461.59 | 11,147,838 |
| 2/15/09 | 1,233,430.00 | 12,334,300.00 | 1,090,644.68 | 11,243,655 |
| 3/15/09 | 1,233,430.00 | 12,334,300.00 | 994,212.86 | 11,340,087 |
| 4/15/09 | 1,233,430.00 | 12,334,300.00 | 897,162.09 | 11,437,138 |
| 5/15/09 | 1,233,430.00 | 12,334,300.00 | 799,488.34 | 11,534,812 |
| 6/15/09 | 1,233,430.00 | 12,334,300.00 | 701,187.60 | 11,633,112 |
| 7/15/09 | 1,233,430.00 | 12,334,300.00 | 602,256.84 | 11,732,043 |
| 8/15/09 | 1,233,430.00 | 12,334,300.00 | 502,691.04 | 11,831,609 |
| 9/15/09 | 1,233,430.00 | 12,334,300.00 | 402,486.15 | 11,931,814 |
| 10/15/09 | 1,233,430.00 | 12,334,300.00 | 304,154.21 | 12,030,146 |
| 11/15/09 | 1,233,430.00 | 12,334,300.00 | 202,675.21 | 12,131,625 |
| 12/15/09 | 1,233,430.00 | 12,334,300.00 | 100,545.05 | 12,233,755 |

(1) Represents the total amount due to Certificate holders. This amount will be paid from (i) funds available from the Certificate Distribution Acct., and, if required, (ii) the Net Compensation" amount.

APPENDIX C

| ABBE Distribution Date | Trust Indenture Expected Distribution |
|---|---|
| Closing | |
| 9/15/95 | 75,777.11 |
| 10/15/95 | 77,705.57 |
| 11/15/95 | 77,705.64 |
| 12/15/95 | 77,705.89 |
| 1/15/96 | 77,706.31 |
| 2/15/96 | 77,705.90 |
| 3/15/96 | 77,705.65 |
| 4/15/96 | 77,705.57 |
| 5/15/96 | 77,705.63 |
| 6/15/96 | 77,705.84 |
| 7/15/96 | 77,706.20 |
| 8/15/96 | 77,705.68 |
| 9/15/96 | 67,706.30 |
| 10/15/96 | 77,706.21 |
| 11/15/96 | 77,706.48 |
| 12/15/96 | 77,705.87 |
| 1/15/97 | 77,706.37 |
| 2/15/97 | 77,705.98 |
| 3/15/97 | 77,705.68 |
| 4/15/97 | 77,706.48 |
| 5/15/97 | 77,706.36 |
| 6/15/97 | 77,706.33 |
| 7/15/97 | 77,706.37 |
| 8/15/97 | 77,706.48 |
| 9/15/97 | 67,705.66 |
| 10/15/97 | 77,706.06 |
| 11/15/97 | 77,705.76 |
| 12/15/97 | 77,706.51 |
| 1/15/98 | 77,706.29 |
| 2/15/98 | 77,706.11 |
| 3/15/98 | 77,705.97 |
| 4/15/98 | 77,705.85 |
| 5/15/98 | 77,705.75 |
| 6/15/98 | 77,705.65 |
| 7/15/98 | 77,705.57 |
| 8/15/98 | 77,706.48 |
| 9/15/98 | 67,706.38 |
| 10/15/98 | 77,706.43 |
| 11/15/98 | 77,705.71 |
| 12/15/98 | 77,705.97 |
| 1/15/99 | 77,706.19 |
| 2/15/99 | 77,706.37 |
| 3/15/99 | 77,706.51 |
| 4/15/99 | 77,705.60 |
| 5/15/99 | 77,705.63 |
| 6/15/99 | 77,705.60 |
| 7/15/99 | 77,706.49 |
| 8/15/99 | 77,706.31 |

| ABBE Distribution Date | Trust Indenture Expected Distribution |
|---|---|
| 9/15/99 | 67,706.03 |
| 10/15/99 | 77,705.84 |
| 11/15/99 | 77,705.79 |
| 12/15/99 | 77,705.63 |
| 1/15/00 | 89,364.37 |
| 2/15/00 | 89,364.18 |
| 3/15/00 | 89,364.38 |
| 4/15/00 | 89,363.97 |
| 5/15/00 | 89,363.93 |
| 6/15/00 | 89,364.26 |
| 7/15/00 | 89,363.93 |
| 8/15/00 | 89,363.96 |
| 9/15/00 | 79,364.31 |
| 10/15/00 | 89,364.15 |
| 11/15/00 | 89,364.55 |
| 12/15/00 | 89,364.24 |
| 1/15/01 | 89,364.23 |
| 2/15/01 | 89,364.50 |
| 3/15/01 | 89,364.04 |
| 4/15/01 | 89,363.83 |
| 5/15/01 | 89,363.88 |
| 6/15/01 | 89,364.16 |
| 7/15/01 | 89,364.66 |
| 8/15/01 | 89,364.38 |
| 9/15/01 | 79,364.29 |
| 10/15/01 | 89,364.57 |
| 11/15/01 | 89,364.26 |
| 12/15/01 | 89,364.13 |
| 1/15/02 | 89,364.16 |
| 2/15/02 | 89,364.33 |
| 3/15/02 | 89,364.63 |
| 4/15/02 | 89,364.05 |
| 5/15/02 | 89,364.59 |
| 6/15/02 | 89,364.22 |
| 7/15/02 | 89,363.94 |
| 8/15/02 | 89,363.74 |
| 9/15/02 | 79,364.59 |
| 10/15/02 | 89,364.66 |
| 11/15/02 | 89,364.01 |
| 12/15/02 | 89,364.38 |
| 1/15/03 | 89,363.77 |
| 2/15/03 | 89,364.16 |
| 3/15/03 | 89,364.54 |
| 4/15/03 | 89,363.89 |
| 5/15/03 | 89,364.20 |
| 6/15/03 | 89,364.47 |
| 7/15/03 | 89,364.66 |
| 8/15/03 | 89,363.78 |
| 9/15/03 | 79,363.81 |
| 10/15/03 | 89,363.90 |

| ABBE Distribution Date | Trust Indenture Expected Distribution |
|---|---|
| 11/15/03 | 89,364.12 |
| 12/15/03 | 89,364.21 |
| 1/15/04 | 89,364.16 |
| 2/15/04 | 89,363.95 |
| 3/15/04 | 89,364.57 |
| 4/15/04 | 89,364.00 |
| 5/15/04 | 89,364.24 |
| 6/15/04 | 89,364.27 |
| 7/15/04 | 89,364.07 |
| 8/15/04 | 89,364.63 |
| 9/15/04 | 79,363.93 |
| 10/15/04 | 89,364.13 |
| 11/15/04 | 89,364.29 |
| 12/15/04 | 89,364.15 |
| 1/15/05 | 102,770.71 |
| 2/15/05 | 102,770.91 |
| 3/15/05 | 102,771.22 |
| 4/15/05 | 102,770.62 |
| 5/15/05 | 102,771.09 |
| 6/15/05 | 102,770.61 |
| 7/15/05 | 102,771.16 |
| 8/15/05 | 102,770.73 |
| 9/15/05 | 92,771.29 |
| 10/15/05 | 102,770.99 |
| 11/15/05 | 102,770.89 |
| 12/15/05 | 102,770.73 |
| 1/15/06 | 102,771.49 |
| 2/15/06 | 102,771.14 |
| 3/15/06 | 102,770.68 |
| 4/15/06 | 102,771.08 |
| 5/15/06 | 102,771.32 |
| 6/15/06 | 102,771.37 |
| 7/15/06 | 102,771.22 |
| 8/15/06 | 102,770.85 |
| 9/15/06 | 92,771.24 |
| 10/15/06 | 102,771.53 |
| 11/15/06 | 102,770.78 |
| 12/15/06 | 102,770.73 |
| 1/15/07 | 102,771.35 |
| 2/15/07 | 102,770.63 |
| 3/15/07 | 102,771.55 |
| 4/15/07 | 102,771.07 |
| 5/15/07 | 102,771.18 |
| 6/15/07 | 102,770.86 |
| 7/15/07 | 102,771.09 |
| 8/15/07 | 102,770.84 |
| 9/15/07 | 92,771.09 |
| 10/15/07 | 102,770.99 |
| 11/15/07 | 102,770.59 |
| 12/15/07 | 102,770.62 |

284(g)

| ABBE Distribution Date | Trust Indenture Expected Distribution |
|---|---|
| 1/15/08 | 102,771.07 |
| 2/15/08 | 102,770.91 |
| 3/15/08 | 102,771.12 |
| 4/15/08 | 102,770.67 |
| 5/15/08 | 102,770.54 |
| 6/15/08 | 102,770.71 |
| 7/15/08 | 102,771.15 |
| 8/15/08 | 102,770.84 |
| 9/15/08 | 92,770.75 |
| 10/15/08 | 102,771.04 |
| 11/15/08 | 102,770.74 |
| 12/15/08 | 102,770.60 |
| 1/15/09 | 102,770.59 |
| 2/15/09 | 102,770.68 |
| 3/15/09 | 102,770.86 |
| 4/15/09 | 102,771.09 |
| 5/15/09 | 102,771.34 |
| 6/15/09 | 102,770.60 |
| 7/15/09 | 102,770.84 |
| 8/15/09 | 102,771.04 |
| 9/15/09 | 100,271.15 |
| 10/15/09 | 102,771.21 |
| 11/15/09 | 102,771.21 |
| 12/15/09 | 100,545.05 |
| | 15,432,168.39 |

EXHIBIT A

NUMBER R- ______________________ $____________________

UNLESS THIS CERTIFICATE IS PRESENTED BY AN AUTHORIZED REPRESENTATIVE OF THE DEPOSITORY TRUST COMPANY TO THE ISSUER OR ITS AGENT FOR REGISTRATION OF TRANSFER, EXCHANGE OR PAYMENT, AND ANY CERTIFICATE ISSUED IS REGISTERED IN THE NAME OF CEDE & CO. OR SUCH OTHER NAME AS REQUESTED BY AN AUTHORIZED REPRESENTATIVE OF THE DEPOSITORY TRUST COMPANY AND ANY PAYMENT IS MADE TO CEDE & CO., ANY TRANSFER, PLEDGE OR OTHER USE HEREOF FOR VALUE OR OTHERWISE BY OR TO ANY PERSON IS WRONGFUL SINCE THE REGISTERED OWNER HEREOF, CEDE & CO., HAS AN INTEREST HEREIN.

THE SECURITIES REPRESENTED BY THIS CERTIFICATE HAVE NOT BEEN AND WILL NOT BE REGISTERED UNDER THE SECURITIES ACT OF 1933, AS AMENDED "SECURITIES ACT"), OR THE LAWS OF ANY OTHER JURISDICTION. CONSEQUENTLY, THE CERTIFICATES ARE NOT TRANSFERABLE OTHER THAN PURSUANT TO AN EXEMPTION UNDER THE SECURITIES ACT AND SATISFACTION OF CERTAIN OTHER PROVISIONS SPECIFIED BELOW.

NO SALE, PLEDGE OR OTHER TRANSFER OF THIS CERTIFICATE MAY BE MADE BY ANY PERSON UNLESS EITHER (I) SUCH SALE, PLEDGE OR OTHER TRANSFER IS MADE TO A "QUALIFIED INSTITUTIONAL BUYER" THAT EXECUTES A CERTIFICATE TO THE EFFECT THAT (A) IT IS A "QUALIFIED INSTITUTIONAL BUYER" AS DEFINED UNDER RULE 144A UNDER THE SECURITIES ACT, ACTING FOR ITS OWN ACCOUNT OR THE ACCOUNTS OF OTHER "QUALIFIED INSTITUTIONAL BUYERS" AS DEFINED UNDER RULE 144A UNDER THE SECURITIES ACT, AND (B) IT IS AWARE THAT THE TRANSFEROR OF THIS

CERTIFICATE INTENDS TO RELY ON THE EXEMPTION FROM THE REGISTRATION REQUIREMENTS OF THE SECURITIES ACT PROVIDED BY RULE 144A UNDER THE SECURITIES ACT, OR (II) SUCH SALE, PLEDGE OR OTHER TRANSFER IS OTHERWISE MADE IN A TRANSACTION EXEMPT FROM THE REGISTRATION REQUIREMENTS OF THE SECURITIES ACT, IN WHICH CASE (A) THE TRUSTEE SHALL REQUIRE THAT BOTH THE PROSPECTIVE TRANSFEROR AND THE PROSPECTIVE TRANSFEREE CERTIFY TO THE TRUSTEE AND THE SELLER IN WRITING THE FACTS SURROUNDING SUCH TRANSFER, WHICH CERTIFICATION SHALL BE IN FORM AND SUBSTANCE SATISFACTORY TO THE TRUSTEE AND THE SELLER, AND (B) THE TRUSTEE SHALL REQUIRE A WRITTEN OPINION OF COUNSEL (WHICH WILL NOT BE AT THE EXPENSE OF THE SELLER OR THE TRUSTEE) SATISFACTORY TO THE SELLER AND THE TRUSTEE TO THE EFFECT THAT SUCH TRANSFER WILL NOT VIOLATE THE SECURITIES ACT.

THE CERTIFICATES MAY NOT BE ACQUIRED BY OR FOR THE ACCOUNT OF (I) AN EMPLOYEE BENEFIT PLAN (AS DEFINED IN SECTION 3(3) OF THE EMPLOYEE RETIREMENT INCOME SECURITY ACT OF 1974, AS AMENDED ("ERISA")) THAT IS SUBJECT TO THE PROVISIONS OF TITLE I OR ERISA, (II) A PLAN DESCRIBED IN SECTION 4975(E)(1) OF THE INTERNAL REVENUE CODE OF 1986, AS AMENDED, OR (III) ANY ENTITY WHOSE UNDERLYING ASSETS INCLUDE PLAN ASSETS BY REASON OF A PLAN'S INVESTMENT IN THE ENTITY (EACH A "BENEFIT PLAN"). BY ACCEPTING AND HOLDING A CERTIFICATE, THE CERTIFICATEHOLDER THEREOF SHALL BE DEEMED TO HAVE REPRESENTED AND WARRANTED THAT IT IS NOT A BENEFIT PLAN AND, IF REQUESTED TO DO SO BY THE SELLER OR THE TRUSTEE, THE CERTIFICATEHOLDER SHALL DELIVER TO THE TRUSTEE AN UNDERTAKING LETTER TO SUCH EFFECT IN THE FORM SPECIFIED IN THE AGREEMENT.

K.C. ABBE® TRUST 1995-1

CERTIFICATE OF BENEFICIAL INTEREST evidencing a fractional undivided interest in the Trust, as defined below, the property of which includes an estate for years commencing on ___________, 1995 and ending on December 31, 2009 in the Real Property (as defined in the Trust Agreement) including, without limitation all rights of the Term Trustee to receive rent or any other payments in respect of the Real Property and all accounts held by or for the benefit of the Term Trustee pursuant to the Terms of the Trust Agreement (as defined below).

(This Certificate does not represent an interest in or obligation of Scribcor, Inc., Old American Insurance Company or any of their respective affiliates.)

THIS CERTIFIES THAT ______________________________ is the registered owner of a nonassessable, fully-paid, fractional undivided interest in K.C. ABBE® TRUST 1995-1 (the "Trust") formed by Scribcor, Inc., an Illinois corporation.

The Trust was created pursuant to a Trust Agreement, dated as of ____________, 1995 (as amended and supplemented from time to time, the "Trust Agreement"), between the Seller and The First National Bank of Chicago, a national banking association, not in its personal capacity, but solely as trustee (the "Term Trustee"), a summary of certain of the pertinent provisions of which is set forth below. To the extent not otherwise defined herein, the capitalized terms used herein have the meanings assigned to them in the Trust Agreement.

This Certificate is one of the duly authorized Certificates designated as K.C. ABBE® TRUST 1995-1 Certificate of Beneficial Interest (the "Certificates"). This Certificate is issued under and is subject to the terms, provisions and conditions of the Trust Agreement, the terms of which are incorporated herein by reference and made a part hereof, to which Trust Agreement the holder of this Certificate by virtue of the acceptance hereof assents and by which such holder is bound. Without limiting the foregoing, the Certificate is subject to each and every of the conditions and limitations contained in Sections 4.4 and 6.2 of the Trust Agreement.

Under the Trust Agreement, there shall be distributed on the 15th day of each month, or, if such 15th day is not a Business Day, the next Business Day, commencing ________ 15, 1995 (each, a "Distribution Date"), to the person in whose name this Certificate is registered on the related Record Date (as defined below), such Certificateholder's fractional undivided interest in the amount of Distributable Funds to be distributed to Certificateholders on such Distribution Date; provided however, Certificateholders shall not receive payments in respect of the Certificate Balance until all Reimbursable Costs reasonably incurred by the Term Trustee have been reimbursed to the Term Trustee in accordance with Section 6.10 and Article V of the Trust Agreement. The "Record Date," with respect to any Distribution Date, means the close of business on the third (3rd) business day immediately preceding such Distribution Date.

The distributions in respect of the Certificate Balance on this Certificate are payable in such coin or currency of the United States of America as at the time of payment is legal tender for payment of public and private debts.

It is the intent of the Seller and the Certificateholders that, for purposes of federal income, state and local income and franchise taxes, and any other taxes imposed upon, measured by or based upon gross or net income, the Trust shall be treated as a grantor trust. Except as otherwise required by appropriate taxing authorities, the Seller and the other Certificateholders by acceptance of a Certificate, agree to treat, and to take no action inconsistent with the treatment of, the Certificates for such tax purposes as interests in such grantor trust.

Each Certificateholder, by its acceptance of a Certificate, covenants and agrees that such Certificateholder shall not, prior to the date which is one year and one day after the termination of the Trust Agreement, acquiesce in, petition or otherwise invoke or cause the Seller to invoke the process of any court or governmental authority for the purpose of commencing or sustaining a case against the Seller under any federal or state bankruptcy, insolvency, reorganization or similar law or appointing a receiver, liquidator, assignee, trustee, custodian, sequestrator or other similar official of the Seller or any substantial part of its property, or ordering the winding up or liquidation of the affairs of the Seller.

Distributions on this Certificate shall be made as provided in the Trust Agreement by the Term Trustee by wire transfer or check mailed to the Certificateholder of record in the Certificate Register without the presentation or surrender of this Certificate or the making of any notation hereon. Except as otherwise provided in the Trust Agreement and notwithstanding the above, the final distribution on this Certificate shall be made after due notice by the Term Trustee of the pendency of such distribution and only upon presentation and surrender of this Certificate at the office maintained for such purpose by the Trustee in the City of Chicago, County of Cook and State of Illinois.

Reference is hereby made to the further provisions of this Certificate set forth on the reverse hereof, which further provisions shall for all purposes have the same effect as if set forth at this place.

Unless the certificate of authentication hereon shall have been executed by an authorized officer of the Term Trustee by manual signature, this Certificate shall not entitle the holder hereof to any benefit under the Trust Agreement or be valid for any purpose.

THIS CERTIFICATE SHALL BE CONSTRUED IN ACCORDANCE WITH THE LAWS OF THE STATE OF ILLINOIS, WITHOUT REFERENCE TO ITS CONFLICT

OF LAW PROVISIONS, AND THE OBLIGATIONS, RIGHTS AND REMEDIES OF THE PARTIES HEREUNDER SHALL BE DETERMINED IN ACCORDANCE WITH SUCH LAWS.

IN WITNESS WHEREOF, the Term Trustee, on behalf of the Trust and not in its individual capacity, has caused this Certificate to be duly executed.

K.C. ABBE® TRUST 1995-1
THE FIRST NATIONAL BANK OF CHICAGO, a national banking association, not in its individual capacity but solely as Term Trustee Dated: ____________________, 1995

By:____________________________
Name:
Title:

TERM TRUSTEE'S CERTIFICATE OF AUTHENTICATION

This is one of the Certificates referred to in the within-mentioned Trust Agreement.

| | | |
|---|---|---|
| THE FIRST NATIONAL BANK OF CHICAGO, a national banking association, not in its individual capacity but solely as Term Trustee<br><br>By ____________________<br>Name:<br>Title: | OR | THE FIRST NATIONAL BANK OF CHICAGO, a national banking association, not in its individual capacity but solely as Term Trustee<br><br>By ________________, as<br>Authenticating Agent<br><br>By: ____________________<br>Name:<br>Title: |

REVERSE OF CERTIFICATE

The Certificates do not represent an obligation of, or an interest in, the Seller, Tenant, any Replacement Tenant, the Term Trustee or any affiliates of any of them and no recourse may be had against such parties or their assets, except as may be expressly set forth or contemplated herein or in the Trust Agreement. In addition, this Certificate is not guaranteed by any governmental agency or instrumentality and is limited in right of payment to certain collections and recoveries with respect to the Trust Estate (and certain other amounts), all as more specifically set forth herein and in the Trust Agreement. A copy of the Trust Agreement may be examined during normal business hours at the principal office of the Seller or the Term Trustee, and at such other places, if any, designated by the Seller, or the Term Trustee, by any Certificateholder upon written request.

The Trust Agreement does not permit, with certain exceptions therein provided, the amendment thereof or the modification of the rights and obligations of the Seller and the rights of the Certificateholders under the Trust Agreement. To the extent such amendments and modifications are permitted, the same may be made only with the consent of Certificateholders whose Certificates evidence not less than a majority of the Voting Interests as of the close of business on the immediately preceding Record Date. Any such consent by the Holder of this Certificate shall be conclusive and binding on such holder and on all future Holders of this Certificate and of any Certificate issued upon the transfer hereof or in exchange herefor or in lieu hereof whether or not notation of such consent is made upon this Certificate.

As provided in the Trust Agreement and subject to certain limitations therein set forth, the transfer of this Certificate is registerable in the Certificate Register upon surrender of this Certificate for registration of transfer at the offices or agencies of the Certificate Registrar maintained by the Term Trustee in the City of Chicago, County of Cook and State of Illinois, accompanied by a written instrument of transfer in form satisfactory to the Term Trustee and the Certificate Registrar duly executed by the Holder hereof or such Holder's attorney duly authorized in writing, and thereupon one or more new Certificates of authorized denominations evidencing the same aggregate interest in the Trust will be issued to the designated transferee. The initial Certificate Registrar appointed under the Trust Agreement is The First National Bank of Chicago, Chicago, Illinois.

The Certificates are issuable only as registered Certificates without coupons in denominations of $20,000 or integral multiples of $1,000 in excess thereof. As provided in the Trust Agreement and subject to certain limitations therein set forth, Certificates are exchangeable for new Certificates of authorized denominations evidencing the same aggregate denomination, as requested by the Holder surrendering the same; provided, however, that no Certificate may be subdivided such that the denomination of any resulting Certificate is less than $20,000. No service charge shall be made for any such registration of transfer or exchange, but the Term Trustee or the Certificate Registrar may require payment of a sum sufficient to cover any tax or governmental charge payable in connection therewith.

The Term Trustee, the Certificate Registrar and any agent of the Term Trustee or the Certificate Registrar may treat the person in whose name this Certificate is registered as the owner hereof for all purposes, and none of the Term Trustee, the Certificate Registrar or any such agent shall be affected by any notice to the contrary.

The obligations and responsibilities created by the Trust Agreement and the Trust created thereby shall terminate upon the payment to Certificateholders of all amounts required to be paid to them pursuant to the Trust Agreement and the disposition of all property held as part of the Trust.

EXHIBIT B

SECURITIES ACT EXEMPTION CERTIFICATE

Scribcor, Inc.
400 North Michigan Avenue
Suite 1200
Chicago, Illinois 60611

The First National Bank of Chicago
One North State Street
Chicago, IL 60602

Ladies and Gentlemen:

In connection with our proposed purchase of a certificate of beneficial interest (the "Certificate"), representing a fractional undivided interest in the K.C. ABBE® Trust 1995-1, issued under a trust agreement, dated as of April 27, 1995 (the "Trust Agreement"), between Scribcor, Inc., an Illinois corporation (the "Seller") and The First National Bank of Chicago, as owner trustee, acting thereunder not in its individual capacity but solely as owner trustee of the Trust (the "Term Trustee") we certify that:

1. We understand that the Certificate has not been registered under the Securities Act of 1933, as amended (the "Securities Act"), and may not be sold except as permitted in the following sentence. We agree, on our own behalf and on behalf of any accounts for which we are acting as hereinafter stated, that such Certificate may be resold, pledged or transferred only to: (i) the Seller; (ii) an institutional investor that is an "Accredited Investor" as defined in Rule 501(a)(1), (2), (3) or (7) (an "Institutional Accredited Investor") under the Securities Act (as indicated by the box checked by the transferor on the Certificate of Transfer on the reverse of the Certificate) acting for its own account and not for the account of others or as a fiduciary or agent for others (which others also are Institutional Accredited Investors unless the holder is a bank acting in its fiduciary capacity) that executes a certificate substantially in the form hereof, (iii) so long as such Certificate is eligible for resale pursuant to Rule 144A under the Securities Act ("Rule 144A"), to a person whom we reasonably believe after due inquiry to be a "qualified institutional buyer" as defined in Rule 144A acting for its own account (and not for the account of others) or as a fiduciary or agent for others (which others also are "qualified institutional buyers" to whom notice is given that the resale, pledge or transfer is being made in reliance on Rule 144A, or (iv) in a sale, pledge or other transfer made in a transaction otherwise exempt from the registration requirements of the Securities Act, in which case (A) the Term Trustee shall require a written opinion of counsel (which will not be at the expense of the Seller or the Term Trustee) satisfactory to the Seller and the Term Trustee to the effect that such transfer will not violate the Securities Act, in each in accordance with any applicable securities laws of any state of the United States. We will notify any purchaser of the Certificate from us of the above resale restrictions, if then applicable. We further understand that in connection with any transfer of the Certificate by us that the Seller and the Term Trustee may request, and if so requested we will furnish, such certificates and other information as they may reasonably require to confirm that any such transfer complies with the foregoing restrictions. We understand that no sale, pledge or other transfer may be made to any one person for Certificates with a face amount of less than $20,000 and, in the case of any person acting on behalf of one or more third parties (other than a bank (as defined in Section 3(a)(2) of the Securities Act) acting in its fiduciary capacity), for the Certificates with a face amount of less than $20,000 for each such third party.

2. [CHECK ONE]

• (a) We are an institutional investor and an "accredited investor" (as defined in Rule 501(a)(1), (2), (3) or (7) of Regulation D under the Securities Act) acting for our own account (and not for the account of others) or as a fiduciary or agent for others (which others also are Institutional Accredited Investors unless we are bank acting in its fiduciary capacity). We have such knowledge and experience in financial and business matters as to be capable of evaluating the merits and risks of our investment in the Certificate, and we and any accounts for which we are acting are each able to bear the economic risk of our or its investment for an indefinite period of time. We are acquiring the Certificate for investment and not with a view to, or for offer and sale in connection with, a public distribution.

• (b) We are a "qualified institutional buyer" as defined under Rule 144A under the Securities Act and are acquiring the Certificate for our own account (and not for the account of others) or as a fiduciary or agent for others (which others also are "qualified institutional buyers"). We are familiar with Rule 144A under the Securities Act and are aware that the seller of the Certificate and other parties intend to rely on the statements made herein and the exemption from the registration requirements of the Securities Act provided by Rule 144A.

3. You are entitled to rely upon this letter and you are irrevocably authorized to produce this letter or a copy thereof to any interested party in any administrative or legal proceeding or official inquiry with respect to the matters covered hereby.

Very truly yours,

______________________________________

(Name of Purchaser)

By: ____________________________________

Date: ____________________________________

EXHIBIT C

UNDERTAKING LETTER

Scribcor, Inc.
400 North Michigan Avenue
Chicago, IL 60611

First National Bank of Chicago
as Term Trustee of the K.C. ABBE®
Trust 1995-1
One First National Plaza
Chicago, IL 60670

Ladies and Gentlemen:

In connection with our purchase of record or beneficial ownership of the Certificate of Beneficial Interest (the "Certificate") of the K.C. ABBE® Trust 1995-1, the undersigned purchaser, record owner or beneficial owner hereby acknowledges, represents and warrants that such purchaser, record owner or beneficial owner:

(1) is not, and has not acquired the Certificate by or for the benefit of, (i) an employee benefit plan (as defined in Section 3(3) of the Employee Retirement Income Security Act of 1974, as amended ("ERISA")) that is subject to the provisions of Title I of ERISA, (ii) a plan described in Section 4975(e)(1) of the Internal Revenue Code of 1986, as amended, or (iii) any entity whose underlying assets include plan assets by reason of a plan's investment in the entity whose underlying assets include plan assets by reason of a plan's investment in the entity; and (2) acknowledges that you and others will rely on our acknowledgements, representations and warranties, and agrees to notify you promptly in writing if any of our representations or warranties herein cease to be accurate and complete.

---

Name of Certificateholder

By:______________________________

Name:______________________________

Title:______________________________

Date: ______________________________

EXHIBIT D

[FORM OF DISTRIBUTION DATE STATEMENT]

| | | |
|---|---|---|
| 1 | Expected Distributions | $______________ |
| 2 | Total Collections Received (since prior Distribution Date, itemized) | $______________ |
| 3. | Distributable Funds (as of this Distribution Date, itemized) | $______________ |
| 4. | Difference between Expected Distributions and Distributable Funds | $______________ |
| 5. | Balance in Certificate Distribution Account (after distribution of Distributable Funds) | $______________ |
| 6. | Reimbursable Costs Distributed to Term Trustee (this Distribution Date, itemize) | $______________ |

EXHIBIT E

FORM OF LEASE

LEASE

R&S KANSAS CITY ASSOCIATES
LIMITED PARTNERSHIP
as

Landlord and

OLD AMERICAN INSURANCE COMPANY
as

Tenant

Date: December 29, 1989

Premises: 4900 Oak Street
Kansas City, Missouri

TABLE OF CONTENTS

| Articles | | Page |
|---|---|---|
| Article I | Demise of Premises | 306 |
| Article II | Use | 307 |
| Article III | Term and Renewal | 308 |
| Article IV | Rent | 310 |
| Article V | Net Lease | 312 |
| Article VI | Taxes; Assessments; Compliance with Law | 313 |
| Article VII | Repairs and Maintenance | 318 |
| Article VIII | Alterations | 320 |
| Article IX | Tenant's Equipment | 322 |
| Article X | Liens | 323 |
| Article XI | Utilities and Service | 324 |
| Article XII | Insurance | 324 |
| Article XIII | Hazardous Material | 329 |
| Article XIV | Fire and Other Casualty | 333 |
| Article XV | Condemnation | 335 |
| Article XVI | Subletting and Assignment | 336 |
| Article XVII | Indemnification | 343 |
| Article XVIII | Conditional Limitations; Default Provisions | 344 |

| | | |
|---|---|---|
| Article XIX | Landlord's Right to Cure Tenants Default | 351 |
| Article XX | Waivers | 351 |
| Article XXI | Subordination | 352 |
| Article XXII | Exculpation | 353 |
| Article XXIII | Delays | 354 |
| Article XXIV | Brokers | 354 |
| Article XXV | Landlord's Right to Inspect | 355 |
| Article XXVI | Estoppel Certificates | 356 |
| Article XXVII | Fees and Expenses | 356 |
| Article XXVIII | Rent Control | 357 |
| Article XXIX | No Merger of Title | 358 |
| Article XXX | Surrender; Holding Over | 358 |
| Article XXXI | Notices | 360 |
| Article XXXII | Quiet Enjoyment | 360 |
| Article XXXIII | Affirmative Waivers | 361 |
| Article XXXIV | Interpretation | 361 |
| Article XXXV | No Representations or Modifications | 362 |
| Article XXXVI | Recording | 362 |
| Article XXXVII | Headings | 362 |
| Article XXXVIII | Successors and Assigns | 363 |
| Article XXXIX | Escrow | 363 |
| Article XL | Development Rights | 368 |
| Article XLI | Governing Law | 368 |
| Article XLII | Modification Amendment, Etc | 368 |

| | |
|---|---|
| Schedule A | Description of the Land |
| Schedule B | Memorandum of Lease |

LEASE

This Lease (this "Lease") made as of this 29th day of December, 1989, between R&S KANSAS CITY ASSOCIATES LIMITED PARTNERSF.IP, a Connecticut limited Partnership, having an address c/o Realty Holdings of America, 1370 Avenue of the Americas, 33rd Floor, New York, New York 10019 ("Landlord"); and OLD AMERICAN INSURANCE COMPANY, a Missouri corporation, having an office at 4900 Oak Street, Kansas City, Missouri 64112 ("Tenant").

WITNESSETH:

I. DEMISE OF PREMISES

A. In consideration of the rents, agreements and conditions herein reserved and contained on the cart of Tenant to be paid, performed and observed, Landlord does hereby demise and lease to Tenant, and Tenant does hereby take from Landlord, for the term and upon the terms, covenants and conditions hereinafter set forth, the following property (collectively, "Demised Premises"):

1. The real property described in Schedule A annexed hereto and made a part hereof ("Land,");

2. All buildings, structures and other improvements Presently situated or hereafter constructed upon the Land and all of the fixtures, facilities and installations of every kind and nature whatsoever now or hereafter located therein or thereon including, without limitation, all plumbing, gas, electrical, ventilating, heating and air conditioning systems, lighting, wiring, ducts, oil and gas boilers, burners, hot water heaters, signs and canopies, attached to or comprising a part of such improvements (collectively, "Improvements");

3. All easements, rights and appurtenances relating to the Land and the Improvements, subject, however, to all of the covenants, easements, restrictions and agreements of record; and 4. Any and all existing leases, subleases, concessions, tenancies and other occupancies of the Demised Premises.

B. Tenant, and/or an affiliate of Tenant, has occupied the Demised Premises and is thoroughly acquainted with its condition and the Demised Premises is accepted by Tenant in its present "as is" condition without representation or warranty by Landlord and subject to all notes or notices of violation of law; it being expressly understood and agreed that Landlord shall not be required to perform any demolition, construction, improvements, alterations, maintenance, repairs, replacements or any other work of any kind or nature whatsoever at the Demised Premises. Tenant has examined the title to the Demised Premises and is thoroughly acquainted with its state and condition and has found the same satisfactory and In accordance with the Provisions of this Lease relating thereto. Tenant acknowledges that Landlord has made no representation as to the state of title, or the condition, of the Demised Premises, or of any equipment or facilities located within or appurtenant thereto or the expenses of operation, or as to its fitness or sufficiency for Tenant's requirements or as to any defects, latent, patent or otherwise, or any other matter or thing affecting or related to the Demised Premises, except as expressly set forth herein. The taking of possession of the Demised Premises by Tenant shall be conclusive evidence that the said Demised Premises was in good and satisfactory condition at the time such possession was taken.

II. USE

The Demised Premises may be used as primarily an office building and incidentally for related and/or ancillary uses (such as, for example, retail stores an the first floor) , subject to covenants, easements, restrictions and agreements of record, and for no other purpose; provided, however, notwithstanding anything contained in the foregoing to the contrary, in no event shall Tenant use, or suffer or permit anyone to use, the Demised Premises or any part thereof, for (a) an agency, department or bureau of the United States Government or any state or municipality within the United States, or for any agency, department or bureau of any other government or governmental agency, department or bureau, (b) any tax exempt or charitable, religious, union or other not-for-profit organization, (c) the conduct of a public auction of any kind, (d) the conduct or maintenance of any gambling or gaming activities or any political activities or any club activities,. whether private or public, including but not limited to an Off-Track Betting establishment, (e) the use of any type of video game, slot machine, pinball machines or related equipment on the Demised Premises, (f) the use for any obscene or pornographic purposes or any sort of commercial sex establishment, whether pornographic or otherwise, or for the sale of pornographic or sexually related implements or similar items, (g) the use 'or a pawn shop, astrology, palm or card reading parlor or check cashing establishment, (h) a center, shelter or clinic for the homeless, (i) a funeral home, or (j) a flea market.

III. TERM AND RENEWAL

A. The original term of this Lease shall be a period of twenty (20) years commencing upon the date hereof and expiring on December 31, 2009 (the "Original Term" and each twelve (12) month period commencing upon the date hereof or any anniversary of the date hereof, a "Lease Year"), or until such term shall sooner cease and expire or as such term shall be extended, as hereinafter provided.

B. Tenant shall have the right, at its option, -to renew the Original Term for two (2) consecutive periods of five (5) years each (each, a "Renewal Term"), provided that at the date of the exercise of any of said options and at the commencement date of any Renewal Term no "Event of Default" (as hereinafter defined) shall have occurred and be continuing, that at the time Tenant exercises its option to renew for the second Renewal Term it shall have duly exercised or shall simultaneously exercise its option to renew for the first Renewal Term in accordance with the ,terms hereof, and provided further that Tenant shall exercise each such option to renew by written notice to Landlord at least twenty--four (24) months prior to the expiration of the Original Term, or the then current Renewal Term, respectively or within sixty (60) days after "Landlord's Notice (as hereinafter defined), whichever is later, but in no event later than the expiration of the "Lease Term" (as hereinafter defined) if no Landlord's Notice is given; time being of the essence to Tenant's giving any of such notices by Tenant. Landlord shall endeavor to deliver to Tenant at least 26 months prior to the expiration of the Lease Term a notice ("Landlord's Notice") stating that Tenant's right to renew the Lease Term shall expire on the later of (1) twenty-four (24) Months prior to the expiration of the Lease Term or (2) sixty (60) days after the delivery of such Notice. Prior to the exercise by Tenant of any of said options to renew the original Term, the expression "Lease Term", shall mean the original Term; after '-he exercise by Tenant of any of the aforesaid options, the expression "Lease Term" shall mean the Original Term as the same may have been extended. If Tenant shall not have given Landlord notice in writing of the exercise of any of the foregoing options within the time periods herein above set forth, Tenant shall have no further right to renew the Lease Term; and if at the expiration of the Lease, should Tenant fail to vacate the Demised Premises, as hereinafter provided, Tenant's holding over shall be governed by the provisions of Article XXX hereof.

C. Each Renewal Term shall be upon the same terms, covenants and conditions as provided in this Lease, except that upon the exercise of each Renewal Term, there shall be one (1) less Renewal Term remaining and the Rent payable during each Renewal Term shall be as set forth in Article IV A.2 hereof. If Tenant shall give notice of the exercise of an option in the manner and within the time periods herein above set forth, the Lease Term shall be renewed upon the giving of the notice without the requirement of any action on the part of Landlord. within thirty (30) days after request by either Landlord or Tenant, Landlord and Tenant agree to execute and deliver an instrument in recordable form confirming that the term of this Lease has been extended.

D. Notwithstanding anything contained herein to the contrary, in the event all or a portion of the Demised Premises has been subleased to not more than two subtenants, for a term, including renewals, which shall expire not more than three year after the expiration of the Lease Term, Tenant shall have the right, at its option, to renew the Lease Term for one additional period of either one, two or three years, so that the Lease Term shall expire after the expiration of such subleases provided that Tenant shall exercise such option to renew in accordance with Paragraph B of this Article III and further provided, Tenant shall have no further right to renew or extend the term of this Lease. The option provided for in this Paragraph D shall be exercisable whether or not Tenant then has the right to exercise any option provided for in Paragraph B above, but the exercise the option provided for in this Paragraph D shall constitute a waiver by Tenant of any then unexercised options provided for i Paragraph B above. In no event shall Tenant enter into any such sublease which extends beyond the expiration of the Lease Term without exercising an option as provided in Paragraph B or in this Paragraph D.

IV. <u>RENT</u>

A. During the Original Term and each Renewal Term, Tenant covenants and agrees to pay to Landlord a basic annual rent ("Rent") in equal monthly installments, in advance, on the Friday of each calendar month included within the Lease Term, as follows:

1. During the Original Term, annual Rent shall be payable as follows:

| Years | Annual Rent |
|---|---|
| 1-5 | $ 811,000 |
| 6-10 | $932,650 |
| 11-15 | $1,072,548 |
| 16-20 | $1,233,430 |

2. During the first Renewal Term, the annual Rent shall be $1,418,445. During the second Renewal Term, the annual Rent shall be $1,631,211. During the renewal term provided for in Paragraph D of Article III, the annual Rent shall be (i) if the option for such renewal term is exercised in lieu of the option for the first Renewal Term or the second Renewal Term, such annual Rent shall be that which would have been payable during the first Renewal Term or the second Renewal Term, as the case may be, or (ii) if such option is exercised during the second Renewal Term, such annual Rent shall be $1,875,893.

B. All Rent and other payments to be made by Tenant to Landlord hereunder shall be in lawful money of the United States of America, and shall be made without any prior demand and without any set-off or deduction whatsoever, and shall be payable on the first day of each and every month during the Lease Term, at Landlord's office at the place to which a notice to Landlord is required to be sent hereunder, unless Landlord shall direct otherwise by notice to Tenant. Rent for any fraction of a month at the commencement or termination of the Lease Term shall be pro-rated. Tenant shall also nay without notice, except for such notice as may be required in this Lease, as additional rent, all costs, expenses, taxes, assessments, insurance premiums required pursuant to this Lease, cost of maintenance, repair and replacement required pursuant to this Lease, and other payments which arise from or are related to the Demised Premises or Tenant's use thereof or which Tenant in any of the provisions of this Lease assumes or agrees to pay, and, in 'the event of any nonpayment thereof, Landlord shall have (in addition to all other rights and remedies) all of the rights and remedies provided for herein or by law in the case of nonpayment of Rent.

C. If Tenant shall fail to pay any installment of Rent or additional rent which Is payable to Landlord for more than five (5) days after same is due and payable, Tenant shall pay interest on the amount due at a rate equal to five (5%) percent in excess .of the rate then established by Citibank, N.A. in New York, New York, as its prime, base or reference rate (the "Interest Rate,,), but in no event higher than the maximum interest rate permitted by law. Such interest shall accrue until the amount due is paid to Landlord and shall be deemed additional rent hereunder.

V. <u>NET LEASE</u>

A. This Lease is a net lease; accordingly, it is the purpose and intent of Landlord and Tenant that the Rent shall be absolutely net to Landlord, so that this Lease shall yield, net to Landlord, the Rent specified in Article IV hereof in each year during the Lease Term, and that all costs and expenses relating to the Demised Premises which may arise or become due during or out of the Lease Term shall be paid by Tenant.

B. Except as otherwise specifically provided in this Lease, this Lease shall not terminate, nor shall Tenant be entitled to any abatement, deduction, counterclaim, defense, deferment or reduction of Rent, or set-off against the Rent, additional rent or other charges payable hereunder, nor shall the respective obligations of Landlord and Tenant be otherwise affected, by reason of damage to or destruction of the Demised Premises from whatever cause, any taking by eminent domain, the lawful or unlawful prohibition, limitation, restriction or prevention of Tenant's use of the Demised Premises, the interference with such use by any private person, corporation or other entity, the impossibility of performance by Landlord, Tenant or both, any actions by governmental authority, or for any other cause whether similar or dissimilar to the foregoing, any present or future law to the contrary notwithstanding; provided, however that nothing contained in this Paragraph D shall negate Landlord's obligations under or deprive Tenant of the full benefit of Article XXXII hereof; it being the intention that the obligations of Tenant hereunder shall be separate and independent covenants and agreements and that the Rent and additional rent and all other sums payable by Tenant hereunder shall continue to be payable in all events unless the obligations to pay the same shall be terminated pursuant to the express provisions of this Lease; and Tenant covenants and agrees that it shall remain obligated under this Lease in accordance with its terms, and that it shall not take any action to terminate, rescind or avoid this Lease, notwithstanding the bankruptcy, Insolvency, reorganization, composition, readjustment, liquidation, dissolution, winding up or other Proceedings affecting Landlord or any assignee of Landlord. Except as provided in this Lease, Tenant waives all rights to terminate or surrender this Lease, or to any reduction, abatement or deferment of Rent, additional rent or any other sums payable hereunder.

VI. TAXES; ASSESSMENTS; COMPLIANCE WITH LAWS

A. Tenant does hereby covenant and agree to and shall, (i) pay, as additional rent, before any fine, penalty, interest or cost may be added for nonpayment, all real estate taxes, assessments, water and sewer rents, rates and charges, ad valorem taxes, gross receipts taxes, sales and use taxes, charges for public utilities, excises, levies, license and permit fees and other similar and dissimilar governmental charges general and special, ordinary and extraordinary, foreseen and unforeseen of any kind and nature whatsoever which are, at any time during the Lease Term, assessed, levied, confirmed, imposed upon or become due and payable out of or in respect of or ' become a lien upon or against or which arise with respect to the Demised Premises or any part thereof; any Rent, additional rent or other sums payable hereunder; this Lease or the leasehold estate created hereby; or the acquisition, ownership, leasing, operation, occupation, possession or use of the Demised Premises by Landlord or Tenant ("Taxes"); and (ii) furnish to Landlord, within thirty (30) days after '-he last day on which the same may be paid without penalty, official receipts or other satisfactory proof evidencing such payment. All obligations contemplated by this Section shall be appropriately adjusted between the parties hereto with respect to the amount of any such obligations paid or payable by Tenant or Landlord subsequent to the termination of this Lease which are properly allocable to a period subsequent to the Lease Term.

B. If, due to a future change in the method of taxation or in the tax method, a new or additional real estate tax, or a franchise, income, transit, profit, or other tax or governmental imposition, however designated, shall be levied against Landlord and/or the Land and/or Improvements in addition to or in substitution in whole or in part for any tax which would constitute Taxes, or in lieu of additional taxes, such tax or imposition shall be deemed for the purposes hereof to be include within the term Taxes. By way of limitation as to "he previous sentence as to any such tax which is adopted in addition to any tax which would constitute Taxes, the same shall be deemed Taxes only to the extent that the same are applicable to real property and the proceeds thereof or owners or lessors of real property as opposed to taxes of general application. Nothing contained in this Article VI shall require Tenant to pay any municipal, state or federal income, capital gains, excess profit, estate, inheritance, succession, transfer, franchise, capital levy or other tax or assessment upon Landlord, all of which shall be the obligation of Landlord, except to the extent that such tax may be levied or imposed as provided in the first sentence of this Paragraph B. If at any time during the Lease Term, a tax or excise on, or measured in whole or in part by, rents or gross receipts is levied or assessed against Landlord or the Rent or additional rent expressly reserved hereunder in addition to or as a substitute in whole or in part for taxes assessed or imposed an land and/or buildings (such as, for example, the present Florida sales tax an rents, the Michigan single business tax, the City of Los Angeles gross receipt tax on rents, or the Philadelphia City or school district gross receipt tax; it being understood and agreed for the purposes of this Lease that the foregoing taxes are not of the nature which would be subject to the limitation referred to in the second sentence of this Paragraph B), the same shall be included within the term real estate taxes, and Tenant covenants to pay such tax or excise on, or measured by, rents or gross receipts, but only to the extent of the amount thereof which is lawfully assessed or imposed upon Landlord and which was so assessed or imposed as a direct result of Landlord's ownership solely of the Demised Premises or of this Lease. It is agreed that Tenant shall have the sole right to file an application for an abatement of real estate taxes or otherwise contest Taxes or the assessment of the Demised Premises for any tax year wholly or partially included within the Lease Term, that Landlord shall cooperate with Tenant in perfecting any such application, including, without limitation, the execution of any documents legally required to perfect such application and permitting same to be brought in Landlord's name (but at no cost or expense to Landlord) , and that Tenant shall retain any abatement, refund or rebate received on account thereof; except that if the last tax year shall be partially included within the Lease Term, then such abatement shall be prorated between Landlord and Tenant after first deducting therefrom Tenant's costs and expenses (including reasonable attorneys, fees) of obtaining the same.

C. In the event that any amount levied or assessed against the Demised Premises may legally be paid in installments, Tenant shall have the option to pay such assessment in installments and shall only be liable for those installments which become due and payable during the Lease Term (subject to apportionment as provided in the last sentence of Paragraph A above).

D. Tenant, at its sale cost and expense, shall promptly (i) comply with, and cause the Demised Premises to comply with, and assume all liabilities and obligations with respect to, all Legal Requirements (as hereinafter defined) and Insurance Requirements (As hereinafter defined), whether or not compliance therewith shall require structural changes or interfere with the use and enjoyment of the Demised Premises or any part thereof; (ii) procure, maintain and comply with all permits, licenses and other authorizations required for any use of the Demised Premises or any part thereof then being made, and for the proper erection, installation, operation and maintenance of the Improvements; and (iii) comply with, and cause the Demised Premises to comply with, all reciprocal easement agreements , if any, affecting or related to the Demised Premises.

1. Legal Requirements are deemed to be all laws, statutes, ordinances, orders, judgments, rules, regulations, permits, licenses and requirements of all governmental departments and agencies, which now, or at any 'lime hereafter, may be applicable to the Demised Premises or the ownership, operation, use, occupancy or possession thereof, including, without limitation, all Environmental Laws (as hereinafter defined).

2. Insurance Requirements are all terms of any of Tenant's insurance policies covering or applicable to the Demised Premises, all requirements of the issuer of any such policy, and all orders, rules, regulations and any other requirements of the applicable National Board of Fire Underwriters (or any other body exercising similar functions) applicable to or affecting the Demised Premises or the use, occupancy or possession thereof.

E. Tenant, at its sole cost and expense, may contest (and, if legally required, in the name of Landlord), by appropriate legal Proceedings conducted in good faith and with due diligence, the amount or validity or application, in whole or in part, of any real estate tax or lien therefor or any Legal Requirement or Insurance Requirement provided that (i) such proceedings shall suspend the collection of any sums payable to satisfy any such liens or real estate taxes from Landlord, the Demised Premises, any interest therein, the Rent or any additional rent, (ii) neither the Demised Premises nor any part thereof or interest therein, or the Rent, or any additional rent, or any portion thereof, would be in any danger of being sold, forfeited, attached or lost by reason of such proceedings, (iii) Tenant shall have furnished such security, if any, as may be required by Landlord, (iv) with respect to the contesting of any Legal Requirement, Landlord would not be in any danger of any criminal liability by reason of such contest and the Demised Premises would not be subject to a forfeiture or a prohibition on occupancy as a result of failure to comply with any Legal Requirement, and (v) if such contest be finally resolved against Tenant, Tenant shall promptly pay the amount required to be paid, together with all interest and penalties accrued thereon. Notwithstanding the Provisions of subparagraph (iii) above, Tenant shall not be required to furnish any such security in contesting any real estate tax or lien therefor or any Legal Requirement or Insurance Requirements provided (i) Tenant has paid the contested tax, lien or amount imposed by a Legal Requirement, or (ii) Tenant delivers to Landlord its most recent annual financial statement, which shall have been prepared in accordance with generally accepted accounting principles, consistently applied, and certified by an independent Certified Public Accountant, which shows a net worth of Tenant equal to the greater of $50,000,000 or the product of (1) 50 ,multiplied by (2) the Rent and Taxes payable for the current Lease Year ("Tenant's Minimum Net worth") and provided that Tenant's most recent quarterly financial statement does not show a reduction in Tenant's net worth below its Minimum Net Worth. Landlord, at the expense of Tenant, shall cooperate with Tenant and execute any documents or pleadings legally required to perfect any such contest. Tenant shall indemnify and save Landlord harmless from and against any cost or expense of any kind that may be imposed upon Landlord in connection with any such contest and any loss resulting therefrom. Tenant shall give prompt notice to Landlord of Tenant's intention to contest as herein above set forth. In the event Landlord does not receive such notice on or before the date which is thirty (30) days prior to the last day such contest may be commenced, Landlord shall have the right, but not the obligation, at Landlord's expense, to conduct such contest and file any and all papers and/or commence such proceedings as in Landlord's opinion may be necessary or desirable. Tenant shall cooperate with Landlord and execute any documents or pleadings legally required to perfect any such contest. If Landlord obtains any tax refund, same shall be paid to Tenant net of Landlord's expenses in obtaining same, or, if obtained in the last year of the Lease Term, such refund shall be apportioned between Landlord and Tenant.

F. In case of default by Tenant in any payment to be made by Tenant as provided in this Article VI, Landlord, after ten (10) days, written notice to Tenant and the continuation of such default at the expiration of such ten (10) day period, may, but shall not be obligated to, pay the amount of any such obligation with interest and penalties, if any, and the amount so paid by Landlord, with interest at the interest Rate from the date of such payment thereof by Landlord until repaid by Tenant, shall be deemed to be additional rent hereunder and shall be paid by Tenant to Landlord within ten (10) days after demand.

VII. <u>REPAIRS AND MAINTENANCE</u>

A. Tenant, at its sole cost and expense, shall keep the Demised Premises, and all parts thereof, including, without limitation, all sidewalks, curbs, parking areas, access ways and landscaped areas, in good order, repair and condition, whether inferior or exterior, structural or non-structural, ordinary or extraordinary, foreseen or unforeseen, including, without limitation, repair of all glass, utilities, conduits, fixtures, equipment, foundations, roofs, exterior and interior walls, heating and air conditioning systems, lighting fixtures, wiring, plumbing, sprinkler systems, paving, sidewalks, roads, parking areas, curbs, gutters and fences. All repairs made by Tenant shall be at least equal in quality and class t 0 the original work. The necessity for and adequacy of repairs to the Demised Premises pursuant to this Article shall be measured by the standard which is appropriate for suburban office buildings in the Kansas City Metropolitan area (both Missouri and Kansas) of similar construction, class and age, provided Tenant shall in any event make all repairs necessary to avoid any structural damage or injury thereto. In connection with the making of any such repairs, Tenant shall comply with the provisions of Article VIII hereof. Tenant shall not commit any waste of the Demised Premises. Landlord makes no representation or warranty with respect to the condition of the Demised Premises or its fitness or availability for any particular use, and Landlord shall not be liable for any latent or patent defect therein.

B. Landlord shall not under any circumstances be required to build any improvements on the Demised Premises, or to make any repairs of any nature or description whatsoever to the Demised Premises, whether ordinary or extraordinary, structural or nonstructural, foreseen or unforeseen, or to make any expenditure whatsoever in connection with this Lease or to maintain the Demised-Premises in any way. Tenant hereby waives the right to make repairs at the expense of Landlord pursuant to any law in effect at the time of the execution of this Lease or thereafter enacted.

C. If, during the last twelve (12) months of the Lease Term, Tenant is required pursuant to any Legal Requirement to make structural repairs or alterations to the Demised Premises (a "Mandated Repair"), then notwithstanding the provisions of Paragraphs A an8 B of this Article VII, the following shall apply. If a Mandated Repair must be completed prior to the expiration of the Lease Term, Tenant shall be responsible to complete same at its sole cost and expense. If, however, a Mandated Repair may be accomplished over a period of time which extends beyond the expiration of the Lease Term but work on such Mandated Repair must be commenced prior to the expiration of the Lease Term, then Tenant shall commence such work and shall be obligated to pay that portion of the work which is equal to the result obtained by pro-rating the total cost of the Mandated Repair over the period of time during which such Mandated Repair may or must be completed and allocating to Tenant the amount allocable to the balance of the Lease Term. If the Mandated Repair can be made during the period which follows the expiration of the Lease Term, then Tenant shall not be obligated to make such Required Repairs nor contribute to the cost of same. The provisions of this Paragraph C shall survive the expiration or sooner termination of this Lease.

D. Tenant shall keep the Demised Premises, and all parts thereof in a clear and orderly condition, free of trash and debris; shall keep the parking areas and sidewalks free of snow and ice; and shall keep all landscaped areas in a well-groomed condition.

E. Upon the expiration or prior termination of the Lease Term, Tenant shall vacate and surrender the Demised Premises to Landlord vacant and broom clean and in as good order and repair as on the date hereof, ordinary wear and tear excepted and subject to any then unrepaired damage caused by fire or other casualty or condemnation which Tenant is not required to repair under Articles XIV or XV of this Lease or the repair of which has not been completed as of the date of expiration or termination.

VIII. ALTERATIONS

Subject to the next following sentence, Tenant, at its sale cost and expense, may make alterations or additions or other improvements to the Demised Premises or any part thereof, provided that (a) if Tenant is required to submit or file any plans and specifications with any federal, state, county, city or any other governmental or municipal authority, department, agency, board, office, commission or bureau or subdivision thereof ("Governmental Authorities") for any such alterations, additions or improvements, Tenant shall deliver a copy of such plans and specifications to Landlord promptly after the filing of same , and (b) any alterations or additions or other improvements (i) shall not reduce the fair market value of the Demised Premises below its value immediately before such alteration, addition or improvement, or impair the usefulness or structural integrity of the Improvements or change the use thereof (but the foregoing shall not preclude the removal by Tenant of personal property not owned by Landlord), (ii) shall not reduce the gross leaseable area of the Demised Premises, (iii) are effected in a good and workmanlike manner, in a safe and careful fashion, and in compliance with all Legal Requirements and insurance Requirements, and (iv) are fully paid for by Tenant. In the event that alterations, additions or improvements affect the exterior of the improvements or the plumbing, electrical or heating, ventilating and air-conditioning systems of the Improvements (other than duct work or the location of sprinkler heads), or such alterations, additions, or improvements are structural in nature which shall be deemed to mean that they affect in any material way the columns, beams, floors, ceilings, interior ceiling-high partitions, slabs, roof or improvements facade, or change in a material way the interior layout of the Improvements, Tenant shall not commence any such alterations, additions or improvements until and unless Landlord shall have consented in writing to same, which consent Landlord shall not unreasonably withhold or delay. Landlord shall be deemed to have consented to any alterations, additions or improvements requested to be made by Tenant pursuant to the preceding sentence, if Landlord does not provide Tenant with written notice of its objection to same within ten (10) business days of receipt of Tenant's written request with respect to any such alterations, additions or improvements. All other alterations, additions or improvements shall not require the consent of Landlord.

Notwithstanding anything contained herein to the contrary, in no event shall Tenant have the right to demolish any part of "he Demised Premises (other than non-structural improvements) without Landlord's consent. All such alterations, additions or other improvements shall be and remain a part of the realty and the property of Landlord, shall be subject to the terms of this Lease, and shall be surrendered to Landlord upon the expiration or earlier termination of the Lease Term.

IX. TENANT'S EQUIPMENT

Tenant, or any permitted subtenant hereunder may, at its sale cost and expense, install or assemble or place in, on or about the Demised Premises, and remove and substitute, any items of machinery, equipment, furniture, furnishings or other personal property used or useful in Tenant's or its subtenant's business that can be removed from the Demised Premises without material damage thereto, which property shall constitute Tenant's "Equipment". Tenant's Equipment shall not include ceiling height movable partitions. Title to Tenant's Equipment shall be and remain in the Tenant or the applicable subtenant and Tenant or the applicable subtenant may remove the same upon the expiration or prior termination of the Lease Term or sublease term, as applicable; provided, however, that Tenant or any subtenant, as applicable, shall have no right to remove any such item which is necessary for the operation or maintenance of the Improvements as such, without regard to the nature of the business conducted therein, including, without limitation, heating, ventilating and air-conditioning equipment; and provided further that any of Tenant's Equipment not removed by Tenant or any applicable subtenant after the expiration or earlier termination of this Lease shall be considered abandoned by Tenant or the applicable subtenant and may be appropriated, sold, destroyed or otherwise disposed of by Landlord without obligation to account therefore Tenant shall pay all costs and expenses incurred in removing or disposing of Tenant 's Equipment, whether removed by Tenant or Landlord, and shall repair, at its sole cost and expense, all damage to the Demised Premises caused by the removal of Tenant's Equipment, whether effected by Tenant, a subtenant or Landlord.

X. LIENS

A. Tenant shall cause to be paid all charges for all work done (labor and materials) upon the Demised Premises during the Lease Term and shall not suffer or permit any mechanics, or similar liens for labor or materials furnished to the Demised Premises during the Lease Term to be filed against the Demised Premises or any part thereof; and if any such lien shall be filed, Tenant shall either pay the same or procure the discharge thereof in any manner permitted by law within thirty (30) days after such filing. Tenant shall indemnify Landlord and save Landlord harmless from and against any and all loss, damage, claims, liabilities, judgments., costs and expenses arising out of the filing of any such lien.

B. If a notice of mechanics lien shall be filed against the Demised Premises for labor or materials alleged to have been furnished, or to be furnished at the Demised Premises, to or for Tenant or to or from someone claiming under Tenant; and if Tenant shall fail to take such action as shall cause such lien to be discharged within thirty (30) days after such filing, in addition to all other rights of Landlord hereunder, Landlord may pay the amount of such lien or discharge it by deposit or by bonding proceeding, and in the event of such deposit or bonding proceeding, Landlord may require the lien or to prosecute an appropriate action to enforce the lienor's claim. In such case, Landlord may pay any judgment recovered on such claim. Any amount paid or expense incurred by Landlord, as in this Section provided, and any expense incurred or sum of money paid by Landlord by reason of the failure of Tenant to comply with any provision of this Lease, or in defending any such action, shall be deemed to be additional rent for the Demised Premises, and shall be due and payable by Tenant to Landlord on demand, together with interest at the Interest Rate on the amount so paid by Landlord, from the date paid by Landlord until the date repaid by Tenant. The receipt by Landlord of any installment of the regular stipulated Rent hereunder or any of said additional rent shall no t be a waiver of any other additional rent then due.

C. Nothing contained herein shall constitute any consent or request by Landlord express or implied, to or for the performance of any labor or services or the furnishing of any materials or other property in respect of the Demised Premises, nor as giving Tenant any right, power or authority to contract for or permit the performance of any labor or services or the furnishing of any materials or other property in such fashion as would permit the making of any claim against Landlord in respect thereof; and notice is hereby given that Landlord will not, under any circumstances, be liable for any labor, services or materials furnished to Tenant or to anyone having an interest in the Demised Premises or any part thereof through or under Tenant, and no mechanic's or other lien for any such labor, services or material shall attach to or affect the reversionary or other interest of Landlord in and to the Demised Premises, or in and to any alterations

XI. UTILITIES AND SERVICES

Tenant shall arrange for the procurement of and pay, cause to be paid, all charges for electricity, power, gas, steam water, telephone and other utilities and services, including, without limitation, cleaning and maintenance services, used up or in connection with the Demised Premises. Landlord shall no be required to furnish an utilities or services to Tenant.

XII. INSURANCE

A. Tenant agrees to, and shall, maintain at all times and at its sole cost and expense, insurance covering the Demised Premises as follows:

1. All-risk property insurance with an agreed amount endorsement for the full replacement cost of the Improvements (with a deductible of not more than 25,000), excluding the costs of excavation and foundation;

2. Commercial general public liability insurance against claims for bodily injury, death or property damage occurring on, in, under, at or about the Demised Premises in a combined single limit amount of $10,000,000 with respect to bodily injury or death arising out of any one accident or occurrence;

3. Boiler and Machinery Insurance in the amount of at least $1,000,000 (with a deductible of not more than $10,000), 4. Workers' compensation insurance to the extent required by the law of the state in which the Demised Premise are located in respect of any work or other operations in, on, under, at or about the Demised Premises;

5. During any period of constriction on the Demised Premises, builder's risk insurance on a completed value basis for the total cost of such alterations, additions or improvements, and workers, compensation insurance as required by applicable law if not already covered under the insurance provided for in Paragraph 1 or Paragraph 4 hereof;

6. If and to the extent such insurance is commonly obtained by prudent owners of suburban office buildings in the Kansas City metropolitan area (Kansas and Missouri) of similar construction; class and age to the Demised Premises, environmental impairment insurance in such amounts as are commonly obtained by such prudent owners; provided, however, Tenant shall not be required to carry such insurance so long as its net worth (as defined in Paragraph E of Article VI) exceeds Tenant's minimum Net worth; and further, provided, to the extent Tenant is required to carry such insurance because its net worth is equal to or less than Tenant's Minimum Net Worth, Tenant may maintain a deductible with respect to such insurance of not more than five (5%) percent of its net worth; and 7. Such other insurance in such amounts, and against such risks, as are commonly obtained at the time in question by prudent owners of suburban office buildings in the Kansas City metropolitan area (Kansas and Missouri) of similar construction, class and age to the Demised Premises, including, without limitation war risk insurance, earthquake insurance and flood insurance.

B. All of the insurance required by this Article shall be written by companies of nationally recognized financial standing, reasonably satisfactory to Landlord, which are authorized to issue policies in the state in which the Demised Premises are located. The insurance maintained by Tenant pursuant to this Article or otherwise in respect of the Demised Premises shall name Landlord and Landlord's mortgagee as additional insureds as their interests may appear. The proceeds of the insurance maintained by Tenant under Section A.1 shall be payable in case of loss 11-o the holders of any fee mortgages upon the Demised Premises as their interests may appear. All insurance maintained by Tenant shall provide that (i) no cancellation or reduction thereof shall be effective until at least thirty (30) days after receipt by Landlord of written notice thereof, and (ii) all losses shall be payable as provided in Article XIV notwithstanding any act or negligence of Landlord, Tenant, or any person or entity having an interest in the Demised Premises. Tenant, on the execution and delivery hereof, shall furnish to Landlord, and any mortgagee, certificates for such insurance, and not less than ten (10) days before the expiration of any such insurance, a certificate or binder evidencing the replacement or renewal thereof. Landlord agrees to obtain from any fee mortgagee to whom insurance proceeds are payable hereunder, an agreement that such fee mortgagee shall permit such insurance to be disbursed in accordance with Article XIV hereof.

C. Tenant shall not take out separate insurance concurrent in form or contributing in the event of loss with that required by this Article to be furnished by Tenant unless Landlord and any mortgagee are included therein as additional insureds, as their interests may appear, with loss payable as in this Article provided. Tenant shall promptly notify Landlord whenever any such separate insurance is taken out and shall deliver to Landlord, and any mortgagee, the policy or policies or duplicates thereof, or certificates evidencing the same, as provided in this Article.

D. Should Tenant fail to effect, maintain or renew any insurance required to be maintained by the provisions of this Article, or to Day 41--he premium therefor, or to deliver to Landlord, or any mortgagee, any of such policies or certificates, then and in any of said events Landlord, at its option, but without, obligation to do so, may, upon ten (10) days' notice to Tenant, procure such insurance on Tenant's behalf. Any sums expended by Landlord to procure such insurance, together with interest thereon at the Interest Rate from the date expended by Landlord until the date repaid by Tenant, shall be deemed to be additional rent hereunder and shall be paid by Tenant to Landlord on demand.

E. There shall be no apportionment of premium in respect of insurance maintained pursuant to this Article at the expiration Tenant may cancel any or any earlier termination of this Lease. Tenant may cancel any such policies as of such expiration or termination and obtain any premium refunds incident thereto. Tenant shall be entitled to any premium refund or dividend received by Landlord or Tenant on account of any insurance maintained by Tenant pursuant to this Article.

F. Tenant hereby waives any and all rights of recovery, claim, action or cause of action against Landlord and Landlord's partners, trustees, agents, officers and employees, for any loss or damage that may occur to the Demised Premises, and to all property, whether real, personal or mixed, located in or about the Demised Premises, by reason of fire, the elements or other risks, regardless of cause or origin, including the negligence of Landlord and Landlord's partners, trustees, agents, officers and employees. Tenant agrees to furnish Landlord with reasonable evidence of Tenant's insurance carrier's consent to such waiver of subrogation.

G. At the request of Landlord, but not more than once every three (3) years, Tenant, at Tenant's sole cost and expense, shall increase the limits of liability an any of the insurance policies (with a corresponding increase in the applicable deductibles if Tenant's net worth at such time equals or exceeds Tenant's Minimum Net Worth) Tenant is required to maintain pursuant to subparagraphs A(2), (3), (6) and (7) of this Article, to such Landlord shall reasonably request; and in the event Tenant shall fail to do so, Landlord may procure such increase on behalf of Tenant and the premiums paid by Landlord therefore, together with interest thereon at the Interest Rate, from the date paid by Landlord until the date repaid by Tenant, shall be deemed to be additional rent hereunder and shall be paid by Tenant to Landlord on demand. Any such request of the Landlord shall be based upon and not in excess of the amount of insurance then being carried by prudent owners of suburban office buildings in the Kansas City metropolitan area (Kansas City Missouri) of similar construction, class and age. If Landlord and Tenant disagree as to the amounts of the limits of liability required by Landlord, Tenant shall first procure the increased limits of liability and may then submit such dispute to arbitration and the same shall be determined by arbitration as hereinafter described, and judgment upon the award rendered may be entered in any Court having jurisdiction. The person desiring arbitration shall appoint a disinterested person as arbitrator on its behalf and give notice thereof to the other party who shall, within fifteen (15) days thereafter, appoint a second disinterested person as arbitrator an its behalf and give written notice thereof to the first party. The arbitrators thus appointed shall appoint a third disinterested per son, and such three arbitrators shall, as promptly as possible, determine the matter which is the subject of the arbitration . The decision of the majority of the arbitrators shall be conclusive and binding on all parties. Each arbitrator shall have at least 'en (10) years experience in owning, operating or managing real estate in Kansas City (Missouri or Kansas). If a party who shall have the right pursuant to the foregoing to appoint an arbitrator fails or neglects to do so, then, and in such event, the other party shall appoint a second arbitrator. if the two arbitrators appointed shall fail within fifteen (15) days after the appointment of the .second arbitrator to appoint a 11-hird arbitrator, then either may apply to any court of competent jurisdiction to appoint such third arbitrator. The expenses of arbitration shall be shared equally by Landlord and Tenant but each party shall be responsible for the costs of its own counsel. Landlord and Tenant agree to, and hereby do, waive any and all rights they or either of them may at any time have to revoke their agreement hereunder to submit to arbitration and to abide by the decision rendered thereunder. The arbitrators shall have no power to modify 'he provisions of this Lease and their judgment is limited accordingly.

XIII. HAZARDOUS MATERIALS

A. Tenant agrees not to use, manufacture, store, dispose or sell, any substance or material (collectively, "Hazardous Material(s)"), identified to be toxic or hazardous according to any applicable federal, state or local statute, law, rule or -regulation, now or hereafter existing, relating to regulation or control of toxic or hazardous substances or materials, including, without limitation, the Resource Conservation and Recovery Act, as amended by the Hazardous and Solid Waste Amendments of 1984, the Comprehensive Environmental Response, Compensation and Liability Act, the Hazardous Materials Transportation Act, the Toxic Substances Control Act, the Federal Insecticide, Fungiscide and Rodenticide Act, as any of the foregoing may have been or may be from time-to-time amended, supplemented or supplanted (collectively, "Environmental Law(s)"), including, without limitation, any asbestos, PCB, radioactive substance, methane, volatile hydrocarbons, industrial solvents, gasoline or petroleum products in, on, under, at or about the Demised Premises (except for the existing fuel oil storage tanks at the Demised Premises which shall be used, operated and maintained at all times in compliance with all Environmental Laws, it being understood, however, that Tenant shall have no obligation to remove any asbestos from the Demised Premises other than visible asbestos as described in Paragraph F of this Article XIII, unless such removal is mandated by Environmental Law.

B. If Tenant receives any written notice of the happening of any event involving the use, spill, discharge, dumping or cleanup of any Hazardous Material in, on, under, at or about the Demised Premises or into the sewer, septic system or waste treatment system servicing the Demised Premises (any such event being hereinafter referred to as "Hazardous Discharge") or of any complaint, order ettation, or notice with regard to such Hazardous Discharge or to air emissions, water discharges, noise emissions or any other environmental, health or safety matter affecting the Demised Premises or Tenant (any of the foregoing being hereinafter referred to as an 'Environmental Complaint') from any person or entity, including, without limitation, the United States Environmental Protection Agency ("EPA"), then Tenant shall give immediate oral and written notice of same to Landlord and Landlord's mortgagee, detailing all relevant facts and circumstances with respect thereto of which Tenant has knowledge.

C. If any Event of Default under Paragraph D of this Article XIII occurs and is continuing, without limiting the foregoing, Landlord shall have the right, but not the obligation, to exercise any of its rights as provided in this Lease with respect to an Event of Default or to enter onto the Demised Premises or to take such actions as may be required by any Governmental Authority to clean up, remove, resolve or minimize the impact of, or otherwise deal with, any Hazardous Discharge or Environmental Complaint upon its receipt of any notice from any Governmental Authority, including, without limitation, the EPA, asserting the happening of a Hazardous Discharge or an Environmental Complaint on or pertaining to the Demised Premises and requiring cleanup or other action to be taken. All costs and expenses incurred by Landlord in the exercise of any such rights, together with interest thereon at the Interest Rate from the date incurred by Landlord until the date repaid by Tenant, shall be deemed to be additional rent hereunder and shall be paid by Tenant to Landlord on demand.

D. The occurrence of the following event shall constitute an Event of Default under this Lease:

If the EPA, or any other local, state or federal agency asserts or creates a lien upon any or all of the Demised Premises by reason of the (a) presence of Hazardous Materials in, on, under, at or about the Demised Premises, (b) occurrence of a Hazardous Discharge, (c) an Environmental Complaint, (d) any violation of any Environmental Law or otherwise; or if the EPA, or any other local, state or federal agency asserts a written claim against Tenant, the Demised Premises or Landlord for damages or cleanup costs related to the presence of Hazardous Material, a Hazardous Discharge or an Environmental Complaint on or pertaining to the Demised Premises; provided, however, such claim or lien shall not constitute a default if, within ten (10) days after Tenant receives written notice of such lien or claim:

(a) Tenant shall commence and shall thereafter pursue with due diligence either: (i)the cure or correction of the event which constitutes the bas is for the claim or lien, and continues with due diligence to pursue such cure or correction to completion, or (ii) proceedings for an injunction, a restraining order or other appropriate proceedings are brought by Tenant with due diligence seeking relief of the matter giving rise to the claim and the relief obtained thereby is not thereafter reversed on appeal; and (b) In either of the foregoing events, Tenant shall have posted any bond, letter of credit or other security required by law satisfactory in form, substance and amount to the agency or entity asserting the claim to secure the proper and complete cure or correction of the event which constitutes the basis for the claim.

E. Tenant hereby agrees to defend, pay, protect, indemnify and hold Landlord, or any partner, officer, director, trustee or shareholder of Landlord, and any mortgagee with respect to the Demised Premises, harmless from and against any and all claims (including, without limitation, wrongful death actions and third party claims, but excluding claims for consequential damages) losses, liabilities, damages, costs and expenses (including, without limitation, causes of actions, suits, claims, demands, judgments, cleanup costs and reasonable attorneys' fees and disbursements) arising directly or indirectly from, out of or by reason of the presence of any Hazardous Material in, on, under, at or about the Demised Premises or any Hazardous Discharge in, on, under, at or about the Demised Premises, or any Environmental Complaint related to the Demised Premises or due to a violation of any Environmental Law with respect to Tenant or the Demised Premises or as a result of Tenant's failure to comply with the provisions of this Article XIII occurring either (i) during or attributable to the period prior, to the expiration or sooner termination of this Lease and any other period of possession of the Demised Premises by Tenant or any affiliate of Tenant, or (ii) by reason of or attributable to Tenant's operations in, on, under, at or about the Demised Premises.

F. In addition to its obligations set forth in this Article, Tenant shall, on or before the first anniversary date hereof, remove any exposed asbestos in, on, under or about the Demised Premises. Such removal shall be accomplished in accordance and compliance with all Environmental Laws. In the event of Tenant's failure to comply with the foregoing obligations in addition to all other remedies of Landlord hereunder, Landlord shall have the right to apply the proceeds of the "Deposit" described in Article XXXIX hereof) to pay for the cost of the removal and compliance and in the event the cost thereof, shall not exceed the Deposit, the balance shall be said to Landlord additional rent within five days after demand.

G. The provisions of this Article shall survive the expiration or sooner termination of this Lease with respect to the obligations and liabilities of Tenant hereunder, actual contingent, which have arisen an or prior to such expiration sooner termination.

XIV. FIRE AND OTHER CASUALTY

A. If the improvements, or any part thereof, shall be damaged or destroyed by fire, the elements or other casualty during the term of this Lease, then Tenant shall give prompt. notice thereof to Landlord, and Tenant shall promptly thereafter repair or restore the Improvements to substantially the same condition, to the extent permitted by applicable law, they were in immediately prior to the casualty, and notwithstanding any contrary law, Rent shall not be suspended, abated or reduced as a result thereof. All insurance proceeds recovered on account of any damage or destruction by fire, the elements or other casualty shall be made available for the payment of the cost of the aforesaid repair or restoration. If the amount of said insurance proceeds plus the amount of any deductible applicable to said damage or destruction shall be less than One Hundred Thousand ($100,000.00) Dollars, said insurance proceeds shall be paid over to Tenant. I.' the amount of said insurance proceeds plus the amount of any deductible applicable to said damage or destruction shall be less than One Hundred Thousand ($100,000.00) Dollars, said insurance proceeds shall be paid over to Tenant. If the amount of said insurance proceeds plus the amount of any deductible applicable to said damage or destruction shall be One Hundred Thousand ($100,000.00) Dollars or more, said insurance proceeds shall be paid to any bank or trust company in Kansas City, Missouri, designated by Landlord and shall be held in trust and shall be disbursed to Tenant, upon joint signatures of Landlord and Tenant, as the work of repair or restoration progresses upon certificates of the architect or engineer supervising the repair or restoration that the disbursements then requested, plus all previous disbursements made from said insurance proceeds, plus the amount of said deductible, do not exceed the cost of the repair or restoration already completed and paid for, and that the balance being held by Landlord is sufficient to pay for the estimated cost of completing the repair and restoration. All amounts held by such bank or trust company pursuant to the preceding sentence or by Landlord's mortgagee, as provided below, shall be invested in an interest bearing account until disbursed as provided in this Paragraph Al and the interest on such funds shall be added to the proceeds of such insurance for disbursement in accordance with the provisions of this Paragraph A. if the insurance proceeds shall be less than the cost of repair or restoration, Tenant shall pay the excess cost prior to the disbursement of any insurance proceeds. If the insurance proceeds shall be greater than the cost of repair or restoration, the excess shall be paid to Tenant. All repairs and restoration shall be completed in accordance with Article VIII hereof. If Landlord's first mortgagee shall be a bank, insurance company or other recognized institutional lender, such mortgagee may hold any insurance proceeds which would otherwise be paid to the aforementioned bank or trust company and such proceeds shall be disbursed by such mortgagee as the repair and restoration work progresses upon its receipt of the certificates described above.

B. In the event of damage or destruction during the second to last year of the Lease Term, the repair and restoration of which (as estimated and certified to by an architect or engineer designated by Tenant and reasonably approved by Landlord) would cost in excess of 75% of the replacement value of the Building, or in the event of damage or destruction during the last year of the Lease Term hereof, the repair and restoration of which (as estimated and certified to by an architect or engineer designated by Tenant and reasonably approved by Landlord) would cost in excess of 25% of the replacement value of the Building, Landlord or Tenant, upon written notice to the other given within thirty (30) days of such damage or destruction and the determination by the architect or engineer of the replacement value, as aforesaid, may terminate this Lease by serving upon the other at any time within said thirty (30) day period a ten (10) day written notice of its election to so terminate (but a sixty (60) day written notice shall be required in case of Landlord's election to terminate pursuant to this Paragraph B), provided that any and all insurance proceeds received by Tenant in connection therewith and the right to receive all insurance proceeds not previously paid by any insurance company insuring the Demised Premises shall be paid to and assigned to Landlord; and, subject to the following sentence, if such notice is given and such payment and assignment are made, this Lease shall cease and terminate and come to an end on the date specified in said notice as if said date were the date originally mentioned in this Lease for the expiration hereof. Notwithstanding the foregoing, Tenant shall not have the right to terminate this Lease if any damage or destruction is caused by an uninsured casualty, or if Tenant fails to maintain the insurance required hereunder, or if Landlord is unable (other than by reason of its own acts), for any reason whatsoever, to collect all insurance proceeds which would otherwise be payable by Tenant's insurance carriers in connection with such damage or destruction (unless Tenant makes Landlord whole by paying any such shortfall).

XV. CONDEMNATION

A. Tenant hereby irrevocably assigns to Landlord any award or payment to which Tenant may be or become entitled by reason of any taking of the Demised Premises, or any part thereof ("Compensation"), in or by condemnation or other eminent domain proceedings pursuant to any law, general or special, by any governmental authority, civil or military ("Condemnation"), whether the same shall be paid or payable in respect of Tenant's leasehold interest hereunder or otherwise, but nothing in this Lease shall impair Tenant's right to any award or payment an account of Tenant's trade fixtures, equipment and moving expenses, if available, to the extent Tenant shall have a right to make a separate claim therefor against the appropriate governmental authority, but in no event shall any such separate claim be based upon the value of Tenant's leasehold interest and in no event shall any such claim reduce the award which would otherwise be made to Landlord. Tenant agrees to execute any and all documents that may be required in order to facilitate collection by Landlord of any and all such awards. Landlord, and only Landlord may appear in any such proceeding or action to negotiate, prosecute and adjust any claim for any Compensation, and Landlord shall collect any such Compensation. Landlord shall pay all costs and expenses in connection with each such proceeding, action, negotiations prosecution and adjustment, for which costs and expenses Landlord shall be reimbursed out of any Compensation received. All Compensation shall be applied pursuant to this subparagraph A, and all such Compensation (less the expense of collecting such Compensation) is herein called the "Net Proceeds." Notwithstanding the foregoing, it is understood that any award paid on account of Tenant's trade fixtures, equipment and moving expenses or any award for a temporary taking of the Demised Premises shall be paid exclusively to Tenant.

B. If all or substantially all of the Land or Improvements shall be taken in or by condemnation or other eminent domain proceedings pursuant to any law, general or special, then this Lease shall terminate on the day preceding the date of the vesting of title to the Demised Premises or portion thereof in the condemning authority and Rent and additional rent shall be paid to the date of such termination.

C. If a Condemnation shall affect at least 50% of the Demised Premises and, in Tenant's reasonable judgment shall render the Demised Premises unsuitable for restoration for continued use and occupancy of Tenant, then Tenant shall, not later than thirty (30) days after such Condemnation, deliver to Landlord (i) notice of its intention to terminate this Lease on the next rental payment date (the "Condemnation Termination Date") which occurs not less than ninety (90) days after the delivery of such notice, (ii) a certificate of an authorized officer of Tenant describing the event giving rise to such termination, and (iii) an irrevocable offer by Tenant to Landlord to purchase on 'the Condemnation Termination Date any remaining portion of the Premises and the Net Proceeds, if any, payable in connection with such Condemnation (or the right to receive the same when made, if payment thereof has not yet been made), at a price equal to ten times the then annual Rent payable hereunder. In the event that Tenant exercises the right to terminate the lease provided in this paragraph C, then, in such event, notwithstanding anything to the contrary contained in Paragraph A above, Tenant shall have the right to participate in any condemnation proceeding in connection with such Condemnation. If Landlord shall reject such offer by notice given to Tenant not later than fifteen (15) days prior to the Condemnation Termination Date, this Lease shall terminate an the Condemnation Termination Date, except with respect to obligations and liabilities of Tenant hereunder, actual or contingent, which have arisen on or prior to the Condemnation Termination Date, upon payment by Tenant of all Rent, additional rent and other sums then due and payable hereunder to and including the Condemnation Termination Date and the Net Proceeds shall belong to Landlord. Unless Landlord shall have rejected such offer in accordance with this subparagraph, Landlord shall be conclusively considered to have accepted such offer, and, on the Condemnation Termination Date, there shall be conveyed to Tenant or its designee the remaining portion of the Demised Premises, if any, and there shall be paid and assigned to Tenant or its designee all its interest in the Net Proceeds, pursuant to and upon compliance with subparagraph D below.

D. (i) If Tenant shall purchase the Demised Premises pursuant to subparagraph C hereof, Landlord shall convey or cause to be conveyed title thereto by special warranty deed, free of any mortgage imposed by Landlord and subject only to this Lease, the lien of any taxes, exceptions set forth in the title policy delivered to Landlord on even date, exceptions created or consented to or existing by reason of actions by Tenant, and all Legal Requirements.

(ii) Upon the date fixed for any purchase of the Demised Premises by Tenant to subparagraph C of this Lease, Tenant shall pay to Landlord the purchase price therefore specified herein in immediately available funds, together with all Rent, additional rent and other sums then due and payable hereunder to and including such date of purchase and there shall be delivered to Tenant a deed or other conveyance of the interests in the Demised Premises then being sold to Tenant and any other instruments necessary to convey the title thereto described in subparagraph (i) and to assign any other property then required to be assigned by Landlord pursuant hereto.

(iii) There shall be no adjustments at closing except that Tenant shall pay all prepayment premiums or penalties charged by any mortgagee of Landlord. Tenant shall pay all charges incident to such conveyance and assignment, including, without limitation, reasonable attorneys, fees and disbursements, recording fees, title insurance premiums and all applicable transfer taxes (not including any income, capital gain or franchise taxes of Landlord) which may be imposed by reason of such conveyance and other instruments. Upon the completion of any purchase of the entire Demised Premises (but not of any lesser interest than the entire Demised Premises) but not prior thereto (whether or not any delay or failure in the completion of such purchase shall be the fault of Landlord), this Lease shall terminate, except with respect to obligations and liabilities of Tenant hereunder actual or contingent, which have arisen on or prior to such completion of purchase.

E. If (i) less than 50% of the Demised Premises shall be taken in or by condemnation or other eminent domain proceedings pursuant to any law, general or special, or (ii) the use or occupancy of the Demised Premises or any part thereof shall be temporarily requisitioned by any governmental authority, civil or military, then this Lease shall continue in full force and effect without abatement or reduction of Rent, additional rent or other sums payable by Tenant hereunder, notwithstanding such taking or requisition. In such event, Tenant shall promptly after any such taking or requisition and, at its sole cost and expense, repair any damage caused by any such taking or requisition in conformity with the provisions of Article VIII of this Lease so that, after the completion of such repair, the Demised Premises shall be, as nearly as possible, in a condition as good as the condition thereof immediately prior to such taking or requisition, except for ordinary wear and tear. In the event of any such lesser taking in or by condemnation or other eminent domain proceedings, Landlord shall promptly make payments to Tenant out of the Net Proceeds (which shall be held in trust for such purpose), and such payments shall be made in the same manner in which fire insurance proceeds are to be disbursed to Tenant pursuant to the provisions of Article XIV hereof. If there shall be any Net Proceeds remaining after the final payment has been made for such repair work, they shall be retained by Landlord.

F. For purposes of this Lease, all amounts paid pursuant to any agreement with any condemning authority which has been made in settlement of any condemnation or other eminent domain proceeding affecting the Demised Premises shall be deemed to constitute an award made in such proceeding.

XVI. <u>SUBLETTING AND ASSIGNMENT</u>

A. Subject to the provisions of Paragraph F of this Article XVI and the other terms and conditions of this Article XVI, Tenant shall have the right to assign this Lease (in whole, but not in part), or sublet the Demised Premises (in whole or in part) without the consent of Landlord, provided that in the case of a subletting, no subletting shall be for a term ending later than one day prior to the expiration date of the Lease Term, subject, however, to the provisions of Paragraph D of Article III hereof. Landlord shall have the right to collect and enjoy all rents and other sums of money payable under any sublease of the Demised Premises following the occurrence of any Event of Default, and Tenant hereby assigns such rents and money to Landlord, such assignment to be effective upon the occurrence of any Event of Default.

B. If this Lease be assigned or transferred in violation of the terms of this Lease, Landlord may, after default by Tenant, collect rent from the assignee or transferee, and apply the net amount collected to the Rent, but no such assignment or collection shall be deemed a waiver of any agreement, term, covenant or condition hereof (except that to the extent Rent or additional rent has been collected under the sublease, Tenant shall be entitled to a credit against any Rent or additional rent due and payable by Tenant hereunder), or the acceptance of the assignee or transferee as tenant, or a release of Tenant from the performance or further performance by Tenant of the agreements, terms, covenants and conditions hereof, and Tenant shall continue liable hereunder in accordance with the agreements, terms, covenants and conditions hereof.

C. The merger or consolidation or sale of substantially all the assets of Tenant, shall be deemed an assignment of this Lease and shall be subject to all of the provisions of this Lease with respect to assignments, including, without limitation Paragraph E hereof. There shall be no restriction under this Article XVI applicable to the sale of all or any portion of the stock of Tenant to any third party, and such sale of stock shall not constitute an assignment of this Lease for any purposes under this or any other Article of this Lease.

D. No assignment made shall be effective until there shall have been delivered to Landlord an executed counterpart of such assignment containing an agreement, in recordable form, executed by the assignor and the proposed assignee, wherein and whereby such assignee assumes due performance of the obligations an the assignor's part to be performed under this Lease from and after the effective date of the assignment to the end of the Lease Term. In no event shall any such assignment relieve Tenant of its obligations hereunder.

E. It shall be a condition precedent to the merger of Tenant into another corporation or to the consolidation of the Tenant with one or more other corporations that the surviving entity or transferee of assets, as the case may be, shall (i) have a minimum net worth at least equal to the net worth of Tenant immediately prior to such merger or consolidation, (ii) deliver to Landlord a certified financial statement evidencing the requirements set forth in the foregoing subsection (i), and (iii) deliver to Landlord an acknowledged instrument in recordable form assuming all obligations, covenants and responsibilities of Tenant hereunder; and Tenant covenants that it will not merge or consolidate or sell or otherwise dispose of all or substantially all of its assets unless the foregoing requirements are met and such statement and instrument shall have been so delivered.

F. No sublease shall be effective unless Tenant within ten (10) days after the execution of any sublease, shall deliver one fully executed original sublease to Landlord. Each sublease shall provide that it is subject and subordinate to this Lease and to the matters to which this Lease is or shall be subordinate and that in the event of any termination, re-entry or dispossess by Landlord under 'his Lease, Landlord, at its option may take over all of the right, title and interest of Tenant, as sublessor, under such sublease and such subtenant, at Landlord's option, shall attorn to Landlord pursuant to the then executory provisions of such sublease, except that Landlord shall not (a) be liable for any previous act or omission of Tenant under such sublease, (b) be subject to any offset not expressly provided in such sublease or which theretofore accrued to such subtenant against Tenant, (c) be bound by any previous or prepayment of more than one month's rent, or (d) be responsible for the repayment of security deposits not delivered to Landlord.

G. Each subletting shall be subject to all the covenants, agreements, terms, provisions and conditions contained in this Lease. Notwithstanding any such subletting to any subtenant and/or acceptance of rent or additional rent by Landlord from any subtenant, Tenant shall and will remain fully liable for the payment of rent, and additional rent due and to become due hereunder and for the performance of all the covenants, agreements, terms, provisions and conditions contained in this Lease on the part of Tenant to be performed and all acts and omissions of any licensee or subtenant or anyone claiming under or through any subtenant which shall be in violation of any of the obligations of this Lease, shall be deemed to be a violation by Tenant.

H. It is understood and agreed that if Tenant should sublease all of the Demised Premises to one or two subtenants, then, upon request of Tenant, and provided the conditions set forth in Paragraph I below are satisfied, Landlord, within ten (10) business days after request therefor, shall enter into an agreement with such subtenants, substantially to the effect that in the event of any default proceeding against Tenant (i) Landlord will not make such subtenant a party defendant to such action, nor disturb its possession under its sublease so long as there shall be no default continuing by said subtenant under its sublease (after the expiration of applicable grace periods, if such Recognition continue in full Landlord and the covenants as are shall not (i) be Tenant under the any), and (ii) such subtenant shall be recognized by Landlord as a direct tenant pursuant to such subtenant's sublease as if Landlord had executed such sublease as sublessor thereof; provided, however, that any such subtenant shall attorn to Landlord (any such agreement, or any agreement of similar import, being referred to in this Lease as a "Recognition Agreement"). Any Agreement shall provide that the sublease shall force and effect as a direct lease between subtenant upon all of the terms, conditions, and set forth in the sublease, except that Landlord liable for any previous act or omission of sublease; (ii) be subject to any offset not expressly provided for in the sublease, which theretofore shall have accrued to the subtenant against Tenant; (iii) be obligated to perform any work; (iv) be bound by any previous modification of the sublease or by any previous prepayment of more than one month's rent, or additional rent, unless such modification or prepayment shall have been expressly approved in writing by Landlord; or (v) be obligated to repair the sublet space or the Improvements, or any part thereof, in the event of any casualty or in the event of partial condemnation. In connection with any Recognition Agreement, Tenant agrees to pay to Landlord, as additional rent, such reasonable attorney fees and disbursements as are incurred by Landlord in connection with any such Recognition Agreement.

I. Any such Recognition Agreement shall be executed by the Landlord only under the following circumstances:

(a) the rent and additional rent per square foot provided for in such sublease is a fair market rent, but in no event less than the Rent and additional rent per square foot payable hereunder;

(b) the sublease does not provide for any up front lump-sum payment of rent or prepaid rent, and the sublease does provide for regular, equal monthly installments of rent which in any lease year are not less than the rent payable in the previous lease year; and (c) the sublet space consists of one or more full floors of the improvements.

XVII. <u>INDEMNIFICATION</u>

A. Tenant shall protect, indemnify, defend and save Landlord, and any officer, director, shareholder, trustee or partner of Landlord, and any mortgagee (collectively, Indemnified Parties") harmless from and against all liabilities, obligations, claims, damages, penalties, causes of action, costs and expenses (including, without limitation, reasonable attorneys' fees and disbursements) imposed upon or incurred by or asserted against an Indemnified Party by reason of any of the following which occurs prior to the later of the expiration or the earlier termination of the Lease or the abandonment of the Demised Premises as described in Article XVIII(A)(vi); (a) any accident, injury to or death of persons, loss of or damage to property occurring in, on, under, at or about the Demised Premises or connected with the use, condition or occupancy of any part thereof; (b) any use, misuse, act or omission, alteration, maintenance or repair of the Improvements by Tenant, its agents, contractors, licensees, or sublessees; and (c) any failure on the part of Tenant to perform or comply with any of the terms, provisions and conditions of this Lease, including, without limitation, the provisions relating to Legal Requirements and Environmental Laws. Each indemnified Party shall give Tenant prompt notice of any such claim; and Tenant, at its sale cost and expense, shall contest, resist and defend any such claim, action or proceedings asserted or instituted against an Indemnified Party, with counsel of its choice, and may compromise or otherwise dispose of the same as it sees fit.

B. The indemnity set forth in the foregoing Section A shall survive the expiration or earlier termination of this Lease, but only as to matters covered thereby which arose or accrued prior to the later of the expiration or earlier termination of the Lease or the abandonment of the Demised Premises as described in Article XVIII(A)(vi).

XVIII. <u>CONDITIONAL LIMITATIONS; DEFAULT PROVISIONS</u>

A. Each of the following occurrences or acts shall constitute an event of default (an "Event of Default") under this Lease:

(i) If Tenant shall fail to pay any Rent, additional rent or other sum required to be paid by Tenant hereunder and such failure shall continue for ten (10) days after notice to Tenant of such failure; or (ii) If an Event of Default shall occur pursuant to Paragraph D of Article XIII hereof; or (iii) If Tenant shall fail to observe or perform any other provision hereof and such failure shall continue for thirty (30) days after notice to Tenant of such failure (provided, however, that in the case of any such default which cannot be cured solely by the payment of money and cannot with diligence be cured within such thirty (30) day period, If Tenant shall commence promptly to cure the same and thereafter shall prosecute the curing thereof with due diligence, the time within which such default may be cured shall be extended for such period as is reasonably necessary to complete the curing thereof with due diligence; and provided further that any failure to cure within said thirty (30) day period will not (a) subject Landlord or any mortgagee to prosecution for a crime, or (b) subject the Demised Premises, or any part thereof, to being condemned or vacated; or (iv) If Tenant shall make an assignment for the benefit of creditors, or shall file a voluntary petition under any bankruptcy or insolvency law, or an involuntary petition alleging an act of bankruptcy or insolvency shall be filed against Tenant under any bankruptcy or insolvency law, or whenever a petition shall be filed by or against Tenant under the reorganization provisions of the United States Bankruptcy Code or under the provisions of any law of like import, or whenever a petition shall be filed by Tenant under the arrangement provisions of the United States Bankruptcy Code or under the provisions of any law of like import, or whenever a permanent receiver of Tenant or of or for the property of Tenant shall be appointed, and if any of the foregoing events occur and continue without the acquiescence of Tenant for a period of ninety (90) days, or in any other case at any time after the occurrence of any such event; or (v) If any event shall occur or any contingency shall arise whereby this Lease or the estate hereby granted or the unexpired balance of the Lease Term would, by operation of law or otherwise, devolve upon or pass to any person, firm or corporation except as expressly permitted in this Lease; or (vi) If Tenant shall abandon all of the Demised Premises by vacating the Demised Premises and failing to (i) maintain the Demised Premises, (ii) make all repairs thereto, (iii) maintain security and/or (iv) comply with all of the terms, covenants and provisions hereof, '-or a period in excess of thirty (30) days (and the fact that any of Tenant's property remains in, on, under, at or about the Demised Premises, shall not be evidence that Tenant has not abandoned the Demised Premises).

B. If an Event of Default shall have occurred and be continuing, Landlord shall have the right to give Tenant a five (5) day notice of Landlord's termination of this Lease; and upon the fifth (5th) day next succeeding the giving of such notice, this Lease and the estate hereby g ranted shall expire and terminate on such date as fully and completely and with the same effect as if such date were the date herein fixed for the expiration of the Lease Term, all rights of Tenant hereunder shall expire and terminate (Tenant hereby waiving all rights of redemption), but Tenant shall remain liable as hereinafter provided.

C. No expiration or termination of this Lease pursuant to the foregoing Section B, or by operation of law or otherwise, shall relieve Tenant of its liabilities and obligations hereunder, all of which shall survive such expiration or termination.

D. If any Event of Default continues beyond the applicable the following rights grace period, if any, Landlord shall have and remedies, which rights and remedies shall not limit, restrict or otherwise modify any other rights or remedies of Landlord, including, without limitation, those set forth in the foregoing Section B:

(i) Landlord shall have the right, without prejudice to any other right or remedy Landlord might have hereunder or by law or in equity and notwithstanding any forbearance or waiver of any prior default of Tenant hereunder, to re-enter the Demised Premises, to dispossess Tenant and any legal representative of Tenant or other occupants of the Demised Premises whose occupancy is subject and subordinate to this Lease, by a summary proceeding or other appropriate suit, action or proceeding or otherwise, and, at Tenant's expense, to remove, keep and/or dispose of (by sale, donation, destruction or otherwise) for the sole benefit of Landlord, Tenant's effects, all of which shall be deemed abandoned to Landlord and to have, hold and enjoy the Demised Premises and the right to receive all rental and other income of and from the same and Tenant hereby waives the service of notice of intention to re-enter or to institute summary proceedings to that end. No re-entry by Landlord shall be deemed an acceptance of a surrender of this Lease unless Landlord shall otherwise so elect in writing.

(ii) In case of any such re-entry, termination and/or dispossess by summary proceedings or otherwise, (a) the Rent, additional rent, and any and all other sums payable by Tenant hereunder shall become due thereupon and be paid up to the time of such re-entry, dispossess and/or termination, together with expenses as Landlord may incur for legal expenses such reasonable brokerage, and/or keeping attorneys' fees and disbursements, brokerage, and/or keeping or putting the Demised Premises in good order and preparing the same for re-letting; (b) Landlord may re-let the Demised Premises or any part or parts thereof, either in the name of Landlord or otherwise, for a term or terms which may at Landlord's option be less than or exceed the period which would otherwise have constituted the balance of the Lease Term and may grant concessions or free rent; and (c) Tenant or the legal representative of Tenant shall also pay Landlord as liquidated damages, and not as a penalty, for the failure of Tenant to observe and perform said Tenant's covenants herein contained, the amount set forth in Section E hereof. The failure of Landlord to re-let the Demised Premises or any part or parts thereof shall not release or affect Tenant's liability for damages.

(iii) Landlord shall have the right of injunction and the right to invoke any remedy allowed at law or in equity as if re-entry, summary proceedings and other remedies were not her provided for.

(iv) Landlord, if it has not exercised its rights to terminate this Lease under Paragraph B or to re-enter the Demised Premises pursuant to this Paragraph D, may cure the default specified in Section A and may enter upon the Demised Premises to do so. In such case, Landlord may pay, or incur an obligation to pay, any sum of money or perform any other act necessary to accomplish the same. All sums so paid, and obligations so incurred, by Landlord and all necessary costs and expenses incurred by Landlord in connection therewith, together with interest thereon at the Interest Rate from the date so incurred by Landlord until the date repaid by Tenant, shall be deemed to be additional rent under this Lease and shall be paid by Tenant to Landlord upon demand. Such cure by Landlord shall not release Tenant from any future duty or obligation under this Lease.

E. In the event of any termination of this Lease under the provisions of Section B hereof or in the event that Landlord shall re-enter the Demised Premises under the Provisions of Section D hereof, Tenant will pay to Landlord as liquidated damages and not as a penalty, at the election of Landlord, either:

(i) a sum which is equal to the excess, if any, discounted at eight (8%) percent per annum, of (x) the full amount of Rent reserved under this Lease for the balance of the unexpired portion-of the original Term, or a Renewal Term, as applicable and the additional rents and other charges or sums payable by Tenant hereunder which would have been payable had the Lease not so terminated, over (y) the aggregate rental value of the Premises for the same period considered on a net rental basis, such sum to be immediately due in full upon such termination or re-entry; or (ii) a sum which is equal to the aggregate of the Rent reserved under this Lease for the balance of the unexpired portion of the original Term or Renewal Term, as applicable, and the additional rent and other charges or sums payable by Tenant hereunder which would have been payable by Tenant hereunder had this Lease not so terminated, or had Landlord not so re-entered the Demised Premises, payable upon the due dates specified herein following such termination or such re-entry and until the date for the expiration of the Original Term or such Renewal Term, as applicable, as provided herein; provided, however, that if Landlord shall re-let the Demised Premises or any portion thereof during said period, Landlord shall credit Tenant with any rents or other amounts received by Landlord from such re-letting.

If the Demised Premises or any part thereof shall be re-let by Landlord for the un-expired portion of the Lease Term, or any part thereof, before presentation of proof of such damages to any court, commission or tribunal, the amount of rent reserved upon such re-letting shall, prima facie, be the fair and reasonable rental value for the Demise Premises, or part thereof, so re-let during the term of the re-letting.

In computing such liquidated damages under clause (ii), there shall be added to the said deficiencies such reasonable expenses as Landlord may incur in connection with any re-letting, including, without limitation, legal expenses, attorneys' lees and disbursements, brokerage fees and expenses and for keeping or putting the Demised Premises in good order and preparing the same 'or re-letting. Any suit brought to collect the amount of the Deficiency for any period shall not prejudice in any way a proceeding for any other period with respect to a deficiency. Landlord, at Landlord's option, may make such alterations repairs, replacements and/or decorations in the Demised Premises and advertise the same, as Landlord, in Landlord's reasonable - judgment, considers advisable or necessary for the purpose of re-letting the Demised Premises or any par'- thereof; and the making of such alterations and/or decorations, or any other action by Landlord (except a written release executed and acknowledged by Landlord) shall not operate or be construed to release Tenant from liability hereunder as aforesaid. Landlord shall not be obligated to re-let or attempt to re-let the Demised Premises or any part or parts thereof and the failure of Landlord to re-let the Demised Premises or any part or parts thereof or the failure of Landlord to collect any rent due upon any re-letting shall not release or affect Tenant's liability, for such liquidated damages or other damages. Suit or suits for the recovery of such liquidated damages, or any installment thereof, may be brought by Landlord from time to time at its election and nothing contained herein shall be deemed to require Landlord to postpone suit until the date when the Lease Term would have expired if it had not been terminated under the provisions of Section B hereof, or, had Landlord not re-entered the Demised Premises under the provisions of Section D hereof.

F. Nothing herein contained shall be construed as limiting or precluding the recovery by Landlord against Tenant of any sums or damages to which, in addition to the damages specifically set forth in the foregoing Sections, Landlord may lawfully be entitled by reason of the occurrence of any Event of Default hereunder.

G. Mention in this Lease of any particular remedy shall not preclude Landlord from any other remedy, in law or in equity. The specific remedies to which Landlord may resort under the terms of this Lease are cumulative and are not intended to be exclusive of any other remedies or means of redress to which it may be lawfully entitled in case of any breach or threatened breach of any provisions of this Lease; and the exercise by Landlord of any one or more of the rights or remedies provided for in this Lease or now or hereafter existing at law or in equity or by statute or otherwise shall not preclude the simultaneous or later exercise by Landlord of any or all other rights or remedies provided for in this Lease or now or hereafter existing at law or in equity or by statute or otherwise.

XIX. LANDLORD'S RIGHT TO CURE TENANT'S DEFAULT

If Tenant shall default in the payment, performance or observance of any agreement or condition in this Lease contained on its part to be paid, performed or observed and shall not cure such default within ten (10) days after notice from Landlord specifying the default (except that no notice shall be required in an emergency, as reasonably determined by Landlord), or shall not within said period commence to cure such default and thereafter prosecute the curing of such default to completion with due diligence, Landlord may, at its option, at any time thereafter cure such default for the account of Tenant, and any amount said or any contractual liability incurred by Landlord in so doing shall be deemed paid or incurred for the account of Tenant, and Tenant agrees to save Landlord harmless therefrom and to reimburse Landlord in the amount so incurred by Landlord, including all reasonable expenses incurred in connection therewith, including, without limitation, reasonable attorney's fees and disbursements, together with interest on all said amounts at the Interest Rate, from the date(s) incurred by Landlord until the date repaid by Tenant, and all such amounts shall be deemed to be additional rent hereunder, and shall be paid by Tenant to Landlord an demand.

XX. WAIVERS

The failure of Landlord to insist in any one or more cases upon the strict performance of any of the conditions, terms, or covenants of this Lease shall not be construed as a waiver or relinquishment for the future of such or any other covenants, conditions or terms. The receipt by Landlord of any Rent, additional rent or other sum payable hereunder with knowledge of the breach of any covenant or agreement contained in this Lease shall not be deemed a waiver of such breach, and no waiver by Landlord of any provision of this Lease shall be deemed to have been made unless expressed in writing and signed by Landlord. Landlord shall be entitled, to the extent permitted by applicable law, to injunctive relief in case of the violation, or attempted or threatened violation, of any covenant, agreement, condition or provision of this Lease or to a decree compelling performance of any covenant, agreement, condition or provision of this Lease, or to any other remedy allowed to Landlord by law.

XXI. SUBORDINATION

A. This Lease, and the lien hereof, and the rights of Tenant hereunder, are and shall be subject and subordinate in all respects to the lien of all present and future (a) ground leases, master leases, underlying leases, or grants of term of the Land and the Improvements or any portion thereof (collectively, including the applicable items set forth in subsection (c) below "Superior Lease"), (b) mortgages, deeds of trust, building loan agreements, and spreader and consolidation agreements (collectively, including the applicable items set forth in subsection (c) below, "Superior Mortgage"), and (c) all renewals, modifications, replacements, supplements, substitutions and extensions thereof, irrespective of the time of execution or time of recording of any Superior Lease or Superior Mortgage, provided that the holder of any such Superior Lease or Superior Mortgage (being hereinafter respectively referred to as "Superior Lessor" and "Superior Mortgagee") shall enter into a Non-Disturbance and Attornment Agreement with Tenant on terms substantially as set forth in Paragraph B below.

B. Landlord and Tenant agree that the Non-Disturbance and Attornment Agreement referred to in Paragraph A above shall provide that upon the termination of the Superior Lease or foreclosure or the Superior Mortgage, this Lease shall continue in full force and effect as a direct lease between such Superior Lessor or Superior Mortgagee and Tenant in accordance with all of the terms thereof, including, without limitation, then unexercised rights to Renewal Terms and Tenant shall attorn to such Superior Lessor or Superior Mortgagee and this Lease shall continue in full force and effect upon all of the terms of this Lease except that such Superior Mortgagee or Superior Lessor shall not be (a) liable for any previous act or omission or negligence of Landlord under this Lease; (b) subject to any counterclaim, defense or offset, which theretofore shall have accrued to Tenant against Landlord; or (c) bound by any previous modification or amendment of this Lease or by any previous prepayment of more than one month's Rent, unless such modification or prepayment shall have been approved in writing by the Superior Lessor or the Superior Mortgagee, but this clause (c) shall be operative only if Tenant shall have been furnished with the name and address of the Superior Lessor or Superior Mortgagee before such prepayment or modification is made.

XXII. EXCULPATION

A. Neither Landlord, nor any partner, trustee, shareholder, officer or director of Landlord shall have any personal liability under this Lease. Tenant shall look only to Landlord's estate in the Demised Premises for the satisfaction of Tenant's remedies for the collection of a judgment (or other judicial process) requiring the payment of money by Landlord in the event of any default by Landlord hereunder, and no other property or assets of Landlord or its shareholders, trustees, partners or principals, disclosed or undisclosed, or its officers or directors, shall be subject to levy, execution or other enforcement procedure for the satisfaction of Tenant's remedies under or with respect to this Lease, the relationship of Landlord and Tenant hereunder or Tenant's use or occupancy of the Demised Premises.

B. The term "Landlord" shall mean only the owner at the time in question of the Demised Premises, or of a lease of the Demised Premises, so that in the event of any transfer or transfers of title to the Demised Premises, or of Landlord's interest in a lease of the Demised Premises, the transferor shall be and hereby is relieved and free of all obligations of Landlord under this Lease accruing from and after the date of such transfer, and it shall be deemed, without further agreement, that such transferee has assumed and agreed to perform and observe all of the obligations of Landlord set forth herein during the period it is the holder of Landlord's interest under this Lease; provided, however, that any such Landlord transferor shall continue to be responsible to Tenant for matters arising prior to the transfer of this Lease to the extent of any sole proceeds received by any such Landlord transferor either as a result of a sale of the Demised Premises or an assignment of the Lease.

C. If in this Lease it is provided that Landlord's consent or approval as to any matter will not be unreasonably withheld, and it is established by a court or body having final jurisdiction thereover that Landlord-has been unreasonable, the only effect of such finding shall be that Landlord shall be deemed to have given its consent or approval; but Landlord shall not be liable to Tenant in any respect for money damages by reason of withholding its consent.

XXIII. <u>DELAYS</u>

In any case where Tenant is required to do any act (other than make a payment of money), delays caused by or resulting from Acts of God, war, civil commotion, fire or other casualty, labor difficulties, general shortages of labor, materials or equipment, government regulations or other causes beyond Tenant's reasonable control shall not be counted in determining the time when the performance of such act must be commenced and/or completed, whether such time be designated by a fixed time, a fixed period of time or a "reasonable time".

XXIV. <u>BROKERS</u>

A. Each of Landlord and Tenant represents that it has, dealt with no real estate broker in connection with this transaction other than J. Scott Harrison of J. Scott Harrison & Co. and Ted Murray of PCA Realty Corporation (collectively, the "Broker") and Tenant shall pay any commission of the Broker pursuant to a separate agreement. Tenant hereby indemnities, defends and holds Landlord harmless from and against any and all losses, damages,' costs (including reasonable attorneys, fees and expenses), causes of action, suits or judgments of any nature arising out of any claims or demands asserted by any broker, agent or finder, licensed or otherwise, including, without limitation, the Broker, claiming to have acted on behalf of Tenant in connection with this transaction. Landlord hereby indemnifies, defends and holds Tenant harmless from and against any and all losses, damages, costs (including reasonable attorneys, fees and expenses), causes of action, suits or judgments of any nature arising out of any claims or demands asserted by any broker, agent, or finder, licensed or otherwise, other than the Broker, claiming to have acted on behalf of Landlord in connection with this transaction.

B. The provisions of this Article XXIV shall survive the expiration or sooner termination of this Lease.

XXV. LANDLORD'S RIGHT TO INSPECT

Landlord or Landlord's agents shall have the right to enter the Demised Premises at all reasonable times, upon one days prior notice, except in an emergency, to inspect or examine the same (including environmental inspections), to show them to prospective purchasers, mortgagees or, during the last twenty four months of the term hereof or after an Event of Default of Tenant hereunder, lessees of the Demised Premises, and to make such repairs, alterations, improvements or additions as Landlord may elect to perform following Tenant's failure to make repairs or perform any work which Tenant is obligated to perform under this Lease and the elapsing of any grace period after notice as provided for herein and Landlord shall be allowed to take all material into and upon the Demised Premises that may be required therefor without the same constituting an eviction or constructive eviction of Tenant in whole or in part and the Rent shall in no wise abate while said decorations, repairs, alterations, improvements, or additions are being made. Except in an emergency, Tenant and Landlord shall not enter any area which Tenant reasonably designates as a security area where Tenant stores, or which contains valuable or proprietary items, without being accompanied by a representative of Tenant, unless such representative is not made available after request by Landlord. Nothing herein contained, however, shall be deemed or construed to impose upon Landlord any obligation, responsibility or liability whatsoever, for the care, supervision or repair of the Demised Premises or any part thereof.

XXVI. ESTOPPEL CERTIFICATES

Landlord or Tenant, promptly upon request of the other (or sublessee hereunder, in the case of Landlord), shall execute, acknowledge and deliver to the other (or any sublessee hereunder, in the case of Landlord), a certificate of Landlord or Tenant, as the case may be, certifying (a) that the copy of this Lease which is annexed to such certificate is a true and correct copy of same, is unmodified and In full force and effect (or, if there have been modifications, that this Lease is in full force and effect, as modified, and stating the date of each instrument so modifying this Lease), (b) the dates to which Rent and Taxes due hereunder have been paid, and (c) whether, to the best knowledge of each signer, any default exists hereunder (or, in the case of a request by any sublessee, under the applicable sublease) and, if any such default exists, specifying the nature and period of existence thereof and what action Landlord or Tenant, as the case may be, is taking or proposes to take with respect thereto and whether notice thereof has been given to the other party. Any certificate required under this Article may be relied upon by a prospective purchaser, mortgagee or other transferee of Landlord's or (subject to the provisions of Article XVI) Tenant's interest under this Lease.

XXVII. FEES AND EXPENSES

Tenant covenants and agrees that in case Landlord shall be made a party to any litigation commenced against Tenant, then Tenant shall pay all expenses, costs and reasonable attorneys, fees and disbursements incurred by or imposed on Landlord by or i-n connection with such litigation, and Tenant shall also pay all costs, expenses and reasonable attorneys, fees and disbursements which may be incurred or paid by Landlord in any successful action (which shall include a settlement of any action in which Landlord receives a benefit) to enforce the covenants and agreements of this Lease, and all such expenses, costs and reasonable attorneys, fees and disbursements when paid by Landlord shall become at once a valid lien upon the improvements at any time situated on or in the Demised Premises and upon the leasehold estate hereby created, and shall be paid as additional rent hereunder, together with interest thereon at the Interest Rate from the date of payment by Landlord until the date repaid by Tenant, and shall be paid by Tenant to Landlord on demand.

XXVIII. RENT CONTROL

If at any time or times during the Lease Term the Rent and/or additional rent reserved in this Lease shall not be fully collectible by reason of any legal requirement ("Rent Control Law"), then Tenant shall enter into such agreement(s) and take such other steps as Landlord may legally request to enable Landlord to collect the maximum rents which may, from time to time during the continuance of such legal rent restriction, be legally permissible (but not in excess of the amounts reserved under this Lease). Upon the termination of such legal rent restriction, (a) the rents shall become and thereafter be payable in accordance with the amounts reserved herein for the periods following such termination and (b) Tenant shall pay to Landlord, to the maximum extent legally permissible, an amount equal to (i) the rents which would have been paid pursuant to this Lease but for such legal rent restriction less (ii) the rents and payments in lieu of rents paid by Tenant during the period such legal restriction was in effect. Further, and notwithstanding anything contained in this Lease to the contrary, if any Rent Control Law is in effect either (a) at the time Tenant exercises its right to renew the Original Term or any Renewal Term of this Lease or (b) on the last day of the then Lease Term, then Tenant's exercise of its renewal right shall not be effective if Landlord is unable to collect the Rent in accordance with Article IV hereof on account o-f such Rent Control Law and, in such event, this Lease shall terminate at the expiration of the then current Lease Term as if the renewal right had not been exercised. The foregoing notwithstanding, Tenant shall have the right to exercise its renewal right if Tenant agrees to pay to Landlord an amount equivalent to the Rent and additional rent which would be due during such Renewal Term and Landlord agrees to cooperate with Tenant in agreeing upon such alternative method of payment.

XXIX. <u>NO MERGER OF TITLE</u>

There shall be no merger of this Lease or the leasehold estate created by this Lease with any other estate or interest in the Demised Premises or any part thereof by reason of the fact that the same person, firm, corporation or other entity may acquire or own or hold, directly or indirectly (a) this Lease or the leasehold estate created by this Lease or any interest in this Lease or in any such leasehold estate, and (b) any such other estate or interest in the Demised Premises or any part thereof, and no such merger shall occur unless and until all persons, firms, corporations, and other entities having an interest (including a security interest) in (i) this Lease or the leasehold estate created by this Lease and (ii) any such other estate or interest in the Demised Premises or any part thereof, shall join in a written instrument effecting such merger and shall duly record the same.

XXX. <u>SURRENDER; HOLDING OVER</u>

A. Tenant shall surrender the Demised Premises to Landlord upon the expiration or sooner termination of this Lease, vacant and broom clean and in at least the condition as same had been upon the execution and delivery hereof, reasonable wear and tear excepted and subject to any damage by fire or other casualty or condemnation which Tenant is not required to repair under Articles XIV and XV of this Lease or which repair is not completed prior to the expiration or termination of this Lease. Tenant acknowledges that possession of the Demised Premises must be surrendered to Landlord at the expiration or sooner termination of this Lease. Tenant agrees to indemnify and save Landlord harmless from and against all cost, claim, loss or liability resulting from delay by Tenant in so surrendering the Demised Premises, including, without limitation, any claims made by any succeeding Tenant founded on such delay. The parties recognize and agree that the damage to Landlord resulting from any failure by Tenant to timely surrender possession of the Demised Premises as aforesaid may be extremely substantial, may exceed the amount of Rent and additional rent theretofore payable hereunder, and will be impossible to accurately measure. Tenant therefore agrees that if possession of the Demised Premises is not surrendered to Landlord within 24 hours after the date of the expiration or sooner termination of the this Lease, Tenant shall pay to Landlord for each month and for each portion of any month during which Tenant holds over in the Premises after the expiration or sooner termination of this Lease, a sum equal to three (3) times the aggregate of that portion of the annual Rent which was payable under this Lease during the last month of the Lease Term. In the event of any holding over, Tenant shall also pay any additional rent which would have been payable under the terms of the Lease attributable to any such period of holding over, including Taxes. Nothing herein contained shall be deemed to permit Tenant to retain possession of the Demised Premises after the expiration or sooner termination of this Lease. The aforesaid provisions of this Section shall survive the expiration or sooner termination of this Lease.

B. If Tenant or anyone claiming under Tenant shall remain in possession of the Demised Premises or any part thereof after the expiration of the Lease Term without any agreement in writing between Landlord and Tenant with respect thereto, prior to acceptance of rent by Landlord, the person remaining in possession shall be deemed a Tenant at sufferance; and after acceptance of rent by Landlord, the person remaining in possession shall be deemed a Tenant from month to month subject to the provisions of this Lease insofar as the same may be made applicable to a tenancy from month to month. The aforesaid provisions of this Section shall survive the expiration or sooner termination of this Lease.

XXXI. NOTICES

Any notice and other communication given pursuant to the provisions of this Lease shall be in writing and shall be given by delivery by a nationally recognized courier service such as Federal Express, and except as may be expressly otherwise provided in this Lease, any such notice or other communication, shall be deemed given when so delivered to the addressee thereof or rejected by the addressee. If sent to Landlord, the same shall be delivered to Landlord, c/o Realty Holdings of America, 1370 Avenue of the Americas, 33rd Floor, New York, New York 10019, Attn: Mr. Sanford Herrick; with a copy to Proskauer, Rose, Goetz & Mendelsohn, 300 Park Avenue, New York, New York 10022, Attn: Herbert T. Weinstein, Esq.; and if sent to Tenant the same shall be delivered at 4900 Oak Street, Kansas City, Missouri 64112; with a copy to Paul, Weiss, Rifkind, Wharton & Garrison, 1285 Avenue of the Americas, New York, New York 10019, Attn: Walter F. Leinbardt, Esq. Either party may change its address for notices by giving notice of such change to the other party by notice given in the manner herein provided.

XXXII. QUIET ENJOYMENT

Upon Tenant's paying the Rent, additional rent and all other sums payable by Tenant hereunder and performing and observing all of the other agreements and conditions on its part to be performed and observed hereunder, Tenant shall and may peaceably and quietly have, hold and enjoy the Demised Premises and all rights of Tenant hereunder during the Lease Term without any manner of hindrance or molestation by Landlord, or anyone claiming by, through or under Landlord.

XXXIII. AFFIRMATIVE WAIVERS

A. Tenant an behalf of itself and any and all persons claiming through or under Tenant, does hereby waive and surrender all right and privilege which it, they or any of them might have under or by reason of any present or future law, to redeem the Demised Premises or to have a continuance of this Lease after being dispossessed or ejected therefrom by process of law or under the terms of this Lease or after the termination of this Lease as provided in this Lease.

B. If Tenant is in arrears in payment of Rent or additional rent, Tenant waives Tenant's right, if any, to designate the items to which any payments made by Tenant are to be credited, and Tenant agrees that Landlord may apply any payments made by Tenant to such items as Landlord sees fit, irrespective of and notwithstanding any designation or request by Tenant as to items to which any such payment shall be credited.

C. Landlord and Tenant each hereby waives trial by jury in any action, proceeding or counterclaim brought by either against the other on any matter whatsoever arising out of or in any way connected with this Lease, the relationship of Landlord and Tenant, Tenant's use or occupancy of the Demised Premises, including, without limitation, any claim of injury or damage, and any emergency and other statutory remedy with respect thereto.

D. Tenant shall not interpose any counterclaim of any kind in any action or proceeding commenced by Landlord to recover possession of the Demised Premises or for non-payment other than counterclaims which, if not asserted, would be waived.

XXXIV. INTERPRETATION

It is agreed that if any provision of this Lease or the application of any provision to any person or any circumstance shall be determined to be invalid or unenforceable, then such determination shall not affect any other provisions of this Lease or the application of said provision to any other person or circumstance, all of which other provisions shall remain in full force and effect. This Lease shall be construed without regard to any presumption or other rule requiring constriction against the party who caused this Lease to be drafted.

XXXV. NO REPRESENTATIONS OR MODIFICATIONS

Landlord and Tenant expressly acknowledge and agree that neither has made and is not making, and neither, in executing and delivering this Lease, is relying upon, any warranties, representations, promises or statements of the other, except to the extent that the same are expressly set forth in this Lease. All understandings and agreements heretofore had between the parties are merged in this Lease, which alone fully and completely expresses the agreement of the parties and which is entered into after full investigation, neither party relying upon any statement or representation not embodied in this Lease. This Lease shall not be modified in any way except by a writing subscribed by both parties.

XXXVI. RECORDING

Landlord and Tenant agree that a memorandum or notice of this Lease in the form annexed hereto and made a part hereof as Schedule B shall be executed at the time of the execution of this Lease and may be recorded by either party at Tenant's expense.

XXXVII. HEADINGS

The headings of the various Articles and Schedules of this Lease are used only as a matter of convenience, and for reference, and are not to be considered a part of this Lease or to be used in determining or construing the intent of the parties to this Lease.

XXXVIII. SUCCESSORS AND ASSIGNS

The agreements and conditions in this Lease contained on the part of Landlord to be performed and observed shall be binding upon Landlord and its heirs, legal representatives, successors and assigns, and shall ensure to the benefit of Tenant and its heirs, legal representatives, successors and permitted assigns; and the agreements and conditions on the part of Tenant to be performed and observed shall be binding upon Tenant and its heirs, legal representatives, successors and permitted assigns and shall ensure to the benefit of Landlord and its heirs, legal representatives, successors, and assigns.

XXXIX. ESCROW

A. Proskauer, Rose, Goetz & Mendelsohn shall be the escrow agent ("Escrow Agent") hereunder. The Escrow Agent shall perform the functions of Escrow Agent in accordance with the provisions of this Article.

B. Simultaneously with the execution and delivery hereof, Tenant shall deposit the sum of Ninety-four Thousand Six Hundred Dollars ($94,600) (the "Deposit") in escrow with the Escrow Agent, which deposit shall be held and disbursed by the Escrow Agent in accordance with this Lease and the following additional provisions:

(a) The Deposit shall be held in an interest bearing account, interest to follow the principal.

(b) The Deposit shall be disbursed to Landlord upon notice to the Escrow Agent from Landlord that Tenant has not complied with its obligations under Article XIII(F) hereof, and that Landlord has incurred expenses as provided in said Article XIII(F) without the necessity for any further authorization or documentation.

(c) The Deposit shall be disbursed to Tenant upon notice to the Escrow Agent from Tenant, given not earlier than the first anniversary date of this Lease, that Tenant has complied with its obligations under Article XIII(F) hereof.

(d) If the Escrow Agent shall receive a written notice signed by both Landlord and Tenant authorizing and directing delivery of the Deposit, then the Escrow Agent shall deliver the Deposit to the authorized recipient.

(e) If the Escrow Agent shall receive a written notice from Landlord or Tenant as set forth in subparagraphs (b) and (c) above, claiming that the party delivering such notice is entitled to the Deposit, the Escrow Agent shall promptly deliver written notice ("Escrow Agent's Notice") thereof to the other party, and unless such other party shall have delivered a written notice of objection to the Escrow Agent within ten (10) days after receipt by such other party of the Escrow Agent's Notice, the Escrow Agent shall deliver the Deposit to the party initially requesting it.

(f) If (i) the Escrow Agent shall have received a notice of objection as provided for in subparagraph (e) above within the time therein prescribed: or (ii) any disagreement or dispute shall arise between Landlord and Tenant resulting in adverse claims and demands being made for the Deposit, whether a not litigation has been instituted, then, in any such event, at the Escrow Agent's option (x) the Escrow Agent may refuse to comply with any claims or demands on it and continue to hold the Deposit until the Escrow Agent receives written notice signed by Landlord and Tenant directing the disbursement of the Deposit in accordance with said direction, and the Escrow Agent shall not be or become liable in any way or to any persons for its refusal to comply with any claims or demands; or (y) if the Escrow Agent shall receive a written notice advising that a litigation over entitlement to the Deposit has been commenced, the Escrow Agent may deposit the Deposit with the clerk of the court in which said litigation is pending; or (z) the Escrow Agent, upon notice to the parties, may (but shall not be required to) take such affirmative steps as it may, at its option, elect in order to substitute another impartial party to hold the Deposit and to terminate its duties as Escrow Agent, including, but not limited to, the deposit of the Deposit in a court of competent jurisdiction and the commencement of an action of interpleader, the costs and expenses thereof, including, without limitation, reasonable attorney's fees and disbursements to be borne by whichever of Landlord or Tenant is the losing party and thereupon the Escrow Agent shall be released of and from all liability.

C. Upon the taking by the Escrow Agent of any final action permitted by this Article, the Escrow Agent shall be released of and from all liability hereunder except for any gross negligence or willful default. Except as otherwise provided herein, all costs and expenses incurred by the Escrow Agent in performing its duties as the Escrow Agent, including, without limitation, attorneys' fees and disbursements (either paid to retained attorneys or amounts representing the fair value of legal services rendered to or for itself) shall be borne by Tenant except that all such costs and expenses shall be borne by the losing party in any litigation brought in connection with such Deposit.

D. The Escrow Agent acts hereunder as a depositary only and is not responsible or liable in any manner whatsoever for (i) the sufficiency, correctness, genuineness, collection or validity of any instrument deposited with it, (ii) the form of execution of such instruments, (iii) the identity, authority or rights of any person executing or depositing the same, or (iv) the terms and conditions of any instrument pursuant to which the parties may act, except for its gross negligence or willful default.

E. The Escrow Agent shall not have any duties or responsibilities except those set forth in this Article, and shall not incur any liability in acting upon any signature, notice, request, waiver, consent, receipt or other paper or document believed by the Escrow Agent to be genuine, and the Escrow Agent may assume that any person purporting to give it any notice on behalf of any party in accordance with the provisions hereof has been duly authorized to do so, except that this will not relieve the Escrow Agent of liability for its gross negligence or willful default.

F. Notices to and from the Escrow Agent shall be given as provided in Article XXXI hereof and shall be given to Herbert T. Weinstein, Esq. The Escrow Agent is made a signatory to this Lease only for the purpose of agreeing to those provisions relating to it as the Escrow Agent, which provisions hereby constitute an escrow agreement between the parties hereto and the Escrow Agent.

G. The Escrow Agent may resign at any time by giving 30 days' notice of such resignation to Landlord and Tenant. Thereafter, the Escrow Agent shall have no further obligations hereunder except to hold the Escrow Fund as depository. In such event, the Escrow Agent shall not take any action until Landlord and Tenant have jointly appointed a successor Escrow Agent by notice to the Escrow Agent in the manner set forth in Article XXXI hereof. Upon receipt of written notice from Landlord and Tenant, the Escrow Agent shall promptly turn over the Escrow Fund to the successor Escrow Agent. The Escrow Agent shall thereafter have no further obligations hereunder.

H. The Escrow Agent shall perform only the duties expressly set forth herein. No other duties shall be inferred from this Lease, and the Escrow Agent shall not be required to refer to, or examine, any other instrument or document except as specifically provided for in this Article.

I. The Escrow Agent shall be deemed to have no notice of, or duties with respect to, any agreement or agreements (whether or not a copy thereof is delivered to the Escrow Agent), other than as expressly set forth in this Article. The Escrow Agent may disregard any notice to it unless expressly provided for in this Article.

J. The Escrow Agent may consult with counsel (including members and employees of the Escrow Agent) and shall be fully protected with respect to any action taken or omitted by it in good faith on advice of such counsel. The fees and disbursements of such counsel shall be promptly paid by the parties pursuant to the provisions of Paragraph O below. In no event shall the Escrow Agent have any liability under this Lease except for its own willful misconduct or gross negligence.

K. The Escrow Agent shall not be bound by any modification of this Lease, including, without limitation, any modification of this Article; unless such modification is in writing and signed by both Landlord and Tenant, and the Escrow Agent shall have given its prior written consent thereto.

L. The Escrow Agent shall not take any action by reason of any notice given by Landlord or Tenant or by any other person, firm or corporation, except only (i) such notices as are herein specifically provided for in this Article, and (ii) such instructions as are pursuant to orders or process of any court entered or issued with competent jurisdiction.

M. In the event that any of the terms and provisions of any other Article of this Lease or any other agreement between Landlord and Tenant conflict or are in consistent with any of the terms and provisions of this Article, the terms and provisions of this Article shall govern and control in all respects as to the duties and liabilities of the Escrow Agent.

N. Nothing herein shall preclude the Escrow Agent, in its capacity as a law firm, from representing Landlord or its partners or any affiliates thereof.

O. Landlord and Tenant hereby jointly and severally agree to indemnify and hold harmless the Escrow Agent from and against any and all losses, expenses (including, without limitation, reasonable fees and disbursements of counsel, including fees and disbursements of the Escrow Agent in its capacity as a law firm), assessments, liabilities, claims, damages, actions, suits or other charges incurred by or assessed against it for anything done or omitted by it in the performance of its duties hereunder, except as a result of its own willful misconduct or gross negligence. The agreements contained in this subparagraph survive any termination of this Lease or the Escrow Agent's duties hereunder.

XL. DEVELOPMENT RIGHTS

Tenant hereby waives any and all rights it may possess in and to any zoning, development or air rights affecting the Demised Premises. Landlord may (i) sell, transfer, encumber or otherwise dispose of any and all zoning, development or air rights it may have in respect to (or which may be appurtenant or attributable to) the Demised Premises; (ii) merge the Land with any other zoning lot; and (iii) grant easements for light and air with respect to or affecting the Demised Premises, all of the foregoing without Tenant's consent, approval or waiver. Further, it is agreed that Tenant shall not have any interest in or right to dispose of such zoning, development or air rights. Tenant agrees to execute and deliver to Landlord within five (5) days of Landlord's request, a statement confirming the aforesaid. Tenant hereby appoints Landlord as Tenant's attorney-in-fact for the purpose of executing any instrument confirming that Tenant has no interest in or right to the zoning, development or air rights relating to the Improvements or the Land. The provisions of this Article shall not be construed as depriving Tenant of any rights necessary to allow Tenant to rebuild the Demised Premises as required or permitted pursuant to Articles XIV and XV of this Lease.

XLI. GOVERNING LAW

This Lease shall be governed by and construed in accordance with the laws of the State of Missouri.

XLII. MODIFICATION, AMENDMENT, ETC.

Each and every modification and amendment of this Lease shall be in writing and signed by Landlord and Tenant, and each and every waiver of, or consent to any departure from, any representation, warranty, covenant or other term or provision of this Lease shall be in writing and signed by the affected party thereto.

IN WITNESS WHEREOF, the parties hereto have caused this Lease to be executed as of the day and year first above written.

WITNESSES: LANDLORD:

R&S KANSAS CITY ASSOCIATES
LIMITED PARTNERSHIP

By: U.S. Realty Capital Services Inc.
General Partner
By:______________________________
Its: ______________________________

TENANT:

OLD AMERICAN INSURANCE COMPANY
By:______________________________
Its: ______________________________

Escrow Conditions agreed to:
PROSKAUER, ROSE, GOETZ & MENDELSOHN

By:__________________________
Herbert T. Weinstein

STATE OF )

) ss:

COUNTY OF )

On this ___________ day of __________________, 1989, before me the subscriber, personally appeared _____________, to me personally known, who, being by me duly sworn, did depose and say that he resides at ___________________; that he is the _______________ of _________________________, the corporation described in and which executed the foregoing instrument; and that he signed his name thereto by order of the Board of Directors and said corporation.

________________________________

Notary Public

STATE OF )

) ss:

COUNTY OF )

On this _____ day of _____________, 1989, before me the subscriber, personally appeared ______________________, to me personally known, who, being by me duly sworn, did depose and say that he resides at __________________; that he is the ____________________ of ________________________, the corporation described in and which executed the foregoing instrument; and that he signed his name thereto by order of the Board of Directors of said corporation.

________________________________

Notary Public

[SUBSTITUTE APPROPRIATE FORM OF MISSOURI ACKNOWLEDGMENT.]

LEGAL DESCRIPTION

JA54974 K

ALL THAT PART OF BLOCKS 2 AND 3, LAWNDALE, A SUBDIVISION IN KANSAS CITY, JACKSON COUNTY, MISSOURI, ACCORDING TO THE RECORDED PLAT THEREOF, ALL THAT PART OF VACATED MCGEE STREET LYING BETWEEN SAID BLOCKS 2 AND 3 AND ALL OF THAT PART OF THE SOUTHEAST 1/4 OF THE SOUTHWEST 1/4 OF SECTION 29, TOWNSHIP 49, RANGE 33, IN SAID CITY AND COUNTY EMBRACED WITHIN THE FOLLOWING METES AND BOUNDS DESCRIPTION, TO-WIT: BEGINNING AT A POINT IN THE NORTH LINE OF LOT 1 IN SAID BLOCK 3, SAID POINT ALSO BEING IN THE NORTH LINE OF SAID 1/4 1/4 SECTION AND 347.92 FEET WEST OF THE NORTHEAST CORNER THEREOF, THENCE SOUTH ALONG A LINE 347.92 FEET WEST OF AND PARALLEL TO THE EAST LINE OF SAID 1/4 1/4 SECTION A DISTANCE OF 291 FEET; THENCE EAST ALONG A LINE 291 FEET SOUTH OF AND PARALLEL TO THE NORTH LINE OF SAID 1/4 1/4 SECTION TO THE POINT OF INTERSECTION OF SAID LINE WITH A LINE DRAWN SOUTHEASTERLY IN A STRAIGHT LINE FROM A POINT IN THE NORTH LINE OF SAID 1/4 1/4 SECTION WHICH IS 296.3 FEET WEST OF THE NORTHEAST CORNER THEREOF TO A POINT WHICH IS 331 FEET SOUTH OF THE NORTH LINE AND 146.24 FEET WEST OF THE EAST LINE OF SAID 1/4 1/4 SECTION; THENCE SOUTHEASTERLY ALONG SAID LAST DESCRIBED LINE TO SAID POINT WHICH 1S 331 FEET SOUTH OF THE NORTH LINE AND 146.24 FEET WEST OF THE EAST LINE OF SAID 1/4 1/4 SECTION; THENCE EAST ALONG A LINE 331 FEET SOUTH OF AND PARALLEL TO THE NORTH LINE OF SAID 1/4 1/4 SECTION 96.74 FEET TO THE POINT OF INTERSECTION OF SAID LINE WITH THE

WEST LINE OF OAK STREET, AS NOW ESTABLISHED; THENCE NORTH ALONG SAID WEST LINE OF OAK STREET 331 FEET TO A POINT IN THE NORTH LINE OF SAID 1/4 1/4 SECTION; THENCE WEST ALONG THE NORTH LINE OF SAID 1/4 1/4 SECTION 298.42 TO THE POINT OF BEGINNING.

SCHEDULE A

MEMORANDUM OF LEASE

THIS MEMORANDUM OF LEASE is made and entered into this ________ day of December, 1989, by and between R&S KANSAS CITY ASSOCIATES LIMITED PARTNERSHIP, a Connecticut limited partnership ("Landlord") and OLD AMERICAN INSURANCE COMPANY, ("Tenant").

W I T N E SS E T H:

WHEREAS, Landlord and Tenant have entered into a Lease Agreement dated as of the ________ day of December, 1989, for lease of real estate described on Exhibit "A" attached hereto and made a part hereof; and WHEREAS, Landlord and Tenant are executing this Memorandum as evidence of the existence of the Lease Agreement.

NOW, THEREFORE, in consideration of One and No/100 Dollars ($1.00) and other valuable consideration, as more fully set forth in the Lease Agreement, Landlord has leased, rented, let and demised to Tenant and Tenant has taken and hired from Landlord the property described on Exhibit "A" for the period commencing on December 29, 1989 and ending December 31, 2009, with provisions for said term to be extended for up to an additional ten (10) years, unless such term is sooner terminated as provided in said Lease.

R&S KANSAS CITY

ASSOCIATES LIMITED PARTNERSHIP

A Connecticut Limited Partnership

By: U.S. REALTY CAPITAL SERVICES INC.,

Its General Corporate Partner

By:________________________________

Title: ______________________________

LANDLORD

OLD AMERICAN INSURANCE COMPANY,

A Missouri Corporation

By:________________________________

Title: ______________________________

TENANT

SCHEDULE B

STATE OF )
) ss:
COUNTY OF )

On this ____________ day of December, 1989, before me, a notary public, personally appeared ______________________________, to me known to be the person described in and who executed the foregoing instrument, and acknowledged that he executed the same as his free act and deed in his/her capacity as ____________________ of U.S. Realty Capital Services Inc., a general corporate partner of R&S Kansas City Associates Limited Partnership, and the execution thereof was authorized on behalf of the corporation as a general corporate partner of the partnership.

IN WITNESS WHEREOF, I have hereunto set my hand and affixed by official seal the day and year last above written.

____________________________________

Notary Public

My commission expires:

____________________

STATE OF )

) ss:

COUNTY OF )

On this ____________ day of December, 1989, before me, a notary public, personally appeared ______________________________, to me known to be the person described in and who executed the foregoing instrument, and acknowledged that he executed the same as his free act and deed, and the said ________________________ further declared that he is the ______________________________ of Old American Insurance Company, a Missouri corporation, and the execution thereof was authorized on behalf of the corporation.

IN WITNESS WHEREOF, I have hereunto set my hand and affixed by official seal the day and year last above written.

____________________________________

Notary Public

My commission expires:

____________________

LEGAL DESCRIPTION

JA54974 K

ALL THAT PART OF BLOCKS 2 AND 3, LAWNDALE, A SUBDIVISION IN KANSAS CITY, JACKSON COUNTY, MISSOURI, ACCORDING TO THE RECORDED PLAT THEREOF, ALL THAT PART OF VACATED MCGEE STREET LYING BETWEEN SAID BLOCKS 2 AND 3 AND ALL OF THAT PART OF THE SOUTHEAST 1/4 OF THE SOUTHWEST 1/4 OF SECTION 29, TOWNSHIP 49, RANGE 33, IN SAID CITY AND COUNTY EMBRACED WITHIN THE FOLLOWING METES AND BOUNDS DESCRIPTION, TO-WIT: BEGINNING AT A POINT IN THE NORTH LINE OF LOT 1 IN SAID BLOCK 3, SAID POINT ALSO BEING IN THE NORTH LINE OF SAID 1/4 1/4 SECTION AND 347.92 FEET WEST OF THE NORTHEAST CORNER THEREOF, THENCE SOUTH ALONG A LINE 347.92 FEET WEST OF AND PARALLEL TO THE EAST LINE OF SAID 1/4 1/4 SECTION A DISTANCE OF 291 FEET; THENCE EAST ALONG A LINE 291 FEET SOUTH OF AND PARALLEL TO THE NORTH LINE OF SAID 1/4 1/4 SECTION TO THE POINT OF INTERSECTION OF SAID LINE WITH A LINE DRAWN SOUTHEASTERLY IN A STRAIGHT LINE FROM A POINT IN THE NORTH LINE OF SAID 1/4 1/4 SECTION WHICH IS 296.3 FEET WEST OF THE NORTHEAST CORNER THEREOF TO A POINT WHICH IS 331 FEET SOUTH OF THE NORTH LINE AND 146.24 FEET WEST OF THE EAST LINE OF SAID 1/4 1/4 SECTION; THENCE SOUTHEASTERLY ALONG SAID LAST DESCRIBED LINE TO SAID POINT WHICH 1S 331 FEET SOUTH OF THE NORTH LINE AND 146.24 FEET WEST OF THE EAST LINE OF SAID 1/4 1/4 SECTION; THENCE EAST ALONG A LINE 331 FEET SOUTH OF AND PARALLEL TO THE NORTH LINE OF SAID 1/4 1/4 SECTION 96.74 FEET TO THE POINT OF INTERSECTION OF SAID LINE WITH THE

WEST LINE OF OAK STREET, AS NOW ESTABLISHED; THENCE NORTH ALONG SAID WEST LINE OF OAK STREET 331 FEET TO A POINT IN THE NORTH LINE OF SAID 1/4 1/4 SECTION; THENCE WEST ALONG THE NORTH LINE OF SAID 1/4 1/4 SECTION 298.42 TO THE POINT OF BEGINNING.

EXHIBIT A

MEMORANDUM OF LEASE

THIS MEMORANDUM OF LEASE is made and entered into this ________ day of December, 1989, by and between R&S KANSAS CITY ASSOCIATES LIMITED PARTNERSHIP, a Connecticut limited partnership ("Landlord") and OLD AMERICAN INSURANCE COMPANY, ("Tenant").

W I T N E SS E T H:

WHEREAS, Landlord and Tenant have entered into a Lease Agreement dated as of the ________ day of December, 1989, for lease of real estate described on Exhibit "A"

attached hereto and made a part hereof; and

WHEREAS, Landlord and Tenant are executing this Memorandum as evidence of the existence of the Lease Agreement.

NOW, THEREFORE, in consideration of One and No/100 Dollars ($1.00) and other valuable consideration, as more fully set forth in the Lease Agreement, Landlord has leased, rented, let and demised to Tenant and Tenant has taken and hired from Landlord the property described on Exhibit "A" for the period commencing on December 29, 1989 and ending December 31, 2009, with provisions for said term to be extended for up to an additional ten (10) years, unless such term is sooner terminated as provided in said Lease.

R&S KANSAS CITY

ASSOCIATES LIMITED PARTNERSHIP

A Connecticut Limited Partnership

By: U.S. Realty Capital Services Inc.,

Its General Corporate Partner

By:______________________________

Title: ______________________________

LANDLORD

OLD AMERICAN INSURANCE COMPANY,

A Missouri Corporation

By:______________________________

Title: ______________________________

TENANT

STATE OF )

) ss:

COUNTY OF )

On this ____________ day of December, 1989, before me, a notary public, personally appeared ______________________________, to me known to be the person described in and who executed the foregoing instrument, and acknowledged that he executed the same as his free act and deed in his/her capacity as ____________________ of U.S. Realty Capital Services Inc., a general corporate partner of R&S Kansas City Associates Limited Partnership, and the execution thereof was authorized on behalf of the corporation as a general corporate partner of the partnership.

IN WITNESS WHEREOF, I have hereunto set my hand and affixed by official seal the day and year last above written.

_____________________________________

Notary Public

My commission expires:

____________________

STATE OF )

) ss:

COUNTY OF )

On this ___________ day of December, 1989, before me, a notary public, personally appeared ___________________________, to me known to be the person described in and who executed the foregoing instrument, and acknowledged that he executed the same as his free act and deed, and the said ______________________ further declared that he is the ____________________________ of Old American Insurance Company, a Missouri corporation, and the execution thereof was authorized on behalf of the corporation.

IN WITNESS WHEREOF, I have hereunto set my hand and affixed by official seal the day and year last above written.

_________________________________

Notary Public

My commission expires:

____________________

LEGAL DESCRIPTION

JA54974 K

ALL THAT PART OF BLOCKS 2 AND 3, LAWNDALE, A SUBDIVISION IN KANSAS CITY, JACKSON COUNTY, MISSOURI, ACCORDING TO THE RECORDED PLAT THEREOF, ALL THAT PART OF VACATED MCGEE STREET LYING BETWEEN SAID BLOCKS 2 AND 3 AND ALL OF THAT PART OF THE SOUTHEAST 1/4 OF THE SOUTHWEST 1/4 OF SECTION 29, TOWNSHIP 49, RANGE 33, IN SAID CITY AND COUNTY EMBRACED WITHIN THE FOLLOWING METES AND BOUNDS DESCRIPTION, TO-WIT: BEGINNING AT A POINT IN THE NORTH LINE OF LOT 1 IN SAID BLOCK 3, SAID POINT ALSO BEING IN THE NORTH LINE OF SAID 1/4 1/4 SECTION AND 347.92 FEET WEST OF THE NORTHEAST CORNER THEREOF, THENCE SOUTH ALONG A LINE 347.92 FEET WEST OF AND PARALLEL TO THE EAST LINE OF SAID 1/4 1/4 SECTION A DISTANCE OF 291 FEET; THENCE EAST ALONG A LINE 291 FEET SOUTH OF AND PARALLEL TO THE NORTH LINE OF SAID 1/4 1/4 SECTION TO THE POINT OF INTERSECTION OF SAID LINE WITH A LINE DRAWN SOUTHEASTERLY IN A STRAIGHT LINE FROM A POINT IN THE NORTH LINE OF SAID 1/4 1/4 SECTION WHICH IS 296.3 FEET WEST OF THE NORTHEAST CORNER THEREOF TO A POINT WHICH IS 331 FEET SOUTH OF THE NORTH LINE AND 146.24 FEET WEST OF THE EAST LINE OF SAID 1/4 1/4 SECTION; THENCE SOUTHEASTERLY ALONG SAID LAST DESCRIBED LINE TO SAID POINT WHICH 1S 331 FEET SOUTH OF THE NORTH LINE AND 146.24 FEET WEST OF THE EAST LINE OF SAID 1/4 1/4 SECTION; THENCE EAST ALONG A LINE 331 FEET SOUTH OF AND PARALLEL TO THE NORTH LINE OF SAID 1/4 1/4

SECTION 96.74 FEET TO THE POINT OF INTERSECTION OF SAID LINE WITH THE WEST LINE OF OAK STREET, AS NOW ESTABLISHED; THENCE NORTH ALONG SAID WEST LINE OF OAK STREET 331 FEET TO A POINT IN THE NORTH LINE OF SAID 1/4 1/4 SECTION; THENCE WEST ALONG THE NORTH LINE OF SAID 1/4 1/4 SECTION 298.42 TO THE POINT OF BEGINNING.

EXHIBIT A

FIRST AMENDMENT TO LEASE –

R & S KANSAS CITY ASSOCIATES LIMITED PARTNERSHIP,

LANDLORD AND OLD AMERICAN INSURANCE COMPANY, TENANT

DATED DECEMBER 29, 1989

WHEREAS, R & S KANSAS CITY ASSOCIATES LIMITED PARTNERSHIP, a Connecticut Limited Partnership, having an address c/o Realty Holdings of America, 1370 Avenue of the Americas, 33rd Floor, New York, New York 10019 ("Landlord") and OLD AMERICAN INSURANCE COMPANY, a Missouri corporation, having an office at 4900 Oak Street, Kansas City, Missouri 64112 ("Tenant") have executed a Lease dated December 19, 1989; and WHEREAS, The parties listed above hereby wish to amend the above referenced lease as provided by Article XLIT.

NOW THEREFORE, as good and valuable consideration of this amendment KANSAS CITY LIFE INSURANCE COMPANY, a Missouri Corporation, having an address of 3520 Broadway, Kansas City, Missouri 64111 ("Guarantor") has agreed to execute a separate Guaranty of OLD AMERICAN INSURANCE COMPANY'S obligations under the terms and conditions of the above referenced Lease, as amended this First Amendment, the parties hereto hereby agree to amend the above referenced Lease as follows:

Delete Article II, Subparagraphs (a) and (b) of the Lease in their entirety.

IN WITNESS WHEREOF, The parties hereto have caused this First Amendment to Lease to be executed in duplicate original form as of this _______ day of November, 1991.

| | |
|---|---|
| TENANT: | LANDLORD: |
| OLD AMERICAN INSURANCE COMPANY | R & S KANSAS CITY ASSOCIATES LIMITED |
| | By: U.S. Realty Capital Services, Inc., General Partner |
| By:______________________ | By: ______________________ |
| Its: _______President_______. | Its: ______________________ |

STATE OF NEW YORK )
) ss
COUNTY OF NEW YORK )

On this_________ day of November, 1991, before me appeared ____________________, to me personally known, who being by me duly sworn, did say that he is the _______________________ of U.S. REALTY CAPITAL SERVICES, INC., a corporation, and that the seal affixed to the foregoing instrument is the corporate seal of said corporation and that said instrument was signed and sealed in behalf of said corporation by authority of its Board of Directors, and said ______________________ acknowledged said instrument to be the free act and deed of said corporation.

IN WITNESS WHEREOF, I have hereunto set my hand and affixed my notarial seal at my office in Kansas City, Missouri, the day and year last above written.

____________________________________
Notary Public

My commission expires:
____________________

STATE OF MISSOURI )

) ss

COUNTY OF JACKSON )

On this _______ day of November, 1991, before me appeared ________________, to me personally known, who being by me duly sworn, did say that he is the _____________ of OLD AMERICAN INSURANCE COMPANY, a corporation, and that the seal affixed to the foregoing instrument is the corporate seal of said corporation and that said instrument was signed and sealed in behalf of said corporation by authority of its Board of Directors, and said _______________________ acknowledged said instrument to be the free act and deed of said corporation.

IN WITNESS WHEREOF, I have hereunto set my hand and affixed my notarial seal at my office in Kansas city, Missouri, the day and year last above written.

___________________________________

Notary Public

My commission expires:

____________________

EXHIBIT F

FORM OF SERVICING AGREEMENT

SCRIBCOR, INC.

Servicer and

THE FIRST NATIONAL BANK OF CHICAGO, not personally, but solely as Trustee of the K.C. ABBE® 1995-1 Trust Owner Trustee

SERVICING AGREEMENT

Dated as of August 25, 1995

ARTICLE I. 398

DEFINITIONS 398

Section 1.01. Definitions 398

ARTICLE II. 398

REPRESENTATIONS, WARRANTIES AND COVENANTS 398

Section 2.01. Representations, Warranties and Covenants 398

Section 2.02. Representations, Warranties and Covenants of Owner Trustee 401

ARTICLE III. 402

SERVICING STANDARD AND SCOPE OF AUTHORITY 402

Section 3.01. Servicing Standard 402

Section 3.02. Scope of Servicer's Authority 403

Section 3.03. Retention of Contractors 403

ARTICLE IV. 403

OBLIGATIONS 403

Section 4.01. Obligations Generally 403

| | | |
|---|---|---|
| Section 4.02. | Certificate Distribution Account | 404 |
| Section 4.03. | Tenant Billing, Collection and Service | 404 |
| Section 4.04. | Financial and Legal Covenants | 406 |
| Section 4.05. | Maintenance of Hazard Insurance; Casualty or Condemnation Proceeds | 406 |
| Section 4.06. | Performance Monitoring | 406 |
| Section 4.07. | Enforcement Proceedings | 407 |
| Section 4.08. | Property Management | 408 |
| Section 4.09. | Casualty Services | 408 |
| Section 4.10. | Condemnation Services | 409 |
| Section 4.11. | Required Tenancy | 410 |
| Section 4.12. | Casualty Loss Termination | 410 |

ARTICLE V. 412

SERVICER COMPENSATION 412

Section 5.01. Basic Servicing Fee 412

Section 5.02. Additional Services 412

Section 5.03. Monthly Statements 413

ARTICLE VI. 414

ADDITIONAL COVENANTS OF SERVICER 414

Section 6.01. No Liens 414

Section 6.02. Requirements of Trustee 415

ARTICLE VII. 415

MISCELLANEOUS SERVICING MATTERS 415

Section 7.01. Fidelity Bond; Errors and Omissions Insurance 415

Section 7.02. Liability Insurance 415

Section 7.03. Employees and Independent Contractor Status 416

Section 7.04. Annual Statement as to Compliance 416

Section 7.05. Access to Certain Documentation and Information 417

Section 7.06. Existence; Merger or Consolidation of, or Assumption of the Obligations of the Servicer 417

Section 7.07. Servicer Not to Resign 417

Section 7.08. Transfer or Delegation of Servicing 418

ARTICLE VIII. 419

DEFAULT 419

Section 8.01. Events of Default 419

Section 8.02. Remedies 420

Section 8.03. Successor to Servicer 421

Section 8.04. Waiver of Defaults 422

Section 8.05. Remedies Cumulative 422

Section 8.06. Owner Trustee's Right to Cure 423

Section 8.07. Payment of Owner Trustee's Expenses 423

Section 8.08. Indemnification 423

Section 8.09. Default by Owner Trustee 424

ARTICLE IX. 424

TERMINATION 424

Section 9.01. Termination 424

Section 9.02. Termination without Cause 424

Section 9.03. Rating Agency Confirmation 425

ARTICLE X. 425

MISCELLANEOUS PROVISIONS 425

Section 10.01. Governing Law; Submission to Jurisdiction 425

Section 10.02. General Interpretive Principles 426

Section 10.03. Reproduction of Documents 427

Section 10.04. Notices 427

Section 10.05. Severability of Provisions 428

Section 10.06. Exhibits 428

Section 10.07. Counterparts; Assignment 429

Section 10.08. Effect of Readings 429

Section 10.09. Other Agreements Superseded 429

Section 10.10. Amendments 429

Section 10.11. Further Assurances 429

Section 10.12. No Partnership 429

Section 10.13. Time is of the Essence 430

Section 10.14. Drafting of Agreement 430

Section 10.15. Confidentiality 430

Section 10.16. References to Related Agreements 430

THIS SERVICING AGREEMENT (this "Agreement"), dated and effective as of August 25, 1995, between SCRIBCOR, INC., an Illinois corporation ("Servicer"), and THE FIRST NATIONAL BANK OF CHICAGO, not personally, but solely as Trustee of the K.C. ABBE® 1995-1 Trust ("Owner Trustee").

PRELIMINARY STATEMENT

A. Owner Trustee has acquired an estate for years in the Real Property subject to the terms of the Term Trust Agreement and the Lease and wishes to retain Servicer to provide certain services with respect to the Real Property and the Lease as more fully described herein, and Servicer desires to perform such services. The Certificateholders consent to such appointment by their acceptance of the Certificates.

B. In consideration of the mutual agreements herein contained, the Owner Trustee and the Servicer hereby covenant and agree as set forth below.

ARTICLE I

DEFINITIONS

Section 1.01. Whenever used in this Agreement, unless the context otherwise requires, initially capitalized terms shall have the meanings ascribed to them in Appendix A hereto.

ARTICLE II.

REPRESENTATIONS, WARRANTIES AND COVENANTS

. Section 2.201. Representations, Warranties and Covenants. Servicer hereby represents and warrants to, and covenants with, Owner Trustee that, as of the date hereof, and, where specified herein, on a continuing basis throughout the Term:

(a) Servicer is, and throughout the Term shall remain, a corporation duly organized, validly existing and in good standing under the laws of the State of Illinois and is and shall remain in compliance with the laws of the state in which the Real Property is located to the extent necessary to perform the Obligations of Servicer under this Agreement;

(b) Servicer has taken all necessary action to authorize the execution, delivery and performance of this Agreement by it, and has, and throughout the Term will have, the full power and authority to execute, deliver and perform this Agreement and all transactions contemplated by this Agreement to be performed by Servicer;

(c) Assuming the due authorization, execution and delivery of this Agreement by Owner Trustee, this Agreement and all Obligations of Servicer are the legal, valid and binding obligations of Servicer, enforceable against Servicer in accordance with the terms of this Agreement subject only to bankruptcy, reorganization, insolvency and other similar laws affecting the enforcement of creditors' rights generally and the application of general principles of equity;

(d) Neither the execution and delivery of this Agreement or any related documents executed by Servicer nor the fulfillment of or compliance with the terms and conditions of this Agreement or any related documents executed by Servicer, will conflict with or result in a breach of any of the terms, conditions or provisions of Servicer's charter or by-laws or any legal restriction or any material agreement or instrument to which Servicer is a party or by which it is bound, or constitute a default or result in an acceleration under any of the foregoing, or result in the violation of any law, rule, regulation, order, judgment or decree to which Servicer or its property is subject;

(e) Servicer is experienced in all aspects of commercial real estate management, operation and servicing, including, without limitation, those aspects falling within the scope of the Obligations, is fully qualified to perform the Obligations hereunder and does not believe, nor does it have any reason or cause to believe, that as of the date hereof, it cannot perform each and every obligation on its part hereunder to be performed in accordance with the terms hereof;

(f) There is no litigation pending or, to Servicer's knowledge, threatened, against Servicer which, if determined adversely to Servicer, would adversely affect the execution, delivery or enforceability of this Agreement, or the ability of Servicer to service the Real Property hereunder in accordance with the terms hereof or which would have a materially adverse affect on the financial condition of Servicer;

(g) No consent, approval, authorization or order of any court or governmental agency or body is required for the execution, delivery and performance by Servicer of, or compliance by Servicer with, this Agreement, or the consummation by Servicer of the transactions contemplated by this Agreement;

(h) To the best of Servicer's actual knowledge, neither this Agreement nor any statement, report or other document furnished or to be furnished by Servicer pursuant to this Agreement or in connection with the transactions contemplated herein contains any untrue statement of a material fact or omits to state a material fact necessary to make the statements contained therein not misleading;

(i) Servicer has received and reviewed complete copies of the Term Trust Agreement and the Lease, and agrees that it shall (i) perform its obligations under this Agreement in full compliance with such documents and (ii) refrain from taking any actions which are prohibited by such documents, unless in each case of (i) and (ii) above it shall obtain the prior written direction of Owner Trustee to the contrary; and (j) Servicer has received a complete copy of the offering memorandum attached hereto as Exhibit A (the "Offering Memorandum") and has reviewed the Sections entitled: "SUMMARY OF THE OFFERING" and "THE SERVICING AGREEMENT", and the information in such Sections relating to and furnished by Servicer is true and correct in all material respects and does not omit to state a material fact necessary to make the information contained therein not misleading.

Section 2.02. Representations, Warranties and Covenants of Owner Trustee. Owner Trustee hereby represents and warrants to, and covenants with, Servicer that, as of the date hereof, as of the Closing Date and, where specified herein, on a continuing basis throughout the Term (or earlier resignation by the Term Trustee pursuant to the provisions of the Term Trust Agreement):

(a) The Owner Trustee is, and throughout the Term shall remain, duly organized, validly existing and in good standing under the laws of the United States of America and is and shall remain in or exempt from compliance with the laws of the state in which the Real Property is located to the extent necessary to perform the Owner Trustee's obligations under this Agreement;

(b) Owner Trustee has taken all necessary action to authorize the execution, delivery and performance of this Agreement by it, and has, and throughout the Term (or earlier resignation by the Term Trustee pursuant to the provisions of the Term Trust Agreement) will have, the full power and authority to execute and deliver this Agreement and all transactions contemplated by this Agreement to be performed by Owner Trustee;

(c) Assuming the due authorization, execution and delivery of this Agreement by Servicer, this Agreement and all obligations of Owner Trustee hereunder are the legal, valid and binding obligations of Owner Trustee, enforceable against Owner Trustee in accordance with the terms of this Agreement subject only to bankruptcy, reorganization, insolvency and other similar laws affecting the enforcement of creditors rights generally and the application of general principles of equity;

(d) Neither the execution and delivery of this Agreement nor the fulfillment of or compliance with the terms and conditions of this Agreement to be performed by Owner Trustee, will conflict with or result in a breach of any of the terms, conditions or provisions of Owner Trustee's charter or by-laws or any legal restriction or any agreement or instrument to which Owner Trustee is a party or by which it is bound, or constitute a default or result in an acceleration under any of the foregoing, or result in the violation of any law, rule, regulation, order, judgement or decree to which Owner Trustee is subject; and (e) There is no litigation pending or, to Owner Trustee's Actual Knowledge, threatened, against Owner Trustee which, if determined adversely to Owner Trustee, would adversely affect the execution, delivery or enforceability of this Agreement or the ability of Owner Trustee to perform its obligations hereunder in accordance with the terms hereof or which would have a materially adverse affect on the financial condition of Owner Trustee.

ARTICLE III.

SERVICING STANDARD AND SCOPE OF AUTHORITY

Section 3.01. Servicing Standard. Servicer shall perform the Obligations as required by the terms of this Agreement, the Term Trust Agreement and the Lease, with reasonable care and in a manner consistent with prudent industry standards for commercial property managers and servicers, and with at least the same level of care, skill, prudence and diligence used by Servicer in connection with, the servicing and administration of similar assets by Servicer for its own account or for accounts of others giving due consideration to: (a) customary and usual property servicing and management practices of a prudent commercial property and asset manager, (b) the restrictions placed on Servicer's practices as provided in this Agreement and (c) the limited scope of Servicer's Obligations hereunder (the "Servicing Standard"). Servicer shall at all times act in the best interest of the Term Trust and without regard to (i) any relationship which Servicer or any Affiliate thereof may have with the Tenant or any property contiguous with or related to the Real Property, (ii) Servicer's right to receive compensation for its services hereunder or with respect to any particular transaction, or (iii) the servicing or management for other Persons by Servicer of any other assets similar to the Real Property.

Section 3.02. Scope of Servicer's Authority. in accordance with the terms of this Agreement and shall not take any actions which are not expressly authorized, or are prohibited, by an express provision of this Agreement, the Term Trust Agreement or the Lease. It is not contemplated by this Agreement that Servicer shall be delegated, or shall have any need to be delegated, any substantial discretionary authority by Owner Trustee in the course of Servicer's performance of the obligations, except as expressly provided in this Agreement.

Section 3.03. Retention of Cotnractors. Except as otherwise expressly provided herein, Servicer shall have no authority to retain Contractors for the performance of its Obligations.

ARTICLE IV.

OBLIGATIONS

Section 4.01. Obligations Generally. Servicer shall perform each of the obligations, responsibilities and duties of Servicer specifically enumerated in this Agreement in accordance with the provisions hereof, which obligations, responsibilities and duties shall be referred to in this Agreement as the "Obligations". In the event of any inconsistency regarding Servicer's Obligations under this Agreement and either the Term Trust Agreement or the Lease, the terms and conditions of the Term Trust Agreement and/or the Lease shall control. In the event of any inconsistency regarding Servicer's Obligations under this Agreement and any other document, the terms and conditions of this Agreement shall control unless Owner Trustee otherwise directs in writing; provided, however, Servicer's Obligations, responsibilities and duties which are part of the Obligations may not be materially increased by an amendment or supplement to the Term Trust Agreement or the Lease without Servicer's consent, which consent shall not be unreasonably withheld, delayed or conditioned.

Section 4.02. Certificate Distribution Account. (a) Owner Trustee shall establish and maintain the Certificate Distribution Account in accordance with the terms of the Term Trust Agreement. The Certificate Distribution Account shall initially be established with The First National Bank of Chicago. No withdrawal may be made from the Certificate Distribution Account by Servicer.

(b) Servicer shall require the Tenant to make all payments required to be made by the Tenant under the Lease directly to the Certificate Distribution Account. If Servicer shall receive any Collections directly, Servicer shall forward the same to Owner Trustee for deposit into the Certificate Distribution Account, Casualty Account or Condemnation Account, as appropriate, by no later than the Business Day following receipt thereof.

(c) If Servicer receives with respect to the Real Property any property or asset other than cash, check, draft or wire transfer of funds, Servicer shall promptly notify Owner Trustee and take such action as Owner Trustee may direct, to subject such property to the terms of the Term Trust Agreement.

Section 4.03. Tenant Billing, Collection and Service. (a) Servicer shall prepare and send to Tenant by first class mail, or as otherwise required by the Lease or applicable law, monthly bills for Rent and any other amounts owing under the Lease ("Rent Invoices"). All Rent Invoices shall be sent sufficiently in advance of the payment due date for the amount then due to enable timely collection. All Rent Invoices shall require that (i) all checks and other non-wire transfer payments be payable to the order of Owner Trustee and be delivered directly to the Owner Trustee for deposit into the Certificate Distribution Account at the address set forth in Section 10.04 and (ii) all wire transfer payments be payable to Owner Trustee and be wired directly into the Certificate Distribution Account. Such Rent Invoices shall include wire transfer instructions for the Certificate Distribution Account and shall also identify Servicer as the party to whom any inquiries by Tenant should be made, including Servicer's address and telephone number.

(b) Servicer and the Owner Trustee shall each cooperate with the other to collect all Rent and other Collections relating to the Real Property, subject to the limits of Servicer's Obligations hereunder. The Servicer shall confirm with the Owner Trustee receipt by the Owner Trustee of all payments of Rent or other sums required to be paid by the Tenant under the Lease on the due date for such payments and the Owner Trustee shall provide to the Servicer telephonic notice of the failure of the Owner Trustee to receive any payment on the date required not later than one (1) business day after such due date.

(c) Servicer shall not deposit any Collections received directly by Servicer into the Certificate Distribution Account in situations where the Tenant tenders less than the full amount then payable pursuant to the Lease (a "Conditional Receipt"). If Servicer receives a Conditional Receipt, Servicer shall immediately seek the advice of Owner Trustee to determine whether such Conditional Receipt should be returned to the Tenant or deposited into the Certificate Distribution Account. Servicer shall apply such Conditional Receipt strictly in the manner directed by Owner Trustee and, if Servicer has not received such direction by 2 P.M. in Chicago on the date such Conditional Receipt is received following diligent efforts by Servicer to obtain the same, Servicer shall hold such Conditional Receipt (without applying the same) until such direction is received.

(d) Servicer shall refer to Owner Trustee any communications received by Servicer from Tenant concerning payment disputes, transfers of the Tenant's interest in the Lease, Enforcement Proceedings, Casualty Loss, Condemnation and any other matters which constitute or, with the passage of time or the giving of notice or both, would constitute an Event of Default. Servicer shall notify Owner Trustee of the receipt of any such communications not later than the opening of business in Chicago on the Business Day following Servicer's receipt of notice thereof. Servicer's notice shall include any documentation received from the Tenant in connection therewith.

Section 4.04. Financial and Legal Convenants. Servicer shall review the financial and legal covenants contained in the Lease as necessary to accurately monitor Tenant's performance thereunder.

Section 4.05. Maintenance of Hazard Insurance; Casualty or Condemnation Proceeds. Servicer shall, in connection with the monitoring of Tenant's performance under the Lease immediately notify Owner Trustee upon obtaining Actual Knowledge that the Minimum Required Insurance is not being maintained strictly in accordance with the terms of the Lease and Servicer shall take such further action with respect thereto as directed in writing by Owner Trustee.

Section 4.06. Performance Monitoring. The Servicer shall monitor on behalf of the Owner Trustee performance by the Tenant under the Lease, give and receive notices required or appropriate to be given or received by the Landlord under the Lease and otherwise perform on behalf of the Owner Trustee the obligations of the Landlord under the Lease pursuant hereto. If an Event of Default shall occur under the Lease, the Servicer shall give a Default Notice with respect thereto to the Tenant and to the Owner Trustee not later than two (2) business days after the date on which the Servicer first obtains Actual Knowledge of the occurrence of such Event of Default. Each Default Notice shall specify in reasonable detail the nature of the default by the Tenant giving rise to the occurrence of such Event of Default. For all purposes of this Agreement, the Servicer shall be deemed to have Actual Knowledge of an Event of Default in the payment of any amount required to be paid by the Tenant under the terms of the Lease not later than two (2) business days after the date required for the making of such payment. In furtherance of its duties hereunder, the Servicer shall inspect the Real Property not less frequently than two (2) times in each twelve (12) calendar month period during the term of this Trust for the purpose of determining the Tenant's compliance with the terms of the Lease and shall prepare and deliver to the Owner Trustee a Property Report reflecting the results of such inspection.

Section 4.07. Enforcement Proceedings. If so directed in writing by the Owner Trustee, after the giving of a Default Notice, the Servicer shall initiate such actions, including, without limitation, the commencement of legal proceedings, as shall, in the judgment of counsel retained by the Owner Trustee for such purpose, be necessary or appropriate to preserve the Trust Estate and enforce the rights and remedies of the Landlord under the Lease (collectively and individually, "Enforcement Proceedings"). In connection therewith, the Servicer shall obtain an inspection of the Real Property, including, without limitation, a phase I environmental inspection and shall deliver copies of any report prepared in connection therewith to the Term Trustee promptly upon receipt of the same. All reasonable third-party costs and expenses incurred by the Servicer in pursuing such Enforcement Proceedings shall be Reimbursable Costs. In connection with any Enforcement Proceedings initiated by the Term Trustee or by the Servicer on behalf thereof, the Term Trustee or the Servicer, as the case may be, shall in all cases elect the measure of damages provided in Section XVIII B. of the Lease as will, in the reasonable judgement of the Servicer, result in the maximum award to the Term Trustee in respect of such Event of Default. Notwithstanding the foregoing, the Servicer shall not be required to take any action, incur any expenses or advance any funds of the Servicer under this Section 4.07 unless Servicer shall have received assurances from the Owner Trustee (or otherwise) as to the source and manner for the reimbursement of such Reimbursable Costs reasonably satisfactory to the Servicer.

Section 4.08 Property Management. If the Lease or the Tenant's right to possession of the Real Property thereunder shall be terminated in connection with an Event of Default, Casualty Loss Termination, or Total Condemnation, the Owner Trustee may direct the Servicer to provide Property Management Services and initiate such actions as are, in the reasonable judgment of the Servicer and counsel engaged by the Term Trustee for such purpose necessary or appropriate to: (i) preserve the Trust Estate and maintain the Real Property including, without limitation, the payment of real property taxes, insurance premiums as required to maintain the Minimum Required Insurance and other reasonable costs and expenses of maintaining and preserving the Real Property in good operating condition and in compliance with all Laws; and (ii) if so directed in writing by the Owner Trustee, procure a Replacement Lease or Leases on such terms and conditions as shall be approved in writing by the Owner Trustee. All reasonable costs and expenses incurred by the Servicer pursuant to this Section 4.08 shall be Reimbursable Costs. Notwithstanding the foregoing, the Servicer shall not be required to take any action, incur any expenses or advance any funds of the Servicer under this Section 4.08 unless the Servicer shall have received assurances from the Owner Trustee (or otherwise) as to the source and manner for the reimbursement of such Reimbursable Costs reasonably satisfactory to the Servicer.

Section 4.09. Casualty Services. In the event of a Casualty Loss affecting the Real Property in connection with which the amount of Casualty Proceeds payable with respect to such Casualty Loss shall be $100,000.00 or more, the Servicer shall give written notice thereof to the Owner Trustee not later than three (3) business days after the Servicer shall have obtained Actual Knowledge of such Casualty Loss. Thereafter, the Owner Trustee shall establish the Casualty Account into which the Net Casualty Proceeds from such Casualty Loss shall be deposited in accordance with Article XIV of the Lease (or any comparable provision of any Replacement Lease), and otherwise direct the Servicer to exercise the rights and perform the obligations, subject to the provisions of this Agreement and the Term Trust Agreement, of the Landlord under said Article XIV (or the comparable provisions of any Replacement Lease) in connection with the settlement of all insurance claims relating to such Casualty Loss restoration of the Real Property by the Tenant as required pursuant to Article XIV A. of the Lease (collectively, the "Casualty Services"). In any circumstance in which the Owner Trustee does not direct the Servicer as to the taking (or not taking) of any action in connection with the settlement of such claims or restoration of the Real Property, the Servicer shall provide to the Owner Trustee the Servicer's written recommendation with respect to the matter in question and shall proceed or cause the Tenant to proceed in the manner so recommended. All reasonable third-party costs and expenses incurred by the Servicer in so acting shall be Reimbursable Costs.

Section 4.10. Condemnation Services. In the event of a Total Condemnation, Servicer shall give written notice thereof to the Owner Trustee not later than three (3) business days after Service shall have obtained Actual Knowledge of such Total Condemnation. The Owner Trustee shall accept the offer to purchase the Real Property required to be made by the Tenant pursuant to Article XV, Subparagraph C of the Lease (or any comparable provision of any Replacement Lease) and the Servicer shall take such actions as are reasonably necessary to assist Owner Trustee in completing such sale of the Real Property pursuant to Article XV of the Lease. All reasonable third-party costs and expenses incurred by the Servicer in completing the sale of the Real Property to the Tenant pursuant to such offer, shall be Reimbursable Costs. The Net Compensation received in connection with such Total Condemnation shall be deposited into the Certificate Distribution Account and applied in accordance with Section 7.3 of the Term Trust Agreement. If there shall occur a Partial Condemnation, the Net Compensation received by the Owner Trustee shall be deposited into the Condemnation Account and administered by the Servicer in accordance with Article XV, Subparagraph E of the Lease (or the comparable provisions of any Replacement Lease) to the payments required to be made to the Tenant (or any Replacement Tenant) in connection with the restoration of the Real Property by the Tenant as required pursuant to Article XV. Subparagraph E of the Lease. If, after making all payments of the Net Compensation required to be made to the Tenant (or any Replacement Tenant) there shall remain any unapplied balance of the Net Compensation, such unapplied balance shall be paid to the Remainder Trustee. Services performed by the Servicer pursuant to this Section 4.10 shall be referred to as "Condemnation Services."

Section 4.11. Required Tenancy. Notwithstanding the provisions of Section 4.08, if the Lease, or the Tenant's right to possession of the Real Property thereunder, is terminated at any time during the last ten (10) years of the Term, the provisions of Section 4.08 with respect to the maintenance and repair of the Real Property shall not apply unless and until at least one (1) Replacement Tenant has executed a lease for and taken possession of the Real Property or any portion thereof; provided, however, that such maintenance provisions shall be likewise suspended at any time thereafter at which there shall not be at least one performing Tenant in possession of all or some portion of the Real Property.

Section 4.12. Casualty Loss Termination. If there shall occur a Casualty Loss Termination, the Net Casualty Proceeds shall be deposited into the Casualty Account and administered by the Servicer, at the direction of the Owner Trustee, to restore the Real Property to substantially the same condition as existed immediately prior to the Casualty Loss giving rise to the Casualty Loss Termination. In such event, the Servicer shall obtain on behalf of the Trust, within forty-five (45) days after the Casualty Loss in question, or such later time as may be reasonable or necessary under the circumstances, at least three (3) fixed-price bids for the performance of the work required in connection with such restoration (the "Restoration Work") from experienced general contractors each having (i) net worth of not less than $10,000,000.00; (ii) a five (5) year annual average contract volume of not less than $50,000,000.00; and (iii) not less than ten (10) years of continuous business operation. The Servicer shall submit all three (3) bids to the Owner Trustee, who shall direct in writing the Servicer as to the bid to be selected not later than thirty (30) days after receipt by the Owner Trustee of such bids. If the Owner Trustee shall fail or refuse to select one of the three (3) bids within said thirty (30) day period, then the Servicer shall make a written recommendation as to the bid which, in the judgement of the Servicer exercised in accordance with the Servicing Standards, is in the best interest of the Certificateholders. In connection therewith, the Owner Trustee may direct the Servicer to provide Construction Management Services in connection with the supervision and management of the Restoration Work pursuant to the terms of this Agreement. All reasonable third-party costs and expenses incurred by the Servicer in obtaining the bids required pursuant to this Section 4.12 shall be Reimbursable Costs. Notwithstanding the foregoing, the Servicer shall not be required to take any action, incur any expenses or advance any funds of the Servicer under this Section 4.12 unless the Servicer shall have received assurances from the Owner Trustee (or otherwise) as to the source and manner for the reimbursement of such Reimbursable Costs satisfactory to the Servicer. If, upon completion of the restoration of the Real Property required by this Section 4.12 there shall remain any unapplied balance of Net Casualty Proceeds, the same shall be deposited into the Certificate Distribution Account.

ARTICLE V.

SERVICER COMPENSATION

Section 5.01. Basic Servicing Fee. The Servicer shall receive as compensation for performance of the Basic Services an annual fee in the amount of $2,500.00 from the Term Trustee per Section 5.04 hereof (the "Basic Servicing Fee") payable annually in advance in a single installment on September 1 of each year in the Term. Servicer shall be entitled to receive reimbursement of Reimbursable Costs incurred in connection with the performance of the Basic Services only to the extent expressly so provided herein.

Section 5.02. Additional Services. If requested in writing by the Owner Trustee from time to time, the Servicer shall perform, or arrange to have performed, the Property Management Services, the Casualty Services, the Condemnation Services and/or the Construction Management Services (collectively, the "Additional Services"). In each case, the Servicer shall be entitled to receive, in addition to the Basic Servicing Fee, all Reimbursable Costs reasonably incurred by the Servicer in connection with the performance of such Additional Services; provided that in each instance, the Servicer shall have obtained the prior written consent of the Owner Trustee for all Reimbursable Costs. In the event of an Emergency, such prior written consent shall not be required with respect to Reimbursable Costs reasonably incurred by the Servicer as necessary to prevent imminent loss to persons or property, provided that the Servicer shall promptly thereafter provide written notice of the same to Owner Trustee. In addition to such Reimbursable Costs, Servicer shall be entitled to receive the Additional Servicing Fee in respect of its performance of Additional Services; provided, however, that the amount of Reimbursable Costs and Additional Servicing Fee payable with respect to such Additional Services, as determined in accordance with Appendix C hereto, shall be submitted to the Rating Agency and the Rating Agency shall have provided a written confirmation that the payment thereof shall not result in a downgrade, qualification or withdrawal of its then-assigned rating with respect to the Certificates. The Reimbursable Costs and Additional Servicing Fee payable to Servicer pursuant to this Section 5.02 are more particularly set forth in Appendix C hereto.

Section 5.03. Monthly Statements. Servicer shall prepare and submit to Owner Trustee monthly statements for the payment of Reimbursable Costs and the Additional Servicing Fee payable to Servicer in connection with the performance of Additional Services for each month during the Term in which such Additional Services are performed, which statements shall include (a) reasonably detailed calculations used by Servicer to compute the Reimbursable Costs and Additional Servicing Fees payable in connection therewith and (b) a year-to-date summary of such costs and fees. Owner Trustee shall cause such statements to be paid not later than thirty (30) days after receipt of the same by Owner Trustee; provided, however, that if Owner Trustee shall object to the amount requested by Servicer pursuant to any such statement, Owner Trustee shall notify Servicer in writing of such objection specifying in reasonable detail the reason therefor within such thirty (30) day period. In such event, Owner Trustee shall pay the amount of such statement not then in dispute, and Servicer and Owner Trustee shall negotiate in good faith regarding the resolution of Owner Trustee's objection. If Owner Trustee and Servicer are not able to reach a resolution of Owner Trustee's objection within thirty (30) days after notice thereof is submitted to Servicer by Owner Trustee, the matter shall be submitted to binding arbitration in accordance with the then applicable commercial arbitration rules of the American Arbitration Association before an arbitrator selected in accordance with such rules. Each party shall be responsible for its costs and expenses in preparing for and attending such arbitration and the costs, fees and expenses of the arbitrator shall be shared equally by the parties.

Section 5.04. No Recourse to Owner Trustsee The Owner Trustee agrees that payment to the Servicer of the Basic Servicing Fee shall be paid by the Owner Trustee without right of reimbursement from any source. The Servicer agrees that the Owner Trustee's duty to pay it either any Additional Servicing Fee or any Reimbursable Cost shall not be obligations of the Owner Trustee in its personal capacity but shall be limited to funds on deposit in the Casualty Account, Certificate Distribution Account, or Condemnation Account, as the case may be.

ARTICLE VI.

ADDITIONAL COVENANTS OF SERVICER

Section 6.01. No Liens. Servicer shall use reasonable efforts to the extent it can control the same not to permit any lien, charge, security interest, mortgage or other encumbrance to be created on or extend to or otherwise arise upon or burden the Trust Estate or any part thereof or any interest therein or the proceeds thereof, other than:

(i) rights of the Tenant, under the Lease;

(ii) any law, ordinance or governmental regulation (including building and zoning ordinances) restricting, regulating or prohibiting the occupancy, use or enjoyment of any Real Property, or regulating the character, dimensions or location of any improvement now or hereafter erected on the Real Property, and rights of eminent domain or governmental rights of police power;

(iii) taxes (including rollback taxes), tax liens, water fees, sewer rents and assessment liens for taxes or assessments either not yet due and payable or whose amount, applicability or validity is being contested by Tenant in good faith by appropriate proceedings; and (iv) mechanics' and materialmen's liens: (i) in an amount not material to the value of the Real Property; (ii) whose amount, applicability or validity is being contested in good faith by Tenant by appropriate proceedings; or (iii) is otherwise permitted under the Lease.

Section 6.02. Requirements of Trustee. If Owner Trustee requires any modification of this Agreement, Servicer shall, at Owner Trustee's request, promptly execute and deliver to Owner Trustee instruments in form satisfactory to Owner Trustee effecting such modification, provided that such modification does not materially adversely (a) affect any of Servicer's rights hereunder or (b) increase any of Servicer's obligations under this Agreement.

ARTICLE VII.

MISCELLANEOUS SERVICING MATTERS

Section 7.01. Fidelity Bond; Errors and Omissions Insurance. Servicer shall maintain with a responsible company at its own expense, a blanket fidelity bond with broad coverage, on all officers, employees or other persons acting in any capacity permitting such persons to handle funds, money, documents and papers relating to the Real Property. Such fidelity bond (i) shall protect and insure Servicer against losses, including forgery, theft, embezzlement, fraud, errors and omissions and negligent acts of such persons and (ii) shall be issued by a company with claims paying rating of "BBB+" or better as determined by the Rating Agency. No provision of this Section 7.01 requiring such fidelity bond shall diminish or relieve Servicer from its duties and obligations as set forth in this Agreement. The minimum coverage under any such bond and insurance policy shall be $500,000.00. Upon request of Owner Trustee, Servicer shall cause to be delivered to Owner Trustee a certified true copy of such fidelity bond and a statement from the surety that such fidelity bond shall in no event be terminated or materially modified without 30 days prior written notice to Owner Trustee.

Section 7.02 Liability Insurance. Servicer shall obtain and maintain at all times during the Term the insurance coverages set forth in Appendix B (the "Servicer's Required Insurance"). The issuer, policy form and terms, coverage limits and deductibles with respect to Servicer's Required Insurance shall be as reasonably required by Owner Trustee from time to time and all such insurance shall be issued by a company with claims paying rating of "BBB+" or better as determined by the Rating Agency. On or prior to the commencement of the Term and annually thereafter, Servicer shall provide to Owner Trustee copies of policies (including receipts or other evidence of premium payment), certificates of insurance or other proof reasonably satisfactory to Owner Trustee evidencing the maintenance by Servicer of the Servicer's Required Insurance.

Section 7.03. Employees and Independent Contractor Status. Servicer shall at all times during the Term maintain sufficient employees to permit Servicer to perform the Obligations in accordance with the Servicing Standard. Servicer shall be solely responsible for its employees and any independent contractors engaged by Servicer. All matters pertaining to the employment, supervision, compensation, promotion and discharge of Servicer's employees shall be solely the responsibility of Servicer, and Servicer shall be solely responsible for their compensation. In no event shall any employee, agent or independent contractor of Servicer be, or be construed to be, an employee, agent or independent contractor of Owner Trustee. Servicer shall at all times comply in all material respects with all applicable Laws relating to employer-employee relations.

Section 7.04. Annual Statements as to Compliance. On or before July 1 of each year (beginning July 1, 1996), Seller shall deliver to Owner Trustee (with a copy to Standard & Poor's Corporation, Commercial Mortgage Surveillance Group, 25 Broadway, 10th Floor, New York, New York 10004-1064), an officer's certificate from an executive officer of Servicer stating that (a) a review of the activities of Servicer during the preceding calendar year and of its performance under this Agreement has been made under such officer's supervision and (b) to the best of such officer's knowledge, based on such review, Servicer has fulfilled all its Obligations under this Agreement throughout such year, or, if there has been a default in the fulfillment of any such Obligation, specifying each such default known to such officer and the nature and status thereof.

Section 7.05. Access to Certain Documentation and Information. Owner Trustee shall have the right, upon reasonable notice, to examine, audit and copy, during business hours on Business Days or at such other times as might be reasonable under applicable circumstances, any servicing files, books, records or other information of Servicer with respect to or concerning the Real Property or this Agreement in Servicer's possession or under its control in Administrator's possession.

Section 7.06 Existeence; Merger or Consolidation of, or Assumption of the Obligations of Servicer. Servicer will do or cause to be done all things necessary to preserve and keep in full force and effect its existence and rights (charter and statutory) throughout the Term. Any Person into which Servicer may be merged or consolidated, or any corporation resulting from any merger, conversion or consolidation to which Servicer shall be a party, or any Person succeeding to the business of Servicer, shall be the successor of the Servicer hereunder, without the execution or filing of any paper or any further act on the part of any of the parties hereto, anything herein to the contrary notwithstanding; provided, however, that the successor or surviving Person shall satisfy the requirements of this Agreement with respect to the qualifications of an Eligible Servicer.

Section 7.07 Servicer Not to Resign. Servicer shall not assign this Agreement nor resign from its obligations and duties hereby imposed on it except upon determination that the performance of its duties hereunder is no longer permissible under applicable law. Any such determination permitting the resignation of Servicer shall be evidenced by an opinion of counsel to such effect delivered to Owner Trustee. No such resignation, nor any termination of Servicer under Articles VIII or IX hereof, shall affect Servicer's obligations under Section 8.08 or any obligations of Servicer arising prior to such resignation or termination.

Section 7.08. Transfer or Delegation of Servicing. (a) Owner Trustee has entered into this Agreement in reliance upon Servicer's independent status, the adequacy of its servicing facilities, plant, personnel, records and procedures, its integrity, reputation and financial standing and the continuance thereof. Without in any way limiting the generality of this Section 7.08, Servicer shall not (i) assign this Agreement or the servicing hereunder or delegate its rights or duties hereunder, (other than as may be permitted under Section 7.08(b)), or (ii) sell or otherwise dispose of all or substantially all of its property or assets (other than as permitted in Section 7.06), without the prior written approval of Owner Trustee.

(b) From and after the date hereof, Servicer shall not delegate any of its Obligations without the prior written consent of Owner Trustee in each instance which may be withheld by Owner Trustee in its sole but reasonable discretion. If such delegation of Servicer's Obligations to a sub-servicer or Contractor is so approved by Owner Trustee, (i) such delegation shall not release Servicer from any of its Obligations hereunder, (ii) Servicer shall remain responsible hereunder for all acts and omissions of any such sub-servicer or Contractor as fully as if such acts and omissions were those of Servicer, (iii) Servicer shall remain the servicer of record, and (iv) such sub-servicer or Contractor shall not be permitted to assume any of the representations and warranties made by Servicer herein, Servicer shall pay all fees and expenses of such sub-servicer or contractor out of the fees paid to Servicer hereunder or other amounts permitted to be reimbursed to Servicer hereunder. If Servicer's responsibilities and duties under this Agreement are terminated, any sub-servicing agreement or other delegated contract shall automatically terminate. Any obligations, duties and responsibilities between Servicer and any approved sub-servicer or Contractor pursuant to any sub-servicing agreement, and any other agreements or transactions between Servicer and any approved sub-servicer or Contractor relating to the Real Property, shall be the sole obligation, duty and responsibility of Servicer and Owner Trustee shall have no obligations, duties or liabilities with respect to such sub--servicer or Contractor including, without limitation, the payment of fees and expenses. Any such sub-servicing agreement or other agreement between Servicer and an approved sub-servicer or Contractor shall expressly obligate such sub-servicer to strictly comply with all of the provisions of this Agreement and the Term Trust Agreement. Notwithstanding the foregoing provisions of this Section 7.08(b), Servicer and Owner Trustee hereby acknowledge that they contemplate that Servicer will engage one or more Contractors in connection with the provision of Property Management Services or Construction Management Services should the same be required hereunder. In such event, Owner Trustee and Servicer shall enter into an amendment hereto setting forth the scope of the delegated Obligations and the terms and conditions and compensation for their performance.

(c) Servicer shall promptly notify Owner Trustee in the event of (i) a reorganization, merger or consolidation of Servicer, (ii) a change of its name or business address, or (iii) the occurrence of a material adverse change in its financial position.

ARTICLE VIII

DEFAULT

Section 8.01. Events of Default. The term "Event of Default" as used herein shall mean any of the following:

(a) any failure by Servicer to remit or deposit any payment required to be made under the terms of this Agreement, which failure continues beyond the second day following the date upon which such payment was due; or (b) any failure on the part of Servicer duly and timely to observe or perform in any material respect any other of the covenants or agreements on the part of Servicer set forth in this Agreement or in any agreement executed and delivered by Servicer in connection with this Agreement or the transactions contemplated hereby, which continues unremedied for a period of 10 days (or such longer period of time (not to exceed 90 days) as may be required to cure such failure if the same is not susceptible of being cured within 10 days so long as Servicer has commenced such cure and diligently prosecutes such cure to completion) after the date upon which written notice of such failure requiring the same to be remedied shall have been given to Servicer by Owner Trustee; or (c) any representation or warranty made by Servicer in this Agreement shall be untrue in any material respect as of the date when made or at any other relevant time; or (d) the occurrence of an Insolvency Event with respect to Servicer.

Section 8.02. Remedies. Upon the occurrence of any Event of Default, and for so long as the same shall be continuing, Owner Trustee may, by notice in writing to Servicer and in addition to whatever rights Owner Trustee may have hereunder, at law or in equity, terminate subject to the provisions of Section 9.03, all the rights and obligations of Servicer under this Agreement and in and to the Real Property and the proceeds thereof, including, without limitation, the right to receive any further Servicing Fees (excluding any earned but unpaid Servicing Fees, which shall be payable to Servicer after first deducting Owner Trustee's damages therefrom). On or after the receipt by Servicer of such written notice, all authority and power of Servicer under this Agreement, whether with respect to the Real Property or otherwise, shall pass to and be vested in Owner Trustee or any successor appointed pursuant to Section 8.03. Servicer shall comply with the provisions of Section 8.03 with respect to the transfer of servicing and asset management obligations to such successor.

Section 8.03. Successor to Servicer. (a) Prior to termination of Servicer's responsibilities and duties under this Agreement pursuant to Section 8.02, or resignation permitted by Section 7.07, Owner Trustee may select a successor which shall succeed to all rights and assume all of the responsibilities and duties (but not liabilities) of Servicer under this Agreement prior to the termination of Servicer's responsibilities and duties (but not liabilities) under this Agreement. If Servicer's duties and responsibilities (but not liabilities) under this Agreement are terminated, Servicer shall discharge such duties and responsibilities during the period from the date it acquires knowledge of such termination until the effective date thereof in accordance with the Servicing Standard, and with the same degree of diligence and prudence, which it is obligated to exercise under this Agreement, and shall take no action whatsoever that might impair or prejudice the rights or financial condition of its successor. The removal of Servicer to this Agreement shall in no event relieve Servicer of its obligations and liabilities hereunder, or extinguish the remedies available to Owner Trustee to the extent provided herein.

(b) Any successor appointed as provided herein shall execute, acknowledge and deliver to Owner Trustee an instrument accepting such appointment, whereupon such successor shall become fully vested with all the rights, powers, duties, responsibilities and obligations (but not accrued liabilities) of Servicer, with like effect as if originally named as a party to this Agreement. Any termination of this Agreement or any termination of Servicer shall not affect any claim that Owner Trustee may have against Servicer arising prior to any such termination or any claim under Section 8.08.

(c) Servicer agrees to cooperate with Owner Trustee and such successor in effecting the termination of Servicer's responsibilities and rights hereunder, includ-ing, without limitation, the transfer to such successor for administration by it of all funds, if any, which at the time are being administered by Servicer pursuant hereto, or thereafter received with respect to the Real Property. Servicer shall timely deliver to the successor any Collections received by it, and all servicing files, books and records relating to the Real Property, and all other related documents, statements and funds relating to the Assets held by it hereunder. Servicer shall account for all funds and shall execute and deliver such instruments and do such other things as may reasonably be required to more fully and definitely vest and confirm in the successor all such rights, powers, duties, responsibilities and obligations of Servicer. All actions to be taken by Servicer pursuant to this Section 8.03 shall be taken at Servicer's sole expense without reimbursement therefor.

Section 8.04 Waiver of Defaults. The Owner Trustee may, but only in accordance with Section 6.15 of the Term Trust Agreement, in writing, waive any default by Servicer in the performance of its obligations hereunder and its consequences. Upon any such waiver of a past default, such default shall cease to exist, and any Event of Default arising therefrom shall be deemed to have been remedied for every purpose of this Agreement. No such waiver shall extend to any subsequent or other default or impair any right consequent thereon except to the extent expressly so waived.

Section 8.05. Remedies Cumulative. Owner Trustee shall be entitled to exercise any right or remedy that it may have pursuant to this Agreement, at law or in equity, and such exercise shall not preclude the concurrent or subsequent exercise of any other such right or remedy, it being understood and agreed that such rights and remedies are cumulative and not exclusive.

Section 8.06. Owner Trustee's Right to Cure. Owner Trustee may, but shall not be obligated to, cure any Event of Default by Servicer under this Agreement at any time after notice and the lapse of any cure period to which such Event of Default relates, but without further notice. Whenever Owner Trustee so elects, all costs and expenses incurred by Owner Trustee in curing any such default, including reasonable attorneys' fees and disbursements, together with interest at the rate of 12% per annum on the amount of costs and expenses so incurred commencing on the day such costs are paid by Owner Trustee, shall be paid by Servicer to Owner Trustee within 20 days of demand.

Section 8.07 Payment of Owner Trustee's Expenses. In the event Servicer fails to perform its obligations or is otherwise in default under this Agreement, all costs and expenses, including attorneys' fees (whether or not legal proceedings are instituted), involved in enforcing the obligations of Servicer under this Agreement, including the cost and expense of appointing a successor to -Servicer pursuant to Section 8.03 after any termination of Servicer pursuant to Section 8.02, shall be due and payable by Servicer within 20 days of demand.

Section 8.08. Indemnification. Servicer shall defend, indemnify and hold harmless the Indemnified Parties against any and all claims, losses (including market losses), penalties, fines, forfeitures, legal fees and related costs, judgments, and any other costs, fees, and expenses that Owner Trustee may sustain in any way, related to (a) the failure (grossly negligent or willful) of Servicer to perform its Obligations in compliance with the terms of this Agreement (including, without limitation, those terms relating to timeliness) and (b) any material breach of a representation, warranty or covenant made by Servicer in this Agreement, or in any schedule, statement, certificate or document furnished by Servicer pursuant to or with this Agreement. The obligations of Servicer under this Section 8.08 shall survive the termination of this Agreement or of Servicer and shall not be affected by any knowledge obtained by Owner Trustee in the course of its due diligence activities or otherwise.

Section 8.09. Defaults by Owner Trustee. Subject to Section 5.03, if Owner Trustee shall fail to pay any amount required to be paid hereunder to Servicer within thirty (30) days after written demand therefor by Servicer following the date on which such payment was due, Servicer may terminate this Agreement upon fifteen (15) days written notice of such termination to Owner Trustee following the expiration of said thirty (30) day period, and Servicer shall be entitled in such event, to exercise any right or remedy that Servicer may have pursuant to this Agreement, at law or in equity.

ARTICLE IX.

TERMINATION

Section 9.01. Termination. In addition to a termination pursuant to Section 8.02, the respective obligations and responsibilities of Servicer hereunder shall terminate upon the later of (a) the Final Distribution Date, and (b) mutual consent of Servicer and Owner Trustee in writing.

Section 9.02. Termination without Cause. Owner Trustee may, at its sole option, terminate any rights Servicer may have hereunder, without cause, by giving 30 days written notice of termination to Servicer in the manner provided in Section 10.04. If Owner Trustee so terminates Servicer, Owner Trustee shall pay Servicer all accrued but unpaid Servicing Fees, including the amount of any Reimbursable Costs Servicer is entitled to receive pursuant hereto. On or after the receipt by Servicer of such written notices all authority and power of Servicer under this Agreement, -whether with respect to the Real Property or otherwise, shall pass to and be vested in any successor appointed pursuant to Section 8.03. Servicer shall comply with the provisions of Section 8.03 with respect to the transfer of servicing obligations to such successor; provided, however, in the event of a termination under this Section 9.02, notwithstanding the provisions of Section 8.03(c), Owner Trustee shall reimburse Servicer for its reasonable expenses of transferring to the successor the files and documents relating to the Real Property.

Section 9.03. Rating Agency Confirmation. Notwithstanding anything to the contrary set forth in this Article IX or in Section 8.02, no termination of this Agreement or of Servicer shall be effective unless and until (a) the Rating Agency shall have confirmed in writing that such termination shall not result in a downgrade, qualification or withdrawal of its then assigned rating with respect to the Certificates at the time of any such termination.

ARTICLE X.

MISCELLANEOUS PROVISIONS

Section 10.01. Governing Law; Submission to Jurisdiction. (a) This Agreement shall be governed by and construed in accordance with the internal laws of the State of Illinois without regard to principles of conflict of laws.

(b) Servicer hereby irrevocably submits to the nonexclusive jurisdiction of any State or Federal court sitting in Chicago, Illinois, in any action or proceeding arising out of or relating to this Agreement, and irrevocably agrees that all claims in respect of such action or proceeding may be heard and determined in such State or Federal court, Servicer agrees that any process or notice of motion or other application to any such court or a judge thereof may be served on Servicer within or outside such court's territorial jurisdiction by registered or certified mail or by personal service at Servicer's address set forth in Section 10.04, provided that a reasonable time for appearance is allowed.

(c) Servicer irrevocably waives any objection which it may now or hereafter have to the laying of venue of any suit, action or proceeding arising out of or relating to this Agreement in any State or Federal court sitting in Chicago, Illinois and hereby further irrevocably waives any claim that any such suit, action or proceeding brought in any such court has been brought in an inconvenient forum.

(d) Nothing herein contained shall affect the right of Owner Trustee or Servicer to serve legal process in any other manner permitted by law or to bring any action or proceeding against Servicer or Owner Trustee or its property in the courts of other jurisdictions.

Section 10.02 General Interpretative Principles. For purposes of this Agreement, except as otherwise expressly provided or unless the context otherwise requires:

(a) the terms defined in this Agreement have the meanings assigned to them in this Agreement and include the plural as well as the singular, and the use of any gender herein shall be deemed to include the other gender;

(b) references herein to "Articles," "Sections," "Subsections," "Paragraphs," and other subdivisions without reference to a document are to designated Articles, Sections, Subsections, Paragraphs, and other subdivisions of this Agreement;

(c) references herein to determinations to be made by Owner Trustee in its "sole discretion" or words to that effect shall mean Owner Trustee's sole and absolute discretion acting in its own economic self-interest even if the same is not in the interest of Servicer or any other Person;

(d) whenever notices, consents or approvals are required to be given by Owner Trustee hereunder, such notices, consents or approvals shall be in writing and shall be delivered in the manner required by Section 11.04;

(e) all consents or approvals to be given by Owner Trustee hereunder shall be given by the Scribcor in writing unless expressly provided otherwise herein;

(f) references to "in writing" or words to that effect shall include, where appropriate, an electronic mail or other computer generated communication;

(g) to the extent any obligations are imposed on Owner Trustee by this Agreement or other documents executed in connection with the transactions contemplated hereby, Owner Trustee shall have no personal liability to Servicer for its failure to perform such obligations;

(h) the word "include" or "including" shall mean, without limitation by reason of enumeration; and (i) the word "herein", "hereof", "hereunder" and other words of similar impact refer to this Agreement as a whole and not to any particular provision.

Section 10.03. Reproduction of Documents. This Agreement and all documents relating hereto, including, without limitation, (a) consents, waivers, and modifications which may hereafter be executed (b) documents received by any party at the closing, and (c) certificates, and other information previously or hereafter furnished, may be reproduced by any photographic, photostatic, microfilm, micro-card, miniature photographic, or other similar process. The parties agree that any such reproduction shall be admissible in evidence as the original itself in any judicial or administrative proceeding, whether or not the original is in existence and whether or not such reproduction was made by a party in the regular course of business, and that any enlargement, facsimile, or further reproduction of such reproduction shall likewise be admissible in evidence.

Section 10.04. Notices. Any notice required or desired to be given hereunder shall, unless specified otherwise herein, be in writing and deemed to have been duly given if deposited in the United States mail, postage prepaid, sent certified or registered, or hand delivered or sent by a nationally recognized overnight courier service (such as Federal Express or Airborne Express), postage prepaid or billed to sender, addressed as follows:

| | |
|---|---|
| If to Servicer: | Scribcor, Inc.<br>400 North Michigan Avenue<br>Chicago, Illinois 60611<br>Attention: Richard M. Ross |
| With a Copy to: | Stephen G. Tomlinson, Esq.<br>Kirkland & Ellis<br>200 East Randolph Drive<br>Chicago, IL 60601 |
| If to Owner Trustee to: | The First National Bank of Chicago<br>Corporate Trust Offices<br>One First National Plaza, Suite 0126<br>Chicago, Illinois 60670-0126<br>Attention: Corporate Trust Department<br>Trust Number 19-203062 |

or to such other address or person as hereafter designated in writing by the applicable party in the manner provided in this paragraph for the giving of notices. Such notices shall be deemed to have been delivered upon receipt or refusal of delivery.

Section 10.05. Severability of Provisions. If any one or more of the covenants, agreements, provisions, or terms of this Agreement shall be held invalid for any reason whatsoever, then such covenants, agreements, provisions, or terms shall be deemed severable from the remaining covenants, agreements, provisions, or terms of this Agreement and shall in no way affect the validity or enforceability of the other covenants, agreements, provisions, or terms of this Agreement. If the invalidity of any covenant, agreement, provision, or term of this Agreement shall deprive any party of the economic benefit intended to be conferred by this Agreement, the parties shall negotiate in good faith to develop a structure the economic effect of which is as nearly as possible the same as the economic effect of this Agreement without regard to such invalidity.

Section 10.06. Exhibits and Appendices. The exhibits and appendices to this Agreement are hereby incorporated and made a part hereof and are an integral part of this Agreement.

Section 10.07. Counterparts; Assignement. This Agreement may be executed in one or more counterparts and by the different parties hereto on separate counterparts, each of which, when so executed, shall be deemed to be an original; such counterparts, together, shall constitute one and the same agreement. This Agreement is not assignable by Servicer but may be assigned by Owner Trustee upon notice to Servicer.

Section 10.08. Effect of Headings. The headings in this Agreement are for purposes of reference only and shall not limit or otherwise affect the meaning hereof.

Section 10.09. Other Agreements Superseded. This Agreement (including the Exhibits hereto) supersedes all prior agreements and understandings relating to the subject matter hereof.

Section 10.10. Amendments. Neither this Agreement nor any term hereof may be changed, waived, discharged, or terminated except by an instrument in writing signed by the party against whom enforcement of the change, waiver, discharge, or termination is sought.

Section 10.11. Further Assurances. Servicer agrees to execute and deliver such instruments and take such actions as Owner Trustee may, from time to time, reasonably request in order to effectuate the purpose and to carry out the terms of this Agreement.

Section 10.12. No Partnership. Nothing contained in this Section 10.12 or elsewhere in this Agreement shall be decreed or construed to create a partnership or joint venture between the parties hereto and the services of Servicer shall be rendered as an independent contractor and not as agent for Owner Trustee.

Section 10.13. Time is of the Essence. Owner Trustee and Servicer agree that time is of the essence with respect to the timely performance of each and every obligation and covenant contained in this Agreement.

Section 10.14. Drafting of Agreement. Owner Trustee and Servicer acknowledge and agree that each party was represented by legal counsel of its choosing and participated equally in the negotiation and drafting of this Agreement.

Section 10.15. Confidentiality. Servicer shall keep confidential and not divulge, without Owner Trustee's written consent, to any Person the terms and conditions of this Agreement, any Servicing File, any Real Property Documentation or any document or instrument delivered in connection therewith or herewith, except to the extent that it is appropriate for Servicer to do so in working with legal counsel, auditors, taxing authorities or other governmental agencies having regulatory jurisdiction over Servicer.

Section 10.16. References to Related Agreements. Any references in this Agreement to defined terms or sections contained in the Lease or Term Trust Agreement shall refer to such defined terms and sections contained therein as in effect on the date of this Agreement (or if an agreement is not in effect on such date, the most recent form thereof which has been provided to Servicer prior to such date) and shall continue to have such meaning (in the case of defined terms) or refer to such section (in the case of section references) notwithstanding any subsequent amendment, supplement or termination of such agreements.

IN WITNESS WHEREOF, Owner Trustee and Servicer have caused their names to be signed hereto by their respective officers thereunto duly authorized as of the day and year first above written.

SERVICER:

SCRIBCOR, INC., an Illinois corporation

By: ____________________________

Name: ____________________________

Title: ____________________________

OWNER TRUSTEE:

THE FIRST NATIONAL BANK OF CHICAGO

By: ____________________________

Name: ____________________________

Title: ____________________________

REPRESENTATIONS FOR DEPOSIT/WITHDRAWAL AT CUSTODIAN ("DWAC") -- to be included in DTC Letter of Representations The Security certificate(s) shall remain in Agent's custody as a "Balance Certificate" subject to the provisions of the Balance Certificate Agreement between Agent and DTC currently in effect.

On each day on which Agent is open for business and on which it receives an instruction originated by a Participant through DTC's Deposit/Withdrawal at Custodian ("DWAC") system to increase the Participant's account by a specified number of shares, units, or obligations (a "Deposit Instruction"), Agent shall, before 6:30 p.m. (Eastern Time) that day, either approve or cancel the Deposit Instruction through the DWAC system.

On each day on which Agent is open for business and on which it receives an instruction originated by a Participant through the DWAC system to decrease the Participant's account by a specified number of shares, units, or obligations (a "Withdrawal Instruction"), Agent shall, before 6:30 p.m. (Eastern Time) that day, either approve or cancel the Withdrawal Instruction through the DWAC system.

Agent agrees that its approval of a Deposit or Withdrawal Instruction shall be deemed to be the receipt by DTC of a new, reissued or reregistered certificated security on registration of transfer to the name of Cede & Co. for the quantity of Securities evidenced by the Balance Certificate after the Deposit or Withdrawal Instruction is effected.

Principal and Interest Payments Rider

1. This Rider supersedes any contradictory language set forth in the Letter of Representations to which it is appended.

2. With respect to principal and interest payments in the Securities:

A. DTC shall receive all dividend and interest payments on payable date in same-day funds by 2:30 p.m. ET (Eastern Time).

B. Issuer agrees that it or Agent shall provide dividend and interest payment information to a standard announcement service subscribed to by DTC. In the unlikely event that no such service exists, Issuer agrees that it or Agent shall provide this information directly to DTC in advance of the dividend or interest record date as soon as the information is available.

This information should be conveyed directly to DTC electronically. If electronic transmission is not possible, such information should be conveyed by telephone or facsimile transmission to:

The Depository Trust Company
Manager, Announcements
Dividend Department
7 Hanover Square, 22nd Floor
New York, NY 10004

Phone: (212) 709-1270
Fax: (212) 709-1723, 1686

C. Issuer agrees that it or Agent shall provide automated notification of CUSIP-level detail to the depository no later than noon ET on the payment date.

D. DTC shall receive maturity and redemption payments and CUSIP-level detail on the payable date in same-day funds by 2:30 p.m. ET. Absent any other arrangements between Agent and DTC, such payments shall be wired according to the following instructions:

[6/95]

Chemical Bank
ABA 021000128
For credit to A/C Depository Trust Company
Redemption Account 066-027306 in accordance with existing SDFS payment procedures in the manner set forth in DTC's *SDFS Paying Agent Operating Procedures* a copy of which has previously been furnished to Agent.

E. DTC shall receive all other payments and CUSIP-level detail resulting from corporate actions (such as tender offers or mergers) on the first payable date in same-day funds by 2:30 p.m. ET. Absent any other arrangements between the Agent and DTC, such payments shall be wired to the following address:

Chemical Bank
ABA 021000128
For credit to A/C Depository Trust Company
Reorganization Account 066-027608

APPENDIX A

Definitions

"Actual Knowledge" of any fact shall mean with respect to any Person or party, Conscious Awareness (as hereinafter defined) of a fact or that such fact is contained in a document of which such person has Conscious Awareness or which was created during the course of a transaction in which such person actively participated. A person, however, shall not be deemed to have Actual Knowledge of a fact merely because (i) such fact is contained in a document approved by such person if such person does not have Conscious Awareness of such document or if such document was not created during the course of a transaction in which such person actively participated or (ii) any other individual in such person's organization has Actual Knowledge of such fact.

"Additional Services" shall mean, collectively, Property Management Services, Casualty Services, Condemnation Services and Construction Management Services and, individually, any one or more of the preceding.

"Additional Servicing Fee" shall have the meaning set forth in Appendix C.

"Affiliate" shall mean, with respect to any Person, any Person or party owning, or owned by a Person or party owning, directly or indirectly ten percent (10%) or more of the voting interest of such Person, or otherwise having the ability to exercise control over such Person.

"Agreement" shall have the meaning given in the introductory sentence of this Servicing Agreement.

"Basic Services" shall mean all services required to be performed by Servicer under the Agreement other than the Additional Services.

"Basic Servicing Fee" shall have the meaning given in Section 5.01.

"Casualty Account" shall mean a segregated trust account established by the Term Trustee at The First National Bank of Chicago, or if there shall be designated a successor Term Trustee, at such successor Term Trustee acting in its commercial capacity, known as the K.C. ABBE® Trust 1995-1 Casualty Account, bearing an additional designation clearly indicating that the funds deposited therein are held for the benefit of the Certificateholders. All fees and expenses for maintaining the Casualty Account shall be included in the trustee's fees payable to the Term Trustee in connection with this Agreement and shall not constitute Reimbursable Costs.

"Casualty Loss" shall mean any loss or damage suffered or incurred in respect of the Real Property arising out of or in connection with any fire, windstorm, flood, earthquake, act of god, war, strike or other casualty.

"Casualty Loss Termination" shall mean any termination of the Lease resulting from the occurrence of a Casualty Loss.

"Casualty Proceeds" shall mean the aggregate amount of payment received by the Term Trustee in respect of any Casualty Loss affecting the Real Property including, without limitation, all proceeds of any insurance maintained by the Tenant or the Term Trustee in respect thereof.

"Casualty Services" shall have the meaning given to it in Section 4.09.

"Certificate" shall mean one or more certificates of ownership of beneficial interest in the Term Trust issued by the Term Trustee pursuant to Section 3.3 of the Term Trust Agreement in substantially identical form to the sample certificate attached to the Agreement as Exhibit A.

"Certificate Distribution Account" shall mean the bank account established and maintained by the Term Trustee pursuant to Section 5.1 of the Term Trust Agreement.

"Certificateholder" shall mean each Person in whose name one or more Certificates is registered as of a particular date as evidenced by the Certificate Register.

"Collections" shall mean all monies, cash, rent or other payments received by the Term Trustee in respect of the Lease, the Real Property or otherwise including, without limitation the amount of all judgments, awards or other payments made in connection with the enforcement of the Lease by the Term Trustee, the amount of any Net Casualty Proceeds or Net Compensation.

"Compensation" shall mean the amount of any award, judgment, settlement or other payment receive by the Term Trustee in respect of any Condemnation of all or any portion of the Real Property.

"Condemnation" shall mean any taking, condemnation or other exercise of the power of eminent domain by any governmental or quasi-governmental authority having such power affecting all or any portion of the Real Property.

"Condemnation Account" shall mean a segregated trust account established by the Term Trustee at The First National Bank of Chicago, or if there shall be designated a successor Term Trustee, at such successor Term Trustee acting in its commercial capacity, known as the K.C. ABBE® Trust 1995-1 Condemnation Account, bearing an additional designation clearly indicating that the funds deposited therein are held for the benefit of the Certificateholders. All fees and expenses for maintaining the Condemnation Account shall be included in the trustee's fees payable to the Term Trustee in connection with this Agreement and shall not constitute Reimbursable Costs.

"Condemnation Services" shall have the meaning given in Section 4.10.

"Conditional Receipt" shall have the meaning given in Section 4.03.

"Conscious Awareness" shall mean with respect to any Person or party, that such Person actually remembered a fact at the given time. A Person shall not be deemed to have Conscious Awareness of a fact at a given time if such Person did not actually remember a fact at the given time unless such fact is contained in a document previously read or executed by such Person in the course of a transaction in which such Person actively participated. A Person shall not be deemed to have Conscious Awareness of a fact merely because any other individual in such Person's organization has Conscious Awareness of such fact.

"Construction Management Services" shall mean such usual and customary supervisory and management services relating to the supervision, management and coordination of the activities of one or more architects, engineers and construction contractors engaged by Owner Trustee to perform construction activities required for the repair or restoration of the Real Property following a Casualty Loss Termination including, without limitation, the following: (i) consultation and recommendations regarding design documents and bidding qualifications and information; (ii) consultation and recommendations regarding project budgets and schedules; (iii) coordination of information flows and decision making on behalf of the Owner Trustee; (iv) review of required permits and licenses; (v) consultation and recommendations regarding project insurance programs; (vi) inspection of work in progress for conformance with applicable contract requirements; (vii) preparation of progress reports and recommendations for budget and schedule compliance or modifications; (viii) review and recommendations regarding payment applications and change orders; (ix) attendance on behalf of Owner Trustee at all project meetings and (x) consultation and recommendations regarding achievement of substantial completion and final completion of the work required to be performed. Owner Trustee and Servicer shall enter into an amendment to this Agreement setting forth the agreed upon scope of and compensation for the Construction Management Services at the time the same are requested by Owner Trustee, which amendment shall have been submitted to the Rating Agency, and the Rating Agency shall have confirmed that such amendment shall not result in a downgrade, qualification or withdrawal of its then assigned rating with respect to the Certificates.

"Contractors" shall mean any Person (other than Servicer) in the business of performing services of the nature constituting the Obligations with whom Servicer may contract pursuant to a sub-servicing or other written agreement for the performance of one or more of the Additional Services.

"Corporate Trust Office" shall mean the office maintained by the Term Trustee at One First National Plaza, Suite 0126, Chicago, Illinois 60670-0126.

"Default Notice" means any notice of the occurrence of an Event of Default given pursuant to Section 4.06 of the Agreement.

"Eligible Servicer" shall mean the commercial loan servicing, property or asset management group which is part of or an Affiliate of the Term Trustee, or any Person or party who: (i) has not less than ten (10) years of experience as a professional asset or property manager and is licensed (if required) to perform such services in the locale of the Real Property; (ii) then has under management a portfolio of commercial and office properties containing in the aggregate not less than two (2) million square feet or with an aggregate fair market value of not less than $20,000,000.00; and (iii) then has not fewer than twenty (20) employees directly engaged in the provision of asset or property management services, or is otherwise acceptable to the Rating Agency.

"Emergency" shall mean any fact or circumstance the existence of which constitutes an imminent risk of material harm or injury to persons or property.

"Enforcement Proceedings" shall have the meaning given in Section 4.07.

"Event of Default" shall mean any fact or matter the occurrence of which constitutes a default or an Event of Default under the Lease (or any Replacement Lease).

"Final Distribution Date" shall have the meaning set forth in Section 7.1 of the Term Trust Agreement.

"Guarantee" shall mean that certain guarantee of the Lease by Kansas City Life Insurance Company dated November 13, 1991.

"Insolvency Event" shall mean with respect to Servicer: (i) the filing of a petition in bankruptcy for reorganization or liquidation pursuant to Title 11 of the United States Code (the "Bankruptcy Code") or any similar state or federal law; (ii) the entry of a decree by a court of competent jurisdiction adjudicating Servicer to be bankrupt or insolvent; (iii) the making of an assignment for the benefit of creditors; (iv) the making of an admission in writing or inability to pay debts generally as they become due; or (v) consent to the appointment of a receiver for any material portion of Servicer's assets.

"Landlord" shall mean the Term Trustee, in its capacity as the landlord under the Lease, together with any successors and assigns.

"Lease" shall mean that certain lease dated December 29, 1989 by and between Old American Insurance Company, as tenant, and R&S Kansas City Associates Limited Partnership as landlord, regarding the Real Property, as amended by a First Amendment to Lease, dated November 12, 1991, as guaranteed by the Guarantee, copies of which are attached hereto as Exhibit A, and any Replacement Lease, as applicable.

"Laws" shall mean all statutes, codes, rules, regulations, ordinances, decrees and enactments of any governmental or quasi-governmental agency having jurisdiction over: (i) the Real Property, or its use and operation; (ii) the Term Trustee; or (iii) the Trust Estate.

"Minimum Required Insurance" shall mean such coverage and limits required to be maintained by Tenant under the Lease.

"Net Casualty Proceeds" shall mean the aggregate amount of Casualty Proceeds received by the Term Trustee in respect of any Casualty Loss less all Reimbursable Costs incurred by the Term Trustee in connection with the adjustment, negotiation, settlement, or collection of such Casualty Proceeds or the exercise or performance by the Term Trustee of any of its rights, powers or duties under the Agreement.

"Net Compensation" shall mean the aggregate amount of Compensation received by the Term Trustee in connection with any Condemnation less all Reimbursable Costs incurred by the Term Trustee in connection with any negotiation, adjudication or settlement regarding the amount of such compensation or the exercise or performance by the Term Trustee of any of its rights, powers or duties under the Agreement.

"Obligations" has the meaning given in Section 4.01.

"Offering Memorandum" has the meaning given in Section 2.01(k).

"Partial Condemnation" shall mean (i) any taking in or by condemnation or other eminent domain proceeding pursuant to any law, general or special or (ii) temporary requisition of the Real Property or any part thereof by any governmental authority, civil or military after the occurrence of which the Lease (or any Replacement Lease) shall remain in full force and effect.

"Person" shall mean any corporation, partnership, limited liability company, or other entity or human being.

"Property Management Services" shall mean such usual and customary activities as are required to oversee and perform all aspects of the day to day management, oversight, operation and maintenance of the Real Property in a manner consistent with the Servicing Standard and so as to cause the Real Property to be maintained in good condition and in compliance with all Laws. Owner Trustee and Servicer shall enter into an amendment to the Agreement setting forth the agreed upon scope of and compensation for the Property Management Services at the time the same are requested by Owner Trustee, which amendment shall have been submitted to the Rating Agency and the Rating Agency shall have confirmed that such amendment shall not result in a downgrade, qualification or withdrawal of its then assigned rating with respect to the Certificates.

"Property Report" shall mean a written report setting forth in reasonable detail the results of the inspections of the Real Property made pursuant to Section 4.06 including the recommendation of the Servicer as to any repair or remedial work to be performed at the Real Property and the opinion of the Servicer as to whether or not the Tenant is maintaining the Real Property in the condition required by the Lease.

"Rating Agency" means Standard & Poor's Corporation.

"Real Property" means the land and all buildings and improvements located thereon (including all fixtures and equipment incorporated therein not owned by a Tenant) commonly known as 4900 Oak Street, Kansas City, Missouri and legally described on Appendix C to the Agreement.

"Reimbursable Costs" shall mean all fees, expenses, costs or other charges incurred in good faith by Servicer in the performance of Additional Services under the Agreement, including, without limitation, all payments required to be made by the Servicer to Contractors engaged by the Servicer pursuant to Section 7.08(b). Reimbursable Costs shall be determined as more particularly set forth in Appendix C.

"Remainder Proceeds" shall mean the greater of zero and the difference between the Net Compensation received by the Term Trustee in respect of a Total Condemnation and the Prepayment Amount payable in respect thereof.

"Remainder Trust" shall mean the K.C. LURE® Trust 1995-1 established pursuant to that certain Trust Agreement of even date herewith between Seller and the First National Bank of Chicago, as Trustee.

"Remainder Trustee" shall mean the Trustee under the Remainder Trust.

"Rent" shall mean rent as defined in the Lease or as the term may be defined under any Replacement Lease.

"Rent Invoices" shall have the meaning set forth in Section 4.03.

"Replacement Lease" means any lease for all or any portion of the Real Property entered into pursuant to Section 4.08 of the Agreement, which Lease (A) shall require the tenant thereunder at its sole cost and expense to: (i) maintain at least the Minimum Required Insurance; (ii) pay all ad valorem and other real property taxes levied against the Real Property; (iii) maintain or cause the Real Property to be maintained in good operating condition and in compliance with all Laws, and (B), shall have been submitted to Standard & Poor's Corporation for its review, and Standard & Poor's Corporation shall not, based upon such review, have down-graded qualified or withdrawn its then assigned rating with respect to the Certificates.

"Replacement Tenant" shall mean any Tenant under a Replacement Lease.

"Responsible Officer" shall mean, with respect to any party to the Agreement or any Certificateholder, the president, any vice-president, assistant vice-president, secretary, assistant secretary or other officer or officers customarily performing functions similar to those performed by any of the above, or to whom any matter arising under this Agreement, the Lease or the Administrative Agreement may be referred, having the legal authority to bind the party in question.

"Seller" shall mean Scribcor, Inc., an Illinois corporation, its successors and assigns in its capacity as "Seller" under the Term Trust Agreement.

"Servicing Fees" shall mean all compensation to be paid to Servicer hereunder, including, without limitation, all Basic Servicing Fees, Additional Servicing Fees and Reimbursable Costs.

"Servicer" means initially Scribcor, Inc., in its capacity as Servicer, or any party who may succeed to Scribcor Inc. as Servicer pursuant to the terms of the Agreement.

"Servicer's Required Insurance" shall have the meaning given in Section 7.02.

"Servicing Agreement" means the Servicing Agreement attached hereto as Exhibit __ and all amendments, modifications or replacements thereof.

"Servicing Standard" has the meaning given in Section 3.01.

"Tenant" shall mean Old American Insurance Company, together with its subtenants, of whatever level, successors and assigns and all parties claiming by or through any of them, and any tenant under any Replacement Lease, or any subtenant (of whatever level) or assignee thereof.

"Term Trust" shall mean the K.C. ABBE® Trust 1995-1 as established pursuant to the Term Trust Agreement by and between Seller and the Term Trustee.

"Term Trust Agreement" means the First Amended and Restated Term Trust Agreement dated as of April 27, 1995 by and between Seller and Term Trustee, a copy of which is attached hereto as Exhibit B.

"Term Trustee" shall mean The First National Bank of Chicago, not personally but solely as trustee under the K.C. ABBE® Trust 1995-1, together with any Person who shall be appointed a successor trustee under the Agreement pursuant to Section 6.11 thereof.

"Term" shall mean the period commencing on the date of the Agreement and ending on the first to occur of the termination of the Agreement by Owner Trustee pursuant to Articles VIII or IX of the Agreement and December 31, 2009.

"Total Condemnation" shall mean any Condemnation after the occurrence of which the Lease shall be terminated pursuant to Article XV of the Lease or any similar provision in any Replacement Lease.

"Trust Estate" shall mean all right title and interest of the Term Trustee in and to (i) the Real Property; (ii) the Lease and the Guarantee, including without limitation all right to receive the Rent payable under the Lease or any Replacement Lease and any other payments due thereunder or under the Guarantee, and (iii) the accounts held by the Term Trustee pursuant to the provisions of this Agreement.

APPENDIX B

SERVICER'S REQUIRED INSURANCE

APPENDIX C

Additional Services

If Owner Trustee shall request that Servicer perform Additional Services pursuant to the terms of the Agreement, the Additional Servicing Fee and Reimbursable Costs payable in connection therewith shall be determined in accordance with this Appendix C.

Casualty Services and Condemnation Services

In the event of a Casua`lty Loss (other than a Casualty Loss resulting in a Casualty Loss Termination) or a Partial Condemnation, the Additional Servicing Fee payable to Servicer in connection with the performance of the Casualty Services or Condemnation Services, as applicable, relating thereto shall be determined as follows: not later than five (5) business days following receipt of a request from Owner Trustee for the performance of Casualty Services or Condemnation Services setting forth in reasonable detail the scope of services to be performed, Servicer shall prepare an itemized budget setting forth in detail the specific tasks to be performed by Servicer in connection with the performance of the Additional Services specified in such request, the respective hourly charge for the employees of Servicer who shall discharge such Additional Services and the estimated number of hours necessary to complete the same (the "Budget"). The hourly rate to be charged by Servicer in connection with the performance of such Additional Services shall in no event exceed the lower of: (i) the rate generally charged by Servicer to other parties to whom it provides similar services in the conduct of its business; and (ii) the "market rate" for such services generally available from providers of such services meeting the requirements of an Eligible Servicer in the locale of the Real Property, as reasonably determined by either the Servicer or the Owner Trustee. In addition, Servicer shall include in the Budget its estimate of the Reimbursable Costs to be incurred by Servicer in connection with the performance of such Additional Services. Owner Trustee shall, not later than three (3) business days following the receipt of the Budget, advise Servicer as to any objections it may have to the Budget, specifying in reasonable detail the basis for such objection. If Servicer and Owner Trustee are unable to resolve any such objections within five (5) business days following receipt of notice thereof by Servicer, the matter shall be submitted to binding arbitration in accordance with the then applicable commercial arbitration rules and the American Arbitration Association before an arbitrator selected in accordance with such rules, and Servicer shall commence performance of the Additional Services requested by Owner Trustee. Prior to the determination of such arbitration, Servicer shall be compensated for such Additional Services at the rate of ninety percent (90%) of the amount specified in the Budget prepared by Servicer, and upon determination of such arbitration the amounts previously paid to Servicer and the Budget with respect to the amounts remaining to be paid to Servicer in respect of such Additional Services shall be adjusted in accordance with the outcome of the arbitration.

Property Management Services and Construction Management

If the Lease or tenant's right to possession of the Real Property thereunder shall be terminated in connection with an Event of Default or a Casualty Loss Termination, the Additional Servicing Fee payable to Servicer in connection with the performance of the Property Management Services or Construction Management Services, as applicable, relating thereto shall be determined as follows: not later than ten (10) business days following receipt of a request from Owner Trustee for the performance of Property Management Services or Construction Management Services, as the case may be, setting forth in reasonable detail the scope of services to be performed, Servicer shall prepare an itemized budget setting forth in detail the specific tasks required to be performed by Servicer (or, subject to Section 7.08(b), a Contractor to be engaged by Servicer), the respective hourly charges for employees of Servicer (or the proposed Contractor) who shall discharge such Additional Services and the estimated number of hours necessary to complete the same, or such other basis for compensation for the Additional Services requested by Owner Trustee as shall be customary in the locale in which the Real Property is located (the "Proposal"). The hourly rate or other basis of compensation to be charged by Servicer (or the Proposed Contractor) in connection with the performance of such Additional Services shall in no event exceed the lower of: (i) the rate or other basis of compensation generally charged by Servicer to other parties to whom it provides similar Services in the conduct of its business; and (ii) the "market rate" for such services generally available from providers of such services meeting, with respect to Property Management Services, the requirements of an Eligible Servicer and in the case of Construction Management Services, meeting the requirements of clauses (i), (ii) and (iii) of Section 4.12 of the Agreement, in the locale of the Real Property, as reasonably determined by either the Servicer or the Owner Trustee. In addition, Servicer shall include in the Proposal an amount allocated to the estimated amount of Reimbursable Costs to be incurred by Servicer (or such Contractor) in connection with the performance of such Additional Services. Owner Trustee shall, not later than five (5) business days following the receipt of the Proposal, advise Servicer as to any objections it may have to the Proposal, and if applicable, the identity of the Contractor Servicer proposes to engage, specifying in reasonable detail the basis for such objection. If Owner Trustee shall object to the identity of the Contractor proposed to be engaged by Servicer, Servicer shall propose one or more other Contractors for the performance of such Additional Services in accordance with Section 7.08(b) or shall perform such Additional Services itself. If Servicer and Owner Trustee are unable to resolve any objection as to the amount of Additional Servicing Fees or Reimbursable Costs to be paid pursuant to the Proposal, within five (5) business days following receipt of notice thereof by Servicer, the matter shall be submitted to binding arbitration in accordance with the then applicable Commercial Arbitration rules and the American Arbitration Association before an arbitrator selected in accordance with such rules, and Servicer and Owner Trustee shall enter into an amendment to the Agreement setting forth the scope of Additional Services to be performed by Servicer (or a Contractor proposed by Servicer subject to the approval requirements of Section 7.08(b)) and Servicer shall commence performance of the Additional Services requested by Owner Trustee. If there shall be an unresolved objection with regard to the Additional Servicing Fee for Reimbursable Costs payable pursuant to the Proposal, then, prior to the determination of the arbitration required above, Servicer shall be compensated for such Additional Services at the rate of ninety percent (90%) of the amount specified in the Proposal, and upon determination of such arbitration, the amounts previously paid to Servicer and the Proposal as it pertains to the amounts remaining to be paid to Servicer in respect of such Additional Services shall be adjusted in accordance with the outcome of the arbitration.

SCHEDULE B

SAMPLE OFFERING DOCUMENT LANGUAGE

DESCRIBING BOOK-ENTRY-ONLY ISSUANCE (Prepared by DTC –bracketed material may be applicable only to certain issues)

1. The Depository Trust Company ("DTC"), New York, N.Y. will act as securities depository for the securities (the "Securities"). The Securities will be issued as fully-registered securities registered in the name of Cede & Co. (DTC's partnership nominee). One fully-registered Security certificate will be issued for [each issue of] the Securities, [each] in the aggregate principal amount of such issue, and will be deposited with DTC. [If, however, the aggregate principal amount of [any] issue exceeds $150 million, one certificate will be issued with respect to each $150 million of principal amount and an additional certificate will be issued with respect to any remaining principal amount of such issue.]

2. DTC is a limited-purpose trust company organized under the New York Banking Law, a "banking organization" within the meaning of the New York Banking Law, a member of the Federal Reserve System, a "clearing corporation" within the meaning of the New York Uniform Commercial Code, and a "clearing agency" registered pursuant to the provisions of Section 17A of the Securities Exchange Act of 1934. DTC holds securities that its participants ("Participants") deposit with DTC. DTC also facilitates the settlement among Participants of securities transactions, such as transfers and pledges, in deposited securities through electronic computerized book-entry changes in Participants' accounts, thereby eliminating the need for physical movement of securities certificates. Direct Participants include securities brokers and dealers, banks, trust companies, clearing corporations, and certain other organizations. DTC is owned by a number of its Direct Participants and by the New York Stock Exchange, Inc., the American Stock Exchange, Inc., and the National Association of Securities Dealers, Inc. Access to the DTC system is also available to others such as securities brokers and dealers, banks, and trust companies that clear through or maintain a custodial relationship with a Direct Participant, either directly or indirectly ("Indirect Participants"). The Rules applicable to DTC and its Participants are on file with the Securities and Exchange Commission.

3. Purchases of Securities under the DTC system must be made by or through Direct Participants, which will receive a credit for the Securities on DTC's records. The ownership interest of each actual purchaser of each Security ("Beneficial Owner") is in turn to be recorded on the Direct and Indirect Participants' records. Beneficial Owners will not receive written confirmation from DTC of their purchase, but Beneficial Owners are expected to receive written confirmations providing details of the transaction, as well as periodic statements of their holdings, from the Direct or Indirect Participant through which the Beneficial Owner entered into the transaction. Transfers of ownership interests in the Securities are to be accomplished by entries made on the books of Participants acting on behalf of Beneficial Owners. Beneficial Owners will not receive certificates representing their ownership interests in Securities, except in the event that use of the book-entry system for the Securities is discontinued.

4. To facilitate subsequent transfers, all Securities deposited by Participants with DTC are registered in the name of DTC's partnership nominee, Cede & Co. The deposit of Securities with DTC and their registration in the name of Cede & Co. effect no change in beneficial ownership. DTC has no knowledge of the actual Beneficial Owners of the Securities; DTC's records reflect only the identity of the Direct Participants to whose accounts such Securities are credited, which may or may not be the Beneficial Owners. The Participants will remain responsible for keeping account of their holdings on behalf of their customers.

5. Conveyance of notices and other communications by DTC to Direct

Participants, by Direct Participants to Indirect Participants, and by Direct Participants and Indirect Participants to Beneficial Owners will be governed by arrangements among them, subject to any statutory or regulatory requirements as may be in effect from time to time.

[6. Redemption notices shall be sent to Cede & Co. If less than all of the Securities within an issue are being redeemed, DTC's practice is to determine by lot the amount of the interest of each Direct Participant in such issue to be redeemed.]

7. Neither DTC nor Cede & Co. will consent or vote with respect to Securities. Under its usual procedures, DTC mails an Omnibus Proxy to the Issuer as soon as possible after the record date. The Omnibus Proxy assigns Cede & Co.'s consenting or voting rights to those Direct Participants to whose accounts the Securities are credited on the record date (identified in a listing attached to the Omnibus Proxy).

8. Principal and interest payments on the Securities will be made to DTC. DTC's practice is to credit Direct Participants' accounts on payable date in accordance with their respective holdings shown on DTC's records unless DTC has reason to believe that it will not receive payment on payable date. Payments by Participants to Beneficial Owners will be governed by standing instructions and customary practices, as is the case with securities held for the accounts of customers in bearer form or registered in "street name," and will be the responsibility of such Participant and not of DTC, the Agent, or the Issuer, subject to any statutory or regulatory requirements as may be in effect from time to time. Payment of principal and interest to DTC is the responsibility of the Issuer or the Agent, disbursement of such payments to Direct Participants shall be the responsibility of DTC, and disbursement of such payments to the Beneficial Owners shall be the responsibility of Direct and Indirect Participants.

[9. A Beneficial Owner shall give notice to elect to have its Securities purchased or tendered, through its Participant, to the [Tender/Remarketing] Agent, and shall effect delivery of such Securities by causing the Direct Participant to transfer the Participant's interest in the Securities, on DTC's records, to the [Tender/Remarketing] Agent. The requirement for physical delivery of Securities in connection with a demand for purchase or a mandatory purchase will be deemed satisfied when the ownership rights in the Securities are transferred by Direct Participants on DTC's records.]

10. DTC may discontinue providing its services as securities depository with respect to the Securities at any time by giving reasonable notice to the Issuer or the Agent. Under such circumstances, in the event that a successor securities depository is not obtained, Security certificates are required to be printed and delivered.

11. The Issuer may decide to discontinue use of the system of book-entry transfers through DTC (or a successor securities depositor). In that event, Security certificates will be printed and delivered.

12. The information in this section concerning DTC and DTC's book-entry system has been obtained from sources that the Issuer believes to be reliable, but the Issuer takes no responsibility for the accuracy thereof.

1. Issuer represents that at the time of initial registration in the name of DTC's nominee, Cede & Co., the Securities were Legally or Contractually Restricted Securities,[1] eligible for transfer under Rule 144A under the Securities Act of 1933 as amended (the "Securities Act"), and identified by a CUSIP or CINS identification number that was different from any CUSIP or CINS number assigned to any securities of the same class that were not Legally or Contractually Restricted Securities. Issuer shall ensure that a CUSIP or CINS identification number is obtained for all unrestricted securities of the same class that is different from any CUSIP or CINS identification number assigned to a Legally or Contractually Restricted Security of such class, and shall notify DTC promptly in the event that it is unable to do so. Issuer represents that it has agreed to comply with all applicable information requirements of Rule 144A.

2. Issuer represents that the Securities are [Note: Issuer must represent one of the following, and may cross out the other]

[an issue of nonconvertible debt securities or nonconvertible preferred stock which is rated in one of the top four categories by a nationally recognized statistical rating organization ("Investment-Grade Securities")]

3. If the Securities are not Investment-Grade Securities, Issuer and Agent acknowledge that if such Securities cease to be included in an SRO Rule 144A System during any period in which such Securities are Legally or Contractually Restricted Securities, such Securities shall no longer be eligible for DTC's services. Furthermore, DTC may discontinue providing its services as securities depository with respect to the Securities at any time by giving reasonable notice to Issuer or Agent. Under any of the aforementioned circumstances, at DTC's request, Issuer and Agent shall cooperate fully with DTC by taking appropriate action to make available one or more separate certificates evidencing Securities to any Participant having Securities credited to its DTC accounts.

---

[1] A "Legally Restricted Security" is a security that is a restricted security, as defined in Rule 144(a)(3). A "Contractually Restricted Security" is a security that upon issuance and continually thereafter can only be sold pursuant to Regulation S under the Securities Act, Rule 144A, Rule 144, or in a transaction exempt from the registration requirements of the Securities Act pursuant to Section 4 of the Securities Act and not involving any public offering; provided, however, that once the security is sold pursuant to the provisions of Rule 144, including Rule 144(k), it will thereby cease to be a "Contractually Restricted Security". For purposes of this definition, in order for a depositary receipt to be considered a "Legally or Contractually Restricted Security," the underlying security must also be a "Legally or Contractually Restricted Security."

4. Issuer and Agent acknowledge that so long as Cede & Co. is a record owner of the Securities, Cede & Co. shall be entitled to all applicable voting rights and to receive the full amount of all distributions payable with respect thereto. Issuer and Agent acknowledge that DTC shall treat any DTC Participant ("Participant") having Securities credited to its DTC accounts as entitled to the full benefits of ownership of such Securities. Without limiting the generality of the preceding sentence, Issuer and Agent acknowledge that DTC shall treat any Participant having Securities credited to its DTC accounts as entitled to receive distributions (and voting rights, if any) in respect of Securities, and to receive from DTC certificates evidencing Securities. Issuer and Agent recognize that DTC does not in any way undertake to, and shall not have any responsibility to, monitor or ascertain the compliance of any transactions in the Securities with any of the provisions: (a) of Rule 144A; (b) of other exemptions from registration under the Securities Act or of any other state or federal securities laws; or (c) of the offering documents.

EXHIBIT G

Letter of Representations (To be Completed by issuer and Trustee)

K.C. ABBE TRUST 1995-1

[Name of Issuer]

THE FIRST NATIONAL BANK OF CHICAGO

[Name of Trustee]

Attention: General Counsel's Office
The Depository Trust Company
55 Water Street, 49th Floor
New York, N.Y. 10041-10099

Re: K.C. ABBE Trust 1995-1

$9,340,000 * Certificates

[Issue Description]

Ladies and Gentlemen:

This letter sets forth our understanding with respect to certain matters relating to the above-referenced issue (the "Securities"). Trustee will act as trustee with respect to the Securities pursuant to a trust indenture dated April 27, 1995 (the "Document"). William Blair & Company is distributing "Placement Agent" the Securities through The Depository Trust Company ("DTC"). To induce DTC to accept the Securities as eligible for deposit at DTC and to act in accordance with its Rules with respect to the Securities, Issuer and Trustee make the following representations to DTC:

1. Prior to closing on the Securities on July __, 1995 there shall be deposited with DTC one Security certificate registered in the name of DTC's nominee Cede & Co. for each stated maturity of the Securities in the face amounts set forth on Schedule A hereto, the total of which represents 100% of the principal amount of such Securities. If, however, the aggregate principal amount of any maturity exceeds $150 million, one certificate will be issued with respect to each $150 million of principal amount and an additional certificate will be issued with respect to any remaining principal amount. Each $150 million certificate shall bear the following legend:

Unless this certificate is presented by an authorized representative of The Depository Trust Company, a New York corporation ("DTC"), to Issuer or its agent for registration of transfer, exchange, or payment, and any certificate issued is registered in the name of Cede & Co. or in such other name as is requested by an authorized representative of DTC (and any payment is made to Cede & Co. or to such other entity as is requested by an authorized representative of DTC), ANY TRANSFER, PLEDGE, OR OTHER USE HEREOF FOR VALUE OR OTHERWISE BY OR TO ANY PERSON IS WRONGFUL inasmuch as the registered owner hereof, Cede & Co., has an interest herein.

2. In the event of any solicitation of consents from or voting by holders of the Securities, Issuer or Trustee shall establish a record date for such purposes (with no provision for revocation of consents or votes by subsequent holders) and shall, to the extent possible, send notice of such record date to DTC not less than 15 calendar days in advance of such record date. Notices to DTC pursuant to this Paragraph by telecopy shall be sent to DTC's Reorganization Department at (212) 709-6896 or (212) 709-6897, and receipt of such notices shall be confirmed by telephoning (212) 709-6870. Notices to DTC pursuant to this Paragraph by mail or by any other means shall be sent to DTC's Reorganization Department as indicated in Paragraph 4.

3. In the event of a full or partial redemption, Issuer or Trustee shall send a notice to DTC specifying: (a) the amount of the redemption or refunding; (b) in the case of a refunding, the maturity date(s) established under the refunding; and (c) the date such notice is to be mailed to security holders or published (the "Publication Date"). Such notice shall be sent to DTC by a secure means (e.g., legible telecopy, registered or certified mail, overnight delivery) in a timely manner designed to assure that such notice is in DTC's possession no later than the close of business on the business day before or, if possible, two business days before the Publication Date. Issuer or Trustee shall forward such notice either in a separate secure transmission for each CUSIP number or in a secure transmission for multiple CUSIP numbers (if applicable) which includes a manifest or list of each CUSIP number submitted in that transmission. (The party sending such notice shall have a method to verify subsequently the use of such means and the timeliness of such notice.) The Publication Date shall be not less than 30 days nor more than 60 days prior to the redemption date or, in the case of an advance refunding, the date that the proceeds are deposited in escrow. Notices to DTC pursuant to this Paragraph by telecopy shall be sent to DTC's Call Notification Department at (516) 227-4039 or (516) 227-4190. If the party sending the notice does not receive a telecopy receipt from DTC confirming that the notice has been received, such party shall telephone (516) 227-4070, Notices to DTC pursuant to this Paragraph by mail or by any other means shall be sent to;

Manager; Call Notification Department
The Depository Trust Company
711 Stewart Avenue
Garden City, NY 11530-4719

4. In the event of an invitation to tender the Securities, notice by Issuer or Trustee to Security holders specifying the terms of the tender and the Publication Date of such notice shall be sent to DTC by a secure means in the manner set forth in the preceding Paragraph. Notices to DTC pursuant to this Paragraph and notices of other corporate actions (including mandatory tenders, exchanges, and capital changes) by telecopy shall be sent to DTC's Reorganization Department at (212) 709-1093 or (212) 709-1094, and receipt of such notices shall be confirmed by telephoning (212) 709-6884. Notices to DTC pursuant to the above by mail or by any other means shall be sent to:

Manager; Reorganization Department
Reorganization Window
The Depository Trust Company
7 Hanover Square; 23rd Floor
New York, NY 10004-2695

5. All notices and payment advices sent to DTC shall contain the CUSIP number of the Securities.

6. Trustee shall send DTC written notice with respect to the dollar amount per $1,000 original face value (or other minimum authorized denomination if less than $1,000 face value) payable on each payment date allocated as to the interest and principal portions thereof preferably 5, but not less than 2, business days prior to such payment date. Such notices, which shall also contain the current pool factor and Trustee contact's name and telephone number, shall be sent by telecopy to DTC's Dividend Department at (212) 709-1723, or if by mail or by any other means to:

Manager; Announcements
Dividend Department
The Depository Trust Company
7 Hanover Square; 22rd Floor
New York, NY 10004-2695

8. Interest payments and principal payments that are part of periodic principal-and-interest payments ahll be received by Cede & Co., as nominee of DTC, or its registered assigns in same-day funds on each payment date (or the equivalent in accordance with existing arrangements between Issuer or Trustee and DTC). Such payments shall be made payable to the order of Cede & Co. Absent any other existing arrangements, such payments shall be addressed as follows:

Manager; Cash Receipts
Dividend Department
The Depository Trust Company
7 Hanover Square; 24th Floor
New York, NY 10004-2695

[Note: Issuer must represent one of the following, and cross out the other:]

Securities Eligible for DTC's Same-Day Funds Settlement ("SDFS") System.

Other principal payments (redemption payments) shall be made in same-day funds by Trustee in the manner set forth in the SDFS Paying Agent Operating Procedures, a copy of which previously has been furnished to Trustee.

Note 1

The Certificates evidence undivided fractional interests in K.C. ABBE® Trust 1995-1, a special purpose grantor trust (the "Trust"). The trust has been created and will be governed by the terms of an Amended and Restated Trust Agreement, dated as of April 27, 1995, between Scribcor, Inc. (the "Grantor") and the First National Bank of Chicago, as Trustee (the "Trustee"). The Property of the Trust will consist of: (i) a term-of-years real property interest expiring on December 31, 2009 (the "Term Interest") in and to the Old American Life Insurance Building, a three-story commercial office building located at 4900 Oak Street in Kansas City, Missouri, (ii) the right, as Landlord, to receive all payments to be made on and after August 1, 1995, by the Tenant of the Property under the terms of a Lease, dated as of December 29, 1989, as amended, and (iii) the right to all monies and securities deposited or required to be deposited with the Trustee pursuant to any term of the Trust Agreement. Monthly payments with respect to the Certificates will represent a pass-through of monthly rental payments to be made by the Tenant pursuant to the Lease, and, as such, such payments will not be comprised of principal and/or interest components. For Federal income tax purposes, payments with respect to Certificates will constitute ordinary income in the hands of Certificateholders, subject to cost recovery depreciation deductions with respect to the Term Interest taken ratably over the 14-year term of the Term Interest.

9. DTC may direct Issuer or Trustee to use any other number or address as the number or address to which notices or payments of interest or principal may be sent.

10. In the event of a redemption, acceleration, or any other similar transaction (e.g., tender made and accepted in response to Issuer's or Trustee's invitation) necessitating a reduction in the aggregate principal amount of Securities outstanding or an advance refunding of part of the Securities outstanding, DTC, in its discretion: (a) may request Issuer or Trustee to issue and authenticate a new Security certificate; or (b) may make an appropriate notation on the Security certificate indicating the date and amount of such reduction in principal except in the case of final maturity, in which case the certificate will be presented to Issuer or Trustee prior to payment, if required.

11. In the event that Issuer determines that beneficial owners of Securities shall be able to obtain certificated Securities, Issuer or Trustee shall notify DTC of the availability of certificates. In such event, Issuer or Trustee shall issue, transfer, and exchange certificates in appropriate amounts, as required by DTC and others.

12. DTC may discontinue providing its services as securities depository with respect to the Securities at any time by giving reasonable notice to Issuer or Trustee (at which time DTC will confirm with Issuer or Trustee the aggregate principal amount of Securities outstanding). Under such circumstances, at DTC's request Issuer and Trustee shall cooperate fully with DTC by taking appropriate action to make available one or more separate certificates evidencing Securities to any DTC Participant having Securities credited to its DTC accounts.

13. Issuer: (a) understands that DTC has no obligation to, and will not, communicate to its Participants or to any person having an interest in the Securities any information contained in the Security certificate(s); and (b) acknowledges that neither DTC's Participants nor any person having an interest in the Securities shall be deemed to have notice of the provisions of the Security certificates by virtue of submission of such certificate(s) to DTC.

14. Nothing herein shall be deemed to require Trustee to advance funds on behalf of Issuer.

Very truly yours,

By: ___________________________

(Authorized Officer)

By: ___________________________

(Authorized Officer)

Notes:

A. If there is a Trustee (as defined in this Letter of Representations), Trustee as well as Issuer must sign this Letter. If there is no Trustee, in signing this Letter, Issuer itself undertakes to perform all of the obligations set forth herein.

B. Schedule B contains statements that DTC believes accurately describe DTC, the method of effecting book-entry transfers of securities distributed through DTC, and certain related matters.

Received and Accepted

THE DEPOSITORY TRUST COMPANY

By:

______________________________

SCHEDULE A (Describe Issue)

| CUSIP | Principal Amount | Maturity Date | Interest Rate |
|---|---|---|---|

To be determined; will advise DTC once finalized.

SPECIMEN 6

Copy No. ________

CONFIDENTIAL PRIVATE PLACEMENT MEMORANDUM

DATED: MAY 4, 1995

K.C. LURE® TRUST 1995-1

$2,150,000 Certificates

---

This Confidential Private Placement Memorandum relates to the offering and sale of $2,150,000 aggregate amount of certificates (the "Certificates") evidencing undivided fractional interests in K.C. LURE® Trust 1995-1, a special purpose grantor trust (the "Remainder Trust"). The Remainder Trust will be created and governed by the terms of a Trust Agreement, dated as of April 27, 1995, between Scribcor, Inc. (the "Seller") and The First National Bank of Chicago, as Trustee (the "Trustee"). The property of the Remainder Trust will consist of a current, fully vested unencumbered remainder interest in fee simple in real property (the "LURE® Interest") comprised of the Old American Life Insurance Building, a three story commercial office building located at 4900 Oak Street in the Country Club Plaza district of Kansas City, Missouri (the "Property"). Following expiration in 2009 of an underlying term-of-years to be purchased by an institutional investor, the Remainder Trust will hold fee simple title to the Property.

The Property has been leased to Old American Life Insurance Company for an initial term expiring in 2009, and the obligations of Old American Life Insurance Company under the Lease have been guaranteed by Kansas City Life Insurance Company, a Missouri company (the "Lease Guarantor").

THE SECURITIES OFFERED HEREBY ARE HIGHLY SPECULATIVE AND INVOLVE A HIGH DEGREE OF RISK (SEE "RISK FACTORS AND OTHER CONSIDERATIONS"). INVESTORS WILL BE REQUIRED TO REPRESENT THAT THEY ARE FAMILIAR

WITH AND UNDERSTAND THE TERMS OF THIS OFFERING.

This Confidential Private-Placement Memorandum is submitted in connection with the private placement of Certificates and may not be reproduced or used for any other purpose. The Seller reserves the right to accept or reject any subscriptions.

THE CERTIFICATES HAVE NOT BEEN REGISTERED UNDER THE SECURITIES ACT OF 1933, AS AMENDED (THE "ACT"), THE ILLINOIS SECURITIES LAW OF 1953, AS AMENDED, OR ANY OTHER STATE SECURITIES LAW. THIS PRIVATE OFFERING MEMORANDUM HAS NOT BEEN REVIEWED BY THE SECURITIES AND EXCHANGE COMMISSION, THE ILLINOIS SECURITIES DEPARTMENT OR ANY OTHER GOVERNMENTAL AUTHORITY PRIOR TO ITS ISSUANCE AND USE. NEITHER THE SECURITIES AND EXCHANGE COMMISSION, THE ILLINOIS SECURITIES DEPARTMENT NOR ANY OTHER GOVERNMENTAL AUTHORITY HAS PASSED UPON THE ACCURACY OR ADEQUACY OF THIS OFFERING MEMORANDUM OR ENDORSED THE MERITS OF THIS OFFERING. ANY REPRESENTATION TO THE CONTRARY IS A CRIMINAL OFFENSE.

| | Offering Price | Selling Commissions (1) | Proceeds to the Seller |
|---|---|---|---|
| Per Certificate........................ | $50,000.00 | $-0- | $50,000.00 |
| Total ..................................... | $2,150,000.00 | $-0- | $2,150,000.00 |

(1) The Certificates will be offered and sold by the Seller on a best efforts basis and nc sales commissions will be paid. The Seller will be reimbursed for legal, accounting, printing and other organizational expenses associated with the organization of the Remainder Trust and the offering made hereby which expenses are currently estimated to be approximately $100,000. See "SOURCES AND USES OF FUNDS."

© Copyright 1995 Graff/Ross Holdings, an affiliate of the Seller -- All rights reserved.

LURE® is a registered trademark of Graff/Ross Holdings.

THE INFORMATION CONTAINED IN THIS MEMORANDUM IS CONFIDENTIAL AND PROPRIETARY TO THE SELLER AND THE TRUST AND IS BEING SUBMITTED TO PROSPECTIVE INVESTORS IN THE TRUST SOLELY FOR SUCH INVESTORS' CONFIDENTIAL USE WITH THE EXPRESS UNDERSTANDING THAT, WITHOUT THE PRIOR WRITTEN PERMISSION OF THE TRUST AND THE SELLER, SUCH PERSONS WILL NOT RELEASE THIS DOCUMENT OR DISCUSS THE INFORMATION CONTAINED HEREIN OR MAKE REPRODUCTIONS OF OR USE THIS MEMORANDUM FOR ANY PURPOSE OTHER THAN EVALUATING A POTENTIAL INVESTMENT IN THE SECURITIES OFFERED HEREBY.

---

A PROSPECTIVE INVESTOR, BY ACCEPTING DELIVERY OF THIS MEMORANDUM, AGREES PROMPTLY TO RETURN TO THE SELLER THIS MEMORANDUM AND ANY OTHER DOCUMENTS OR INFORMATION FURNISHED IF THE PROSPECTIVE INVESTOR ELECTS NOT TO PURCHASE ANY OF THE SECURITIES OFFERED HEREBY.

---

THE CERTIFICATES ARE BEING OFFERED ONLY TO PERSONS MEETING THE REQUIREMENTS SET FORTH UNDER "INVESTOR SUITABILITY" WHO ARE PURCHASING FOR INVESTMENT AND NOT FOR RESALE. THIS PRIVATE OFFERING MEMORANDUM DOES NOT CONSTITUTE AN OFFER TO ANY OTHER PERSON.

NO PERSON HAS BEEN AUTHORIZED TO GIVE ANY INFORMATION OR TO MAKE ANY REPRESENTATION, OTHER THAN THOSE CONTAINED IN THIS OFFERING MEMORANDUM, IN CONNECTION WITH THE OFFERING MADE

HEREBY, AND IF GIVEN OR MADE, SUCH INFORMATION OR REPRESENTATIONS MUST NOT BE RELIED UPON AS HAVING BEEN AUTHORIZED BY THE SELLER OR THE SELLERS.

THIS MEMORANDUM CONTAINS ONLY A SUMMARY OF CERTAIN PROVISIONS OF THE TRUST AGREEMENT AND OTHER DOCUMENTS AFFECTING THE TRANSACTION. INVESTORS AND THEIR REPRESENTATIVES ARE URGED TO REVIEW CAREFULLY THE TRUST AGREEMENT AND SUCH OTHER DOCUMENTS. THE TRUST AGREEMENT (AS OF THE DATE OF THIS MEMORANDUM) IS ATTACHED AS EXHIBIT A HERETO. ALL OTHER DOCUMENTS RELATING TO THIS INVESTMENT (AND ANY ADDITIONAL INFORMATION THAT IS AVAILABLE) WILL BE MADE AVAILABLE TO THE OFFEREE UPON REQUEST. SEE "ADDITIONAL INQUIRIES."

THIS MEMORANDUM DOES NOT PURPORT TO BE ALL-INCLUSIVE OR TO CONTAIN ALL THE INFORMATION THAT A PROSPECTIVE INVESTOR MAY DESIRE IN INVESTIGATING AN INVESTMENT IN CERTIFICATES. EACH INVESTOR MUST CONDUCT AND RELY ON ITS OWN EVALUATION OF THE SELLER AND THE TERMS OF THE OFFERING, INCLUDING THE MERITS AND RISKS INVOLVED, IN MAKING AN INVESTMENT DECISION WITH RESPECT TO THE SECURITIES OFFERED HEREBY. SEE "RISK FACTORS" FOR A DISCUSSION OF CERTAIN FACTORS THAT SHOULD BE CONSIDERED IN CONNECTION WITH THE PURCHASE OF THE SECURITIES OFFERED HEREBY.

---

THIS MEMORANDUM DOES NOT CONSTITUTE AN OFFER TO SELL, OR A SOLICITATION OF AN OFFER TO BUY, THE SECURITIES OFFERED HEREBY IN ANY JURISDICTION WHERE, OR TO ANY PERSON TO WHOM, IT IS UNLAWFUL TO MAKE SUCH OFFER OR SOLICITATION. EXCEPT AS OTHERWISE INDICATED,

THIS MEMORANDUM SPEAKS AS OF THE DATE HEREOF. NEITHER THE DELIVERY OF THIS MEMORANDUM NOR ANY SALE MADE HEREUNDER SHALL, UNDER ANY CIRCUMSTANCES, CREATE ANY IMPLICATION THAT THERE HAS BEEN NO CHANGE IN THE AFFAIRS OF THE SELLER AFTER THE DATE HEREOF.

---

NO PERSON HAS BEEN AUTHORIZED TO GIVE ANY INFORMATION OTHER THAN THAT CONTAINED IN THIS MEMORANDUM, OR TO MAKE ANY REPRESENTATIONS IN CONNECTION WITH THE OFFERING MADE HEREBY, AND, IF GIVEN OR MADE, SUCH OTHER INFORMATION OR REPRESENTATIONS MUST NOT BE RELIED UPON AS HAVING BEEN AUTHORIZED BY THE TRUST OR THE SELLER. THE SELLER AND THE TRUST DISCLAIM ANY AND ALL LIABILITIES FOR REPRESENTATIONS OR WARRANTIES, EXPRESSED OR IMPLIED, CONTAINED IN, OR OMISSIONS FROM, THIS MEMORANDUM OR ANY OTHER WRITTEN OR ORAL COMMUNICATION OR TRANSMISSION MADE AVAILABLE TO THE RECIPIENT.

---

EACH PROSPECTIVE INVESTOR, AT ITS OWN EXPENSE, SHOULD CONSULT ITS OWN COUNSEL, ACCOUNTANTS, PURCHASE REPRESENTATIVES AND OTHER ADVISORS CONCERNING THE LEGAL, TAX, INVESTMENT AND OTHER CONSIDERATIONS REGARDING A PURCHASE BY SUCH PROSPECTIVE INVESTOR OF THE SECURITIES OFFERED HEREBY.

---

EACH PROSPECTIVE INVESTOR SHOULD THOROUGHLY REVIEW THIS MEMORANDUM AND EACH OF THE EXHIBITS ATTACHED HERETO BEFORE DECIDING TO SUBSCRIBE FOR ANY OF THE SECURITIES OFFERED HEREBY. A COPY OF EACH OF THE DOCUMENTS REFERRED TO HEREIN IS INCLUDED

AMONG THE EXHIBITS ATTACHED HERETO OR IS AVAILABLE, UPON REQUEST, FOR INSPECTION AT THE OFFICES OF THE SELLER.

---

EACH PROSPECTIVE INVESTOR AND ITS PURCHASER REPRESENTATIVE SHALL BE GIVEN, UPON REQUEST, THE OPPORTUNITY TO ASK QUESTIONS OF, AND TO RECEIVE ANSWERS FROM, THE SELLER CONCERNING THE OFFERING AND TO OBTAIN ANY ADDITIONAL INFORMATION NECESSARY TO VERIFY THE ACCURACY OF THE INFORMATION CONTAINED HEREIN, TO THE EXTENT THAT SUCH INFORMATION IS AVAILABLE WITHOUT UNREASONABLE EFFORT OR EXPENSE.

---

FOR RESIDENTS OF ALL STATES:

THE CERTIFICATES OFFERED HEREBY HAVE NOT BEEN REGISTERED WITH OR APPROVED BY THE SECURITIES AND EXCHANGE COMMISSION OR ANY STATE SECURITIES AGENCY. THIS IS A PRIVATE OFFERING PURSUANT TO EXEMPTIONS PROVIDED BY SECTION 4(2) OF THE SECURITIES ACT OF 1933, AS AMENDED, AND APPLICABLE STATE SECURITIES LAWS. NEITHER THE SECURITIES AND EXCHANGE COMMISSION NOR ANY STATE AGENCY HAS PASSED UPON THE VALUE OF THESE SECURITIES, MADE ANY RECOMMENDATIONS AS TO THEIR PURCHASE, APPROVED OR DISAPPROVED THIS OFFERING, OR PASSED UPON THE ADEQUACY OR ACCURACY OF THIS MEMORANDUM. ANY REPRESENTATION TO THE CONTRARY IS A CRIMINAL OFFENSE. THIS PRIVATE OFFERING MEMORANDUM, DOES NOT CONSTITUTE AN OFFER OR SOLICITATION IN ANY STATE OR JURISDICTION IN WHICH SUCH AN OFFER OR SOLICITATION IS UNLAWFUL.

FOR RESIDENTS OF FLORIDA:

THESE SECURITIES HAVE NOT BEEN REGISTERED UNDER THE FLORIDA SECURITIES ACT IN RELIANCE UPON EXEMPTION PROVISIONS CONTAINED THEREIN. SECTION 517.061(11)(a)(5) OF THE FLORIDA SECURITIES AND INVESTOR PROTECTION ACT (THE "FLORIDA ACT") PROVIDES THAT ANY PURCHASER OF SECURITIES IN FLORIDA WHICH ARE EXEMPTED FROM REGISTERED UNDER SECTION 517.061(11) OF THE FLORIDA ACT MAY WITHDRAW HIS SUBSCRIPTION AGREEMENT AND RECEIVE A FULL REFUND OF ALL MONIES PAID, WITHIN THREE BUSINESS DAYS AFTER HE TENDERS CONSIDERATION FOR SUCH SECURITIES. THEREFORE, ANY FLORIDA RESIDENT WHO PURCHASES SECURITIES IS ENTITLED TO EXERCISE THE FOREGOING STATUTORY RESCISSION RIGHT WITHIN THREE BUSINESS DAYS AFTER TENDERING CONSIDERATION FOR THE SECURITIES BY TELEPHONE, TELEGRAM, OR LETTER NOTICE TO THE SELLER AT 400 N. MICHIGAN AVENUE, SUITE 1200, CHICAGO, ILLINOIS 60611. ANY TELEGRAM OR LETTER SHOULD BE SENT OR POSTMARKED PRIOR TO THE END OF THE THIRD BUSINESS DAY. A LETTER SHOULD BE MAILED BY CERTIFIED MAIL, RETURN RECEIPT REQUESTED, TO ENSURE ITS RECEIPT AND TO EVIDENCE THE TIME OF MAILING. ANY ORAL REQUEST SHOULD BE CONFIRMED IN WRITING.

K.C. LURE® TRUST 1995-1

$2,150,000 Certificates

TABLE OF CONTENTS

| | Page |
|---|---|
| SUMMARY OF THE OFFERING | 474 |
| INVESTOR SUITABILITY | 481 |
| OFFERING TERMS | 483 |
| ESTIMATED SOURCES AND USES OF FUNDS | 485 |
| RISK FACTORS AND OTHER CONSIDERATIONS | 488 |
| THE LURE INTEREST | 491 |
| THE REMAINDER TRUST | 495 |
| THE BUILDING AND THE PROPERTY | 503 |
| THE LEASE | 505 |
| THE LEASE GUARANTOR | 506 |
| FEDERAL INCOME TAX MATTERS | 506 |
| REPORTS TO CERTIFICATEHOLDERS | 508 |
| ADDITIONAL INQUIRIES | 508 |
| LEGAL MATTERS | 508 |

EXHIBITS:

CERTIFICATE SUBSCRIPTION AGREEMENT AND SUITABILITY STATEMENT

Exhibit A

FORM OF REAL ESTATE ACQUISITION AGREEMENT

Exhibit B

FORM OF TRUST AGREEMENT

Exhibit C

SUMMARY OF LEASE PROVISIONS

Exhibit D

KANSAS CITY LIFE INSURANCE COMPANY

ANNUAL REPORT ON FORM 10-K FOR THE YEAR ENDED DECEMBER 31, 1994

Exhibit E

SUMMARY OF THE OFFERING

The following summary is qualified in its entirety by the detailed information appearing elsewhere in this Private Offering Memorandum. Certain capitalized terms used in this summary are defined elsewhere in this Private Offering Memorandum.

The Certificates

The Certificates offered hereby evidence undivided fractional interests in K.C. LURE® Trust 1995-1, a special purpose grantor trust (the "Remainder Trust"). The Remainder Trust will be created and governed by the terms of a Trust Agreement, dated as of April 27, 1995, between Scribcor, Inc. (the "Seller") and The First National Bank of Chicago, as Trustee (the "Trustee"). The property of the Remainder Trust will consist of a current, fully vested unencumbered remainder interest in fee simple in real property (the "LURE® Interest") comprised of the Old American Life Insurance Building, a three story commercial office building located at 4900 Oak Street in the Country Club Plaza district of Kansas City, Missouri (the "Property"). Following expiration in 2009 of an underlying term-of-years to be purchased by an institutional investor, the Remainder Trust will hold fee simple title to the Property.

The Remainder Trust

The Remainder Trust is a special purpose grantor trust created and governed by the terms of a Trust Agreement, dated as of April 27, 1995 (the "Trust Agreement"), between the Seller and the Trustee. The Seller has established the Remainder Trust by selling and assigning the LURE® Interest to the Remainder Trust in exchange for $2,150,000. Prior to such sale and assignment, the Remainder Trust had no assets or obligations or any operating history. The Remainder Trust will not engage in any activity other than acquiring and holding the LURE Interest and issuing the Certificates pursuant to the Trust Agreement.

The LURE® Interest

The LURE® Interest is a real property interest and constitutes a current, fully vested unencumbered remainder interest in fee simple in and to the Property. Following termination in 2009 of an underlying term-of-years held by an institutional investor, the Remainder Trust will hold fee simple absolute title to the Property, free and clear of any underlying indebtedness.

Property Acquisition and Bridge Financing

On May 4, 1995, the Seller completed the acquisition of fee simple title to the Property for a purchase price of $10,445,000. The Property consists of a 94,149 square foot office building (the "Building") situated on a 2.091 acre parcel in the Country Club Plaza District of Kansas City, Missouri. The Country Club Plaza District is located approximately 4.5 miles south of Downtown Kansas City. The Building was constructed in 1960 and substantial renovations were completed on the Building in 1992.

In completing the acquisition of the Property, Seller caused the previous owner of the Property to "split" the fee simple ownership of the Property by simultaneously (a) conveying to a single purpose grantor trust (the "Term Trust") a term-of-years real property interest in the Property (the "Term Interest"), which Term Interest will terminate on December 31, 2009, and (b) conveying to the Remainder Trust the LURE® Interest, which will entitle the Remainder Trust, upon termination of the Term Interest on December 31, 2009, to a fee simple interest in the Property.

The Seller established the Term Trust by assigning and selling the Term Interest to the Term Trust in exchange for $8,295,000, which amount was contributed to the Term Trust by K.C. ABBE Holdings, L.L.C. ("Holdings"), a Delaware limited liability company, the sole members (equity holders) of which are principals or affiliates of the Seller or spouses thereof. Holdings was formed to facilitate the purchase of the Property pending completion of a private placement to institutional investors of certificates representing beneficial interests in the Term Trust (the "Term Trust Certificates"). Holdings financed its purchase of the beneficial interest in the Term Trust representing the Term Interest by incurring bank indebtedness in the amount of $8,295,000, which indebtedness and accrued interest thereon will be discharged with the proceeds of the offering of the Term Trust Certificates. See "ESTIMATED SOURCES AND USES OF FUNDS" and "THE TRUST AGREEMENT."

Investment Characteristics of the LURE® Interest

The LURE® Interest to be acquired by the Remainder Trust is similar in many respects to a zero-coupon security, with payment "at maturity" occurring in 2009 at the expiration of the underlying term-of-years in the form of unencumbered fee simple absolute title to the Property. However, unlike the holder of a zero-coupon debt security, the Remainder Trust will not be subject to taxation of imputed interest on, or appreciation of, the LURE® Interest during the underlying term-of years.

During the Term Interest expiring in 2009, the Term Trust will receive all net rental cash flow from the Property and will be responsible for all expenditures associated with conservation of the investment value of the Property, including maintenance, taxes, insurance, etc. The Remainder Trust will receive no financial benefits during the term-of-years and, correspondingly, will not be subject to any property-related expenditures during this period. The beneficiaries of the Term Trust will not have any financial claims against the Remainder Trust, as holder of the corresponding LURE® Interest, or any claims to any of the economic benefits to be derived from the Property following expiration of the term-of-years in 2009. Accordingly, upon the expiration of the term-of-years in 2009, the Remainder Trust, as holder of the LURE® Interest, will hold fee simple absolute title to the Property, free and clear of any underlying indebtedness. See "THE LURE® INTEREST."

The Lease

Pursuant to the terms of a Lease, dated as of December 29, 1989, as amended (the "Lease"), the Property has been leased to Old American Life Insurance Company (the "Tenant") for an initial term expiring in 2009. The Lease is a so-called "triple net" lease, with Tenant assuming responsibility for taxes, insurance and operating expenses, obligations for repair and maintenance, and certain condemnation and casualty risks associated with the Building. See "THE LEASE."

The Lease Guarantor

The obligations of the Tenant under the Lease have been guaranteed by Kansas City Life Insurance Company ("Kansas City Life" or the "Lease Guarantor"). Kansas City Life and its wholly owned subsidiaries issue and market a full line of universal life, term and traditional whole life insurance and accident and health insurance products. For the year ended December 31, 1994, Kansas City Life had consolidated revenues in the amount of $393.5 million, pre-tax income of $56.9 million and net income of $37.4 million. At December 31, 1994, the Lease Guarantor had total assets of $2.7 billion and total stockholders' equity of $343.7 million. See "THE LEASE GUARANTOR."

Certain Tax Matters

In the opinion of Kirkland & Ellis, special tax counsel to the Seller, the Remainder Trust will be classified for Federal income tax purposes as a grantor trust and not as an association taxable as a corporation. Accordingly, each holder of a Certificate will be subject to Federal income taxation as if it owned directly its proportionate interest in each asset owned by the Trust. See "FEDERAL INCOME TAX MATTERS."

The Seller and Affiliates

Scribcor, Inc. (the "Seller") is the grantor of the Remainder Trust and an affiliate of Electrum Partners L.L.C ("Electrum"), a newly-formed Illinois limited liability company. Principals of Electrum have been engaged for over the past three years in developing the proprietary software and technology associated with originating and pricing the term and residual components of commercial real estate.

The principal officers and majority owners of Electrum are Richard M. Ross, Jr. and Richard A. Graff.

Mr. Ross is President of Scribcor, Inc., and has been associated with Scribcor in various administrative capacities since 1971. Scribcor, founded in 1891, is a privately-held firm focusing on management, leasing and consulting in the Chicago commercial and industrial real estate market. During his 24-year tenure with Scribcor, Mr. Ross has directed complex transactions for major institutional clients, including site acquisition, financing, office relocation, development consulting and property management. He has provided confidential consulting services to numerous major corporations. Mr. Ross is a graduate of Denison University and holds an MBA in Finance from the University of Chicago. He is a member of the American Society of Real Estate Counselors (ASREC) and the Urban Land Institute.

Over the last nine years, Mr. Graff developed the investment theory and legal structure that forms the basis for the Seller's proprietary financial technology. Mr. Graff is a graduate of the Massachusetts Institute of Technology. He holds MA and Ph.D. degrees in mathematics from Princeton University and an MBA in Finance from the University of Chicago. He is an author of several widely recognized articles on innovations in real estate finance and investments that have appeared or are scheduled to appear in various professional and academic real estate and financial publications.

The Offering $2,150,000 aggregate amount of Certificates are being offered hereby at a subscription price of $50,000 per Certificate to persons who satisfy the investor suitability requirements described under the caption "Investor Suitability." The minimum subscription for each investor is one Certificate. The Seller may, in its sole discretion, elect to accept subscriptions for fractional Certificates..

The offering period will commence on the date of this Offering Memorandum and will terminate on or before June 1, 1995, unless extended by the Seller to a date not later than December 31, 1995 (such period, including any extensions, is referred to herein as the "Offering Period" and the date on which the Offering Period terminates, or any earlier date on which the offering may be terminated, is referred to herein as the "Offering Closing Date"). The Seller may terminate the offering at any time and will have sole discretion regarding the acceptance or rejection of any subscription. A subscriber has no right to withdraw its investment during the Offering Period.

Risk Factors and Conflicts of Interest

An investment in the Certificates involves certain risks and conflicts of interest. See "Risk Factors and Other Considerations" and "Conflicts of Interest."

Investor Suitability

Certificates will be offered and sold solely to "accredited investors", as such term is defined under Rule 501 of Regulation D under the Securities Act of 1933, as amended. Generally, "accredited investors" include banks and savings and loan institutions (whether acting in their individual capacity or in a fiduciary capacity), registered brokers and dealers, insurance companies, registered investment companies, certain qualified employee benefit plans and natural persons (a) whose individual net worth, or joint net worth with that person's spouse, at the time of purchase exceeds $1,000,000 or (b) who had an individual income in excess of $200,000 in each of the two most recent years or joint income with that person's spouse in excess of $300,000 in each of those years and has a reasonable expectation of reaching the same income levels in the current year. Each purchaser of Certificates will also be required to represent, among other things, that it is acquiring Certificates solely for investment purposes and not for resale or distribution.

Organization
The structure of the transaction described hereby will be as set forth in the diagram below:
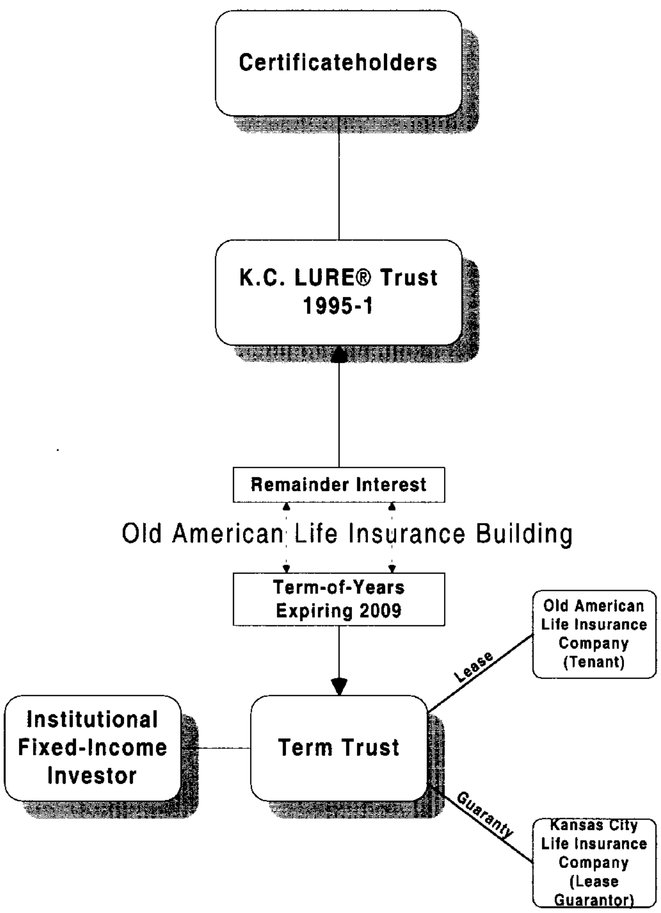

INVESTOR SUITABILITY

An investment in the Certificates involves a high degree of risk and is suitable only for persons who understand the merits and risks involved and who have financial resources sufficient to bear the economic risks of investing in the Seller. The Certificates are being offered without registration under the Securities Act of 1933, as amended (the "Act"), pursuant to the exemptions provided by Regulation D thereunder.

An investment in Certificates is available only to prospective investors who meet the requirements described below or who the Sellers otherwise determine to be suitable investors.

Each subscriber for Certificates must represent that he:

(a) has an individual net worth, or joint net worth with his spouse, in excess of $1,000,000; or has had an individual income in excess of $200,000 in each of the two most recent years or joint income with his spouse in excess of $300,000 in each of those years and has a reasonable expectation of reaching the same income level in the current year; or otherwise qualifies as an "Accredited Investor" as that term is defined in Rule 501(a) of Regulation D to the Securities Act of 1933, as amended;

(b) has an overall commitment to investments which are not readily marketable that is reasonable in relation and not disproportionate to his net worth and his investment in the Certificates will not cause such overall commitment to become excessive, and the investment in the Certificates will not exceed 20% of the subscriber's net worth (exclusive of principal residence, furnishings and automobiles);

(c) is willing and able to bear the economic risk of an investment in the Certificates, has no need for liquidity with respect to this investment and is able to sustain a complete loss of his investment in the Certificates;

(d) has read this Confidential Private Placement Memorandum for purposes of evaluating the risks of investing in the Certificates;

(e) has such knowledge and experience in financial and business matters, in general, and in health care investments, in particular, to believe that he is capable of evaluating the merits and risks of an investment in the Certificates;

(f) is purchasing Certificates for his own account, for investment, and not with a view to resale; and (g) is a United States citizen or is treated as a United States citizen for federal income tax purposes.

The foregoing is a summary of certain of the investor suitability and other requirements set forth in the Subscription Agreement and Suitability Statement included as Exhibit A hereto. The investor suitability requirements set forth above represent minimum suitability requirements for prospective purchasers and the satisfaction of such standards by a prospective purchaser does not necessarily mean that the Certificates are a suitable investment for such purchaser. The Seller, in circumstances it considers appropriate, may modify such requirements (including the "Accredited Investor" requirement), without notice, for any reason.

The foregoing representations will be reviewed to determine the suitability of prospective purchasers, and the Seller will have the right to refuse a subscription for a Certificate or Certificates if in its sole discretion it believes that the prospective purchaser does not meet the suitability requirements or that the Certificates are otherwise an unsuitable investment for the prospective purchaser. The Seller will have sole discretion regarding the acceptance or rejection of any subscription to purchase Certificates.

It is anticipated that comparable suitability standards will be imposed by the Seller in connection with any resales of the Certificates; any such resale is subject to various restrictions and consequences. See "Transfers".

In the event that the Seller or one or more affiliates of the Seller purchase unsold Certificates, certain of the provisions set forth above may be waived provided that such purchase will not result in the loss of an applicable securities law exemption. Any resale of such unsold Certificates, however, will be made only to persons meeting the foregoing criteria.

OFFERING TERMS

The Seller is offering hereby a total of approximately 43 Certificates. The Certificates are being offered at a purchase price of $50,000 per Certificate. The purchase price will be payable in full upon subscription. The minimum subscription is one Certificate, although the Seller reserves the right, in its sole discretion, to accept subscriptions for fractional Certificates.

Except as provided below, the Certificates will be sold only to such persons who meet the suitability standards set forth under "Investor Suitability." The Certificates will be sold by the Seller on a best efforts basis and no commissions will be payable in connection therewith.

The offering period will terminate on or before June 1, 1995, unless extended to a date not later than December 31, 1995 (the "Offering Period"). The Seller may terminate the offering at any time.

Each prospective investor who wishes to purchase Certificates must complete, execute and deliver to the Seller, at the address set forth therein, a Subscription Agreement and Suitability Statement (the "Subscription Agreement"). The Subscription Agreement contains a power of attorney authorizing the Seller to sign certain documents on behalf of the subscriber. A subscriber will have no right to withdraw his subscription after the acceptance thereof by the Seller. Except as described under the caption "Additional Inquiries," no party has been authorized to give any information or to make any representations other than those contained in this Offering Memorandum, and any such representations may not be relied upon.

ACQUISITION OF PROPERTY AND BRIDGE FINANCING

On May 4, 1995, the Seller completed the acquisition of fee simple title to the Property for a purchase price of $10,445,000. In completing the acquisition of the Property, the Seller caused the previous owner of the Property to "split" the fee simple ownership of the Property by simultaneously (a) conveying or causing to be conveyed to the Term Trust the Term Interest expiring on December 31, 2009 and (b) conveying or causing to be conveyed to the Remainder Trust, in exchange for $2,150,000, a remainder interest in the Property, which remainder interest will entitle the beneficiaries of the Remainder Trust, upon termination of the Term Interest on December 31, 2009, to a fee simple interest in the Property.

The Seller established the Term Trust by assigning and selling the Term Interest to the Term Trust in exchange for $8,295,000, which amount was contributed to the Term Trust by K.C. ABBE Holdings, L.L.C. ("Holdings"), a Delaware limited liability company of which the sole members (equity holders) are principals or affiliates of the Seller or spouses thereof. Holdings was formed to facilitate the purchase of the Property pending completion of a private placement of certificates evidencing beneficial interests in the Term Trust (the "Term Trust Certificates"). Holdings financed its purchase of the beneficial interest in the Term Trust representing the Term Interest by incurring bank indebtedness (the "Bridge Financing") in the amount of $8,295,000, which indebtedness and accrued interest thereon will be discharged with the anticipated proceeds of the offering of Term Trust Certificates. See "ESTIMATED SOURCES AND USES OF FUNDS."

See Exhibit B hereto for a copy of the Purchase and Sale Agreement, dated as of January 13, 1995 (the "Acquisition Agreement"), contemplating the purchase of the Property. The $10.445 million purchase price represents a capitalization of the Building's operating income for the year ended December 31, 1994 at a rate of 8.93%, a capitalization of projected operating income for the year ending December 31, 2000 at a rate of 10.27%, and a capitalization of projected operating income for the year ending December 31, 2005 at a rate of 11.81%

ESTIMATED SOURCES AND USES OF FUNDS

Set forth below is a summary of the estimated sources and uses of funds in connection with the (a) purchase of the Property on May 4, 1995 by the Seller for $10,455,000, utilizing the proceeds of the Bridge Financing and the sale by the Seller of the LURE® Interest to the Remainder Trust for $2,150,000, and the issuance of the Certificates for $2,150,000 and organization of the Remainder Trust and (b) the organization of the Term Trust and the proposed issuance of the Term Trust Certificates on or about July 15, 1995. The information set forth below represents the best estimate of the Seller and is subject to change.

SOURCES OF FUNDS:

| | Purchase of Property and Issuance of Certificates | Subsequent Issuance of Term Trust Certificates |
|---|---|---|
| Proceeds from issuance and sale of Certificates | $2,150,000 | |
| Proceeds from Bridge Financing | $8,295,000 | |
| Proceeds from issuance and sale of Term Trust Certificates (1) | | $9,114,568 |
| Lease Payments for the period May 4, 1995—June 30, 1995 | | 145,413 |
| Other sources | 371,250 | 12,633 |
| TOTAL SOURCES OF FUNDS | $10,816,250 | $9,272,614 |

USES OF FUNDS:

| | Purchase of Property and Issuance of Certificates | Subsequent Issuance of Term Trust Certificates |
|---|---|---|
| Acquisition cost of Property | $10,445,000 | |

| | | |
|---|---|---|
| Real estate commissions payable in connection with acquisition of Property.... | 121,875 | |
| Legal expenses and other closing costs in connection with acquisition of the Property.................................................. | 128,125 | |
| Bridge Financing commitment fee ........... | 21,250 | |
| Repayment of Bridge Financing, including accrued interest........................ | | $8,413,630 |
| Reimburse Scribcor, Inc. for Property acquisition costs (2)................................ | | 371,250 |
| Expenses payable in connection with organization of Term Trust...................... | | 100,000 |
| Expenses payable in connection with organization of Remainder Trust and offering of beneficial interests therein ...... | 100,000 | |
| Placement Agent Fee payable in connection with issuance of Term Trust Certificates.............................................. | | 177,734 |
| Trustee fee ............................................. | | 110,000 |
| Other expenses ...................................... | | 100,000 |

| | | |
|---|---|---|
| TOTAL USES OF FUNDS .................. | $10,816,250 | $9,272,614 |

(1) Estimated solely for purposes of this presentation. The actual proceeds to be realized upon issuance of the Term Trust Certificates will depend upon prevailing interest rates at the time of issuance of the Term Trust Certificates.

(2) The Seller will be reimbursed for all legal, accounting and filing fees related to the organization of the Remainder Trust, the Term Trust, the preparation of the Trust Agreement and this Offering Memorandum and related organizational expenses.

RISK FACTORS AND OTHER CONSIDERATIONS

The purchase of Certificates involves substantial risks for investors. In addition to general investment risks and the factors described elsewhere herein, a prospective purchaser of Certificates should consider the following factors.

Real Estate Investment Risks

An investment in Certificates will be subject to many of the risks generally associated with the ownership of unleveraged real property, including the possibility of adverse changes in national and local economic conditions; changes in rates of inflation; changes in the real estate investment climate; adverse changes in local market conditions due to changes in general or local economic conditions and neighborhood characteristics; adverse changes in governmental rules and fiscal policies; natural disasters, including earthquakes and other factors which are beyond the control of the Seller. The success of an investment in the Certificates will depend in large part upon the ability of the Trustee to re-lease the Property upon the completion of the Term Interest in 2009.

Condemnation Risk

As described below, under certain circumstances during the early years of the underlying Term Interest, a "taking" of the Property by means of eminent domain or other governmental proceedings (a "condemnation") resulting in a termination of the Lease could result in loss of all, or a significant portion, of a Certificateholder's investment.

If a condemnation affects more than 50% of the Building and, in Tenant's reasonable judgment, renders the Building unsuitable for restoration for continued use and occupancy (a "Total Condemnation"), then Tenant is required to terminate the Lease and submit an irrevocable offer to purchase from the Term Trust (a) any remaining portion of the Building and (b) the right to receive the net proceeds, if any, payable in connection with such condemnation. The purchase price shall be equal to ten times the then-annual Base Rent payable under the Lease, which amount will not be less than $9,326,500. In accordance with the terms of the Term Trust, the Term Trustee is required to accept such offer to purchase, and proceeds received by the Term Trust from the Tenant upon the occurrence of a Total Condemnation are to be distributed, first, to holders of Term Trust Certificates solely to the extent of the applicable Prepayment Amount, and second, if and only to the extent of any remaining proceeds, to the Remainder Trustee for distribution to holders of Certificates. The applicable "Prepayment Amount" at any date with respect to holders of Term Trust Certificates will be an amount generally equal to the present value of the then-remaining monthly lease payments otherwise to be made under the Lease, discounted to the date of prepayment at the Imputed Interest Rate. The "Imputed Interest Rate" with respect to the Term Trust Certificates is the annual pre-tax interest rate which the holders of Term Trust Certificates applied, at the time of initial issuance of the Term Trust Certificates, as the discount rate to the stream of cash flows represented by payments to be made during the Term Interest under the Lease.

Assuming an Imputed Interest Rate of 7.24%, the amount of the proceeds to be received upon a Total Condemnation will be generally equal to or nominally in excess of the then-applicable Prepayment Amount through the period ending December 31, 1999. As a result, in the event of a Total Condemnation during such period, holders of Certificates will not receive a return of their initial investment and could incur a significant loss. While the Seller believes that the probability of a Total Condemnation under the Lease is remote, the occurrence of such an event during the early years of the underlying Term Interest could have a material adverse effect upon the holders of Certificates.

No Operating History

The Remainder Trust is newly formed and has no operating history.

Achievement of Objectives

There can be no assurance that any or all of the principal objectives of the Remainder Trust as set forth under "Business" can be achieved. Any reference to the objectives of the Seller should not be interpreted as a guarantee, representation or warranty.

Arbitrary Offering Price

The offering price of the Certificates offered hereby has been arbitrarily determined by the Seller based primarily upon the estimated cost of acquiring the LURE ® Interest, the expenses to be paid as a result of this offering, the cost of organizing the Remainder Trust and other matters. The offering price of the Certificates is no indication of their value or the value of the assets which the Remainder Trust will acquire. No assurance is or can be given that any Certificates, if transferable, could be sold for the offering price or for any amount.

Lack of Liquidity

There is no established market for the Certificates and the Seller does not anticipate that any market will develop. Consequently, holders may not be able to liquidate their investment in the event of an emergency or for other reasons. Purchase of a Certificate is therefore suitable only for persons who have no need for liquidity with respect to their investment and who are able to bear the economic risks of their investments for an unlimited period of time.

Securities Law Aspects

The Certificates have not been registered under the Act or the Illinois Securities Act in reliance upon certain exemptions from registration thereunder. The Seller believes that the offering presently qualifies and, where appropriate, will continue to qualify under the exemptions. However, since the availability of certain of these exemptions is based upon subjective factors, and in some instances the criteria for exemption are subject to reinterpretation by state or federal regulatory agencies and courts, there can be no assurance that such exemptions will be determined to be available.

THE LURE® INTEREST

Background

Academics and real estate finance specialists have generally accepted the notion that commercial real estate leased on a so-called "bondable" basis (i.e., obligating the tenant to pay, among other things, all maintenance, insurance and tax expenses and to assume certain condemnation, environmental and structural repair risks) to credit-worthy tenants can be divided conceptually into two components: a bond-equivalent component and a "residual", or equity, component. The bond-equivalent component represents the value on a net present value basis of the expected payments under the bondable lease, discounted at a rate appropriate to the duration of the lease and the credit-worthiness of the tenant. The bond-equivalent component is comparable in many respects to an intermediate-term, non-callable fixed-income security. In contrast, the "residual", or equity, component represents the value of commercial real estate after the cash flows generated by the bond-equivalent component have been eliminated -- i.e., the net present value of the future right to occupy the real estate upon expiration of the term of the lease. Legally, the bond-equivalent component can be simulated by creating a term-of-years of a duration co-terminous with the term of the triple-net lease, while the equity component in a particular property represents a current, fully vested unencumbered remainder interest in fee simple title to such property. This unencumbered remainder interest will entitle the holder to future possession and control of the property on a debt-free basis following the termination of the underlying term-of-years.

Over the last four years, principals of Electrum have developed proprietary financial software to implement this debt/equity conceptual model of commercial real estate value. Electrum utilizes a proprietary pricing model comparable to that used to price and value fixed income securities to appropriately price and value both the bond-equivalent component of a commercial real estate asset and the residual equity component of that asset.

Investment Characteristics of LURE® Interest

The LURE® Interest to be acquired by the Remainder Trust is similar in many respects to a zero-coupon security, with payment "at maturity" occurring in 2009 at the expiration of the underlying term-of-years in the form of unencumbered fee simple absolute title to the Property. However, unlike the holder of a zero-coupon debt security, holders of Certificates, as beneficiaries of the Remainder Trust, will not be subject to taxation of imputed interest on, or appreciation of, the LURE® Interest during the underlying term-of-years.

In effecting the acquisition of the entire fee simple interest in the Property pursuant to the Acquisition Agreement, Seller caused the previous owner of the Property to "split" the fee simple ownership of the Property by simultaneously (a) conveying to the Term Trust a term-of-years real property interest in the Property, which term-of-years interest will terminate on December 31, 2009 and (b) conveying to the Remainder Trust the LURE® Interest, which will entitle the holders of Certificates, as beneficiaries of the Remainder Trust, upon termination of the Term Interest on December 31, 2009, to a fee simple interest in the Property.

The Seller has established the Remainder Trust by selling and assigning the LURE® Interest to the Remainder Trust in exchange for $2.15 million. Prior to such sale and assignment, the Remainder Trust had no assets or obligations or any operating history. The Remainder Trust will not engage in any activity other than acquiring and holding the LURE Interest and issuing the Certificates.

During the term-of-years expiring in 2009, the Term Trust will receive all net rental cash flow from the Property and will be responsible for all expenditures associated with conservation of the investment value of the Property, including maintenance, taxes, insurance, etc. The Remainder Trust as holder of the LURE® Interest will receive no financial benefits during the term-of-years and, correspondingly, will not be subject to any property-related expenditures during this period. The Term Trust will not have any financial claims against the Remainder Trust, as holder of the corresponding LURE® Interest, or any claims to any of the economic benefits to be derived from the Property following expiration of the term-of-years in 2009. Accordingly, upon the expiration of the term-of-years in 2009, the Remainder Trust, as holder of the LURE® Interest, will be entitled, free of any underlying indebtedness, to exclusive possession and control of the Property.

To illustrate the investment characteristics of the LURE® Interest, set forth below is an example of hypothetical investment returns to the Remainder Trust, assuming the LURE® Interest is held by the Remainder Trust until expiration of the underlying term-of-years in 2009:

Property Purchase Price: $10,455,000.

Valuation of Term-of Years and LURE® Interest: Assume that the bond-equivalent component entitled to receive the net cash flows from the Lease is sold to an institutional investor or investors. The price of the LURE® Interest to the Remainder Trust equals the difference between the market value of the Property (plus fees and expenses associated with the separation), less the cost of the bond-equivalent component, or $2.15 million.

Investment Return: If the LURE® Interest is held to maturity (i.e., until December 31, 2009), the investment return on the LURE® Interest is determined by the value of the Property at the end of the term-of-years:

Assuming a 25% decline in the Property's market value over the investment period (to $7,841,250), then the LURE® Interest will yield a compound annual return of 9.22% and a total return of 264.71%.

Assuming no change in the Property's value over the investment period, then the LURE® Interest will yield a compound annual return of 11.38% and a total return of 386.28%.

Assuming a 25% increase in the Property's market value over the investment period (to $13,068,750), the LURE® Interest will yield a compound annual return of 13.08% per annum and a total return of 507.85%.

An investment in Certificates will be subject to many of the risks generally associated with the ownership of unleveraged real property, including the possibility of adverse changes in national and local economic conditions; changes in rates of inflation; changes in the real estate investment climate; adverse changes in local market conditions due to changes in general or local economic conditions and neighborhood characteristics; adverse changes in governmental rules and fiscal policies; natural disasters, including earthquakes and other factors which are beyond the control of the Seller.

THE REMAINDER TRUST

Set forth below is a summary of certain provisions of the Trust Agreement governing the terms of the Remainder Trust. The description and summaries of the Trust Agreement hereinafter set forth do not purport to be comprehensive or definitive, and reference is made to the Trust Agreement for the complete details of all terms and conditions. All statements herein are qualified in their entirety by reference to the Trust Agreement, a copy of which is attached as Exhibit C to this Confidential Private Placement Memorandum.

The Certificates

The Certificates will be issued only in fully registered form. The Certificates will be issued in denominations of $50,000 and integral multiples thereof.

The Trust Agreement

General

The Trust Agreement sets forth the terms and conditions on which the Trustee shall hold the LURE® Interest, both during the term-of-years held by the Term Trust, and following the termination of the Term Trust upon the expiration of the term-of-years expiring in 2009. The Trust Agreement establishes the duties and obligations of the Trustee regarding the collection and distribution of funds and other administrative responsibilities relating to the LURE® Interest. The Trust Agreement assigns the Trustee the general responsibilities accorded financial fiduciaries, reserving other specified services to the beneficiaries as appropriate.

Flow Of Funds

The terms of the Trust Agreement require the Trustee to establish the Administration Account into which the Trustee is required to deposit all monies received for the benefit of the Certificateholders on account of any rent or other payments received in respect of the Property. The Administration Account must be established at a bank or other financial institution: (i) authorized pursuant to applicable laws to exercise corporate trust powers with respect to the LURE® Interest; (ii) having a combined capital and surplus of at least $50,000,000 and subject to supervision or examination by federal or state authorities; and (iii) having (or having a parent which has) a long term unsecured debt rating of at least BBB- by Standard & Poor's Corporation and at least Baa3 by Moody's Investors Service, Inc. On the 15th day of each month following the establishment of the Administration Account, the Trustee is directed to distribute to the Certificateholders as of the immediately preceding Record Date the amount of Distributable Funds then on deposit in the Administration Account. Distributable Funds includes the total balance of funds then in the Administration Account less the sum of: (i) $25,000; plus (ii) the amount of all Reimbursable Costs incurred by the Trustee for which the Trustee has not previously been reimbursed; plus (iii) the amount of all Reimbursable Costs reasonably anticipated by the Trustee to be incurred prior to the next succeeding Distribution Date. The Trustee has a priority right to reimbursement of Reimbursable Costs incurred pursuant to the Trust Agreement from Collections received by the Trustee and, if necessary, from the Trust Estate. On the Final Distribution Date, the Distributable Funds shall be calculated without regard to clauses (i) and (iii) above.

For purposes of calculating Distributable Funds, "Reimbursable Costs" include all fees, expenses, costs or other charges incurred in good faith by the Trustee in the performance of its duties and obligations under the Agreement. By way of example, Reimbursable Costs would include all fees and expenses incurred by the Trustee in connection with the engagement by the Trustee of Qualified Real Estate Consultants and counsel to advise the Trustee regarding the discharge by the Trustee of its obligations under Section 6.2 of the Trust Agreement upon the occurrence of an Event of Default, Casualty Loss Termination or Total Condemnation.

General Duties Of Trustee

The Trustee shall generally have only such duties as are specifically set forth in the Trust Agreement relating to the administration of the Remainder Trust in the interest of the Certificateholders and is required to discharge such duties in accordance with its general obligations of loyalty and prudence as Trustee. The Trustee shall receive on behalf of the Certificateholders all Collections with respect to the Property and shall deposit the same into the Administration Account for monthly distribution in accordance with the terms of the Trust Agreement. Each monthly distribution shall be accompanied by a statement itemizing Collections received, Reimbursable Costs incurred and the calculation of the amount of such distribution. In addition, the Trustee shall be required to give and receive all notices in respect of the Trust Estate as more specifically set forth in the Trust Agreement.

Specific Duties Of Trustee

Actions to Be Taken By Trustee Upon Event of Default Under Lease. The

Trustee is required generally to monitor the performance of the Tenant under the Lease and to give and receive all notices required or permitted to be given or received by the Trustee under the Administration Agreement. If an Event of Default shall occur under the Lease, the Trustee must give notice thereof to the holders of Certificates and proceed upon the further written instruction of the holders of Certificates with respect to such Event of Default. Because of the nature of the LURE® Interest, during the term-of-years owned by the Term Trust, the Trustee has limited rights with respect to actions involving the Property. Such rights will generally be limited to the Trustee's ability to commence an action against the Term Trustee seeking to prevent waste regarding the Property through the failure of the Term Trustee to enforce the terms of the Lease or to otherwise take such actions as are reasonably necessary with respect to the preservation of the Property.

If so directed in writing by the holders of Certificates, the Trustee shall initiate such actions, including the commencement of legal proceedings, as shall in the reasonable judgment of counsel retained by the Trustee for such purpose be necessary or appropriate to preserve the Trust Property. All costs and expenses incurred by the Remainder Trustee in so acting shall constitute Reimbursable Costs. The Trustee shall not be required to take any action, incur any expense or advance any funds unless: (i) there shall then be on deposit in the Administration Account funds sufficient, in the reasonable judgment of the Trustee, to provide for reimbursement of all Reimbursable Costs incurred or to be incurred by the Trustee in acting at the direction of the holders of Certificates; or (ii) the Trustee shall have received assurances from the holders of Certificates as to the source and manner for the reimbursement of such Reimbursable Costs reasonably satisfactory to the Trustee (clauses (i) and (ii) above being hereinafter referred to as the "Reimbursement Conditions"). If the Trustee shall seek such assurances and the holders of Certificates shall fail or refuse to provide the same within fifteen (15) days after demand therefor by the Trustee, such failure or refusal shall constitute a Termination Event and require the Trustee to cause the Trust Property to be sold at auction to the highest bidder. The holders of Certificates will not be permitted to bid at such auction.

Casualty Loss; Casualty Loss Termination. In the event of a Casualty Loss affecting the Property involving a loss in excess of $100,000, the Trustee is required to give written notice to the holders of Certificates. If such Casualty Loss results in a Casualty Loss Termination of the Lease, the Trustee shall so notify the holders of Certificates and await the further written instructions of the holders of Certificates. If the holders of Certificates shall direct the Trustee with respect to the taking of any actions in response to such Casualty Loss Termination, all fees and expenses reasonably incurred by the Trustee in connection therewith shall be Reimbursable Costs. The Trustee shall have no obligation to take any such actions unless the Reimbursement Conditions are then met. For purposes of the Trust Agreement, a "Casualty Loss" is any loss or damage suffered or incurred with respect to the Property arising out of any fire, windstorm, flood, earthquake, act of God, war, strike or other casualty. A "Casualty Loss Termination" means any termination of the Lease resulting from the occurrence of a Casualty Loss. See "Exhibit D -- SUMMARY OF LEASE PROVISIONS -- Fire and Other Casualty."

Condemnation. In the event of a Partial Condemnation affecting the Property, the Trustee shall give written notice thereof to the holders of Certificate and await the instructions of the holders of Certificate. If, after restoration of the Property pursuant to the terms of the Lease, there remains any unapplied balance of the Condemnation Award received in respect of such Partial Condemnation, such unapplied balance is required by the terms of the Term Trust to be paid to the Trustee, who in turn shall deposit the same in the Administration Account for distribution in accordance with the terms of the Trust Agreement.

If there shall occur a Total Condemnation, the Trustee shall give notice thereof to the holders of Certificates and proceed in accordance with the written instructions thereof; provided that if the holders of Certificates fail to direct the Trustee as to the taking or failing to take of any action in connection with such Total Condemnation, the Trustee shall retain a Qualified Real Estate Consultant with respect to the Total Condemnation and shall proceed in the manner determined by the Qualified Real Estate Consultant to be in the best interests of the holders of Certificates. All legal fees and expenses incurred by the Trustee in so acting shall be Reimbursable Costs.

For purposes of the Trust Agreement, a "Partial Condemnation" means (i) any taking by condemnation or other eminent domain proceeding pursuant to any law or (ii) temporary requisition of the Property or any part thereof by any governmental authority after the occurrence of which the Lease shall remain in full force and effect. A "Total Condemnation" means any condemnation after the occurrence of which the Lease shall not remain in full force and effect. A "Qualified Real Estate Consultant" means the commercial loan servicing, property or asset management group which is an affiliate of the Trustee, if such group is affiliated with the Trustee, or any Person who: (i) has not less than 10 years of experience as a professional asset or property manager and is licensed (if required) to perform such services in the locale of the property; (ii) then has under management a portfolio of commercial and office properties containing in the aggregate not less than 2 million square feet or with an aggregate fair market value of not less than $20 million; and (iii) then has not fewer than 20 employees directly engaged in the provision of asset or property management services.

Termination Of Trust Agreement

The Trust shall terminate upon the final distribution of all monies or other property or proceeds of the Trust Estate following the occurrence of a Termination Event or a sale of the Trust Estate pursuant to Section 7.2 of the Trust Agreement. A "Termination Event" shall have occurred upon the happening of any of the following: (i) a Total Condemnation; (ii) the failure of the holders of Certificates to give the financial assurances or indemnity required pursuant to Sections 6.2(d) or (g) of the Trust Agreement with respect to actions to be taken by the Trustee following an Event of Default or Casualty Loss Termination; (iii) the expiration of ten (10) years from the date on which the Term Trust shall have terminated; or (iv) following the date on which the Term Trust shall have terminated, the receipt by the Trustee of a written direction from all holders of Certificates directing the Trustee to terminate the Trust and containing a release of all claims of any nature whatsoever of such holders of Certificates against the Term Trustee and the beneficial owners of any interest in the Term Trust arising from or in connection with the Term Trustee's ownership of the Term Interest in the Property, or the use, operation or maintenance of the Property during the term of the Term Trust.

Section 7.2 of the Trust Agreement requires the Trustee to sell the Trust Estate at auction in the event of the occurrence of a Termination Event pursuant to Sections 6.2(d) or (g) of the Trust Agreement. Such sale shall take place pursuant to an auction to be held in a manner and at the direction of an auctioneer as recommended by a Qualified Real Estate Consultant retained by the Trustee with respect to conduct of such auction. The holders of Certificates will not be permitted to bid at such auction. All reasonable fees and expenses incurred by the Trustee, including, without limitation, fees and expenses incurred by counsel retained by the Trustee in connection with such auction shall be Reimbursable Costs. The proceeds of such auction shall be deposited into the Administration Account, and applied in accordance with the terms of the Trust Agreement.

Amendments

For so long as Elizabeth McKeever Ross is the sole Certificateholder, she may cause the Trust Agreement to be amended at any time by a written instrument effecting such amendment, provided that any amendment which materially modifies the scope or nature of the duties and obligations of the Trustee shall not be effective unless consented to by the Trustee, which consent shall not be unreasonably withheld. It is contemplated that upon the sale by K.C. ABBE® Holdings, L.L.C. of the beneficial interest in the Term Trust, the Trust Agreement shall be amended to eliminate such right of amendment by Elizabeth McKeever Ross and to reflect the designation of a successor trustee to The First National Bank of Chicago. The Trust Agreement may be amended by the Trustee with the consent of the holders of 51% or more of the Voting Interests only for the limited purposes of (i) curing any ambiguity; (ii) correcting or supplementing any provision in the Trust Agreement that may be defective or inconsistent with any other provision; (iii) as shall be required in connection with the acceptance of the appointment of a successor Trustee; or (iv) and as may be required to facilitate the administration of the Remainder Trust under the Trust Agreement by more than one Trustee pursuant to Article 6 of the Trust Agreement. The Trust Agreement may not otherwise be amended.

The Trustee

The First National Bank of Chicago will serve as Trustee. The Trustee, in its individual capacity or otherwise, and any of its affiliates, may hold Certificates in their own name or as pledgee. In addition, for the purpose of meeting the legal requirements of certain jurisdictions, the Trustee will have the power to appoint co-trustees or separate trustees of all or any part of the Remainder Trust. In the event of such appointment, all rights, powers, duties and obligations conferred or imposed upon the Trustee by the Trust Agreement will be conferred or imposed upon the Trustee and such co-trustee or separate trustee jointly or, in any jurisdiction where the Trustee is incompetent or unqualified to perform certain acts, singly upon such co-trustee or separate trustee who shall exercise and perform such rights, powers, duties and obligations solely at the direction of the Trustee.

The Trustee may resign at any time, in which event the Certificateholders may appoint a successor trustee. The Certificateholders may also remove the Trustee if the Trustee ceases to be eligible to serve, becomes legally unable to act, is adjudged insolvent or is placed in receivership or similar proceedings.

The Trust Agreement provides that the fees and expenses of the Trustee constitute Reimbursable Costs, reimbursable from funds on deposit in the Administration Account created pursuant to the Trust Agreement.

The Trustee's Corporate Trust Office is located at One First National Plaza, Suite 0126, Chicago, Illinois 60670-0126. The Seller and its affiliates may have other banking relationships with the Trustee and its affiliates in the ordinary course of their respective businesses.

THE BUILDING AND THE PROPERTY

General

The Seller has purchased for $10,445,000 the entire fee simple interest in the Kansas City Life Insurance Office Building, a 94,149 square foot office building (the "Building") located at 4900 Oak Street in the Country Club Plaza district of Kansas City, Missouri. The Building was constructed in 1960 and substantial renovations were completed on the Building in 1992. Pursuant to the terms of a so-called "bondable"

lease, the term of which expires in 2009, the Building is 100% leased to Old American Life Insurance Company (the "Tenant"). The obligations of the Tenant under the Lease have been unconditionally and irrevocably guaranteed by Kansas City Life Insurance Company (the "Lease Guarantor"), and the Tenant has subleased a portion of the Building to The Ewing Kauffman Foundation (the "Subtenant"). The sublease expires in 1997, but the Subtenant has options to extend.

The Building

The Building is a three-story office building containing 94,149 square feet of rentable area, of which approximately 27,780 square feet comprise a basement containing a mailroom, print shop, cafeteria, boiler room and restrooms. A sprinklered garage containing 76,341 square feet adjoins and is connected to the structure and provides sheltered parking for 250 vehicles. The Building was constructed in 1960, and substantial renovations were completed in 1992. The Building is of steel beam and column construction, with exterior walls of concrete panels, brick, decorative marble and glass. The Building's heating/ventilating/air conditioning system consists of hot and cold deck systems which utilize two gas hot water heaters, each with 37,000,000 BTUs of heating capacity, together with two 200 ton Carrier centrifugal chillers. The Seller believes that the Building is in very good physical condition.

The Property

The Building and its adjoining garage are located approximately 4.5 miles south of downtown Kansas City on a 2.091 acre parcel in an area commonly referred to as the Country Club Plaza district of Kansas City, Missouri. The Property, situated at the intersection of Volker Boulevard and Oak Street, is located directly across from the campus of the University of Missouri at Kansas City and is surrounded by several other office buildings, medical research facilities and high-quality residential developments.

Access to the Property site is along both Volker Boulevard and Oak Street, with a circular drive running to the Building's front entrance off of Oak Street.

The Country Club Plaza district of Kansas City is anchored by the Country Club Plaza retail development, which was established in the 1920's as the country's first "shopping center." Country Club Plaza remains one of the most prestigious retail locations in Kansas City, attracting quality tenants including Saks Fifth Avenue, Tiffany, Brooks Brothers, Dillard's and Ralph Lauren/Polo, among others. Country Club Plaza is located less than one mile from the Property. The area surrounding the Property is fully developed, made up of approximately 45% single family residential, 15% institutional, 15% commercial retail, 15% multi-family residential and 10% commercial office buildings.

The Kansas City, Missouri/Kansas metropolitan area is the 28th largest in the United States, with a population in excess of 1.5 million. The economy of the region is diversified, with the manufacturing, wholesale/retail services and government sectors each contributing in excess of 15% of the non-agricultural jobs in the region. Transportation, finance, insurance and real estate are also substantial contributors to the region's economy.

THE LEASE

Pursuant to the terms of a Lease, dated December 29, 1989 and as subsequently amended (the "Lease"), Old American Life Insurance Company (the "Tenant") has leased the Building for an initial term expiring on December 31, 2009. The Lease is a so-called "triple net" lease, with the Tenant assuming substantially all obligations for maintenance, insurance and utilities and certain other environmental, structural repair and condemnation risks. Attached hereto as Exhibit D is a summary of the terms of the Lease.

THE LEASE GUARANTOR

Pursuant to the terms of a Guaranty, dated as of November 13, 1991 (the "Guaranty"), from Kansas City Life Insurance Company (the "Lease Guarantor"), the obligations of the Tenant under the Lease have been unconditionally and irrevocably guaranteed by the Lease Guarantor. The Tenant is a wholly-owned subsidiary of the Lease Guarantor.

Kansas City Life Insurance Company (the "Lease Guarantor") and its wholly-owned subsidiaries issue and market a full line of universal life, term and traditional whole life insurance and accident and health insurance products. For the year ended December 31, 1994, the Lease Guarantor had consolidated revenues in the amount of $393.5 million, pre-tax income of $56.9 million and net income of $37.4 million. At December 31, 1994, the Lease Guarantor had total assets of $2.7 billion and total stockholders' equity of $343.7 million.

Attached hereto as Exhibit E is a copy of the Lease Guarantor's Annual Report on Form 10-K for the year ended December 31, 1994, in the form as filed with the Securities and Exchange Commission.

FEDERAL INCOME TAX MATTERS

PROSPECTIVE INVESTORS ARE URGED TO CONSULT THEIR PERSONAL TAX ADVISORS WITH RESPECT TO THE FEDERAL, STATE, AND LOCAL INCOME TAX CONSEQUENCES OF PURCHASING CERTIFICATES.

The following is a summary of the material federal income tax consequences to holders of Certificates. This summary is based upon the Internal Revenue Code of 1986, as amended (the "Code"), and upon rules and regulations promulgated under the Code and existing interpretations thereof, any of which could be changed at any time, by legislation or otherwise. Any of such changes may or may not be retroactive with respect to transactions consummated prior to the date such changes are announced. The discussion below does not purport to address federal income tax consequences applicable to particular categories of investors, some of which (e.g., banks, tax-exempt organizations, insurance companies or foreign investors) may be subject to special rules.

In the opinion of Kirkland & Ellis, special tax counsel to the Seller, the Remainder Trust will be classified for Federal income tax purposes as a grantor trust and not as an association taxable as a corporation. Accordingly, each holder of a Certificate will be subject to Federal income taxation as if it owned directly its proportionate interest in each asset owned by the Trust. Each holder of Certificates will be required to report on its federal income tax return its pro rata share of each item of income, gain, loss, deduction or credit from the property held in the Remainder Trust, in accordance with such holder's method of accounting. In general, until the expiration in 2009 of the underlying Term Interest in the Property, the Remainder Trust is not expected to recognize any income or incur any expenses with respect to the LURE® Interest. Any increase or decrease in the fair market value of a Certificate will not give rise to recognizable gain or loss, respectively, to a holder for Federal income tax purposes, until the earlier of such holder's sale of his Certificate or the Remainder Trust's sale of the LURE® Interest.

A holder that sells or exchanges a Certificate should recognize gain or loss equal to the difference between its adjusted tax basis in the Certificate and the amount realized upon such sale or exchange. If the holder held such Certificate as a capital asset, any such gain or loss will be capital gain or loss, which will be long-term capital gain or loss if the Certificate was held for more than one year. Any long-term capital gains realized on the sale or exchange of a Certificate will be taxable under current law to corporate taxpayers at the rates applicable to ordinary income, and to individual taxpayers at a maximum marginal rate of 28%. Any capital losses realized generally will be deductible by a corporate taxpayer only to the extent of capital gains and by an individual taxpayer only to the extent of capital gains plus $3,000 of other income.

REPORTS TO CERTIFICATEHOLDERS

The Trustee will furnish to each holder of Certificates certain reports, statements and tax information, as set forth in the Trust Agreement, a copy of which is attached as Exhibit C, including such information necessary in the preparation of the Certificateholders' federal income tax returns.

ADDITIONAL INQUIRIES

The Seller will make every effort to furnish to any qualified prospective investor or his purchaser representative any additional information, or opportunity for inquiry, concerning the terms and conditions of this offering, including information requested to verify the accuracy of the information contained in this Confidential Private Placement Memorandum or otherwise furnished the prospective investor or his purchaser representative.

LEGAL MATTERS

The legality of the Certificates offered hereby will be passed upon for the Seller by Gardner, Carton & Douglas, Chicago, Illinois. Gardner, Carton & Douglas has served as special securities counsel to the Seller and certain affiliates of the Seller. Certain tax matters relating to the Remainder Trust, the Certificates and the LURE® Interest will be passed upon for the Seller by Kirkland & Ellis, Chicago, Illinois.

EXHIBIT A

CERTIFICATE SUBSCRIPTION AGREEMENT AND SUITABILITY STATEMENT

______________________________

Name (Please Print)

K.C. LURE® TRUST 1995-1

$2,150,000 Certificates

Scribcor, Inc.

400 North Michigan Avenue

Chicago, Illinois 60611

Re: K.C. LURE® Trust 1995-1

Gentlemen:

In connection with the subscription of the undersigned to purchase all or a portion of $2,150,000 aggregate of leveraged unencumbered real estate (LURE®) certificates (the "Certificates") evidencing undivided fractional interests in K.C. LURE® Trust 1995-1, a special purpose grantor trust (the "Remainder Trust"), the undersigned is hereby furnishing Scribcor, Inc., the grantor of the Remainder Trust (the "Seller"), the information set forth herein and makes the representations and warranties set forth herein, to indicate whether the undersigned is a suitable purchaser of Certificates. As a condition precedent to investing in the Certificates, the undersigned hereby represents, warrants, covenants and agrees as follows:

1. If the undersigned has retained a purchaser representative, the undersigned acknowledges receipt of a statement from such purchaser representative relating to any past or future relationships between such purchaser representative and the Seller or their respective affiliates.

(Note: The purchaser representative, if any, must sign the Purchaser Representative Acknowledgment attached hereto.)

2. The undersigned acknowledges that he and his purchaser representative, if any, have received and carefully reviewed a copy of the Confidential Private Placement Memorandum, including any supplements thereto (the "Offering Memorandum"), dated May 4,1995, relating to the Certificates, and all exhibits thereto, and understands the Certificates will be offered to others on the terms and in the manner described in the Offering Memorandum. The undersigned hereby subscribes to purchase the aggregate amount of Certificates set forth below pursuant to the terms of the Offering Memorandum and hereby tenders his initial subscription. The undersigned acknowledges that he shall have no right to withdraw this subscription after the acceptance thereof by the Seller and that the Seller may reject any subscription for any reason without liability therefor.

2. The undersigned recognizes that he will be personally liable for the full amount of this subscription.

3. The undersigned is aware that no federal or state regulatory agency has made any findings or determination as to the fairness for public or private investment, nor any recommendation or endorsement, of an investment in Certificates.

4. The undersigned believes that, by reason of his knowledge and experience in financial and business matters in general, and in real estate investments in particular (and/or such knowledge and experience of the undersigned's purchaser representative, if any), he is capable of evaluating the risks and merits of an investment in Certificates. The undersigned recognizes the speculative nature and the risk of loss associated with an investment in Certificates and that he may suffer a complete loss of his investment. The undersigned has an overall commitment to investments which are not readily marketable and not disproportionate to his net worth, and his investment in Certificates will not cause such overall commitment to become excessive. The amount and nature of the undersigned's investment in Certificates is suitable and consistent with his investment program and his financial situation enables him to bear the risks of this investment. The undersigned represents that he has adequate means of providing for his current needs and possible personal contingencies and that his investment in Certificates will not excess 20% of his net worth (exclusive of principal residence, furnishings and automobiles).

5. The undersigned confirms that he understands, and has fully considered for purposes of this investment, the matters discussed under the caption "Risk Factors and Other Considerations" in the Offering Memorandum and that (i) the Remainder Trust has been recently formed and has no financial or operating history; (ii) an investment in Certificates involves a significant degree of risk by the undersigned; and (iii) it may be difficult or impossible for him to liquidate his investment in Certificates in case of an emergency or for any other reason.

6. The undersigned confirms that in making his decision to invest in Certificates he has relied upon independent investigations made by him or his purchaser representative or other advisors, including his own professional tax, financial and other advisors, and that he and such representatives have been given the opportunity to examine all documents and to ask questions of, and to receive answers from the Seller concerning the terms and conditions of the offering or any other matter set forth in the Offering Memorandum, and to obtain any additional information, to the extent the Seller possesses such information or can acquire it without unreasonable effort or expense, necessary to verify the accuracy of the information set forth in the Offering Memorandum, and that no representations have been made to him and no offering materials have been furnished to him concerning Certificates, its business or prospects or other matters, except as set forth in the Offering Memorandum.

7. The undersigned understands that Certificates are being offered and sold pursuant to an exemption from registration provided by the Securities Act of 1933, as amended (the "Act"), and, in particular, Regulation D thereunder, and warrants and represents his investment is being made solely for his own account, for investment purposes only, and not with a view to or for the resale, distribution, subdivision or fractionalization thereof; the undersigned understands and acknowledges that the Certificates are being offered and will be sold solely to "accredited investors," as such term is defined in Rule 501(a) of Regulation D; the undersigned has no agreement or other arrangement, formal or informal, with any person to sell, transfer or pledge all or any part of his investment in Certificates or which would guarantee the undersigned any profit or protect the undersigned against any loss with respect to such investment; the undersigned has no plans to enter into any such agreement or arrangement, and, consequently, he must bear the economic risk of the investment for an indefinite period of time because the investment cannot be resold or otherwise transferred unless subsequently registered under the Act (which the Seller is not obligated to do), or an exemption from such registration is available.

8. The undersigned confirms that he and his purchaser representative, if any, understand the nature of the investment that the Remainder Trust intends to make, and that he and his purchaser representative, if any, are thoroughly familiar with typical organizational, operational, financial and other relevant characteristics of such investments and the economic benefits and operational, regulatory and other risks associated with such investments.

9. The undersigned is aware that the Seller has been and is relying upon the representations and warranties set forth in this Agreement in part in determining whether the offering meets the conditions specified in the rules of the Securities and Exchange Commission and the exemption from registration provided by the Act.

10. All of the information which the undersigned has furnished the Seller herein or previously with respect to the undersigned's financial position and business experience is correct and complete as of the date of this Agreement, and, if there should be any material change in such information prior to the termination of the offering period, the undersigned immediately will furnish such revised or corrected information to the Seller. The undersigned agrees that the foregoing representations and warranties shall survive his purchase of Certificates as well as any acceptance or rejection of a subscription for an investment in Certificates.

11. The undersigned acknowledges that he understands the meaning and legal consequences of the representations and warranties set forth herein, and he agrees to indemnify and hold harmless Seller from and against any and all claims, actions, demands, losses, costs, expenses (including attorney's fees), and damages that might result from any claim or legal proceeding relating to or arising out of a breach of any representation or warranty of the undersigned contained in this Agreement.

<u>INVESTORS MUST PROVIDE THE FOLLOWING INFORMATION</u>

12. The name and address of the undersigned's purchaser representative, if any, are as follows:

______________________________________________

______________________________________________

______________________________________________

13. The undersigned represents and warrants as follows:

(a) If an individual, the undersigned is the sole party in interest, and the undersigned is a citizen of the United States, as lest 21 years of age, and a bona fide resident and domiciliary (not a temporary or transient resident) of the State of Illinois;

(b) If a partnership or professional corporation, the undersigned entity meets the following: (1) the undersigned entity has not been formed for the specific purpose of making the investment; (2) the undersigned entity has been organized and is in good standing under the laws of State of Illinois and has its principal office within the State of Illinois; (3) each of the equity owners of the undersigned entity satisfies all the requirements of Item 16(a) above; and (4) the undersigned entity has total assets in excess of $5,000,000 or each of the equity owners of the undersigned entity has responded affirmatively to Item 16(d)(i) or (ii) below.

(c) The undersigned meets all suitability standards and acknowledges being aware of all legend conditions applicable to his state of residence;

(d) If an individual, (i) the undersigned has a net worth (as defined in Rule 501(a)(5) ofRegulation D promulgated by the Securities and Exchange Commission) in excess of $1,000,000;

____Yes ____No (ii) the undersigned has had income (as defined in Rule 501(a)(6) of Regulation D promulgated by the Securities and Exchange Commission) in excess of $200,000 in each of the last twoears or joint income with his or her spouse in excess of $300,000 in each of those years and reasonably expects reaching the same income level in the current year.

___Yes ___No (e) If the undersigned is not an individual, the undersigned constitutes one of the following:

(i) a bank as defined in section 3(a)(2) of the Act, or any savings and loan association or other institution as defined in section 3(a)(5)(A) of the Act whether acting in its individual capacity or fiduciary capacity;

(ii) a broker or dealer registered pursuant to section 15 of the Securities Exchange Act of 1934;

(iii) an insurance company as defined in section 2(13) of the Act;

(iv) an investment company registered under the Investment Company Act of 1940 or a business development company as defined in section 2(a)(48) of the Act;

(v) a Small Business Investment Company licensed by the U.S. Small Business Investment Act of 1958;

(vi) a plan established and maintained by a state, its political subdivisions, or any agency or instrumentality of a state or its political subdivisions for the benefit of its employees, if such plan has total assets in excess of $5,000,000;

(vii) an employee benefit plan within the meaning of the Employee Retirement Income Security Act of 1974 if the investment decision is made by a plan fiduciary, as defined in section 3(21) of such Act, which is either a bank, savings and loan association, insurance company, or registered investment adviser, or if the employee benefit plan has total assets in excess of $5,000,000, or, if a self-directed plan, with investment decisions made solely by persons that are accredited investors;

(viii) a private business development company as defined in Section 202(a)(22) of the Investment Advisers Act of 1940;

(ix) a tax-exempt organization described in Section 501(c)(3) of the Internal Revenue Code, corporation, Massachusetts or similar business trust, or partnership, not formed for the specific purpose of acquiring the Units, with total assets in excess of $5,000.000;

(x) a trust, with total assets in excess of $5,000,000, not formed for the specific purpose of acquiring the Units, the purchase of which is directed by a sophisticated person as described in Rule 506(b)(2)(ii) under the Act; or (xi) an entity in which all of the equity owners are "accredited investors".

The undersigned hereby agrees that he will promptly inform the Seller if any of the foregoing becomes untrue at any time he is an investor in Certificates.

14. Information Concerning the Undersigned.

(a) Residence Address:______________________________

City, State, Zip______________________________

______________________________

Telephone: ______________________________

(b) Social Security or Taxpayer Identification Number:

(c) Present Age: __________

(d) Occupation: ______________________________

(e) Employer and period employed (if term of employment is less than one year, also provide the name and address of your prior employer):

______________________________________________________________

______________________________________________________________

____________________________________________

____________________________________________

____________________________________________

____________________________________________

(f) Has the undersigned ever been subject to bankruptcy, reorganization or debt restructuring?

____Yes ____No

If yes, please provide details:

____________________________________________

____________________________________________

____________________________________________

(g) (I) Please indicate the frequency of the undersigned's investment in marketable securities:

____ often ____ occasionally

____ seldom ____ never (ii) Please check those of the following types of investments in which the undersigned has participated:

____ Private placements of securities.

____ Tax shelters.

____ Limited partnerships investment in real estate or other properties.

____ Real estate.

____ Oil and gas investments.

____ Equipment leasing shelters.

Did the undersigned use a purchaser representative for such private placements?

____Yes ____No (h) The undersigned represents that (a) the information contained hereinabove is complete and accurate and may be relied on, and (b) the undersigned will notify the Seller promptly of any material change in any of such information.

15. The form of ownership for the Certificates subscribed for will be as follows (check one):

(a) ____ Individual ownership (one signature required)

(b) ____ Joint tenants with right of survivorship (both or all parties must sign)

(c) ____ Tenants in common (both or all parties must sign)

____ Community property (one signature required if interest held in one name, that of managing spouse; two signatures required if interest held in both names)

(d) ____ Trust (please include a copy of the partnership agreement authorizing the signature; additional subscription materials may be required by the Seller)

(e) ____ Partnership (please include copy of the trust agreement authorizing the signature; additional subscription materials may be required by the Seller)

(f) ____ Corporation (please include a certified corporate resolution authorizing the signature; additional subscription materials may be required by the Seller)

(g) ____ Individual Retirement Account, Keogh (HR-10) Plan, or benefit plan (please include copy of plan establishing program and authorizing the signature; additional subscription materials may be required by the Seller)

(h) ____ other, explain:

______________________________________________

______________________________________________

______________________________________________

______________________________________________

______________________________________________

Sincerely,

Total Subscription: $________________ ________________________(signature)

________________________(print name)

Date: May 4, 1995

______________________(address)

______________________________

______________________________

K.C. LURE® TRUST 1995-1

PURCHASER REPRESENTATIVE ACKNOWLEDGMENT

The undersigned hereby acknowledges that he is the purchaser representative (as defined in Rule 501 (h) promulgated under the Securities Act of 1993), of ______________________ (name of investor). By reason of the undersigned's knowledge and experience in business and financial matters, the undersigned, on behalf of the above named subscriber, believes himself capable of evaluation of, and has in fact evaluated, the merits and risks of this investment on behalf of the above named subscriber. The undersigned further acknowledges that he received a copy of the Confidential Private Placement Memorandum relating 4900 Oak Street Remainder Trust 1995-1 9the "Remainder Trust"), and any other information that the undersigned deemed appropriate to evaluate this investment. Furthermore, the undersigned acknowledges that he had the opportunity to ask questions of and receive satisfactory answers or documentation form the Seller or its affiliates, associates of employees concerning the terms and conditions of the offering and the information contained in the Confidential Private Placement Memorandum.

Excepts as otherwise previously disclosed by the undersigned to the investor in writing, the undersigned is not an officer, director, employee or affiliate of the seller or an owner of ten percent or more of the equity interest in the Seller and, except as otherwise previously disclosed, neither the undersigned nor any affiliate of the undersigned has had any material relationship with the Seller or its affiliates during the past two years nor contemplates having any such future relationship.

PURCHASER REPRESENTATIVE:

| | |
|---|---|
| Signature | Address |
| Firm Name | City State |
| Occupation | (Area Code) Telephone |

EXHIBIT B

FORM OF REAL ESTATE ACQUISITION AGREEMENT

PURCHASE AND SALE AGREEMENT

Between

R&S KANSAS CITY ASSOCIATES LIMITED PARTNERSHIP,

A Connecticut Limited partnership (Seller)

and

SCRIBOR, INC., an Illinois corporation (Buyer)

Dated as of January 13, 1995

TABLE OF CONTENTS

| | | |
|---|---|---|
| 1 | PURCHASE AND SALE | 528 |
| 1.1 | Property | 528 |
| 2. | PURCHASE PRICE | |
| 2.1 | Letter of Credit | 529 |
| 2.2 | Payment of Purchase Price | 529 |
| 2.3 | Conveyance | |
| 3. | TITLE AND SURVEY | |
| 3.1 | Survey | 530 |
| 3.2 | Title Insurance | 530 |
| 3.3 | Title Clearance | 531 |
| 4. | [INTENTIONALLY OMITTED] | |
| 5. | CLOSING | |
| 5.1 | Closing | 533 |
| 5.2 | Transactions at Closing | 533 |
| 6. | PRORATIONS: CLOSING ITEMS | |
| 6.1 | Prorations | 535 |
| 6.2 | Closing Costs | 535 |
| 7. | REPRESENTATIONS AND WARRANTIES | |
| 7.1 | Representations and Warranties by Seller | 536 |
| 7.2 | Buyer's Representations and Warranties | 539 |
| 7.3 | Buyer Accepts Property "As Is" | 539 |
| 8. | SELLER'S COVENANTS | |

8.1 The Lease 543

8.2 Contracts 543

8.3 Further Liens 543

8.4

9. CONDITIONS TO CLOSING 9.1 Seller's Conditions 543

9.2 Buyer's Conditions 544

9.3 Failure of Condition 545

10. DAMAGE OR DESTRUCTION OF THE PROPERTY; CONDEMNATION 10.1 Damage or Desturction of the Property 546

10.2 Condemnation 547

11. COMMISSIONS, EXPENSES AND CREDITS 11.1 Payment of the Sale Commission 547

12. REMEDIES 12.1 Seller's Remedies 548

12.2 Buyer's Remedies 549

12.3 Provisions Applicable to Buyer and Seller

13. NOTICES 549

14. NON-FOREIGN AFFIDAVIT 551

15. MISCELLANEOUS 15.1 No Waiver 551

15.3 Survival 552

15.4 Successors 552

15.5 Assignment 552

15.6 Relationship of the Parties 553

| | | |
|---|---|---|
| 15.7 | Governing Law | 553 |
| 15.8 | Possession; Risk of Loss | 553 |
| 15.9 | Review by Counsel | 553 |
| 15.10 | <u>Termination</u> | 554 |
| 15.11 | <u>Exhibits</u> | 554 |
| 16. | CONDITION PRECEDENT | 554 |
| 17. | COUNTERPARTS | 554 |

EXHIBITS

EXHIBIT A – LEGAL DESCRIPTION OF THE PROPERTY

EXHIBIT B – PERMITTED EXCEPTIONS

EXHIBIT C - 1 – FORM OF TERM DEED

EXHIBIT C -2 – FORM OF REVERSION DEED

EXHIBIT D – BILL OF SALE

EXHIBIT E – ASSIGNMENT AND ASSUMPTION OF LEASE

EXHIBIT F – COPY OF LESE AND GUARANTY

EXHIBIT G – FORM OF LETTER OF CREIDT

EXHIBIT H – FORM OF NON-FOREIGN AFFIDAVIT

EXHIBIT I – EXISTING REPORTS

PURCHASE AND SALE AGREEMENT

THIS PURCHASE AND SALES AGREEMENT ("Agreement") is made as of the 13th day of January, 1995 (the "Effective Date") by and between R&S KANSAS CITY ASSOCIATES LIMITED PARTNERSHIP, a Connecticut limited partnership ("Seller"), and SCRIBCOR, INC., an Illinois corporation ("Buyer").

RECITALS

A. Seller owns a parcel of land located at and known as 4900 Oak Street, Kansas City Missouri, which land is more particularly described on Exhibit A attached hereto (the "Land"), and the building (the "Building"), parking area, and other real property improvements located thereon (collectively, the "Real Property").

B. The Real Property is subject to that certain Lease Agreement, dated as of December 29, 1989 between Seller, as landlord, and Old American Insurance Company, as tenant ("Tenant"), as amended by a First Amendment to Lease, dated as of November 12, 1991, between Seller and Tenant (as so amended, the "Lease"), which Lease is guaranteed by guaranty, dated as of November 13, 1991, by Kansas City Life Insurance Company (the "Guaranty").

AGREEMENT

C. Subject to the terms and conditions herein, Seller desires to sell and Buyer desires to purchase the Real Property.

NOW, THEREFORE, in consideration of the mutual covenants contained herein, Seller and Buyer agrees as follows:

1. PURCHASE AND SALE.

1.1 Property. Subject to the terms and conditions hereof, Seller hereby agrees to sell, convey and assign to Buyer, and Buyer hereby agrees to purchase and accept from Seller on the Closing Date (as defined in Section 5.1 below) the following (collectively, the "Property"):

(a) the Real Property, including any and all rights, privileges and easements appurtenant thereto which are owned by Seller;

(b) all right, title and interest of Seller (if any) in and to the following (the "Personal Property"): (i) all fixtures, equipment and other items of tangible personal property owned by Seller and attached to or located on the Real Property; and (ii) all assignable or transferable intangible property used in connection with the Real Property, including (A) any and all guaranties and warranties pertaining to the Real Property, (B) all rights to obtain utility service in connection with the Real Property, and (C) assignable licenses and other governmental permits and permissions relating to the Real Property; and (c) the Lease and the Guaranty, together will all security or other deposits, if any, and other amounts collectible or due after Closing, and all rights and claims of Seller relating thereto from and after the Closing.

2. PURCHASE PRICE. Buyer shall pay as the total purchase price for the Property (the "Purchase Price") the sum of Ten Million Two Hundred Fifty Thousand and No/100ths U.S. Dollars ($10,250,000.00).

2.1 Letter of Credit. On the Effective Date Buyer shall provide a letter of credit in the form attached as Exhibit G in the amount of Two Hundred Five Thousand and No/100ths U.S. Dollars ($205,000.00) naming Seller as the beneficiary, with an expiration date not earlier than September 1, 1995, which letter of credit shall be issued by a lending institution reasonably satisfactory to Seller (the "Letter of Credit").

2.2 Payment of Purchase Price. The Purchase Price, plus of minus net prorations shall be due and payable on the Closing Date by wire transfer of immediately available funds to an account or accounts specified by Seller. Seller shall on the Closing Date return the Letter of Credit to Buyer upon payment of the Purchase price.

3. TITLE AND SURVEY 3.1 Survey. Seller has provided Buyer with a Survey dated December 15, 1993, by Shafer, Kline & Warren, P.A., Order Number 226734 (the "Survey"). Seller shall request that the Survey be recertified to Buyer, the Title Insurer (as hereinafter defined), and the Term Trust and Reversion Trust (as those terms are hereinafter defined) as of a date after the date of this Agreement.

3.2 Title Insurance. Promptly after the date of this Agreement, Seller shall promptly hereafter apply to the Title Insurer for, and promptly after receipt thereof deliver to Buyer a commitment for an ALTA Owner's Policy (10/17/92) of title insurance (the "Commitment") issued by Lawyers Title Insurance Corporation or another title insurance company reasonably approved by Buyer (the "Title Insurer") in the amount of the Purchase Price covering title to the Real Property. Buyer agrees to accept title to the Real Property at Closing subject only to the exceptions set forth on Exhibit B attached hereto and made a part hereof (the "Permitted Exceptions"). Seller shall request that the Title Company deliver copies of all documents disclosed by Schedule B of the Commitment to Buyer with the Commitment. The Commitment may also include the general exceptions customarily set forth therein; provided, however, that Seller shall execute such affidavits and other documents as are reasonably and customarily required by the Title Insurer in connection with the issuance of an "extended coverage" endorsement over the general exceptions. At Closing, Seller shall pay to the Title Insurer the cost of an owner's title insurance policy (the "Title Policy") with the following affirmative endorsements (to the extent the Title Insurer is authorized to issue such endorsements): extended coverage, an access endorsement, a survey endorsement, an encroachment endorsement (where encroachments exist), a contiguity endorsement, a separate tax parcel endorsement and zoning a endorsement (form 3.1 including parking), provided that Buyer shall pay the cost of obtaining such zoning endorsement up to the amount of $5,000.00, with the additional cost, if any, of such endorsement to be paid by Seller.

3.3 Title Clearance.

(a) If, at or prior to the Closing, it shall appear that the Real Property is affected by any outstanding liens, encumbrances, interests or other questions subject to which Buyer is not obligated to take title under the terms of this Agreement, and if such liens, encumbrances, interests or other questions of title may, in the reasonable opinion of Seller, be removed as objections to title within sixty (60) days from the date set forth herein for the Closing, Seller may, but shall not be obligated to (except to the extent required in the immediately succeeding sentence), adjourn the Closing for a period not to exceed sixty (60) days for the purpose of removing such liens, encumbrances, interests or other questions. Nothing contained in this Agreement shall be construed to require Seller to incur any expense, take any action or commence any proceeding to remove any such liens, encumbrances, interests or other questions or to otherwise render Seller's title marketable or insurable, provided that Seller shall remove at its sole cost and expense any liens which may be removed by the payment of money and arising out of the acts of omissions of Seller. In the event that Seller fails to remove any such liens, encumbrances, interests or other questions or otherwise fails to convey title to the Real Property in accordance with the provisions of this Agreement, Buyer may either (1) accept such title as Seller may be able to convey, without any reduction of the Purchase Price or other liability on the part of Seller, provided that Buyer shall be entitled to deduct from the Purchase Price the amount of any lien of an ascertainable amount which Seller was required to have removed pursuant to the foregoing sentence of this Section 3.3(a), or (2) terminate this Agreement by notice to Seller so electing, in which case the sole obligation of Seller shall be to return the Letter of Credit to Buyer, and upon such return this Agreement shall be of no further force and effect, neither party shall have any further rights or obligations hereunder, and the lien, if any, on the Premises which may have been created by the delivery of the Letter of Credit and any other sums or things of value which may be paid on account of this Agreement shall wholly cease.

(b) The existence of mortgages, liens or encumbrances, other than the Permitted Exceptions, shall not be objections to title provided that properly executed instruments, in recordable form, necessary to satisfy the same are delivered to Buyer at the Closing, together with any recording or filing fees required in connection therewith. Any such mortgages, liens and encumbrances may be paid out of the cash consideration to be paid by Buyer and, if a request is made in writing within three (3) business days prior to the Closing, Buyer agrees to provide at the Closing separate official bank or certified checks, in such amounts and payable to such parties as requested to facilitate the satisfaction of any such mortgages, liens or encumbrances. No lien which is the responsibility of Tenant or a subtenant of the Real Property shall be an objection to title, and no adjustment to the Purchase Price therefor shall be made.

(c) If, at the time of the Closing, the Real Property, or any part thereof, shall be or shall have been affected by an assessment or assessments which are or may become payable in annual installments then for the purpose or this Agreement, no unpaid installments of any such assessment due on or after the date of the Closing shall be deemed to be due and payable or to be liens upon the Premises.

(d) If a search of title discloses judgments, bankruptcies or other returns against other person having names the same as or similar to that of Seller, Seller will, on request, deliver to Buyer and Buyer's title company an affidavit showing that such judgments, bankruptcies or other returns are not against Seller and the existence thereof shall not be an objection to title if Buyer's title company omits such matters as exceptions to title.

4. [INTENTIONALLY OMITTED]

5. CLOSING 5.1 Closing. The purchase and sale of the Property ("Closing") shall occur at 10:00 a.m. on or before March 1, 1995 (the "Closing Date") at the offices of Rosenman & Col n, 575 Madison Avenue, New York, New York, or at such other location as shall be agreed upon by Seller and Buyer.

5.2 Transactions at Closing. On the Closing Date:

(a) Provided that Seller's conditions to Closing have been satisfied or have been waived in writing by Seller, Seller shall deliver or cause to be delivered to Buyer the following documents (collectively, the "Conveyance Documents") duly executed by Seller and acknowledged where appropriate:

(i) Two special warranty deeds (with covenants as to grantor's acts) (the "Deeds") conveying: (1) an estate for year in the Real Property to the Term Trust (as hereinafter defined) subject only to the Permitted Exceptions in substantially the form of Exhibit C-1 attached hereto (the "Term Deed"); and (2) all remaining right, title and interest of Seller in and to the Real Property to the Reversion Trust (as hereinafter defined) subject only to he Permitted Exceptions in substantially the form of Exhibit C-2 attached hereto (the "Reversion Deed");

(ii) A bill of sale without representation or warranty in the form attached hereto as Exhibit D conveying the Personal Property to the Term trust;

(iii) An assignment and assumption of lease (the "Assignment and Assumption") in the form attached hereto as Exhibit E;

(iv) An estoppel certificate of Tenant in substantially the form specified in Article XXV1 of the Lease;

(v) An original or if unavailable, a copy certified to be true and completed by Seller, of the lease and Guaranty; and (vi) Such other documents and instruments as may be reasonably requested by Buyer or the Title Insurer and as are necessary and appropriate to effect the Closing of the transaction contemplated herein.

(b) Provided that Buyer's conditions to Closing set forth herein have been satisfied or have been waived in writing by Buyer, Buyer shall deliver or cause to be delivered to Seller the following items and documents duly executed by Buyer and acknowledged where appropriate:

(i) The Purchase Price, as adjusted in accordance with the terms of this Agreement;

(ii) Corporate resolution(s) of Buyer, or otherwise other documentation in such form as may be satisfactory to Seller and the title company, evidencing Buyer's full authority to purchase the Property;

(iii) The Assignment and Assumption; and (iv) Such other documents and instruments as may be reasonably requested by Seller and as are necessary and appropriate to complete the Closing of the transaction contemplated herein.

(c) Seller and Buyer shall execute a letter to Tenant (the "Tenant Notification Letter"), disclosing the change of ownership of the Property with the name and address of Buyer and the Closing Date, and Buyer shall, within forty-eight (48) hours following the Closing, cause the Tenant Notification letter to be delivered to Tenant.

6. PRORATIONS; CLOSING ITEMS.

6.1 Prorations.

(a) Basic rent ("Rent") under the Lease shall be apportioned between Buyer and Seller as of 12:01 a.m. immediately preceding the Closing Date.

(b) If the payment of Rent for the month during which Closing occurs has been received by Seller by the Closing Date, then Buyer shall receive a credit against the Purchase Price for the prorated amount of Rent to which it is entitled. If the payment of Rent for the month during which Closing occurs has not been received by Seller by the Closing Date, then Seller shall receive a credit increasing the Purchase Price for the prorated amount of Rent to which it is entitled, and Buyer shall the right to collect the entire payment of Rent for the month during which Closing occurs.

(c) The provisions of this Section 6.1 will survive the Closing.

6.2 Closing Costs (a) Seller shall pay all state and county transfer taxes.

(b) Subject to the provisions of Section 3.2, Seller shall bear all fees, costs and expenses of causing a title company to issue a title insurance policy as required by this Agreement.

(c) Each party shall bear its own fees and expenses of counsel in connection with the negotiation and execution of this Agreement and the Closing of the purchase of the Property. Buyer shall bear all its costs and expenses incurred in connection with its due diligence activities, inspections and investigations in connection with the Agreement.

(d) Except for those costs specifically enumerated herein to be paid by Seller, none of the fees, costs, or expenses arising from or related to this purchase and sale are to be borne by Seller.

7. REPRESENTATIONS AND WARRANTIES.

7.1 Representations and Warranties by Seller. (a) Without limiting any other provision of this Agreement and as a material inducement for Buyer's entering into this Agreement, Seller represents and warrants to Buyer as follows:

(i) Seller has legal power, right and authority to enter into this Agreement and the instruments referenced herein and to consummate the transactions contemplated hereby, and this Agreement and the consummation of the transactions contemplated hereby have been duly authorized by all necessary partnership actions.

(ii) This Agreement constitutes the legal and binding obligation of Seller and is enforceable against Seller in accordance with its terms.

(iii) Seller is a limited partnership duly formed and validly existing as a limited partnership under the laws of the State of Connecticut.

(iv) A true, correct and complete copy of the Lease and Guaranty is attached hereto as Exhibit F.

(v) Seller is not a "Foreign Person", as that term is defined for purposes of the Foreign Investors In Real Property Tax Act of 1980, as amended (Section 1445 of the Internal Revenue Code of 1986, as amended) and the regulations promulgated thereunder ("FIRPTA").

(vi) To the best of Seller's Actual Knowledge (as hereinafter defined), Seller has not received written notice of any material action, proceeding or investigation pending or threatened which would effect the Property.

(vii) To the best of Seller's Actual Knowledge, Seller has not received any notice of violation of or potential liability arising under any federal, state, county, municipal or other governmental authority laws, regulations, ordinances, orders or directives relating to the use or condition or operation of the Property, including but not limited to zoning, building, fire, air pollution, water pollution, environmental or health code violations, that have not been heretofore corrected.

(viii) To the best of Seller's Actual Knowledge, there is no suit, petition, study, investigation or other proceeding pending before any court, governmental agency of instrumentality, administrative or otherwise (including enforcement actions, administrative proceedings, arbitrations, or governmental investigations) regarding the Property. To the best of Seller's Actual Knowledge, there is no condemnation proceedings or declaration of taking or other similar instrument filed against the Property.

(ix) To the best of Seller's Actual Knowledge, there are no persons in possession of, or having a right to possession of, any part of the Property other than Seller, Tenant and persons (known or unknown) claiming by, through or under Tenant. A complete copy of the Lease has been delivered to Buyer. The Lease is in full force and effect, is the valid and binding obligation of the parties thereto, has not been modified or amended and is enforceable against such parties in accordance with the terms thereof. To the best of Seller's Actual Knowledge, there are no defaults by either party to the Lease beyond any applicable grace or cure period. Seller has no obligation to pay brokerage commissions or other compensation in connection with the Lease. All tenant improvements required thereunder to be made by Seller have been completed and paid for.

(x) To the best of Seller's Actual Knowledge, Seller has not received any notice of any special tax, levy or assessment for benefits or betterments which affect the Property and no such special taxes, levies or assessments are pending or contemplated.

(xi) Seller has not entered into any options, purchase and sale agreements, leases, employment agreements, service contracts of other contracts affecting the Property, other than this Agreement and the Lease, which will survive the Closing.

(b) For purposes of this Section 7.1. the following definitions shall obtain:

(i) "Actual Knowledge". At any given time a person shall be deemed to have Actual knowledge of a fact if such person has Conscious Awareness (as hereinafter defined) of such fact or if such fact is contained in a document of which such person has Conscious Awareness or which was created during the course of a transaction in which such person actively participated. A person, however, shall not be deemed to have Actual Knowledge of a fact merely because (i) such fact is contained in a document or approved by such person if such person does not have Conscious Awareness of such document of if such document was not created during the course of a transaction in which such person actively participated or (ii) any other individual in such person's organization has Actual knowledge of such fact. Seller Senior Management, as defined herein, shall, however, be deemed to have Actual Knowledge of a fact at any given time if any single individual in the group comprising Seller Senior Management has Actual Knowledge of such fact at the given time.

(ii) "Conscious Awareness". A person shall be deemed to have Conscious Awareness of a fact at any given time if such person actually remembered such fact at the given time. A person shall not be deemed to have Conscious Awareness of a fact at a given time if such person did not actually remember such fact at the given time unless such fact is contained in a document previously read or executed by such person in the course of a transaction in which such person actively participated. A person shall not be deemed to have Conscious Awareness of a fact merely because any other individual in such person's organization has Conscious Awareness of such fact. Seller Senior Management shall, however, be deemed to have Conscious Awareness of a fact at any given time if any single individual in the group comprising such senior management had Conscious Awareness of such fact at the given time.

(iii) "Seller Senior Management" shall mean Jonathan Molin and Jack Ginende.

7.2 Buyer's representations and Warranties. Buyer hereby represents and warrants to Seller that Buyer has legal power, right and authority to enter into this Agreement and the instruments referenced herein and to consummate the transactions contemplated hereby, and this Agreement and the consummation of the transactions contemplated hereby have been duly authorized by all necessary parties.

7.3 Buyer Accepts Property "As Is".

(a) Buyer acknowledges for Buyer and Buyer's successors, heirs and assignees, (i) that Buyer has been given a reasonable opportunity to inspect and investigate the Property, all improvements thereon and all aspects relating thereto, either independently or through agents and experts of Buyer's choosing and (ii) that Buyer is acquiring the Property based upon Buyer's own investigation and inspection thereof, and (iii) the provisions of this Section 7.3(a) shall survive Closing and shall not be merged therein. SELLER AND BUYER AGREE THAT THE PROPERTY SHALL BE SOLD AND THAT BUYER SHALL ACCEPT POSSESSION OF THE PROPERTY ON THE CLOSING DATE "AS IS, WHERE IS, WITH ALL FAULTS" WITH NO RIGHT OF SET-OFF OR REDUCTION IN THE PURCHASE PRICE, AND THAT EXCEPT AS EXPLICITLY SET FORTH IN THIS AGREEMENT SUCH SALE SHALL BE WITHOUT REPRESENTATION OR WARRANTY OF ANY KIND, EXPRESS OR IMPLIED, INCLUDING, WITHOUT LIMITATION, WARRANTY OF INCOME, POTENTIAL, OPERATING EXPENSES, USES, MERCHANTABILITY OR FITNESS FOR A PARTICULAR PURPOSE, AND EXCEPT AS EXPLICITY SET FORTH IN THIS AGREEMENT, SELLER DOES HEREBY DISCLAIM AND RENOUNCE ANY SUCH REPRESENTATION OR WARRANTY. BUYER SPECIFICALLY ACKNOWLEDGES THAT, WITH THE EXCEPTION OF THE REPRESENTATIONS AND WARRANTIES OF THE SELLER EXPLICITLY SET FORTH HEREIN, BUYER IS NOT RELYING ON ANY REPRESENTATIONS OR WARRANTIES OF ANY KIND WHATSOEVER, EXPRESS OR IMPLIED, FROM SELLER, OTHER AGENTS OR BROKERS AS TO ANY MATTER CONCERNING OR RELATED TO THE PROPERTY, INCLUDING WITHOUT LIMITATION:

(1) THE CONDITION OR SAFETY OF THE PROPERTY OR ANY IMPROVEMENTS THEREON, INCLUDING, BUT NOT LIMITED TO, PLUMBING, SEWER, HEATING AND ELECTRICAL SYSTEMS, ROOFING, AIR CONDITIONING, IF ANY, FOUNDATIONS, SOILS AND GEOLOGY, INCLUDING HAZARDOUS MATERIALS, LOT SIZE, OR SUITABILITY OF THE PROPERTY OR ITS IMPROVEMENTS FOR A PARTICULAR PURPOSE; (2) WHETHER THE APPLIANCES, IF ANY, PLUMBING OR UTILITIES ARE IN WORKING ORDER; (3) THE HABITABILITY OR SUITABILITY FOR OCCUPANCY OF ANY STRUCTURE AND THE QUALITY OF ITS CONSTRUCTION; (4) THE FITNESS OF ANY PERSONAL PROPERTY; (5) WHETHER THE IMPROVEMENTS ARE STRUCTURALLY SOUND, IN GOOD CONDITION, OR IN COMPLIANCE WITH APPLICABLE CITY, COUNTY, STATE OR FEDERAL STATUTES, CODES OR ORDINANCES; OR (6) MATTERS

RELATED TO THE LEASE, THE GUARANTY OR TENANT. BUYER FURTHER ACKNOWLEDGES AND AGREES THAT IT IS RELYING SOLELY UPON ITS OWN INSPECTION OF THE PROPERTY, REVIEW OF THE LEASE AND GUARANTY AND INVESTIGATIONS CONCERNING TENANT AND NOT UPON ANY REPRESENTATIONS MADE TO IT BY SELLER, ITS OFFICERS, DIRECTORS, CONTRACTORS, MANAGERS OR EMPLOYEES NOR ANY PERSON WHOMSOEVER, OTHER THAN THOSE EXPLICITY SET FORTH IN THIS AGREEMENT. ANY REPORTS, REPAIRS OR WORK REQUIRED BY BUYER ARE TO BE THE SOLE REPONSIBILITY OF BUYER AND BUYER AGREES THAT THERE IS NO OBLIGATION ON THE PART OF SELLER TO MAKE ANY CHANGES, ALTERATIONS, OR REPAIR TO THE PROPERTY.

(b) Except as otherwise provided herein, Buyer, for Buyer and Buyer's successors in interest, releases Seller from, and waives all claims and liability which Buyer may have against Seller for, any structural, physical or environmental condition of the Property and further releases Seller from, and waives all liability against Seller attributable to the structural, physical or environmental condition of the Property, including without limitation, the presence, discovery or removal of any Hazardous Materials (as hereinafter defined) in, at, about or under the Property, or for, connected with or with or arising out of any and all claims or causes of action based upon the Comprehensive Environmental Response, Compensation and Liability Act of 1980, the Superfund Amendments and Reauthorization Act of 1986, the Resource Conservation and Recovery Act, the Toxic Substances Control Act, as such acts may be amended from tine to time, or any other federal or state statutory or regulatory cause of action arising from or related to Hazardous Materials at, in, about or under the Property (collectively, the "Hazardous Waste Laws"). The waiver and release of Buyer set forth in this Section 7.3(b) shall survive the Closing Date and shall be enforceable at any time after the Closing Date.

(c) "Hazardous Materials" Defined. For purposes of this Agreement, the term "Hazardous Material" shall mean any substance, chemical, waste or material that is or becomes regulated by any federal, state or local government authority because of its toxicity, infectiousness, radioactivity, explosiveness, ignitability, corrosiveness or reactivity, including, without limitation, those substances regulated by the Hazardous Waste laws.

(d) Hazardous Materials. In addition to and not by way of limitation of the sale of the Property on an "AS IS" basis under this Agreement, Buyer acknowledges receipt of copies of the environmental and engineering reports (the "Existing Reports") listed on Exhibit 1 hereto. Seller makes no representations or warranties whatsoever to Buyer regarding (A) the Existing Reports, if any (including, without limitation, the contents, completeness and/or accuracy thereof or the ability of Buyer to rely thereon), and/or (B) the presence or absence of any Hazardous Materials, in, at, or under the Property; provided, however, Seller does hereby represent and warrants Buyer that to the best of Seller's Actual Knowledge, except for the matters disclosed by the Existing Reports, there are no other matters or conditions relating to the Property the existence of which would or might reasonably be foreseen to give rise to a violation of any Hazardous Waste law. Buyer has made such studies and investigations, conducted such tests and surveys, and engaged such specialists as Buyer has deemed appropriate to evaluate fairly the Property and its risks from an environmental and Hazardous Materials standpoint.

8. SELLER'S COVENANTS. With respect to the period between Effective Date hereof and the Closing Date, Seller covenants as follows:

8.1 The Lease. Seller: (I) shall use reasonable efforts to perform all of the obligations of the landlord under the lease and to cause Tenant to perform all of the obligations of the tenant under the Lease; (ii) shall promptly notify Buyer of any material default under the Lease of which Seller has Actual Knowledge; and (iii) shall promptly deliver to Buyer copies of all correspondence received by Seller with respect to the Property from Tenant or any governmental authority. Seller shall not terminate the Lease, and without Buyer's prior written consent, shall not amend or cancel the Lease. Seller shall not accept from Tenant payment of rent more that one month in advance.

8.2 Contracts. Without Buyer's prior written consent, Seller shall not enter into any contract with respect to the Property which will survive the Closing and for which Buyer shall be liable.

8.3 Further Liens. Without Buyer's prior written consent, Seller shall not between the Effective Date and the Closing Date further encumber the Property with any lien or deed of trust which will not be removed at Seller's sole cost and expense on or before the Closing Date.

Buyer's remedies for a breach on any of the foregoing covenants shall be as provided in Section 12.2 hereof. No obligations under this Section 8 shall survive the Closing.

9. CONDITIONS TO CLOSING.

9.1 Seller's Conditions. The obligation of Seller to sell and convey the Property under this Agreement is subject to the satisfaction of the following conditions precedent or conditions concurrent (the satisfaction of which may be waived only in writing by Seller):

(a) Delivery and execution by Buyer of all monies, items, and other instruments required to be delivered by Buyer to Seller;

(b) Buyer's warranties and representations set forth herein shall be true and correct in all material respects;

(c) All of the actions by Buyer required by this Agreement shall have been completed; and (d) There shall be no uncured default by Buyer of any of its obligations under this Agreement.

Notwithstanding the foregoing, if a condition of Seller is unsatisfied on the Closing Date because of a breach of this Agreement by Seller, then such condition shall be deemed satisfied. Seller shall have no duty or obligation to cause the satisfaction of any of its conditions to Closing set forth in this Section 9.1.

9.2 Buyer's Conditions. The obligation of Buyer to pay the Purchase Price and acquire the Property under this Agreement is subject to the satisfaction of the following conditions precedent or conditions concurrent (the satisfaction of which may be waived only in writing by Buyer):

(a) Delivery and execution by Seller of all items and other instruments to be delivered by Seller pursuant to the other provisions of this Agreement and the following additional items:

(i) Federal and state UCC searches showing that there are no matters that would constitute a lien, charge or prior right against the Personal Property; and (ii) All keys used in connection with the Building and the combinations to all combination locks included on the Property in Seller's possession and control.

(b) Seller's warranties and representations set forth herein shall be true and correct in all material respects;

(c) Buyer shall have received an estoppel certificate from Tenant in the form specified in Article XXVI of the Lease, certifying (i) that the copy of the Lease which is annexed to such certificate is a true and correct copy of the Lease, and, as modified by a First Amendment to Lease, dated as on November 12 1991, between Seller and Tenant, is in full force and effect; (ii) the dates to which Rent and Taxes (as such terms are defined in the Lease) due under the Lease have been paid; and (iii) whether, to the best knowledge of Tenant, any default exists under the Lease and, if any such default exists, specifying the nature and period of existence thereof and what action Tenant is taking or proposes to take with respect thereto.

(d) All of the actions by Seller required by this Agreement shall have been taken.

(e) There shall be no uncured default by Seller of any of its obligations under this Agreement.

(f) There shall be no uncured monetary default beyond any applicable grace or cure period by Tenant under the Lease.

Notwithstanding the foregoing, if a condition of Buyer is unsatisfied on the Closing Date because of a breach of this Agreement by Buyer, then such condition shall be deemed satisfied. Buyer shall have no duty or obligation to cause the satisfaction on any of its conditions to Closing set forth in this Section 9.2

9.3 Failure of Condition.

(a) In the event of a failure of any condition of Seller contained in Section 9.1 above, Seller may in its sole discretion:

(i) Terminate this Agreement by notice to Buyer, and (A) if Buyer is not in default hereunder, Buyer shall receive the Letter of Credit, and (B) if Buyer is in default hereunder, Seller be entitled to the remedies afforded it pursuant to Section 12.1 hereof; or (ii) Seller may waive such condition and close the transaction.

(b) In the event of a failure of any condition of Buyer contained in Section 9.2, then Buyer may:

(i) Terminate this Agreement by notice to Seller, in which event: (A) if Seller is not in default hereunder, Buyer shall receive the Letter of Credit, (B) if Seller is in default hereunder, Buyer shall be entitled to pursue its remedies pursuant to Section 12.2 hereof; or (ii) Buyer may waive such condition and close the transaction.

10. DAMAGE OR DESTRUCTION OF THE PROPERTY; CONDEMNATION.

10.1 <u>Damage or Destruction of the Property</u>.

(a) If, between the Effective Date and the Closing Date, the Property is Materially Damaged or Destroyed (as hereinafter defined), Buyer may elect in writing, within five (5) days after receipt of notice from Seller of such damage or destruction, accompanied by information regarding the amount and payment of insurance, to terminate this Agreement or to purchase the Property without regard to such damaged or destruction. If Buyer fails to notify Seller of Buyer's election, Buyer will be deemed to have elected to proceed with the purchase of the Property. In the event that Buyer purchases the Property, Seller have no obligation to repair any such damage or destruction, nor shall the Purchase Price be adjusted. "<u>Materially Damaged or Destroyed</u>" shall mean damage or destruction, the repair or replacement of which would (i) reasonably take more than ninety (90) days to complete or the cost of which would exceed $1,000,000, as determined by a licensed general contractor selected by Seller and reasonably approved by Buyer or (ii) give rise to a right to Tenant to terminate the Lease.

(b) If Buyer elects to terminate this Agreement in accordance with Section 10.1(a), this Agreement shall be of no further force and effect subject to Section 15.10, and the Letter of Credit shall be returned to buyer.

(c) If Buyer elects or is required to purchase the Property despite such damage or destruction, Seller shall assign its rights to insurance proceeds to and Buyer shall be entitled to receive any insurance proceeds to which Seller is entitled.

10.2 Condemnation. If prior to Closing all or a Material Part (as defined herein) of the Property is subject to a proposed taking by any public authority, Seller shall promptly notify Buyer of such proposed taking and Buyer may terminate this Agreement by notice to Seller within five (5) days after written notice thereof. If Buyer so elects, this Agreement shall be of no further force and effect. If Buyer does not so terminate this Agreement, or if the taking is as to a non-Material Part of the Real Property, Buyer shall accept all of the Property subject to the taking without a reduction in the Purchase Price and shall receive at Closing an assignment of all of Seller's rights to any condemnation award, subject to Tenant's rights under the Lease. "Material Part" shall mean (i) 10% or more of the area of the Land or the full area of the building and other improvements on the Land or (ii) a part such as gives rise to a right to Tenant to terminate the Lease.

11. COMMISSIONS, EXPENSES AND CREDITS.

11.1 Payment of the Sale Commission. Buyer and Seller represent and warrant to each other that the party making such warranty dealt with no real estate broker or agent in connection with this transaction except for FDC Management Group, Inc. (the "Broker") and Buyer shall be solely responsible for the payment of a brokerage fee to the Broker based on a separate agreement between Broker and Buyer. Seller hereby indemnifies Buyer and holds Buyer harmless from any and all demands or claims which now or hereafter may be asserted against Buyer for any brokerage fees, commissions or similar types of compensation which may be claimed by any broker which claims to have dealt with Seller or which claims to have been engaged by Seller and all expenses and costs in handling or defending any such demand or claim (including reasonable attorneys fees). Buyer hereby indemnifies Seller and holds Seller harmless from any and all demands or claims which now or hereafter may be asserted against Seller for any brokerage fees, commissions or similar types of compensation which may be claimed by any broker which claims to have dealt with Buyer or which claims to have been engaged by Buyer and all expenses and costs in handling or defending any such demand or claim in connection with this transaction (including reasonable attorneys fees).

12. REMEDIES.

12.1 Seller's Remedies. If Buyer defaults in its obligations under this Agreement, Seller shall entitled to terminate this Agreement and immediately draw down the Letter of Credit and retain the proceeds thereof as liquidated damages. SELLER AND BUYER ACKNOWLEDGE THAT SELLER'S DAMAGES WOULD BE DIFFICULT TO DETERMINE, AND THAT THE SPECIFIED SUM IS A REASONABLE ESTIMATE OF SELLER'S DAMAGES. SELLER AND BUYER FURTHER AGREE THAT THIS SECTION 12.1 IS INTENDED TO AND DOES LIQUIDATE THE AMOUNT OF DAMAGES DUE SELLER, AND SHALL BE SELLER'S EXCLUSIVE REMEDY AGAINST BUYER, BOTH AT LAW AND IN EQUITY ARISING FROM OR RELATED TO A BREACH BY BUYER OF ITS OBLIGATION TO CONSUMMATE THE TRANSACTIONS CONTEMPLATED BY THIS AGREEMENT.

12.2 Buyer's Remedies. If Seller defaults in its obligations to sell the Property under this Agreement, (i) buyer may elect to treat this Agreement as terminated, in which case all payments and things of value provided by Buyer hereunder (including the Letter of Credit) shall be returned to Buyer and Buyer may recover as its sole recoverable damages its actual out-of-pocket expenses and costs in connection with this transaction, which damages shall not exceed $75,000.00 in any event, or (ii) Buyer may elect to treat this Agreement as being in full force and effect, and Buyer shall have the right to an action for specific performance, which action shall seek enforcement of this Agreement strictly in accordance with its terms. SELLER AND BUYER FURTHER AGREE THAT THIS SECTION 12.2 IS INTENDED TO AND DOES LIMIT THE AMOUNT OF DAMAGES DUE BUYER AND THE REMEDIES AVAILABLE TO BUYER, AND SHALL BE BUYER'S EXCLUSIVE REMEDY AGAINST SELLER, BOTH AT LAW AND IN EQUITY ARISING FROM OR RELATED TO A BREACH BY SELLER OF ITS OBLIGATION TO CONSUMMATE THE TRANSACTIONS CONTEMPLATED BY THIS AGREEMENT.

13. NOTICES.

All notices, requests or demands to a party hereunder shall be in writing and shall be effective (i) when delivered personally, (ii) when received by overnight courier service or facsimile telecommunication (provided that a copy of such notice, request or demand is deposited into the United States mail within one (1) business day of the facsimile transmission), or (iii) three (3) days after being deposited into the United States mail (sent certified or registered, return receipt requested), in each case addressed as follows (or to such other address as Buyer or Seller may designate in writing in accordance with this Section 13):

If to Seller:

R&S Kansas City Associates
Limited Partnership
c/o U.S. Realty Advisors, Inc.
1370 Avenue of the Americas
New York, New York 10019
Attention: Mr. Jonathan Molin
President
Telecopy Number (212) 581-4950
Confirmation Number: (212) 581-4540

With a copy to:

Gordon M. Alpert, Esq.
Rosenman & Colin
575 Madison Avenue
New York, New York 10022
Telecopy Number: (212) 940-7049
Confirmation Number: (212) 940-8920

If to Buyer:

Scribcor, Inc.
400 North Michigan Avenue
Chicago, IL 60611
Attention: Richard M. Ross, Jr.
President
Telecopy Number: (312) 923-8023

Confirmation Number: (312) 923-8000

With a copy to:

Stephen Tomlinson, Esq.

Kirkland & Ellis

200 East Randolph Drive

Suite 5900

Chicago, IL 60601

Telecopy Number: (312) 861-2200

Confirmation Number: (312) 861-2386

14, NON-FOREIGN AFFIDAVIT.

Seller shall provide Buyer, on or before the Closing Date, with a non-foreign affidavit sufficient in form and substance to relieve Buyer of any and all withholding obligations under federal law, which affidavit shall be substantially in the form attached hereto as Exhibit H. If Seller does not furnish Buyer with said affidavit, or if Buyer has reason to believe that said affidavit would be wholly or partially false if given and so notifies Seller, in writing, on or before the Closing Date, Buyer shall be entitled to withhold up to ten percent (10%) of the Purchase Price in an escrow account until such time as Seller furnishes Buyer with a qualifying statement from the Internal Revenue Service sufficient to relieve Buyer of any and all withholding obligations under federal law, or until Buyer is required to deliver said funds to the Internal Revenue Service, whichever first occurs.

15, MISCELLANEOUS.

15.1 No Waiver. No waiver by any party of the performance or satisfaction of any covenant or condition shall be valid unless in writing and shall not be considered to be a waiver by such party of any other covenant or condition hereunder.

15.2 Entire Agreement. This Agreement contains the entire agreement between the parties regarding the Property and supersedes all prior agreements, whether written or oral, between the parties regarding the same subject. This Agreement may only be modified in writing.

15.3. Survival. Except for as otherwise specifically provided in this Agreement, none of the agreements, warranties and representations contained herein shall survive the Closing.

15.4 Successors. This Agreement shall bind and inure to the benefit of the parties hereto and to their respective legal representatives, successors and permitted assigns.

15.5 Assignment. Buyer shall have the right to assign its rights (but not its obligations) under this Agreement to two trusts to be established by Buyer one of which trusts shall acquire an estate for years in the Property (the "Term Trust") and one of which shall acquire the remaining interest of Seller in the Property (the "Reversion Trust"). Seller shall cooperate in all reasonable respects with Buyer in effecting such conveyances, provide that Seller shall not be required to incur any incrementally additional expense in so cooperating. Except as provided above, Buyer shall not have any right to assign, transfer or encumber its rights under this Agreement, without the prior written consent of Seller, which consent may be withheld in Seller's sole, absolute and unfettered discretion. Any assignment, transfer or encumbrance by Buyer requiring, but made without, Seller's prior written consent, shall be void ab initio and shall constitute a breach by Buyer of this Agreement entitling Seller to terminate this Agreement and exercise its remedies to immediately draw down the Letter of Credit and retain the proceeds thereof as liquidated damages under Section 12.1 hereof. No assignment, transfer or encumbrance solely in favor of person(s) or entity(ies) in a control relationship with Buyer shall be deemed to violate this Section 14.5. "Control relationship" shall be deemed to mean either (a) ownership of fifty percent (50%) or more of all of the voting stock of a corporation or fifty percent (50%) or more of all of the legal and equitable interest in a partnership or other business entity or (b) the possession of the power directly or indirectly to direct or cause the direction of management and policy of a corporation, partnership or other business entity, whether through the ownership of voting securities, by contract, common directors or officers, the contractual right to manage the business affairs of any such corporation, partnership or business entity, or otherwise. Buyer represents, warrants and certifies to Seller that Buyer has not assigned, transferred or encumbered or agreed to assign, transfer or encumber, directly or indirectly, all or any portion of its rights or obligations under this Agreement in violation of this Section.

15.6 Relationship of the Parties. The parties acknowledge that neither party is an agent for the other party, and the neither party shall or can bind or enter into agreements for the other party.

15.7 Governing Law. This Agreement and the legal relations between the parties hereto shall be governed by and construed in accordance with the laws of the State of Missouri.

15.8 Possession; Risk of Loss. Seller shall deliver to Buyer possession of the Property on the Closing Date, subject to Permitted Exceptions and the terms and conditions of this Agreement. All risk of loss or damage with respect to the Property shall pass from Seller to Buyer on the Closing Date.

15.9 Review by Counsel. The parties acknowledge that each party and its counsel have reviewed and approved this Agreement, and the parties hereby agree that the normal rule of construction to the effect that any ambiguities are to be resolved against the drafting party shall not be employed in the interpretation of this Agreement or any amendments or exhibits hereto.

15.10 Termination. Upon termination of this Agreement for any reason by either party, Buyer shall have the obligation to return to Seller all documents and copies thereof (including the survey, if any) any other information or documentation prepared by any third party in conjunction with Buyer's inspections of the Property. Seller shall not have any obligation to return the Letter of Credit to Buyer, upon any termination of this Agreement by Buyer, until the documents and copies thereof (including the survey, if any) and other information have been return to Seller.

15.11 Exhibits. The Exhibits attached hereto form a part of this Agreement and are incorporated herein by this reference.

16. CONDITION PRECEDENT.

Buyer's obligations under this Agreement shall be conditioned upon Buyer's completion on or before 5:00 p.m. EST on Thursday, January 19, 1995 of an inspection of the Real Property. If Buyer shall effectively notify Seller in writing within said period that the Real Property is not in a condition reasonably satisfactory to Buyer, then Buyer may elect by such notice to terminate this Agreement, in which event neither part shall have any further rights or obligations hereunder and the Letter of Credit shall be returned to Buyer. In the absence of such effective notice, this condition shall be deemed waived by Buyer.

17. COUNTERPARTS.

This Agreement may be executed in any number of counterparts each of which, when taken together, shall constitute one agreement. This Agreement shall only be effective if a counterpart is signed by both Seller and Buyer.

IN WITNESS WHEREOF, the parties have executed this Agreement as of the date first set forth above.

SELLER:

R&S KANSAS CITY ASSOCIATES LIMITED PARTNERSHIP

By: U.S. Realty Capital Services, Inc., a general partner

By: ______________________________

Name: ____________________________

Title: ____________________________

BUYER:

SCRIBCOR, INC.

By: ______________________________

Name: ____________________________

Title: ____________________________

FORM OF REAL ESTATE ACQUISITION AGREEMENT

PURCHASE AND SALE AGREEMENT

Between

R&S KANSAS CITY ASSOCIATES LIMITED PARTNERSHIP,

A Connecticut Limited partnership (Seller)

and

SCRIBOR, INC., an Illinois corporation (Buyer)

Dated as of January 13, 1995

TABLE OF CONTENTS

1 PURCHASE AND SALE 1.1 Property

2. PURCHASE PRICE 2.1 Letter of Credit 2.2 Payment of Purchase Price 2.3 Conveyance

3. TITLE AND SURVEY 3.1 Survey 3.2 Title Insurance 3.3 Title Clearance

4. [INTENTIONALLY OMITTED]

5. CLOSING 5.1 Closing 5.2 Transactions at Closing

6. PRORATIONS: CLOSING ITEMS 6.1 Prorations 6.2 Closing Costs

7. REPRESENTATIONS AND WARRANTIES 7.1 Representations and Warranties by Seller 7.2 Buyer's Representations and Warranties 7.3 Buyer Accepts Property "As Is"

8. SELLER'S COVENANTS 8.1 The Lease 8.2 Contracts 8.3 Further Liens 8.4

9. CONDITIONS TO CLOSING 9.1 Seller's Conditions 9.2 Buyer's Conditions 9.3 Failure of Condition

10. DAMAGE OR DESTRUCTION OF THE PROPERTY; CONDEMNATION 10.1 Damage or Desturction of the Property 10.2 Condemnation

11. COMMISSIONS, EXPENSES AND CREDITS 11.1 Payment of the Sale Commission

12. REMEDIES 12.1 Seller's Remedies 12.2 Buyer's Remedies 12.3 Provisions Applicable to Buyer and Seller

13. NOTICES

14. NON-FOREIGN AFFIDAVIT

15. MISCELLANEOUS 15.1 No Waier 5.3 Survival 15.4 Successors

15. Assignment

15.Relationship of the Parties 15.7Governing Law 15.8Possession; Risk of Loss 15.9Review by Counsel 15.10 Termination 15.11 Exhibits

16.CONDITION PRECEDENT

17.COUNTERPARTS

EXHIBITS

EXHIBIT A – LEGAL DESCRIPTION OF THE PROPERTY

EXHIBIT B – PERMITTED EXCEPTIONS

EXHIBIT C - 1 – FORM OF TERM DEED

EXHIBIT C -2 – FORM OF REVERSION DEED

EXHIBIT D – BILL OF SALE

EXHIBIT E – ASSIGNMENT AND ASSUMPTION OF LEASE

EXHIBIT F – COPY OF LESE AND GUARANTY

EXHIBIT G – FORM OF LETTER OF CREIDT

EXHIBIT H – FORM OF NON-FOREIGN AFFIDAVIT

EXHIBIT I – EXISTING REPORTS

PURCHASE AND SALE AGREEMENT

THIS PURCHASE AND SALES AGREEMENT ("Agreement") is made as of the 13th day of January, 1995 (the "Effective Date") by and between R&S KANSAS CITY ASSOCIATES LIMITED PARTNERSHIP, a Connecticut limited partnership ("Seller"), and SCRIBCOR, INC., an Illinois corporation ("Buyer").

RECITALS

A. Seller owns a parcel of land located at and known as 4900 Oak Street, Kansas City Missouri, which land is more particularly described on Exhibit A attached hereto (the "Land"), and the building (the "Building"), parking area, and other real property improvements located thereon (collectively, the "Real Property").

B. The Real Property is subject to that certain Lease Agreement, dated as of December 29, 1989 between Seller, as landlord, and Old American Insurance Company, as tenant ("Tenant"), as amended by a First Amendment to Lease, dated as of November 12, 1991, between Seller and Tenant (as so amended, the "Lease"), which Lease is guaranteed by guaranty, dated as of November 13, 1991, by Kansas City Life Insurance Company (the "Guaranty").

AGREEMENT

C. Subject to the terms and conditions herein, Seller desires to sell and Buyer desires to purchase the Real Property.

NOW, THEREFORE, in consideration of the mutual covenants contained herein, Seller and Buyer agrees as follows:

2. PURCHASE AND SALE.

1.1 Property. Subject to the terms and conditions hereof, Seller hereby agrees to sell, convey and assign to Buyer, and Buyer hereby agrees to purchase and accept from Seller on the Closing Date (as defined in Section 5.1 below) the following (collectively, the "Property"):

(a) the Real Property, including any and all rights, privileges and easements appurtenant thereto which are owned by Seller;

(b) all right, title and interest of Seller (if any) in and to the following (the "Personal Property"): (i) all fixtures, equipment and other items of tangible personal property owned by Seller and attached to or located on the Real Property; and (ii) all assignable or transferable intangible property used in connection with the Real Property, including (A) any and all guaranties and warranties pertaining to the Real Property, (B) all rights to obtain utility service in connection with the Real Property, and (C) assignable licenses and other governmental permits and permissions relating to the Real Property; and (c) the Lease and the Guaranty, together will all security or other deposits, if any, and other amounts collectible or due after Closing, and all rights and claims of Seller relating thereto from and after the Closing.

2. PURCHASE PRICE. Buyer shall pay as the total purchase price for the Property (the "Purchase Price") the sum of Ten Million Two Hundred Fifty Thousand and No/100ths U.S. Dollars ($10,250,000.00).

2.1 Letter of Credit. On the Effective Date Buyer shall provide a letter of credit in the form attached as Exhibit G in the amount of Two Hundred Five Thousand and No/100ths U.S. Dollars ($205,000.00) naming Seller as the beneficiary, with an expiration date not earlier than September 1, 1995, which letter of credit shall be issued by a lending institution reasonably satisfactory to Seller (the "Letter of Credit").

2.2 Payment of Purchase Price. The Purchase Price, plus of minus net prorations shall be due and payable on the Closing Date by wire transfer of immediately available funds to an account or accounts specified by Seller. Seller shall on the Closing Date return the Letter of Credit to Buyer upon payment of the Purchase price.

3. TITLE AND SURVEY 3.4 Survey. Seller has provided Buyer with a Survey dated December 15, 1993, by Shafer, Kline & Warren, P.A., Order Number 226734 (the "Survey"). Seller shall request that the Survey be recertified to Buyer, the Title Insurer (as hereinafter defined), and the Term Trust and Reversion Trust (as those terms are hereinafter defined) as of a date after the date of this Agreement.

3.5 Title Insurance. Promptly after the date of this Agreement, Seller shall promptly hereafter apply to the Title Insurer for, and promptly after receipt thereof deliver to Buyer a commitment for an ALTA Owner's Policy (10/17/92) of title insurance (the "Commitment") issued by Lawyers Title Insurance Corporation or another title insurance company reasonably approved by Buyer (the "Title Insurer") in the amount of the Purchase Price covering title to the Real Property. Buyer agrees to accept title to the Real Property at Closing subject only to the exceptions set forth on Exhibit B attached hereto and made a part hereof (the "Permitted Exceptions"). Seller shall request that the Title Company deliver copies of all documents disclosed by Schedule B of the Commitment to Buyer with the Commitment. The Commitment may also include the general exceptions customarily set forth therein; provided, however, that Seller shall execute such affidavits and other documents as are reasonably and customarily required by the Title Insurer in connection with the issuance of an "extended coverage" endorsement over the general exceptions. At Closing, Seller shall pay to the Title Insurer the cost of an owner's title insurance policy (the "Title Policy") with the following affirmative endorsements (to the extent the Title Insurer is authorized to issue such endorsements): extended coverage, an access endorsement, a survey endorsement, an encroachment endorsement (where encroachments exist), a contiguity endorsement, a separate tax parcel endorsement and zoning a endorsement (form 3.1 including parking), provided that Buyer shall pay the cost of obtaining such zoning endorsement up to the amount of $5,000.00, with the additional cost, if any, of such endorsement to be paid by Seller.

3.6 Title Clearance.

(a) If, at or prior to the Closing, it shall appear that the Real Property is affected by any outstanding liens, encumbrances, interests or other questions subject to which Buyer is not obligated to take title under the terms of this Agreement, and if such liens, encumbrances, interests or other questions of title may, in the reasonable opinion of Seller, be removed as objections to title within sixty (60) days from the date set forth herein for the Closing, Seller may, but shall not be obligated to (except to the extent required in the immediately succeeding sentence), adjourn the Closing for a period not to exceed sixty (60) days for the purpose of removing such liens, encumbrances, interests or other questions. Nothing contained in this Agreement shall be construed to require Seller to incur any expense, take any action or commence any proceeding to remove any such liens, encumbrances, interests or other questions or to otherwise render Seller's title marketable or insurable, provided that Seller shall remove at its sole cost and expense any liens which may be removed by the payment of money and arising out of the acts of omissions of Seller. In the event that Seller fails to remove any such liens, encumbrances, interests or other questions or otherwise fails to convey title to the Real Property in accordance with the provisions of this Agreement, Buyer may either (1) accept such title as Seller may be able to convey, without any reduction of the Purchase Price or other liability on the part of Seller, provided that Buyer shall be entitled to deduct from the Purchase Price the amount of any lien of an ascertainable amount which Seller was required to have removed pursuant to the foregoing sentence of this Section 3.3(a), or (2) terminate this Agreement by notice to Seller so electing, in which case the sole obligation of Seller shall be to return the Letter of Credit to Buyer, and upon such return this Agreement shall be of no further force and effect, neither party shall have any further rights or obligations hereunder, and the lien, if any, on the Premises which may have been created by the delivery of the Letter of Credit and any other sums or things of value which may be paid on account of this Agreement shall wholly cease.

(b) The existence of mortgages, liens or encumbrances, other than the Permitted Exceptions, shall not be objections to title provided that properly executed instruments, in recordable form, necessary to satisfy the same are delivered to Buyer at the Closing, together with any recording or filing fees required in connection therewith. Any such mortgages, liens and encumbrances may be paid out of the cash consideration to be paid by Buyer and, if a request is made in writing within three (3) business days prior to the Closing, Buyer agrees to provide at the Closing separate official bank or certified checks, in such amounts and payable to such parties as requested to facilitate the satisfaction of any such mortgages, liens or encumbrances. No lien which is the responsibility of Tenant or a subtenant of the Real Property shall be an objection to title, and no adjustment to the Purchase Price therefor shall be made.

(e) If, at the time of the Closing, the Real Property, or any part thereof, shall be or shall have been affected by an assessment or assessments which are or may become payable in annual installments then for the purpose or this Agreement, no unpaid installments of any such assessment due on or after the date of the Closing shall be deemed to be due and payable or to be liens upon the Premises.

(f) If a search of title discloses judgments, bankruptcies or other returns against other person having names the same as or similar to that of Seller, Seller will, on request, deliver to Buyer and Buyer's title company an affidavit showing that such judgments, bankruptcies or other returns are not against Seller and the existence thereof shall not be an objection to title if Buyer's title company omits such matters as exceptions to title.

8. [INTENTIONALLY OMITTED]

9. CLOSING 9.1 Closing. The purchase and sale of the Property ("Closing") shall occur at 10:00 a.m. on or before March 1, 1995 (the "Closing Date") at the offices of Rosenman & Colin, 575 Madison Avenue, New York, New York, or at such other location as shall be agreed upon by Seller and Buyer.

9.2 Transactions at Closing. On the Closing Date:

(a) Provided that Seller's conditions to Closing have been satisfied or have been waived in writing by Seller, Seller shall deliver or cause to be delivered to Buyer the following documents (collectively, the "Conveyance Documents") duly executed by Seller and acknowledged where appropriate:

(j) Two special warranty deeds (with covenants as to grantor's acts) (the "Deeds") conveying: (1) an estate for year in the Real Property to the Term Trust (as hereinafter defined) subject only to the Permitted Exceptions in substantially the form of Exhibit C-1 attached hereto (the "Term Deed"); and (2) all remaining right, title and interest of Seller in and to the Real Property to the Reversion Trust (as hereinafter defined) subject only to he Permitted Exceptions in substantially the form of Exhibit C-2 attached hereto (the "Reversion Deed");

(vii) A bill of sale without representation or warranty in the form attached hereto as Exhibit D conveying the Personal Property to the Term trust;

(viii) An assignment and assumption of lease (the "Assignment and Assumption") in the form attached hereto as Exhibit E;

(ix) An estoppel certificate of Tenant in substantially the form specified in Article XXV1 of the Lease;

(x) An original or if unavailable, a copy certified to be true and completed by Seller, of the lease and Guaranty; and (xi) Such other documents and instruments as may be reasonably requested by Buyer or the Title Insurer and as are necessary and appropriate to effect the Closing of the transaction contemplated herein.

(b) Provided that Buyer's conditions to Closing set forth herein have been satisfied or have been waived in writing by Buyer, Buyer shall deliver or cause to be delivered to Seller the following items and documents duly executed by Buyer and acknowledged where appropriate:

(v) The Purchase Price, as adjusted in accordance with the terms of this Agreement;

(vi) Corporate resolution(s) of Buyer, or otherwise other documentation in such form as may be satisfactory to Seller and the title company, evidencing Buyer's full authority to purchase the Property;

(vii) The Assignment and Assumption; and (viii) Such other documents and instruments as may be reasonably requested by Seller and as are necessary and appropriate to complete the Closing of the transaction contemplated herein.

(d) Seller and Buyer shall execute a letter to Tenant (the

"Tenant Notification Letter"), disclosing the change of ownership of the Property with the name and address of Buyer and the Closing Date, and Buyer shall, within forty-eight (48) hours following the Closing, cause the Tenant Notification letter to be delivered to Tenant.

10. PRORATIONS; CLOSING ITEMS.

6.1 Prorations.

(a) Basic rent ("Rent") under the Lease shall be apportioned between Buyer and Seller as of 12:01 a.m. immediately preceding the Closing Date.

(b) If the payment of Rent for the month during which Closing occurs has been received by Seller by the Closing Date, then Buyer shall receive a credit against the Purchase Price for the prorated amount of Rent to which it is entitled. If the payment of Rent for the month during which Closing occurs has not been received by Seller by the Closing Date, then Seller shall receive a credit increasing the Purchase Price for the prorated amount of Rent to which it is entitled, and Buyer shall the right to collect the entire payment of Rent for the month during which Closing occurs.

(d) The provisions of this Section 6.1 will survive the Closing.

6.3 Closing Costs (e) Seller shall pay all state and county transfer taxes.

(f) Subject to the provisions of Section 3.2, Seller shall bear all fees, costs and expenses of causing a title company to issue a title insurance policy as required by this Agreement.

(g) Each party shall bear its own fees and expenses of counsel in connection with the negotiation and execution of this Agreement and the Closing of the purchase of the Property. Buyer shall bear all its costs and expenses incurred in connection with its due diligence activities, inspections and investigations in connection with the Agreement.

(h) Except for those costs specifically enumerated herein to be paid by Seller, none of the fees, costs, or expenses arising from or related to this purchase and sale are to be borne by Seller.

11. REPRESENTATIONS AND WARRANTIES.

7.1 Representations and Warranties by Seller. (a) Without limiting any other provision of this Agreement and as a material inducement for Buyer's entering into this Agreement, Seller represents and warrants to Buyer as follows:

(xii) Seller has legal power, right and authority to enter into this Agreement and the instruments referenced herein and to consummate the transactions contemplated hereby, and this Agreement and the consummation of the transactions contemplated hereby have been duly authorized by all necessary partnership actions.

(xiii) This Agreement constitutes the legal and binding obligation of Seller and is enforceable against Seller in accordance with its terms.

(xiv) Seller is a limited partnership duly formed and validly existing as a limited partnership under the laws of the State of Connecticut.

(xv) A true, correct and complete copy of the Lease and Guaranty is attached hereto as Exhibit F.

(xvi) Seller is not a "Foreign Person", as that term is defined for purposes of the Foreign Investors In Real Property Tax Act of 1980, as amended (Section 1445 of the Internal Revenue Code of 1986, as amended) and the regulations promulgated thereunder ("FIRPTA").

(xvii) To the best of Seller's Actual Knowledge (as hereinafter defined), Seller has not received written notice of any material action, proceeding or investigation pending or threatened which would effect the Property.

(xviii) To the best of Seller's Actual Knowledge, Seller has not received any notice of violation of or potential liability arising under any federal, state, county, municipal or other governmental authority laws, regulations, ordinances, orders or directives relating to the use or condition or operation of the Property, including but not limited to zoning, building, fire, air pollution, water pollution, environmental or health code violations, that have not been heretofore corrected.

(xix) To the best of Seller's Actual Knowledge, there is no suit, petition, study, investigation or other proceeding pending before any court, governmental agency of instrumentality, administrative or otherwise (including enforcement actions, administrative proceedings, arbitrations, or governmental investigations) regarding the Property. To the best of Seller's Actual Knowledge, there is no condemnation proceedings or declaration of taking or other similar instrument filed against the Property.

(xx) To the best of Seller's Actual Knowledge, there are no persons in possession of, or having a right to possession of, any part of the Property other than Seller, Tenant and persons (known or unknown) claiming by, through or under Tenant. A complete copy of the Lease has been delivered to Buyer. The Lease is in full force and effect, is the valid and binding obligation of the parties thereto, has not been modified or amended and is enforceable against such parties in accordance with the terms thereof. To the best of Seller's Actual Knowledge, there are no defaults by either party to the Lease beyond any applicable grace or cure period. Seller has no obligation to pay brokerage commissions or other compensation in connection with the Lease. All tenant improvements required thereunder to be made by Seller have been completed and paid for.

(xxi) To the best of Seller's Actual Knowledge, Seller has not received any notice of any special tax, levy or assessment for benefits or betterments which affect the Property and no such special taxes, levies or assessments are pending or contemplated.

(xxii) Seller has not entered into any options, purchase and sale agreements, leases, employment agreements, service contracts of other contracts affecting the Property, other than this Agreement and the Lease, which will survive the Closing.

(c) For purposes of this Section 7.1. the following definitions shall obtain:

(i) "Actual Knowledge". At any given time a person shall be deemed to have Actual knowledge of a fact if such person has Conscious Awareness (as hereinafter defined) of such fact or if such fact is contained in a document of which such person has Conscious Awareness or which was created during the course of a transaction in which such person actively participated. A person, however, shall not be deemed to have Actual Knowledge of a fact merely because (i) such fact is contained in a document or approved by such person if such person does not have Conscious Awareness of such document of if such document was not created during the course of a transaction in which such person actively participated or (ii) any other individual in such person's organization has Actual knowledge of such fact. Seller Senior Management, as defined herein, shall, however, be deemed to have Actual Knowledge of a fact at any given time if any single individual in the group comprising Seller Senior Management has Actual Knowledge of such fact at the given time.

(ii) "Conscious Awareness". A person shall be deemed to have Conscious Awareness of a fact at any given time if such person actually remembered such fact at the given time. A person shall not be deemed to have Conscious Awareness of a fact at a given time if such person did not actually remember such fact at the given time unless such fact is contained in a document previously read or executed by such person in the course of a transaction in which such person actively participated. A person shall not be deemed to have Conscious Awareness of a fact merely because any other individual in such person's organization has Conscious Awareness of such fact. Seller Senior Management shall, however, be deemed to have Conscious Awareness of a fact at any given time if any single individual in the group comprising such senior management had Conscious Awareness of such fact at the given time.

(iv) "Seller Senior Management" shall mean Jonathan Molin and Jack Ginende.

7.4 Buyer's representations and Warranties. Buyer hereby represents and warrants to Seller that Buyer has legal power, right and authority to enter into this Agreement and the instruments referenced herein and to consummate the transactions contemplated hereby, and this Agreement and the consummation of the transactions contemplated hereby have been duly authorized by all necessary parties.

7.5 Buyer Accepts Property "As Is".

(b) Buyer acknowledges for Buyer and Buyer's successors, heirs and assignees, (i) that Buyer has been given a reasonable opportunity to inspect and investigate the Property, all improvements thereon and all aspects relating thereto, either independently or through agents and experts of Buyer's choosing and (ii) that Buyer is acquiring the Property based upon Buyer's own investigation and inspection thereof, and (iii) the provisions of this Section 7.3(a) shall survive Closing and shall not be merged therein. SELLER AND BUYER AGREE THAT THE PROPERTY SHALL BE SOLD AND THAT BUYER SHALL ACCEPT POSSESSION OF THE PROPERTY ON THE CLOSING DATE "AS IS, WHERE IS, WITH ALL FAULTS" WITH NO RIGHT OF SET-OFF OR REDUCTION IN THE PURCHASE PRICE, AND THAT EXCEPT AS EXPLICITLY SET FORTH IN THIS AGREEMENT SUCH SALE SHALL BE WITHOUT REPRESENTATION OR WARRANTY OF ANY KIND, EXPRESS OR IMPLIED, INCLUDING, WITHOUT LIMITATION, WARRANTY OF INCOME, POTENTIAL, OPERATING EXPENSES, USES, MERCHANTABILITY OR FITNESS FOR A PARTICULAR PURPOSE, AND EXCEPT AS EXPLICITY SET FORTH IN THIS AGREEMENT, SELLER DOES HEREBY DISCLAIM AND RENOUNCE ANY SUCH REPRESENTATION OR WARRANTY. BUYER SPECIFICALLY ACKNOWLEDGES THAT, WITH THE EXCEPTION OF THE REPRESENTATIONS AND WARRANTIES OF THE SELLER EXPLICITLY SET FORTH HEREIN, BUYER IS NOT RELYING ON ANY REPRESENTATIONS OR WARRANTIES OF ANY KIND WHATSOEVER, EXPRESS OR IMPLIED, FROM SELLER, OTHER AGENTS OR BROKERS AS TO ANY MATTER CONCERNING OR RELATED TO THE PROPERTY, INCLUDING WITHOUT LIMITATION:

(2) THE CONDITION OR SAFETY OF THE PROPERTY OR ANY IMPROVEMENTS THEREON, INCLUDING, BUT NOT LIMITED TO, PLUMBING, SEWER, HEATING AND ELECTRICAL SYSTEMS, ROOFING, AIR CONDITIONING, IF ANY, FOUNDATIONS, SOILS AND GEOLOGY, INCLUDING HAZARDOUS MATERIALS, LOT SIZE, OR SUITABILITY OF THE PROPERTY OR ITS IMPROVEMENTS FOR A PARTICULAR PURPOSE; (2) WHETHER THE APPLIANCES, IF ANY, PLUMBING OR UTILITIES ARE IN WORKING ORDER; (3) THE HABITABILITY OR SUITABILITY FOR OCCUPANCY OF ANY STRUCTURE AND THE QUALITY OF ITS CONSTRUCTION; (4) THE FITNESS OF ANY PERSONAL PROPERTY; (5) WHETHER THE IMPROVEMENTS ARE STRUCTURALLY SOUND, IN

GOOD CONDITION, OR IN COMPLIANCE WITH APPLICABLE CITY, COUNTY, STATE OR FEDERAL STATUTES, CODES OR ORDINANCES; OR (6) MATTERS RELATED TO THE LEASE, THE GUARANTY OR TENANT. BUYER FURTHER ACKNOWLEDGES AND AGREES THAT IT IS RELYING SOLELY UPON ITS OWN INSPECTION OF THE PROPERTY, REVIEW OF THE LEASE AND GUARANTY AND INVESTIGATIONS CONCERNING TENANT AND NOT UPON ANY REPRESENTATIONS MADE TO IT BY SELLER, ITS OFFICERS, DIRECTORS, CONTRACTORS, MANAGERS OR EMPLOYEES NOR ANY PERSON WHOMSOEVER, OTHER THAN THOSE EXPLICITY SET FORTH IN THIS AGREEMENT. ANY REPORTS, REPAIRS OR WORK REQUIRED BY BUYER ARE TO BE THE SOLE REPONSIBILITY OF BUYER AND BUYER AGREES THAT THERE IS NO OBLIGATION ON THE PART OF SELLER TO MAKE ANY CHANGES, ALTERATIONS, OR REPAIR TO THE PROPERTY.

(b) Except as otherwise provided herein, Buyer, for Buyer and Buyer's successors in interest, releases Seller from, and waives all claims and liability which Buyer may have against Seller for, any structural, physical or environmental condition of the Property and further releases Seller from, and waives all liability against Seller attributable to the structural, physical or environmental condition of the Property, including without limitation, the presence, discovery or removal of any Hazardous Materials (as hereinafter defined) in, at, about or under the Property, or for, connected with or with or arising out of any and all claims or causes of action based upon the Comprehensive Environmental Response, Compensation and Liability Act of 1980, the Superfund Amendments and Reauthorization Act of 1986, the Resource Conservation and Recovery Act, the Toxic Substances Control Act, as such acts may be amended from tine to time, or any other federal or state statutory or regulatory cause of action arising from or related to Hazardous Materials at, in, about or under the Property (collectively, the "Hazardous Waste Laws"). The waiver and release of Buyer set forth in this Section 7.3(b) shall survive the Closing Date and shall be enforceable at any time after the Closing Date.

(c) "Hazardous Materials" Defined. For purposes of this Agreement, the term "Hazardous Material" shall mean any substance, chemical, waste or material that is or becomes regulated by any federal, state or local government authority because of its toxicity, infectiousness, radioactivity, explosiveness, ignitability, corrosiveness or reactivity, including, without limitation, those substances regulated by the Hazardous Waste laws.

(d) Hazardous Materials. In addition to and not by way of limitation of the sale of the Property on an "AS IS" basis under this Agreement, Buyer acknowledges receipt of copies of the environmental and engineering reports (the "Existing Reports") listed on Exhibit 1 hereto. Seller makes no representations or warranties whatsoever to Buyer regarding (A) the Existing Reports, if any (including, without limitation, the contents, completeness and/or accuracy thereof or the ability of Buyer to rely thereon), and/or (B) the presence or absence of any Hazardous Materials, in, at, or under the Property; provided, however, Seller does hereby represent and warrants Buyer that to the best of Seller's Actual Knowledge, except for the matters disclosed by the Existing Reports, there are no other matters or conditions relating to the Property the existence of which would or might reasonably be foreseen to give rise to a violation of any Hazardous Waste law. Buyer has made such studies and investigations, conducted such tests and surveys, and engaged such specialists as Buyer has deemed appropriate to evaluate fairly the Property and its risks from an environmental and Hazardous Materials standpoint.

8. SELLER'S COVENANTS. With respect to the period between Effective Date hereof and the Closing Date, Seller covenants as follows:

8.1 The Lease. Seller: (I) shall use reasonable efforts to perform all of the obligations of the landlord under the lease and to cause Tenant to perform all of the obligations of the tenant under the Lease; (ii) shall promptly notify Buyer of any material default under the Lease of which Seller has Actual Knowledge; and (iii) shall promptly deliver to Buyer copies of all correspondence received by Seller with respect to the Property from Tenant or any governmental authority. Seller shall not terminate the Lease, and without Buyer's prior written consent, shall not amend or cancel the Lease. Seller shall not accept from Tenant payment of rent more that one month in advance.

8.2 Contracts. Without Buyer's prior written consent, Seller shall not enter into any contract with respect to the Property which will survive the Closing and for which Buyer shall be liable.

8.3 Further Liens. Without Buyer's prior written consent, Seller shall not between the Effective Date and the Closing Date further encumber the Property with any lien or deed of trust which will not be removed at Seller's sole cost and expense on or before the Closing Date.

Buyer's remedies for a breach on any of the foregoing covenants shall be as provided in Section 12.2 hereof. No obligations under this Section 8 shall survive the Closing.

9.0 CONDITIONS TO CLOSING.

9.1 Seller's Conditions. The obligation of Seller to sell and convey the Property under this Agreement is subject to the satisfaction of the following conditions precedent or conditions concurrent (the satisfaction of which may be waived only in writing by Seller):

(e) Delivery and execution by Buyer of all monies, items, and other instruments required to be delivered by Buyer to Seller;

(f) Buyer's warranties and representations set forth herein shall be true and correct in all material respects;

(g) All of the actions by Buyer required by this Agreement shall have been completed; and (h) There shall be no uncured default by Buyer of any of its obligations under this Agreement.

Notwithstanding the foregoing, if a condition of Seller is unsatisfied on the Closing Date because of a breach of this Agreement by Seller, then such condition shall be deemed satisfied. Seller shall have no duty or obligation to cause the satisfaction of any of its conditions to Closing set forth in this Section 9.1.

9.2 Buyer's Conditions. The obligation of Buyer to pay the Purchase Price and acquire the Property under this Agreement is subject to the satisfaction of the following conditions precedent or conditions concurrent (the satisfaction of which may be waived only in writing by Buyer):

(g) Delivery and execution by Seller of all items and other instruments to be delivered by Seller pursuant to the other provisions of this Agreement and the following additional items:

(iii) Federal and state UCC searches showing that there are no matters that would constitute a lien, charge or prior right against the Personal Property; and (iv) All keys used in connection with the Building and the combinations to all combination locks included on the Property in Seller's possession and control.

(h) Seller's warranties and representations set forth herein shall be true and correct in all material respects;

(i) Buyer shall have received an estoppel certificate from Tenant in the form specified in Article XXVI of the Lease, certifying (i) that the copy of the Lease which is annexed to such certificate is a true and correct copy of the Lease, and, as modified by a First Amendment to Lease, dated as on November 12 1991, between Seller and Tenant, is in full force and effect; (ii) the dates to which Rent and Taxes (as such terms are defined in the Lease) due under the Lease have been paid; and (iii) whether, to the best knowledge of Tenant, any default exists under the Lease and, if any such default exists, specifying the nature and period of existence thereof and what action Tenant is taking or proposes to take with respect thereto.

(j) All of the actions by Seller required by this Agreement shall have been taken.

(k) There shall be no uncured default by Seller of any of its obligations under this Agreement.

(l) There shall be no uncured monetary default beyond any applicable grace or cure period by Tenant under the Lease.

Notwithstanding the foregoing, if a condition of Buyer is unsatisfied on the Closing Date because of a breach of this Agreement by Buyer, then such condition shall be deemed satisfied. Buyer shall have no duty or obligation to cause the satisfaction on any of its conditions to Closing set forth in this Section 9.2

9.4 Failure of Condition.

(c) In the event of a failure of any condition of Seller contained in Section 9.1 above, Seller may in its sole discretion:

(iii) Terminate this Agreement by notice to Buyer, and (A) if Buyer is not in default hereunder, Buyer shall receive the Letter of Credit, and (B) if Buyer is in default hereunder, Seller be entitled to the remedies afforded it pursuant to Section 12.1 hereof; or (iv) Seller may waive such condition and close the transaction.

(d) In the event of a failure of any condition of Buyer contained in Section 9.2, then Buyer may:

(i) Terminate this Agreement by notice to Seller, in which event: (A) if Seller is not in default hereunder, Buyer shall receive the Letter of Credit, (B) if Seller is in default hereunder, Buyer shall be entitled to pursue its remedies pursuant to Section 12.2 hereof; or (ii) Buyer may waive such condition and close the transaction.

10.0 DAMAGE OR DESTRUCTION OF THE PROPERTY; CONDEMNATION.

10.1 Damage or Destruction of the Property.

(b) If, between the Effective Date and the Closing Date, the Property is Materially Damaged or Destroyed (as hereinafter defined), Buyer may elect in writing, within five (5) days after receipt of notice from Seller of such damage or destruction, accompanied by information regarding the amount and payment of insurance, to terminate this Agreement or to purchase the Property without regard to such damaged or destruction. If Buyer fails to notify Seller of Buyer's election, Buyer will be deemed to have elected to proceed with the purchase of the Property. In the event that Buyer purchases the Property, Seller have no obligation to repair any such damage or destruction, nor shall the Purchase Price be adjusted. "Materially Damaged or Destroyed" shall mean damage or destruction, the repair or replacement of which would (i) reasonably take more than ninety (90) days to complete or the cost of which would exceed $1,000,000, as determined by a licensed general contractor selected by Seller and reasonably approved by Buyer or (ii) give rise to a right to Tenant to terminate the Lease.

(b) If Buyer elects to terminate this Agreement in accordance with Section 10.1(a), this Agreement shall be of no further force and effect subject to Section 15.10, and the Letter of Credit shall be returned to buyer.

(c) If Buyer elects or is required to purchase the Property despite such damage or destruction, Seller shall assign its rights to insurance proceeds to and Buyer shall be entitled to receive any insurance proceeds to which Seller is entitled.

10.2 Condemnation. If prior to Closing all or a Material Part (as defined herein) of the Property is subject to a proposed taking by any public authority, Seller shall promptly notify Buyer of such proposed taking and Buyer may terminate this Agreement by notice to Seller within five (5) days after written notice thereof. If Buyer so elects, this Agreement shall be of no further force and effect. If Buyer does not so terminate this Agreement, or if the taking is as to a non-Material Part of the Real Property, Buyer shall accept all of the Property subject to the taking without a reduction in the Purchase Price and shall receive at Closing an assignment of all of Seller's rights to any condemnation award, subject to Tenant's rights under the Lease. "Material Part" shall mean (i) 10% or more of the area of the Land or the full area of the building and other improvements on the Land or (ii) a part such as gives rise to a right to Tenant to terminate the Lease.

11.0 COMMISSIONS, EXPENSES AND CREDITS.

11.1 Payment of the Sale Commission. Buyer and Seller represent and warrant to each other that the party making such warranty dealt with no real estate broker or agent in connection with this transaction except for FDC Management Group, Inc. (the "Broker") and Buyer shall be solely responsible for the payment of a brokerage fee to the Broker based on a separate agreement between Broker and Buyer. Seller hereby indemnifies Buyer and holds Buyer harmless from any and all demands or claims which now or hereafter may be asserted against Buyer for any brokerage fees, commissions or similar types of compensation which may be claimed by any broker which claims to have dealt with Seller or which claims to have been engaged by Seller and all expenses and costs in handling or defending any such demand or claim (including reasonable attorneys fees). Buyer hereby indemnifies Seller and holds Seller harmless from any and all demands or claims which now or hereafter may be asserted against Seller for any brokerage fees, commissions or similar types of compensation which may be claimed by any broker which claims to have dealt with Buyer or which claims to have been engaged by Buyer and all expenses and costs in handling or defending any such demand or claim in connection with this transaction (including reasonable attorneys fees).

12. REMEDIES.

12.1 Seller's Remedies. If Buyer defaults in its obligations under this Agreement, Seller shall entitled to terminate this Agreement and immediately draw down the Letter of Credit and retain the proceeds thereof as liquidated damages. SELLER AND BUYER ACKNOWLEDGE THAT SELLER'S DAMAGES WOULD BE DIFFICULT TO DETERMINE, AND THAT THE SPECIFIED SUM IS A REASONABLE ESTIMATE OF SELLER'S DAMAGES. SELLER AND BUYER FURTHER AGREE THAT THIS SECTION 12.1 IS INTENDED TO AND DOES LIQUIDATE THE AMOUNT OF DAMAGES DUE SELLER, AND SHALL BE SELLER'S EXCLUSIVE REMEDY AGAINST BUYER, BOTH AT LAW AND IN EQUITY ARISING FROM OR RELATED TO A BREACH BY BUYER OF ITS OBLIGATION TO CONSUMMATE THE TRANSACTIONS CONTEMPLATED BY THIS AGREEMENT.

12.2 Buyer's Remedies. If Seller defaults in its obligations to sell the Property under this Agreement, (i) buyer may elect to treat this Agreement as terminated, in which case all payments and things of value provided by Buyer hereunder (including the Letter of Credit) shall be returned to Buyer and Buyer may recover as its sole recoverable damages its actual out-of-pocket expenses and costs in connection with this transaction, which damages shall not exceed $75,000.00 in any event, or (ii) Buyer may elect to treat this Agreement as being in full force and effect, and Buyer shall have the right to an action for specific performance, which action shall seek enforcement of this Agreement strictly in accordance with its terms. SELLER AND BUYER FURTHER AGREE THAT THIS SECTION 12.2 IS INTENDED TO AND DOES LIMIT THE AMOUNT OF DAMAGES DUE BUYER AND THE REMEDIES AVAILABLE TO BUYER, AND SHALL BE BUYER'S EXCLUSIVE REMEDY AGAINST SELLER, BOTH AT LAW AND IN EQUITY ARISING FROM OR RELATED TO A BREACH BY SELLER OF ITS OBLIGATION TO CONSUMMATE THE TRANSACTIONS CONTEMPLATED BY THIS AGREEMENT.

13. NOTICES.

All notices, requests or demands to a party hereunder shall be in writing and shall be effective (i) when delivered personally, (ii) when received by overnight courier service or facsimile telecommunication (provided that a copy of such notice, request or demand is deposited into the United States mail within one (1) business day of the facsimile transmission), or (iii) three (3) days after being deposited into the United States mail (sent certified or registered, return receipt requested), in each case addressed as follows (or to such other address as Buyer or Seller may designate in writing in accordance with this Section 13):

If to Seller:

R&S Kansas City Associates
Limited Partnership
c/o U.S. Realty Advisors, Inc.
1370 Avenue of the Americas
New York, New York 10019
Attention: Mr. Jonathan Molin
President
Telecopy Number (212) 581-4950
Confirmation Number: (212) 581-4540

With a copy to:

Gordon M. Alpert, Esq.
Rosenman & Colin
575 Madison Avenue
New York, New York 10022

Telecopy Number: (212) 940-7049

Confirmation Number: (212) 940-8920

<u>If to Buyer:</u>

Scribcor, Inc.

400 North Michigan Avenue

Chicago, IL 60611

Attention: Richard M. Ross, Jr.

President

Telecopy Number: (312) 923-8023

Confirmation Number: (312) 923-8000

With a copy to:

Stephen Tomlinson, Esq.

Kirkland & Ellis

200 East Randolph Drive

Suite 5900

Chicago, IL 60601

Telecopy Number: (312) 861-2200

Confirmation Number: (312) 861-2386

14, NON-FOREIGN AFFIDAVIT.

Seller shall provide Buyer, on or before the Closing Date, with a non-foreign affidavit sufficient in form and substance to relieve Buyer of any and all withholding obligations under federal law, which affidavit shall be substantially in the form attached hereto as Exhibit H. If Seller does not furnish Buyer with said affidavit, or if Buyer has reason to believe that said affidavit would be wholly or partially false if given and so notifies Seller, in writing, on or before the Closing Date, Buyer shall be entitled to withhold up to ten percent (10%) of the Purchase Price in an escrow account until such time as Seller furnishes Buyer with a qualifying statement from the Internal Revenue Service sufficient to relieve Buyer of any and all withholding obligations under federal law, or until Buyer is required to deliver said funds to the Internal Revenue Service, whichever first occurs.

15, MISCELLANEOUS.

15.1 No Waiver. No waiver by any party of the performance or satisfaction of any covenant or condition shall be valid unless in writing and shall not be considered to be a waiver by such party of any other covenant or condition hereunder.

15.2 Entire Agreement. This Agreement contains the entire agreement between the parties regarding the Property and supersedes all prior agreements, whether written or oral, between the parties regarding the same subject. This Agreement may only be modified in writing.

15.3. Survival. Except for as otherwise specifically provided in this Agreement, none of the agreements, warranties and representations contained herein shall survive the Closing.

15.4 Successors. This Agreement shall bind and inure to the benefit of the parties hereto and to their respective legal representatives, successors and permitted assigns.

15.5 Assignment. Buyer shall have the right to assign its rights (but not its obligations) under this Agreement to two trusts to be established by Buyer one of which trusts shall acquire an estate for years in the Property (the "Term Trust") and one of which shall acquire the remaining interest of Seller in the Property (the "Reversion Trust"). Seller shall cooperate in all reasonable respects with Buyer in effecting such conveyances, provide that Seller shall not be required to incur any incrementally additional expense in so cooperating. Except as provided above, Buyer shall not have any right to assign, transfer or encumber its rights under this Agreement, without the prior written consent of Seller, which consent may be withheld in Seller's sole, absolute and unfettered discretion. Any assignment, transfer or encumbrance by Buyer requiring, but made without, Seller's prior written consent, shall be void ab initio and shall constitute a breach by Buyer of this Agreement entitling Seller to terminate this Agreement and exercise its remedies to immediately draw down the Letter of Credit and retain the proceeds thereof as liquidated damages under Section 12.1 hereof. No assignment, transfer or encumbrance solely in favor of person(s) or entity(ies) in a control relationship with Buyer shall be deemed to violate this Section 14.5. "Control relationship" shall be deemed to mean either (a) ownership of fifty percent (50%) or more of all of the voting stock of a corporation or fifty percent (50%) or more of all of the legal and equitable interest in a partnership or other business entity or (b) the possession of the power directly or indirectly to direct or cause the direction of management and policy of a corporation, partnership or other business entity, whether through the ownership of voting securities, by contract, common directors or officers, the contractual right to manage the business affairs of any such corporation, partnership or business entity, or otherwise. Buyer represents, warrants and certifies to Seller that Buyer has not assigned, transferred or encumbered or agreed to assign, transfer or encumber, directly or indirectly, all or any portion of its rights or obligations under this Agreement in violation of this Section.

15.6 Relationship of the Parties. The parties acknowledge that neither party is an agent for the other party, and the neither party shall or can bind or enter into agreements for the other party.

15.12 Governing Law. This Agreement and the legal relations between the parties hereto shall be governed by and construed in accordance with the laws of the State of Missouri.

15.13 Possession; Risk of Loss. Seller shall deliver to Buyer possession of the Property on the Closing Date, subject to Permitted Exceptions and the terms and conditions of this Agreement. All risk of loss or damage with respect to the Property shall pass from Seller to Buyer on the Closing Date.

15.14 Review by Counsel. The parties acknowledge that each party and its counsel have reviewed and approved this Agreement, and the parties hereby agree that the normal rule of construction to the effect that any ambiguities are to be resolved against the drafting party shall not be employed in the interpretation of this Agreement or any amendments or exhibits hereto.

15.15 Termination. Upon termination of this Agreement for any reason by either party, Buyer shall have the obligation to return to Seller all documents and copies thereof (including the survey, if any) any other information or documentation prepared by any third party in conjunction with Buyer's inspections of the Property. Seller shall not have any obligation to return the Letter of Credit to Buyer, upon any termination of this Agreement by Buyer, until the documents and copies thereof (including the survey, if any) and other information have been return to Seller.

15.16 Exhibits. The Exhibits attached hereto form a part of this Agreement and are incorporated herein by this reference.

16. CONDITION PRECEDENT.

Buyer's obligations under this Agreement shall be conditioned upon Buyer's completion on or before 5:00 p.m. EST on Thursday, January 19, 1995 of an inspection of the Real Property. If Buyer shall effectively notify Seller in writing within said period that the Real Property is not in a condition reasonably satisfactory to Buyer, then Buyer may elect by such notice to terminate this Agreement, in which event neither part shall have any further rights or obligations hereunder and the Letter of Credit shall be returned to Buyer. In the absence of such effective notice, this condition shall be deemed waived by Buyer.

17. COUNTERPARTS.

This Agreement may be executed in any number of counterparts each of which, when taken together, shall constitute one agreement. This Agreement shall only be effective if a counterpart is signed by both Seller and Buyer.

IN WITNESS WHEREOF, the parties have executed this Agreement as of the date first set forth above.

SELLER:

R&S KANSAS CITY ASSOCIATES LIMITED PARTNERSHIP

By: U.S. Realty Capital Services, Inc., a general partner

By: ______________________________

Name: ______________________________

Title: ______________________________

BUYER:

SCRIBCOR, INC.

By: ______________________________

Name: ______________________________

Title: ______________________________

EXHIBIT C

FORM OF TRUST AGREEMENT

FIRST AMENDED AND RESTATED

REMAINDER TRUST AGREEMENT

BETWEEN

SCRIBCOR, INC.

SELLER

AND

AMERICAN NATIONAL BANK AND TRUST

COMPANY OF CHICAGO

REMAINDER TRUSTEE

DATED AS OF AUGUST 25, 1995

TABLE OF CONTENTS

Page

ARTICLEI

DEFINITIONS AND INCORPORATION BY REFERENCE 1.1 Definitions 601

ARTICLE II

ORGANIZATION 2.1 Name 601

2.2 Office 601

2.3 Purposes and Powers 601

2.4 Appointment of Remainder Trustee 602

2.5 Initial Capital Contribution of Trust Estate 603

2.6 Declaration of Trust 603

2.7 Liability of the Seller and the Certificateholders 604

32.8 Title to Trust Property 604

| | | |
|---|---|---|
| 2.9 | Situs of Trust | 605 |
| 2.10 | Representations and Warranties of the Seller | 605 |
| 2.11 | Tax Treatment | 607 |

ARTICLEIII

THE CERTIFICATES

| | | |
|---|---|---|
| 3.1 | Initial Certificate Ownership | 607 |
| 3.2 | Form of the Certificates | 608 |
| 3.3 | Execution, Authentication and Delivery | 608 |
| 3.4 | Registration; Registration of Transfer and Exchange of Certificates | 609 |
| 3.5 | Mutilated, Destroyed, Lost or Stolen Certificates | 610 |
| 3.6 | Persons Deemed Certificateholders | 612 |
| 3.7 | Access to List of Certificateholders' Names and Addresses | 612 |
| 3.8 | Maintenance of Corporate Trust Office | 612 |
| 3.9 | Seller as Certificateholder | 613 |
| 3.10 | Restrictions on Transfer | 613 |

ARTICLEIV

ACTIONS BY REMAINDER TRUSTEE 614

| | | |
|---|---|---|
| 4.1 | Prior Notice to Certificateholders with Respect to Certain Matters | 614 |
| 4.2 | Prohibitions with Respect to Certain Matters | 615 |
| 4.3 | Bankruptcy | 615 |
| 4.4 | Restrictions on Certificateholders' Power | 615 |
| 4.5 | Majority Control | 615 |

ARTICLEV

APPLICATION OF TRUST FUNDS; CERTAIN DUTIES 616

5.1 Establishment of Administration Account 616

5.2 Application of Trust Funds 617

5.3 Method of Payment 618

5.4 Accounting and Reports to the Certificateholders, the Internal Revenue Service and Others 619

5.5 Signature on Returns 619

ARTICLEVI

THE REMAINDER TRUSTEE 619

6.1 Duties of Remainder Trustee, General 619

6.2 Duties of Remainder Trustee, Specific 621

6.3 Rights of Remainder Trustee 626

6.4 Acceptance of Trusts and Duties 626

6.5 Action upon Instruction by Certificateholders 628

6.6 Furnishing of Documents 630

6.7 Representations and Warranties of Remainder Trustee 630

6.8 Reliance; Advice of Counsel 631

6.9 Remainder Trustee Shall Not Own Certificates and Notes 632

6.10 Compensation; Reimbursable Costs 632

6.11 Replacement of Remainder Trustee 633

6.12 Merger or Consolidation of Remainder Trustee 635

6.13 Appointment of Co-Trustee or Separate Trustee 635

6.14 Eligibility Requirements for Remainder Trustee 635

ARTICLEVII

TERMINATION OF TRUST AGREEMENT 7.1 Termination of Trust Agreement 638

7.2 Termination Pursuant to Section 6.2 640

7.3 Distribution of Remainder Proceeds 641

7.4 Default by Purchaser 642

ARTICLEVIII

AMENDMENTS 643

8.1 Amendments 643

8.2 Form of Amendments 644

ARTICLEIX

MISCELLANEOUS 644

9.1 No Legal Title to Trust Estate. 644

9.2 Limitations on Rights of Others 645

9.3 Derivative Actions. 645

9.4 Notices 645

9.5 Severability 646

9.6 Counterparts 646

9.7 Successors and Assigns 647

9.8 No Recourse 647

9.9 Headings 647

9.10 Governing Law 647

EXHIBITS

Exhibit A Form of Certificate

Exhibit B Form of Securities Act Exemption Certificate

Exhibit C Form of Undertaking Letter

Exhibit D Form of Distribution Date Statement

Exhibit E Lease and Guarantee

FIRST AMENDED AND RESTATED TRUST AGREEMENT, dated as of August 25, 1995, between SCRIBCOR, INC., an Illinois corporation, as Seller, and American National Bank and Trust Company of Chicago, a national banking association, not in its personal capacity but solely as Remainder Trustee (the "Remainder Trustee") of the Trust created hereby.

RECITALS

A. Seller and The First National Bank of Chicago, as Trustee (the "Resigning Trustee") are parties to that certain Trust Agreement dated as of April 17, 1995 (the "Original Agreement") establishing the K.C. LURE® Trust 1995-1.

B. Pursuant to Section 6.11 of the Original Agreement, the Resigning Trustee desires to resign as Remainder Trustee and has so notified the Certificateholders and the Certificateholders have appointed American National Bank and Trust Company of Chicago as the successor Remainder Trustee and American National Bank and Trust Company of Chicago desires to accept such appointment and does so by its execution of this Agreement.

C. The parties hereto, acting pursuant to Sections 8.1 and 8.2 of the Agreement, wish to amend and restate the Original Agreement as hereinafter set forth and the Certificateholders consent to such amendment and restatement.

The Seller and the Remainder Trustee hereby agree as follows:

ARTICLE I

DEFINITIONS AND INCORPORATION BY REFERENCE

SECTION 1.1 Definitions . Certain capitalized terms used in this Agreement shall have the respective meanings assigned to them in Appendix A attached hereto. All references herein to "the Agreement" or "this Agreement" are to this Trust Agreement, and all references herein to Articles, Sections and subsections are to Articles, Sections and subsections of this Agreement unless otherwise specified.

ARTICLE II

ORGANIZATION

SECTION 2.1 Name . The Trust created hereby shall be known as the K.C. LURE® Trust 1995-1 in which name the Remainder Trustee may conduct the business of the Trust, make and execute contracts and other instruments on behalf of the Trust and sue and be sued on behalf of the Trust.

SECTION 2.2 Office . The office of the Trust shall be in care of the Remainder Trustee at the Corporate Trust Office or at such other address as the Remainder Trustee may designate by written notice to the Certificateholders.

SECTION 2.3 Purposes and Powers . The purpose of the Trust is to engage in the following activities:

(i) to acquire, manage and hold the Trust Estate in accordance with the terms hereof;

(ii) to issue the Certificates pursuant to this Agreement, and to sell, transfer or exchange the Certificates;

(iii) to collect and receive all payments if any, required to be made: (a) by the Tenant under the Lease to the Remainder Trustee, whether such payments constitute Rent or other sums required to be paid by the Tenant pursuant to the terms of the Lease; (b) by the Term Trustee pursuant to the terms of the agreement establishing the Term Trust or the Administration Agreement; and to make payment of any amounts so received to the Certificateholders in the manner herein set forth, and to pay the organizational, start-up and transactional expenses of the Trust;

(iv) to enter into and perform the obligations and exercise the rights of the Remainder Trustee under the Administration Agreement, including without limitation, the right to: a) monitor the condition of the Real Property and the performance of the Tenant under the Lease with respect to the maintenance and preservation of the same; and b) give and receive all notices required or permitted to be given or received by the Remainder Trustee.

(v) subject to the limitations hereinafter set forth herein, to engage in those activities, including entering into agreements, that are necessary, suitable or convenient to accomplish the foregoing or are incidental thereto or connected therewith; and (vi) subject to compliance herewith, to engage in such other activities as may be required in connection with conservation of the Trust Estate and the maintenance and preservation of the Real Property for the benefit of the Certificateholders.

The Trust shall not engage in any activity other than in furtherance of the foregoing or as specifically required or authorized by the terms of this Agreement or the Administration Agreement.

SECTION 2.4 Appointment of Remainder Trustee . The Certificateholders, acting pursuant to Section 6.11, hereby appoint the Remainder Trustee as trustee of the Trust effective as of the date hereof, to have all the rights, powers and duties set forth herein, and the Remainder Trustee hereby accepts such appointment subject to the terms and conditions set forth in this Agreement. .

SECTION 2.5 Initial Capital Contribution of Trust Estate . The Seller has previously sold, transferred, assigned and conveyed to the Resigning Trustee, not personally, but solely in its capacity s Remainder Trustee under the Original Agreement, a remainder interest in the Real Property, the Lease and the Guarantee, and currently herewith, the Resigning Trustee has assigned, transferred, conveyed and set over to the Remainder Trustee all right, title and interest of the Resigning Trustee in and to the Trust Estate. The Remainder Trustee hereby acknowledges receipt in trust from the Resigning Trustee, as of the date hereof, of the foregoing contribution, which shall constitute the initial Trust Estate. The Seller has paid all organizational expenses of the Trust incurred through the date hereof together with the Trustee's Fee. Except as specifically provided in Section 6.10, the Seller shall have no further obligations with respect to the payment of Reimbursable Costs or any other fees or expenses incurred by the Remainder Trustee after the date hereof.

SECTION 2.6 Declaration of Trust . The Remainder Trustee hereby declares that it shall hold the Trust Estate in trust, upon and subject to the conditions set forth herein, for the use and benefit of the Certificateholders, subject to the obligations of the Trust under the Lease and the Administration Agreement. It is the intention of the parties hereto that the Trust constitute a grantor trust and that this Agreement constitute the governing instrument of such grantor trust. It is the intention of the parties hereto that, solely for purposes of federal income taxes, state and local income and franchise taxes, and any other taxes imposed upon, measured by, or based upon gross or net income, the Trust shall be treated as a grantor trust subject to the provisions of Subchapter J of Chapter 1 of the Code (or the corresponding provisions of applicable state or local law). The parties agree that, unless otherwise required by appropriate tax authorities, the Trust shall file or cause to be filed annual or other necessary returns, reports and other forms consistent with the characterization of the Trust as a grantor trust for such tax purposes. Effective as of the date hereof, the Remainder Trustee shall have all rights, powers and duties set forth herein and under applicable law with respect to accomplishing the purposes of the Trust.

SECTION 2.7 Liability of the Seller and the Certificateholders .

(a) In no event shall the Seller be liable, directly or indirectly, for any losses, claims, damages, liabilities and expenses of the Trust (including, without limitation but except as specifically provided otherwise in Section 6.10, Reimbursable Costs, to the extent not paid out of the Trust Estate) including, without limitation, (i) any loss, cost, damage or expense suffered or incurred by the Trust in connection with the ownership, use, operation and maintenance of the Real Property (ii) any losses incurred by a Certificateholder in its capacity as an investor in the Certificates or (iii) any losses, claims, damages, liabilities and expenses arising out of the imposition by any taxing authority of any federal, state or local income or franchise taxes, or any other taxes imposed on or measured by gross or net income, gross or net receipts, capital, net worth and similar items (including any interest, penalties or additions with respect thereto) upon the Certificateholders, or the Remainder Trustee (including any liabilities, costs or expenses with respect thereto) with respect to the Trust Estate not specifically indemnified or represented to hereunder.

(b) No Certificateholder shall have any personal liability for any liability or obligation of the Trust.

SECTION 2.8 Title to Trust Property . Legal title to all of the Trust Estate shall be vested at all times in the Trust as a separate legal entity except to the extent that applicable law requires title to any part of the Trust Estate to be vested in a trustee or trustees, in which case title shall be deemed to be vested in the Remainder Trustee, a co-trustee and/or a separate trustee, as the case may be.

SECTION 2.9 Situs of Trust . The Trust shall be located and administered in the State of Illinois. All bank accounts maintained by the Remainder Trustee on behalf of the Trust shall be located in the State of Illinois. The Trust shall not have any employees in any state other than Illinois; provided, however, that nothing herein shall restrict or prohibit the Remainder Trustee from having employees within or without the State of Illinois. Payments shall be received by the Trust only in Illinois, and payments or other distributions will be made by the Trust only from Illinois. The only office of the Trust shall be the Corporate Trust Office in Chicago, Illinois.

SECTION 2.10 Representations and Warranties of the Seller . The Seller hereby represents and warrants to the Remainder Trustee that:

(a) The Seller has been duly organized and is validly existing as a corporation in good standing under the laws of the State of Illinois, with power and authority to own its properties and to conduct its business as such properties are presently owned and such business is presently conducted and had at all relevant times, and now has, power, authority and legal right to acquire and own the Trust Estate.

(b) The Seller is duly qualified to do business as a corporation in good standing, and has obtained all necessary licenses and approvals in all jurisdictions in which the ownership or lease of property or the conduct of its business requires such qualifications.

(c) The Seller has the power and authority to execute and deliver this Agreement and to carry out its terms, the Seller has full power and authority to sell and assign the property to be sold and assigned to and deposited with the Remainder Trustee as part of the Trust and the Seller has duly authorized such sale and assignment to the Remainder Trustee by all necessary corporate action; and the execution, delivery and performance of this Agreement have been duly authorized by the Seller by all necessary corporate action.

(d) The consummation of the transactions contemplated by this Agreement and the fulfillment of the terms of this Agreement do not conflict with, result in any breach of any of the terms and provisions of or constitute (with or without notice or lapse of time) a default under, the certificate of incorporation or by-laws of the Seller, or any indenture, agreement or other instrument, or violate any law or, to the best of the Seller's Actual Knowledge, any order, rule or regulation applicable to the Seller of any court or of any federal or state regulatory body, administrative agency or other governmental instrumentality having jurisdiction over the Seller or any of its properties.

(e) A true, correct and complete copy of the Lease and Guarantee is attached hereto as Exhibit E.

(f) Seller has not received written notice of any material action, proceeding or investigation pending or threatened which would affect the Real Property.

(g) Seller has not received any notice of violation of or potential liability arising under any federal, state, county, municipal or other governmental authority laws, regulations, ordinances, orders or directives relating to the use or condition or operation of the Real Property, including but not limited to zoning, building, fire, air pollution, water pollution, environmental or health code violations, that have not been heretofore corrected.

(h) To the best of Seller's Actual Knowledge, there is no suit, petition, study, investigation or other proceeding pending before any court, governmental agency or instrumentality, administrative or otherwise (including enforcement actions, administrative proceedings, arbitrations, or governmental investigations) regarding the Real Property. To the best of Seller's Actual Knowledge, there is no condemnation proceeding pending or declaration of taking or other similar instrument filed against the Real Property.

(i) There are no persons in possession of, or having a right to possession of, any part of the Real Property other than Seller, Tenant and persons (known or unknown) claiming by, through or under the Tenant. The Lease is in full force and effect, is the valid and binding obligation of the parties thereto, has not been modified or amended and is enforceable against such parties in accordance with the terms thereof. To the best of Seller's Actual Knowledge, there are no defaults by either party to the Lease beyond any applicable grace or cure period.

SECTION 2.11 Tax Treatment. The Seller and the Remainder Trustee, by entering into this Agreement, and the Certificateholders, by acquiring any Certificate or interest therein, (i) express their intention that the Certificates will qualify under applicable tax law as certificates of beneficial interest in a grantor trust subject to the provisions of Subchapter J of Chapter 1 of the Code (or the corresponding provisions of applicable state or local law) and (ii) unless otherwise required by appropriate taxing authorities, agree to treat the Certificates as certificates of beneficial interest in a grantor trust subject to the provisions of Subchapter J of Chapter 1 of the Code (or the corresponding provisions of applicable state or local law) for the purposes of federal income taxes, state and local income and franchise taxes, and any other taxes imposed upon, measured by, or based upon gross or net income.

ARTICLE III

THE CERTIFICATES

SECTION 3.1 Initial Certificate Ownership. Upon the formation of the Trust through the contribution by the Seller made pursuant to Section 2.5 and until the issuance of the Certificates, the Seller shall be the sole Certificateholder.

SECTION 3.2 Form of the Certificates .

(a) The Certificates shall be substantially in the form set forth in Exhibit A and shall be issued in minimum denominations of $20,000.00 and in integral multiples of $1,000.00 in excess thereof; provided, however, that one Certificate may be issued in a denomination that includes any residual amount. The Certificates shall be executed on behalf of the Trust by manual or facsimile signature of a Responsible Officer of the Remainder Trustee. Certificates bearing the manual or facsimile signatures of individuals who were, at the time when such signatures shall have been affixed, authorized to sign on behalf of the Trust, shall be duly issued, fully paid and non-assessable beneficial interests in the Trust, notwithstanding that such individuals or any of them shall have ceased to be so authorized prior to the authentication and delivery of such Certificates or did not hold such offices at the date of authentication and delivery of such Certificates.

(b) The Definitive Certificates shall be typewritten, printed, lithographed or engraved or produced by any combination of these methods (with or without steel engraved borders) all as determined by the officers executing such Certificates, as evidenced by their execution of such Certificates.

(c) The terms of the form of Certificate set forth in Exhibit A shall form part of this Agreement.

SECTION 3.3 Execution, Authentication and Delivery . Concurrently with the acquisition of the Trust Estate by the Trust, the Remainder Trustee shall cause the Certificates in an aggregate principal amount equal to the initial Certificate Balance to be executed on behalf of the Trust, authenticated and delivered to or upon the written order of the Seller, signed by its chairman of the board, its president or any vice president, without further corporate action by the Seller, in authorized denominations. No Certificate shall entitle its holder to any benefit under this Agreement, or shall be valid for any purpose, unless there shall appear on such Certificate a certificate of authentication substantially in the form set forth in Exhibit A, executed by the Remainder Trustee or an authenticating agent appointed by the Remainder Trustee, by manual signature. Such authentication shall constitute conclusive evidence that such Certificate shall have been duly authenticated and delivered hereunder. All Certificates shall be dated the date of their authentication.

SECTION 3.4 Registration; Registration of Transfer and Exchange of Certificates (a) The Trustee shall keep or cause to be kept, at the Corporate Trust Office, a Certificate Register in which, subject to such reasonable regulations as it may prescribe, the Remainder Trustee shall provide for the registration of Certificates and of transfers and exchanges of Certificates as provided herein; provided, however, that no Certificate may be subdivided upon transfer or exchange such that the denomination of any resulting Certificate is less than $20,000.00.

(b) Upon surrender for registration of transfer of any Certificate at the Corporate Trust Office, the Remainder Trustee shall execute on behalf of the Trust, authenticate and deliver (or shall cause its authenticating agent to authenticate and deliver), in the name of the designated transferee or transferees, one or more new Certificates in authorized denominations of a like aggregate amount dated the date of authentication by the Remainder Trustee or any such authenticating agent.

(c) At the option of a Certificateholder, Certificates may be exchanged for other Certificates of authorized denominations of a like aggregate principal amount upon surrender of the Certificates to be exchanged at the Corporate Trust Office. Whenever any Certificates are so surrendered for exchange, the Remainder Trustee shall execute on behalf of the Trust, authenticate and deliver (or shall cause its authenticating agent to authenticate and deliver) one or more Certificates dated the date of authentication by the Remainder Trustee or any such authenticating agent. Such Certificates shall be delivered to the Certificateholder making the exchange.

(d) Every Certificate presented or surrendered for registration of transfer or exchange shall be accompanied by a written instrument of transfer in form satisfactory to the Remainder Trustee duly executed by the Certificateholder or his attorney duly authorized in writing. Each Certificate surrendered for registration of transfer or exchange shall be cancelled and subsequently destroyed by the Remainder Trustee in accordance with its customary practice.

(e) No service charge shall be made for any registration of transfer or exchange of Certificates, but the Remainder Trustee may require payment of a sum sufficient to cover any tax or governmental charge that may be imposed in connection with any transfer or exchange of Certificates.

SECTION 3.5 Mutilated, Destroyed, Lost or Stolen Certificates .

(a) If (i) any mutilated Certificate is surrendered to the Remainder Trustee, or the Remainder Trustee receives evidence to its satisfaction of the destruction, loss or theft of any Certificate, and (ii) there is delivered to the Remainder Trustee and the Trust such security or indemnity as may be required by them to hold each of them harmless, then, in the absence of notice to the Remainder Trustee that such Certificate has been acquired by a bona fide purchaser, the Remainder Trustee shall execute on behalf of the Trust and the Remainder Trustee shall authenticate and deliver (or shall cause its authenticating agent to authenticate and deliver), in exchange for or in lieu of any such mutilated, destroyed, lost or stolen Certificate, a replacement Certificate of a like aggregate principal amount; provided, however, that if any such destroyed, lost or stolen Certificate, but not a mutilated Certificate, shall have become or within seven days shall be due and payable, then instead of issuing a replacement Certificate the Remainder Trustee may pay such destroyed, lost or stolen Certificate when so due or payable.

(b) If, after the delivery of a replacement Certificate or payment in respect of a destroyed, lost or stolen Certificate pursuant to subsection 3.5(a), a bona fide purchaser of the original Certificate in lieu of which such replacement Certificate was issued presents for payment such original Certificate, the Remainder Trustee shall be entitled to recover such replacement Certificate (or such payment) from the Person to whom it was delivered or any Person taking such replacement Certificate from such Person to whom such replacement Certificate was delivered or any assignee of such Person, except a bona fide purchaser, and shall be entitled to recover upon the security or indemnity provided therefor to the extent of any loss, damage, cost or expense incurred by the Remainder Trustee in connection therewith.

(c) In connection with the issuance of any replacement Certificate under this Section 3.5, the Remainder Trustee may require the payment by the Certificateholder of such Certificate of a sum sufficient to cover any tax or other governmental charge that may be imposed in relation thereto and any other reasonable expenses (including the fees and expenses of the Remainder Trustee and the Certificate Registrar) connected therewith.

(d) Any duplicate Certificate issued pursuant to this Section 3.5 in replacement of any mutilated, destroyed, lost or stolen Certificate shall constitute an original additional beneficial interest in the Trust, whether or not the mutilated, destroyed, lost or stolen Certificate shall be found at any time or be enforced by anyone, and shall be entitled to all the benefits of this Agreement equally and proportionately with any and all other Certificates duly issued hereunder.

(e) The provisions of this Section 3.5 are exclusive and shall preclude (to the extent lawful) all other rights and remedies with respect to the replacement or payment of mutilated, destroyed, lost or stolen Certificates.

SECTION 3.6 Persons Deemed Certificateholders . Prior to due presentation of a Certificate for registration of transfer, the Remainder Trustee may treat the Person in whose name any Certificate shall be registered in the Certificate Register as the Certificateholder of such Certificate for the purpose of receiving distributions pursuant to Article V and for all other purposes whatsoever, and the Remainder Trustee shall not be affected by any notice to the contrary.

SECTION 3.7 Access to List of Certificateholders' Names and Addresses . The Remainder Trustee shall furnish within 15 days after receipt by the Remainder Trustee of a written request therefor from the Seller or any Certificateholder, a list, in such form as the party requesting such list may reasonably require, of the names and addresses of the Certificateholders as of the most recent Record Date. Each Holder, by receiving and holding a Certificate, shall be deemed to have agreed not to hold the Remainder Trustee accountable by reason of the disclosure of its name and address, regardless of the source from which such information was derived.

SECTION 3.8 Maintenance of Corporate Trust Office . The Remainder Trustee shall maintain at the Corporate Trust Office, an office or offices or agency or agencies where Certificates may be surrendered for registration of transfer or exchange and where notices and demands to or upon the Remainder Trustee in respect of the Certificates and the Trust Agreement, Lease and Administration Agreement may be served. The Remainder Trustee initially designates the Corporate Trust Office as its principal office for such purposes. The Remainder Trustee shall give prompt written notice to the Seller and to the Certificateholders of any change in the location of the Certificate Register or any such office or agency.

SECTION 3.9 Seller as Certificateholder . The Seller in its individual or any other capacity may become the owner or pledgee of Certificates and may otherwise deal with the Remainder Trustee or its Affiliates in any manner not expressly prohibited hereby or by applicable law.

SECTION 3.10 Restrictions on Transfer .

(a) The Certificates have not and will not be registered under the Securities Act of 1933, as amended (the "Securities Act"), or the securities laws of any other jurisdiction. Consequently, the Certificates are not transferable other than pursuant to an exemption from the registration requirements of the Securities Act and satisfaction of certain other provisions specified herein. The Certificates are being offered in a private placement to Elizabeth McKeever Ross. No sale, pledge or other transfer of the Certificates may be made by any Person unless either (i) such sale, pledge or other transfer is made to a "qualified institutional buyer" that executes a certificate, in the form attached hereto as Exhibit B or as otherwise in form and substance satisfactory to the Trustee and the Seller, to the effect that (A) it is "qualified institutional buyer" as defined under Rule 144A under the Securities Act, acting for its own account or the accounts of other "qualified institutional buyers" as defined under Rule 144A under the Securities Act, and (B) it is aware that the transferor of such Certificate intends to rely on the exemption from the registration requirements of the Securities Act provided by Rule 144A under the Securities Act, or (ii) such sale, pledge or other transfer is otherwise made in a transaction exempt from the registration requirements of the Securities Act, in which case (A) the Trustee shall require that both the prospective transferor and the prospective transferee certify to the Trustee and the Seller in writing the facts surrounding such transfer, which certification shall be in form and substance satisfactory to the Trustee and the Seller, and (B) the Trustee shall require a written opinion of counsel (which will not be at the expense of the Seller or the Trustee) satisfactory to the Seller and the Trustee to the effect that such transfer will not violate the Securities Act.

(b) The Certificates may not be acquired by or for the account of (i) an employee benefit plan (as defined in Section 3(3) of the Employee Income Retirement Security Act of 1974, as amended ("ERISA")) that is subject to the provisions of Title I of ERISA (ii) a plan described in Section 4975(e)(1) of the Internal Revenue Code of 1986, as amended, or (iii) any entity whose underlying assets include plan assets by reason of a plan's investment in the entity (each, a "Benefit Plan"). By accepting and holding a Certificate, the Certificateholder shall be deemed to have represented and warranted that it is not a Benefit Plan and, if requested to do so by the Seller or the Trustee, the Certificateholder shall execute and deliver to the Trustee an Undertaking Letter in the form set forth in Exhibit C.

ARTICLE IV

ACTIONS BY REMAINDER TRUSTEE 4.1 Prior Notice to Certificateholders with Respect to Certain Matters . The Remainder Trustee shall not take any action with respect to the initiation of any claim or lawsuit by the Trust and the compromise of any action, claim or lawsuit brought by or against the Trust until: (i) the Remainder Trustee shall have notified the Certificateholders in writing of the proposed action, such notice to be given at least five (5) business days before the taking of the action described in such notice; and (ii) the Certificateholders shall have failed to notify the Remainder Trustee in writing prior to the 5th business day after such notice is given that such Certificateholders have withheld consent or provided alternative direction.

SECTION 4.2 Prohibitions with Respect to Certain Matters. The Remainder Trustee shall not have the right, power or authority, except upon the occurrence of a Termination Event, to sell, assign, transfer or convey the Trust Estate or any interest therein, and then, only in accordance with and to the extent of the provisions of Section 7.2 hereof. In no event shall the Remainder Trustee have the right, power or authority to: (i) pledge, mortgage, hypothecate, sell, assign, transfer or convey the Trust Estate or any interest therein; or (ii) amend, cause to be amended, or consent to the amendment of the Lease; nor shall the Certificateholders have the right, power or authority to direct the Remainder Trustee to so act, except as explicitly provided in this Agreement.

SECTION 4.3 Bankruptcy. In no event shall the Remainder Trustee have the right, power or authority to commence a voluntary proceeding in bankruptcy relating to the Trust.

SECTION 4.4 Restrictions on Certificateholders' Power. The Certificateholders shall not direct the Remainder Trustee to take or refrain from taking any action if such action or inaction would be contrary to any obligation of the Trust or the Remainder Trustee under this Agreement or the Administration Agreement or would be contrary to Section 2.3, nor shall the Remainder Trustee follow any such direction, if given. In no event shall the Certificateholders have the right to direct the Remainder Trustee to: (i) amend the Lease prior to, or with respect to periods of time prior to, the expiration or earlier termination of the Term Trust; or (ii) enter into any Replacement Lease, or, following, or solely with respect to periods of time following, the expiration or earlier termination of the Term Trust, any amendment of the Lease, unless such Replacement Lease or amendment shall provide indemnification to the Remainder Trustee as landlord under such Replacement Lease or amendment on terms and conditions reasonably satisfactory to the Remainder Trustee.

SECTION 4.5 Majority Control . Except as expressly provided herein, any action that may be taken or consent that may be given or withheld by the Certificateholders under this Agreement may be taken, given or withheld by Certificateholders having not less than a majority of the Voting Interests thereof. Except as expressly provided herein, any written notice of the Certificateholders delivered pursuant to this Agreement shall be effective if signed by Certificateholders having not less than a majority of the Voting Interests at the time of the delivery of such notice.

ARTICLE V

APPLICATION OF TRUST FUNDS; CERTAIN DUTIES

SECTION 5.1 Establishment of Administration Account .

(a) If the Remainder Trustee shall receive any payment of money for the benefit of the Certificateholders on account of any Rent or other payments due under the Lease, or the Administration Agreement or otherwise, or if the Remainder Trustee shall be so directed by the Certificateholders pursuant hereto, the Remainder Trustee, for the benefit of the Certificateholders, shall establish and maintain in the name of the Remainder Trustee a segregated trust account known as the K.C. LURE Trust 1995-1 Administration Account at a bank or other financial institution: (i) authorized pursuant to applicable laws to exercise corporate trust powers with respect to the Trust Estate; (ii) having a combined capital and surplus of at least $50,000,000 and subject to supervision or examination by federal or state authorities; and (iii) having (or having a parent which has) a long-term unsecured debt rating of at least BBB by Standard & Poor's Corporation ("Administration Account"), bearing an additional designation clearly indicating that the funds deposited therein are held for the benefit of the Certificateholders. If such bank or other financial institution shall publish reports of condition at least annually, pursuant to law or to the requirements of the aforesaid supervising or examining authority, then for the purpose of this Section 5.1, the combined capital and surplus of such corporation shall be deemed to be its combined capital and surplus as set forth in its most recent report of condition so published.

(b) The Remainder Trustee shall possess all right, title and interest in and to all funds on deposit from time to time in the Administration Account and in all proceeds thereof. Except as otherwise provided herein, the Administration Account shall be under the sole dominion and control of the Remainder Trustee for the benefit of the Certificateholders.

SECTION 5.2 Application of Trust Funds .

(a) On each Distribution Date (including the Final Distribution Date), the Remainder Trustee shall distribute to the Certificateholders, on a pro rata basis, from and only to the extent of amounts then on deposit in the Administration Account, the Distributable Funds calculated as of the Record Date with respect to such Distribution Date.

(b) On each Distribution Date (including the Final Distribution Date), the Remainder Trustee shall send to each Certificateholder a written statement as of such Distribution Date in substantially the same form as Exhibit D attached hereto setting forth, in reasonable detail, the amount and nature of all Collections received by the Remainder Trustee since the immediately preceding Distribution Date, the amount and calculation of the Distributable Funds as of such Distribution Date, the balance of the Administration Account after distribution of the Distributable Funds on such Distribution Date (and amounts, if any, distributed from the Administration Account to the Remainder Trustee as reimbursement for Reimbursable Costs) as of such Distribution Date, together with any other information reasonable requested in writing by the Certificateholders. The Remainder Trustee is hereby specifically authorized to cause the amount, if any, of such Reimbursable Costs to be distributed from the Administration Account to the Remainder Trustee on each Distribution Date.

(c) If any withholding tax is imposed on the Trust's payment (or allocations of income) to a Certificateholder, such tax shall reduce the amount otherwise distributable to the Certificateholder in accordance with this Section 5.2. The Remainder Trustee is hereby authorized and directed to retain from amounts otherwise distributable to the Certificateholders sufficient funds for the payment of any tax that is legally owed by the Trust (it being understood that the Remainder Trustee may, but shall not be obligated to contest any such tax in appropriate proceedings and withholding payment of such tax, if permitted by law, pending the outcome of such proceedings). The amount of any withholding tax imposed with respect to a Certificateholder shall be treated as cash distributed to such Certificateholder at the time it is withheld by the Trust and remitted to the appropriate taxing authority. If there is a possibility that withholding tax is payable with respect to a distribution (such as a distribution to a non-U.S. Certificateholder), the Remainder Trustee may in its sole discretion withhold such amounts in accordance with this subsection 5.2(c). If a Certificateholder wishes to apply for a refund of any such withholding tax, the Remainder Trustee shall reasonably cooperate with such Certificateholder in making such claim so long as such Certificateholder agrees to reimburse the Remainder Trustee for any out-of-pocket expenses incurred.

SECTION 5.3 Method of Payment . Subject to subsection 7.1(c), distributions required to be made to Certificateholders on any Distribution Date shall be made to each Certificateholder of record on the immediately preceding Record Date either by wire transfer, in immediately available funds, to the account of such Certificateholder at a bank or other entity having appropriate facilities therefor, if such Certificateholder shall have provided to the Remainder Trustee appropriate written instructions at least five (5) business days prior to such Record Date and such Certificateholder's Certificates in the aggregate evidence a denomination of not less than $1,000,000, or, if not, by check mailed to such Certificateholder at the address of such holder appearing in the Certificate Register.

SECTION 5.4 Accounting and Reports to the Certificateholders, the Internal Revenue Service and Others . The Remainder Trustee shall maintain (or cause to be maintained) the books of the Trust on a calendar year basis on the cash method of accounting, deliver to each Certificateholder, as may be required by the Code and applicable Treasury Regulations or otherwise, such information as may be required to enable each Certificateholder to prepare its federal income tax return, file such tax returns relating to the Trust and make such elections as may from time to time be required or appropriate under any applicable state or federal statute or rule or regulation thereunder so as to maintain the Trust's characterization as a grantor trust for federal income tax purposes, cause such tax returns to be signed in the manner required by law and collect or cause to be collected any withholding tax as described in and in accordance with subsection 5.2(c) with respect to income or distributions to Certificateholders.

SECTION 5.5 Signature on Returns . The Remainder Trustee shall sign on behalf of the Trust any and all tax returns of the Trust, unless applicable law requires the Certificateholders to sign such documents, in which case such documents shall be signed by the Certificateholders.

ARTICLE VI

THE REMAINDER TRUSTEE

SECTION 6.1 Duties of Remainder Trustee, General .

(a) The Remainder Trustee undertakes to perform such duties, and only such duties, as are specifically set forth in this Agreement and the Administration Agreement, including the administration of the Trust in the interest of the Certificateholders, subject to the Administration Agreement and in accordance with the provisions of this Agreement and the Lease. No implied covenants, obligations or duties shall be read into this Agreement.

(b) In the absence of bad faith on its part, the Remainder Trustee may conclusively rely upon certificates or opinions furnished to the Remainder Trustee and conforming to the requirements of this Agreement in determining the truth of the statements and the correctness of the opinions contained therein; provided, however, that the Remainder Trustee shall have examined such certificates or opinions so as to determine compliance of the same with the requirements of this Agreement.

(c) The Remainder Trustee may not be relieved from liability for its own negligent action, its own negligent failure to act or its own willful misconduct, except that: this subsection 6.1(c) shall not limit the effect of subsection 6.1(a);

(i) the Remainder Trustee shall not be liable for any error of judgment made in good faith by a Responsible Officer unless it is proved that the Remainder Trustee was negligent in ascertaining the pertinent facts; and (ii) the Remainder Trustee shall not be liable with respect to any action it takes or omits to take in good faith in accordance with a direction of the Seller or the Certificateholders received by it pursuant to any provision of this Agreement.

(d) Subject to Sections 5.1 and 5.2, monies received by the Remainder Trustee hereunder need not be segregated in any manner except (i) to the extent required by law and (ii) as specifically provided herein, and may be deposited under such general conditions as may be prescribed by law for trust funds, and the Remainder Trustee shall not be obligated to invest such funds or be liable for any interest thereon.

(e) The Remainder Trustee shall not take any action that (i) is inconsistent with the purposes of the Trust set forth in Section 2.3 or (ii) would, to the Actual Knowledge of a Responsible Officer of the Remainder Trustee, result in the Trust's becoming taxable as a corporation for federal income tax purposes. The Certificateholders shall not direct the Remainder Trustee to take action that would violate the provisions of this Section 6.1.

SECTION 6.2 Duties of Remainder Trustee, Specific . In addition to, and not in derogation of, the general duty of the Remainder Trustee to administer the Trust in the interest of the Certificateholders, and to conserve the Trust Estate, the Remainder Trustee shall have the specific duties and obligations set forth below.

(a) The Remainder Trustee shall at all times prior to the termination of the Trust pursuant to Article VII hereof, take all actions necessary to preserve the existence of the Trust, including, without limitation, the preparation and filing of all instruments or documentation required in connection therewith. In no event shall the Remainder Trustee take any action, or consent to the taking of any action, pursuant to which the Remainder Trustee, the Certificateholders or any other person or party seeks to combine, partition, join or merge the Trust Estate with or into any other interest in the Real Property, it being acknowledged by the Certificateholders, through their acquisition of the Certificates, that no Certificateholder shall have any right, claim or cause of action, whether at law or in equity, against the Remainder Trustee or any other Person, pursuant to which such Certificateholder may seek to have the Trust Estate combined with any other interest in the Real Property, any such right having been hereby fully and irrevocably waived.

(b) Upon creation of the Trust pursuant hereto, the Remainder Trustee shall receive on behalf of the Certificateholders all Collections. All Collections received by the Trustee shall be deposited into the Administration Account and applied in accordance with the terms hereof.

(c) The Remainder Trustee shall monitor performance by the Tenant under the Lease only to the extent notified by the Term Trustee pursuant to the Administration Agreement and shall give and receive all notices required or appropriate to be given or received by the Remainder Trustee under the Administration Agreement. If an Event of Default shall occur under the Lease, the Remainder Trustee shall give a Default Notice with respect thereto to the Certificateholders not later than three (3) business days after the date on which the Remainder Trustee first obtains Actual Knowledge of the occurrence of such Event of Default or otherwise receives written notice thereof from the Term Trustee pursuant to the Administration Agreement or otherwise. Each Default Notice shall specify in reasonable detail the nature of the default by the Tenant giving rise to the occurrence of such Event of Default. In furtherance of its duties hereunder, the Remainder Trustee shall obtain from the Term Trustee pursuant to the Administration Agreement copies of the Property Report prepared pursuant to the Servicing Agreement, or, if such Property Reports are no longer being prepared, cause the Real Property to be inspected by a Qualified Real Estate Consultant, not less frequently than two (2) times in each twelve (12) calendar month period during the term of this Trust, for the purpose of determining the Tenant's compliance with the terms of the Lease with respect to the maintenance and preservation of the Real Property. All costs and expenses incurred by the Remainder Trustee in connection with such inspections shall be Reimbursable Costs. If the Remainder Trustee shall determine on the basis of any such Property Report or advice from such Qualified Real Estate Consultant that the Tenant has failed to maintain the Real Property in the manner required by the Lease, the Remainder Trustee shall give written notice thereof to the Term Trustee pursuant to the Administration Agreement and to the Certificateholders, and shall await further instruction from the Certificateholders with respect thereto.

(d) If so directed in writing by the Certificateholders after the giving of a Default Notice, the Remainder Trustee shall initiate such actions, including, without limitation, the commencement of legal proceedings, as shall, in the reasonable judgment of counsel retained for such purpose by the Remainder Trustee, be necessary or appropriate to preserve the Trust Estate and enforce the rights and remedies of the Remainder Trustee relating to the Trust Estate; and all reasonable costs and expenses incurred by the Remainder Trustee in so doing shall be Reimbursable Costs. Notwithstanding the foregoing, the Remainder Trustee shall not be required to take any action, incur any expenses or advance any funds of the Remainder Trustee under this Section 6.2(d) unless: (i) there shall then be on deposit in the Administration Account funds sufficient, in the reasonable judgment of the Remainder Trustee, to provide for reimbursement of all Reimbursable Costs incurred or to be incurred by the Remainder Trustee in acting pursuant to this Section 6.2(d); or (ii) the Remainder Trustee shall have received assurances from the Certificateholders (or otherwise) as to the source and manner for the reimbursement of such Reimbursable Costs reasonably satisfactory to the Remainder Trustee. If the Remainder Trustee shall seek such assurances from the Certificateholders and the Certificateholders shall fail or refuse to provide such assurances within fifteen (15) days after receipt of demand therefor, such failure or refusal shall (i) constitute a Termination Event and (ii) excuse further performance by the Remainder Trustee pursuant to this Section.

(e) In the event of a Casualty Loss affecting the Real Property in connection with which the amount of Casualty Proceeds payable with respect to such Casualty Loss shall be $100,000.00 or more, the Remainder Trustee shall give written notice thereof to the Certificateholders not later than five (5) business days after the Remainder Trustee shall have either received written notice thereof from the Term Trustee pursuant to the Administration Agreement or otherwise obtained Actual Knowledge of such Casualty Loss. Thereafter, the Remainder Trustee shall await the further written instructions of the Certificateholders.

(f) In the event of a Total Condemnation, the Remainder Trustee shall give written notice thereof to the Certificateholders not later than five (5) business days after the Remainder Trustee shall have received written notice thereof from the Term Trustee pursuant to the Administration Agreement or shall otherwise have obtained Actual Knowledge of such Total Condemnation. Thereafter the Remainder Trustee shall await the further written instructions of the Certificateholders, and receive the payment of the Remainder Proceeds for the benefit of the Certificateholders. In any circumstances in which the Certificateholders fail to direct the Term Trustee as to the taking (or failing to take) of any action in connection with this Section 6.2(f), the Remainder Trustee shall obtain the written recommendation of counsel and, if determined by the Remainder Trustee to be appropriate, a Qualified Real Estate Consultant with respect to the matter in question and shall proceed in the manner so determined to be in the best interests of the Certificateholders. All reasonable costs and expenses incurred by the Remainder Trustee in so acting, including without limitation, reasonable fees and expenses of counsel and any Qualified Real Estate Consultant retained by the Remainder Trustee on behalf of the Trust in connection with such Total Condemnation shall be Reimbursable Costs.

(g) If there shall occur a Casualty Loss Termination, or if the Lease or the Tenant's right to possession thereunder shall be terminated in connection with an Event of Default, the Remainder Trustee shall so notify the Certificateholders in writing not later than five (5) business days after receipt by the Remainder Trustee of written notice thereof from the Term Trustee pursuant to the Administration Agreement or shall otherwise have obtained Actual Knowledge of such Casualty Loss Termination, and shall await the further written instructions of the Certificateholders. Following any such termination of the Lease or the Tenant's right to possession thereunder, the Remainder Trustee shall, subject to Section 4.4, enter into such Replacement Lease or amendment to the Lease as shall be directed in writing by the Certificateholders. All fees and expenses reasonably incurred by the Remainder Trustee in acting pursuant to this Section 6.2(g) shall be Reimbursable Costs. Notwithstanding the foregoing, the Remainder Trustee shall not be required to take any action, incur any expenses or advance any funds of the Remainder Trustee under this Section 6.2(g) unless: (1) there shall then be on deposit in the Administration Account funds sufficient, in the reasonable judgment of the Remainder Trustee, to provide for reimbursement of all Reimbursable Costs incurred or to be incurred by the Remainder Trustee in acting pursuant to this Section 6.2(g); or (2) the Remainder Trustee shall have received assurances from the Certificateholders (or otherwise) as to the source and manner for the reimbursement of such Reimbursable Costs reasonably satisfactory to the Remainder Trustee. If the Remainder Trustee shall seek such assurances from the Certificateholders and the Certificateholders shall fail or refuse to provide such assurances within fifteen (15) days after receipt of demand therefor, such failure or refusal shall (i) constitute a Termination Event and (ii) excuse further performance by the Remainder Trustee pursuant to this Section.

(h) If there shall occur a Partial Condemnation, the Remainder Trustee shall so notify in writing the Certificateholders not later than five (5) business days after receipt by the Remainder Trustee of written notice thereof from the Term Trustee pursuant to the Administration Agreement or shall otherwise obtain Actual Knowledge of such Partial Condemnation and shall await the further written instructions of the Certificateholders.

SECTION 6.3 Rights of Remainder Trustee . The Remainder Trustee is authorized and directed to execute and deliver the Administration Agreement and each certificate or other document attached as an exhibit to or contemplated by this Agreement or the Administration Agreement to which the Trust is to be a party, in such form as the Certificateholders shall approve as evidenced conclusively by the Remainder Trustee's execution thereof. In addition to the foregoing, the Remainder Trustee is authorized, but shall not be obligated, to take all actions required of the Trust pursuant to the Lease and Administration Agreement. To the extent not prohibited by this Agreement or the Administration Agreement, the Remainder Trustee is further authorized from time to time to take such action as the Certificateholders recommend with respect to the Trust Estate.

SECTION 6.4 Acceptance of Trusts and Duties . Except as otherwise provided in this Article VI, in accepting the trusts hereby created, American National Bank and Trust Company of Chicago acts solely as Remainder Trustee hereunder and not in its individual capacity and all Persons having any claim against the Remainder Trustee by reason of the transactions contemplated by this Agreement shall look only to the Trust Estate for payment or satisfaction thereof. The Remainder Trustee accepts the trusts hereby created and agrees to perform its duties hereunder with respect to such trusts but only upon the terms of this Agreement. The Remainder Trustee also agrees to disburse all monies actually received by it constituting part of the Trust Estate upon the terms of this Agreement. The Remainder Trustee shall not be liable or accountable hereunder or under the Administration Agreement under any circumstances, except a breach of its duties under this Agreement or its own willful misconduct or in the case of the inaccuracy of any representation or warranty contained in Section 6.7 and expressly made by the Remainder Trustee. In particular, but not by way of limitation (and subject to the exceptions set forth in the preceding sentence):

(a) except as specifically provided in Section 6.2 hereof, the Remainder Trustee shall at no time have any responsibility or liability for or with respect to sufficiency of the Trust Estate or its ability to generate the payments to be distributed to Certificateholders under this Agreement including, without limitation: the existence, condition and ownership of the Real Property; the existence and enforceability of any insurance thereon; or the performance or enforcement of the Lease.

(b) Rainder Trustee shall not be liable with respect to any action taken or omitted to be taken by it in accordance with the instructions of the Certificateholders;

(c) no provision of this Agreement or the Administration Agreement shall require the Remainder Trustee to expend or risk funds, incur any Reimbursable Cost, or otherwise incur any financial liability in the performance of any of its rights or powers hereunder, if the Remainder Trustee shall have reasonable grounds for believing that repayment of such funds or adequate indemnity against such risk or liability is not reasonably assured or provided to it;

(d) under no circumstances shall the Remainder Trustee be liable for the payment of amounts due under the Certificates except for the distribution of amounts in the Administration Account in accordance with Section 5.3 hereof;

(e) the Remainder Trustee shall not be responsible for or in respect of and makes no representation as to the validity or sufficiency of any provision of this Agreement or for the due execution hereof by the Seller or for the form, character, genuineness, sufficiency, value or validity of any of the Trust Estate or for or in respect of the validity or sufficiency of the Certificates (other than the certificate of authentication on the Certificates) and the Remainder Trustee shall in no event assume or incur any liability, duty or obligation to any Certificateholder, and shall not have any duties or responsibilities for supervision or oversight of contract performance, other than as expressly provided for herein and in the Administration Agreement;

(f) the Remainder Trustee shall be under no obligation to exercise any of the rights or powers vested in it by this Agreement, or to institute, conduct or defend any litigation under this Agreement or otherwise or in relation to this Agreement, the Lease or Administration Agreement, at the request, order or direction of any of the Certificateholders, unless such Certificateholders have offered to the Remainder Trustee security or indemnity satisfactory to it against the costs, expenses and liabilities that may be incurred by the Remainder Trustee therein or thereby. The right of the Remainder Trustee to perform any discretionary act enumerated in this Agreement or the Administration Agreement shall not be construed as a duty, and the Remainder Trustee shall not be answerable for other than its negligence or willful misconduct in the performance of any such act;

(i) The Remainder Trustee shall not have any duties or responsibilities for signing waste manifests, waste shipping documents, waste stream characterization documents or land disposal restriction certifications;

(ii) The Remainder Trustee shall not have any authority to control or operate the Real Property; and (iii) All contracts shall provide that any party to the contract will claim only against the Trust and Trust Estate for payment or to satisfy any claims or liabilities.

SECTION 6.5 Action upon Instruction by Certificateholders.

(a) Subject to the terms, conditions and limitations hereof and the terms and conditions of the Administration Agreement, the Certificateholders may by written instruction direct the Remainder Trustee in the management of the Trust. Such direction may be exercised at any time by written instruction of the Certificateholders pursuant to Section 3.4 hereof.

(b) Notwithstanding the foregoing, the Remainder Trustee shall not be required to take any action hereunder or under the Administration Agreement if the Remainder Trustee shall have reasonably determined, or shall have been advised by counsel, that such action is likely to result in liability on the part of the Remainder Trustee or is contrary to the terms hereof or of the Lease or Administration Agreement or is otherwise contrary to law or unduly prejudicial to the interests of the Certificateholders not joining in any such direction.

(c) Whenever the Remainder Trustee is unable to decide between alternative courses of action permitted or required by the terms of this Agreement or Administration Agreement, or is unsure as to the application, intent, interpretation or meaning of any provision of this Agreement or Administration Agreement, the Remainder Trustee shall promptly give notice (in such form as shall be appropriate under the circumstances) to the Certificateholders requesting instruction as to the course of action to be adopted, and, to the extent the Remainder Trustee acts in good faith in accordance with any such instruction received, the Remainder Trustee shall not be liable on account of such action to any Person. If the Remainder Trustee shall not have received appropriate instructions within ten days of such notice (or within such shorter period of time as reasonably may be specified in such notice or may be necessary under the circumstances) it may, but shall be under no duty to, take or refrain from taking such action which is consistent, in its view, with this Agreement and the Administration Agreement, and as it shall deem to be in the best interests of the Certificateholders, and the Remainder Trustee shall have no liability to any Person for any such action or inaction.

SECTION 6.6 Furnishing of Documents. The Remainder Trustee shall furnish to the Certificateholders, promptly upon receipt of a written request therefor, duplicates or copies of all reports, notices, requests, demands, certificates, financial statements and any other instruments furnished to the Remainder Trustee under the Lease or hereunder.

SECTION 6.7 Representations and Warranties of Remainder Trustee. The Remainder Trustee hereby represents and warrants to the Seller, for the benefit of the Certificateholders, that:

(a) It is a national banking association duly organized, validly existing and in good standing under the laws of the United States.

(b) It has full power, authority and legal right to execute, deliver and perform this Agreement, and has taken all necessary action to authorize the execution, delivery and performance by it of this Agreement.

(c) The execution, delivery and performance by it of this Agreement (i) shall not violate any provision of any law or regulation governing the banking and trust powers of the Remainder Trustee or any order, writ, judgment or decree of any court, arbitrator or governmental authority applicable to the Remainder Trustee or any of its assets, (ii) shall not violate any provision of the articles of association or by-laws of the Remainder Trustee, or (iii) shall not violate any provision of, or constitute, with or without notice or lapse of time, a default under, or result in the creation or imposition of any lien on any properties included in the Trust Estate pursuant to the provisions of any mortgage, indenture, contract, agreement or other undertaking to which it is a party.

(d) The execution, delivery and performance by the Remainder Trustee of this Agreement shall not require the authorization, consent or approval of, the giving of notice to, the filing or registration with, or the taking of any other action in respect of, any governmental authority or agency regulating the banking and corporate trust activities of banks or trust companies in the jurisdiction in which the Trust was formed.

(e) This Agreement has been duly executed and delivered by the Remainder Trustee and constitutes the legal, valid and binding agreement of the Remainder Trustee, enforceable in accordance with its terms, except as enforceability may be limited by bankruptcy, insolvency, reorganization, or other similar laws affecting the enforcement of creditors' rights in general and by general principles of equity, regardless of whether such enforceability is considered in a proceeding in equity or at law.

SECTION 6.8 Reliance; Advice of Counsel .

(a) The Remainder Trustee shall incur no liability to anyone in acting upon any signature, instrument, notice, resolution, request, consent, order, certificate, report, opinion, bond or other document or paper believed by it to be genuine and believed by it to be signed by the proper party or parties and need not investigate any fact or matter in any such document. The Remainder Trustee may accept a certified copy of a resolution of the board of directors or other governing body of any corporate party as conclusive evidence that such resolution has been duly adopted by such body and that the same is in full force and effect. As to any fact or matter the method of the determination of which is not specifically prescribed herein, the Remainder Trustee may for all purposes hereof rely on a certificate, signed by the president or any vice president or by the treasurer or other authorized officers of the relevant party, as to such fact or matter, and such certificate shall constitute full protection to the Remainder Trustee for any action taken or omitted to be taken by it in good faith in reliance thereon.

(b) In the exercise or administration of the trusts hereunder and in the performance of its duties and obligations under this Agreement or the Administration Agreement, the Remainder Trustee: may act directly or through its agents, attorneys, custodians or nominees (including the granting of a power of attorney to officers of American National Bank and Trust Company of Chicago to execute and deliver any documents related thereto on behalf of the Remainder Trustee) pursuant to agreements entered into with any of them, and the Remainder Trustee shall not be liable for the conduct or misconduct of such agents, attorneys, custodians or nominees if such agents, attorneys, custodians or nominees shall have been selected by the Remainder Trustee with reasonable care; and may consult with counsel, accountants and other skilled professionals to be selected with reasonable care and employed by it. The Remainder Trustee shall not be liable for anything done, suffered or omitted in good faith by it in accordance with the opinion or advice of any such counsel, accountants or other such Persons and not contrary to this Agreement or the Administration Agreement.

SECTION 6.9 Remainder Trustee Shall Not Own Certificates and Notes . The Remainder Trustee shall not, in its individual or any other capacity, become the owner or pledgee of Certificates, but may otherwise deal with other parties to this Agreement, the Lease, the Administration Agreement, and the Certificateholders with the same rights it would have were it not Term Trustee hereunder.

SECTION 6.10 Compensation; Reimbursable Costs . The Remainder Trustee shall receive as compensation for its services hereunder a one-time fee in the amount of $20,000.00 payable upon execution of this Agreement by the Remainder Trustee, and the Remainder Trustee shall be entitled to be reimbursed from time to time by the Certificateholders or the Trust Estate, as the circumstances may require, for all Reimbursable Costs as the Remainder Trustee may incur in connection with the exercise and performance of its rights and its duties hereunder. Any amounts paid to the Remainder Trustee pursuant to this Article VI shall be deemed not to be a part of the Trust Estate immediately after such payment. Seller shall indemnify and hold harmless the Remainder Trustee from and against any loss suffered or cost incurred by the Remainder Trustee for any Reimbursable Cost for which the Remainder Trustee does not receive reimbursement from the Certificateholders, or the Trust Estate, as the circumstances may require, pursuant to the terms of this Agreement ("Unrecovered Costs"), provided the Remainder Trustee shall have first used all commercially reasonable efforts to recover such Unrecovered Costs from the Certificateholders, or the Trust Estate, as the circumstances may require. Seller shall make payment to the Remainder Trustee of any Unrecovered Costs in respect of which the Remainder Trustee is entitled to indemnification pursuant hereto not later than thirty (30) days after receipt of written demand therefor setting forth in reasonable detail the nature and amount of such Unrecovered Costs and the actions taken by the Remainder Trustee to collect the same from the Certificateholders and the Trust Estate, as the case may be. Upon the making of any payment hereunder by the Seller, the Seller shall be subrogated to all rights and claims of the Remainder Trustee against the Certificateholders and the Trust Estate in respect of the Unrecovered Costs so paid by the Seller arising under this Agreement or otherwise.

SECTION 6.11 Replacement of Remainder Trustee .

(a) The Remainder Trustee may resign at any time and be discharged from the trusts hereby created by giving thirty (30) days' prior written notice thereof to the Certificateholders or such lesser period as the Certificateholders shall agree. The Certificateholders shall appoint a successor Remainder Trustee meeting the requirements of Section 6.14 by delivering a written instrument, in duplicate, to the resigning Remainder Trustee and the successor Remainder Trustee. If no successor Remainder Trustee shall have been appointed and have accepted appointment within thirty (30) days after the giving of such notice of resignation, the Seller, upon written notice thereof from the resigning Remainder Trustee, may appoint such successor Remainder Trustee meeting the requirements of Section 6.14 by delivering a written instruction to such effect to the resigning Remainder Trustee and the successor Remainder Trustee within thirty (30) days after receipt of such notice from the resigning Remainder Trustee. If no successor Remainder Trustee shall have been appointed and have accepted appointment prior to the expiration of such second thirty (30) day period, the resigning Remainder Trustee may petition any court of competent jurisdiction for the appointment of a successor Remainder Trustee. The Certificateholders shall remove the Remainder Trustee if:

(i) the Remainder Trustee shall cease to be eligible in accordance with the provisions of Section 6.12 and shall fail to resign after written request therefor by the Certificateholders;

(ii) the Remainder Trustee shall be adjudged bankrupt or insolvent;

(iii) a receiver or other public officer shall be appointed or take charge or control of the Remainder Trustee or of its property or affairs for the purpose of rehabilitation, conservation or liquidation; or (iv) the Remainder Trustee shall otherwise be incapable of acting.

(b) If the Remainder Trustee resigns or is removed or if a vacancy exists in the office of Remainder Trustee for any reason the Certificateholders shall promptly appoint a successor Remainder Trustee by written instrument, in duplicate (one copy of which instrument shall be delivered to the outgoing Remainder Trustee so removed and one copy to the successor Remainder Trustee) and shall pay all fees owed to the outgoing Remainder Trustee.

(c) Any resignation or removal of the Remainder Trustee and appointment of a successor Remainder Trustee pursuant to any of the provisions of this Section 6.11 shall not become effective until a written acceptance of appointment is delivered by the successor Remainder Trustee to the outgoing Remainder Trustee and the Certificateholders and all fees and expenses due to the outgoing Remainder Trustee are paid. Any successor Remainder Trustee appointed pursuant to this Section 6.11 shall be eligible to act in such capacity in accordance with Section 6.14 and, following compliance with the preceding sentence, shall become fully vested with all the rights, powers, duties and obligations of its predecessor under this Agreement, with like effect as if originally named as Remainder Trustee.

(d) The predecessor Remainder Trustee shall upon payment of its fees and expenses deliver to the successor Remainder Trustee all documents and statements and monies held by it under this Agreement. The Certificateholders and the predecessor Remainder Trustee shall execute and deliver such instruments and do such other things as may reasonably be required for fully and certainly vesting and confirming in the successor Remainder Trustee all such rights, powers, duties and obligations.

SECTION 6.12 Merger or Consolidation of Remainder Trustee . Any corporation into which the Remainder Trustee may be merged or converted or with which it may be consolidated, or any corporation resulting from any merger, conversion or consolidation to which the Remainder Trustee shall be a party, or any corporation succeeding to all or substantially all of the corporate trust business of the Remainder Trustee, shall be the successor of the Remainder Trustee hereunder, provided such corporation shall be eligible pursuant to Section 6.14, and without the execution or filing of any instrument or any further act on the part of any of the parties hereto.

SECTION 6.13 Appointment of Co-Trustee or Separate Trustee .

(a) Notwithstanding any other provisions of this Agreement, at any time, for the purpose of meeting any legal requirement of any jurisdiction in which the Trust Estate is located, the Certificateholders and the Remainder Trustee acting jointly shall have the power and shall execute and deliver all instruments to appoint one or more Persons approved by the Remainder Trustee to act as co-trustee, jointly with the Remainder Trustee, or as separate trustee or trustees, of all or any part of the Trust Estate, and to vest in such Person, in such capacity, such title to the Trust Estate, or any part thereof, and, subject to the other provisions of this Section 6.13, such powers, duties, obligations, rights and trusts as the Certificateholders and the Remainder Trustee may consider necessary or desirable. If the Certificateholders shall not have joined in such appointment within fifteen (15) days after receipt of a request so to do, the Remainder Trustee alone shall have the power to make such appointment. No co-trustee or separate trustee under this Agreement shall be required to meet the terms of eligibility as a successor trustee pursuant to Section 6.14 and no notice of the appointment of any co-trustee or separate trustee shall be required pursuant to Section 6.11.

(b) Each separate trustee and co-trustee shall, to the extent permitted by law, be appointed and act subject to the following provisions and conditions:

(i) all rights, powers, duties and obligations conferred or imposed upon the Remainder Trustee shall be conferred upon and exercised or performed by the Remainder Trustee and such separate trustee or co-trustee jointly (it being understood that such separate trustee or co-trustee is not authorized to act separately without the Remainder Trustee joining in such act), except to the extent that under any law of any jurisdiction in which any particular act or acts are to be performed, the Remainder Trustee shall be incompetent or unqualified to perform such act or acts, in which event such rights, powers, duties and obligations (including the holding of title to the Trust Estate or any portion thereof in any such jurisdiction) shall be exercised and performed singly by such separate trustee or co-trustee, but solely at the direction of the Remainder Trustee;

(ii) no trustee under this Agreement shall be personally liable by reason of any act or omission of any other trustee under this Agreement; and (iii) the Certificateholders and the Remainder Trustee acting jointly may at any time accept the resignation of or remove any separate trustee or co-trustee.

(c) Any notice, request or other writing given to the Remainder Trustee shall be deemed to have been given to each of the then separate trustees and co-trustees, as effectively as if given to each of them. Every instrument appointing any separate trustee or co-trustee shall refer to this Agreement and the conditions of this Article. Each separate trustee and co-trustee, upon its acceptance of the trusts conferred, shall be vested with the estates or property specified in its instrument of appointment, either jointly with the Remainder Trustee or separately, as may be provided therein, subject to all the provisions of this Agreement, specifically including every provision of this Agreement relating to the conduct of, affecting the liability of, or affording protection to, the Remainder Trustee. Each such instrument shall be filed with the Remainder Trustee and a copy thereof given to the Certificateholders.

(d) Any separate trustee or co-trustee may at any time appoint the Remainder Trustee as its agent or attorney-in-fact with full power and authority, to the extent not prohibited by law, to do any lawful act under or in respect of this Agreement on its behalf and in its name. If any separate trustee or co-trustee shall die, become incapable of acting, resign or be removed, all of its estates, properties, rights, remedies and trusts shall vest in and be exercised by the Remainder Trustee, to the extent permitted by law, without the appointment of a new or successor trustee.

SECTION 6.14 Eligibility Requirements for Remainder Trustee. The Remainder Trustee shall at all times be a corporation or other person or entity authorized pursuant to applicable laws to exercise corporate trust powers with respect to the Trust Estate. If at any time the Remainder Trustee shall cease to be eligible in accordance with the provisions of this Section 6.14, the Remainder Trustee shall resign immediately in the manner and with the effect specified in Section 6.11.

ARTICLE VII

TERMINATION OF TRUST AGREEMENT

SECTION 7.1 Termination of Trust Agreement.

(a) This Agreement (other than Section 6.10) and the Trust shall terminate and be of no further force or effect upon the final distribution by the Remainder Trustee of all monies or other property or proceeds of the Trust Estate in accordance with the terms hereof following the occurrence of a Termination Event or at the time provided in Section 7.2. The bankruptcy, liquidation, dissolution, death or incapacity of any Certificateholder, shall not (x) operate to terminate this Agreement or the Trust, nor (y) entitle such Certificateholder's legal representatives or heirs to claim an accounting or to take any action or proceeding in any court for a partition or winding up of all or any part of the Trust or the Trust Estate nor (z) otherwise affect the rights, obligations and liabilities of the parties hereto.

(b) Except as provided in Section 7.1(a), neither the Seller nor any Certificateholder shall be entitled to revoke or terminate the Trust.

(c) Notice of any termination of the Trust, specifying the date upon which the Certificateholders shall surrender their Certificates to the Remainder Trustee for final distribution and cancellation (the "Final Distribution Date"), shall be given by the Remainder Trustee by letter to Certificateholders mailed within thirty (30) days following the occurrence of a Termination Event (a "Termination Notice"), stating:

(i) the Final Distribution Date at which time final distribution of the Trust Estate and payment (if any) of the Certificates shall be made upon presentation and surrender of the Certificates at the office of the Remainder Trustee therein designated; (ii) the amount (if then known) of any such final payment; and (iii) that distribution of the Trust Estate and any other payments will be made only upon presentation and surrender of the Certificates at the office of the Remainder Trustee therein specified. Not later than fifteen (15) days prior to the Distribution Date, the Certificateholders shall, by unanimous written direction, advise the Remainder Trustee as to the full legal name, business address and any other information reasonably requested by the Remainder Trustee of the Person to whom the Remainder Trustee shall convey all of its right, title and interest in the Trust Estate on the Distribution Date (the "Successor Owner"). Upon presentation and surrender of the Certificates, the Remainder Trustee shall cause to be distributed to Certificateholders amounts distributable on such Distribution Date pursuant to Section 5.2, and, in addition, shall cause all of the right, title and interest of the Remainder Trustee in and to the Trust Estate and all accounts established by the Remainder Trustee in connection therewith to be transferred to the Successor Owner by such bills of sale, assignments, deeds or other instruments of conveyance as shall be reasonably necessary therefor, all without warranties or covenants of any nature whatsoever. The Final Distribution Date shall be not later than: (i) in the event of a Total Condemnation, thirty (30) days following receipt by the Remainder Trustee of the Remainder Proceeds payable with respect thereto; (ii) in the event of a sale of the Trust Estate pursuant to Section 7.2, thirty (30) days following receipt by the Remainder Trustee of the proceeds from such sale; and (iii) in any other case, forty-five (45) days after the occurrence of the Termination Event giving rise to the termination of the Trust.

(d) If all of the Certificateholders shall not surrender their Certificates for cancellation within thirty (30) days after the date specified in the Termination Notice referred to in subsection 7.1(c) or if the Certificateholders shall fail to designate by unanimous written direction the Successor Owner within the time required hereby, the Remainder Trustee shall give a second written notice so stating. If within thirty (30) days after the second notice all the Certificates shall not have been surrendered for cancellation, or a Successor Owner has not been designated in accordance herewith, the Remainder Trustee may take appropriate steps, or may appoint an agent to take appropriate steps, to contact the remaining Certificateholders concerning surrender of their Certificates or designation of a Successor Owner, and the cost thereof shall be paid out of the funds and other assets that shall remain subject to this Agreement.

SECTION 7.2 Termination Pursuant to Section 6.2 . If a Termination Event shall occur pursuant to Section 6.2, or if the Certificateholders shall fail to designate a Successor Owner pursuant to Section 7.1(c) within sixty (60) days after notice thereof given pursuant to Section 7.1(d), the Remainder Trustee shall give a Termination Notice thereof to the Certificateholders and to the parties to whom such notice is required pursuant to the Administration Agreement and the Remainder Trustee shall thereafter sell the assets of the Trust Estate at an open outcry auction held in a commercially reasonable manner and on commercially reasonable terms on a date not earlier than thirty (30) days and not later than ninety (90) days after such Termination Notice has been given by the Remainder Trustee all as more particularly set forth herein. Such Termination Notice shall specify the time, place and terms of such auction. The Remainder Trustee shall engage a Qualified Real Estate Consultant for the purpose of consulting with the Remainder Trustee regarding the Auctioneer to be engaged by the Remainder Trustee and the terms and conditions of the auction to be conducted thereby. Such Qualified Real Estate Consultant shall make a written recommendation to the Remainder Trustee regarding the identity of the Auctioneer to be selected and the terms on which the auction shall be conducted; provided, however, that in all events, the Auctioneer shall conduct any auction held pursuant hereto: (i) at the Corporate Trust Offices; (ii) on an open outcry basis with no reserve price or minimum bid; (iii) only after publication of the time and place for such auction in a manner and with such publications as shall then be required to satisfy the requirements of the Uniform Commercial Code, or any successor legislation, as then in effect in the jurisdiction in which such auction shall be held, with respect to sales of collateral thereunder; (iv) pursuant to bidding rules that shall specify the form of purchase and sale agreement to be entered into between the Remainder Trustee and the successful bidder at the auction, which agreement shall be in the form recommended by the Qualified Real Estate Consultant and counsel engaged by the Remainder Trustee in connection with such auction; and (v) substantially in accordance with the rules and procedures recommended by the Qualified Real Estate Consultant and counsel engaged by the Trustee in connection with such auction. The Remainder Trustee shall be entitled to rely on such recommendations for all purposes of this Agreement. Certificateholders, and any Person controlling or controlled by, owning, owned by or under common ownership with any Certificateholder, shall not be entitled to participate in such auction. The proceeds of any such sale, disposition or liquidation of the assets of the Trust shall be applied first to any outstanding Reimbursable Costs, second to any outstanding fees due to the Remainder Trustee in connection with this Agreement and the balance shall constitute Collections and shall be deposited into the Administration Account for distribution in accordance with the terms hereof.

SECTION 7.3 Distribution of Remainder Proceeds . If there shall occur a Total Condemnation, the Remainder Trustee shall, in connection with the winding-up of the Trust, distribute the Remainder Proceeds to the Certificateholders on the final Distribution Date.

SECTION 7.4 Default by Purchaser . If the purchaser of the Trust Estate at any auction held pursuant to Section 7.2 shall default in the performance of its obligations under the purchase and sale agreement entered into in connection therewith in the manner and time required thereby, and such default shall give rise to a right to terminate such purchase and sale agreement on the part of the Remainder Trustee, the Remainder Trustee is hereby irrevocably authorized and directed to terminate such agreement in accordance with its terms and to conduct another auction of the Trust Estate in the manner set forth in Section 7.2. If the Purchaser at any such subsequent auction shall likewise fail to perform its obligations to purchase the Trust Estate and such failure shall give rise to a right to terminate the purchase and sale agreement entered into in connection therewith, then the Remainder Trustee shall terminate such agreement in accordance with its terms and proceed in the manner set forth herein.

ARTICLE VIII

AMENDMENTS

SECTION 8.1 Amendments.

(a) Prior to the expiration of the Term Trust, this Agreement may be amended by the Remainder Trustee with the consent of the holders of 51% or more of the Voting Interests, to (i) cure any ambiguity, (ii) correct or supplement any provision in this Agreement that may be defective or inconsistent with any other provision in this Agreement, and (iii) evidence and provide for the acceptance of the appointment of a successor trustee with respect to the Trust Estate and add to or change any provisions as shall be necessary to facilitate the administration of the trusts hereunder by more than one trustee pursuant to Article VI. After the expiration of the Term Trust, this Agreement may be amended by the Remainder Trustee with the written consent of the Certificateholders. Any such amendment shall be narrowly construed so as to give maximum effect to each and every other provision of this Agreement. Except as expressly otherwise provided herein, this Trust Agreement may not be amended.

SECTION 8.2 Form of Amendments .

(a) Promptly after the execution of any amendment, supplement or consent pursuant to Section 8.1, the Remainder Trustee shall furnish written notification of the substance of such amendment or consent to each Certificateholder.

(b) It shall not be necessary for the consent of Certificateholders, pursuant to Section 8.2 to approve the particular form of any proposed amendment or consent, but it shall be sufficient if such consent shall approve the substance thereof. The manner of obtaining such consents (and any other consents of Certificateholders provided for in this Agreement) and of evidencing the authorization of the execution thereof by Certificateholders shall be subject to such reasonable requirements as the Remainder Trustee may prescribe.

(c) If required under applicable law, promptly after the execution of any amendment to the Certificate of Trust, the Remainder Trustee shall cause the filing of such amendment with the Secretary of State.

(d) Prior to the execution of any amendment to this Agreement or the Certificate of Trust, the Remainder Trustee shall be entitled to receive and rely upon an opinion of counsel stating that the execution of such amendment is authorized or permitted by this Agreement. The Remainder Trustee may, but shall not be obligated to, enter into any such amendment which affects the Remainder Trustee's own rights, duties or immunities under this Agreement or otherwise.

ARTICLE IX

MISCELLANEOUS

SECTION 9.1 No Legal Title to Trust Estate. The Certificateholders shall not have legal title to any part of the Trust Estate. The Certificateholders shall be entitled to receive distributions with respect to their undivided ownership interest therein only in accordance with Articles V and VII hereof. No transfer, by operation of law or otherwise, of any right, title, and interest of the Certificateholders to and in their ownership interest in the Trust Estate shall operate to terminate this Agreement or the trusts hereunder or entitle any transferee to an accounting or to the transfer to it of legal title to any part of the Trust Estate.

SECTION 9.2 Limitations on Rights of Others . Except for Section 2.7 and Section 9.11 hereof, and except as expressly provided in the Administration Agreement, the provisions of this Agreement are solely for the benefit of the Remainder Trustee, the Seller and the Certificateholders and nothing in this Agreement, whether express or implied, shall be construed to give to any other Person any legal or equitable right, remedy or claim in the Trust Estate or under or in respect of this Agreement or any covenants, conditions or provisions contained herein.

SECTION 9.3 Derivative Actions. Any provision contained herein to the contrary notwithstanding, the right, if any, of any Certificateholder to bring a derivative action in the right of the Trust is hereby made expressly subject to the following limitations and requirements:

(a) such Certificateholder must meet all requirements set forth in [the Business Trust Statute]; and (b) no Certificateholder may bring a derivative action in the right of the Trust without the prior written consent of Certificateholders owning, in the aggregate, a beneficial interest in Certificates representing 50% of the Certificate Balance.

SECTION 9.4 Notices .

(a) All demands, notices and communications upon or to the Seller, the Remainder Trustee or the Certificateholders under this Agreement shall be in writing, personally delivered, sent by electronic facsimile (with hard copy to follow via first class mail) or mailed by certified mail-return receipt requested, and shall be deemed to have been duly given upon receipt:

If to Seller: Scribcor, Inc.,
400 North Michigan Avenue
Chicago, IL 60611
Attention: Richard M. Ross
(Facsimile No. (312) 923-8023)

If to the Trust or the Remainder Trustee, to the Remainder Trustee at its Corporate Trust Office:

American National Bank and Trust
Company of Chicago
33 North LaSalle Street
Chicago, Illinois 60690
Attention: Corporate Trust Department
(Facsimile No. 312/661-6491)

With respect to any Certificateholder, at the address of such Certificateholder shown in the Certificate Register or at such other address as shall be designated by such Person in a written notice to the other parties to this Agreement.

(b) Any notice required or permitted to be given to a Certificateholder shall be given by first-class mail, postage prepaid, at the address of such Holder as shown in the Certificate Register. Any notice so mailed within the time prescribed in this Agreement shall be conclusively presumed to have been duly given, whether or not the Certificateholder receives such notice.

SECTION 9.5 Severability . If any one or more of the covenants, agreements, provisions or terms of this Agreement shall be for any reason whatsoever held invalid, then such covenants, agreements, provisions or terms shall be deemed severable from the remaining covenants, agreements, provisions or terms of this Agreement and shall in no way affect the validity or enforceability of the other provisions of this Agreement or of the Certificates or the rights of the holders thereof.

SECTION 9.6 Counterparts . This Agreement may be executed by the parties hereto in separate counterparts, each of which when so executed and delivered shall be an original, but all such counterparts shall together constitute one and the same instrument.

SECTION 9.7 Successors and Assigns . All covenants and agreements contained herein shall be binding upon, and inure to the benefit of, the Seller, the Remainder Trustee and each Certificateholder and their respective successors and permitted assigns, all as herein provided. Any request, notice, direction, consent, waiver or other instrument or action by a Certificateholder shall bind the successors and assigns of such Certificateholder.

SECTION 9.8 No Recourse . Each Certificateholder by accepting a Certificate acknowledges that such Certificateholder's Certificates represent beneficial interests in the Trust only and do not represent interests in or obligations of the Tenant, the Remainder Trustee, or any Affiliate thereof and no recourse may be had against such parties or their assets, except as may be expressly set forth or contemplated in this Agreement or the Certificates.

SECTION 9.9 Headings . The headings of the various Articles and Sections herein are for convenience of reference only and shall not define or limit any of the terms or provisions hereof.

SECTION 9.10 Governing Law . THIS AGREEMENT SHALL BE CONSTRUED IN ACCORDANCE WITH THE LAWS OF THE STATE OF ILLINOIS, WITHOUT REFERENCE TO ITS CONFLICT OF LAW PROVISIONS, AND THE OBLIGATIONS, RIGHTS AND REMEDIES OF THE PARTIES HEREUNDER SHALL BE DETERMINED IN ACCORDANCE WITH SUCH LAWS.

IN WITNESS WHEREOF, the parties hereto have caused this Trust Agreement to be duly executed by their respective officers hereunto duly authorized, as of the day and year first above written.

AMERICAN NATIONAL BANK AND TRUST COMPANY OF CHICAGO, not in its individual capacity, but solely as Remainder Trustee as aforesaid By: ______________________________

Name: ______________________________

Title: ______________________________

SCRIBCOR, INC.

By: ______________________________

Name: ______________________________

Title: ______________________________

APPENDIX A

Definitions

"Actual Knowledge" shall mean with respect to any Person or party, Conscious Awareness (as hereinafter defined) of a fact that such fact is contained in a document of which such person has Conscious Awareness or which was created during the course of a transaction in which such person actively participated. A person, however, shall not be deemed to have Actual Knowledge of a fact merely because (i) such fact is contained in a document or approved by such person if such person does not have Conscious Awareness of such document or if such document was not created during the course of a transaction in which such person actively participated or (ii) any other individual in such person's organization has Actual Knowledge of such fact.

"Administration Account" shall mean the bank account established and maintained by the Remainder Trustee pursuant to Section 5.1 of the Agreement.

"Administration Agreement" shall mean that certain First Amended and Restated Administration Agreement of even date as the Agreement by and between Term Trustee and the Remainder Trustee.

"Affiliate" shall mean, with respect to any Person, any Person or party owning, or owned by a Person or party owning, directly or indirectly ten percent (10%) or more of the voting interest of such Person, or otherwise having the ability to exercise control over such Person.

"Agreement" shall mean that certain First Amended and Restated Remainder Trust Agreement dated as of August __, 1995 by and between Seller and Remainder Trustee as the same may be amended from time to time in accordance with its terms.

"Auctioneer" shall mean the Person selected by the Remainder Trustee to administer an auction sale of the Trust Estate pursuant to Section 7.2.

"Benefit Plan" shall mean an employee benefit plan as described in Section 3.10(b) of the Agreement.

"Casualty Loss" shall mean any loss or damage suffered or incurred in respect of the Real Property arising out of or in connection with any fire, windstorm, flood, earthquake, act of god, war, strike or other casualty.

"Casualty Loss Termination" shall mean any termination of the Lease resulting from the occurrence of a Casualty Loss.

"Casualty Proceeds" shall mean the aggregate amount of payment received by the Remainder Trustee in respect of any Casualty Loss affecting the Real Property including, without limitation, all proceeds of any insurance maintained by the Tenant or the Remainder Trustee in respect thereof.

"Certificate" shall mean one or more certificates of ownership of beneficial interest in the Trust issued by the Remainder Trustee pursuant to Section 3.3 of the Agreement in substantially identical form to the sample certificate attached to the Agreement as Exhibit A.

"Certificate Balance" as of any give date shall mean with respect to each Certificate, the percentage ownership interest in the Trust represented by such Certificate multiplied by the Remainder Proceeds calculated in accordance with Appendix B to the Agreement.

"Certificateholder" shall mean each Person in whose name one or more Certificates is registered as of a particular date as evidenced by the Certificate Register.

"Certificate Register" shall mean the register of Certificates required to be maintained by the Remainder Trustee pursuant to Section 3.4 hereof.

"Certificate Registrar" shall mean the Remainder Trustee or such Person as shall be appointed by the Remainder Trustee to maintain the Certificate Register pursuant to Section 3.4 of the Agreement.

"Code" shall mean the Internal Revenue Code of 1986, as it may be amended from time to time.

"Collections" shall mean all monies, cash, rent or other payment received by the Remainder Trustee in respect of the Lease, the Real Property or otherwise including, without limitation the amount of all judgments, awards or other payments made in connection with the enforcement of the Lease by the Remainder Trustee, the amount of any Net Casualty Proceeds or Net Compensation.

"Compensation" shall mean the amount of any award, judgment, settlement or other payment receive by the Remainder Trustee in respect of any Condemnation of all or any portion of the Real Property.

"Condemnation" shall mean any taking, condemnation or other exercise of the power of eminent domain by any governmental or quasi-governmental authority having such power affecting all or any portion of the Real Property.

"Conscious Awareness" shall mean with respect to any Person or party, that such Person actually remembered a fact at the given time. A Person shall not be deemed to have Conscious Awareness of a fact at a given time if such Person did not actually remember a fact at the given time unless such fact is contained in a document previously read or executed by such Person in the course of a transaction in which such Person actively participated. A Person shall not be deemed to have Conscious Awareness of a fact merely because any other individual in such Person's organization has Conscious Awareness of such fact.

"Corporate Trust Office" shall mean the office maintained by the Remainder Trustee at 33 N. LaSalle Street, Chicago, Illinois 60690, or if there shall be a change in the location of the Corporate Trust Office or a successor Remainder Trustee, at the location specified by the Remainder Trustee or such successor Remainder Trustee in a written notice to all Certificateholders delivered in accordance with Section 9.4.

"Default Notice" shall mean any notice of the occurrence of an Event of Default given pursuant to Section 6.2 of the Agreement.

"Distributable Funds" shall mean, as of any Distribution Date, the total balance of funds in the Administration Account less the sum of: (i) $25,000.00; plus (ii) the amount of all Reimbursable Costs incurred by the Remainder Trustee for which the Remainder Trustee has not previously been reimbursed; plus (iii) the amount of all Reimbursable Costs reasonably anticipated by the Remainder Trustee to be incurred prior to the next succeeding Distribution Date provided, however, that upon the Final Distribution Date, the Distributable Funds shall include the amounts set forth in clauses (i) and (iii) above.

"Distribution Date" shall mean the fifteenth day of each month after the establishment of the Administration Account.

"Event of Default" shall mean any fact or matter the occurrence of which constitutes an Event of Default under the Lease (or any Replacement Lease).

"Final Distribution Date" shall have the meaning set forth in Section 7.1.

"Guarantee" means that certain Guarantee of the Lease dated November 13, 1991 made by Kansas City Life Insurance Company.

"Laws" shall mean all statutes, codes, rules, regulations, ordinances, decrees and enactments of any governmental or quasi-governmental agency having jurisdiction over: (i) the Real Property, or its use and operation; (ii) the Remainder Trustee; or (iii) the Trust Estate.

"Lease" shall mean that certain lease dated December 29, 1989 by and between Old American Insurance Company, as Tenant and R&S Kansas City Associates Limited Partnership as Landlord regarding the Real Property, as amended by a First Amendment to Lease, dated November 12, 1991, as guaranteed by the Guarantee, or any Replacement Lease or Leases entered into from time to time.

"Net Casualty Proceeds" shall mean the aggregate amount of Casualty Proceeds received by the Remainder Trustee in respect of any Casualty Loss less all Reimbursable Costs incurred by the Remainder Trustee in connection with the adjustment, negotiation, settlement, or collection of such Casualty Proceeds or the exercise or performance by the Remainder Trustee of any of its rights, powers or duties under the Agreement.

"Partial Condemnation" shall mean (i) any taking in or by condemnation or other eminent domain proceeding pursuant to any law, general or special or (ii) temporary requisition of the Real Property or any part thereof by any governmental authority, civil or military after the occurrence of which the Lease (or any Replacement Lease) shall remain in full force and effect.

"Person" shall mean any corporation, partnership, limited liability company, or other entity or human being.

"Property Report" shall have the meaning given in the Servicing Agreement.

"Qualified Real Estate Consultant" shall mean: (i) the Servicer; (ii) the commercial loan servicing, property or asset management group which is an Affiliate of the Remainder Trustee, or any Person or party who: (i) has not less than ten (10) years of experience as a professional asset or property manager and is licensed (if required) to perform such services in the locale of the Real Property; (ii) then has under management a portfolio of commercial and office properties containing in the aggregate not less than two (2) million square feet or with an aggregate fair market value of not less than $20,000,000.00; and (iii) then has not fewer than twenty (20) employees directly engaged in the provision of asset or property management services.

"Real Property" shall mean the land and all buildings and improvements located thereon commonly known as 4900 Oak Street, Kansas City, Missouri and legally described on Appendix C to the Agreement.

"Record Date" shall mean with respect to any Distribution Date, three (3) business days prior to such Distribution Date.

"Reimbursable Costs" shall mean all fees, expenses, costs (including, without limitation, attorneys fees or the fees of a Qualified Real Estate Consultant), or other charges incurred in good faith by Remainder Trustee in the performance of its rights and obligations under the Agreement.

"Remainder Proceeds" shall mean the amount calculated in accordance with Appendix B attached hereto.

"Remainder Trust" shall mean the K.C. LURE® Trust 1995-1 as established pursuant to that certain Trust Agreement of even date herewith by and between Seller and the Remainder Trustee.

"Rent" shall mean rent as defined in the Lease or as the term may be defined under any Replacement Lease.

"Replacement Lease" shall mean any lease for all or any portion of the Real Property entered into pursuant to Section 6.2(g) of the Agreement requiring the tenant thereunder at its sole cost and expense to: (i) maintain at least the required insurance; (ii) pay all ad valorem and other real property taxes levied against the Real Property; (iii) maintain or cause the Real Property to be maintained in good operating condition and in compliance with all Laws; and (iv) provide indemnification to the Remainder Trustee as landlord under any such Replacement Lease on terms and conditions reasonably satisfactory to the Remainder Trustee.

"Responsible Officer" shall mean, with respect to any party to the Agreement or any Certificateholder, the president, any vice-president, assistant vice-president, secretary, assistant secretary or other officer or officers customarily performing functions similar to those performed by any of the above, or to whom any matter arising under this Agreement, the Lease or the Administration Agreement may be referred, having the legal authority to bind the party in question.

"Seller" shall mean Scribcor, Inc., an Illinois corporation, its successors and assigns.

"Servicer" means Scribcor, Inc., in its capacity as servicer under the Servicing Agreement, or any party who may succeed to Scribcor, Inc. as Servicer under the Servicing Agreement.

"Servicing Agreement" shall mean that certain Servicing Agreement of even date herewith by and between Scribcor, Inc., as Servicer, and the Term Trustee, as Owner Trustee.

"Successor Owner" shall have the meaning set forth in Section 7.1(c).

"Tenant" shall mean Old American Insurance Company, together with its subtenants, of whatever level, successors and assigns and all parties claiming by or through any of them, and any tenant under any Replacement Lease, or any subtenant (of whatever level) or assignee thereof.

"Termination Event" shall mean: (i) the failure of the Certificateholders to give the financial assurances or indemnity required pursuant to Section 6.2(d) or (g); (ii) the expiration of ten (10) years from the date on which the Term Trust shall have terminated; or (iii) following the date on which the Term Trust shall have terminated, receipt by the Remainder Trustee of a written direction from all of the Certificateholders directing the Remainder Trustee to terminate the Trust and containing a release of claims and covenant not to sue from each of the Certificateholders in form reasonably satisfactory to the Remainder Trustee releasing all claims of any nature whatsoever, known or unknown, foreseen or unforeseen, of such Certificateholder against the Term Trustee and all beneficial owners of any interest in the Term Trust arising from or in connection with the Term Trustee's ownership of an interest in the Real Property, or the use, operation or maintenance thereof during the term of the Term Trust.

"Termination Notice" shall have the meaning set forth in Article 7.

"Term Trust" shall mean the K.C. ABBE® Trust 1995-1 as established pursuant to that certain First Amended and Restated Trust Agreement dated as of April 27, 1995 by and between Seller and the Term Trustee.

"Term Trustee" shall mean The First National Bank of Chicago, not personally but solely, as trustee under the K.C. ABBE® Trust 1995-1, together with any Person who shall be appointed a successor trustee pursuant to Section 6.11 of the Term Trust.

"Total Condemnation" shall mean any Condemnation after the occurrence of which the Lease shall be terminated pursuant to Article XV of the Lease or any similar provision in any Replacement Lease.

"Trust" shall mean the grantor trust established pursuant to the Agreement for the uses and purposes and on the trusts set forth therein.

"Trust Estate" shall mean all right, title and interest of the Remainder Trustee in and to (i) the Real Property; (ii) the Lease and the Guarantee, including, without limitation all right to receive the Rent payable under the Lease or any Replacement Lease and any other payments due thereunder or under the Guarantee; (iii) the accounts held by the Remainder Trustee pursuant to the provisions of this Agreement and (iv) any and all proceeds, replacements, claims and other rights or property interests, tangible or intangible, relating to any of the foregoing.

"Unrecovered Costs" shall have the meaning set forth in Section 6.10 hereof.

"Voting Interests" shall mean the right of each Certificateholder to vote each Certificate in respect of any matter on which Certificateholders may, or are required to, vote pursuant to the terms of this Agreement, with the "Voting Interests" owned by any Certificateholder equal to the percentage ownership interest in the Trust represented by such Certificateholder's Certificate. Certificates held by the Seller are expressly deemed to be included in the computation of Voting Interests for all purposes of this Agreement.

APPENDIX B

[To be added by Amendment.]

APPENDIX B

[To be added by Amendment.]

APPENDIX B

CONDEMNATION ANALYSIS – Appendix B of Trust Agmt.

| Assumed Condemnation Distribution Date | Annual Base Rent | 10x Base Rent ("Net Compensation") | Term Allocation | Remainder Proceeds |
|---|---|---|---|---|
| Closing | 932,650.00 | 9,326,500.00 | 9,040,000.00 | 286,500 |
| 9/15/95 | 932,650.00 | 9,326,500.00 | 9,078,671.11 | 247,829 |
| 10/15/95 | 932,650.00 | 9,326,500.00 | 9,060,662.57 | 265,837 |
| 11/15/95 | 932,650.00 | 9,326,500.00 | 9,040,597.64 | 285,902 |
| 12/15/95 | 932,650.00 | 9,326,500.00 | 9,020,403.89 | 306,096 |
| 1/15/96 | 932,650.00 | 9,326,500.00 | 9,000,080.31 | 326,420 |
| 2/15/96 | 932,650.00 | 9,326,500.00 | 8,979,625.90 | 346,874 |
| 3/15/96 | 932,650.00 | 9,326,500.00 | 8,959,040.65 | 367,459 |
| 4/15/96 | 932,650.00 | 9,326,500.00 | 8,938,323.57 | 388,176 |
| 5/15/96 | 932,650.00 | 9,326,500.00 | 8,917,473.63 | 409,026 |
| 6/15/96 | 932,650.00 | 9,326,500.00 | 8,896,489.84 | 430,010 |
| 7/15/96 | 932,650.00 | 9,326,500.00 | 8,875,371.20 | 451,129 |
| 8/15/96 | 932,650.00 | 9,326,500.00 | 8,854,116.68 | 472,383 |
| 9/15/96 | 932,650.00 | 9,326,500.00 | 8,832,726.30 | 493,774 |
| 10/15/96 | 932,650.00 | 9,326,500.00 | 8,821,262.21 | 505,238 |
| 11/15/96 | 932,650.00 | 9,326,500.00 | 8,799,660.48 | 526,840 |
| 12/15/96 | 932,650.00 | 9,326,500.00 | 8,777,919.87 | 548,580 |
| 1/15/97 | 932,650.00 | 9,326,500.00 | 8,756,040.37 | 570,460 |
| 2/15/97 | 932,650.00 | 9,326,500.00 | 8,734,019.98 | 592,480 |
| 3/15/97 | 932,650.00 | 9,326,500.00 | 8,711,858.68 | 614,641 |
| 4/15/97 | 932,650.00 | 9,326,500.00 | 8,689,555.48 | 636,945 |
| 5/15/97 | 932,650.00 | 9,326,500.00 | 8,667,108.36 | 659,392 |
| 6/15/97 | 932,650.00 | 9,326,500.00 | 8,644,517.33 | 681,983 |
| 7/15/97 | 932,650.00 | 9,326,500.00 | 8,621,781.37 | 704,719 |
| 8/15/97 | 932,650.00 | 9,326,500.00 | 8,598,899.48 | 727,601 |
| 9/15/97 | 932,650.00 | 9,326,500.00 | 8,575,870.66 | 750,629 |
| 10/15/97 | 932,650.00 | 9,326,500.00 | 8,562,759.06 | 763,741 |
| 11/15/97 | 932,650.00 | 9,326,500.00 | 8,539,498.76 | 787,001 |
| 12/15/97 | 932,650.00 | 9,326,500.00 | 8,516,089.51 | 810,410 |
| 1/15/98 | 932,650.00 | 9,326,500.00 | 8,492,529.29 | 833,971 |
| 2/15/98 | 932,650.00 | 9,326,500.00 | 8,468,818.11 | 857,682 |
| 3/15/98 | 932,650.00 | 9,326,500.00 | 8,444,954.97 | 881,545 |
| 4/15/98 | 932,650.00 | 9,326,500.00 | 8,420,938.85 | 905,561 |
| 5/15/98 | 932,650.00 | 9,326,500.00 | 8,396,768.75 | 929,731 |
| 6/15/98 | 932,650.00 | 9,326,500.00 | 8,372,443.65 | 954,056 |
| 7/15/98 | 932,650.00 | 9,326,500.00 | 8,347,962.57 | 978,537 |
| 8/15/98 | 932,650.00 | 9,326,500.00 | 8,323,324.48 | 1,003,176 |
| 9/15/98 | 932,650.00 | 9,326,500.00 | 8,298,527.38 | 1,027,973 |
| 10/15/98 | 932,650.00 | 9,326,500.00 | 8,283,635.43 | 1,042,865 |
| 11/15/98 | 932,650.00 | 9,326,500.00 | 8,258,583.71 | 1,067,916 |
| 12/15/98 | 932,650.00 | 9,326,500.00 | 8,233,371.97 | 1,093,128 |
| 1/15/99 | 932,650.00 | 9,326,500.00 | 8,207,998.19 | 1,118,502 |
| 2/15/99 | 932,650.00 | 9,326,500.00 | 8,182,461.37 | 1,144,039 |
| 3/15/99 | 932,650.00 | 9,326,500.00 | 8,156,760.51 | 1,169,739 |
| 4/15/99 | 932,650.00 | 9,326,500.00 | 8,130,894.60 | 1,195,605 |
| 5/15/99 | 932,650.00 | 9,326,500.00 | 8,104,863.63 | 1,221,636 |
| 6/15/99 | 932,650.00 | 9,326,500.00 | 8,078,665.60 | 1,247,834 |
| 7/15/99 | 932,650.00 | 9,326,500.00 | 8,052,299.49 | 1,274,201 |
| 8/15/99 | 932,650.00 | 9,326,500.00 | 8,025,763.31 | 1,300,737 |

CONDEMNATION ANALYSIS – Appendix B of Trust Agmt.

| Assumed Condemnation Distribution Date | Annual Base Rent | 10x Base Rent ("Net Compensation") | Term Allocation | Remainder Proceeds |
|---|---|---|---|---|
| 9/15/99 | 932,650.00 | 9,326,500.00 | 7,999,057.03 | 1,327,443 |
| 10/15/99 | 932,650.00 | 9,326,500.00 | 7,982,243.84 | 1,344,256 |
| 11/15/99 | 932,650.00 | 9,326,500.00 | 7,955,258.79 | 1,371,241 |
| 12/15/99 | 932,650.00 | 9,326,500.00 | 7,928,100.63 | 1,398,399 |
| 1/15/00 | 1,072,548.00 | 10,725,480.00 | 7,900,768.37 | 2,824,712 |
| 2/15/00 | 1,072,548.00 | 10,725,480.00 | 7,861,527.18 | 2,863,953 |
| 3/15/00 | 1,072,548.00 | 10,725,480.00 | 7,822,034.38 | 2,903,446 |
| 4/15/00 | 1,072,548.00 | 10,725,480.00 | 7,782,287.97 | 2,943,192 |
| 5/15/00 | 1,072,548.00 | 10,725,480.00 | 7,742,286.93 | 2,983,193 |
| 6/15/00 | 1,072,548.00 | 10,725,480.00 | 7,702,029.26 | 3,023,451 |
| 7/15/00 | 1,072,548.00 | 10,725,480.00 | 7,661,512.93 | 3,063,967 |
| 8/15/00 | 1,072,548.00 | 10,725,480.00 | 7,620,736.96 | 3,104,743 |
| 9/15/00 | 1,072,548.00 | 10,725,480.00 | 7,579,699.31 | 3,145,781 |
| 10/15/00 | 1,072,548.00 | 10,725,480.00 | 7,548,462.15 | 3,177,018 |
| 11/15/00 | 1,072,548.00 | 10,725,480.00 | 7,506,960.55 | 3,218,519 |
| 12/15/00 | 1,072,548.00 | 10,725,480.00 | 7,465,192.24 | 3,260,288 |
| 1/15/01 | 1,072,548.00 | 10,725,480.00 | 7,423,156.23 | 3,302,324 |
| 2/15/01 | 1,072,548.00 | 10,725,480.00 | 7,380,850.50 | 3,344,630 |
| 3/15/01 | 1,072,548.00 | 10,725,480.00 | 7,338,273.04 | 3,387,207 |
| 4/15/01 | 1,072,548.00 | 10,725,480.00 | 7,295,422.83 | 3,430,057 |
| 5/15/01 | 1,072,548.00 | 10,725,480.00 | 7,252,297.88 | 3,473,182 |
| 6/15/01 | 1,072,548.00 | 10,725,480.00 | 7,208,896.16 | 3,516,584 |
| 7/15/01 | 1,072,548.00 | 10,725,480.00 | 7,165,215.66 | 3,560,264 |
| 8/15/01 | 1,072,548.00 | 10,725,480.00 | 7,121,254.38 | 3,604,226 |
| 9/15/01 | 1,072,548.00 | 10,725,480.00 | 7,077,011.29 | 3,648,469 |
| 10/15/01 | 1,072,548.00 | 10,725,480.00 | 7,042,548.57 | 3,682,931 |
| 11/15/01 | 1,072,548.00 | 10,725,480.00 | 6,997,800.26 | 3,727,680 |
| 12/15/01 | 1,072,548.00 | 10,725,480.00 | 6,952,765.13 | 3,772,715 |
| 1/15/02 | 1,072,548.00 | 10,725,480.00 | 6,907,441.16 | 3,818,039 |
| 2/15/02 | 1,072,548.00 | 10,725,480.00 | 6,861,826.33 | 3,863,654 |
| 3/15/02 | 1,072,548.00 | 10,725,480.00 | 6,815,918.63 | 3,909,561 |
| 4/15/02 | 1,072,548.00 | 10,725,480.00 | 6,769,716.05 | 3,955,764 |
| 5/15/02 | 1,072,548.00 | 10,725,480.00 | 6,723,217.59 | 4,002,262 |
| 6/15/02 | 1,072,548.00 | 10,725,480.00 | 6,676,420.22 | 4,049,060 |
| 7/15/02 | 1,072,548.00 | 10,725,480.00 | 6,629,322.94 | 4,096,157 |
| 8/15/02 | 1,072,548.00 | 10,725,480.00 | 6,581,923.74 | 4,143,556 |
| 9/15/02 | 1,072,548.00 | 10,725,480.00 | 6,534,220.59 | 4,191,259 |
| 10/15/02 | 1,072,548.00 | 10,725,480.00 | 6,496,274.66 | 4,229,205 |
| 11/15/02 | 1,072,548.00 | 10,725,480.00 | 6,448,021.01 | 4,277,459 |
| 12/15/02 | 1,072,548.00 | 10,725,480.00 | 6,399,458.38 | 4,326,022 |
| 1/15/03 | 1,072,548.00 | 10,725,480.00 | 6,350,583.77 | 4,374,896 |
| 2/15/03 | 1,072,548.00 | 10,725,480.00 | 6,301,396.16 | 4,424,084 |
| 3/15/03 | 1,072,548.00 | 10,725,480.00 | 6,251,892.54 | 4,473,587 |
| 4/15/03 | 1,072,548.00 | 10,725,480.00 | 6,202,070.89 | 4,523,409 |
| 5/15/03 | 1,072,548.00 | 10,725,480.00 | 6,151,930.20 | 4,573,550 |
| 6/15/03 | 1,072,548.00 | 10,725,480.00 | 6,101,467.47 | 4,624,013 |
| 7/15/03 | 1,072,548.00 | 10,725,480.00 | 6,050,680.66 | 4,674,799 |
| 8/15/03 | 1,072,548.00 | 10,725,480.00 | 5,999,567.78 | 4,725,912 |
| 9/15/03 | 1,072,548.00 | 10,725,480.00 | 5,948,127.8[illegible] | 4,[illegible]352 |
| 10/15/03 | 1,072,548.00 | 10,725,480.00 | 5,906,42[illegible] | 4,[illegible] |

CONDEMNATION ANALYSIS – Appendix B of Trust Agmt.

| Assumed Condemnation Distribution Date | Annual Base Rent | 10x Base Rent ("Net Compensation") | Term Allocation | Remainder Proceeds |
|---|---|---|---|---|
| 11/15/03 | 1,072,548.00 | 10,725,480.00 | 5,854,384.12 | 4,871,096 |
| 12/15/03 | 1,072,548.00 | 10,725,480.00 | 5,802,012.21 | 4,923,468 |
| 1/15/04 | 1,072,548.00 | 10,725,480.00 | 5,749,304.16 | 4,976,176 |
| 2/15/04 | 1,072,548.00 | 10,725,480.00 | 5,696,257.95 | 5,029,222 |
| 3/15/04 | 1,072,548.00 | 10,725,480.00 | 5,642,871.57 | 5,082,608 |
| 4/15/04 | 1,072,548.00 | 10,725,480.00 | 5,589,142.00 | 5,136,338 |
| 5/15/04 | 1,072,548.00 | 10,725,480.00 | 5,535,068.24 | 5,190,412 |
| 6/15/04 | 1,072,548.00 | 10,725,480.00 | 5,480,647.27 | 5,244,833 |
| 7/15/04 | 1,072,548.00 | 10,725,480.00 | 5,425,877.07 | 5,299,603 |
| 8/15/04 | 1,072,548.00 | 10,725,480.00 | 5,370,755.63 | 5,354,724 |
| 9/15/04 | 1,072,548.00 | 10,725,480.00 | 5,315,279.93 | 5,410,200 |
| 10/15/04 | 1,072,548.00 | 10,725,480.00 | 5,269,513.13 | 5,455,967 |
| 11/15/04 | 1,072,548.00 | 10,725,480.00 | 5,213,388.29 | 5,512,092 |
| 12/15/04 | 1,072,548.00 | 10,725,480.00 | 5,156,903.15 | 5,568,577 |
| 1/15/05 | 1,233,430.00 | 12,334,300.00 | 5,100,055.71 | 7,234,244 |
| 2/15/05 | 1,233,430.00 | 12,334,300.00 | 5,029,350.91 | 7,304,949 |
| 3/15/05 | 1,233,430.00 | 12,334,300.00 | 4,958,192.22 | 7,376,108 |
| 4/15/05 | 1,233,430.00 | 12,334,300.00 | 4,886,576.62 | 7,447,723 |
| 5/15/05 | 1,233,430.00 | 12,334,300.00 | 4,814,502.09 | 7,519,798 |
| 6/15/05 | 1,233,430.00 | 12,334,300.00 | 4,741,964.61 | 7,592,335 |
| 7/15/05 | 1,233,430.00 | 12,334,300.00 | 4,668,962.16 | 7,665,338 |
| 8/15/05 | 1,233,430.00 | 12,334,300.00 | 4,595,490.73 | 7,738,809 |
| 9/15/05 | 1,233,430.00 | 12,334,300.00 | 4,521,548.29 | 7,812,752 |
| 10/15/05 | 1,233,430.00 | 12,334,300.00 | 4,457,194.99 | 7,877,105 |
| 11/15/05 | 1,233,430.00 | 12,334,300.00 | 4,382,364.89 | 7,951,935 |
| 12/15/05 | 1,233,430.00 | 12,334,300.00 | 4,307,054.73 | 8,027,245 |
| 1/15/06 | 1,233,430.00 | 12,334,300.00 | 4,231,261.49 | 8,103,039 |
| 2/15/06 | 1,233,430.00 | 12,334,300.00 | 4,154,981.14 | 8,179,319 |
| 3/15/06 | 1,233,430.00 | 12,334,300.00 | 4,078,211.68 | 8,256,088 |
| 4/15/06 | 1,233,430.00 | 12,334,300.00 | 4,000,950.08 | 8,333,350 |
| 5/15/06 | 1,233,430.00 | 12,334,300.00 | 3,923,192.32 | 8,411,108 |
| 6/15/06 | 1,233,430.00 | 12,334,300.00 | 3,844,935.37 | 8,489,365 |
| 7/15/06 | 1,233,430.00 | 12,334,300.00 | 3,766,176.22 | 8,568,124 |
| 8/15/06 | 1,233,430.00 | 12,334,300.00 | 3,686,911.85 | 8,647,388 |
| 9/15/06 | 1,233,430.00 | 12,334,300.00 | 3,607,139.24 | 8,727,161 |
| 10/15/06 | 1,233,430.00 | 12,334,300.00 | 3,536,918.53 | 8,797,381 |
| 11/15/06 | 1,233,430.00 | 12,334,300.00 | 3,456,182.78 | 8,878,117 |
| 12/15/06 | 1,233,430.00 | 12,334,300.00 | 3,374,929.73 | 8,959,370 |
| 1/15/07 | 1,233,430.00 | 12,334,300.00 | 3,293,155.35 | 9,041,145 |
| 2/15/07 | 1,233,430.00 | 12,334,300.00 | 3,210,855.63 | 9,123,444 |
| 3/15/07 | 1,233,430.00 | 12,334,300.00 | 3,128,028.55 | 9,206,271 |
| 4/15/07 | 1,233,430.00 | 12,334,300.00 | 3,044,669.07 | 9,289,631 |
| 5/15/07 | 1,233,430.00 | 12,334,300.00 | 2,960,775.18 | 9,373,525 |
| 6/15/07 | 1,233,430.00 | 12,334,300.00 | 2,876,342.86 | 9,457,957 |
| 7/15/07 | 1,233,430.00 | 12,334,300.00 | 2,791,369.09 | 9,542,931 |
| 8/15/07 | 1,233,430.00 | 12,334,300.00 | 2,705,849.84 | 9,628,450 |
| 9/15/07 | 1,233,430.00 | 12,334,300.00 | 2,619,782.09 | 9,714,518 |
| 10/15/07 | 1,233,430.00 | 12,334,300.00 | 2,543,225.99 | 9,791,074 |
| 11/15/07 | 1,233,430.00 | 12,334,300.00 | 2,456,114.59 | 9,878,185 |
| 12/15/07 | 1,233,430.00 | 12,334,300.00 | 2,358,444.62 | 9,965,855 |

| CONDEMNATION ANALYSIS – Appendix B of Trust Agmt. | | | | |
|---|---|---|---|---|
| Assumed Condemnation Distribution Date | Annual Base Rent | 10x Base Rent ("Net Compensation") | Term Allocation | Remainder Proceeds |
| 1/15/08 | 1,233,430.00 | 12,334,300.00 | 2,280,212.07 | 10,054,088 |
| 2/15/08 | 1,233,430.00 | 12,334,300.00 | 2,191,412.91 | 10,142,887 |
| 3/15/08 | 1,233,430.00 | 12,334,300.00 | 2,102,044.12 | 10,232,256 |
| 4/15/08 | 1,233,430.00 | 12,334,300.00 | 2,012,101.67 | 10,322,198 |
| 5/15/08 | 1,233,430.00 | 12,334,300.00 | 1,921,582.54 | 10,412,717 |
| 6/15/08 | 1,233,430.00 | 12,334,300.00 | 1,830,482.71 | 10,503,817 |
| 7/15/08 | 1,233,430.00 | 12,334,300.00 | 1,738,798.15 | 10,595,502 |
| 8/15/08 | 1,233,430.00 | 12,334,300.00 | 1,646,524.84 | 10,687,775 |
| 9/15/08 | 1,233,430.00 | 12,334,300.00 | 1,553,659.75 | 10,780,640 |
| 10/15/08 | 1,233,430.00 | 12,334,300.00 | 1,470,263.04 | 10,864,037 |
| 11/15/08 | 1,233,430.00 | 12,334,300.00 | 1,376,266.74 | 10,958,033 |
| 12/15/08 | 1,233,430.00 | 12,334,300.00 | 1,281,667.60 | 11,052,632 |
| 1/15/09 | 1,233,430.00 | 12,334,300.00 | 1,186,461.59 | 11,147,838 |
| 2/15/09 | 1,233,430.00 | 12,334,300.00 | 1,090,644.68 | 11,243,655 |
| 3/15/09 | 1,233,430.00 | 12,334,300.00 | 994,212.86 | 11,340,087 |
| 4/15/09 | 1,233,430.00 | 12,334,300.00 | 897,162.09 | 11,437,138 |
| 5/15/09 | 1,233,430.00 | 12,334,300.00 | 799,488.34 | 11,534,812 |
| 6/15/09 | 1,233,430.00 | 12,334,300.00 | 701,187.60 | 11,633,112 |
| 7/15/09 | 1,233,430.00 | 12,334,300.00 | 602,256.84 | 11,732,043 |
| 8/15/09 | 1,233,430.00 | 12,334,300.00 | 502,691.04 | 11,831,609 |
| 9/15/09 | 1,233,430.00 | 12,334,300.00 | 402,486.15 | 11,931,814 |
| 10/15/09 | 1,233,430.00 | 12,334,300.00 | 304,154.21 | 12,030,146 |
| 11/15/09 | 1,233,430.00 | 12,334,300.00 | 202,675.21 | 12,131,625 |
| 12/15/09 | 1,233,430.00 | 12,334,300.00 | 100,545.05 | 12,233,755 |

EXHIBIT A

NUMBER R- ________________________ $____________________

THE SECURITIES REPRESENTED BY THIS CERTIFICATE HAVE NOT BEEN AND WILL NOT BE REGISTERED UNDER THE SECURITIES ACT OF 1933, AS AMENDED (THE "SECURITIES ACT"), OR THE LAWS OF ANY OTHER JURISDICTION. CONSEQUENTLY, THE CERTIFICATES ARE NOT TRANSFERABLE OTHER THAN PURSUANT TO AN EXEMPTION UNDER THE SECURITIES ACT AND SATISFACTION OF CERTAIN OTHER PROVISIONS SPECIFIED BELOW.

NO SALE, PLEDGE OR OTHER TRANSFER OF THIS CERTIFICATE MAY BE MADE BY ANY PERSON UNLESS EITHER (I) SUCH SALE, PLEDGE OR OTHER TRANSFER IS MADE TO A "QUALIFIED INSTITUTIONAL BUYER" THAT EXECUTES A CERTIFICATE TO THE EFFECT THAT (A) IT IS A "QUALIFIED INSTITUTIONAL BUYER" AS DEFINED UNDER RULE 144A UNDER THE SECURITIES ACT, ACTING FOR ITS OWN ACCOUNT OR THE ACCOUNTS OF OTHER "QUALIFIED INSTITUTIONAL BUYERS" AS DEFINED UNDER RULE 144A UNDER THE SECURITIES ACT, AND (B) IT IS AWARE THAT THE TRANSFEROR OF THIS CERTIFICATE INTENDS TO RELY ON THE EXEMPTION FROM THE REGISTRATION REQUIREMENTS OF THE SECURITIES ACT PROVIDED BY RULE 144A UNDER THE SECURITIES ACT, OR (II) SUCH SALE, PLEDGE OR OTHER TRANSFER IS OTHERWISE MADE IN A TRANSACTION EXEMPT FROM THE REGISTRATION REQUIREMENTS OF THE SECURITIES ACT, IN WHICH CASE (A) THE TRUSTEE SHALL REQUIRE THAT BOTH THE PROSPECTIVE TRANSFEROR AND THE PROSPECTIVE TRANSFEREE CERTIFY TO THE TRUSTEE AND THE SELLER IN WRITING THE FACTS SURROUNDING SUCH TRANSFER, WHICH CERTIFICATION SHALL BE IN FORM AND SUBSTANCE SATISFACTORY TO THE TRUSTEE AND THE SELLER, AND (B) THE TRUSTEE SHALL REQUIRE A WRITTEN

OPINION OF COUNSEL (WHICH WILL NOT BE AT THE EXPENSE OF THE SELLER OR THE TRUSTEE) SATISFACTORY TO THE SELLER AND THE TRUSTEE TO THE EFFECT THAT SUCH TRANSFER WILL NOT VIOLATE THE SECURITIES ACT.

THE CERTIFICATES MAY NOT BE ACQUIRED BY OR FOR THE ACCOUNT OF (I) AN EMPLOYEE BENEFIT PLAN (AS DEFINED IN SECTION 3(3) OF THE EMPLOYEE RETIREMENT INCOME SECURITY ACT OF 1974, AS AMENDED ("ERISA")) THAT IS SUBJECT TO THE PROVISIONS OF TITLE I OR ERISA, (II) A PLAN DESCRIBED IN SECTION 4975(E)(1) OF THE INTERNAL REVENUE CODE OF 1986, AS AMENDED, OR (III) ANY ENTITY WHOSE UNDERLYING ASSETS INCLUDE PLAN ASSETS BY REASON OF A PLAN'S INVESTMENT IN THE ENTITY (EACH A "BENEFIT PLAN"). BY ACCEPTING AND HOLDING A CERTIFICATE, THE CERTIFICATEHOLDER THEREOF SHALL BE DEEMED TO HAVE REPRESENTED AND WARRANTED THAT IT IS NOT A BENEFIT PLAN AND, IF REQUESTED TO DO SO BY THE SELLER OR THE TRUSTEE, CERTIFICATEHOLDER SHALL DELIVER TO THE TRUSTEE AN UNDERTAKING LETTER TO SUCH EFFECT IN THE FORM SPECIFIED IN THE AGREEMENT.

K.C. LURE® TRUST 1995-1

CERTIFICATE OF BENEFICIAL INTEREST evidencing a fractional undivided interest in the Trust, as defined below, the property of which includes a remainder interest in the Real Property (as defined in the Trust Agreement) subject to an estate for years commencing on April 27, 1995 and ending on December 31, 2009 including, without limitation all rights of the Remainder Trustee to receive rent or any other payments in respect of the Real Property and all accounts held by or for the benefit of the Remainder Trustee pursuant to the Terms of the Trust Agreement (as defined below).

(This Certificate does not represent an interest in or obligation of Scribcor, Inc., Old American Insurance Company or any of their respective affiliates.)

THIS CERTIFIES THAT ______________________________ is the registered owner of a nonassessable, fully-paid, fractional undivided interest in K.C. LURE® TRUST 1995-1 (the "Trust") formed by Scribcor, Inc., an Illinois corporation.

The Trust was created pursuant to a Trust Agreement, dated as of April ___, 1995 (as amended and supplemented from time to time, the "Trust Agreement"), between the Seller and American National Bank and Trust Company of Chicago, a national banking association, not in its personal capacity, but solely as trustee (the "Remainder Trustee"), a summary of certain of the pertinent provisions of which is set forth below. To the extent not otherwise defined herein, the capitalized terms used herein have the meanings assigned to them in the Trust Agreement.

This Certificate is one of the duly authorized Certificates designated as K.C. LURE® TRUST 1995-1 Certificate of Beneficial Interest (the "Certificates"). This Certificate is issued under and is subject to the terms, provisions and conditions of the Trust Agreement, the terms of which are incorporated herein by reference and made a part hereof, to which Trust Agreement the holder of this Certificate by virtue of the acceptance hereof assents and by which such holder is bound. Without limiting the foregoing, the Certificate is subject to each and every of the conditions and limitations contained in Sections 4.4 and 6.2 of the Trust Agreement.

Under the Trust Agreement, there shall be distributed on the 15th day of each month after the establishment of the Administration Account, or, if such 15th day is not a Business Day, the next Business Day (each, a "Distribution Date"), to the person in whose name this Certificate is registered on the related Record Date (as defined below), such Certificateholder's fractional undivided interest in the amount of Distributable Funds to be distributed to Certificateholders on such Distribution Date; provided however, Certificateholders shall not receive payments in respect of the Certificate Balance until all Reimbursable Costs reasonably incurred by the Term Trustee have been reimbursed to the Term Trustee in accordance with Section 6.10 and Article V of the Trust Agreement. The "Record Date," with respect to any Distribution Date, means the close of business on the third (3rd) business day immediately preceding such Distribution Date.

The distributions in respect of the Certificate Balance on this Certificate are payable in such coin or currency of the United States of America as at the time of payment is legal tender for payment of public and private debts.

It is the intent of the Seller and the Certificateholders that, for purposes of federal income, state and local income and franchise taxes, and any other taxes imposed upon, measured by or based upon gross or neome, the Trust shall be treated as a grantor trust. Except as otherwise required by appropriate taxing authorities, the Seller and the other Certificateholders by acceptance of a Certificate, agree to treat, and to take no action inconsistent with the treatment of, the Certificates for such tax purposes as interests in such grantor trust.

The Certificateholder, by its acceptance of the Certificate, covenants and agrees that such Certificateholder shall not, prior to the date which is one year and one day after the termination of the Trust Agreement, acquiesce in, petition or otherwise invoke or cause the Seller to invoke the process of any court or governmental authority for the purpose of commencing or sustaining a case against the Seller under any federal or state bankruptcy, insolvency, reorganization or similar law or appointing a receiver, liquidator, assignee, trustee, custodian, sequestrator or other similar official of the Seller or any substantial part of its property, or ordering the winding up or liquidation of the affairs of the Seller.

Distributions on this Certificate shall be made as provided in the Trust Agreement by the Remainder Trustee by wire transfer or check mailed to the Certificateholder of record in the Certificate Register without the presentation or surrender of this Certificate or the making of any notation hereon. Except as otherwise provided in the Trust Agreement and notwithstanding the above, the final distribution on this Certificate shall be made after due notice by the Remainder Trustee of the pendency of such distribution and only upon presentation and surrender of this Certificate at the office maintained for such purpose by the Trustee in the City of Chicago, County of Cook and State of Illinois.

Reference is hereby made to the further provisions of this Certificate set forth on the reverse hereof, which further provisions shall for all purposes have the same effect as if set forth at this place.

Unless the certificate of authentication hereon shall have been executed by an authorized officer of the Remainder Trustee by manual signature, this Certificate shall not entitle the holder hereof to any benefit under the Trust Agreement or be valid for any purpose.

The Certificateholder represents that it is acquiring the Certificate for its own account with the present intention of holding such securities for purposes of investment, and that it has no intention of selling such securities in a public distribution in violation of the federal securities laws or any applicable state securities laws, provided that the disposition of its property shall at all times be within its control. The Certificateholder represents that it is an "accredited investor" as such term is defined under Regulation D promulgated under the Securities Act. The Certificateholder acknowledges that it is able to bear the economic risk if its investment in the Certificate for an indefinite period of time because the Certificate is being issued and sold under exemption(s) from registration provided in the Securities Act and under applicable state securities laws and therefore, cannot be sold unless subsequently registered under the Securities Act or applicable state securities laws or an exemption from such registrations is available. Further, the Certificateholder acknowledges the transfer restrictions relating to the Certificate set forth in the Trust Agreement.

THIS CERTIFICATE SHALL BE CONSTRUED IN ACCORDANCE WITH THE LAWS OF THE STATE OF ILLINOIS, WITHOUT REFERENCE TO ITS CONFLICT OF LAW PROVISIONS, AND THE OBLIGATIONS, RIGHTS AND REMEDIES OF THE PARTIES HEREUNDER SHALL BE DETERMINED IN ACCORDANCE WITH SUCH LAWS.

The Certificateholder, by its acceptance of the Certificate, acknowledges that the Certificate represents a beneficial interest in the Trust only and does not represent interests in or obligations of the Tenant, the Remainder Trustee, or any Affiliate thereof and that no recourse may be had against such parties or their assets, except as expressly set forth in the Trust Agreement or this Certificate.

IN WITNESS WHEREOF, the Remainder Trustee, on behalf of the Trust and not in its individual capacity, has caused this Certificate to be duly executed.

K.C. LURE® TRUST 1995-1
AMERICAN NATIONAL BANK AND TRUST COMPANY OF CHICAGO, a national banking association, not in its individual capacity but solely as Remainder Trustee Dated: ____________________, 1995

By:______________________________
Name:____________________________
Title:____________________________

REMAINDER TRUSTEE'S CERTIFICATE OF AUTHENTICATION

This is one of the Certificates referred to in the within-mentioned Trust Agreement.

| | | |
|---|---|---|
| American National Bank and Trust Company of Chicago, a national banking association, not in its individual capacity but solely as Remainder Trustee<br><br>By<br><br>__________________________<br><br>____<br><br>Name:<br><br>Title: | OR | American National Bank and Trust Company of Chicago, a national banking association, not in its individual capacity but solely as Remainder Trustee<br><br>By _____________________, as<br><br>Authenticating Agent<br><br>By:<br><br>____________________________<br><br>Name:<br><br>Title: |

REVERSE OF CERTIFICATE

The Certificates do not represent an obligation of, or an interest in, the Seller, Tenant, any Replacement Tenant, the Remainder Trustee or any affiliates of any of them and no recourse may be had against such parties or their assets, except as may be expressly set forth or contemplated herein or in the Trust Agreement. In addition, this Certificate is not guaranteed by any governmental agency or instrumentality and is limited in right of payment to certain collections and recoveries with respect to the Trust Estate (and certain other amounts), all as more specifically set forth herein and in the Trust Agreement. A copy of the Trust Agreement may be examined during normal business hours at the principal office of the Seller or the Remainder Trustee, and at such other places, if any, designated by the Seller, or the Remainder Trustee, by any Certificateholder upon written request.

The Trust Agreement does not permit, with certain exceptions therein provided, the amendment thereof or the modification of the rights and obligations of the Seller and the rights of the Certificateholders under the Trust Agreement. To the extent such amendments and modifications are permitted, the same may be made only with the consent of Certificateholders whose Certificates evidence not less than a majority of the Voting Interests as of the close of business on the immediately preceding Record Date. Any such consent by the Holder of this Certificate shall be conclusive and binding on such holder and on all future Holders of this Certificate and of any Certificate issued upon the transfer hereof or in exchange herefor or in lieu hereof whether or not notation of such consent is made upon this Certificate.

As provided in the Trust Agreement and subject to certain limitations therein set forth, the transfer of this Certificate is registerable in the Certificate Register upon surrender of this Certificate for registration of transfer at the offices or agencies of the Certificate Registrar maintained by the Remainder Trustee in the City of Chicago, County of Cook and State of Illinois, accompanied by a written instrument of transfer in form satisfactory to the Remainder Trustee and the Certificate Registrar duly executed by the Holder hereof or such Holder's attorney duly authorized in writing, and thereupon one or more new Certificates of authorized denominations evidencing the same aggregate interest in the Trust will be issued to the designated transferee. The initial Certificate Registrar appointed under the Trust Agreement is American National Bank and Trust Company of Chicago, Chicago, Illinois.

The Certificates are issuable only as registered Certificates without coupons in denominations of $20,000 or integral multiples of $1,000 in excess thereof. As provided in the Trust Agreement and subject to certain limitations therein set forth, Certificates are exchangeable for new Certificates of authorized denominations evidencing the same aggregate denomination, as requested by the Holder surrendering the same; provided, however, that no Certificate may be subdivided such that the denomination of any resulting Certificate is less than $20,000. No service charge shall be made for any such registration of transfer or exchange, but the Remainder Trustee or the Certificate Registrar may require payment of a sum sufficient to cover any tax or governmental charge payable in connection therewith.

The Remainder Trustee, the Certificate Registrar and any agent of the Remainder Trustee or the Certificate Registrar may treat the person in whose name this Certificate is registered as the owner hereof for all purposes, and none of the Remainder Trustee, the Certificate Registrar or any such agent shall be affected by any notice to the contrary.

The obligations and responsibilities created by the Trust Agreement and the Trust created thereby shall terminate upon the payment to Certificateholders of all amounts required to be paid to them pursuant to the Trust Agreement and the disposition of all property held as part of the Trust.

EXHIBIT B

SECURITIES ACT EXEMPTION CERTIFICATE

Scribcor, Inc.
400 North Michigan Avenue
Suite 1200
Chicago, Illinois 60611

American National Bank and Trust
Company of Chicago
33 North LaSalle Street
Chicago, IL Ladies and Gentlemen:

In connection with our proposed purchase of a certificate of beneficial interest (the "Certificate"), representing a fractional undivided interest in the K.C. LURE® Trust 1995-1, issued under a trust agreement, dated as of April 27, 1995 (the "Trust Agreement"), between Scribcor, Inc., an Illinois corporation (the "Seller") and American National Bank and Trust Company of Chicago, as owner trustee, acting thereunder not in its individual capacity but solely as remainder trustee of the Trust (the "Remainder Trustee") we certify that:

1. We understand that the Certificate has not been registered under the Securities Act of 1933, as amended (the "Securities Act"), and may not be sold except as permitted in the following sentence. We agree, on our own behalf and on behalf of any accounts for which we are acting as hereinafter stated, that such Certificate may be resold, pledged or transferred only to: (i) the Seller; (ii) an institutional investor that is an "Accredited Investor" as defined in Rule 501(a)(1), (2), (3) or (7) (an "Institutional Accredited Investor") under the Securities Act (as indicated by the box checked by the transferor on the Certificate of Transfer on the reverse of the Certificate) acting for its own account and not for the account of others or as a fiduciary or agent for others (which others also are Institutional Accredited Investors unless the holder is a bank acting in its fiduciary capacity) that executes a certificate substantially in the form hereof, (iii) so long as such Certificate is eligible for resale pursuant to Rule 144A under the Securities Act ("Rule 144A"), to a person whom we reasonably believe after due inquiry to be a "qualified institutional buyer" as defined in Rule 144A acting for its own account (and not for the account of others) or as a fiduciary or agent for others (which others also are "qualified institutional buyers" to whom notice is given that the resale, pledge or transfer is being made in reliance on Rule 144A, or (iv) in a sale, pledge or other transfer made in a transaction otherwise exempt from the registration requirements of the Securities Act, in which case (A) the Remainder Trustee shall require a written opinion of counsel (which will not be at the expense of the Seller or the Remainder Trustee) satisfactory to the Seller and the Remainder Trustee to the effect that such transfer will not violate the Securities Act, in each in accordance with any applicable securities laws of any state of the United States. We will notify any purchaser of the Certificate from us of the above resale restrictions, if then applicable. We further understand that in connection with any transfer of the Certificate by us that the Seller and the Remainder Trustee may request, and if so requested we will furnish, such certificates and other information as they may reasonably require to confirm that any such transfer complies with the foregoing restrictions. We understand that no sale, pledge or other transfer may be made to any one person for Certificates with a face amount of less than $20,000 and, in the case of any person acting on behalf of one or more third parties (other than a bank (as defined in Section 3(a)(2) of the Securities Act) acting in its fiduciary capacity), for the Certificates with a face amount of less than $20,000 for each such third party.

2. [CHECK ONE]

• (a) We are an institutional investor and an "accredited investor" (as defined in Rule 501(a)(1), (2), (3) or (7) of Regulation D under the Securities Act) acting for our own account (and not for the account of others) or as a fiduciary or agent for others (which others also are Institutional Accredited Investors unless we are bank acting in its fiduciary capacity). We have such knowledge and experience in financial and business matters as to be capable of evaluating the merits and risks of our investment in the Certificate, and we and any accounts for which we are acting are each able to bear the economic risk of our or its investment for an indefinite period of time. We are acquiring the Certificate for investment and not with a view to, or for offer and sale in connection with, a public distribution.

• (b) We re a "qualified institutional buyer" as defined under Rule 144A under the Securities Act and are acquiring the Certificate for our own account (and not for the account of others) or as a fiduciary or agent for others (which others also are "qualified institutional buyers"). We are familiar with Rule 144A under the Securities Act and are aware that the seller of the Certificate and other parties intend to rely on the statements made herein and the exemption from the registration requirements of the Securities Act provided by Rule 144A.

3. You are entitled to rely upon this letter and you are irrevocably authorized to produce this letter or a copy thereof to any interested party in any administrative or legal proceeding or official inquiry with respect to the matters covered hereby.

Very truly yours,

________________________________________

(Name of Purchaser)

By: ______________________________________

Date: _____________________________________

EXHIBIT C

UNDERTAKING LETTER

Scribcor, Inc.
400 North Michigan Avenue
Chicago, IL 60611

American National Bank and Trust
Company of Chicago as Remainder
Trustee of the K.C. LURE® Trust 1995-1
The First National Plaza
Chicago, IL 60670

Ladies and Gentlemen:

In connection with our purchase of record or beneficial ownership of the Certificate of Beneficial Interest (the "Certificate") of the K.C. LURE® Trust 1995-1, the undersigned purchaser, record owner or beneficial owner hereby acknowledges, represents and warrants that such purchaser, record owner or beneficial owner:

(1) is not, and has not acquired the Certificate by or for the benefit of, (i) an employee benefit plan (as defined in Section 3(3) of the Employee Retirement Income Security Act of 1974, as amended ("ERISA")) that is subject to the provisions of Title I of ERISA, (ii) a plan described in Section 4975(e)(1) of the Internal Revenue Code of 1986, as amended, or (iii) any entity whose underlying assets include plan assets by reason of a plan's investment in the entity whose underlying assets include plan assets by reason of a plan's investment in the entity; and (2) acknowledges that you and others will rely on our acknowledgements, representations and warranties, and agrees to notify you promptly in writing if any of our representations or warranties herein cease to be accurate and complete.

________________________________

Name of Certificateholder

By:______________________________

Name:____________________________

Title:_____________________________

Date: ____________________________

EXHIBIT D

[FORM OF DISTRIBUTION DATE STATEMENT]

| | | |
|---|---|---|
| 1 | Expected Distributions | $________________ |
| 2 | Total Collections Received (since prior Distribution Date, itemized) | $________________ |
| 3. | Distributable Funds (as of this Distribution Date, itemized) | $________________ |
| 4. | Difference between Expected Distributions and Distributable Funds | $________________ |
| 5. | Balance in Certificate Distribution Account (after distribution of Distributable Funds) | $________________ |
| 6. | Reimbursable Costs Distributed to Term Trustee (this Distribution Date, itemize) | $________________ |

EXHIBIT D

SUMMARY OF LEASE PROVISIONS

Summary of Lease Provisions

General

The following is a summary of certain provisions of the Lease. This summary is not a complete description of the terms of the Lease, and reference is made to the Lease for its detailed provisions. Section references are to the corresponding provisions of the Lease the terms of which are incorporated by reference thereto.

Pursuant to the Lease, the Tenant has leased during the Initial Term (as defined below) the Property, which contains all 94,176 rentable square feet of office space in the Old American Life Insurance Building (the "Building"), comprised of (i) 66,396 rentable square feet of office space on floors 1 through 3 of the Building and (ii) 27,780 rentable square feet of space in the Building's basement, which is utilized as a cafeteria, print shop and other office service facilities and (iii) the Building's three-story covered parking garage, containing spaces for 250 cars. The term "Premises," as used herein, shall refer to the Property (including the Building).

Term

The initial 20-year term of the Lease (the "Initial Term") commenced on December 29, 1989 and will expire on December 31, 2009, unless sooner terminated in accordance with the provisions of the Lease pertaining to casualty loss or condemnation or the exercise of the Landlord's remedies under the Lease. The tenant has the option to extend the term of the Lease for two additional periods of five years (each, a "Renewal Term"). The Initial Term and the Renewal Terms are sometimes collectively referred to herein as the "Term."

In the event that the Property has been subleased to not more than two subtenants, for a term, including renewals, which shall expire not more than three years after the expiration of the Term, the Tenant shall have the right, at its option, to renew the Term for an additional period of either one, two or three years, so that the Term, as so renewed, shall expire after the expiration of such subleases; provided, Tenant shall have no further right to renew or extend the Term of the Lease. (Article III.D.)

Base Rent

The Tenant is obligated to pay the annual base rent ("Base Rent") in equal installments on the first day of each month during the Term, without any right of set-off or deduction whatsoever. The annual and monthly Base Rent prescribed by the Lease during each year during the Initial Term and Renewal Terms is as follows:

| Year ending December 31 | Annual Base Rent | Monthly Base Rent |
|---|---|---|
| 1995-1999, inclusive.............................. | $ 932,650 | $ 77,720.83 |
| 2000-2004, inclusive................................ | 1,072,548 | 89,379.00 |
| 2005-2009, inclusive................................ | 1,233,430 | 102,785.00 |
| First Renewal Term: 2010-2014, inclusive......................................... | 1,418,445 | 118,203.75 |
| Second Renewal Term: 2015-2019, inclusive............................................. | 1,631,211 | 135,934.25 |

Net Lease

The Lease is a so-called "triple-net" lease – i.e., it is the intent of Landlord and Tenant that the Lease will yield, net to Landlord, the Base Rent as above specified, and that all costs and expenses relating to the Premises shall be paid by the Tenant. (Article V.A.) Accordingly, in addition to Base Rent, the Tenant shall pay to the Landlord as additional rent (the "Additional Rent"), without right of reduction, set-off or abatement, all costs and expenses relating to the Premises, including taxes, utility expenses and costs of insurance, and repair and maintenance expenses, all as more fully described below.

Taxes

Tenant has agreed to pay as Additional Rent, before any fine or costs may be added for nonpayment, all real estate taxes, assessments, water and sewer rents, rates and charges, ad valorem taxes, gross receipts taxes, sales and use taxes, and other similar governmental charges which may at any time during the Term be assessed in respect of the Premises and to furnish to Landlord official receipts or other satisfactory proof evidencing such payment. (Article VI.A.)

Repairs and Maintenance

Tenant is required, at its sole cost and expense, to keep the Premises and all parts thereof, including without limitation, all sidewalks, curbs, parking areas, access ways and landscaped areas, in good order, repair and condition, whether interior or exterior, structural or nonstructural, ordinary or extraordinary, foreseen or unforeseen, including, without limitation, repair of all glass, utilities, conduits, fixtures, equipment, foundations, roofs, exterior and interior walls, heating and air conditioning systems, lighting fixtures, wiring, plumbing, sprinkler systems, paving, sidewalks, roads, parking areas, curbs, gutters and fences. The necessity for and adequacy of all repairs to be made to the Premises pursuant to the Lease shall be measured by the standard which is appropriate for suburban office buildings in the Kansas City metropolitan area of similar construction, class and age. (Article VII.A.)

If, during the last twelve months of the Term, Tenant is required pursuant to any applicable legal requirement to make structural repairs or alterations to the Premises (a "Mandated Repair"), then in such case if a Mandated Repair must be completed prior to the expiration of the Term, Tenant shall be responsible for completing the Mandated Repair at its sole cost and expense. If, however, a Mandated Repair may be completed over a period of time which extends beyond the expiration of the Term, but work on such Mandated Repair must be commenced prior to the expiration of the Term, then in such event Tenant is required to commence the work on the Mandated Repair and is obligated to pay that portion of the work which is equal to the result obtained by pro rating the total cost of the Mandated Repair over the period of time during which such Mandated Repair may or must be completed
and allocating to Tenant the amount allocable to the balance of the Term. (Article VII.C.)

Utilities and Services

Landlord is not required to furnish any utilities or services to Tenant. Tenant is responsible for the procurement of and payment for all charges for electricity, power, gas, steam, water, telephone and other utilities and services, including without limitation, cleaning and maintenance services used in connection with the Premises. (Article XI).

Insurance

Tenant shall maintain at all times, at its sole cost and expense, insurance coverage as follows:

1. All-risk property insurance for the full replacement cost of the Property (with a deductible of not more than $25,000);

2. Commercial general public liability insurance against claims for bodily injury, death or property damage occurring on or about the Premises in a single limit amount of $10,000,000 with respect to bodily injury or death arising out of any one accident or occurrence;

3. Boiler and machinery insurance in the amount of at least $1,000,000 (with a dedUctible of not more than $10,000);

4. Worker's compensation insurance to the extent required by law;

5. During any period of construction with respect to the Building, builders' risk insurance on a completed value basis for the total cost of any alterations.

6. If and to the extent such insurance is commonly obtained by prudent owners of suburban office buildings in the Kansas City metropolitan area, environmental impairment insurance in such amounts as are commonly obtained by such prudent owners. Notwithstanding the foregoing, Tenant shall not be required to carry such environmental impairment insurance so long as its net worth exceeds Tenant's Minimum Net Worth (as defined) (and further provided that, to the extent that Tenant is required to carry such insurance because its net worth is equal to or less than Tenant's Minimum Net Worth, Tenant may maintain a deductible with respect to such insurance of not more than 5% of its net worth);

7. Such other insurance in such amounts as are commonly obtained at the time in question by prudent owners of suburban office buildings in the Kansas City metropolitan area.

For purposes of the foregoing paragraph (6), "Tenant's Minimum Net Worth" is an amount equal to the greater of (i) $50,000,000 or (ii) the product of (1) 50 times (2) the Base Rent and taxes with respect to the Premises payable by the Tenant in the then-current calendar year. All insurance maintained by Tenant with respect to the Premises must name Landlord as an additional insured as its interest may appear. In addition, at the request of Landlord, but not more than once every three years, Tenant at Tenant's sole cost and expense shall increase the limits of liability on any of the insurance policies Tenant is otherwise required to maintain to such greater amounts as Landlord shall reasonably request. (Article XII)

All proceeds of insurance maintained by Tenant under the Lease shall be payable to and administered by the Trustee under the terms of the Trust Agreement.

Fire and Other Casualty

In the event of damage or destruction during the second to last year of the Term (the repair and restoration of which would cost in excess of 75% of the replacement value of the Premises) or in the event of damage or destruction during the last year of the Term (the repair and restoration of which would cost in excess of 25% of the replacement value of the Premises), then in each such event, Landlord or Tenant, upon 30 days' written notice to the other, may terminate the Lease, provided that any and all insurance proceeds in such case received by Tenant are required to be paid to and assigned to Landlord. (Article XIV.B.)

Condemnation

Tenant has irrevocably assigned to Landlord any award or payment to which Tenant may be or become entitled by reason of any taking of the Premises or any part thereof by condemnation or other eminent domain proceedings pursuant to any law, general or special, by any governmental authority, civil or military. Notwithstanding the foregoing, Tenant shall have the right to any award or payment on account of Tenant's trade fixtures, equipment and moving expenses, to the extent Tenant shall have a right to make a separate claim therefor against the appropriate governmental authority. (Article XV.A.)

If all or substantially all of the Property shall be taken by condemnation or other eminent domain proceedings, then the Lease shall terminate on the day preceding the date of the vesting of title to the Premises or portion thereof in the condemning authority, and Base Rent and Additional Rent shall be paid to the date of such termination. (Article XV.B.)

If condemnation shall effect at least 50% of the Premises and, in Tenant's reasonable judgment, shall render the Premises unsuitable for restoration for continued use and occupancy, then Tenant shall, not later than 30 days after such condemnation, deliver to Landlord (i) notice of its intention to terminate the Lease on the next rental payment date which occurs not less than 90 days after the delivery of such notice (the "Condemnation Termination Date"), (ii) a certificate of an authorized officer of the Tenant describing the event giving rise to such termination and (iii) an irrevocable offer by Tenant to Landlord to purchase on the Condemnation Termination Date (a) any remaining portion of the Premises and (b) the right to receive the net proceeds, if any, payable in connection with such condemnation, at a price equal to ten times the then annual Base Rent. If Landlord shall reject such offer by notice given to Tenant not later than 15 days prior to the Condemnation Termination Date, the Lease shall terminate on the Condemnation Termination Date upon payment by Tenant of all Base Rent, Additional Rent and other sums then due and payable to and including the Condemnation Termination Date. (Article XV.C.)

If less than 50% of the Premises shall be taken by condemnation or other eminent domain proceedings pursuant to any law, general or special, or the use or occupancy of the Premises or any part thereof shall be temporarily requisitioned by any governmental authority, civil or military, then the Lease shall continue in full force and effect without abatement or reduction of Base Rent, Additional Rent or other sums payable by Tenant. In such event, Tenant is obligated after such taking or requisition, at its sole cost and expense, to repaid any damage caused by any such taking or requisition in conformity with the provisions in the Lease governing the making of alterations to the Premises. (Article XV.E.)

Assignment and Subletting

Tenant shall have the right to assign the Lease (in whole, but not in part) or to sublet the premises (in whole or in part) without the consent of Landlord, provided that in the case of a subletting, no subletting shall be for a term ending later than one day prior to the expiration of the Term. No assignment shall be deemed a waiver of any agreement, term, covenant or condition of the Lease or a release of Tenant from the performance or further performance by Tenant of the agreements, terms, convenants, conditions of the Lease, and Tenant shall continue to be primarily liable under the Lease in accordance with its terms. (Article XVI.A.)

The merger or consolidation or sale of substantially all the assets of Tenant shall be deemed to be an assignment of the Lease. However, it shall be a condition precedent to the merger of Tenant into another corporation or the consolidation of the Tenant with one or more other corporations, that the surviving entity shall (i) have a minimum net worth at least equal to the net worth of Tenant immediately prior to such merger or consolidation, (ii) deliver to Landlord a certified financial statement evidencing satisfaction of the requirement set forth in the foregoing clause (i), and (iii) deliver to Landlord an acknowledged instrument in recordable form assuming all obligations, covenants and responsibilities of Tenant under the Lease. (Article XVI.E.)

Environmental Matters

Tenant has agreed not to use, manufacture, store, dispose or sell any substance or material (collectively, "Hazardous Materials") identified to be toxic, or hazardous according to any applicable federal, state or local statute, law, rule or regulation relating to regulation or control of toxic or hazardous substances or materials ("Environmental Laws"). If tenant receives any written notice of any event involving the use, spill, discharge, dumping or clean-up of any Hazardous Material in at or about the Premises or into the sewer, septic system or waste treatment servicing the Premises (any such event being hereinafter referred to as a "Hazardous Discharge") or any complaint, order, citation or notice with regard to such Hazardous Discharge, then in such event Tenant shall give immediate oral and written notice of same to Landlord.

For purposes of the Lease, the following event constitutes an Event of Default:

If the Environmental Protection Agency, or any other local, state or federal agency asserts or creates a lien upon any or all the Premises by reason of (a) the presence of Hazardous Materials in, on, under, at or about the Premises, (b) the occurrence of a Hazardous Discharge, (c) an environmental complaint, or (d) any violation of any environmental law or otherwise; or if the EPA or any other local, state or federal agency asserts a written claim against Tenant, the Premises or Landlord for damages or clean-up costs related to the presence of Hazardous Materials, a Hazardous Discharge or an environmental complaint on or pertaining to the Premises; provided, however, such claim or lien shall not constitute a default if, within then days after Tenant receives written notice of such lien or claim:

(a) Tenant shall commence and shall thereafter pursue with due diligence either (i) the cure or correction of the event which constitutes the basis for the claim of lien and continues with due diligence to pursue such cure or correction to completion or (ii) proceedings for an injunction, restraining order or other appropriate proceedings are brought by Tenant with due diligence seeking relief of the matter giving rise to the claim and the relief thereby obtained is not thereafter reversed on appeal; and (b) In either of the foregoing events, Tenant shall have posted a bond, letter of credit or other security required by law satisfactory in form, substance and amount to the agency or entity asserting the claim to secure the proper and complete cure or correction of the event which constitutes the basis for the claim.

Tenant has agreed to defend, indemnify and hold Landlord harmless from and against any and all claims (including, without limitation), wrongful death actions and third-party claims (but excluding claims for consequential damages) arising directly or indirectly from the presence of any Hazardous Material in, on, under, at or about the Premises or any Hazardous Discharge in, on, under, at or about the Premises, or any environmental complaint. (Article XIII.)

Alterations

Tenant, at its sole cost and expense, may make alterations or additions or other improvements to the Premises or any part thereof, provided that any alterations or additions (i) shall not reduce the fair market value of the Premises below its value immediately before such alteration or impair the usefulness or structural integrity of the Building or change the use thereof; (ii) shall not reduce the gross leasable area of the Premises, (iii) are effected in good and workmanlike manner in a safe and careful fashion in compliance with all applicable legal requirements and (iv) are fully paid for by the Tenant. (Article VIII.)

Covenant Against Liens

Tenant shall not permit any mechanics' or similar liens for labor or materials furnished to the Premises during the Term to be filed against the Premises or any part thereof and, if such lien shall be filed, Tenant shall either pay the same or procure the discharge thereof in any manner permitted by law within 30 days after such filing. Tenant shall indemnify Landlord and save Landlord harmless from and against any and all loss, damage, claims, liabilities, judgments, costs and expenses arising out of the filing of any such lien. (Article X.)

Default Provisions; Landlord's Remedies

The occurrence of any of the following events constitutes an event of default (an "Event of Default") under the Lease:

1. Tenant's failure to pay any Base Rent, Additional Rent or any other sum required to be paid pursuant to the Lease, and such failure shall continue for 10 days after notice to Tenant of such failure;

2. The occurrence of an Event of Default described under "Environmental Matters" above;

3. Tenant's failure to observe or perform any other provision of the Lease and such failure shall continue for 30 days after notice to Tenant of such failure;

4. If Tenant shall make an assignment for the benefit of creditors, or shall file a voluntary petition under any bankruptcy or insolvency law or an involuntary petition alleging any act of bankruptcy or insolvency shall be filed against Tenant, and the occurrence of certain other bankruptcy-related events, and in such case such events shall occur and continue without the acquiescence of Tenant for a period of 90 days;

5. The occurrence of any event or contingency whereby the Lease or the estate thereby created or the unexpired balance of the Lease Term would, by operation of law or otherwise, devolve upon pass to any person, firm or corporation, except as expressly permitted in the Lease; or 6. If Tenant shall abandon all of the Demised Premises by vacating the premises and failing to (i) maintain the premises , (ii) make all repairs thereto, (iii) maintain security and/or (iv) comply with all the terms, covenants and provisions thereof for a period in excess of 30 days.

If an Event of Default shall have occurred and be continuing, Landlord shall have the right to give Tenant a five-day notice of Landlord's termination of the Lease. Upon expiration of such five-day period, the Lease and the estate thereby granted shall expire and terminate, and all rights of Tenant under the Lease shall expire and terminate, but Tenant shall remain liable under the Lease as hereinafter provided. (Article XVIII.B)

Upon the occurrence of an Event of Default, Landlord shall have the following additional rights and remedies:

1. Landlord shall have the right to reenter the Premises, to dispossess Tenant by a summary proceeding or other appropriate suit and, at Tenant's expense, to remove, for the sole benefit of Landlord, Tenant's effects and to hold the Premises and the right to receive all rental and other income of and from the Premises;

2. In the case of any such reentry termination and/or disposition the Base Rent, Addition Rent and any other sums payable by Tenant under the Lease shall become immediately due and be paid up to the time of such reentry, disposition and/or termination, together with such reasonable expenses as Landlord may incur for legal expenses, attorneys' fees and disbursements; Landlord may relet the premises or any part or parts thereof for a term or terms which may at Landlord's option be less than or exceed the period which would otherwise have constituted the balance of the Term;

3. Tenant shall also pay to Landlord as liquidated damages an amount equal to the Liquidated Damages Amount hereinafter set forth; and 4. Landlord shall have the right to invoke any remedy allowed at law or in equity as if reentry, summary proceedings and other remedies were not provided for in the Lease.

In the event of any termination of the Lease or in the event that Landlord shall reenter the premises as above described, Tenant will pay to Landlord as liquidated damages, at the election or Landlord; either:

(i) A sum equal to the excess, if any, discounted at 8% per annum, of (x) the full amount of Rent reserved under the Lease for the balance of the unexpired portion of the Initial Term, or a Renewal Term, as applicable, and the Additional Rent and other charges or sums payable by Tenant hereunder which would have been payable had the Lease not so terminated, over (y) the aggregate rental value of the Premises for the same period considered on a net rental basis, such sum to be immediately due in full upon such termination or reentry; or (ii) a sum which is equal to the aggregate of the Base Rent reserved under the Lease for the balance of the unexpired portion of the Initial Term or Renewal Term, as applicable, and the Additional Rent and other charges or sums payable by Tenant thereunder which would have been payable by Tenant had the Lease not so terminated, or had Landlord not so reentered the Premises, payable upon the due dates specified in the Lease following such termination or such reentry and until the date for the expiration of the Initial Term or such Renewal Term, as applicable, as provided herein. (Article XVIII.E.)

EXHIBIT E

KANSAS CITY LIFE INSURANCE COMPANY – ANNUAL REPORT ON FORM 10-K

FOR THE YEAR

ENDED DECEMBER 31, 1994

SPECIMEN 7

(vested deed subject to a condition subsequent)

SPECIAL WARRANTY DEED

THIS DEED, Made and entered into as of this 4th day of May, nineteen hundred and ninety-five by and between R&S Kansas City Associates Limited partnership, a Connecticut limited partnership, party of the first part, and The First National Bank of Chicago, not in its individual capacity, but solely as Trustee under the K.C. LURE® TRUST 1995-1, having an address at First National Plaza, Chicago, Illinois, 60601, party of the second part.

WITNESSETH, that the said party of the first part for and in consideration of the sum of Ten U.S. Dollars ($10.00) and other good and valuable consideration paid by the said party of the second part, the receipt of which is hereby acknowledged, does by these presents bargain and sell, convey and confirm unto the said party of the second part all right, title, interest and remainder of the party of the first part in and to the real estate, situated in the County of Jackson, and State of Missouri (the "Premises"), as more particularly described on Exhibit A attached hereto;

To Have and to Hold the same, upon the trusts, together with all rights and appurtenances to the same belonging, unto the said party of the second part, and to its heirs and assigns forever, for the uses and purposes herein and in said Trust Agreement set forth, subject to an estate for years for a term of years commencing on the date hereof and expiring on December 31, 2009 conveyed by instrument of even date herewith and intended to be recorded immediately prior hereto by the party of the first part to The First National Bank of Chicago, not in its individual capacity, but solely as Trustee under the K.C. ABBE® TRUST 1995-1 and further subject to the condition subsequent that upon an Event of Default (as defined in that certain Lease dated December 29, 1989 [the "Lease"] between party of the first part, as landlord, and Old American Insurance Company, as tenant) at any time during the term of the Lease prior to December 31, 2009, title to the Premises shall automatically vest in ________________________________, in accordance with the terms of that certain Special Warranty deed dated May 4, 1995 from party of the first part to ____________________________________ (the "Contingent Deed"). The said party of the first part hereby covenanting that its heirs, executors and administrators shall and will warrant and defend the title to the Premises unto the said party of the second part, and to the heirs and assigns thereof forever, subject to the aforementioned estate for years, against the lawful claims of all persons claiming by, through or under party of the first part but none other, excepting, however, those matters set forth on Exhibit B attached hereto.

If the title to any of the Premises is now or hereafter registered, the Registrar of Titles is hereby directed not to register or note in the certificate of title or duplicate thereof, or memorial, the words "in trust," or upon condition, or "with limitations," or words of similar import, in accordance with the statute in such case made and provided.

IN WITNESS WHEREOF, the said party of the first part has executed these presents the day and year first above written, the undersigned general partners on behalf of the said party of the first part being all of the general partners of the said party of the first part.

R&S KANSAS CITY ASSOCIATES LIMITED PARTNERSHIP

By: U.S. Realty Capital Services, Inc., a general partner

By: ______________________
Richard M. Ader, President

By: Topflight Realty Corp., a Delaware corporation, formerly known as 4900 Oak Street Realty Investment Corp., and name changed to Topflight Realty Corp. pursuant to Certificate of Amendment filed April 5, 1991, a general partner By: ______________________
Gerald Silbert, President

STATE OF NEW YORK )

) SS.

COUNTY OF NEW YORK )

On this 3rd day of May, 1995, before me personally appeared Gerald Silbert, to me known, who, being by me duly sworn, did say that he is the President of Topflight Realty Corp., a Delaware corporation, a general partner of R&S Kansas City Associates Limited Partnership, a Connecticut limited partnership, executing the foregoing instrument, and that the said instrument was signed in behalf of said corporation as general partner of R&S Kansas City Associates Limited Partnership, a Connecticut limited partnership, by authority of the corporation's Board of Directors; and that said individual as said officer acknowledged said execution of said instrument to be the free act and deed of said corporation and limited partnership by them and by the officer voluntarily executed.

IN TESTIMONY WHEREOF, I have hereunto set my hand and affixed my official seal in the County and State aforesaid, the day and year first above written.

______________________________

Notary Public in the State of

My term expires: ______________________

STATE OF NEW YORK )

) SS.

COUNTY OF NEW YORK )

On this 3rd day of May, 1995, before me personally appeared Richard H. Ader, to me known, who, being by me duly sworn, did say that he is the President of U.S. Realty Capital Services, Inc., a corporation of the State of Delaware, a general partner of R&S Kansas City Associates Limited Partnership, a Connecticut limited partnership, executing the foregoing instrument, and that the said instrument was signed in behalf of said corporation as general partner of R&S Kansas City Associates Limited Partnership, a Connecticut limited partnership, by authority of the corporation's Board of Directors; and that said individual as said officer acknowledged said execution of said instrument to be the free act and deed of said corporation and limited partnership by them and by the officer voluntarily executed.

IN TESTIMONY WHEREOF, I have hereunto set my hand and affixed my official seal in the County and State aforesaid, the day and year first above written.

____________________________________

Notary Public in the State of

My term expires: ________________________

EXHIBIT A

Legal Description

All that part of Blocks 2 and 3, LAWNDALE, a subdivision in Kansas City, Jackson County, Missouri, according to the recorded plat thereof, all that part of vacated McGee Street lying between said Blocks 2 and 3 and all of that part of the Southeast 1/4 of the Southwest 1/4 of Section 29, Township 49, Range 33, in said City and County embraced within the following metes and bounds description, to-wit: Beginning at a point in the North line of Lot 1 in said Block 3, said point also being in the North line of said 1/4 1/4 Section and 347.92 feet West of the Northeast corner thereof, thence South along a line 347.92 feet West of and parallel to the East line of said 1/4 1/4 Section a distance of 291 feet; thence East along a line 291 feet South of and parallel to the North line of said 1/4 1/4 Section to the point of intersection of said line with a line drawn Southeasterly in a straight line from a point in the North line of said 1/4 1/4 Section which is 296.3 feet West of the Northeast corner thereof to a point which is 331 feet South of the North line and 146.24 feet West of the East line of said 1/4 1/4 Section; thence Southeasterly along said last described line to said point which is 331 feet South of the North line and 146.24 feet West of the East line of said 1/4 1/4 Section; thence East along a line 331 feet South of and parallel to the North line of said 1/4 1/4 Section 96.74 feet to the point of intersection of said line with the West line of Oak Street, as now established; thence North along said West line of Oak Street 331 feet to a point in the North line of said 1/4 1/4 Section; thence West along the North line of said 1/4 1/4 Section 298.42 feet to the point of beginning.

EXHIBIT B

Permitted Exceptions

1. All taxes and assessments for the year 1995 and thereafter, not yet due and payable.

2. Sewer Right of Way condemned by Kansas City under Ordinance No. 49248, over a 10-foot tract, as being more particularly described therein.

3. Sewer Right of Way granted to Kansas City by the instrument filed in Book B-3088 at Page 208 and in Book B-3087 at Page 190, respectively, over a 10-foot strip, as being more particularly described therein.

4. Sewer Right of Way granted to Kansas City by the instrument filed in Book B-1398 at Page 163, over the North 10 feet of Lot 12, Block 2, LAWNDALE.

5. Utility Easement reserved in Ordinance vacating McGee Street filed October 27, 1930 as Document No. A-457479 in Book B-2983 at Page 503.

6. Easement for buried cable granted to The Kansas City Power & Light Company by the instrument filed in Book B-7014 at Page 701, over a 5 foot tract as being fully described in said document.

7. Easement granted to The Kansas City Power & Light Company by the instrument filed as Document No. B-293759, over a 10 foot tract, as being fully described in said document.

8. Easement granted to The Kansas City Power & Light Company by the instrument filed as Document No. B-293762, over a 10 foot tract, as being fully described in said document.

9. Terms and provisions of lease, notice of which is given in Memorandum of Lease by Seller and Tenant, dated December 29, 1989 and filed January 2, 1990 as Document No. K-908358 in Book K-1984 at Page 1813.

10. Terms and provisions of the Lease, notice of which is given in Memorandum of Lease by Old American Insurance Company and Ewing Marion Kauffman Foundation, dated March 11, 1992 and filed July 24, 1992 as Document No. K-1034456 in Book K-2270 at Page 1744.

11. Terms and provisions of the Lease, notice of which is given in Memorandum of Lease by Old American Insurance Company and Muriel I. Kauffman, dated June 30, 1992 and filed December 4, 1992 as Document No. K-1055836 in Book K-2327 at Page 2061.

12. Terms and provisions of the Lease, notice of which is given in Memorandum of Lease by Old American Insurance Company and Muriel McBrien Kauffman Foundation, filed December 4, 1992 as Document No. K-1055839 in Book K-2327 at Page 2072.

13. Terms, powers, conditions and limitations of the Trusts under which title to said land is held.

14. Any discrepancy between the actual boundaries of the land and the apparent boundaries indicated by fences, plantings or other improvements.

15. Encroachment of the ornamental brick wall over the property adjoining to the west as shown on the survey by Shafer, Kline and Warren dated February 13, 1995.

16. Rights of tenants as tenants only.

17. Terms and conditions of the Contingent Deed to be recorded concurrently with this Deed.

SPECIMEN 8

(contingent deed subject to a condition precedent)

SPECIAL WARRANTY DEED

THIS DEED, Made and entered into as of this 4th day of May, nineteen hundred and ninety-five by and between R&S Kansas City Associates Limited partnership, a Connecticut limited partnership, party of the first part, and

________________________________________

, having an address at ____________________________________, party of the second part.

WITNESSETH, that the said party of the first part for and in consideration of the sum of Ten U.S. Dollars ($10.00) and other good and valuable consideration paid by the said party of the second part, the receipt of which is hereby acknowledged, does by these presents bargain and sell, convey and confirm unto the said party of the second part all right, title, interest and remainder of the party of the first part in and to the real estate, situated in the County of Jackson, and State of Missouri (the "Premises"), as more particularly described on Exhibit A attached hereto;

To Have and to Hold the same, upon the trusts, together with all rights and appurtenances to the same belonging, unto the said party of the second part, and to its heirs and assigns forever, for the uses and purposes herein and in said Trust Agreement set forth, subject to an estate for years for a term of years commencing on the date hereof and expiring on December 31, 2009 conveyed by instrument of even date herewith and intended to be recorded immediately prior hereto by the party of the first part to The First National Bank of Chicago, not in its individual capacity, but solely as Trustee under the K.C. ABBE® TRUST 1995-1 and further subject to the condition precedent that title to the Premises shall only vest in party of the second part upon the occurrence of an Event of Default (as defined in that certain Lease dated December 29, 1989 [the "Lease"] between party of the first part, as landlord, and Old American Insurance Company, as tenant) at any time during the term of the Lease prior to December 31, 2009. Unless and until title to the Premises vests in party of the second part as provided herein, title to the Premises shall vest in The First National Bank of Chicago, not in its individual capacity, but solely as Trustee under the K.C. LURE® TRUST 1995-1 ("K.C. LURE®"), in accordance with the terms of that certain Special Warranty deed dated May 4, 1995 from party of the first to K.C. LURE® TRUST 1995-1 (the "Vested Deed"). The said party of the first part hereby covenanting that its heirs, executors and administrators shall and will warrant and defend the title to the Premises unto the said party of the second part, and to the heirs and assigns thereof forever, subject to the aforementioned estate for years, against the lawful claims of all persons claiming by, through or under party of the first part but none other, excepting, however, those matters set forth on <u>Exhibit B</u> attached hereto.

If the title to any of the Premises is now or hereafter registered, the Registrar of Titles is hereby directed not to register or note in the certificate of title or duplicate thereof, or memorial, the words "in trust," or upon condition, or "with limitations," or words of similar import, in accordance with the statute in such case made and provided.

IN WITNESS WHEREOF, the said party of the first part has executed these presents the day and year first above written, the undersigned general partners on behalf of the said party of the first part being all of the general partners of the said party of the first part.

R&S KANSAS CITY ASSOCIATES LIMITED PARTNERSHIP

By: U.S. Realty Capital Services, Inc., a general partner

By: ______________________
Richard M. Ader, President

By: Topflight Realty Corp., a Delaware corporation, formerly known as 4900 Oak Street Realty Investment Corp., and name changed to Topflight Realty Corp. pursuant to Certificate of Amendment filed April 5, 1991, a general partner By:______________________

Gerald Silbert, President

STATE OF NEW YORK )
) SS.
COUNTY OF NEW YORK )

On this 3rd day of May, 1995, before me personally appeared Gerald Silbert, to me known, who, being by me duly sworn, did say that he is the President of Topflight Realty Corp., a Delaware corporation, a general partner of R&S Kansas City Associates Limited Partnership, a Connecticut limited partnership, executing the foregoing instrument, and that the said instrument was signed in behalf of said corporation as general partner of R&S Kansas City Associates Limited Partnership, a Connecticut limited partnership, by authority of the corporation's Board of Directors; and that said individual as said officer acknowledged said execution of said instrument to be the free act and deed of said corporation and limited partnership by them and by the officer voluntarily executed.

IN TESTIMONY WHEREOF, I have hereunto set my hand and affixed my official seal in the County and State aforesaid, the day and year first above written.

________________________________

Notary Public in the State of

My term expires: ________________________

STATE OF NEW YORK )
) SS.
COUNTY OF NEW YORK )

On this 3rd day of May, 1995, before me personally appeared Richard H. Ader, to me known, who, being by me duly sworn, did say that he is the President of U.S. Realty Capital Services, Inc., a corporation of the State of Delaware, a general partner of R&S Kansas City Associates Limited Partnership, a Connecticut limited partnership, executing the foregoing instrument, and that the said instrument was signed in behalf of said corporation as general partner of R&S Kansas City Associates Limited Partnership, a Connecticut limited partnership, by authority of the corporation's Board of Directors; and that said individual as said officer acknowledged said execution of said instrument to be the free act and deed of said corporation and limited partnership by them and by the officer voluntarily executed.

IN TESTIMONY WHEREOF, I have hereunto set my hand and affixed my official seal in the County and State aforesaid, the day and year first above written.

______________________________

Notary Public in the State of

My term expires: ____________________

EXHIBIT A

Legal Description

All that part of Blocks 2 and 3, LAWNDALE, a subdivision in Kansas City, Jackson County, Missouri, according to the recorded plat thereof, all that part of vacated McGee Street lying between said Blocks 2 and 3 and all of that part of the Southeast 1/4 of the Southwest 1/4 of Section 29, Township 49, Range 33, in said City and County embraced within the following metes and bounds description, to-wit: Beginning at a point in the North line of Lot 1 in said Block 3, said point also being in the North line of said 1/4 1/4 Section and 347.92 feet West of the Northeast corner thereof, thence South along a line 347.92 feet West of and parallel to the East line of said 1/4 1/4 Section a distance of 291 feet; thence East along a line 291 feet South of and parallel to the North line of said 1/4 1/4 Section to the point of intersection of said line with a line drawn Southeasterly in a straight line from a point in the North line of said 1/4 1/4 Section which is 296.3 feet West of the Northeast corner thereof to a point which is 331 feet South of the North line and 146.24 feet West of the East line of said 1/4 1/4 Section; thence Southeasterly along said last described line to said point which is 331 feet South of the North line and 146.24 feet West of the East line of said 1/4 1/4 Section; thence East along a line 331 feet South of and parallel to the North line of said 1/4 1/4 Section 96.74 feet to the point of intersection of said line with the West line of Oak Street, as now established; thence North along said West line of Oak Street 331 feet to a point in the North line of said 1/4 1/4 Section; thence West along the North line of said 1/4 1/4 Section 298.42 feet to the point of beginning.

EXHIBIT B

Permitted Exceptions

1. All taxes and assessments for the year 1995 and thereafter, not yet due and payable.

2. Sewer Right of Way condemned by Kansas City under Ordinance No. 49248, over a 10-foot tract, as being more particularly described therein.

3. Sewer Right of Way granted to Kansas City by the instrument filed in Book B-3088 at Page 208 and in Book B-3087 at Page 190, respectively, over a 10-foot strip, as being more particularly described therein.

4. Sewer Right of Way granted to Kansas City by the instrument filed in Book B-1398 at Page 163, over the North 10 feet of Lot 12, Block 2, LAWNDALE.

5. Utility Easement reserved in Ordinance vacating McGee Street filed October 27, 1930 as Document No. A-457479 in Book B-2983 at Page 503.

6. Easement for buried cable granted to The Kansas City Power & Light Company by the instrument filed in Book B-7014 at Page 701, over a 5 foot tract as being fully described in said document.

7. Easement granted to The Kansas City Power & Light Company by the instrument filed as Document No. B-293759, over a 10 foot tract, as being fully described in said document.

8. Easement granted to The Kansas City Power & Light Company by the instrument filed as Document No. B-293762, over a 10 foot tract, as being fully described in said document.

9. Terms and provisions of lease, notice of which is given in Memorandum of Lease by Seller and Tenant, dated December 29, 1989 and filed January 2, 1990 as Document No. K-908358 in Book K-1984 at Page 1813.

10. Terms and provisions of the Lease, notice of which is given in Memorandum of Lease by Old American Insurance Company and Ewing Marion Kauffman Foundation, dated March 11, 1992 and filed July 24, 1992 as Document No. K-1034456 in Book K-2270 at Page 1744.

11. Terms and provisions of the Lease, notice of which is given in Memorandum of Lease by Old American Insurance Company and Muriel I. Kauffman, dated June 30, 1992 and filed December 4, 1992 as Document No. K-1055836 in Book K-2327 at Page 2061.

12. Terms and provisions of the Lease, notice of which is given in Memorandum of Lease by Old American Insurance Company and Muriel McBrien Kauffman Foundation, filed December 4, 1992 as Document No. K-1055839 in Book K-2327 at Page 2072.

13. Terms, powers, conditions and limitations of the Trusts under which title to said land is held.

14. Any discrepancy between the actual boundaries of the land and the apparent boundaries indicated by fences, plantings or other improvements.

15. Encroachment of the ornamental brick wall over the property adjoining to the west as shown on the survey by Shafer, Kline and Warren dated February 13, 1995.

16. Rights of tenants as tenants only.

17. Terms and conditions of the Vested Deed to be recorded concurrently with this Deed.

SPECIMEN 9

(vested certificate subject to a condition subsequent)

K.C. LURE® TRUST 1995-I

CERTIFICATE OF BENEFICIAL INTEREST evidencing a fractional undivided interest in the Trust, as defined below, the property of which includes a remainder interest in the Real Property (as defined in the Trust Agreement) subject to an estate for years commencing on April 27, 1995 and ending on December 31, 2009 including, without limitation all rights of the Remainder Trustee to receive rent or any other payments in respect of the Real Property and all accounts held by or for the benefit of the Remainder Trustee pursuant to the Terms of the Trust Agreement (as defined below). *

(This Certificate does not represent an interest in or obligation of Scribcor, Inc., Old American Insurance Company or any of their respective affiliates.)

THIS CERTIFIES THAT ______________________________ is the registered owner of a nonassessable, fully-paid, fractional undivided interest in K.C. LURE® TRUST 1995-1 (the "Trust") formed by Scribcor, Inc., an Illinois corporation.

The Trust was created pursuant to a Trust Agreement, dated as of April ___,1995 (as amended and supplemented from time to time, the "Trust Agreement"), between the Seller and American National Bank and Trust Company of Chicago, a national banking association, not in its personal capacity, but solely as trustee (the "Remainder Trustee"), a summary of certain of the pertinent provisions of which is set forth below. To the extent not otherwise defined herein, the capitalized terms used herein have the meanings assigned to them in the Trust Agreement.

This Certificate is one of the duly authorized Certificates designated as KC.

LURE® TRUST 1995-I Certificate of Beneficial Interest (the "Certificates"). This Certificate is issued under and is subject to the terms, provisions and conditions of the Trust Agreement, the terms of which are incorporated herein by reference and made a part hereof, to which Trust Agreement the holder of this Certificate by virtue of the acceptance hereof assents and by which such holder is bound, Without limiting the foregoing, the Certificate is subject to each and every of the conditions and limitations contained in Sections 4.4 and 6.2 of the Trust Agreement.

Under the Trust Agreement, there shall be distributed on the 15th day of each month after the establishment of the Administration Account, or, if such 15th day is not a Business Day, the next Business Day (each, a "Distribution Date"), to the person in whose name this Certificate is registered on the related Record Date (as defined below), such Certificateholder's fractional undivided interest in the amount of Distributable Funds to be distributed to Certificateholders on such Distribution Date; provided however, Certificateholders shall not receive payments in respect of the Certificate Balance until all Reimbursable Costs reasonably incurred by the Term Trustee have been reimbursed to the and further subject to the condition subsequent that upon the occurrence of an Event of Default (as defined in that certain Lease dated December 29, 1989 [the "Lease"] between R&S Kansas City Associates Limited Partnership, as landlord and Old American Insurance Company, as tenant) under the terms of Section XVIIIA(iv) of the Lease at any time during the term of the Lease prior to December 3 1, 2009, title to this Certificate shall automatically vest in

___________________________

Term Trustee in accordance with Section 6.10 and Article V of the Trust Agreement. The "Record Date," with respect to any Distribution Date, means the close of business on the third (3rd) business day immediately preceding such Distribution Date.

The distributions in respect of the Certificate Balance on this Certificate are payable in such coin or currency of the United States of America as at the time of payment is legal tender for payment of public and private debts.

It is the intent of the Seller and the Certificateholders that, for purposes of federal income, state and local income and franchise taxes, and any other taxes imposed upon, measured by or based upon gross or net income, the Trust shall be treated as a grantor trust. Except as otherwise required by appropriate taxing authorities, the Seller and the other Certificateholders by acceptance of a Certificate, agree to treat, and to take no action inconsistent with the treatment of, the Certificates for such tax purposes as interests in such grantor trust.

The Certificateholder, by its acceptance of the Certificate, covenants and agrees that such Certificateholder shall not, prior to the date which is one year and one day after the termination of the Trust Agreement, acquiesce in, petition or otherwise invoke or cause the Seller to invoke the process of any court or governmental authority for the purpose of commencing or sustaining a case against the Seller under any federal or state bankruptcy, insolvency, reorganization or similar law or appointing a receiver, liquidator, assignee, trustee, custodian, sequestrator or other similar official of the Seller or any substantial part of its property, or ordering the winding up or liquidation of the affairs of the Seller.

Distributions on this Certificate shall be made as provided in the Trust Agreement by the Remainder Trustee by wire transfer or check mailed to the Certificateholder of record in the Certificate Register without the presentation or surrender of this Certificate or the making of any notation hereon. Except as otherwise provided in the Trust Agreement and notwithstanding the above, the final distribution on this Certificate shall be made after due notice by the Remainder Trustee of the pendency of such distribution and only upon presentation and surrender of this Certificate at the office maintained for such purpose by the Trustee in the City of Chicago, County of Cook and State of Illinois.

Reference is hereby made to the further provisions of this Certificate set forth on the reverse hereof, which further provisions shall for all purposes have the same effect as if set forth at this place.

Unless the certificate of authentication hereon shall have been executed by an authorized officer of the Remainder Trustee by manual signature, this Certificate shall not entitle the holder hereof to any benefit under the Trust Agreement or be valid for any purpose.

The Certificateholder represents that it is acquiring the Certificate for its own account with the present intention of holding such securities for purposes of investment, and that it has no intention of selling such securities in a public distribution in violation of the federal securities laws or any applicable state securities laws, provided that the disposition of its property shall at all times be within its control. The Certificateholder represents that it is an "accredited investor" as such term is defined under Regulation D promulgated under the Securities Act. The Certificateholder acknowledges that it is able to bear the economic risk of its investment in the Certificate for an indefinite period of time because the Certificate is being issued and sold under exemption(s) from registration provided in the Securities Act and under applicable state securities laws and therefore, cannot be sold unless subsequently registered under the Securities Act or applicable state securities laws or an exemption from such registrations is available. Further, the Certificateholder acknowledges the transfer restrictions relating to the Certificate set forth in the Trust Agreement.

THIS CERTIFICATE SHALL BE CONSTRUED IN ACCORDANCE WITH THE LAWS OF THE STATE OF ILLINOIS, WITHOUT REFERENCE TO ITS CONFLICT OF LAW PROVISIONS, AND THE OBLIGATIONS, RIGHTS AND REMEDIES OF THE PARTIES HEREUNDER SHALL BE DETERMINED IN ACCORDANCE WITH SUCH LAWS.

The Certificateholder, by its acceptance of the Certificate, acknowledges that the Certificate represents a beneficial interest in the Trust only and does not represent interests in or obligations of the Tenant, the Remainder Trustee, or any Affiliate thereof and that no recourse may be had against such parties or their assets, except as expressly set forth in the Trust Agreement or this Certificate.

IN WITNESS WHEREOF, the Remainder Trustee, on behalf of the Trust and not in its individual capacity, has caused this Certificate to be duly executed.

KC, LURE® TRUST 1995-I

AMERICAN NATIONAL BANK AND TRUST COMPANY OF CHICAGO, a national banking association, not in its individual capacity but solely as Remainder Trustee Dated: ____________, 1995

By: ____________________

Name:

Title:.

REMAINDER TRUSTEE'S CERTIFICATE OF AUTHENTICATION

This is one of the Certificates referred to in the within-mentioned Trust Agreement.

American National Bank and Trust Company of Chicago, a national banking association, not in its individual capacity but solely as Remainder Trustee American National Bank and Trust Company of Chicago, a national banking association, not in its individual capacity but solely as Remainder Trustee

OR

By________________________
Name:
Title:

By ________________________ ,as
Authenticating Agent

By: ________________________
Name
Title:

REVERSE OF CERTIFICATE

The Certificates do not represent an obligation of, or an interest in, the Seller, Tenant, any Replacement Tenant, the Remainder Trustee or any affiliates of any of them and no recourse may be had against such parties or their assets, except as may be expressly set forth or contemplated herein or in the Trust Agreement. In addition, this Certificate is not guaranteed by any governmental agency or instrumentality and is limited in right of payment to certain collections and recoveries with respect to the Trust Estate (and certain other amounts), all as more specifically set forth herein and in the Trust Agreement. A copy of the Trust Agreement may be examined during normal business hours at the principal office of the Seller or the Remainder Trustee, and at such other places, if any, designated by the Seller, or the Remainder Trustee, by any Certificateholder upon written request.

The Trust Agreement does not permit, with certain exceptions therein provided, the amendment thereof or the modification of the rights and obligations of the Seller and the rights of the Certificateholders under the Trust Agreement. To the extent such amendments and modifications are permitted, the same may be made only with the consent of Certificateholders whose Certificates evidence not less than a majority of the Voting Interests as of the close of business on the immediately preceding Record Date. Any such consent by the Holder of this Certificate shall be conclusive and binding on such holder and on all future Holders of this Certificate and of any Certificate issued upon the transfer hereof or in exchange herefor or in lieu hereof whether or not notation of such consent is made upon this Certificate.

As provided in the Trust Agreement and subject to certain limitations therein set forth, the transfer of this Certificate is registerable in the Certificate Register upon surrender of this Certificate for registration of transfer at the offices or agencies of the Certificate Registrar maintained by the Remainder Trustee in the City of Chicago, County of Cook and State of Illinois, accompanied by a written instrument of transfer in form satisfactory to the Remainder Trustee and the Certificate Registrar duly executed by the Holder hereof or such Holder's attorney duly authorized in writing, and thereupon one or more new Certificates of authorized denominations evidencing the same aggregate interest in the Trust will be issued to the designated transferee. The initial Certificate Registrar appointed under the Trust Agreement is American National Bank and Trust Company of Chicago, Chicago, Illinois.

The Certificates are issuable only as registered Certificates without coupons in denominations of $20,000 or integral multiples of $1,000 in excess thereof. As provided in the Trust Agreement and subject to certain limitations therein set forth, Certificates are exchangeable for new Certificates of authorized denominations evidencing the same aggregate denomination, as requested by the Holder surrendering the same; provided, however, that no certificate may be subdivided such that the denomination of any resulting Certificate is less than $20,000. No service charge shall be made for any such registration of transfer or exchange, but the Remainder Trustee or the Certificate Registrar may require payment of a sum sufficient to cover any tax or governmental charge payable in connection therewith.

The Remainder Trustee, the Certificate Registrar and any agent of the Remainder Trustee or the Certificate Registrar may treat the person in whose name this Certificate is registered as the owner hereof for all purposes, and none of the Remainder Trustee, the Certificate Registrar or any such agent shall bc affected by any notice to the contrary.

The obligations and responsibilities created by the Trust Agreement and the Trust created thereby shall terminate upon the payment to Certificateholders of all amounts required to be paid to them pursuant to the Trust Agreement and the disposition of all property held as part of the Trust.

SPECIMEN 10

(contingent certificate subject to a condition precedent)

K.C. LURE®TRUST 1995-I

CERTIFICATE OF BENEFICIAL INTEREST evidencing a fractional undivided interest in the Trust, as defined below, the property of which includes a remainder interest in the Real Property (as defined in the Trust Agreement) subject to an estate for years commencing on April 27, 1995 and ending on December 31, 2009 including, without limitation all rights of the Remainder Trustee to receive rent or any other payments in respect of the Real Property and all accounts held by or for the benefit of the Remainder Trustee pursuant to the Terms of the Trust Agreement (as defined below). *

(This Certificate does not represent an interest in or obligation of Scribcor, Inc., Old American Insurance Company or any of their respective affiliates.)

THIS CERTIFIES THAT ______________________________ is the Registered owner of a nonassessable, fully-paid, fractional undivided interest in K.C. LURE® TRUST 1995-1 (the "Trust") formed by Scribcor, Inc., an Illinois corporation.

The Trust was created pursuant to a Trust Agreement, dated as of April __,1995 (as amended and supplemented from time to time, the "Trust Agreement"), between the Seller and American National Bank and Trust Company of Chicago, a national banking association, not in its personal capacity, but solely as trustee (the "Remainder Trustee"), a summary of certain of the pertinent provisions of which is set forth below. To the extent not otherwise defined herein, the capitalized terms used herein have the meanings assigned to them in the Trust Agreement.

This Certificate is one of the duly authorized Certificates designated as KC. LURE®TRUST 1995-1 Certificate of Beneficial Interest (the "Certificates"). This Certificate is issued under and is subject to the terms, provisions and conditions of the Trust Agreement, the terms of which are incorporated herein by reference and made a part hereof, to which Trust Agreement the holder of this Certificate by virtue of the acceptance hereof assents and by which such holder is bound. Without limiting the foregoing, the Certificate is subject to each and every of the conditions and limitations contained in Sections 4.4 and 6.2 of the Trust Agreement.

Under the Trust Agreement. there shall be distributed on the 15th day of each month after the establishment of the Administration Account, or, if such 15th day is not a Business Day, the next Business Day (each, a "Distribution Date"), to the person in whose name this Certificate is registered on the related Record Date (as defined below), such Certificateholder's fractional undivided interest in the amount of Distributable Funds to be distributed to Certificateholders on such Distribution Date; provided however, Certificateholders shall not receive payments in respect of the Certificate Balance until all Reimbursable Costs reasonably incurred by the Term Trustee have

*and further subject to the condition precedent that title to this Certificate shall only vest in the Certificateholder upon the occurrence of an Event of Default (as defined in that certain Lease dated December 29, 1989 [the "Lease"] between R&S Kansas City Associates Limited Partnership, as landlord and Old American Insurance Company, as tenant) under the terms of Section XVIIIA(iv) of the Lease at any time during the term of the Lease Prior to December 31, 2009.

been reimbursed to the Term Trustee in accordance with Section 6.10 and Article V of the Trust Agreement. The "Record Dare," with respect to any Distribution Date, means the close of business on the third (3rd) business day immediately preceding such Distribution Date.

The distributions in respect of the Certificate Balance on this Certificate are payable in such coin or currency of the United States of America as at the time of payment is legal tender for payment of public and private debts.

It is the intent of the Seller and the Certificateholders that, for purposes of federal income, state and local income and franchise taxes, and any other taxes imposed upon, measured by or based upon gross or net income, the Trust shall be treated as a grantor trust. Except as otherwise required by appropriate taxing authorities, the Seller and the other Certificateholders by acceptance of a Certificate, agree to treat, and to take no action inconsistent with the treatment of, the Certificates for such tax purposes as interests in such grantor trust.

The Certificateholder, by its acceptance of the Certificate, covenants and agrees that such Certificateholder shall not, prior to the date which is one year and one day after the termination of the Trust Agreement, acquiesce in, petition or otherwise invoke or cause the Seller to invoke the process of any court or governmental authority for the purpose of commencing or sustaining a case against the Seller under any federal or state bankruptcy, insolvency, reorganization or similar law or appointing a receiver, liquidator, assignee, trustee, custodian, sequestrator or other similar official of the Seller or any substantial part of its property, or ordering the winding up or liquidation of the affairs of the Seller.

Distributions on this Certificate shall be made as provided in the Trust Agreement by the Remainder Trustee by wire transfer or check mailed to the Certificateholder of record in the Certificate Register without the presentation or surrender of this Certificate or the making of any notation hereon. Except as otherwise provided in the Trust Agreement and notwithstanding the above, the final distribution on this Certificate shall be made after due notice by the Remainder Trustee of the pendency of such distribution and only upon presentation and surrender of this Certificate at the office maintained for such purpose by the Trustee in the City of Chicago, County of Cook and State of Illinois.

Reference is hereby made to the further provisions of this Certificate set forth on the reverse hereof, which further provisions shall for all purposes have the same effect as if set forth at this place.

Unless the certificate of authentication hereon shall have been executed by an authorized officer of the Remainder Trustee by manual signature, this Certificate shall not entitle the holder hereof to any benefit under the Trust Agreement or be valid for any purpose.

The Certificateholder represents that it is acquiring the Certificate for its own account with the present intention of holding such securities for purposes of investment, and that it has no intention of selling such securities in a public distribution in violation of the federal securities laws or any applicable state securities laws, provided that the disposition of its property shall at all times be within its control. The Certificateholder represents that it is an "accredited investor" as such term is defined under Regulation D promulgated under the Securities Act. The Certificateholder acknowledges that it is able to bear the economic risk of its investment in the Certificate for an indefinite period of time because the Certificate is being issued and sold under exemption(s) from registration provided in the Securities Act and under applicable state securities laws and therefore, cannot be sold unless subsequently registered under the Securities Act or applicable state securities laws or an exemption from such registrations is available. Further, the Certificateholder acknowledges the transfer restrictions relating to the Certificate set forth in the Trust Agreement.

THIS CERTIFICATE SHALL BE CONSTRUED IN ACCORDANCE WITH THE LAWS OF THE STATE OF ILLINOIS, WITHOUT REFERENCE TO ITS CONFLICT OF LAW PROVISIONS, AND THE. OBLIGATIONS, RIGHTS AND REMEDIES OF THE PARTIES HEREUNDER SHALL BE DETERMINED IN ACCORDANCE WITH SUCH LAWS.

The Certificateholder, by its acceptance of the Certificate, acknowledges that the Certificate represents a beneficial interest in the Trust only and does not represent interests in or obligations of the Tenant, the Remainder Trustee, or any Affiliate thereof and that no recourse may be had against such parties or their assets, except as expressly set forth in the Trust Agreement or this Certificate.

IN WITNESS WHEREOF, the Remainder Trustee, on behalf of the Trust and not in its individual capacity, has caused this Certificate to be duly executed.

KC. LURE® TRUST 1995-I
AMERICAN NATIONAL BANK AND TRUST COMPANY OF CHICAGO, a national banking association, not in its individual capacity but solely as Remainder Trustee Dated: ______________, 1995

By: ______________________________

Name:

Title:

REMAINDER TRUSTEE'S CERTIFICATE OF AUTHENTICATION

This is one of the Certificates referred to in the within-mentioned Trust Agreement.

American National Bank and Trust Company of Chicago, a national banking association, not in its individual capacity but solely as Remainder Trustee By: ______________________
Name:
Title:

OR

American National Bank and Trust Company of Chicago, a national Banking association, not in its individual capacity but solely as Remainder Trustee By: ______________________, as Authorized Agent By: ______________________
Name:
Title:

REVERSE OF CERTIFICATE

The Certificates do not represent an obligation of, or an interest in, the Seller, Tenant, any Replacement Tenant, the Remainder Trustee or any affiliates of any of them and no recourse may be had against such parties or their assets, except as may be expressly set forth or contemplated herein or in the Trust Agreement. In addition, this Certificate is not guaranteed by any governmental agency or instrumentality and is limited in right of payment to certain collections and recoveries with respect to the Trust Estate (and certain other amounts), all as more specifically set forth herein and in the Trust Agreement. A copy of the Trust Agreement may be examined during normal business hours at the principal office of the Seller or the Remainder Trustee, and at such other places, if any, designated by the Seller, or the Remainder Trustee, by any Certificateholder upon written request.

The Trust Agreement does not permit, with certain exceptions therein provided, the amendment thereof or the modification of the rights and obligations of the Seller and the rights of the Certificateholders under the Trust Agreement. To the extent such amendments and modifications arc permitted, the same may be made only with the consent of Certificatcholders whose Certificates evidence not less than a majority of the Voting Interests as of the close of business on the immediately preceding Record Date. Any such consent by the Holder of this Certificate shall be conclusive and binding on such holder and on all future Holders of this Certificate and of any Certificate issued upon the transfer hereof or in exchange herefor or in lieu hereof whether or not notation of such consent is made upon this Certificate.

As provided in the Trust Agreement and subject to certain limitations therein set forth, the transfer of this Certificate is registerable in the Certificate Register upon surrender of this Certificate for registration of transfer at the offices or agencies of the Certificate Registrar maintained by the Remainder Trustee in the City of Chicago, County of Cook and State of Illinois, accompanied by a written instrument of transfer in form satisfactory to the Remainder Trustee and the Certificate Registrar duly executed by the Holder hereof or such Holder's attorney duly authorized in writing, and thereupon one or more new Certificates of authorized denominations evidencing the same aggregate interest in the Trust will be issued to the designated transferee. The initial Certificate Registrar appointed under the Trust Agreement is American National Bank and Trust Company of Chicago, Chicago, Illinois.

The Certificates are issuable only as registered Certificates without coupons in denominations of $20,000 or integral multiples of $1,000 in excess thereof. As provided in the Trust Agreement and subject to certain limitations therein set forth, Certificates are exchangeable for new Certificates of authorized denominations evidencing the same aggregate denomination, as requested by the Holder surrendering the same; provided, however, that no Certificate may be subdivided such that the denomination of any resulting Certificate is less than $20,000. No service charge shall be made for any such registration of transfer or exchange, but the Remainder Trustee or the Certificate Registrar may require payment of a sum sufficient to cover any tax or governmental charge payable in connection therewith.

The Remainder Trustee, the Certificate Registrar and any agent of the Remainder Trustee or the Certificate Registrar may treat the person in whose name this Certificate is registered as the owner hereof for all purposes, and none of the Remainder Trustee, the Certificate Registrar or any such agent shall be affected by any notice to the contrary.

The obligations and responsibilities created by the Trust Agreement and the

Trust created thereby shall terminate upon the payment to Certificateholders of all amounts required to be paid to them pursuant to the Trust Agreement and the disposition of all property held as part of the Trust.

What is claimed is:

1. A computer apparatus for changing digital electrical signals to generate a valuation of a fractional interest in a contingent interest in property, the computer apparatus including:

an input device operable for converting input data representing property into input digital electrical signals representing the input data;

a digital electrical computer having a processor, the processor electrically connected to the input device to receive the input digital electrical signals, the processor programmed to change the input digital electrical signals to produce modified digital electrical signals representing a valuation of a fractional interest in a contingent interest in the property associated with at least one lease default condition for the property;

a memory electrically connected to the processor; and wherein:

the processor manipulates further digital electrical signals to generate at least one document for the contingent interest by inserting the valuation in preexisting text data obtained from the memory; and an output device electrically connected to the processor to print the document.

2. The apparatus of claim 1, wherein the text corresponds to text for a document required for securitization of the contingent interest in the property.

3. The apparatus of claim 1, wherein the contingent interest is an augmented estate for years interest.

4. The apparatus of claim 1, wherein the contingent interest is a complementary remainder interest.

5. The apparatus of claim 1, wherein the processor is further programmed to change the input digital electrical signals to produce further modified digital electrical signals representing a tax subsequent to elimination of a contingency in the contingent interest due to occurrence of the at least one lease default condition, to manipulate the further digital electrical signals to generate at least one additional document utilizing the tax and preexisting text data obtained from the memory, and to control the output device to print the at least one additional document.

6. The apparatus of claim 1, wherein the text corresponds to text for a document for paper-clipping shares in an augmented estate for years interest as the contingent interest.

7. The apparatus of claim 1, wherein the text corresponds to text for a document for paper-clipping shares in a complementary remainder interest as the contingent interest.

8. A computer-aided method for generating financial documentation for a fractional interest in a contingent interest in property, the method including:

controlling a digital electrical computer having a processor by programming the processor and by providing input information to an input device for converting the input information into digital electrical signals, the processor electrically connected to the input device for receiving the input digital electrical signals and to an output device for printing in response to receipt of modified digital electrical signals produced by the processor, the processor being programmed to change the input digital electrical signals representing an interest in property into the modified digital electrical signals representing a document creating a fractional interest in a contingent interest in the property, the contingent interest associated with at least one lease default condition for the property, and to print the document at the output device.

9. The method of claim 8, wherein the step of controlling is carried out with a memory electrically connected to the processor; and wherein:

the processor manipulates the input digital electrical signals to form a valuation of the fractional interest in a contingent interest in the property, the valuation included within the modified digital electrical signals, and wherein the document is made by the processor obtaining preexisting text data from a memory accessible to the processor.

10. The method of claim 8, wherein the document is a document required for securitization of the contingent interest in the property.

11. The method of claim 8, wherein the contingent interest is an augmented estate for years interest.

12. The method of claim 8, wherein the contingent interest is a complementary remainder interest.

13. The method of claim 8, wherein the modified digital electrical signals include a tax determined for the contingent interest.

14. The method of claim 13, wherein the step of controlling is carried out on a second occasion to produce further modified digital electrical signals representing a tax subsequent to elimination of a contingency in the contingent interest due to occurrence of the at least one lease default condition for the property, and the processor is programmed to manipulate the further modified digital electrical signals to generate an additional document utilizing the tax and preexisting text data obtained from a memory electrically connected to the processor, and to control the output device to print the additional document.

15. The method of claim 8, wherein the text corresponds to text for a document for paper-clipping shares in an augmented estate for years interest as the contingent interest.

16. The method of claim 8, wherein the text corresponds to text for a document for paper-clipping shares in a complementary remainder interest as the contingent interest.

17. A computer-aided method for generating financial documentation for a fractional interest in a contingent interest in property, the method including:

controlling a digital electrical computer having a processor by programming the processor and by providing input information to an input device for converting the input information into digital electrical signals, the processor electrically connected to the input device for receiving the input digital electrical signals and to an output device for printing in response to receipt of modified digital electrical signals produced by the processor, the processor being programmed to change the input digital electrical signals representing an interest in property into the modified digital electrical signals representing at least one document of a set of documents collectively used in securitizing a fractional interest in a contingent interest in the property, the contingency interest associated with at least one lease default condition for the property, and to print the document at the output device, wherein at least a member of the set of documents is made by a computerized valuation of the fractional interest in the contingent interest in the property inserted in text data obtained from a memory.

* * * * *